US012486470B2

(12) United States Patent
Vanhercke et al.

(10) Patent No.: US 12,486,470 B2
(45) Date of Patent: *Dec. 2, 2025

(54) PROCESSES FOR PRODUCING INDUSTRIAL PRODUCTS FROM PLANT LIPIDS

(71) Applicant: NUSEED GLOBAL INNOVATION LTD., Manchester (GB)

(72) Inventors: Thomas Vanhercke, Kaleen (AU); James Robertson Petrie, Goulburn (AU); Anna El Tahchy, Kaleen (AU); Surinder Singh, Downer (AU); Kyle Reynolds, Macgregor (AU); Qing Liu, Giralang (AU); Benjamin Aldo Leita, Nelson Bay (AU)

(73) Assignee: NUSEED GLOBAL INNOVATION LTD., Manchester (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,436

(22) Filed: Nov. 10, 2023

(65) Prior Publication Data

US 2024/0263100 A1 Aug. 8, 2024

Related U.S. Application Data

(63) Continuation of application No. 17/828,322, filed on May 31, 2022, now Pat. No. 11,814,600, which is a
(Continued)

(30) Foreign Application Priority Data

| | | |
|---|---|---|
| Jul. 7, 2014 | (AU) | 2014902617 |
| Jan. 13, 2015 | (AU) | 2015900084 |
| Jan. 30, 2015 | (AU) | 2015900284 |

(51) Int. Cl.
*C11B 1/10* (2006.01)
*C10B 53/02* (2006.01)
(Continued)

(52) U.S. Cl.
CPC ................ *C11B 1/10* (2013.01); *C10B 53/02* (2013.01); *C10G 3/40* (2013.01); *C10L 1/026* (2013.01);
(Continued)

(58) Field of Classification Search
CPC . C10B 53/02; C10G 3/40; C10L 1/026; C10L 1/08; C10L 2200/0476;
(Continued)

(56) References Cited

U.S. PATENT DOCUMENTS

2012/0101319 A1* 4/2012 Roberts .................... C10G 3/42 585/240
2013/0164798 A1* 6/2013 Vanhercke ................ C11B 3/14 44/605
2013/0247451 A1* 9/2013 Vanhercke ................ C11B 3/14 554/20

OTHER PUBLICATIONS

First Information Disclosure Statement Substitute Form PTO-1449 submitted Jul. 7, 2022 and initialed by Examiner on Jan. 28, 2023 in connection with U.S. Appl. No. 17/828,322.
(Continued)

*Primary Examiner* — Ellen M Mcavoy
*Assistant Examiner* — Chantel Graham
(74) *Attorney, Agent, or Firm* — Gary J. Gershik

(57) ABSTRACT

The present invention relates to methods of producing industrial products from plant lipids, particularly from vegetative parts of plants. In particular, the present invention provides oil products such as biodiesel and synthetic diesel and processes for producing these, as well as plants having an increased level of one or more non-polar lipids such as triacylglycerols and an increased total non-polar lipid con-
(Continued)

Figure 1:
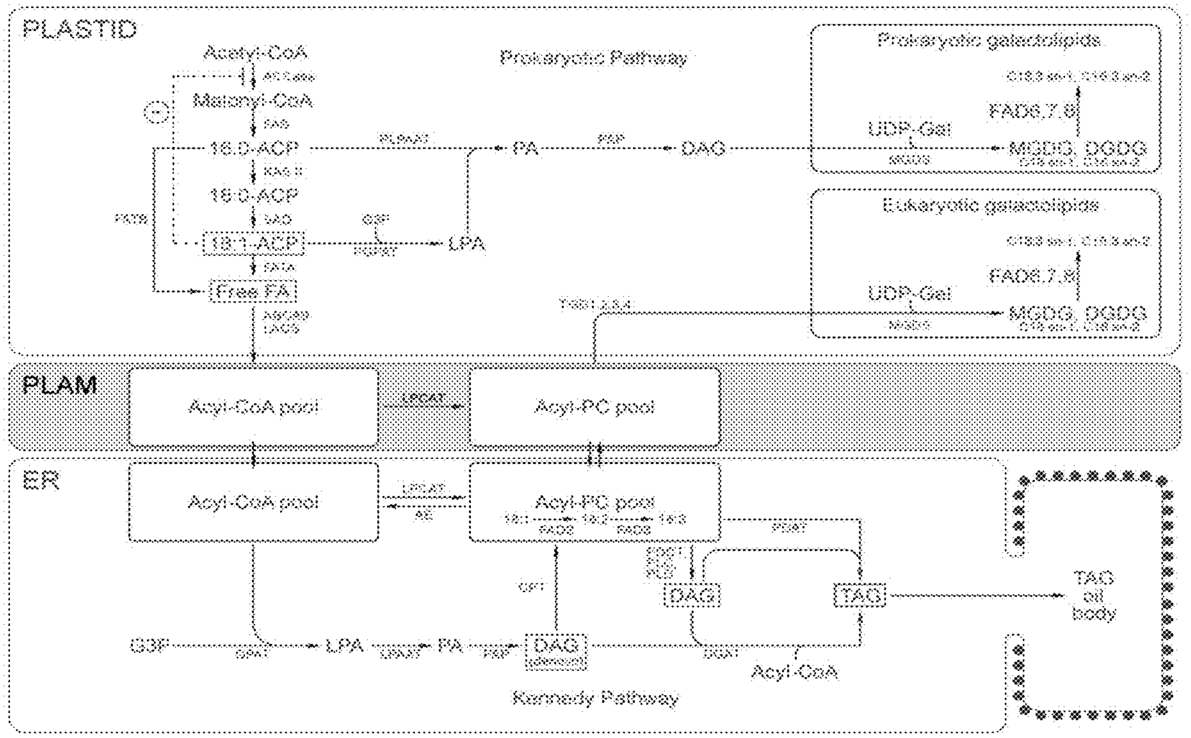

tent. In one particular embodiment, the present invention relates to combinations of modifications in two or more of lipid handling enzymes, oil body proteins, decreased lipid catabolic enzymes and/or transcription factors regulating lipid biosynthesis to increase the level of one or more non-polar lipids and/or the total non-polar lipid content and/or mono-unsaturated fatty acid content in plants or any part thereof. In an embodiment, the present invention relates to a process for extracting lipids. In another embodiment, the lipid is converted to one or more hydrocarbon products in harvested plant vegetative parts to produce alkyl esters of the fatty acids which are suitable for use as a renewable biodiesel fuel.

14 Claims, 18 Drawing Sheets

Specification includes a Sequence Listing.

Related U.S. Application Data continuation of application No. 16/677,325, filed on Nov. 7, 2019, now Pat. No. 11,365,369, which is a continuation of application No. 14/793,663, filed on Jul. 7, 2015, now Pat. No. 10,472,587.

(51) Int. Cl.

| | |
|---|---|
| ***C10G 3/00*** | (2006.01) |
| ***C10L 1/02*** | (2006.01) |
| ***C10L 1/08*** | (2006.01) |
| ***C11B 3/00*** | (2006.01) |
| ***C11B 3/02*** | (2006.01) |
| ***C11B 7/00*** | (2006.01) |
| ***C11C 3/00*** | (2006.01) |
| ***C11C 3/04*** | (2006.01) |
| ***C11C 3/10*** | (2006.01) |
| ***C11C 3/12*** | (2006.01) |
| ***C12N 15/52*** | (2006.01) |

(52) U.S. Cl.

CPC .................. *C10L 1/08* (2013.01); *C11B 3/00* (2013.01); *C11B 3/02* (2013.01); *C11B 7/00* (2013.01); *C11C 3/00* (2013.01); *C11C 3/04* (2013.01); *C11C 3/10* (2013.01); *C11C 3/12* (2013.01); *C10L 2200/0476* (2013.01); *C10L 2270/026* (2013.01); *C10L 2290/06* (2013.01); *C10L 2290/26* (2013.01); *C10L 2290/544* (2013.01); *Y02E 50/10* (2013.01); *Y02P 30/20* (2015.11)

(58) Field of Classification Search

CPC ........... C10L 2270/026; C10L 2290/06; C10L 2290/26; C10L 2290/544; C11B 1/10; C11B 3/00; C11B 3/02; C11B 7/00; C11C 3/00; C11C 3/04; C11C 3/10; C11C 3/12; G06F 11/0763; G06F 11/22; G06F 11/30; Y02E 50/10; Y02P 30/20

See application file for complete search history.

(56) References Cited

OTHER PUBLICATIONS

Second Information Disclosure Statement Substitute Form PTO-1449 submitted Jul. 7, 2022 and initialed by Examiner on Jan. 28, 2023 in connection with U.S. Appl. No. 17/828,322.
Third Information Disclosure Statement Substitute Form PTO-1449 submitted Jun. 5, 2023 and initialed by Examiner on Jun. 16, 2023 in connection with U.S. Appl. No. 17/828,322.
Feb. 3, 2023 Notice of References Cited issued Examiner on Feb. 24, 2020 in connection with U.S. Appl. No. 17/828,322 (Exhibit 4).
Sep. 6, 2023 Response to Jun. 14, 2023 First Examination Report filed in connection with Malaysian Patent Application PI 2020002508 (Divisional of MY MY-178434-A).
Sep. 14, 2023 First Office Action issued in connection with Mexican Patent Application MX/a/2020/004734 (Divisional of MX 376551) including English language translation thereof.
Feb. 6, 2024 Extended European Search Report issued in connection with European Patent Application 23206971.6 (Divisional of EP 2966157).
Sep. 7, 2023 First Examination Report issued in connection with New Zealand Patent Application 727699.
Mar. 13, 2024 Response to Sep. 7, 2023 First Examination Report filed in connection with New Zealand Patent Application 727699.
Apr. 12, 2024 Second Examination Report issued in connection with New Zealand Patent Application 727699.
Dec. 3, 2024 First Examination Report issued in connection with Canadian Patent Application 3216668 (Divisional of CA 2954203).
May 16, 2025 Response filed in response to May 29, 2024 First Examination Report in connection with Australian Patent Application 2022218528 (Divisional of AU 2015286221).
Jun. 5, 2025 Second Examination Report issued in connection with Canadian Patent Application 3216668 (Divisional of CA 2954203.
Apr. 2, 2025 Response filed in response to the Dec. 3, 2024 First Examination Report dated Dec. 3, 2024 in connection with Canadian Patent Application 3216668 (Divisional of CA 2954203).

* cited by examiner

A

B

PROCESSES FOR PRODUCING INDUSTRIAL PRODUCTS FROM PLANT LIPIDS

CROSS REFERENCE TO RELATED APPLICATIONS

This application is a continuation of U.S. application Ser. No. 17/828,322, filed May 31, 2022, now allowed, which is a continuation of U.S. application Ser. No. 16/677,325, filed Nov. 7, 2019, now U.S. Pat. No. 11,365,369 issued Jun. 1, 2022, which is a continuation of U.S. application Ser. No. 14/793,633, filed Jul. 7, 2015, now U.S. Pat. No. 10,472,587, issued Nov. 12, 2019, claiming priority of Australian Patent Application Nos. 2015900284, filed Jan. 30, 2015, 2015900084, filed Jan. 13, 2015, and 2014902617, filed Jul. 7, 2014, the contents of each of which are hereby incorporated by reference herein.

REFERENCE TO SEQUENCE LISTING

This application incorporates-by-reference nucleotide and/or amino acid sequences which are present in the file named 240417_87776-AAA_Sequence_Listing_DH.xml which is 443,781 bytes in size, and which was created Apr. 17, 2024 in the IBM-PC machine format, having an operating system compatibility with MS-Windows, which is contained in the text file filed Apr. 17, 2024 as part of this application.

FIELD OF THE INVENTION

The present invention relates to methods of producing industrial products from plant lipids, particularly from vegetative parts of plants. In particular, the present invention provides oil products such as biodiesel and synthetic diesel and processes for producing these, as well as plants having an increased level of one or more non-polar lipids such as triacylglycerols and an increased total non-polar lipid content. In one particular embodiment, the present invention relates to combinations of modifications in two or more of lipid handling enzymes, oil body proteins, decreased lipid catabolic enzymes and/or transcription factors regulating lipid biosynthesis to increase the level of one or more non-polar lipids and/or the total non-polar lipid content and/or mono-unsaturated fatty acid content in plants or any part thereof. In an embodiment, the present invention relates to a process for extracting lipids. In another embodiment, the lipid is converted to one or more hydrocarbon products in harvested plant vegetative parts to produce alkyl esters of the fatty acids which are suitable for use as a renewable biodiesel fuel.

BACKGROUND OF THE INVENTION

The majority of the world's energy, particularly for transportation, is supplied by petroleum derived fuels, which have a finite supply. Alternative sources which are renewable are needed, such as from biologically produced oils.

Triacylglycerol Biosynthesis

Triaclyglycerols (TAG) constitute the major form of lipids in seeds and consist of three acyl chains esterified to a glycerol backbone. The fatty acids are synthesized in the plastid as acyl-acyl carrier protein (ACP) intermediates where they may undergo a first desaturation catalyzed. This reaction is catalyzed by the stearoyl-ACP desaturase and yields oleic acid ($C18:1^{\Delta9}$). Subsequently, the acyl chains are transported to the cytosol and endoplasmic reticulum (ER) as acyl-Coenzyme (CoA) thioesters. Prior to entering the major TAG biosynthesis pathway, also known as the Kennedy or glycerol-3-phosphate (G3P) pathway, the acyl chains are typically integrated into phospholipids of the ER membrane where they can undergo further desaturation. Two key enzymes in the production of polyunsaturated fatty acids are the membrane-bound FAD2 and FAD3 desaturases which produce linoleic ($C18:2^{\Delta9,12}$) and α-linolenic acid ($C18:3^{\Delta9,12,15}$) respectively.

TAG biosynthesis via the Kennedy pathway consists of a series of subsequent acylations, each using acyl-CoA esters as the acyl-donor. The first acylation step typically occurs at the sn1-position of the G3P backbone and is catalyzed by the glycerol-3-phosphate acyltransferase (sn1-GPAT). The product, sn1-lysophosphatidic acid (sn1-LPA) serves as a substrate for the lysophosphatidic acid acyltransferase (LPAAT) which couples a second acyl chain at the sn2-position to form phosphatidic acid. PA is further dephosphorylated to diacylglycerol (DAG) by the phosphatidic acid phosphatase (PAP) thereby providing the substrate for the final acylation step. Finally, a third acyl chain is esterified to the sn3-position of DAG in a reaction catalyzed by the diacylglycerol acyltransferase (DGAT) to form TAG which accumulates in oil bodies. A second enzymatic reaction, phosphatidyl glycerol acyltransferase (PDAT), also results in the conversion of DAG to TAG. This reaction is unrelated to DGAT and uses phospholipids as the acyl-donors.

To maximise yields for the commercial production of lipids, there is a need for further means to increase the levels of lipids, particularly non-polar lipids such as DAGs and TAGs, in transgenic organisms or parts thereof such as plants, seeds, leaves, algae and fungi. Attempts at increasing neutral lipid yields in plants have mainly focused on individual critical enzymatic steps involved in fatty acid biosynthesis or TAG assembly. These strategies, however, have resulted in modest increases in seed or leaf oil content. Recent metabolic engineering work in the oleaginous yeast *Yarrowia lipolytica* has demonstrated that a combined approach of increasing glycerol-3-phosphate production and preventing TAG breakdown via β-oxidation resulted in cumulative increases in the total lipid content (Dulermo et al., 2011).

Plant lipids such as seedoil triaclyglycerols (TAGs) have many uses, for example, culinary uses (shortening, texture, flavor), industrial uses (in soaps, candles, perfumes, cosmetics, suitable as drying agents, insulators, lubricants) and provide nutritional value. There is also growing interest in using plant lipids for the production of biofuel.

To maximise yields for the commercial biological production of lipids, there is a need for further means to increase the levels of lipids, particularly non-polar lipids such as DAGs and TAGs, in transgenic organisms or parts thereof such as plants, seeds, leaves, algae and fungi.

SUMMARY OF THE INVENTION

The present inventors have identified a process for producing an oil product from vegetative plant parts.

In a first aspect, the present invention provides a process for producing an oil product, the process comprising the steps of (i) treating, in a reactor, a composition comprising (a) vegetative plant parts whose dry weight is at least 2 g and which have a total non-polar lipid content of at least 5% by weight on a dry weight basis, (b) a solvent which comprises water, an alcohol, or both, and (c) optionally a catalyst, wherein the treatment comprises heating the composition at a temperature between about 50° C. and about 450° C. and at a pressure between 5 and 350 bar for between 1 and 120 minutes in an oxidative, reductive or inert environment, (ii) recovering oil product from the reactor at a yield of at least 35% by weight relative to the dry weight of the vegetative plant parts, thereby producing the oil product.

In an embodiment, the vegetative plant parts have a dry weight of at least 1 kg.

In an embodiment, the vegetative plant parts have a total non-polar lipid content of at least 10%, at least 15%, at least 20%, about 25%, about 30%, about 35%, between 10% and 75%, between 20% and 75% or preferably between 30% and 75% on a dry weight basis.

In an embodiment, the composition has a solids concentration between 5% and 90%, preferably between 15% and 50% (dry weight/weight).

Any suitable catalyst can be used. In an embodiment, the catalyst is an alkali, an acid or a precious metal catalyst. For instance, in an embodiment the catalyst comprises NaOH or KOH or both, preferably at a concentration of 0.1M to 2M.

In an embodiment, the treatment time is between 1 and 60 minutes, preferably between 10 and 60 minutes, more preferably between 15 and 30 minutes. In an embodiment where the pressure is less than 50 bar, the time of reaction may be up to 24 hours or even up to 7 days. In a preferred embodiment, the temperature is between 275° C. and 360° C., the pressure is between 100 and 200 bar, and the reaction occurs in 10-60 mins.

In an embodiment, if the solvent is water the process produces a yield of the oil product between a minimum of 36%, 37%, 38%, 39% or 40% and a maximum of 55% or preferably 60% by weight relative to the dry weight of the vegetative plant parts. In this embodiment, the oil product comprises at least 2-fold, preferably at least 3-fold more hydrocarbon compounds than fatty acyl esters. Preferably, the oil product comprises 35%, more preferably 40% C13-C22 hydrocarbon compounds.

In another embodiment, if the solvent comprises an alcohol, preferably methanol, the process produces a yield of the oil product between a minimum of 36%, 37%, 38%, 39% or 40% and a maximum of 65% or preferably 70% by weight relative to the dry weight of the vegetative plant parts. In this embodiment, the oil product comprises at least 1.5-fold, preferably at least 2-fold, more fatty acyl esters than hydrocarbon compounds. Preferably, the oil product comprises 40%, more preferably 50%, fatty acid methyl esters.

In a further embodiment, if the solvent comprises about 80% water, the oil product comprises about 30% of C13-C22 hydrocarbon compounds, preferably about 35%, more preferably about 40% C13-C22 hydrocarbon compounds.

In another embodiment, if the solvent comprises about 50% methanol, the oil product comprises about 50% fatty acid methyl esters (FAME).

In a further embodiment, the recovered oil product has a water content of less than about 15% by weight, preferably less than 5% by weight.

In yet another embodiment, the yield of oil product is at least 2% greater by weight, preferably at least 4% greater by weight, relative to a corresponding process using corresponding vegetative plant parts whose non-polar lipid content is less than 2% on a dry weight basis.

In an embodiment, the vegetative plant parts in step (i)(a) have been physically processed by one or more of drying, chopping, shredding, milling, rolling, pressing, crushing or grinding. In an alternative embodiment, the vegetative plant parts have not been dried to a moisture content of less than 10% prior to preparation of the composition. For example, the vegetative plant parts have a moisture content of at least 20% or at least 30%, or the vegetative plant parts retain at least 50% of the water content that they had at the time they were harvested.

In an embodiment, the process further comprises one or more of:

(i) hydrodeoxygenation of the recovered oil product, (ii) treatment of the recovered oil product with hydrogen to reduce the levels of ketones or sugars in the oil product, (iii) production of syngas from the recovered oil product, and (iv) fractionating the recovered oil product to produce one or more of fuel oil, diesel oil, kerosene or gasoline. For example, the fractionating step is by fractional distillation.

In an embodiment, the vegetative plant parts comprise plant leaves, stems or both.

In an embodiment, the vegetative plant parts comprise a combination of exogenous polynucleotides and/or genetic modifications as defined herein.

The present inventors have also demonstrated significant increases in the lipid content of organisms, particularly in the vegetative parts and seed of plants, by manipulation of fatty acid biosynthesis, lipid assembly and lipid packaging pathways, and reduced lipid catabolismarious combinations of genes and reduction of gene expression were used to achieve substantial increases in oil content, which is of great significance for production of biofuels and other industrial products derived from oil.

In a second aspect, the present invention provides a recombinant eukaryotic cell comprising a) first exogenous polynucleotide which encodes a transcription factor polypeptide that increases the expression of one or more glycolytic and/or fatty acid biosynthetic genes in the cell, b) a second exogenous polynucleotide which encodes a polypeptide involved in the biosynthesis of one or more non-polar lipids, and any one or two or all three of c) a first genetic modification which down-regulates endogenous production and/or activity of a polypeptide involved in the catabolism of triacylglycerols (TAG) in the cell when compared to a corresponding cell lacking the genetic modification, d) a third exogenous polynucleotide which encodes a polypeptide which increases the export of fatty acids out of plastids of the cell when compared to a corresponding cell lacking the fourth exogenous polynucleotide, and e) a fourth exogenous polynucleotide which encodes a second transcription factor polypeptide that increases the expression of one or more glycolytic and/or fatty acid biosynthetic genes in the cell, wherein each exogenous polynucleotide is operably linked to a promoter which is capable of directing expression of the polynucleotide in the cell.

In an embodiment, the cell comprises a), b) and c), and optionally d) or e).

In an embodiment, the cell comprises a), b) and d), and optionally c) or e).

In an embodiment, the cell comprises a), b) and e), and optionally c) or d).

In an embodiment, the cell further comprises one or more or all of a) a fifth exogenous polynucleotide which encodes an oil body coating (OBC) polypeptide, preferably a lipid droplet associated protein (LDAP),
b) a second genetic modification which down-regulates endogenous production and/or activity of a polypeptide involved in importing fatty acids into plastids of the cell when compared to a corresponding cell lacking the second genetic modification, and
c) a third genetic modification which down-regulates endogenous production and/or activity of a polypeptide involved in diacylglycerol (DAG) production in the plastid when compared to a corresponding cell lacking the third genetic modification.

In an embodiment, the recombinant eukaryotic cell comprises a) a first exogenous polynucleotide which encodes a transcription factor polypeptide that increases the expression of one or more glycolytic and/or fatty acid biosynthetic genes in the cell,
b) a second exogenous polynucleotide which encodes a polypeptide involved in the biosynthesis of one or more non-polar lipids, and
c) a first genetic modification which down-regulates endogenous production and/or activity of a polypeptide involved in the catabolism of triacylglycerols (TAG) in the cell when compared to a corresponding cell lacking the genetic modification, wherein each exogenous polynucleotide is operably linked to a promoter which is capable of directing expression of the polynucleotide in the cell, and optionally the cell further comprises one or more or all of d) a third exogenous polynucleotide which encodes an oil body coating (OBC) polypeptide, preferably an LDAP,
e) a fourth exogenous polynucleotide which encodes a polypeptide which increases the export of fatty acids out of plastids of the cell when compared to a corresponding cell lacking the fourth exogenous polynucleotide,
f) a second genetic modification which down-regulates endogenous production and/or activity of a polypeptide involved in importing fatty acids into plastids of the cell when compared to a corresponding cell lacking the second genetic modification, and
g) a third genetic modification which down-regulates endogenous production and/or activity of a polypeptide involved in diacylglycerol (DAG) production in the plastid when compared to a corresponding cell lacking the third genetic modification.

In an embodiment, the cell is a plant cell from or in a vegetative part of a plant and one or more or all of the promoters are expressed at a higher level in the vegetative part relative to seed of the plant.

In a preferred embodiment, the presence of the c), d) or e), together with the first and second exogenous polynucleotides increases the total non-polar lipid content of the cell, preferably a cell in vegetative plant part such as a leaf or stem, relative to a corresponding cell which comprises the first and second exogenous polynucleotides but lacking each of c), d) and e). More preferably, the increase is synergistic. Most preferably, at least the promoter that directs expression of the first exogenous polynucleotide is a promoter other than a constitutive promoter.

In an embodiment, the polypeptide involved in the biosynthesis of one or more non-polar lipids is a DGAT or a PDAT and the polypeptide involved in the catabolism of TAG in the cell is an SDP1 lipase.

In an embodiment, the transcription factor polypeptide that increases the expression of one or more glycolytic and/or fatty acid biosynthetic genes in the cell is a WRI1 polypeptide and the polypeptide involved in the biosynthesis of one or more non-polar lipids is a DGAT or a PDAT.

In an embodiment, the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide and the polypeptide involved in the biosynthesis of one or more non-polar lipids is a DGAT.

In an embodiment, the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide and the polypeptide involved in the catabolism of triacylglycerols (TAG) in the cell is an SDP1 lipase.

In an embodiment, the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide, the polypeptide involved in the biosynthesis of one or more non-polar lipids is a DGAT or a PDAT and the polypeptide involved in the catabolism of triacylglycerols (TAG) in the cell is an SDP1 lipase.

In an embodiment, when present, the two transcription factors are WRI1 and LEC2, or WRI1 and LEC1.

In the above embodiments, it is preferred that the cell is in a vegetative part of a plant which is growing in soil or which was grown in soil and the plant part was subsequently harvested, and wherein the cell comprises at least 8% TAG on a weight basis (% dry weight) such as for example between 8% and 75% or between 8% and 30%. More preferably, the TAG content is at least 10%, such as for example between 10% and 75% or between 10% and 30%. Preferably, these TAG levels are present in the vegetative parts prior to or at flowering of the plant or prior to seed setting stage of plant development. In these embodiments, it is preferred that the ratio of the TAG content in the leaves to the TAG content in the stems of the plant is between 1:1 and 10:1, and/or the ratio is increased relative to a corresponding cell comprising the first and second exogenous polynucleotides and lacking the first genetic modification.

In the above embodiments, the cell preferably comprises an exogenous polynucleotide which encodes a DGAT and a genetic modification which down-regulates production of an endogenous SDP1 lipase. More preferably, the cell does not comprise an exogenous polynucleotide encoding a PDAT, and/or is a cell other than a *Nicotiana benthamiana* cell, and/or the WRI1 is a WRI1 other than *Arabidopsis thaliana* WRI1 (SEQ ID NOs:21 or 22). Most preferably, at least one of the exogenous polynucleotides in the cell is expressed from a promoter which is not a constitutive promoter such as, for example, a promoter which is expressed preferentially in green tissues or stems of the plant or that is up-regulated after commencement of flowering or during senescence.

In a third aspect, the present invention provides a recombinant eukaryotic cell comprising a) a first exogenous polynucleotide which encodes a transcription factor polypeptide that increases the expression of one or more glycolytic and/or fatty acid biosynthetic genes in the cell, b) a second exogenous polynucleotide which encodes a polypeptide involved in the biosynthesis of one or more non-polar lipids, and c) a third exogenous polynucleotide which encodes an oil body coating (OBC) polypeptide, preferably a lipid droplet associated polypeptide (LDAP), wherein each exogenous polynucleotide is operably linked to a promoter which is capable of directing expression of the polynucleotide in the cell, and wherein the recombinant eukaryotic cell has an increased level of one or more non-polar lipid(s), and/or an increased amount of the OBC polypeptide, relative to a corresponding cell which comprises a third exogenous polynucleotide whose nucleotide sequence is the complement of the sequence provided as SEQ ID NO: 176.

In an embodiment, the cell of the above aspect further comprises one or more or all of d) a first genetic modification which down-regulates endogenous production and/or activity of a polypeptide involved in the catabolism of triacylglycerols (TAG) in the cell when compared to a corresponding cell lacking the first genetic modification, e) a fourth exogenous polynucleotide which encodes a polypeptide which increases the export of fatty acids out of plastids of the cell when compared to a corresponding cell lacking the fourth exogenous polynucleotide, f) a second genetic modification which down-regulates endogenous production and/or activity of a polypeptide involved in importing fatty acids into plastids of the cell when compared to a corresponding cell lacking the second genetic modification, and g) a third genetic modification which down-regulates endogenous production and/or activity of a polypeptide involved in diacylglycerol (DAG) production in the plastid when compared to a corresponding cell lacking the third genetic modification.

In an embodiment, the polypeptide involved in the biosynthesis of one or more non-polar lipids is a DGAT or a PDAT and the OBC polypeptide is an oleosin. Alternatively, the OBC polypeptide is an LDAP.

In an embodiment, the transcription factor polypeptide that increases the expression of one or more glycolytic and/or fatty acid biosynthetic genes in the cell is a WRI1 polypeptide and the polypeptide involved in the biosynthesis of one or more non-polar lipids is a DGAT or a PDAT.

In an embodiment, the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide and the OBC polypeptide is an oleosin. Alternatively, the OBC polypeptide is an LDAP.

In an embodiment, the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide, the polypeptide involved in the biosynthesis of one or more non-polar lipids is a DGAT or a PDAT and the OBC polypeptide is an oleosin. Alternatively, the OBC polypeptide is an LDAP.

In an embodiment, the cell comprises two exogenous polynucleotides encoding two different transcription factor polypeptides that increase the expression of one or more glycolytic and/or fatty acid biosynthetic genes in the cell, such as WRI1 and LEC2, or WRI1 and LEC1.

In a preferred embodiment, the presence of the third exogenous polynucleotide encoding the OBC polypeptide, preferably a LDAP, together with the first and second exogenous polynucleotides increases the total non-polar lipid content of the plant cell, preferably a cell in vegetative plant part such as a leaf or stem, relative to a corresponding plant cell which comprises the first and second exogenous polynucleotides but lacking the third exogenous polynucleotide. More preferably, the increase is synergistic. Most preferably, at least the promoter that directs expression of the first exogenous polynucleotide is a promoter other than a constitutive promoter.

In a fourth aspect, the present invention provides a recombinant eukaryotic cell comprising plastids and a first exogenous polynucleotide which encodes a transcription factor polypeptide that increases the expression of one or more glycolytic and/or fatty acid biosynthetic genes in the cell, and one or more or all of;

a) a second exogenous polynucleotide which encodes a polypeptide which increases the export of fatty acids out of plastids of the cell when compared to a corresponding cell lacking the second exogenous polynucleotide, b) a first genetic modification which down-regulates endogenous production and/or activity of a polypeptide involved in importing fatty acids into plastids of the cell when compared to a corresponding cell lacking the first genetic modification, and c) a second genetic modification which down-regulates endogenous production and/or activity of a polypeptide involved in diacylglycerol (DAG) production in the plastid when compared to a corresponding cell lacking the second genetic modification, wherein each exogenous polynucleotide is operably linked to a promoter which is capable of directing expression of the polynucleotide in the cell.

In an embodiment, the cell, preferably a plant cell, comprises a) and optionally b) or c).

In an embodiment, the cell of the above aspect further comprises one or more or all of d) a third exogenous polynucleotide which encodes a polypeptide involved in the biosynthesis of one or more non-polar lipids, e) a third genetic modification which down-regulates endogenous production and/or activity of a polypeptide involved in the catabolism of triacylglycerols (TAG) in the cell when compared to a corresponding cell lacking the third genetic modification, and f) a fourth exogenous polynucleotide which encodes an oil body coating (OBC) polypeptide, preferably an LDAP.

In a preferred embodiment, the cell, preferably a plant cell, comprises the first, second and third exogenous polynucleotides and optionally the third genetic modification or the fourth exogenous polynucleotide.

In a preferred embodiment, the presence of the second exogenous polynucleotide encoding a polypeptide which increases the export of fatty acids out of plastids of the cell, which is preferably a fatty acyl thioesterase such as a FATA polypeptide, together with the first and, if present, third exogenous polynucleotides increases the total non-polar lipid content of the plant cell, preferably a cell in vegetative plant part such as a leaf or stem, relative to a corresponding plant cell which comprises the first and, if present, third exogenous polynucleotides but lacking the second exogenous polynucleotide. More preferably, the increase provided by the second exogenous polynucleotide is synergistic. Most preferably, at least the promoter that directs expression of the first exogenous polynucleotide is a promoter other than a constitutive promoter.

In an embodiment, the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide, preferably a transcription factor other than *Arabidopsis thaliana* WRI1 (SEQ ID NOs:21 or 22), and the polypeptide which increases the export of fatty acids out of plastids of the cell is a fatty acid thioesterase, preferably a FATA or a FATB polypeptide, more preferably a FATA polypeptide or a fatty acid thioesterase other than a medium chain fatty acid thioesterase. The presence of a thioesterase other than a medium chain thioesterase is indicated by the percentage of C12:0 and/or C14:0 fatty acids in the total fatty acid content of the cell being about the same relative to a corresponding cell lacking the exogenous polynucleotide encoding the thioesterase. Preferably, the cell further comprises an exogenous polynucleotide which encodes a DGAT and a genetic modification which down-regulates production of an endogenous SDP1 lipase. In an embodiment, the decreased production of an SDP1 lipase acts synergistically with the transcription factor and fatty acid thioesterase to increase the total non-polar lipid content in the cell. More preferably, the cell does not comprise an exogenous polynucleotide encoding a PDAT, and/or is a cell other than a *Nicotiana benthamiana* cell. Most preferably, at least one of the exogenous polynucleotides in the cell is expressed from a promoter which is not a constitutive promoter such as, for example, a promoter expressed preferentially in green tissues or stems of the plant or that is up-regulated during senescence.

In an embodiment, the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide, and the polypeptide involved in importing fatty acids into plastids of the cell is a TGD polypeptide.

In an embodiment, the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide, and the polypeptide involved in diacylglycerol (DAG) production is a plastidial GPAT.

In an embodiment, the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide, the polypeptide which increases the export of fatty acids out of plastids of the cell is a fatty acid thioesterase, preferably a FATA or a FATB polypeptide, and the polypeptide involved in importing fatty acids into plastids of the cell a TGD polypeptide.

In an embodiment, the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide, the polypeptide which increases the export of fatty acids out of plastids of the cell is a fatty acid thioesterase, preferably a FATA or a FATB polypeptide, and the polypeptide involved in diacylglycerol (DAG) production is a plastidial GPAT.

In an embodiment, the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide, the polypeptide involved in importing fatty acids into plastids of the cell a TGD polypeptide, and the polypeptide involved in diacylglycerol (DAG) production is a plastidial GPAT.

In an embodiment, the cell comprises two exogenous polynucleotides encoding two different transcription factor polypeptides that increase the expression of one or more glycolytic and/or fatty acid biosynthetic genes in the cell, such as WRI1 and LEC2, or WRI1 and LEC1.

In embodiments of the second, third and fourth aspects, when the cell comprises an exogenous polynucleotide encoding a fatty acid thioesterase such as, for example, a FATA or a FATB polypeptide, the thioesterase is preferably a FATA polypeptide or a fatty acid thioesterase other than a medium chain fatty acid thioesterase.

In a fifth aspect, the present invention provides a recombinant eukaryotic cell comprising a) a first exogenous polynucleotide which encodes a transcription factor polypeptide that increases the expression of one or more glycolytic and/or fatty acid biosynthetic genes in the cell, preferably a WRI transcription factor, b) a second exogenous polynucleotide which encodes a polypeptide involved in the biosynthesis of one or more non-polar lipids which is an LPAAT with preferential activity for fatty acids with a medium chain length (C8 to C14), and c) a third exogenous polynucleotide which encodes a polypeptide which increases the export of C8 to C14 fatty acids out of plastids of the cell when compared to a corresponding cell lacking the third exogenous polynucleotide, wherein each exogenous polynucleotide is operably linked to a promoter which is capable of directing expression of the polynucleotide in the cell.

In an embodiment, the third exogenous polynucleotide encodes a thioesterase, preferably a FATB thioesterase with preferential activity for fatty acids with a medium chain length (C8 to C14).

In a preferred embodiment, the presence of the third exogenous polynucleotide encoding a polypeptide which increases the export of C8 to C14 fatty acids out of plastids of the cell, together with the first and second exogenous polynucleotides increases the total MCFA content of the cell, preferably a cell in vegetative plant part such as a leaf, root or stem, relative to a corresponding plant cell which comprises the first and second exogenous polynucleotides but lacking the third exogenous polynucleotide. More preferably, the increase provided by the third exogenous polynucleotide is synergistic. Most preferably, at least the promoter that directs expression of the first exogenous polynucleotide is a promoter other than a constitutive promoter.

In an embodiment, the exogenous polynucleotide encoding the FATB thioesterase with preferential activity for fatty acids with a medium chain length (C8 to C14) comprises amino acids whose sequence is set forth as any one of SEQ ID NOs: 193 to 199, or a biologically active fragment of any one thereof, or a polypeptide whose amino acid sequence is at least 30% identical to any one or more of SEQ ID NOs: 193 to 199. More preferably, the exogenous polynucleotide encoding the FATB thioesterase with preferential activity for fatty acids with a medium chain length (C8 to C14) comprises amino acids whose sequence is set forth as SEQ ID NOs: 193 to 199, or a biologically active fragment of any one thereof, or a polypeptide whose amino acid sequence is at least 30% identical to any one or both of SEQ ID NOs: 193 to 199.

In an embodiment of the fifth aspect, the transcription factor is not *Arabidopsis thaliana* WRI1 (SEQ ID NOs:21 or 22).

In an embodiment of the fifth aspect, the exogenous polynucleotide encoding LPAAT comprises amino acids whose sequence is set forth as SEQ ID NO:200, or a biologically active fragment thereof, or a polypeptide whose amino acid sequence is at least 30% identical thereto.

In an embodiment of the fifth aspect, the cell further comprises one or more or all of;

d) a fourth exogenous polynucleotide which encodes a further polypeptide involved in the biosynthesis of one or more non-polar lipids, e) a first genetic modification which down-regulates endogenous production and/or activity of a polypeptide involved in the catabolism of triacylglycerols (TAG) in the cell when compared to a corresponding cell lacking the first genetic modification, f) a fifth exogenous polynucleotide which encodes an oil body coating (OBC) polypeptide, preferably an LDAP, g) a second genetic modification which down-regulates endogenous production and/or activity of a polypeptide involved in importing fatty acids into plastids of the cell when compared to a corresponding cell lacking the second genetic modification, and h) a third genetic modification which down-regulates endogenous production and/or activity of a polypeptide involved in diacylglycerol (DAG) production in the plastid when compared to a corresponding cell lacking the third genetic modification, wherein each exogenous polynucleotide is operably linked to a promoter which is capable of directing expression of the polynucleotide in the cell.

In an embodiment of the fifth aspect, the cell is a plant cell from or in a vegetative part of a plant and one or more or all of the promoters are expressed at a higher level in the vegetative part relative to seed of the plant.

In an embodiment of the fifth aspect, the fatty acid with a medium chain length is at least myristic acid. In a preferred embodiment, the cell comprises a myristic acid content of at least about 8%, at least about 10%, at least about 11%, at least about 12%, at least about 15%, at least about 20%, at least about 25%, between 8% and 25%, between 8% and 20%, between 10% and 25%, between 11% and 25%, between about 15% and 25%, between about 20% and 25%, (w/w dry weight).

In the embodiments of the third, fourth and fifth aspects, it is preferred that the cell is in a vegetative part of a plant which is growing in soil or which was grown in soil and the plant part was subsequently harvested, and wherein the cell comprises at least 8% TAG on a weight basis (% dry weight) such as for example between 8% and 75% or between 8% and 30%. More preferably, the TAG content is at least 10%, such as for example between 10% and 75% or between 10% and 30%. Preferably, these TAG levels are present in the vegetative parts prior to or at flowering of the plant or prior to seed setting stage of plant development. In these embodiments, it is preferred that the ratio of the TAG content in the leaves to the TAG content in the stems of the plant is between 1:1 and 10:1, and/or the ratio is increased relative to a corresponding cell comprising the first and second exogenous polynucleotides and lacking the first genetic modification.

In the embodiments of the second, third, fourth and fifth aspects, the cell preferably comprises an exogenous polynucleotide which encodes a DGAT and a genetic modification which down-regulates production of an endogenous SDP1 lipase. In a preferred embodiment, the cell does not comprise an exogenous polynucleotide encoding a PDAT, and/or is a cell other than a *Nicotiana benthamiana* cell and/or is a cell other than a *Brassica napus* cell. Most preferably, at least one of the exogenous polynucleotides in the cell is expressed from a promoter which is not a constitutive promoter such as, for example, a promoter expressed preferentially in green tissues or stems of the plant or that is up-regulated during senescence.

In an embodiment, a cell of the invention (including of the second, third, fourth and fifth aspects) has one or more or all of the following features (where applicable);

i) the cell has an increased synthesis of total fatty acids relative to a corresponding cell lacking the first exogenous polynucleotide, or a decreased catabolism of total fatty acids relative to a corresponding cell lacking the first exogenous polynucleotide, or both, such that it has an increased level of total fatty acids relative to a corresponding cell lacking the first exogenous polynucleotide, ii) the cell has an increased expression and/or activity of a fatty acyl acyltransferase which catalyses the synthesis of TAG, DAG or MAG, preferably TAG, relative to a corresponding cell having the first exogenous polynucleotide and lacking the exogenous polynucleotide which encodes a polypeptide involved in the biosynthesis of one or more non-polar lipids, iii) the cell has a decreased production of lysophosphatidic acid (LPA) from acyl-ACP and G3P in its plastids relative to a corresponding cell having the first exogenous polynucleotide and lacking the genetic modification which down-regulates endogenous production and/or activity of a polypeptide involved in diacylglycerol (DAG) production in the plastid in the cell, iv) the cell has an altered ratio of C16:3 to C18:3 fatty acids in its total fatty acid content and/or its galactolipid content relative to a corresponding cell lacking the exogenous polynucleotide(s) and/or genetic modification(s), preferably a decreased ratio, v) the cell is in a vegetative part of a plant and comprises a total non-polar lipid content of at least about 8%, at least about 10%, at least about 11%, at least about 12%, at least about 15%, at least about 20%, at least about 25%, at least about 30%, at least about 35%, at least about 40%, at least about 45%, at least about 50%, at least about 55%, at least about 60%, at least about 65%, at least about 70%, between 8% and 75%, between 10% and 75%, between 11% and 75%, between about 15% and 75%, between about 20% and 75%, between about 30% and 75%, between about 40% and 75%, between about 50% and 75%, between about 60% and 75%, or between about 25% and 50% (w/w dry weight), vi) the cell is in a vegetative part of a plant and comprises a TAG content of at least about 8%, at least about 10%, at least about 11%, at least about 12%, at least about 15%, at least about 20%, at least about 25%, at least about 30%, at least about 35%, at least about 40%, at least about 45%, at least about 50%, at least about 55%, at least about 60%, at least about 65%, at least about 70%, between 8% and 75%, between 10% and 75%, between 11% and 75%, between about 15% and 75%, between about 20% and 75%, between about 30% and 75%, between about 40% and 75%, between about 50% and 75%, between about 60% and 75%, or between about 25% and 50% (w/w dry weight), vii) the transcription factor polypeptide(s) is selected from the group consisting of Wrinkled 1 (WRI1), Leafy Cotyledon 1 (LEC1), LEC1-like, Leafy Cotyledon 2 (LEC2), BABY BOOM (BBM), FUS3, ABI3, ABI4, ABI5, Dof4 and Dof11, or the group consisting of MYB73, bZIP53, AGL15, MYB115, MYB118, TANMEI, WUS, GFR2a1, GFR2a2 and PHR1, viii) oleic acid comprises at least 20% (mol %), at least 22% (mol %), at least 30% (mol %), at least 40% (mol %), at least 50% (mol %), or at least 60% (mol %), preferably about 65% (mol %) or between 20% and about 65% of the total fatty acid content in the cell, ix) non-polar lipid in the cell comprises a fatty acid which comprises a hydroxyl group, an epoxy group, a cyclopropane group, a double carbon-carbon bond, a triple carbon-carbon bond, conjugated double bonds, a branched chain such as a methylated or hydroxylated branched chain, or a combination of two or more thereof, or any of two, three, four, five or six of the aforementioned groups, bonds or branched chains, x) non-polar lipid in the cell comprises one or more polyunsaturated fatty acids selected from eicosadienoic acid (EDA), arachidonic acid (ARA), stearidonic acid (SDA), eicosatrienoic acid (ETE), eicosatetraenoic acid (ETA), eicosapentaenoic acid (EPA), docosapentaenoic acid (DPA), docosahexaenoic acid (DHA), or a combination of two of more thereof, xi) the cell is in a plant or part thereof, preferably a vegetative plant part, or the cell is an algal cell such as a diatom (bacillariophytes), green algae (chlorophytes), blue-green algae (cyanophytes), golden-brown algae (chrysophytes), haptophytes, brown algae or heterokont algae, or the cell is from or is an organism suitable for fermentation such as a fungus, xii) one or more or all of the promoters are selected from a promoter other than a constitutive promoter, preferably a tissue-specific promoter such as a leaf and/or stem specific promoter, a developmentally regulated promoter such as a senescense-specific promoter such as a SAG12 promoter, an inducible promoter, or a circadian-rhythm regulated promoter, preferably wherein at least one of the promoters operably linked to an exogenous polynucleotide which encodes a transcription factor polypeptide is a promoter other than a constitutive promoter, xiii) the cell comprises a total fatty acid content which comprises medium chain fatty acids, preferably C12:0, C14:0 or both, at a level of at least 5% of the total fatty acid content and optionally an exogenous polynucleotide which encodes an LPAAT which has preferential activity for fatty acids with a medium chain length (C8 to C14), preferably C12:0 or C14:0, xiv) the cell comprises a total fatty acid content whose oleic acid level and/or palmitic acid level is increased by at least 2% relative to a corresponding cell lacking the exogenous polynucleotide(s) and/or genetic modification(s), and/or whose α-linolenic acid (ALA) level and/or linoleic acid level is decreased by at least 2% relative to a corresponding cell lacking the exogenous polynucleotide(s) and/or genetic modification(s), xv) non-polar lipid in the cell comprises a modified level of total sterols, preferably free (non-esterified) sterols, steroyl esters, steroyl glycosides, relative to the non-polar lipid in a corresponding cell lacking the exogenous polynucleotide(s) and/or genetic modification(s), xvi) non-polar lipid in the cell comprises waxes and/or wax esters, xvii) the cell is one member of a population or collection of at least about 1000 such cells, preferably in a vegetative plant part or a seed, xviii) the cell comprises an exogenous polynucleotide encoding a silencing suppressor, wherein the exogenous polynucleotide is operably linked to a promoter which is capable of directing expression of the polynucleotide in the cell, xix) the level of one or more non-polar lipid(s) and/or the total non-polar lipid content of the cell is at least 2% greater on a weight basis than in a corresponding cell which comprises exogenous polynucleotides encoding an *Arabidposis thaliana* WRI1 (SEQ ID NO:21) and an *Arabidopsis thaliana* DGAT1 (SEQ ID NO:1), and xx) a total polyunsaturated fatty acid (PUFA) content which is decreased relative to the total PUFA content of a corresponding cell lacking the exogenous polynucleotide(s) and/or genetic modification(s).

The following embodiments apply to the cell of the invention (including of the second, third, fourth and fifth aspects) as well as to methods of producing the cells and to methods of using the cells. In these embodiments, where the cell is in a vegetative part of a plant, it is preferred that the plant is growing in soil or was grown in soil.

In an embodiment, the polypeptide involved in the biosynthesis of one or more non-polar lipids is a fatty acyl acyltransferase which is involved in the biosynthesis of TAG, DAG or monoacylglycerol (MAG) in the cell, preferably of TAG in the cell, such as, for example, a DGAT, PDAT, LPAAT, GPAT or MGAT, preferably a DGAT or a PDAT.

In an embodiment, the polypeptide involved in the catabolism of triacylglycerols (TAG) in the cell is an SDP1 lipase, a Cgi58 polypeptide, an acyl-CoA oxidase such as ACX1 or ACX2, or a polypeptide involved in β-oxidation of fatty acids in the cell such as a PXA1 peroxisomal ATP-binding cassette transporter, preferably an SDP1 lipase.

In an embodiment, the oil body coating (OBC) polypeptide is oleosin, such as a polyoleosin or a caleosin, or preferably a lipid droplet associated protein (LDAP).

In an embodiment, the polypeptide which increases the export of fatty acids out of plastids of the cell is a C16 or C18 fatty acid thioesterase such as a FATA polypeptide or a FATB polypeptide, a fatty acid transporter such as an ABCA9 polypeptide or a long-chain acyl-CoA synthetase (LACS).

In an embodiment, the polypeptide involved in importing fatty acids into plastids of the cell is a fatty acid transporter, or subunit thereof, preferably a TGD polypeptide such as, for example, a TGD1 polypeptide, a TGD2 polypeptide, a TGD3 polypeptide, or a TGD4 polypeptide.

In an embodiment, the polypeptide involved in diacylglycerol (DAG) production in the plastid is a plastidial GPAT, a plastidial LPAAT or a plastidial PAP.

In one embodiment, the cell is from or in a 16:3 plant, or in a vegetative part or seed thereof, and which comprises one or more or all of the following;

a) an exogenous polynucleotide which encodes a polypeptide which increases the export of fatty acids out of plastids of the cell when compared to a corresponding cell lacking the exogenous polynucleotide, b) a first genetic modification which down-regulates endogenous production and/or activity of a polypeptide involved in importing fatty acids into plastids of the cell when compared to a corresponding cell lacking the first genetic modification, and c) a second genetic modification which down-regulates endogenous production and/or activity of a polypeptide involved in diacylglycerol (DAG) production in the plastid when compared to a corresponding cell lacking the second genetic modification, wherein the exogenous polynucleotide is operably linked to a promoter which is capable of directing expression of the polynucleotide in the cell.

In an alternative embodiment, the cell is from or in a 18:3 plant, or in a vegetative part or seed thereof.

In an embodiment, the cell is from or in a plant leaf, stem or root, before the plant flowers, and the cell comprises a total non-polar lipid content of at least about 8%, at least about 10%, at least about 11%, between 8% and 15%, or between 9% and 12% (w/w dry weight). In an embodiment, the total non-polar lipid content of the cell is at least 3%, more preferably at least 5% greater, than the total non-polar lipid content in a corresponding cell transformed with genes encoding a WRI1 and a DGAT but lacking the other exogenous polynucleotides and genetic modifications as described herein for the second, third, fourth and fifth aspects. More preferably, that degree of increase is in a cell in a stem or root of the plant.

In an embodiment, the addition of one or more of the exogenous polynucleotides or genetic modifications, preferably the exogenous polynucleotide encoding an OBC or a fatty acyl thioesterase or the genetic modification which down-regulates endogenous production and/or activity of a polypeptide involved in the catabolism of triacylglycerols (TAG) in the cell, more preferably the exogenous polynucleotide which encodes a FATA thioesterase or an LDAP or which decreases expression of an endogenous TAG lipase such as a SDP1 TAG lipase in the cell, results in a synergistic increase in the total non-polar lipid content of the cell when added to the pair of transgenes WRI1 and DGAT, particularly before the plant flowers and even more particularly in the stems and/or roots of the plant. For example, see Examples 8, 11 and 15. In a preferred embodiment, the increase in the TAG content of the cell in a stem or root of the plant is at least 2-fold, more preferably at least 3-fold, relative to a corresponding cell transformed with genes encoding WRI1 and DGAT1 but lacking the FATA thioesterase, LDAP and the genetic modification which down-regulates endogenous production and/or activity of a polypeptide involved in the catabolism of triacylglycerols (TAG) in the cell. Most preferably, at least the promoter that directs expression of the first exogenous polynucleotide is a promoter other than a constitutive promoter.

The genetic modification can be any change to a naturally occurring cell that achieves the desired effect. Methods of genetically modifying cells are well known in the art. In an embodiment, each of the one or more or all of the genetic modifications is a mutation of an endogenous gene which partially or completely inactivates the gene, preferably an introduced mutation, such as a point mutation, an insertion, or a deletion (or a combination of one or more thereof). The point mutation may be a premature stop codon, a splice-site mutation, a frame-shift mutation or an amino acid substitution mutation that reduces activity of the gene or the encoded polypeptide. The deletion may be of one or more nucleotides within a transcribed exon or promoter of the gene, or extend across or into more than one exon, or extend to deletion of the entire gene. Preferably the deletion is introduced by use of ZF, TALEN or CRISPR technologies. In an embodiment, one or more or all of the genetic modifications is an exogenous polynucleotide encoding an RNA molecule which inhibits expression of the endogenous gene, wherein the exogenous polynucleotide is operably linked to a promoter which is capable of directing expression of the polynucleotide in the cell. Examples of exogenous polynucleotide which reduces expression of an endogenous gene are selected from the group consisting of an antisense polynucleotide, a sense polynucleotide, a microRNA, a polynucleotide which encodes a polypeptide which binds the endogenous enzyme, a double stranded RNA molecule and a processed RNA molecule derived therefrom. In an embodiment, the cell comprises genetic modifications which are an introduced mutation in an endogenous gene and an exogenous polynucleotide encoding an RNA molecule which reduces expression of another endogenous gene.

In an embodiment, the exogenous polynucleotide encoding WRI1 comprises one or more of the following:

i) nucleotides encoding a polypeptide comprising amino acids whose sequence is set forth as any one of SEQ ID NOs:21 to 75 or 205 to 210, or a biologically active fragment thereof, or a polypeptide whose amino acid sequence is at least 30% identical to any one or more of SEQ ID NOs: 21 to 75 or 205 to 210, ii) nucleotides whose sequence is at least 30% identical to i), and iii) nucleotides which hybridize to i) and/or ii) under stringent conditions. Preferably, the WRI1 polypeptide is a WRI1 polypeptide other than *Arabidopsis thaliana* WRI1 (SEQ ID NOs:21 or 22). More preferably, the WRI1 polypeptide comprises amino acids whose sequence is set forth as SEQ ID NO:208, or a biologically active fragment thereof, or a polypeptide whose amino acid sequence is at least 30% identical thereto.

In an embodiment of the second, third, fourth or fifth aspects, the recombinant cell is a cell of a potato (*Solanum tuberosum*) tuber, a cell of a sugarbeet (*Beta vulgaris*) beet or leaf, a cell of a sugarcane (*Saccharum* sp.) or sorghum (*Sorghum bicolor*) stem or leaf, an endosperm cell of a monocotyledonous plant, wherein the cell has an increased total fatty acid content relative to a corresponding wild-type endosperm cell such as, for example, a cell of a wheat (*Triticum aestivum*) grain, rice (*Oryza* sp.) grain or a corn (*Zea mays*) kernel, a cell of a *Brassica* sp. seed having an increased total fatty acid content such as, for example, a canola seed, or a cell of a legume seed having an increased total fatty acid content such as, for example, a soybean (*Glycine max*) seed.

In a sixth aspect, the present invention provides a non-human organism, or part thereof, comprising, or consisting of, one or more cells of the invention.

In an embodiment, the part of the non-human organism is a seed, fruit, or a vegetative part of a plant such as an aerial plant part or a green part such as a leaf or stem.

In another embodiment, the non-human organism is a phototrophic organism such as, for example, a plant or an alga, or an organism suitable for fermentation such as, for example, a fungus.

In a seventh aspect, the present invention provides a transgenic plant, or part a) a first exogenous polynucleotide which encodes a transcription factor polypeptide that increases the expression of one or more glycolytic and/or fatty acid biosynthetic genes in the plant, b) a second exogenous polynucleotide which encodes a polypeptide involved in the biosynthesis of one or more non-polar lipids, and any one or two or all three of c) a genetic modification which down-regulates endogenous production and/or activity of a polypeptide involved in the catabolism of triacylglycerols (TAG) in the plant when compared to a corresponding plant lacking the genetic modification, d) a third exogenous polynucleotide which encodes a polypeptide which increases the export of fatty acids out of plastids of cells of the plant when compared to a corresponding cell lacking the fourth exogenous polynucleotide, and e) a fourth exogenous polynucleotide which encodes a second transcription factor polypeptide that increases the expression of one or more glycolytic and/or fatty acid biosynthetic genes in the plant, wherein each exogenous polynucleotide is operably linked to a promoter which is capable of directing expression of the polynucleotide in the plant.

In an embodiment, the plant or part thereof comprises a), b) and c), and optionally d) or e).

In an embodiment, the plant or part thereof comprises a), b) and d), and optionally c) or e).

In an embodiment, the plant or part thereof comprises a), b) and e), and optionally c) or d).

In a preferred embodiment, the presence of c), d) or e), together with a) and b) increases the total non-polar lipid content of the plant or part thereof, preferably a vegetative plant part such as a leaf, root or stem, relative to a corresponding plant or part thereof which comprises a) and b) but lacking each of c), d) and e). More preferably, the increase is synergistic. Most preferably, at least the promoter that directs expression of the first exogenous polynucleotide is a promoter other than a constitutive promoter.

In an embodiment, the plant, or part thereof, further comprises one or more or all of a) a fifth exogenous polynucleotide which encodes an oil body coating (OBC) polypeptide, preferably an LDAP, b) a second genetic modification which down-regulates endogenous production and/or activity of a polypeptide involved in importing fatty acids into plastids of the plant when compared to a corresponding plant lacking the second genetic modification, and c) a third genetic modification which down-regulates endogenous production and/or activity of a polypeptide involved in diacylglycerol (DAG) production in the plastid when compared to a corresponding plant lacking the third genetic modification.

In an embodiment, the transgenic plant, or part thereof, comprises a) a first exogenous polynucleotide which encodes a transcription factor polypeptide that increases the expression of one or more glycolytic and/or fatty acid biosynthetic genes in the plant, preferably expressed from a promoter other than a constitutive promoter, b) a second exogenous polynucleotide which encodes a polypeptide involved in the biosynthesis of one or more non-polar lipids, and c) a genetic modification which down-regulates endogenous production and/or activity of a polypeptide involved in the catabolism of triacylglycerols (TAG) in the plant when compared to a corresponding plant lacking the genetic modification, wherein each exogenous polynucleotide is operably linked to a promoter which is capable of directing expression of the polynucleotide in the plant, and optionally the plant, or part thereof, further comprises one or more or all of d) a third exogenous polynucleotide which encodes an oil body coating (OBC) polypeptide, preferably an LDAP, e) a fourth exogenous polynucleotide which encodes a polypeptide which increases the export of fatty acids out of plastids of the plant when compared to a corresponding plant lacking the fourth exogenous polynucleotide, f) a second genetic modification which down-regulates endogenous production and/or activity of a polypeptide involved in importing fatty acids into plastids of the plant when compared to a corresponding plant lacking the second genetic modification, and g) a third genetic modification which down-regulates endogenous production and/or activity of a polypeptide involved in diacylglycerol (DAG) production in the plastid when compared to a corresponding plant lacking the third genetic modification.

In an embodiment, the part is a vegetative part and one or more or all of the promoters are expressed at a higher level in the vegetative part relative to seed of the plant.

In an embodiment, the polypeptide involved in the biosynthesis of one or more non-polar lipids is a DGAT or a PDAT and the polypeptide involved in the catabolism of TAG in the plant is an SDP1 lipase.

In an embodiment, the transcription factor polypeptide that increases the expression of one or more glycolytic and/or fatty acid biosynthetic genes in the plant is a WRI1 polypeptide and the polypeptide involved in the biosynthesis of one or more non-polar lipids is a DGAT or a PDAT.

In an embodiment, the transcription factor polypeptide that increases the expression of one or more glycolytic and/or fatty acid biosynthetic genes in the plant is a WRI1 polypeptide, a LEC2 polypeptide, a LEC1 polypeptide or a LEC1-like polypeptide and the polypeptide involved in the biosynthesis of one or more non-polar lipids is a DGAT.

In an embodiment, the transcription factor polypeptide that increases the expression of one or more glycolytic and/or fatty acid biosynthetic genes in the plant is a WRI1 polypeptide, a LEC2 polypeptide, a LEC1 polypeptide or a LEC1-like polypeptide and the polypeptide involved in the catabolism of triacylglycerols (TAG) in the plant is an SDP1 lipase.

In an embodiment, the transcription factor polypeptide that increases the expression of one or more glycolytic and/or fatty acid biosynthetic genes in the plant is a WRI1 polypeptide, a LEC2 polypeptide, a LEC1 polypeptide or a LEC1-like polypeptide, the polypeptide involved in the biosynthesis of one or more non-polar lipids is a DGAT or a PDAT and the polypeptide involved in the catabolism of triacylglycerols (TAG) in the plant is an SDP1 lipase.

In an embodiment, when present, the two transcription factors are WRI1 and LEC2, or WRI1 and LEC1.

In the above embodiments, it is preferred that the plant is growing in soil or was grown in soil and the part thereof was subsequently harvested. Preferably, a vegetative part of the plant comprises at least 8% TAG on a weight basis (% dry weight) such as for example between 8% and 75% or between 8% and 30%. More preferably, the TAG content is at least 10%, such as for example between 10% and 75% or between 10% and 30%. Preferably, these TAG levels are present in the vegetative part prior to or at flowering of the plant or prior to seed setting stage of plant development. In these embodiments, it is preferred that the ratio of the TAG content in the leaves to the TAG content in the stems of the plant is between 1:1 and 10:1, and/or the ratio is increased relative to a corresponding cell comprising the first and second exogenous polynucleotides and lacking the first genetic modification.

In the above embodiments, the total non-polar lipid content of the plant or part thereof is preferably at least 3%, more preferably at least 5% greater, than the total non-polar lipid content in a corresponding plant or part thereof transformed with genes encoding a WRI1 and a DGAT but lacking the other exogenous polynucleotides and genetic modifications as described herein. More preferably, that degree of increase is in stem or root tissues of the plant.

In the above embodiments, it is preferred that the addition of one or more exogenous polynucleotides or genetic modifications, preferably the exogenous polynucleotide encoding the OBC or the fatty acid thioesterase or the genetic modification which down-regulates endogenous production and/or activity of a polypeptide involved in the catabolism of triacylglycerols (TAG) in the cell, more preferably the exogenous polynucleotide which encodes an LDAP or FATA thioesterase or which decreases expression of an endogenous TAG lipase such as a SDP1 TAG lipase in the cell, results in a synergistic increase in the total non-polar lipid content of the plant or part thereof when added to the pair of transgenes WRI1 and DGAT, particularly before the plant flowers and even more particularly in stem and/or root tissue of the plant. For example, see Examples 8, 11 and 15. In a preferred embodiment, the increase in the TAG content of the leaf, stem or root tissues, or all three, of the plant is at least 2-fold, more preferably at least 3-fold, relative to a corresponding part transformed with genes encoding WRI1 and DGAT1 but lacking the exogenous polynucleotide encoding the OBC or the fatty acid thioesterase and the genetic modification which down-regulates endogenous production and/or activity of a polypeptide involved in the catabolism of triacylglycerols (TAG) in the cell.

In the above embodiments, the plant or part thereof preferably comprises a second exogenous polynucleotide which encodes a DGAT and a first genetic modification which down-regulates production of an endogenous SDP1 lipase. More preferably, the plant or part thereof does not comprise an exogenous polynucleotide encoding a PDAT, and/or is a plant or part thereof other than of *Nicotiana benthamiana* and/or *Brassica napus*, and/or the WRI1 is a WRI1 other than *Arabidopsis thaliana WRI*1 (SEQ ID NOs:21 or 22). In an embodiment, the plant is other than sugarcane. Most preferably, at least one of the exogenous polynucleotides in the plant is expressed from a promoter which is not a constitutive promoter such as, for example, a promoter which is expressed preferentially in green tissues or stems of the plant or that is up-regulated after commencement of flowering or during senescence. Preferably at least the first exogenous polynucleotide (encoding a transcription factor) is expressed from such a promoter.

In an eighth aspect, the present invention provides a transgenic plant, or part a) a first exogenous polynucleotide which encodes a transcription factor polypeptide that increases the expression of one or more glycolytic and/or fatty acid biosynthetic genes in the plant,
b) a second exogenous polynucleotide which encodes a polypeptide involved in the biosynthesis of one or more non-polar lipids, and
c) a third exogenous polynucleotide which encodes an oil body coating (OBC) polypeptide, preferably an LDAP, wherein each exogenous polynucleotide is operably linked to a promoter which is capable of directing expression of the polynucleotide in the plant and wherein the plant has an increased level of one or more non-polar lipid(s) and/or an increased amount of the OBC polypeptide, relative to a corresponding plant which comprises a third exogenous polynucleotide whose nucleotide sequence is the complement of the sequence provided as SEQ ID NO:176.

In a preferred embodiment, the presence of the third exogenous polynucleotide encoding the OBC polypeptide, together with the first and second exogenous polynucleotides, increases the total non-polar lipid content of the plant or part thereof, preferably a vegetative plant part such as a leaf, root or stem, relative to a corresponding plant part which comprises the first and second exogenous polynucleotides but lacking the third exogenous polynucleotide. More preferably, the increase is synergistic. Most preferably, at least the promoter that directs expression of the first exogenous polynucleotide is a promoter other than a constitutive promoter.

In an embodiment of the eighth aspect, the plant, or part thereof, further comprises one or more or all of d) a first genetic modification which down-regulates endogenous production and/or activity of a polypeptide involved in the catabolism of triacylglycerols (TAG) in the plant when compared to a corresponding plant lacking the first genetic modification,
e) a fourth exogenous polynucleotide which encodes a polypeptide which increases the export of fatty acids out of plastids of the plant when compared to a corresponding plant lacking the fourth exogenous polynucleotide,
f) a second genetic modification which down-regulates endogenous production and/or activity of a polypeptide involved in importing fatty acids into plastids of the plant when compared to a corresponding plant lacking the second genetic modification, and
g) a third genetic modification which down-regulates endogenous production and/or activity of a polypeptide involved in diacylglycerol (DAG) production in the plastid when compared to a corresponding plant lacking the third genetic modification.

In an embodiment, the polypeptide involved in the biosynthesis of one or more non-polar lipids is a DGAT or a PDAT and the OBC polypeptide is an oleosin. Alternatively, the OBC polypeptide is an LDAP.

In an embodiment, the transcription factor polypeptide that increases the expression of one or more glycolytic and/or fatty acid biosynthetic genes in the plant is a WRI1 polypeptide and the polypeptide involved in the biosynthesis of one or more non-polar lipids is a DGAT or a PDAT.

In an embodiment, the transcription factor polypeptide that increases the expression of one or more glycolytic and/or fatty acid biosynthetic genes in the plant is a WRI1 polypeptide, a LEC2 polypeptide, a LEC1 polypeptide or a LEC1-like polypeptide and the OBC polypeptide is an oleosin. Alternatively, the OBC polypeptide is an LDAP.

In an embodiment, the transcription factor polypeptide that increases the expression of one or more glycolytic and/or fatty acid biosynthetic genes in the plant is a WRI1 polypeptide, a LEC2 polypeptide, a LEC1 polypeptide or a LEC1-like polypeptide, the polypeptide involved in the biosynthesis of one or more non-polar lipids is a DGAT or a PDAT and the OBC polypeptide is an oleosin. Alternatively, the OBC polypeptide is an LDAP.

In an embodiment, the cell comprises two exogenous polynucleotides encoding two different transcription factor polypeptides that increase the expression of one or more glycolytic and/or fatty acid biosynthetic genes in the plant, such as WRI1 and LEC2, or WRI1 and LEC1.

In an ninth aspect, the present invention provides a transgenic plant or part thereof, preferably a vegetative plant part, comprising a first exogenous polynucleotide which encodes a transcription factor polypeptide that increases the expression of one or more glycolytic and/or fatty acid biosynthetic genes in the plant and one or more or all of;

a) a second exogenous polynucleotide which encodes a polypeptide which increases the export of fatty acids out of plastids of the plant when compared to a corresponding plant lacking the second exogenous polynucleotide, b) a first genetic modification which down-regulates endogenous production and/or activity of a polypeptide involved in importing fatty acids into plastids of the plant when compared to a corresponding plant lacking the first genetic modification, and c) a second genetic modification which down-regulates endogenous production and/or activity of a polypeptide involved in diacylglycerol (DAG) production in the plastid when compared to a corresponding plant lacking the second genetic modification, wherein each exogenous polynucleotide is operably linked to a promoter which is capable of directing expression of the polynucleotide in the plant.

In an embodiment, the plant or part thereof, preferably a vegetative plant part, comprises a) and optionally b) or c).

In an embodiment of the ninth aspect, the plant, or part thereof, further comprises one or more or all of d) a third exogenous polynucleotide which encodes a polypeptide involved in the biosynthesis of one or more non-polar lipids, e) a third genetic modification which down-regulates endogenous production and/or activity of a polypeptide involved in the catabolism of triacylglycerols (TAG) in the plant when compared to a corresponding plant lacking the third genetic modification, and f) a fourth exogenous polynucleotide which encodes an oil body coating (OBC) polypeptide, preferably an LDAP.

In a preferred embodiment, the plant or part thereof, preferably a vegetative plant part, comprises the first, second and third exogenous polynucleotides and optionally the third genetic modification or the fourth exogenous polynucleotide.

In a preferred embodiment, the presence of the second exogenous polynucleotide encoding a polypeptide which increases the export of fatty acids out of plastids of the plant, which is preferably a fatty acyl thioesterase such as a FATA polypeptide, together with the first and, if present, third exogenous polynucleotides increases the total non-polar lipid content of the plant part, preferably a vegetative plant part such as a leaf, root or stem, relative to a corresponding plant part which comprises the first and, if present, third exogenous polynucleotides but lacking the second exogenous polynucleotide. More preferably, the increase provided by the second exogenous polynucleotide is synergistic. Most preferably, at least the promoter that directs expression of the first exogenous polynucleotide is a promoter other than a constitutive promoter.

In an embodiment, the transcription factor polypeptide that increases the expression of one or more glycolytic and/or fatty acid biosynthetic genes in the plant is a WRI1 polypeptide, a LEC2 polypeptide, a LEC1 polypeptide or a LEC1-like polypeptide, and the polypeptide involved in importing fatty acids into plastids of the cell is a TGD polypeptide.

In an embodiment, the transcription factor polypeptide that increases the expression of one or more glycolytic and/or fatty acid biosynthetic genes in the plant is a WRI1 polypeptide, a LEC2 polypeptide, a LEC1 polypeptide or a LEC1-like polypeptide, and the polypeptide involved in diacylglycerol (DAG) production is a plastidial GPAT.

In an embodiment, the transcription factor polypeptide that increases the expression of one or more glycolytic and/or fatty acid biosynthetic genes in the plant is a WRI1 polypeptide, a LEC2 polypeptide, a LEC1 polypeptide or a LEC1-like polypeptide, the polypeptide which increases the export of fatty acids out of plastids of the plant is a fatty acid thioesterase, preferably a FATA or a FATB polypeptide, and the polypeptide involved in importing fatty acids into plastids of the plant is a TGD polypeptide.

In an embodiment, the transcription factor polypeptide that increases the expression of one or more glycolytic and/or fatty acid biosynthetic genes in the plant is a WRI1 polypeptide, a LEC2 polypeptide, a LEC1 polypeptide or a LEC1-like polypeptide, the polypeptide which increases the export of fatty acids out of plastids of the plant is a fatty acid thioesterase, preferably a FATA or a FATB polypeptide, and the polypeptide involved in diacylglycerol (DAG) production is a plastidial GPAT.

In an embodiment, the transcription factor polypeptide that increases the expression of one or more glycolytic and/or fatty acid biosynthetic genes in the plant is a WRI1 polypeptide, a LEC2 polypeptide, a LEC1 polypeptide or a LEC1-like polypeptide, the polypeptide involved in importing fatty acids into plastids of the plant a TGD polypeptide, and the polypeptide involved in diacylglycerol (DAG) production is a plastidial GPAT.

In an embodiment, the plant comprises two exogenous polynucleotides encoding two different transcription factor polypeptides that increase the expression of one or more glycolytic and/or fatty acid biosynthetic genes in the cell, such as WRI1 and LEC2, or WRI1 and LEC1.

In embodiments of the seventh, eighth and ninth aspects, when the plant comprises an exogenous polynucleotide encoding a fatty acid thioesterase such as, for example, a FATA or a FATB polypeptide, the thioesterase is preferably a FATA polypeptide or a fatty acid thioesterase other than a medium chain fatty acid thioesterase.

In a tenth aspect, the present invention provides a transgenic plant, or part thereof, preferably a vegetative part, comprising a) a first exogenous polynucleotide which encodes a transcription factor polypeptide that increases the expression of one or more glycolytic and/or fatty acid biosynthetic genes in the plant, preferably a WRI transcription factor, b) a second exogenous polynucleotide which encodes a polypeptide involved in the biosynthesis of one or more non-polar lipids which is an LPAAT with preferential activity for fatty acids with a medium chain length (C8 to C14), and c) a third exogenous polynucleotide which encodes a polypeptide which increases the export of C8 to C14 fatty acids out of plastids of the plant when compared to a corresponding a plant lacking the third exogenous polynucleotide, wherein each exogenous polynucleotide is operably linked to a promoter which is capable of directing expression of the polynucleotide in the plant.

In a preferred embodiment, the presence of the third exogenous polynucleotide encoding a polypeptide which increases the export of C8 to C14 fatty acids out of plastids of the plant, together with the first and second exogenous polynucleotides increases the total MCFA content of the plant part, preferably a vegetative plant part such as a leaf, root or stem, relative to a corresponding plant part which comprises the first and second exogenous polynucleotides but lacking the third exogenous polynucleotide. More preferably, the increase provided by the third exogenous polynucleotide is synergistic. Most preferably, at least the promoter that directs expression of the first exogenous polynucleotide is a promoter other than a constitutive promoter.

In an embodiment of the tenth aspect, the transgenic plant or part thereof further comprises one or more or all of;

d) a fourth exogenous polynucleotide which encodes a further polypeptide involved in the biosynthesis of one or more non-polar lipids, e) a first genetic modification which down-regulates endogenous production and/or activity of a polypeptide involved in the catabolism of triacylglycerols (TAG) in the plant when compared to a corresponding plant lacking the first genetic modification, f) a fifth exogenous polynucleotide which encodes an oil body coating (OBC) polypeptide, preferably an LDAP, g) a second genetic modification which down-regulates endogenous production and/or activity of a polypeptide involved in importing fatty acids into plastids of the plant when compared to a corresponding plant lacking the second genetic modification, and h) a third genetic modification which down-regulates endogenous production and/or activity of a polypeptide involved in diacylglycerol (DAG) production in the plastid when compared to a corresponding plant lacking the third genetic modification, wherein each exogenous polynucleotide is operably linked to a promoter which is capable of directing expression of the polynucleotide in the plant.

In an embodiment of the tenth aspect, the transcription factor is not *Arabidopsis thaliana* WRI1 (SEQ ID NOs:21 or 22), and/or the plant is not *N. benthamiana.*

In an embodiment of the tenth aspect, the exogenous polynucleotide encoding LPAAT comprises amino acids whose sequence is set forth as SEQ ID NO:200, or a biologically active fragment thereof, or a LPAAT polypeptide whose amino acid sequence is at least 30% identical thereto.

In an embodiment of the tenth aspect, one or more or all of the promoters are expressed at a higher level in the vegetative part relative to seed of the plant, preferably including at least the promoter that expresses the first exogenous polynucleotide.

In an embodiment of the tenth aspect, the fatty acid with a medium chain length is at least myristic acid (C14:0). In a preferred embodiment, the plant part, preferably a vegetative plant part, comprises a myristic acid content of at least about 8%, at least about 10%, at least about 11%, at least about 12%, at least about 15%, at least about 20%, at least about 25%, between 8% and 25%, between 8% and 20%, between 10% and 25%, between 11% and 25%, between about 15% and 25%, between about 20% and 25%, (w/w dry weight).

In the embodiments of the sixth, seventh, eighth, ninth and tenth aspects, it is preferred that the plant is growing in soil or was grown in soil and the plant part, preferably vegetative plant part, was subsequently harvested, and wherein the plant part comprises at least 8% TAG on a weight basis (% dry weight) such as for example between 8% and 75% or between 8% and 30%. More preferably, the TAG content is at least 10%, such as for example between 10% and 75% or between 10% and 30%. Preferably, these TAG levels are present in the vegetative part prior to or at flowering of the plant or prior to seed setting stage of plant development. In these embodiments, it is preferred that the ratio of the TAG content in the leaves to the TAG content in the stems of the plant is between 1:1 and 10:1, and/or the ratio is increased relative to a corresponding cell comprising the first and second exogenous polynucleotides and lacking the first genetic modification.

In the embodiments of the sixth, seventh, eighth, ninth and tenth aspects, the plant or part thereof preferably comprises an exogenous polynucleotide which encodes a DGAT and a genetic modification which down-regulates production of an endogenous SDP1 lipase. In a preferred embodiment, the plant or part thereof does not comprise an exogenous polynucleotide encoding a PDAT, and/or is a plant other than a *Nicotiana benthamiana* plant. Most preferably, at least one of the exogenous polynucleotides in the plant or part thereof is expressed from a promoter which is not a constitutive promoter such as, for example, a promoter expressed preferentially in green tissues or stems of the plant or that is up-regulated during senescence.

In an eleventh aspect, the present invention provides a plant comprising a vegetative part, or the vegetative part thereof, wherein the vegetative part has a total non-polar lipid content of at least about 18%, at least about 20%, at least about 25%, at least about 30%, at least about 35%, at least about 40%, at least about 45%, at least about 50%, at least about 55%, at least about 60%, at least about 65%, at least about 70%, between 18% and 75%, between about 20% and 75%, between about 30% and 75%, between about 40% and 75%, between about 50% and 75%, between about 60% and 75%, or between about 25% and 50% (w/w dry weight), wherein the non-polar lipid comprises at least 90% triacylglycerols (TAG).

In preferred embodiments, the vegetative plant part is characterised by features as described in the seventh, eighth, ninth and tenth aspects. The plant is preferably an 18:3 plant.

In an embodiment of the above aspects, the plant cell or plant part has been treated so it is no longer able to be propagated or give rise to a living plant, i.e. it is dead. For example, the plant cell or plant part has been dried and/or ground.

In an twelfth aspect, the present invention provides a plant comprising a vegetative part, or the vegetative part thereof, wherein the vegetative part has a TAG content of at least about 18%, at least about 20%, at least about 25%, at least about 30%, at least about 35%, at least about 40%, at least about 45%, at least about 50%, at least about 55%, at least about 60%, at least about 65%, at least about 70%, between 18% and 75%, between about 20% and 75%, between about 30% and 75%, between about 40% and 75%, between about 50% and 75%, between about 60% and 75%, or between about 25% and 50% (w/w dry weight), wherein the non-polar lipid comprises at least 90% triacylglycerols (TAG). The plant is preferably an 18:3 plant.

In a thirteenth aspect, the present invention provides a plant comprising a vegetative part, or the vegetative part thereof, wherein the vegetative part has a total non-polar lipid content of at least 8%, at least about 10%, at least about 11%, at least about 12%, at least about 15%, at least about 20%, at least about 25%, at least about 30%, at least about 35%, at least about 40%, at least about 45%, at least about 50%, at least about 55%, at least about 60%, at least about 65%, at least about 70%, between 8% and 75%, between 10% and 75%, between 11% and 75%, between about 15% and 75%, between about 20% and 75%, between about 30% and 75%, between about 40% and 75%, between about 50% and 75%, between about 60% and 75%, or between about 25% and 50% (w/w dry weight), wherein the non-polar lipid comprises at least 90% triacylglycerols (TAG), and wherein the plant is a 16:3 plant or vegetative part thereof.

In a fourteenth aspect, the present invention provides a plant comprising a vegetative part, or the vegetative part thereof, wherein the vegetative part has a TAG content of at least 8%, at least about 10%, at least about 11%, at least about 12%, at least about 15%, at least about 20%, at least about 25%, at least about 30%, at least about 35%, at least about 40%, at least about 45%, at least about 50%, at least about 55%, at least about 60%, at least about 65%, at least about 70%, between 8% and 75%, between 10% and 75%, between 11% and 75%, between about 15% and 75%, between about 20% and 75%, between about 30% and 75%, between about 40% and 75%, between about 50% and 75%, between about 60% and 75%, or between about 25% and 50% (w/w dry weight), wherein the non-polar lipid comprises at least 90% triacylglycerols (TAG), and wherein the plant is a 16:3 plant or vegetative part thereof.

In an embodiment, the cell of the invention (including of the second, third, fourth and fifth aspects) is a cell of the following species or genera, or the plant or part thereof of the invention (including of the sixth, seventh, eighth, ninth, tenth, eleventh, twelfth, thirteenth and fourteenth aspects) is *Acrocomia aculeata* (macauba palm), *Arabidopsis thaliana, Aracinis hypogaea* (peanut), *Astrocaryum murumuru* (*murumuru*), *Astrocaryum vulgare* (tucumã), *Attalea geraensis* (Indaiá-rateiro), *Attalea humilis* (American oil palm), *Attalea oleifera* (andaiá), *Attalea phalerata* (uricuri), *Attalea* speciosa (babassu), *Avena sativa* (oats), *Beta vulgaris* (sugar beet), *Brassica* sp. such as, for example, *Brassica carinata, Brassica juncea, Brassica napobrassica, Brassica napus* (canola), *Camelina sativa* (false flax), *Cannabis sativa* (hemp), *Carthamus tinctorius* (safflower), *Caryocar brasiliense* (pequi), *Cocos nucifera* (Coconut), *Crambe abyssinica* (Abyssinian kale), *Cucumis melo* (melon), *Elaeis guineensis* (African palm), *Glycine max* (soybean), *Gossypium hirsutum* (cotton), *Helianthus* sp. such as *Helianthus annuus* (sunflower), *Hordeum vulgare* (barley), *Jatropha curcas* (physic nut), *Joannesia princeps* (arara nut-tree), *Lemna* sp. (duckweed) such as *Lemna aequinoctialis, Lemna disperma, Lemna ecuadoriensis, Lemna gibba* (swollen duckweed), *Lemna japonica, Lemna minor, Lemna minuta, Lemna obscura, Lemna paucicostata, Lemna perpusilla, Lemna tenera, Lemna trisulca, Lemna turionifera, Lemna valdiviana, Lemna yungensis, Licania rigida* (oiticica), *Linum usitatissimum* (flax), *Lupinus angustifolius* (lupin), *Mauritia flexuosa* (buriti palm), *Maximiliana maripa* (inaja palm), *Miscanthus* sp. such as *Miscanthus* x *giganteus* and *Miscanthus sinensis, Nicotiana* sp. (tabacco) such as *Nicotiana tabacum* or *Nicotiana benthamiana, Oenocarpus bacaba* (bacaba-do-azeite), *Oenocarpus bataua* (patauã), *Oenocarpus distichus* (bacaba-de-leque), *Oryza* sp. (rice) such as *Oryza sativa* and *Oryza glaberrima, Panicum virgatum* (switchgrass), *Paraqueiba paraensis* (mari), *Persea amencana* (avocado), *Pongamia pinnata* (Indian beech), *Populus trichocarpa, Ricinus communis* (castor), *Saccharum* sp. (sugarcane), *Sesamum indicum* (sesame), *Solanum tuberosum* (potato), *Sorghum* sp. such as *Sorghum* bicolor, *Sorghum vulgare, Theobroma grandiforum* (cupuassu), *Trifolium* sp., *Trithrinax brasiliensis* (Brazilian needle palm), *Triticum* sp. (wheat) such as *Triticum aestivum* and *Zea mays* (corn).

In a fifteenth aspect, the present invention provides a potato plant, or part thereof preferably a tuber which has a diameter of at least 2 cm, and has a TAG content of at least 0.5% on a dry weight basis and/or a total fatty acid content of at least 1%, preferably at least 1.5% or at least 2.0%, on a dry weight basis. The potato tuber preferably has an increased level of monounsaturated fatty acids (MUFA) and/or a lower level of polyunsaturated fatty acids (PUFA) in both the total fatty acid content and in the TAG fraction of the total fatty acid content, such as an increased level of oleic acid and a reduced level of ALA, when compared to a corresponding potato tuber lacking the genetic modifications and/or exogenous polynucleotide(s). Preferably, the ALA level in the total fatty acid content of the tuber is reduced to less than 10% and/or the level of oleic acid in the total fatty acid content is increased to at least 5%, preferably at least 10% or more preferably at least 15%, when compared to a corresponding potato tuber lacking the genetic modifications and/or exogenous polynucleotide(s). Furthermore, in an embodiment the level of palmitic acid in the total fatty acid content of the tuber is increased and/or the stearic acid (18:0) levels decreased in the total fatty acid content of the tuber, when compared to a corresponding potato tuber lacking the genetic modifications and/or exogenous polynucleotide(s). In an embodiment, the starch content of the tuber is between about 90% and 100% on a weight basis relative to a wild-type tuber when they are grown under the same conditions.

In an embodiment, the potato plant, or part thereof preferably a tuber, of the invention comprises a) a first exogenous polynucleotide which encodes a transcription factor polypeptide that increases the expression of one or more glycolytic and/or fatty acid biosynthetic genes in the tuber, and b) a second exogenous polynucleotide which encodes a polypeptide involved in the biosynthesis of one or more non-polar lipids, wherein each exogenous polynucleotide is operably linked to a promoter which is capable of directing expression of the polynucleotide in the tuber during growth of the potato plant.

In a preferred embodiment, the potato tuber further comprises one or more or all of c) a third exogenous polynucleotide which encodes an oil body coating (OBC) polypeptide, preferably an LDAP, d) a first genetic modification which down-regulates endogenous production and/or activity of a polypeptide involved in the catabolism of triacylglycerols (TAG) in the tuber when compared to a corresponding tuber lacking the first genetic modification, for example where the polypeptide is SDP1, e) a fourth exogenous polynucleotide which encodes a polypeptide which increases the export of fatty acids out of plastids of the tuber when compared to a corresponding tuber lacking the fourth exogenous polynucleotide, f) a second genetic modification which down-regulates endogenous production and/or activity of a polypeptide involved in importing fatty acids into plastids of the tuber when compared to a corresponding tuber lacking the second genetic modification, and g) a third genetic modification which down-regulates endogenous production and/or activity of a polypeptide involved in diacylglycerol (DAG) production in plastids of the tuber when compared to a corresponding tuber lacking the third genetic modification.

In further embodiments, additional genetic modifications in the tuber are as defined in the context of a cell or plant of the invention.

In a sixteenth aspect, the present invention provides a sorghum or sugarcane plant, or part thereof preferably a stem or a leaf, which has a total fatty acid content of at least 6% or at least 8% on a dry weight basis and/or a TAG content in the stem of at least 2% or at least 3% on a dry weight basis and/or has an increase in TAG content of at least 50-fold in the stem and/or at least 100-fold in leaf on a weight basis. In embodiments, the sorghum or sugarcane plant, or part thereof preferably a stem or a leaf, is characterised by features as defined in the context of a cell or plant or part thereof of the invention.

In a seventeenth aspect, the present invention provides a sorghum or sugarcane plant, or part thereof preferably a stem or leaf, which comprises a) a first exogenous polynucleotide which encodes a transcription factor polypeptide that increases the expression of one or more glycolytic and/or fatty acid biosynthetic genes in the plant or part thereof, and
b) a second exogenous polynucleotide which encodes a polypeptide involved in the biosynthesis of one or more non-polar lipids, wherein each exogenous polynucleotide is operably linked to a promoter which is capable of directing expression of the polynucleotide in the plant or part thereof during growth of the plant.

Preferably, the promoter which directs expression of at least the first exogenous polynucleotide is a promoter other than a rice ubiquitin promoter (Rubi3). More preferably, the promoter is not a ubiquitin promoter or any other constitutive promoter. Preferably, the first and second exogenous polynucleotides and their respective promoters are linked on one genetic construct which is integrated into the plant genome.

In an embodiment, the sugar content of the sugarcane stem is between about 70% and 100% on a weight basis relative to a wild-type sugarcane stem when they are grown under the same conditions. Alternatively, the sugar content is between 50% and 70%.

In an embodiment, the sorghum or sugarcane plant, or part thereof preferably a stem or leaf, of the invention comprises a) a first exogenous polynucleotide which encodes a transcription factor polypeptide that increases the expression of one or more glycolytic and/or fatty acid biosynthetic genes in the stem(s) of the plant, and
b) a second exogenous polynucleotide which encodes a polypeptide involved in the biosynthesis of one or more non-polar lipids, wherein at least one of the exogenous polynucleotides, preferably at least the first exogenous polynucleotide, is operably linked to a promoter which is preferentially expressed in the stem(s) relative to the leaves during growth of the plant.

In an embodiment, the sorghum or sugarcane plant or part thereof of the invention further comprises one or more or all of c) a third exogenous polynucleotide which encodes an oil body coating (OBC) polypeptide, preferably an LDAP,
d) a first genetic modification which down-regulates endogenous production and/or activity of a polypeptide involved in the catabolism of triacylglycerols (TAG) in the plant or part thereof when compared to a corresponding plant or part thereof lacking the first genetic modification,
e) a fourth exogenous polynucleotide which encodes a polypeptide which increases the export of fatty acids out of plastids of the plant or part thereof when compared to a corresponding plant or part thereof lacking the fourth exogenous polynucleotide,
f) a second genetic modification which down-regulates endogenous production and/or activity of a polypeptide involved in importing fatty acids into plastids of the plant or part thereof when compared to a corresponding plant or part thereof lacking the second genetic modification, and
g) a third genetic modification which down-regulates endogenous production and/or activity of a polypeptide involved in diacylglycerol (DAG) production in plastids of the plant or part thereof when compared to a corresponding plant or part thereof lacking the third genetic modification.

The sorghum or sugarcane plant or part thereof of the invention preferably has an increased level of monounsaturated fatty acids (MUFA) and/or a lower level of polyunsaturated fatty acids (PUFA) in both the total fatty acid content and in the TAG fraction of the total fatty acid content, such as an increased level of oleic acid and a reduced level of ALA, when compared to a corresponding plant or part thereof lacking the genetic modifications and/or exogenous polynucleotide(s).

Preferably, the ALA level in the total fatty acid content is less than 10% and/or the level of oleic acid in the total fatty acid content is at least 5%, preferably at least 10% or more preferably at least 15%, when compared to a corresponding plant or part thereof lacking the genetic modifications and/or exogenous polynucleotide(s).

In further embodiments, additional genetic modifications in the sorghum or sugarcane plant or part thereof are as defined in the context of a cell or plant of the invention.

In a eighteenth aspect, the present invention provides a transgenic monocotyledonous plant, or part thereof preferably a leaf, a grain, a stem, a root or an endosperm, which has a total fatty acid content or TAG content which is increased at least 5-fold on a weight basis when compared to a corresponding non-transgenic monocotyledonous plant, or part thereof. Alternatively, the invention provides a transgenic monocotyledonous plant whose endosperm has a TAG content which is at least 2.0%, preferably at least 3%, more preferably at least 4% or at least 5%, on a weight basis, or part of the plant, preferably a leaf, a stem, a root, a grain or an endosperm. In an embodiment, the endosperm has a TAG content of at least 2% which is increased at least 5-fold relative to a corresponding non-transgenic endosperm. Preferably, the plant is fully male and female fertile, its pollen is essentially 100% viable, and its grain has a germination rate which is between 70% and 100% relative to corresponding wild-type grain. In an embodiment, the transgenic plant is a progeny plant at least two generations derived from an initial transgenic wheat plant, and is preferably homozygous for the transgenes. In embodiments, the monocotyledonous plant, or part thereof preferably a leaf, stem, grain or endosperm, is further characterised by one or more features as defined in the context of a cell or plant of the invention.

In an nineteenth aspect, the present invention provides a monocotyledonous plant, or part thereof preferably a leaf, a grain, stem or an endosperm, which comprises a) a first exogenous polynucleotide which encodes a transcription factor polypeptide that increases the expression of one or more glycolytic and/or fatty acid biosynthetic genes in the plant or part thereof, and
b) a second exogenous polynucleotide which encodes a polypeptide involved in the biosynthesis of one or more non-polar lipids, wherein each exogenous polynucleotide is operably linked to a promoter which is capable of directing expression of the polynucleotide in the plant or part thereof during growth of the plant.

Preferably, the promoter which directs expression of at least the first exogenous polynucleotide is a promoter other than a constitutive promoter.

In an embodiment, the starch content of the grain of a monocotyledonous plant of the invention is between about 70% and 100% on a weight basis relative to a wild-type grain when the plants from which they are obtained are grown under the same conditions. Preferred monocotyledonous plants in the above two aspects are wheat, rice, sorghum and corn (maize).

In an embodiment, the monocotyledonous plant, or part thereof, preferably a leaf, a grain or endosperm, of the invention comprises a) a first exogenous polynucleotide which encodes a transcription factor polypeptide that increases the expression of one or more glycolytic and/or fatty acid biosynthetic genes in the endosperm of the plant, and b) a second exogenous polynucleotide which encodes a polypeptide involved in the biosynthesis of one or more non-polar lipids, wherein at least one of the exogenous polynucleotides, preferably at least the first exogenous polynucleotide, is operably linked to a promoter which is expressed at a greater level in the endosperm relative to the leaves during growth of the plant.

In a preferred embodiment, the monocotyledonous plant or part thereof further comprises one or more or all of c) a third exogenous polynucleotide which encodes an oil body coating (OBC) polypeptide, preferably an LDAP, d) a first genetic modification which down-regulates endogenous production and/or activity of a polypeptide involved in the catabolism of triacylglycerols (TAG) in the plant or part thereof when compared to a corresponding plant or part thereof lacking the first genetic modification, e) a fourth exogenous polynucleotide which encodes a polypeptide which increases the export of fatty acids out of plastids of the plant or part thereof when compared to a corresponding plant or part thereof lacking the fourth exogenous polynucleotide, f) a second genetic modification which down-regulates endogenous production and/or activity of a polypeptide involved in importing fatty acids into plastids of the plant or part thereof when compared to a corresponding plant or part thereof lacking the second genetic modification, and g) a third genetic modification which down-regulates endogenous production and/or activity of a polypeptide involved in diacylglycerol (DAG) production in plastids of the plant or part thereof when compared to a corresponding plant or part thereof lacking the third genetic modification.

In an embodiment, the monocotyledonous plant comprises features a), b), one or both of d) and e), and optionally one of c), f) and g).

The monocotyledonous plant, or part thereof preferably a leaf, a grain, stem or an endosperm of the invention preferably has an increased level of monounsaturated fatty acids (MUFA) and/or a lower level of polyunsaturated fatty acids (PUFA) in both the total fatty acid content and in the TAG fraction of the total fatty acid content, such as for example an increased level of oleic acid and a reduced level of LA (18:2), when compared to a corresponding plant or part thereof lacking the genetic modifications and/or exogenous polynucleotide(s).

Preferably, the linoleic acid (LA, 18:2) level in the total fatty acid content of the grain or endosperm is reduced by at least 5% and/or the level of oleic acid in the total fatty acid content is increased by at least 5% relative to a corresponding wild-type plant or part thereof, preferably at least 10% or more preferably at least 15%, when compared to a corresponding plant or part thereof lacking the genetic modifications and/or exogenous polynucleotide(s).

The following embodiments apply to each of the plants and parts thereof of the fifteenth, sixteenth, seventeenth, eighteenth and nineteenth aspects.

In an embodiment, the polypeptide involved in the biosynthesis of one or more non-polar lipids is a DGAT or a PDAT and the OBC polypeptide is an oleosin. Alternatively, the OBC polypeptide is an LDAP.

In an embodiment, the transcription factor polypeptide that increases the expression of one or more glycolytic and/or fatty acid biosynthetic genes in the plant or part thereof is a WRI1 polypeptide and the polypeptide involved in the biosynthesis of one or more non-polar lipids is a DGAT or a PDAT.

In an embodiment, the transcription factor polypeptide that increases the expression of one or more glycolytic and/or fatty acid biosynthetic genes in the plant or part thereof is a WRI1 polypeptide, a LEC2 polypeptide, a LEC1 polypeptide or a LEC1-like polypeptide and the OBC polypeptide is an oleosin. Alternatively, the OBC polypeptide is an LDAP.

In an embodiment, the transcription factor polypeptide that increases the expression of one or more glycolytic and/or fatty acid biosynthetic genes in the plant or part thereof is a WRI1 polypeptide, a LEC2 polypeptide, a LEC1 polypeptide or a LEC1-like polypeptide, the polypeptide involved in the biosynthesis of one or more non-polar lipids is a DGAT or a PDAT and the OBC polypeptide is an oleosin. Alternatively, the OBC polypeptide is an LDAP.

In an embodiment, the plant or part thereof comprises two exogenous polynucleotides encoding two different transcription factor polypeptides that increase the expression of one or more glycolytic and/or fatty acid biosynthetic genes in the cell, such as WRI1 and LEC2, or WRI1 and LEC1.

In each of the embodiments of the cells, plants and parts thereof of the invention (including of the second, third, fourth, fifth, sixth, seventh, eighth, ninth, tenth, eleventh, twelfth, thirteenth, fourteenth, fifteenth sixteenth, seventeenth, eighteenth and nineteenth aspects), it is preferred that the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide, the polypeptide involved in the biosynthesis of one or more non-polar lipids is a DGAT or a PDAT and the polypeptide involved in the catabolism of triacylglycerols (TAG) in the cell is an SDP1 lipase.

In each of the embodiments of the cells, plants and parts thereof of the invention (including of the second, third, fifth, sixth, seventh, eighth, tenth, eleventh, twelfth, thirteenth, fourteenth, fifteenth, sixteenth, seventeenth, eighteenth and nineteenth aspects, but excluding the fifth and tenth aspects), it is preferred that the transcription factor polypeptide that increases the expression of one or more glycolytic and/or fatty acid biosynthetic genes in the cell is a WRI1 polypeptide, a LEC2 polypeptide, a LEC1 polypeptide or a LEC1-like polypeptide, the polypeptide involved in the biosynthesis of one or more non-polar lipids is a DGAT or a PDAT and the polypeptide which increases the export of fatty acids out of plastids of the cell is a fatty acid thioesterase, preferably a FATA or a FATB polypeptide, more preferably a FATA polypeptide or a fatty acid thioesterase other than a medium chain fatty acid thioesterase.

In each of the above embodiments of the cells, plants and parts thereof of the invention (including of the second, third, fourth, fifth, sixth, seventh, eighth, ninth, tenth, eleventh, twelfth, thirteenth, fourteenth, fifteenth, sixteenth seventeenth, eighteenth and nineteenth aspects), it is preferred that the transcription factor polypeptide that increases the expression of one or more glycolytic and/or fatty acid biosynthetic genes in the plant or part thereof is a combination of at least two polypeptides, preferably a WRI1 polypeptide and a LEC2 polypeptide. More preferably, said at least two transcription factor polypeptides are expressed from different promoters. Most preferably, the exogenous polynucleotides encoding said at least two polypeptides are linked on a single genetic construct integrated into the cell or plant genome.

In each of the above embodiments, when the plant is a dicotyledonous plant, said transcription factor may be a monocotyledonous plant transcription factor. Conversely, when the plant is a monocotyledonous plant, said transcription factor may be a dicotyledonous plant transcription factor. Said transcription factor is preferably a transcription factor other than *A. thaliana* WRI1 (SEQ ID NOs: 21 or 22).

In each of the above embodiments, it is preferred that the plant is a transgenic progeny plant at least two generations derived from an initial transgenic plant, and is preferably homozygous for the transgenes.

In further embodiments, additional genetic modifications in the plant or part thereof are as defined in the context of a cell of the invention.

In an embodiment, a plant, or part thereof, of the invention (including of the sixth, seventh, eighth, ninth, tenth, eleventh, twelfth, thirteenth, fourteenth, fifteenth, sixteenth seventeenth, eighteenth and nineteenth aspects) has one or more or all of the following features (where applicable);

i) the plant comprises a part, preferably a vegetative part, which has an increased synthesis of total fatty acids relative to a corresponding part lacking the first exogenous polynucleotide, or a decreased catabolism of total fatty acids relative to a corresponding part lacking the first exogenous polynucleotide, or both, such that it has an increased level of total fatty acids relative to a corresponding part lacking the first exogenous polynucleotide, ii) the plant comprises a part, preferably a vegetative part, which has an increased expression and/or activity of a fatty acyl acyltransferase which catalyses the synthesis of TAG, DAG or MAG, preferably TAG, relative to a corresponding part having the first exogenous polynucleotide and lacking the exogenous polynucleotide which encodes a polypeptide involved in the biosynthesis of one or more non-polar lipids, iii) the plant comprises a part, preferably a vegetative part, which has a decreased production of lysophosphatidic acid (LPA) from acyl-ACP and G3P in its plastids relative to a corresponding part having the first exogenous polynucleotide and lacking the genetic modification which down-regulates endogenous production and/or activity of a polypeptide involved in diacylglycerol (DAG) production in plastids in the plant part, iv) the plant comprises a part, preferably a vegetative part, which has an altered ratio of C16:3 to C18:3 fatty acids in its total fatty acid content and/or its galactolipid content relative to a corresponding part lacking the exogenous polynucleotide(s) and/or genetic modification(s), preferably a decreased ratio, v) a vegetative part of the plant comprises a total non-polar lipid content of at least about 8%, at least about 10%, at least about 11%, at least about 12%, at least about 15%, at least about 20%, at least about 25%, at least about 30%, at least about 35%, at least about 40%, at least about 45%, at least about 50%, at least about 55%, at least about 60%, at least about 65%, at least about 70%, between 8% and 75%, between 10% and 75%, between 11% and 75%, between about 15% and 75%, between about 20% and 75%, between about 30% and 75%, between about 40% and 75%, between about 50% and 75%, between about 60% and 75%, or between about 25% and 50% (w/w dry weight), preferably before flowering, vi) a vegetative part of the plant comprises a TAG content of at least about 8%, at least about 10%, at least about 11%, at least about 12%, at least about 15%, at least about 20%, at least about 25%, at least about 30%, at least about 35%, at least about 40%, at least about 45%, at least about 50%, at least about 55%, at least about 60%, at least about 65%, at least about 70%, between 8% and 75%, between 10% and 75%, between 11% and 75%, between about 15% and 75%, between about 20% and 75%, between about 30% and 75%, between about 40% and 75%, between about 50% and 75%, between about 60% and 75%, or between about 25% and 50% (w/w dry weight), preferably before flowering, vii) the transcription factor polypeptide(s) is selected from the group consisting of WRI1, LEC1, LEC1-like, LEC2, BBM, FUS3, ABI3, ABI4, ABI5, Dof4 and Dof11, preferably WRI1, LEC1 or LEC2, or the group consisting of MYB73, bZIP53, AGL15, MYB115, MYB118, TANMEI, WUS, GFR2a1, GFR2a2 and PHR1, viii) oleic acid comprises at least 20% (mol %), at least 22% (mol %), at least 30% (mol %), at least 40% (mol %), at least 50% (mol %), or at least 60% (mol %), preferably about 65% (mol %) or between 20% and about 65% of the total fatty acid content in the plant, or part thereof, ix) non-polar lipid in the plant, or part thereof preferably a vegetative part, comprises an increased level of one or more fatty acids which comprise a hydroxyl group, an epoxy group, a cyclopropane group, a double carbon-carbon bond, a triple carbon-carbon bond, conjugated double bonds, a branched chain such as a methylated or hydroxylated branched chain, or a combination of two or more thereof, or any of two, three, four, five or six of the aforementioned groups, bonds or branched chains, x) non-polar lipid in the plant, or part thereof preferably a vegetative part, comprises one or more polyunsaturated fatty acids selected from eicosadienoic acid (EDA), arachidonic acid (ARA), stearidonic acid (SDA), eicosatrienoic acid (ETE), eicosatetraenoic acid (ETA), eicosapentaenoic acid (EPA), docosapentaenoic acid (DPA), docosahexaenoic acid (DHA), or a combination of two of more thereof, xi) the part is a vegetative plant part, such as a leaf or a stem, or part thereof, xii) one or more or all of the promoters are selected from promoter other than a constitutive promoter, preferably a tissue-specific promoter such as a leaf and/or stem specific promoter, a developmentally regulated promoter such as a senescense-specific promoter such as a SAG12 promoter, an inducible promoter, or a circadian-rhythm regulated promoter, preferably wherein at least one of the promoters operably linked to an exogenous polynucleotide which encodes a transcription factor polypeptide is a promoter other than a constitutive promoter, xiii) the plant, or part thereof preferably a vegetative part, comprises a total fatty acid content which comprises medium chain fatty acids, preferably C12:0, C14:0 or both, at a level of at least 5% of the total fatty acid content and optionally an exogenous polynucleotide which encodes an LPAAT which has preferential activity for fatty acids with a medium chain length (C8 to C14), preferably C12:0 or C14:0, xiv) the plant, or part thereof preferably a vegetative part, comprises a total fatty acid content whose oleic acid level and/or palmitic acid level is increased by at least 2% relative to a corresponding plant, or part thereof, lacking the exogenous polynucleotide(s) and/or genetic modification(s), and/or whose α-linolenic acid (ALA) level and/or linoleic acid level is decreased by at least 2% relative to a corresponding plant, or part thereof, lacking the exogenous polynucleotide(s) and/or genetic modification(s), xv) non-polar lipid in the plant, or part thereof preferably a vegetative part, comprises a modified level of total sterols, preferably free (non-esterified) sterols, steroyl esters, steroyl glycosides, relative to the non-polar lipid in a corresponding plant, or part thereof, lacking the exogenous polynucleotide(s) and/or genetic modification(s), xvi) non-polar lipid in the plant, or part thereof, comprises waxes and/or wax esters, xvii) the plant, or part thereof preferably a vegetative part, is one member of a population or collection of at least about 1000 such plants, or parts thereof, xviii) the plant comprises an exogenous polynucleotide encoding a silencing suppressor, wherein the exogenous polynucleotide is operably linked to a promoter which is capable of directing expression of the polynucleotide in the plant, xix) the level of one or more non-polar lipid(s) and/or the total non-polar lipid content of the plant or part thereof, preferably a vegetative plant part, is at least 2% greater on a weight basis than in a corresponding plant or part, respectively, which comprises exogenous polynucleotides encoding an *Arabidposis thaliana* WRI1 (SEQ ID NO:21) and an *Arabidopsis thaliana* DGAT1 (SEQ ID NO:1), xx) a total polyunsaturated fatty acid (PUFA) content which is decreased relative to the total PUFA content of a corresponding plant lacking the exogenous polynucleotide(s) and/or genetic modification(s), xxi) the plant part is a potato (*Solanum tuberosum*) tuber, a sugarbeet (*Beta vulgaris*) beet, a sugarcane (*Saccharum* sp.) or sorghum (*Sorghum bicolor*) stem, a monocotyledonous plant seed having an increased total fatty acid content in its endosperm such as, for example, a wheat (*Triticum aestivum*) grain or a corn (*Zea mays*) kernel, a *Nicotiana* spp. leaf, or a legume seed having an increased total fatty acid content such as, for example, a *Brassica* sp. seed or a soybean (*Glycine max*) seed, xxii) if the plant part is a seed, the seed germinates at a rate substantially the same as for a corresponding wild-type seed or when sown in soil produces a plant whose seed germinate at a rate substantially the same as for corresponding wild-type seed, and xxiii) the plant is an algal plant such as from diatoms (bacillariophytes), green algae (chlorophytes), blue-green algae (cyanophytes), golden-brown algae (chrysophytes), haptophytes, brown algae or heterokont algae.

In the above embodiments, a preferred plant part is a leaf piece having a surface area of at least 1 $cm^2$ or a stem piece having a length of at least 1 cm.

In an embodiment of the above aspects, the plant or plant part has been treated so it is no longer able to be propagated or give rise to a living plant, i.e. it is dead. For example, the plant or plant part has been dried and/or ground.

In the above embodiments, it is preferred that the total non-polar lipid content of the plant part is at least 3% greater, more preferably at least 5% greater, than the total non-polar lipid content in a corresponding plant part transformed with genes encoding a WRI1 and a DGAT but lacking the other exogenous polynucleotides and genetic modifications as described herein for the above aspects. More preferably, that degree of increase is in a stem or root of the plant.

In an embodiment, the addition of one or more of the exogenous polynucleotides or genetic modifications, preferably the exogenous polynucleotide encoding an OBC or a fatty acyl thioesterase or the genetic modification which down-regulates endogenous production and/or activity of a polypeptide involved in the catabolism of triacylglycerols (TAG) in the plant, more preferably the exogenous polynucleotide which encodes a FATA thioesterase or an LDAP or which decreases expression of an endogenous TAG lipase such as a SDP1 TAG lipase in the plant, results in a synergistic increase in the total non-polar lipid content of the plant part when added to the pair of transgenes WRI1 and DGAT, particularly before the plant flowers and even more particularly in the stems and/or roots of the plant. For example, see Examples 8, 11 and 15. In a preferred embodiment, the increase in the TAG content of the stem or root of the plant is at least 2-fold, more preferably at least 3-fold, relative to a corresponding part transformed with genes encoding WRI1 and DGAT1 but lacking the FATA thioesterase, LDAP and the genetic modification which down-regulates endogenous production and/or activity of a polypeptide involved in the catabolism of triacylglycerols (TAG) in the plant. Most preferably, at least the promoter that directs expression of the first exogenous polynucleotide is a promoter other than a constitutive promoter.

In the embodiments of the sixth, seventh, eighth, ninth, tenth, eleventh, twelfth, thirteenth, fourteenth, sixteenth, eighteenth and nineteenth aspects, it is preferred that the plant or the part thereof is phenotypically normal, in that it is not significantly reduced in its ability to grow and reproduce when compared to an unmodified plant or part thereof. Preferably, the biomass, growth rate, germination rate, storage organ size, seed size and/or the number of viable seeds produced is not less than 90% of that of a corresponding wild-type plant when grown under identical conditions. In an embodiment, the plant is male and female fertile to the same extent as a corresponding wild-type plant and its pollen (if produced) is as viable as the pollen of the corresponding wild-type plant, preferably about 100% viable. In an embodiment, the plant produces seed which has a germination rate of at least 90% relative to the germination rate of corresponding seed of a wild-type plant, where the plant species produces seed. In an embodiment, the plant of the invention has a plant height which is at least 90% relative to the height of the corresponding wild-type plant grown under the same conditions. A combination of each of these features is envisaged. In an alternative embodiment, the plant of the invention has a plant height which is between 60% and 90% relative to the height of the corresponding wild-type plant grown under the same conditions. In an embodiment, the plant or part thereof of the invention, preferably a plant leaf, does not exhibit increased necrosis, i.e. the extent of necrosis, if present, is the same as that exhibited by a corresponding wild-type plant or part thereof grown under the same conditions and at the same stage of plant development. This feature applies in particular to the plant or part thereof comprising an exogenous polynucleotide which encodes a fatty acid thioesterase such as a FATB thioesterase.

The following embodiments apply to the plant, or part thereof, of the invention (including of the sixth, seventh, eighth, ninth, tenth, eleventh, twelfth, thirteenth, fourteenth, sixteenth, eighteenth and nineteenth aspects), as well as a method of producing the plant or part thereof or a method of using same. In an embodiment, the polypeptide involved in the biosynthesis of one or more non-polar lipids is a fatty acyl acyltransferase involved in the biosynthesis of TAG, DAG or monoacylglycerol (MAG) in the plant or part thereof, preferably of TAG in the plant or part thereof, such as a DGAT, PDAT, LPAAT, GPAT or MGAT, preferably a DGAT or a PDAT.

In another embodiment, the polypeptide involved in the catabolism of triacylglycerols (TAG) in the plant or plant part is an SDP1 lipase, a Cgi58 polypeptide, an acyl-CoA oxidase such as ACX1 or ACX2, or a polypeptide involved in β-oxidation of fatty acids in the plant such as a PXA1 peroxisomal ATP-binding cassette transporter, preferably an SDP1 lipase.

In an embodiment, the oil body coating (OBC) polypeptide is oleosin, such as a polyoleosin or a caleosin, or preferably a lipid droplet associated protein (LDAP).

In an embodiment, the polypeptide which increases the export of fatty acids out of plastids of the plant is a C16 or C18 fatty acid thioesterase such as a FATA polypeptide or a FATB polypeptide, a fatty acid transporter such as an ABCA9 polypeptide or a long-chain acyl-CoA synthetase (LACS).

In an embodiment, the polypeptide involved in importing fatty acids into plastids of the plant is a fatty acid transporter, or subunit thereof, preferably a TGD polypeptide such as, for example, a TGD1 polypeptide, a TGD2 polypeptide, a TGD3 polypeptide or a TGD4 polypeptide.

In an embodiment, the polypeptide involved in diacylglycerol (DAG) production in the plastid is a plastidial GPAT, a plastidial LPAAT or a plastidial PAP.

In an embodiment, the plant, or part thereof, of the invention is a 16:3 plant, or part thereof, and which comprises one or more or all of the following;

a) an exogenous polynucleotide which encodes a polypeptide which increases the export of fatty acids out of plastids of the plant when compared to a corresponding plant lacking the exogenous polynucleotide,
b) a first genetic modification which down-regulates endogenous production and/or activity of a polypeptide involved in importing fatty acids into plastids of the plant when compared to a corresponding plant lacking the first genetic modification, and
c) a second genetic modification which down-regulates endogenous production and/or activity of a polypeptide involved in diacylglycerol (DAG) production in the plastid when compared to a corresponding plant lacking the second genetic modification, wherein the exogenous polynucleotide is operably linked to a promoter which is capable of directing expression of the polynucleotide in the plant, or part thereof.

In an alternative embodiment, the plant, or part thereof, of the invention is a 18:3 plant or part thereof.

In an embodiment, before the plant flowers, a vegetative part of the plant comprises a total non-polar lipid content of at least about 8%, at least about 10%, about 11%, between 8% and 15%, or between 9% and 12% (w/w dry weight).

In an embodiment, one or more or all of the genetic modifications is a mutation of an endogenous gene which partially or completely inactivates the gene, such as a point mutation, an insertion, or a deletion (or a combination of one or more thereof), preferably an introduced mutation. The point mutation may be a premature stop codon, a splice-site mutation, a frame-shift mutation or an amino acid substitution mutation that reduces activity of the gene or the encoded polypeptide. The deletion may be of one or more nucleotides within a transcribed exon or promoter of the gene, or extend across or into more than one exon, or extend to deletion of the entire gene. Preferably the deletion is introduced by use of ZF, TALEN or CRISPR technologies. In an alternate embodiment, one or more or all of the genetic modifications is an exogenous polynucleotide encoding an RNA molecule which inhibits expression of the endogenous gene, wherein the exogenous polynucleotide is operably linked to a promoter which is capable of directing expression of the polynucleotide in the plant, or part thereof.

In an embodiment, the exogenous polynucleotide encoding WRI1 comprises one or more of the following:

i) nucleotides encoding a polypeptide comprising amino acids whose sequence is set forth as any one of SEQ ID NOs:21 to 75 or 205 to 210, or a biologically active fragment thereof, or a polypeptide whose amino acid sequence is at least 30% identical to any one or more of SEQ ID NOs: 21 to 75 or 205 to 210,
ii) nucleotides whose sequence is at least 30% identical to i), and
iii) nucleotides which hybridize to i) and/or ii) under stringent conditions. Preferably, the WRI1 polypeptide is a WRI1 polypeptide other than *Arabidopsis thaliana* WRI1 (SEQ ID NOs:21 or 22). More preferably, the WRI1 polypeptide comprises amino acids whose sequence is set forth as SEQ ID NO:208, or a biologically active fragment thereof, or a polypeptide whose amino acid sequence is at least 30% identical thereto.

In an embodiment, the total non-polar lipid content, or the one or more non-polar lipids, and/or the level of the oleic acid or a PUFA in the plant or part thereof is determinable by analysis by using gas chromatography of fatty acid methyl esters obtained from the plant or vegetative part thereof.

In a further embodiment, wherein the plant part is a leaf and the total non-polar lipid content of the leaf is determinable by analysis using Nuclear Magnetic Resonance (NMR).

In an embodiment, the plant, or part thereof, is a member of a population or collection of at least about 1000 such plants or parts.

In a further aspect, the present invention provides a population of at least about 1000 plants, each being a plant of the invention, growing in a field.

In another aspect, the present invention provides a collection of at least about 1000 vegetative plant parts, each being a vegetative plant part of the invention, wherein the vegetative plant parts have been harvested from plants growing in a field.

In an embodiment of the cell, non-human organism, plant or part thereof of the invention, the transcription factor polypeptide that increases the expression of one or more glycolytic and/or fatty acid biosynthetic genes in the cell is a WRI1 transcription factor, the polypeptide involved in the biosynthesis of one or more non-polar lipids is a DGAT such as a DGAT1 or a DGAT2, or a PDAT, and the polypeptide involved in the catabolism of triacylglycerols (TAG) in the cell is an SDP1 lipase. In a preferred embodiment, the oil body coating (OBC) polypeptide is an oleosin, the polypeptide which increases the export of fatty acids out of plastids of the cell is a fatty acid thioesterase such as a FATA or FATB thioesterase, the polypeptide involved in importing fatty acids into plastids of the cell is a TGD polypeptide, preferably a TGD1 polypeptide, and the polypeptide involved in diacylglycerol (DAG) production in the plastid is a plastidial GPAT. In a more preferred embodiment, the cell is in a vegetative plant part and the TAG content of the vegetative plant part prior to flowering of the plant is at least 8% (% dry weight).

In an embodiment, the plant, vegetative plant part, non-human organism or part thereof, seed or potato tuber comprises a first exogenous polynucleotide encoding a WRI1, a second exogenous polynucleotide encoding a DGAT or a PDAT, preferably a DGAT1, a third exogenous polynucleotide encoding an RNA which reduces expression of a gene encoding an SDP1 polypeptide, and a fourth exogenous polynucleotide encoding an oleosin. In preferred embodiments, the vegetative plant part, non-human organism or part thereof, seed or potato tuber has one or more or all of the following features:

i) a total lipid content of at least 8%, at least 10%, at least 12%, at least 14%, or at least 15.5% (% weight),
ii) at least a 3 fold, at least a 5 fold, at least a 7 fold, at least an 8 fold, or least a 10 fold, at higher total lipid content in the vegetative plant part or non-human organism relative to a corresponding vegetative plant part or non-human organism lacking the exogenous polynucleotides,
iii) a total TAG content of at least 5%, at least 6%, at least 6.5% or at least 7% (% weight of dry weight or seed weight),
iv) at least a 40 fold, at least a 50 fold, at least a 60 fold, or at least 70 fold, at least 100 fold, or at least a 120-fold higher total TAG content relative to a corresponding vegetative plant part or non-human organism lacking the exogenous polynucleotides,
v) oleic acid comprises at least 15%, at least 19% or at least 22% (% weight of dry weight or seed weight) of the fatty acids in TAG,
vi) at least a 10 fold, at least a 15 fold or at least a 17 fold higher level of oleic acid in TAG relative to a corresponding vegetative plant part or non-human organism lacking the exogenous polynucleotides,
vii) palmitic acid comprises at least 20%, at least 25%, at least 30% or at least 33% (% weight) of the fatty acids in TAG,
viii) at least a 1.5 fold higher level of palmitic acid in TAG relative to a corresponding vegetative plant part or non-human organism lacking the exogenous polynucleotides,
ix) linoleic acid comprises at least 22%, at least 25%, at least 30% or at least 34% (% weight) of the fatty acids in TAG,
x) α-linolenic acid comprises less than 20%, less than 15%, less than 11% or less than 8% (% weight) of the fatty acids in TAG,
xi) at least a 5 fold, or at least an 8 fold, lower level of α-linolenic acid in TAG relative to a corresponding vegetative plant part or non-human organism lacking the exogenous polynucleotides, and
xii) for a potato tuber, a TAG content of at least 0.5% on a dry weight basis and/or a total fatty acid content of at least 1%, preferably at least 1.5% or at least 2.0%, on a dry weight basis.

Also provided is seed of, or obtained from, a plant of the invention.

In another aspect, the invention provides a transgenic plant stem, or part of a stem of at least 1 g dry weight, whose TAG content is at least 5% on a weight basis (dry weight), preferably at least 6%, more preferably at least 7%. In an embodiment, the transgenic plant stem or stem part is of, or preferably harvested from, a dicotyledonous plant. Alternatively, the transgenic plant stem or stem part is of, or preferably harvested from, a monocotyledonous plant. In an embodiment, the plant stem or stem part is of or from a plant other than sugarcane. In embodiments, the plant stem or stem part is further characterised by one or more features as defined in the context of a cell or plant of the invention.

In another aspect, the invention provides a plant cell comprising a) a first exogenous polynucleotide which encodes a PDAT,
b) a first genetic modification which down-regulates endogenous production and/or activity of a polypeptide involved in importing fatty acids into plastids of the cell, preferably a TGD polypeptide, when compared to a corresponding cell lacking the first genetic modification, and one or more of
c) a second genetic modification which down-regulates endogenous production and/or activity of a polypeptide involved in the catabolism of triacylglycerols (TAG) in the cell, preferably an SDP1 polypeptide, when compared to a corresponding cell lacking the genetic modification,
d) a second exogenous polynucleotide which encodes a polypeptide which increases the export of fatty acids out of plastids of the cell, preferably a fatty acyl thioesterase, when compared to a corresponding cell lacking the second exogenous polynucleotide, and
e) a third genetic modification which down-regulates endogenous production and/or activity of a polypeptide involved in diacylglycerol (DAG) production in the plastid when compared to a corresponding cell lacking the third genetic modification, wherein each exogenous polynucleotide is operably linked to a promoter which is capable of directing expression of the polynucleotide in the cell. In a preferred embodiment, the presence in the cell of the first, second or third genetic modification or the second exogenous polynucleotide synergistically increases the total non-polar lipid content of the cell when compared to a corresponding cell having the PDAT but lacking the additional genetic modification or exogenous polynucleotide. More preferably, at least one of the exogenous polynucleotides is expressed from a promoter other than a constitutive promoter.

In another aspect, the present invention provides a process for obtaining a recombinant eukaryotic cell of the invention, the process comprising the steps of:

i) introducing into a eukaryotic cell at least one exogenous polynucleotide and/or at least one genetic modification as defined herein to produce a eukaryotic cell comprising a set of exogenous polynucleotides and/or genetic modifications as defined herein, ii) expressing the exogenous polynucleotide(s) in the cell or a progeny cell thereof, iii) analysing the lipid content of the cell or progeny cell, and iv) selecting a cell of the invention.

In an embodiment, the one or more exogenous polynucleotides are stably integrated into the genome of the cell or progeny cell.

In an embodiment, the process further comprises the step of regenerating a transgenic plant from the cell or progeny cell comprising the one or more exogenous polynucleotides.

In a further embodiment, the step of regenerating a transgenic plant is performed prior to the step of expressing the one or more exogenous polynucleotides in the cell or a progeny cell thereof, and/or prior to the step of analysing the lipid content of the cell or progeny cell, and/or prior to the step of selecting the cell or progeny cell having an increased level of one or more non-polar lipids.

In another embodiment, the process further comprises a step of obtaining seed or a progeny plant from the transgenic plant, wherein the seed or progeny plant comprises the one or more exogenous polynucleotides.

In yet another embodiment, the selected cell or regenerated plant therefrom, or a vegetative plant part or seed of the regenerated plant, has one or more of the features as defined herein.

In a further aspect, the present invention provides a method of producing a plant which has integrated into its genome a set of exogenous polynucleotides and/or genetic modifications as defined herein, the method comprising the steps of i) crossing two parental plants, wherein one plant comprises at least one of the exogenous polynucleotides and/or at least one genetic modifications as defined herein, and the other plant comprises at least one of the exogenous polynucleotides and/or at least one genetic modifications as defined herein, and wherein between them the two parental plants comprise a set of exogenous polynucleotides and/or genetic modifications as defined herein, ii) screening one or more progeny plants from the cross for the presence or absence of the set of exogenous polynucleotides and/or genetic modifications as defined herein, and iii) selecting a progeny plant which comprise the set of exogenous polynucleotides and/or genetic modifications as defined herein, thereby producing the plant.

Also provided is a transgenic cell or transgenic plant obtained using the process of the invention, or a part thereof, obtained therefrom which comprises the set of exogenous polynucleotides and/or genetic modifications as defined herein.

Also provided is the use of a set of exogenous polynucleotides and/or genetic modifications as defined herein for producing a transgenic cell, a transgenic non-human organism or a part thereof or a seed having an enhanced ability to produce one or more non-polar lipids relative to a corresponding cell, non-human organism or part thereof or seed lacking the set of exogenous polynucleotides and/or genetic modifications, wherein each exogenous polynucleotide is operably linked to a promoter that is capable of directing expression of the exogenous polynucleotide in the transgenic cell, transgenic non-human organism or a part thereof or seed.

Preferably, at least one of the promoters operably linked to an exogenous polynucleotide which encodes a transcription factor polypeptide is a promoter other than a constitutive promoter.

In an embodiment, the transgenic cell, non-human organism or part thereof, or seed comprises one or more of the features defined herein.

In a further aspect, the present invention provides a process for producing an industrial product, the process comprising the steps of:

i) obtaining a recombinant eukaryotic cell of the invention, a transgenic non-human organism or a part thereof of the invention, a transgenic plant or part thereof of the invention, a seed of the invention, or a transgenic cell or transgenic plant or part thereof of the invention, and ii) converting at least some of the lipid in the cell, non-human organism or part thereof, plant or part thereof, or seed, to the industrial product by applying heat, chemical, or enzymatic means, or any combination thereof, to the lipid in situ in the non-human organism or part thereof, and iii) recovering the industrial product, thereby producing the industrial product.

In a further aspect, the present invention provides a process for producing an industrial product, the process comprising the steps of:

i) obtaining a recombinant eukaryotic cell of the invention, a transgenic non-human organism or a part thereof of the invention, a transgenic plant or part thereof of the invention, a seed of the invention, or a transgenic cell or transgenic plant or part thereof of the invention, and ii) physically processing the cell, non-human organism or part thereof, plant or part thereof or seed of step i), iii) simultaneously or subsequently converting at least some of the lipid in the processed cell, non-human organism or part thereof, plant or part thereof, or seed, to the industrial product by applying heat, chemical, or enzymatic means, or any combination thereof, to the lipid in the processed cell, non-human organism or part thereof, plant or part thereof, or seed, and iv) recovering the industrial product, thereby producing the industrial product.

In an embodiment, of the two above aspects, the plant part is a vegetative plant part.

In a further aspect, the present invention provides a process for producing an industrial product, the process comprising the steps of:

i) obtaining a vegetative plant part having a total non-polar lipid content of at least about 18%, at least about 20%, at least about 25%, at least about 30%, at least about 35%, at least about 40%, at least about 45%, at least about 50%, at least about 55%, at least about 60%, at least about 65%, at least about 70%, between 18% and 75%, between about 20% and 75%, between about 30% and 75%, between about 40% and 75%, between about 50% and 75%, between about 60% and 75%, or between about 25% and 50% (w/w dry weight), ii) converting at least some of the lipid in the vegetative plant part to the industrial product by applying heat, chemical, or enzymatic means, or any combination thereof, to the lipid in situ in the vegetative plant part, and iii) recovering the industrial product, thereby producing the industrial product.

In another aspect, the present invention provides a process for producing an industrial product, the process comprising the steps of:

i) obtaining a vegetative plant part having a total non-polar lipid content of at least about 18%, at least about 20%, at least about 25%, at least about 30%, at least about 35%, at least about 40%, at least about 45%, at least about 50%, at least about 55%, at least about 60%, at least about 65%, at least about 70%, between 18% and 75%, between about 20% and 75%, between about 30% and 75%, between about 40% and 75%, between about 50% and 75%, between about 60% and 75%, or between about 25% and 50% (w/w dry weight),
ii) physically processing the vegetative plant part of step i),
iii) simultaneously or subsequently converting at least some of the lipid in the processed vegetative plant part to the industrial product by applying heat, chemical, or enzymatic means, or any combination thereof, to the lipid in the processed vegetative plant part, and
iv) recovering the industrial product, thereby producing the industrial product.

In yet a further aspect, the present invention provides a process for producing an industrial product, the process comprising the steps of:

i) obtaining a vegetative plant part having a total non-polar lipid content of at least about 11%, at least about 12%, at least about 15%, at least about 20%, at least about 25%, at least about 30%, at least about 35%, at least about 40%, at least about 45%, at least about 50%, at least about 55%, at least about 60%, at least about 65%, at least about 70%, between 8% and 75%, between 10% and 75%, between 11% and 75%, between about 15% and 75%, between about 20% and 75%, between about 30% and 75%, between about 40% and 75%, between about 50% and 75%, between about 60% and 75%, or between about 25% and 50% (w/w dry weight), wherein the plant is a 16:3 plant or vegetative part thereof,
ii) converting at least some of the lipid in the vegetative plant part to the industrial product by applying heat, chemical, or enzymatic means, or any combination thereof, to the lipid in situ in the vegetative plant part, and
iii) recovering the industrial product, thereby producing the industrial product.

In another aspect, the present invention provides a process for producing an industrial product, the process comprising the steps of:

i) obtaining a vegetative plant part having a total non-polar lipid content of at least about 11%, at least about 12%, at least about 15%, at least about 20%, at least about 25%, at least about 30%, at least about 35%, at least about 40%, at least about 45%, at least about 50%, at least about 55%, at least about 60%, at least about 65%, at least about 70%, between 8% and 75%, between 10% and 75%, between 11% and 75%, between about 15% and 75%, between about 20% and 75%, between about 30% and 75%, between about 40% and 75%, between about 50% and 75%, between about 60% and 75%, or between about 25% and 50% (w/w dry weight), wherein the plant is a 16:3 plant or vegetative part thereof,
ii) physically processing the vegetative plant part of step i),
iii) simultaneously or subsequently converting at least some of the lipid in the processed vegetative plant part to the industrial product by applying heat, chemical, or enzymatic means, or any combination thereof, to the lipid in the processed vegetative plant part, and
iv) recovering the industrial product, thereby producing the industrial product.

In an embodiment, the step of physically processing the cell, non-human organism or part thereof, plant or part thereof, or seed comprises one or more of rolling, pressing, crushing or grinding the cell, non-human organism or part thereof, plant or part thereof, or seed.

In an embodiment, the process comprises the steps of:

(a) extracting at least some of the non-polar lipid content of the cell, non-human organism or part thereof, plant or part thereof, or seed as non-polar lipid, and
(b) recovering the extracted non-polar lipid, wherein steps (a) and (b) are performed prior to the step of converting at least some of the lipid in the cell, non-human organism or part thereof, plant or part thereof, or seed to the industrial product.

In an embodiment, the extracted non-polar lipid comprises triacylglycerols, wherein the triacylglycerols comprise at least 90%, preferably at least 95%, of the extracted lipid.

In an embodiment, the industrial product is a hydrocarbon product such as fatty acid esters, preferably fatty acid methyl esters and/or a fatty acid ethyl esters, an alkane such as methane, ethane or a longer-chain alkane, a mixture of longer chain alkanes, an alkene, a biofuel, carbon monoxide and/or hydrogen gas, a bioalcohol such as ethanol, propanol, or butanol, biochar, or a combination of carbon monoxide, hydrogen and biochar. In a preferred embodiment, the total fatty acid content of the vegetative plant part comprises at least 5% C12:0, C14:0 or the sum of C12:0 and C14:0 is at least 5% of the total fatty acid content and the industrial product produced from the lipid in the vegetative plant part is a component in an aviation fuel.

In a further aspect, the present invention provides a process for producing extracted lipid, the process comprising the steps of:

i) obtaining a recombinant eukaryotic cell of the invention, a transgenic non-human organism or a part thereof of the invention, a transgenic plant or part thereof of the invention, a seed of the invention, or a transgenic cell or transgenic plant or part thereof of the invention,
ii) extracting lipid from the cell, non-human organism or part thereof, plant or part thereof or seed, and
iii) recovering the extracted lipid, thereby producing the extracted lipid.

In a further aspect, the present invention provides a process for producing extracted lipid, the process comprising the steps of:

i) obtaining a vegetative plant part having a total non-polar lipid content of at least about 18%, at least about 20%, at least about 25%, at least about 30%, at least about 35%, at least about 40%, at least about 45%, at least about 50%, at least about 55%, at least about 60%, at least about 65%, at least about 70%, between 18% and 75%, between about 20% and 75%, between about 30% and 75%, between about 40% and 75%, between about 50% and 75%, between about 60% and 75%, or between about 25% and 50% (w/w dry weight),
ii) extracting lipid from the vegetative plant part, and
iii) recovering the extracted lipid, thereby producing the extracted lipid.

In a further aspect, the present invention provides a process for producing extracted lipid, the process comprising the steps of:

i) obtaining a vegetative plant part having a total non-polar lipid content of at least about 11%, at least about 12%, at least about 15%, at least about 20%, at least about 25%, at least about 30%, at least about 35%, at least about 40%, at least about 45%, at least about 50%, at least about 55%, at least about 60%, at least about 65%, at least about 70%, between 8% and 75%, between 10% and 75%, between 11% and 75%, between about 15% and 75%, between about 20% and 75%, between about 30% and 75%, between about 40% and 75%, between about 50% and 75%, between about 60% and 75%, or between about 25% and 50% (w/w dry weight), wherein the plant is a 16:3 plant or vegetative part thereof, ii) extracting lipid from the vegetative plant part, and iii) recovering the extracted lipid, thereby producing the extracted lipid.

In an embodiment, a process of extraction of the comprises one or more of drying, rolling, pressing, crushing or grinding the cell, non-human organism or part thereof, plant or part thereof, or seed, and/or purifying the extracted lipid or seedoil.

In an embodiment, the process uses an organic solvent in the extraction process to extract the oil.

In a further embodiment, the process comprises recovering the extracted lipid or oil by collecting it in a container and/or one or more of degumming, deodorising, decolourising, drying, fractionating the extracted lipid or oil, removing at least some waxes and/or wax esters from the extracted lipid or oil, or analysing the fatty acid composition of the extracted lipid or oil.

In an embodiment, the volume of the extracted lipid or oil is at least 1 litre.

In a further embodiment, one or more or all of the following features apply:

(i) the extracted lipid or oil comprises triacylglycerols, wherein the triacylglycerols comprise at least 90%, preferably at least 95% or at least 96%, of the extracted lipid or oil, (ii) the extracted lipid or oil comprises free sterols, steroyl esters, steroyl glycosides, waxes or wax esters, or any combination thereof, and (iii) the total sterol content and/or composition in the extracted lipid or oil is significantly different to the sterol content and/or composition in the extracted lipid or oil produced from a corresponding cell, non-human organism or part thereof, plant or part thereof, or seed.

In an embodiment, the process further comprises converting the extracted lipid or oil to an industrial product.

In an embodiment, the industrial product is a hydrocarbon product such as fatty acid esters, preferably fatty acid methyl esters and/or a fatty acid ethyl esters, an alkane such as methane, ethane or a longer-chain alkane, a mixture of longer chain alkanes, an alkene, a biofuel, carbon monoxide and/or hydrogen gas, a bioalcohol such as ethanol, propanol, or butanol, biochar, or a combination of carbon monoxide, hydrogen and biochar. In a preferred embodiment, the total fatty acid content of the vegetative plant part comprises at least 5% C12:0, C14:0 or the sum of C12:0 and C14:0 is at least 5% of the total fatty acid content and the industrial product produced from the lipid in the vegetative plant part is a component in an aviation fuel.

In a further embodiment, the plant part is an aerial plant part or a green plant part, preferably a vegetative plant part such as a plant leaf or stem. In an alternative embodiment, the plant part is a tuber or beet, such as a potato (*Solanum tuberosum*) tuber or a sugar beet.

In yet a further embodiment, the process further comprises a step of harvesting the cell, non-human organism or part thereof, plant or part thereof such as a tuber or beet, or seed, preferably with a mechanical harvester, or by a process comprising filtration, centrifugation, sedimentation, flotation or flocculation of algal or fungal organisms.

In another embodiment, the level of a lipid in the cell, non-human organism or part thereof, plant or part thereof, or seed and/or in the extracted lipid or oil is determinable by analysis by using gas chromatography of fatty acid methyl esters prepared from the extracted lipid or oil.

In yet another embodiment, the process further comprises harvesting the part from a plant.

In an embodiment, the plant part is a vegetative plant part which comprises a total non-polar lipid content of at least about 18%, at least about 20%, at least about 25%, at least about 30%, at least about 35%, at least about 40%, at least about 45%, at least about 50%, at least about 55%, at least about 60%, at least about 65%, at least about 70%, between 18% and 75%, between about 20% and 75%, between about 30% and 75%, between about 40% and 75%, between about 50% and 75%, between about 60% and 75%, or between about 25% and 50% (w/w dry weight).

In a further embodiment, the plant part is a vegetative plant part which comprises a total TAG content of at least about 18%, at least about 20%, at least about 25%, at least about 30%, at least about 35%, at least about 40%, at least about 45%, at least about 50%, at least about 55%, at least about 60%, at least about 65%, at least about 70%, between 18% and 75%, between about 20% and 75%, between about 30% and 75%, between about 40% and 75%, between about 50% and 75%, between about 60% and 75%, or between about 25% and 50% (w/w dry weight).

In another embodiment, the plant part is a vegetative plant part which comprises a total non-polar lipid content of at least about 11%, at least about 12%, at least about 15%, at least about 20%, at least about 25%, at least about 30%, at least about 35%, at least about 40%, at least about 45%, at least about 50%, at least about 55%, at least about 60%, at least about 65%, at least about 70%, between 8% and 75%, between 10% and 75%, between 11% and 75%, between about 15% and 75%, between about 20% and 75%, between about 30% and 75%, between about 40% and 75%, between about 50% and 75%, between about 60% and 75%, or between about 25% and 50% (w/w dry weight), and wherein the vegetative plant part is from a 16:3 plant.

In yet another embodiment, the plant part is a vegetative plant part which comprises a total TAG content of at least about 11%, at least about 12%, at least about 15%, at least about 20%, at least about 25%, at least about 30%, at least about 35%, at least about 40%, at least about 45%, at least about 50%, at least about 55%, at least about 60%, at least about 65%, at least about 70%, between 8% and 75%, between 10% and 75%, between 11% and 75%, between about 15% and 75%, between about 20% and 75%, between about 30% and 75%, between about 40% and 75%, between about 50% and 75%, between about 60% and 75%, or between about 25% and 50% (w/w dry weight), and wherein the vegetative plant part is from a 16:3 plant.

Also provided is a process for producing seed, the process comprising:

i) growing a plant of the invention, and ii) harvesting seed from the plant.

In an embodiment, the above process comprises growing a population of at least about 1000 plants, each being a plant of the invention, and harvesting seed from the population of plants.

In yet a further aspect, the present invention provides a fermentation process comprising the steps of:

i) providing a vessel containing a liquid composition comprising a recombinant eukaryotic cell of the invention, or the transgenic non-human organism of the invention, wherein the cell or non-human organism is suitable for fermentation, and constituents required for fermentation and fatty acid biosynthesis, and ii) providing conditions conducive to the fermentation of the liquid composition contained in said vessel.

Also provided is recovered or extracted lipid obtainable from a recombinant eukaryotic cell of the invention, a transgenic non-human organism or a part thereof of the invention, a transgenic plant or part thereof of the invention, a seed of the invention, or a transgenic cell or transgenic plant or part thereof of the invention, or obtainable by the process of the invention.

In a further aspect, the present invention provides an industrial product produced by the process of the invention, which is a hydrocarbon product such as fatty acid esters, preferably fatty acid methyl esters and/or a fatty acid ethyl esters, an alkane such as methane, ethane or a longer-chain alkane, a mixture of longer chain alkanes, an alkene, a biofuel, carbon monoxide and/or hydrogen gas, a bioalcohol such as ethanol, propanol, or butanol, biochar, or a combination of carbon monoxide, hydrogen and biochar.

Also provided is the use of a recombinant eukaryotic cell of the invention, a transgenic non-human organism or a part thereof of the invention, a transgenic plant or part thereof of the invention, a seed of the invention, or a transgenic cell or transgenic plant or part thereof of the invention, or the recovered or extracted lipid of the invention for the manufacture of an industrial product.

Examples of industrial products of the invention include, but are not limited to, a hydrocarbon product such as fatty acid esters, preferably fatty acid methyl esters and/or a fatty acid ethyl esters, an alkane such as methane, ethane or a longer-chain alkane, a mixture of longer chain alkanes, an alkene, a biofuel, carbon monoxide and/or hydrogen gas, a bioalcohol such as ethanol, propanol, or butanol, biochar, or a combination of carbon monoxide, hydrogen and biochar.

In a further aspect, the present invention provides a process for producing fuel, the process comprising:

i) reacting the lipid of the invention with an alcohol, optionally, in the presence of a catalyst, to produce alkyl esters, and ii) optionally, blending the alkyl esters with petroleum based fuel.

In an embodiment of the above process, the alkyl esters are methyl esters.

In yet a further aspect, the present invention provides a process for producing a synthetic diesel fuel, the process comprising:

i) converting the lipid in a recombinant eukaryotic cell of the invention, a transgenic non-human organism or a part thereof of the invention, a transgenic plant or part thereof of the invention, a seed of the invention, or a transgenic cell or transgenic plant or part thereof of the invention, to a bio-oil by a process comprising pyrolysis or hydrothermal processing or to a syngas by gasification, and ii) converting the bio-oil to synthetic diesel fuel by a process comprising fractionation, preferably selecting hydrocarbon compounds which condense between about 150° ° C. to about 200° C. or between about 200° ° C. to about 300° ° C., or converting the syngas to a biofuel using a metal catalyst or a microbial catalyst.

In another aspect, the present invention provides a process for producing a biofuel, the process comprising converting the lipid in a recombinant eukaryotic cell of the invention, a transgenic non-human organism or a part thereof of the invention, a transgenic plant or part thereof of the invention, a seed of the invention, or a transgenic cell or transgenic plant or part thereof of the invention to bio-oil by pyrolysis, a bioalcohol by fermentation, or a biogas by gasification or anaerobic digestion.

In an embodiment of the above process, the part is a vegetative plant part.

Also provided is a process for producing a feedstuff, the process comprising admixing a recombinant eukaryotic cell of the invention, a transgenic non-human organism or a part thereof of the invention, a transgenic plant or part thereof of the invention, a seed of the invention, or a transgenic cell or transgenic plant or part thereof of the invention, or obtainable by the process of the invention, or an extract or portion thereof, with at least one other food ingredient.

In a further aspect, the present invention provides feedstuffs, cosmetics or chemicals comprising a recombinant eukaryotic cell of the invention, a transgenic non-human organism or a part thereof of the invention, a transgenic plant or part thereof of the invention, a seed of the invention, or a transgenic cell or transgenic plant or part thereof of the invention, or obtainable by the process of the invention, or an extract or portion thereof.

In another aspect, the present invention provides a process for feeding an animal, the process comprising providing to the animal the transgenic plant or part thereof of the invention, a seed of the invention, or transgenic plant or part thereof of the invention, or the recovered or extracted lipid of the invention.

Any embodiment herein shall be taken to apply mutatis mutandis to any other embodiment unless specifically stated otherwise.

The present invention is not to be limited in scope by the specific embodiments described herein, which are intended for the purpose of exemplification only. Functionally-equivalent products, compositions and methods are clearly within the scope of the invention, as described herein.

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or group of compositions of matter.

The invention is hereinafter described by way of the following non-limiting Examples and with reference to the accompanying figures.

BRIEF DESCRIPTION OF THE ACCOMPANYING DRAWINGS

FIG. 1. A representation of lipid synthesis in eukaryotic cells, showing export of some of the fatty acids synthesized in the plastids to the Endoplasmic Reticulum (ER) via the Plastid Associated Membrane (PLAM), and import of some of the fatty acids into the plastid from the ER for eukaryotic galactolipid synthesis. Abbreviations:

Acetyl-CoA and Malonyl-CoA: acetyl-coenzyme A and malonyl-coenzymeA;

ACCase: Acetyl-CoA carboxylase;

FAS: fatty acid synthase complex;

16:0-ACP, 18:0-ACP and 18:1-ACP: C16:0-acyl carrier protein (ACP), C18:0-acyl carrier protein, C18:1-acyl carrier protein;

KAS II: ketoacyl-ACP synthase II (EC 2.3.1.41);

PLPAAT: plastidial LPAAT;
PGPAT: plastidial GPAT;
PAP: PA phosphorylase (EC 3.1.3.4);
G3P: glycerol-3-phosphate;
LPA: lysophosphatidic acid;
PA: phosphatidic acid;
DAG: diacylglycerol;
TAG: triacylglycerol;
Acyl-CoA and Acyl-PC: acyl-coenzyme A and acyl-phosphatidylcholine;
PC: phosphatidylcholine;
GPAT: glycerol-3-phosphate acyltransferase;
LPAAT: lysophosphatidic acid acyltransferase (EC 2.3.1.51);
LPCAT: acyl-CoA:lysophosphatidylcholine acyltransferase; or synonyms 1-acylglycerophosphocholine O-acyltransferase; acyl-CoA: 1-acyl-sn-glycero-3-phosphocholine O-acyltransferase (EC 2.3.1.23);
CPT: CDP-choline:diacylglycerol cholinephosphotransferase; or synonyms 1-alkyl-2-acetylglycerol cholinephosphotransferase; alkylacylglycerol cholinephosphotransferase; cholinephosphotransferase; phosphorylcholine-glyceride transferase (EC 2.7.8.2);
PDCT: phosphatidylcholine:diacylglycerol cholinephosphotransferase;
PLC: phospholipase C (EC 3.1.4.3);
PLD: Phospholipase D; choline phosphatase; lecithinase D;
lipophosphodiesterase II (EC 3.1.4.4);
PDAT: phospholipid:diacylglycerol acyltransferase; or synonym phospholipid: 1,2-diacyl-sn-glycerol O-acyltransferase (EC 2.3.1.158);
FAD2: fatty acid Δ12-desaturase; FAD3, fatty acid Δ15-desaturase;
UDP-Gal: Uridine diphosphate galactose;
MGDS: monogalactosyldiacylglycerol synthase;
MGDG: monogalactosyldiacylglycerol; DGDG: digalactosyldiacylglycerol
FAD6, 7, 8: plastidial fatty acid Δ12-desaturase, plastidial ω3-desaturase, plastidial ω3-desaturase induced at low temperature, respectively.

Figure 2:
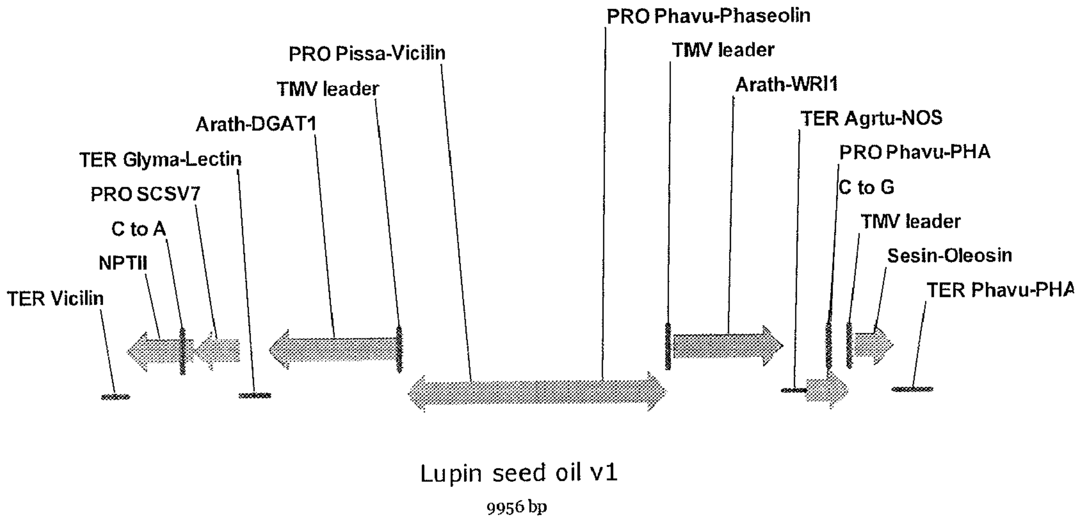

FIG. 2. Schematic genetic map of construct to increase seed oil content in dicotyledonous plants. Abbreviations: PRO Pissa-Vicilin, *Pisum sativum* vicilin promoter and 5' UTR; TMV leader, 5'UTR of tobacco mosaic virus; Arath-DGAT1, protein coding region encoding *A. thaliana* DGAT1; TER Glyma-Lectin, 3' terminator/polyadenylation region of a *G. max* lectin gene; PRO Phavu-Phaseolin, promoter from a *Phaseolus vulgaris* phaseolin protein gene; Arath-WRI1, protein coding region encoding *A. thaliana* WRI1; TER Agrtu-NOS, 3' terminator/polyadenylation region of an *Agrobacterium tumefaciens* Nos gene; PRO Phavu-PHA, promoter of a *Phaseolus vulgaris* phaseolin gene; Sesin-Oleosin, protein coding region encoding a *Sesame indicum* oleosin gene; TER Phavu-PHA, 3' terminator/polyadenylation region of a *Phaseolus vulgaris* phaseolin gene.

Figure 3:
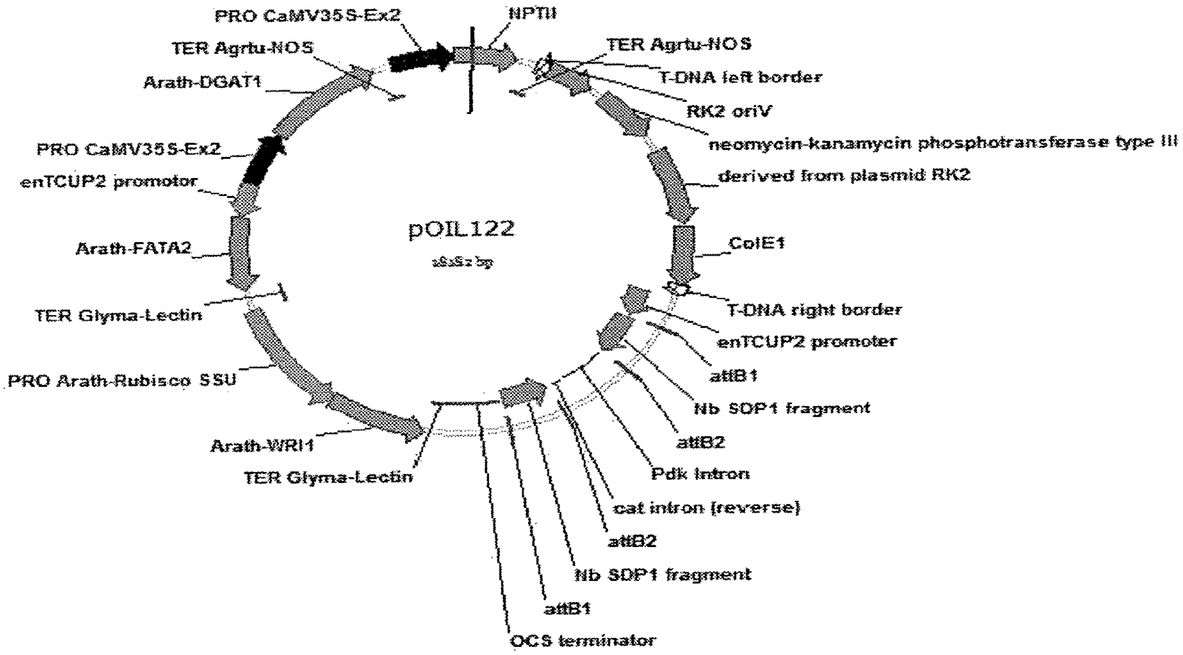

FIG. 3. Schematic diagram of vector pOIL122. Abbreviations: TER Agrtu-Nos, *Agrobacterium tumefaciens* nopaline synthase terminator; NPTII, neomycin phosphotransferase protein coding region; PRO CaMV35S-Ex2, Cauliflower Mosaic Virus 35S promoter with double enhancer region; Arath-DGAT1, *Arabidopsis thaliana* DGAT1 acyltransferase protein coding region; PRO Arath-Rubisco SSU, *A. thaliana* Rubisco small subunit promoter; Arath-FATA2, *A. thaliana* FATA2 thioesterase protein coding region; Arath-WRI, *A. thaliana* WRI1 transcription factor protein coding region; TER Glyma-Lectin, *Glycine max* lectin terminator; enTCUP2 promoter, *Nicotiana tabacum* cryptic constitutive promoter; attB1 and attB2, Gateway recombination sites; NB SDP1 fragment, *Nicotiana benthamiana* SDP1 region targeted for hpRNAi silencing; OCS terminator, *A. tumefaciens* octopine synthase terminator. Backbone features outside the T-DNA region are derived from pORE04 (Coutu et al., 2007).

Figure 4:
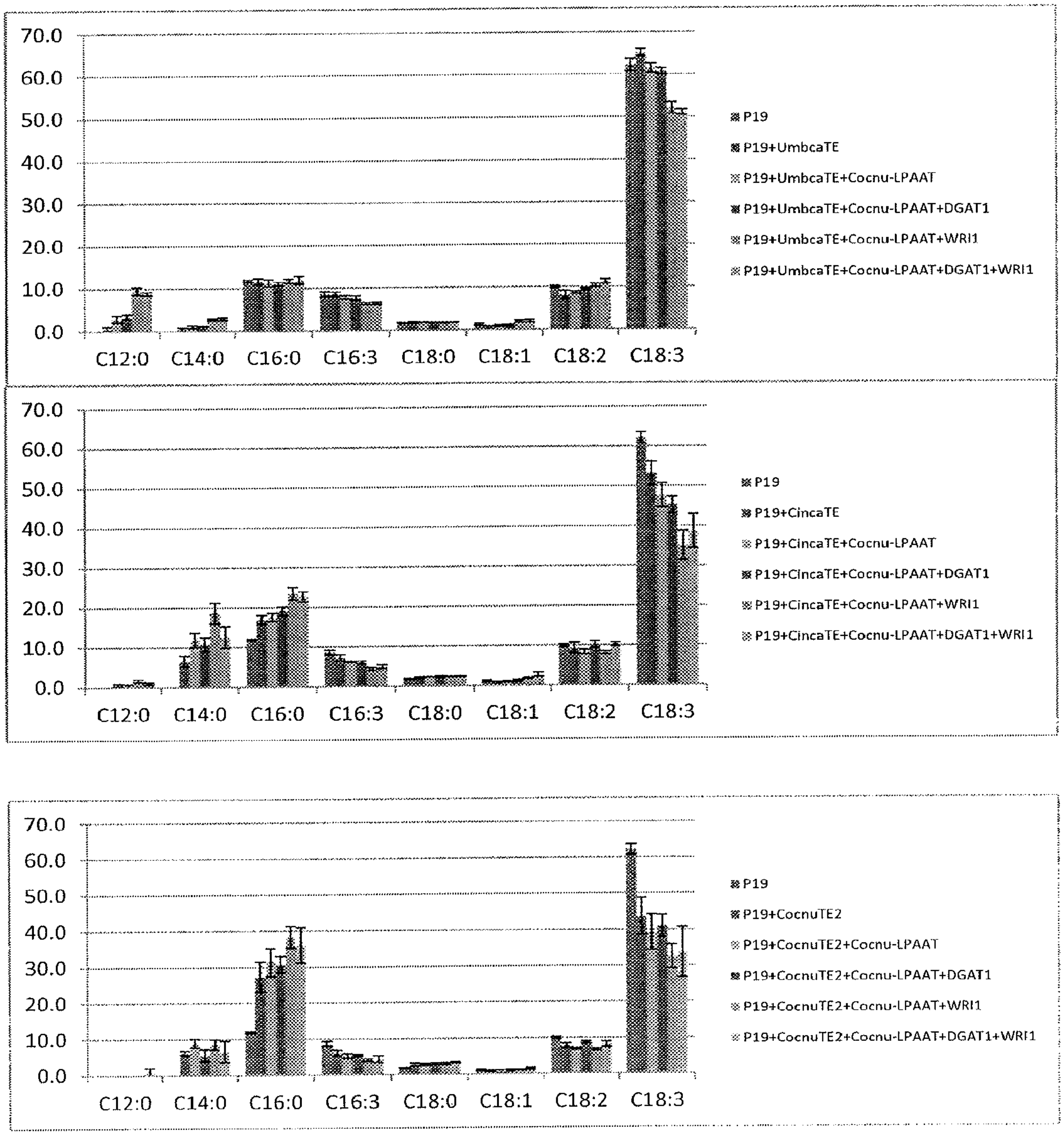

FIG. 4. Total fatty acid methyl ester (FAME) profiles (weight %) illustrating the effect of WRI1+DGAT1-mediated high oil background on MCFA production in *Nicotiana benthamiana* leaf (n=4). Highest MCFA production was observed after the addition of Arath-WRI1.

Figure 5:
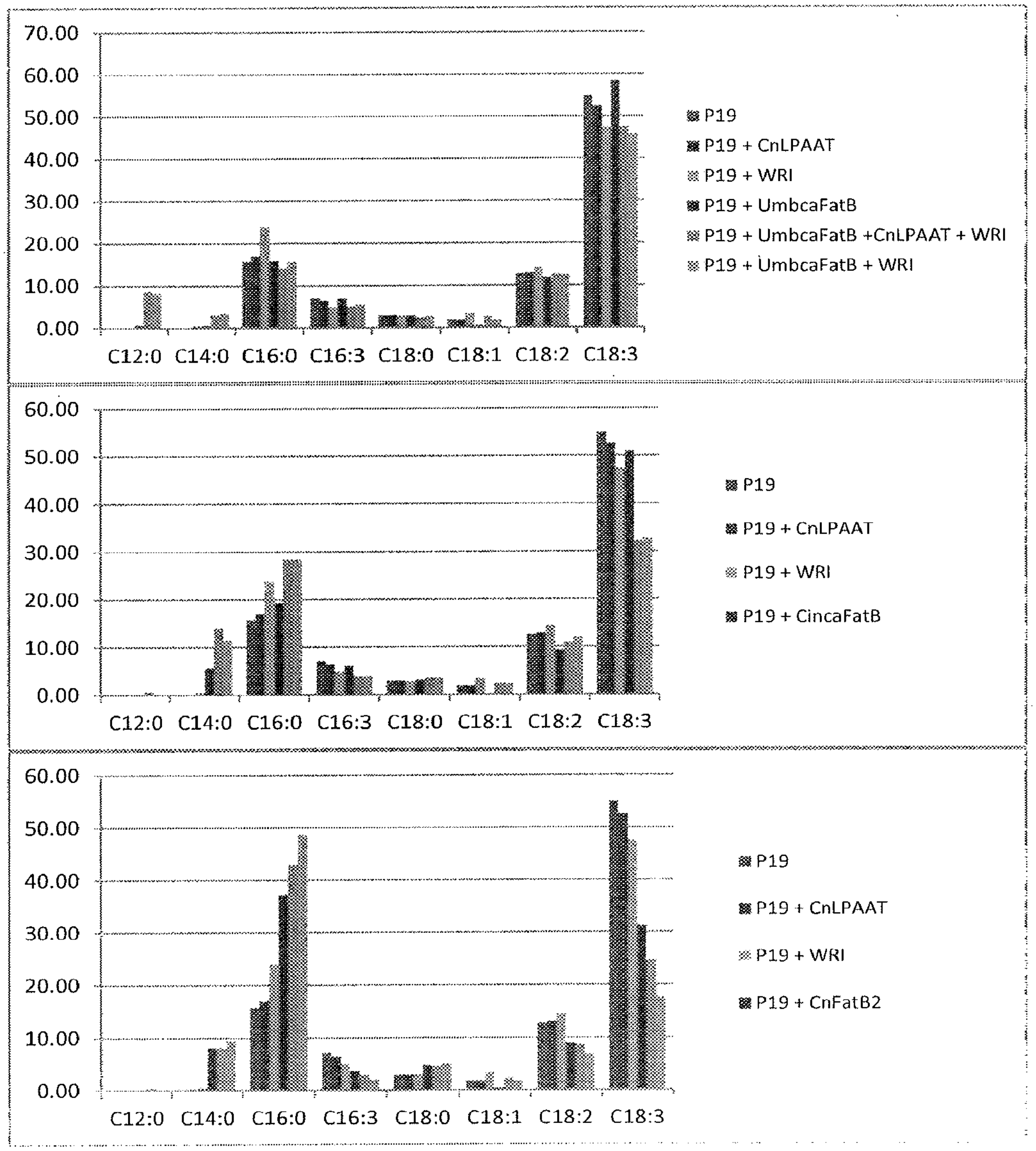

FIG. 5. Leaf total FAME profiles (weight %) elucidating the effect of WRI1 on MCFA accumulation (n=4). Addition of Arath-WRI1 greatly increased the production of the relevant fatty acid (C12:0, C14:0 or C16:0) relative to the previous addition of Cocnu-LPAAT alone.

Figure 6:
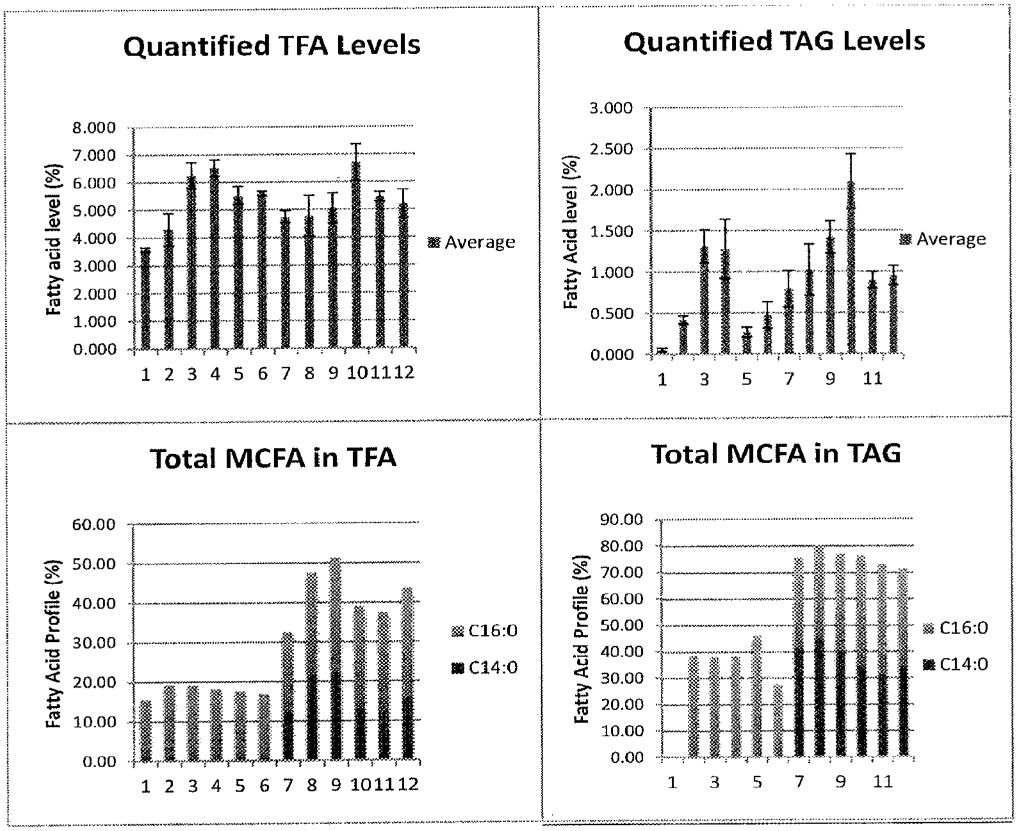

FIG. 6. TFA levels (% weight), TAG levels, levels of MCFA (C16:0 and C14:0, % of total fatty acids) in TFA and MCFA in TAG (% of total fatty acid content in TAG) in plant cells after expression of combinations of three oil palm DGATs with FATB, LPAAT and WRI1. Numbers 1-10 are as listed in the text (Example 9).

Figure 7:
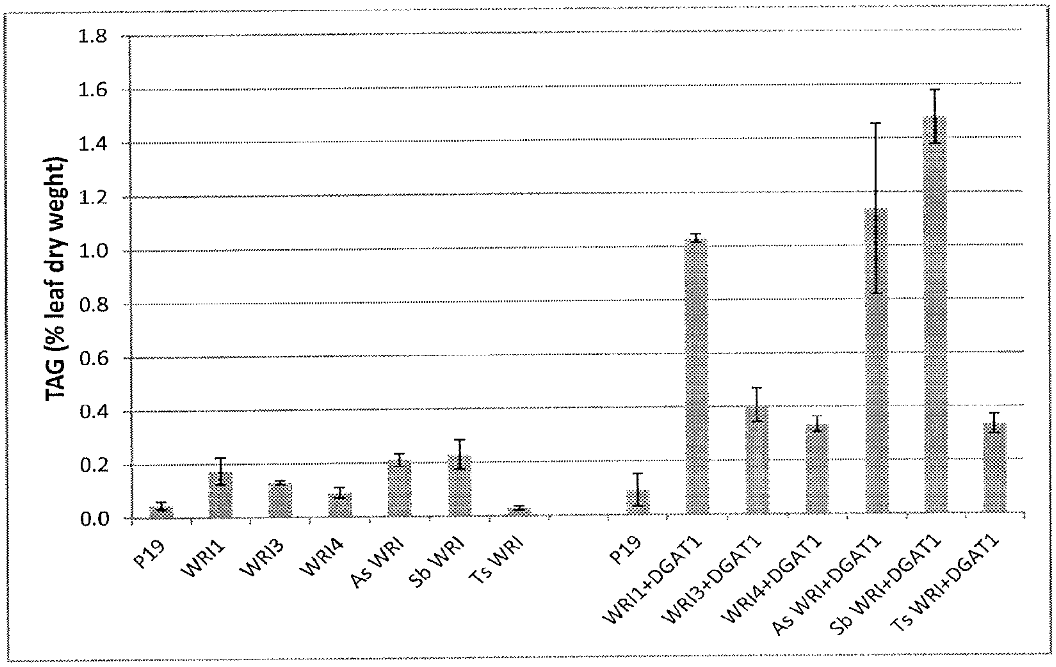

FIG. 7. TAG levels (% leaf dry weight) in *N. benthamiana* leaf tissue, infiltrated with genes encoding different WRI1 polypeptides either with (right hand bars) or without (left hand bars) co-expression of DGAT1 (n=3). All samples were infiltrated with the P19 construct as well.

Figure 8:
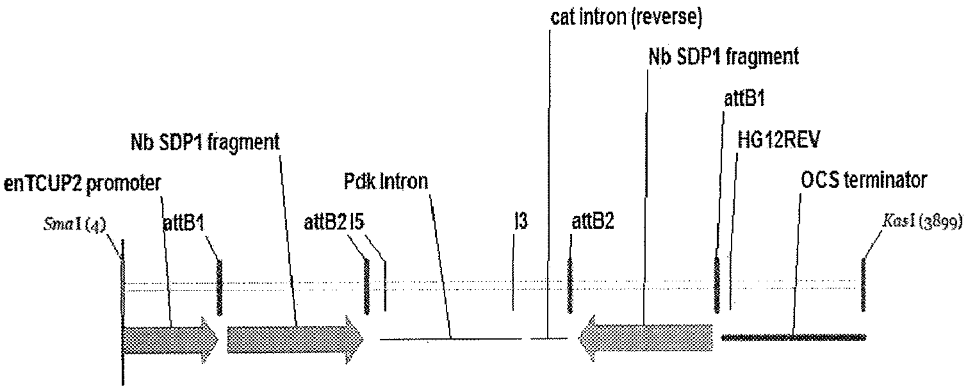

FIG. 8. Schematic representation of the *N. benthamiana* SDP1 hairpin construct. The genetic segments shown are as described in Example 11. Abbreviations are as for FIG. 3. attB sites represent recombination sites from the pHELLSGATE12 vector.

Figure 9:
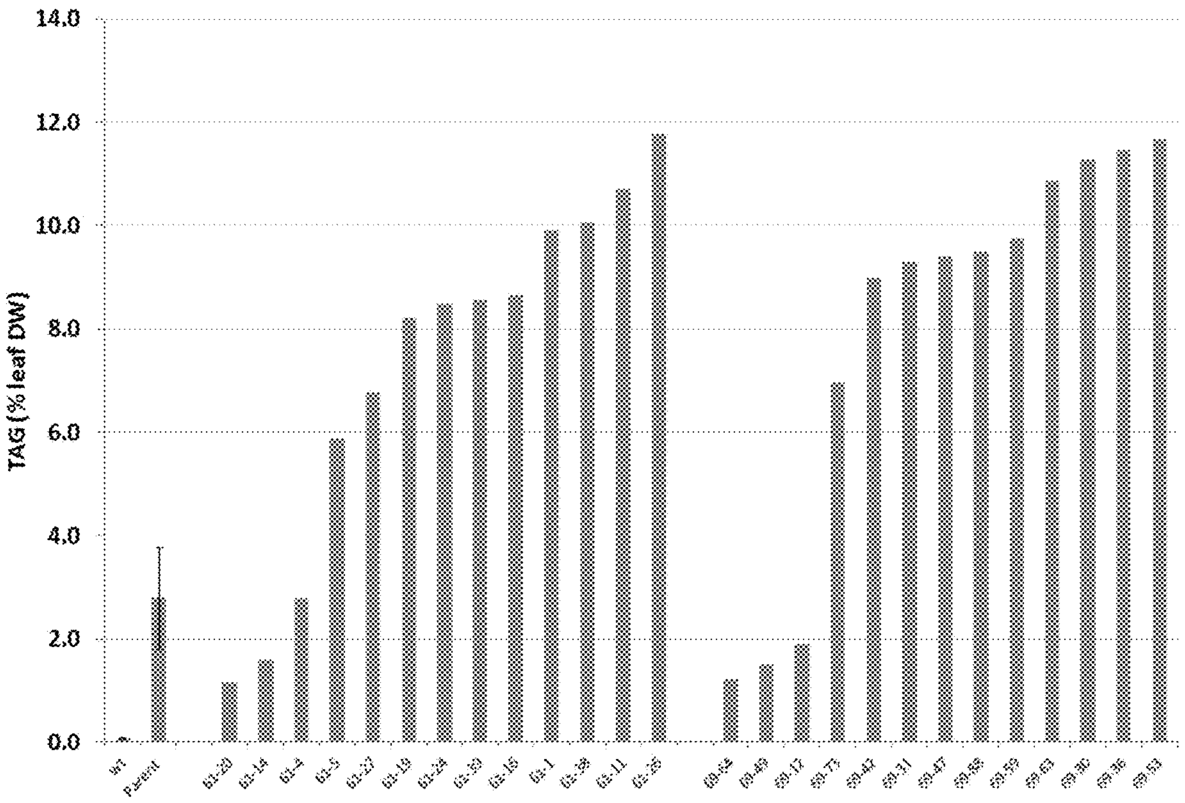

FIG. 9. TAG content in green leaf samples of tobacco plants transformed with the T-DNA from pOIL51, lines #61 and #69, harvested before flowering. The controls (parent) samples were from plants transformed with the T-DNA from pJP3502.

Figure 10:
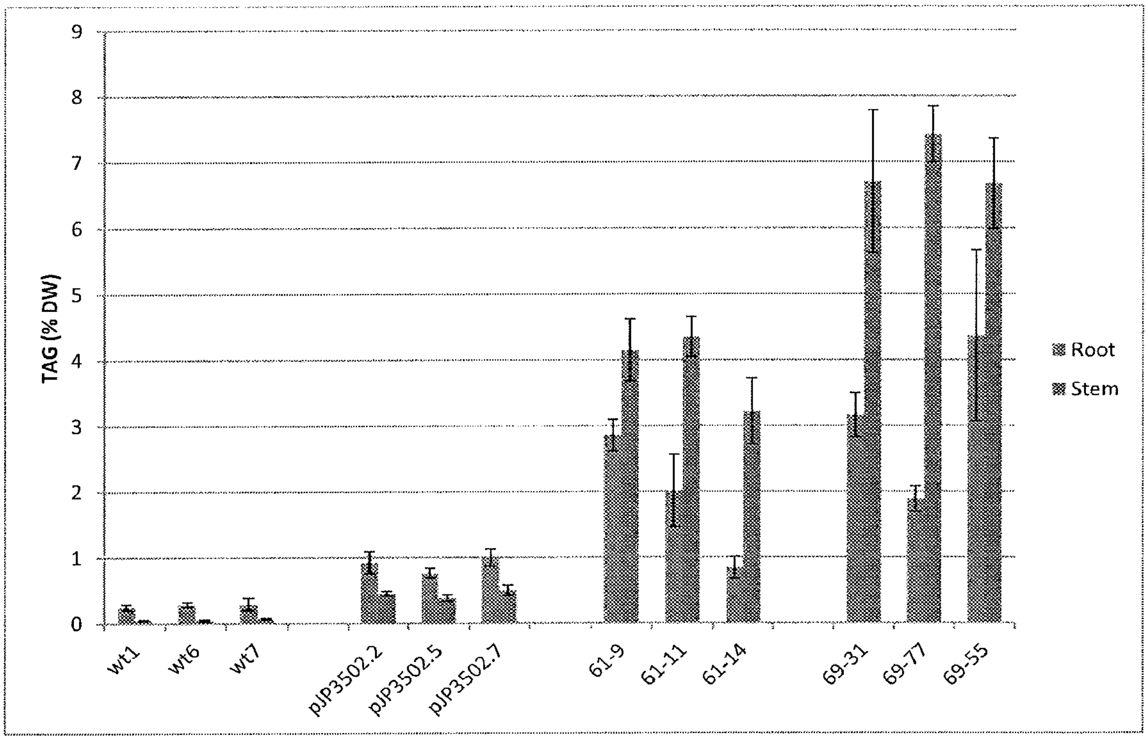

FIG. 10. TAG levels (% dry weight) in root and stem tissue of wild-type (wt) and transgenic *N. tabacum* plants containing the T-DNA from pJP3502 alone or additionally with the T-DNA from pOIL051.

Figure 11:
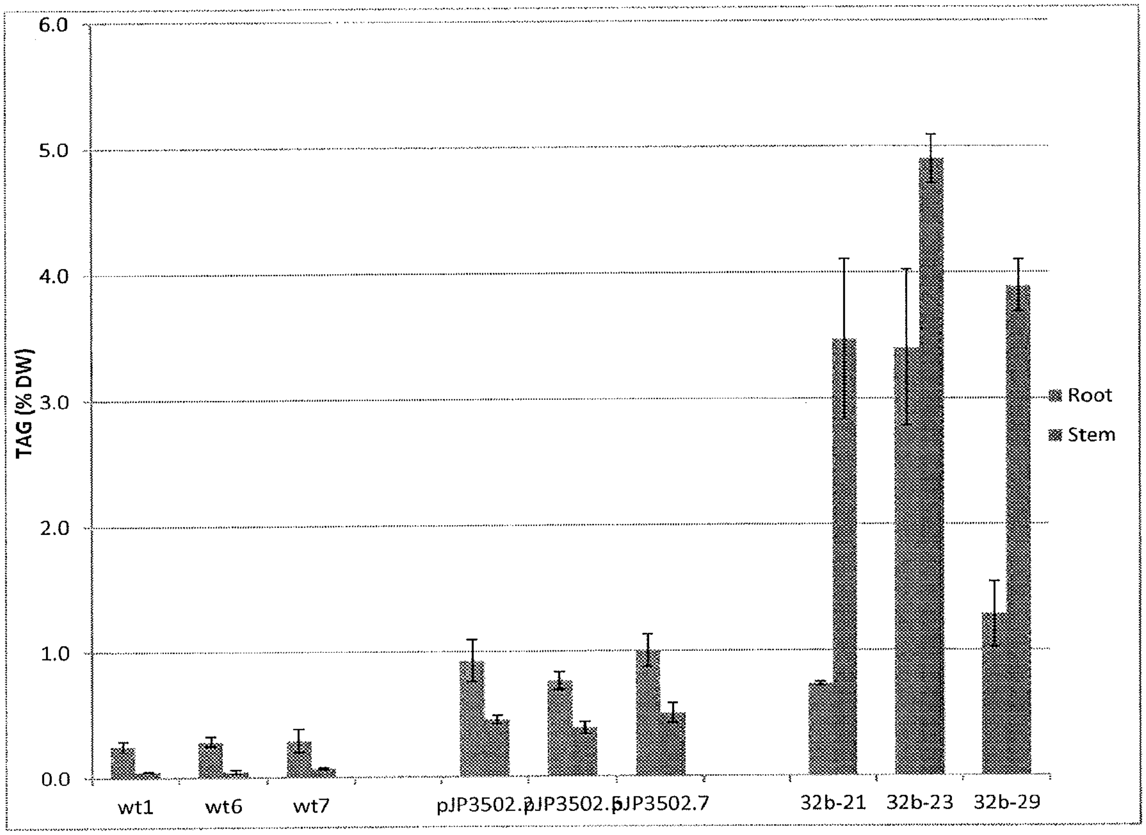

FIG. 11. TAG levels (% dry weight) in root and stem tissue of wild-type (wt) and transgenic *N. tabacum* plants containing the T-DNA from pJP3502 alone or additionally with the T-DNA from pOIL049.

Figure 12:
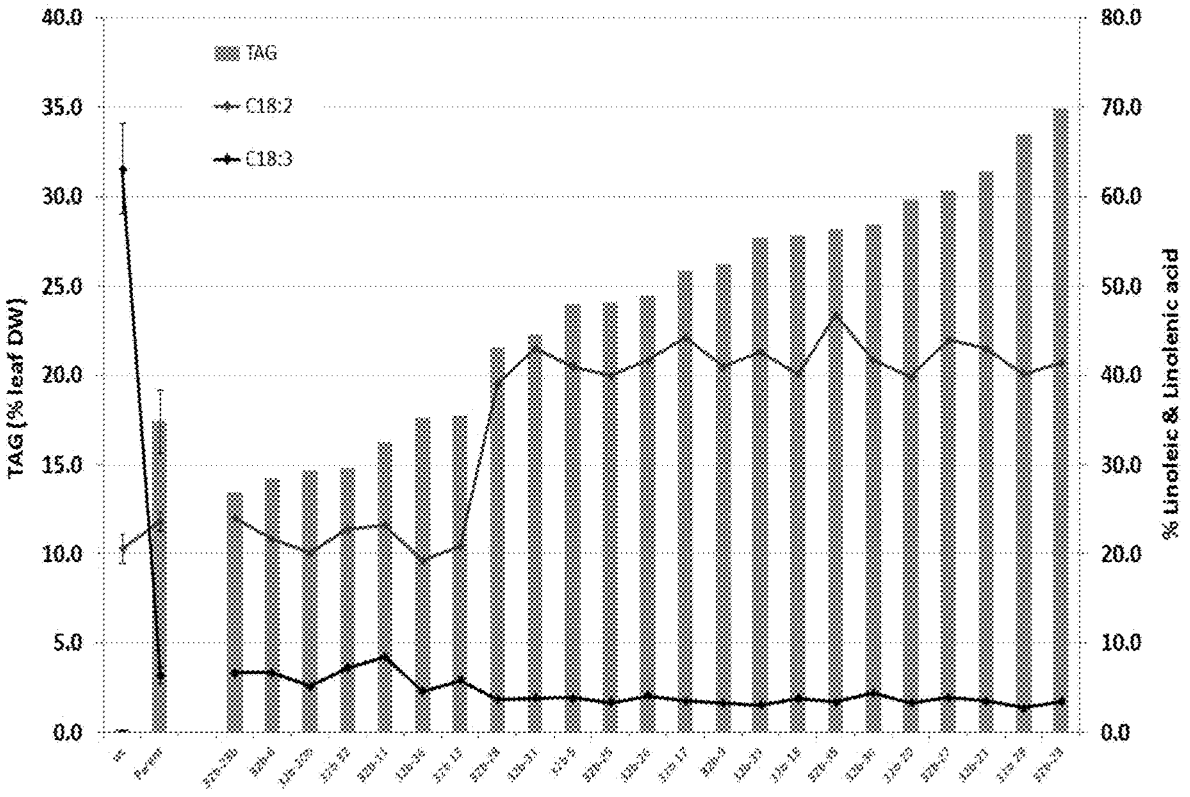

FIG. 12. TAG content in leaf samples of transformed tobacco plants at seed-setting stage of growth, transformed with the T-DNA from pOIL049, lines #23c and #32b. The controls (parent) samples were from plants transformed with the T-DNA from pJP3502. The upper line shows 18:2 percentage in the TAG and the lower line shows the 18:3 (ALA) percentage in the fatty acid content.

Figure 13:
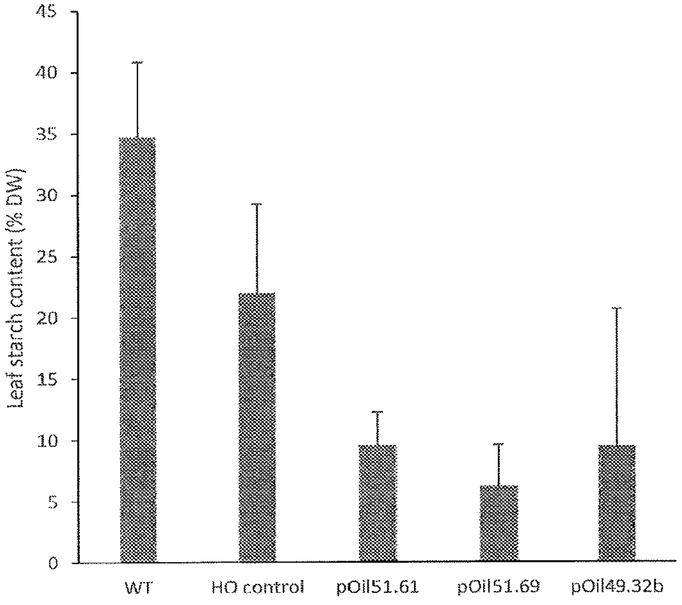
Figure 13:
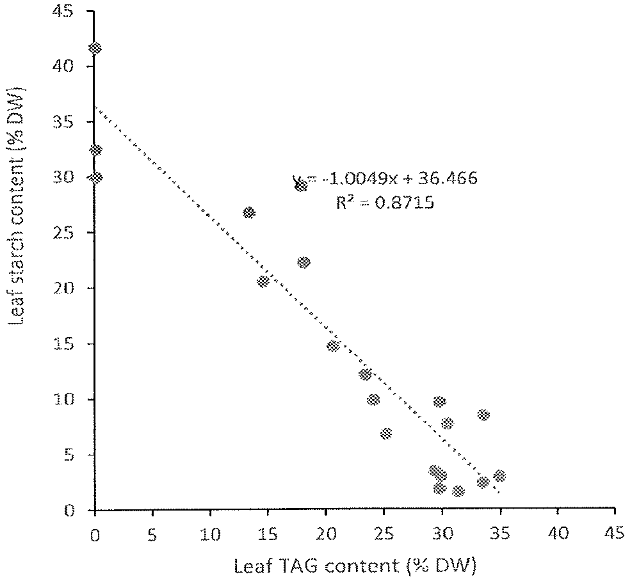

FIG. 13. A. Starch content in leaf tissue from wild-type plants (WT) and transgenic plants containing the T-DNA from pJP3502 (HO control) or the T-DNAs from both pJP3502 and pOIL051 (pOIL51.61 and pOIL51.69) or both pJP3502 and pOIL049 (pOIL49.32b). Data represent combined results from at least three individual plants. B. Correlation between starch and TAG content in leaf tissue of wild-type plants (WT) and transgenic plants containing the T-DNA from pJP3502 (HO control) or T-DNAs from both pJP3502 and pOIL051 (pOIL51.61 and pOIL51.69) or both pJP3502 and pOIL049 (pOIL49.32b). Data represent combined results from at least three individual plants.

Figure 14:
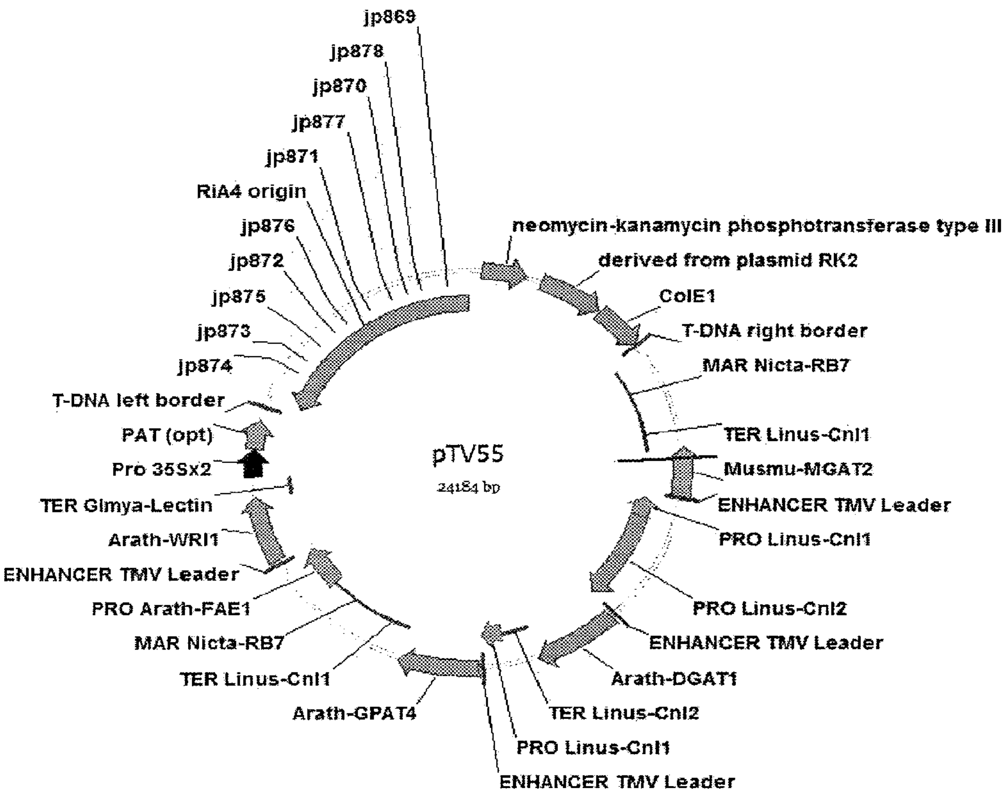

FIG. 14. Schematic representation of the pTV55 binary vector. Abbreviations: PRO, promoter; TER, 3' termination/polyadenylation region; Arath, *A. thaliana*; Linus, *Limum usitatissimum*; Nicta, *Nicotiana tabacum*; Glyma, *G. max*; Cnl1, conlinin 1 from flax; Cnl2, Conlinin 2 from flax; MAR Nicat-RB7, matrix attachment region from the tobacco RB7, or as in FIG. 3. Gene abbreviations MGAT2, DGAT1, GPAT4, WRI1 as in the text.

Figure 15:
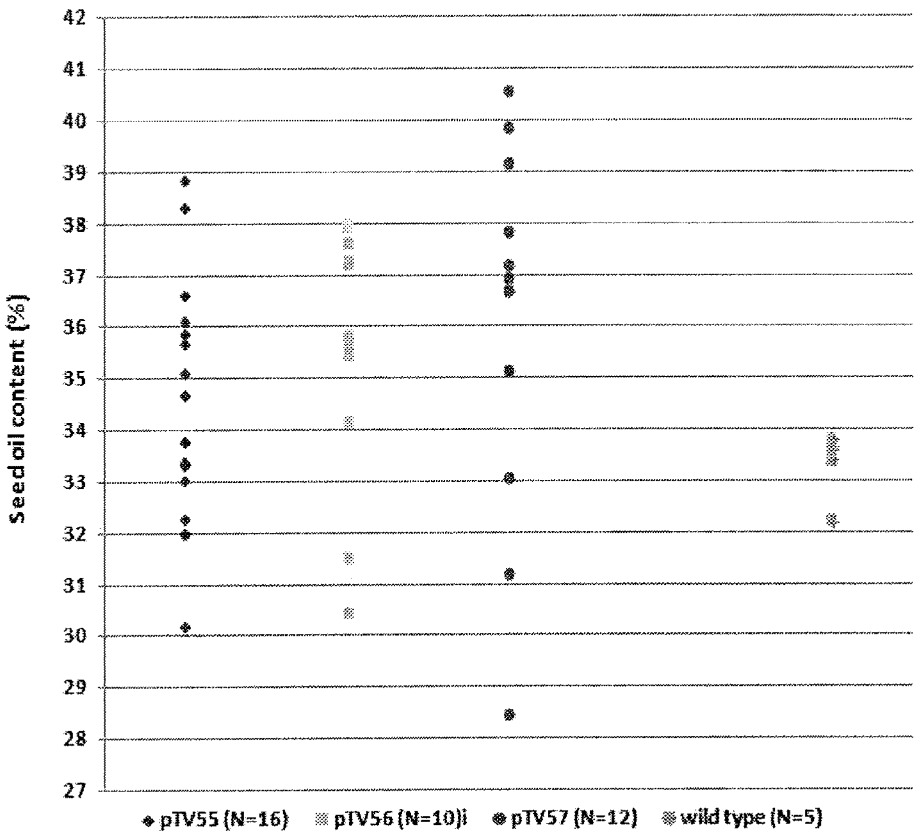

FIG. 15. Oil content (%) of *C. sativa* T2 seeds transformed with pTV55, pTV56 and pTV57 as determined by NMR. Each data point represents the average oil content of three independent batches of 50 mg seed for each transgenic line. Negative control seeds were wild-type (untransformed) *C. sativa* seeds, grown under the same conditions in the greenhouse. N indicates the number of independent transgenic events for each construct.

Figure 16:
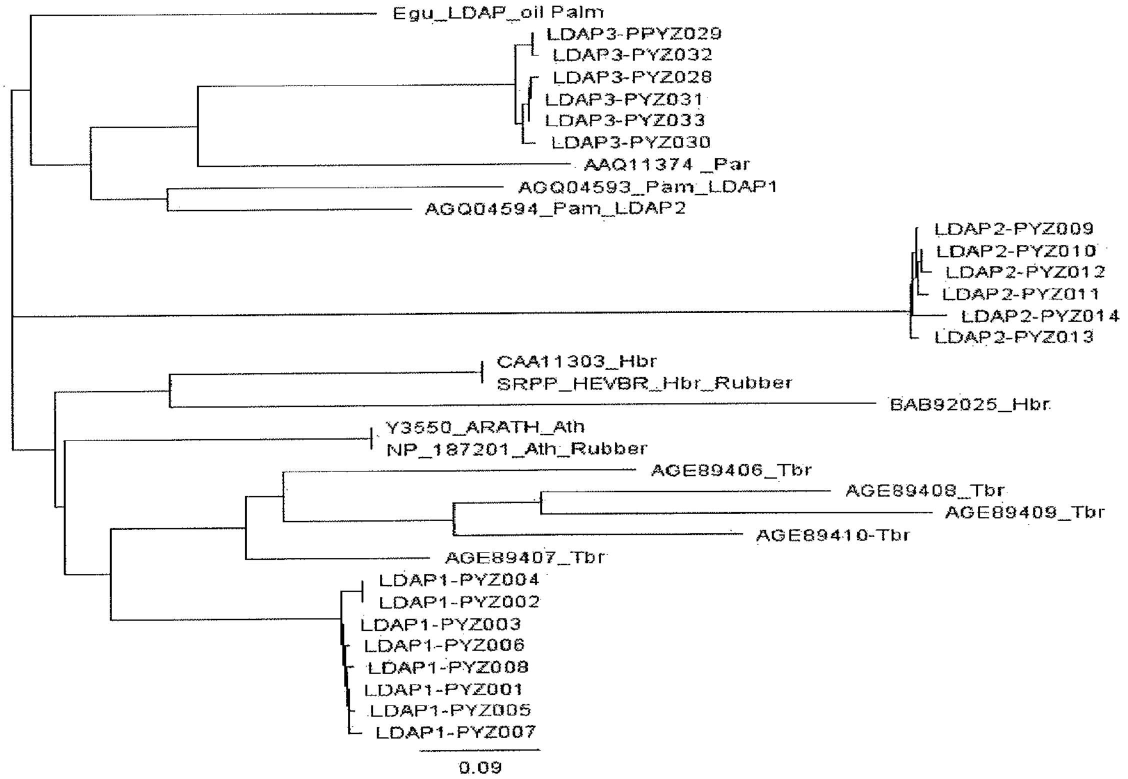

FIG. 16. Phylogenetic tree of LDAP polypeptides (Example 15).

Figure 17:
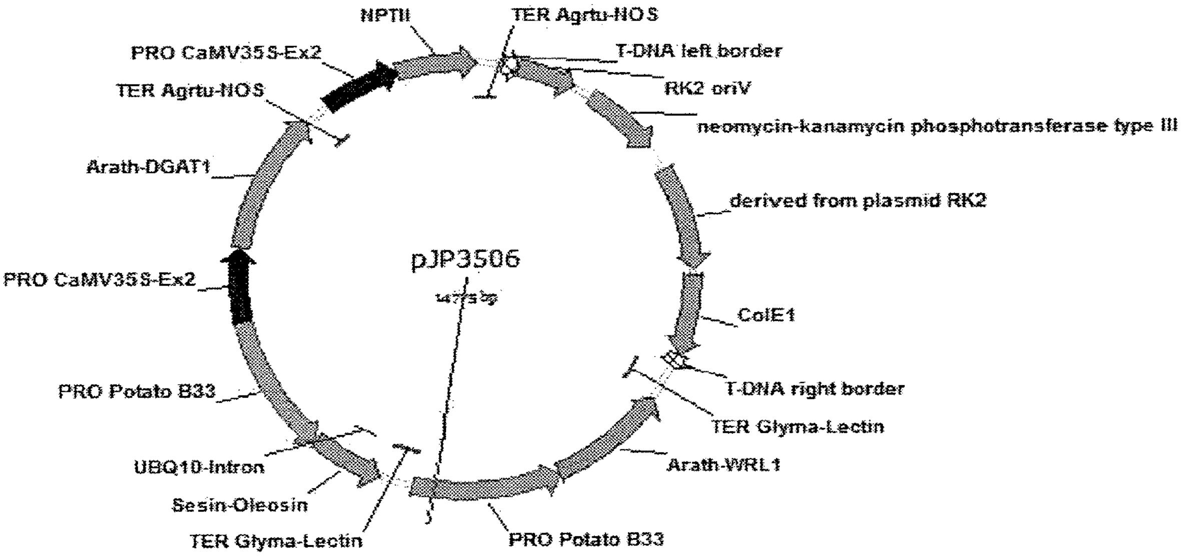

FIG. 17. Schematic representation of the genetic construct pJP3506 including the T-DNA region between the left and right borders. Abbreviations are as for FIG. 3 and: Sesin-Oleosin, *Sesame indicum* oleosin protein coding region.

Figure 18:
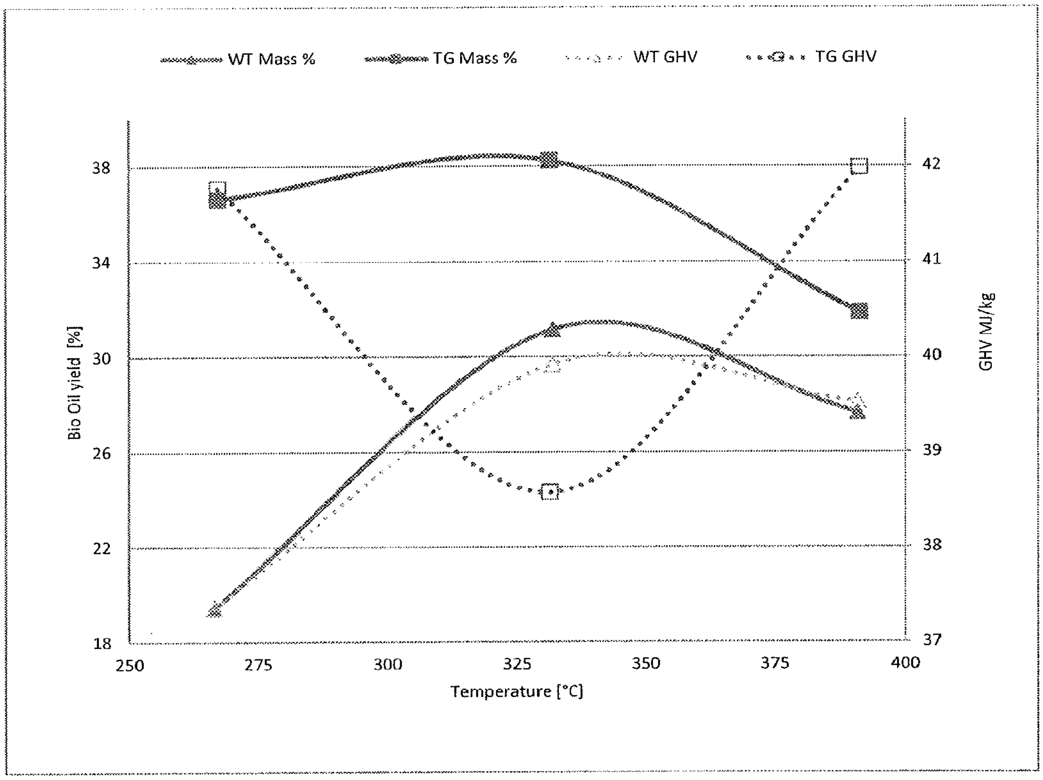

FIG. 18. Yield and calorific value changes for bio-oil production by HTP of wild-type and transgenic, high oil tobacco vegetative plant material as feedstock.

KEY TO THE SEQUENCE LISTING

SEQ ID NO:1 *Arabidopsis thaliana* DGAT1 polypeptide (CAB44774.1)

SEQ ID NO:2 *Arabidopsis thaliana* DGAT2 polypeptide (NP_566952.1)

SEQ ID NO:3 *Ricinus communis* DGAT2 polypeptide (AAY16324.1)

SEQ ID NO:4 *Vernicia fordii* DGAT2 polypeptide (ABC94474.1)

SEQ ID NO:5 *Mortierella ramanniana* DGAT2 polypeptide (AAK84179.1)

SEQ ID NO:6 *Homo sapiens* DGAT2 polypeptide (Q96PD7.2)

SEQ ID NO:7 *Homo sapiens* DGAT2 polypeptide (Q58HT5.1)

SEQ ID NO:8 *Bos taurus* DGAT2 polypeptide (Q70VZ8.1)

SEQ ID NO:9 *Mus musculus* DGAT2 polypeptide (AAK84175.1)

SEQ ID NO:10 YFP tripeptide—conserved DGAT2 and/or MGAT1/2 sequence motif

SEQ ID NO:11 HPHG tetrapeptide—conserved DGAT2 and/or MGAT1/2 sequence motif

SEQ ID NO:12 EPHS tetrapeptide—conserved plant DGAT2 sequence motif

SEQ ID NO:13 RXGFX(K/R)XAXXXGXXX(L/V)VPXXXFG(E/Q)—long conserved sequence motif of DGAT2 which is part of the putative glycerol phospholipid domain SEQ ID NO:14 FLXLXXXN—conserved sequence motif of mouse DGAT2 and MGAT1/2 which is a putative neutral lipid binding domain SEQ ID NO:15 plsC acyltransferase domain (PF01553) of GPAT SEQ ID NO:16 HAD-like hydrolase (PF12710) superfamily domain of GPAT SEQ ID NO:17 Phosphoserine phosphatase domain (PF00702). GPAT4-8 contain a N-terminal region homologous to this domain SEQ ID NO:18 Conserved GPAT amino acid sequence GDLVICPEGTTCREP SEQ ID NO:19 Conserved GPAT/phosphatase amino acid sequence (Motif I)

SEQ ID NO:20 Conserved GPAT/phosphatase amino acid sequence (Motif III)

SEQ ID NO:21 *Arabidopsis thaliana* WRI1 polypeptide (A8MS57)

SEQ ID NO:22 *Arabidopsis thaliana* WRI1 polypeptide (Q6X5Y6)

SEQ ID NO:23 *Arabidopsis lyrata* subsp. *lyrata* WRI1 polypeptide (XP_002876251.1)

SEQ ID NO:24 *Brassica napus* WRI1 polypepetide (ABD16282.1)

SEQ ID NO:25 *Brassica napus* WRI1 polypeptide (ADO16346.1)

SEQ ID NO:26 *Glycine max* WRI1 polypeptide (XP_003530370.1)

SEQ ID NO:27 *Jatropha curcas* WRI1 polypeptide (AEO22131.1)

SEQ ID NO:28 *Ricinus communis* WRI1 polypeptide (XP_002525305.1)

SEQ ID NO:29 *Populus trichocarpa* WRI1 polypeptide (XP_002316459.1)

SEQ ID NO:30 *Vitis vinifera* WRI1 polypeptide (CBI29147.3)

SEQ ID NO:31 *Brachypodium distachyon* WRI1 polypeptide (XP_003578997.1)

SEQ ID NO:32 *Hordeum vulgare* subsp. *vulgare* WRI1 polypeptide (BAJ86627.1)

SEQ ID NO:33 *Oryza sativa* WRI1 polypeptide (EAY79792.1)

SEQ ID NO:34 *Sorghum bicolor* WRI1 polypeptide (XP_002450194.1)

SEQ ID NO:35 *Zea mays* WRI1 polypeptide (ACG32367.1)

SEQ ID NO:36 *Brachypodium distachyon* WRI1 polypeptide (XP_003561189.1)

SEQ ID NO:37 *Brachypodium sylvaticum* WRI1 polypeptide (ABL85061.1)

SEQ ID NO:38 *Oryza sativa* WRI1 polypeptide (BAD68417.1)

SEQ ID NO:39 *Sorghum bicolor* WRI1 polypeptide (XP_002437819.1)

SEQ ID NO:40 *Sorghum bicolor* WRI1 polypeptide (XP_002441444.1)

SEQ ID NO:41 *Glycine max* WRI1 polypeptide (XP_003530686.1)

SEQ ID NO:42 *Glycine max* WRI1 polypeptide (XP_003553203.1)

SEQ ID NO:43 *Populus trichocarpa* WRI1 polypeptide (XP_002315794.1)

SEQ ID NO:44 *Vitis vinifera* WRI1 polypeptide (XP_002270149.1)

SEQ ID NO:45 *Glycine max* WRI1 polypeptide (XP_003533548.1)

SEQ ID NO:46 *Glycine max* WRI1 polypeptide (XP_003551723.1)

SEQ ID NO:47 *Medicago truncatula* WRI1 polypeptide (XP_003621117.1)

SEQ ID NO:48 *Populus trichocarpa* WRI1 polypeptide (XP_002323836.1)

SEQ ID NO:49 *Ricinus communis* WRI1 polypeptide (XP_002517474.1)

SEQ ID NO:50 *Vitis vinifera* WRI1 polypeptide (CAN79925.1)

SEQ ID NO:51 *Brachypodium distachyon* WRI1 polypeptide (XP_003572236.1)
SEQ ID NO:52 *Oryza sativa* WRI1 polypeptide (BAD10030.1)
SEQ ID NO:53 *Sorghum bicolor* WRI1 polypeptide (XP_002444429.1)
SEQ ID NO:54 *Zea mays* WRI1 polypeptide (NP_001170359.1)
SEQ ID NO:55 *Arabidopsis lyrata* subsp. *lyrata* WRI1 polypeptide (XP_002889265.1)
SEQ ID NO:56 *Arabidopsis thaliana* WRI1 polypeptide (AAF68121.1)
SEQ ID NO:57 *Arabidopsis thaliana* WRI1 polypeptide (NP_178088.2)
SEQ ID NO:58 *Arabidopsis lyrata* subsp. *lyrata* WRI1 polypeptide (XP_002890145.1)
SEQ ID NO:59 *Thellungiella halophila* WRI1 polypeptide (BAJ33872.1)
SEQ ID NO:60 *Arabidopsis thaliana* WRI1 polypeptide (NP_563990.1)
SEQ ID NO:61 *Glycine max* WRI1 polypeptide (XP_003530350.1)
SEQ ID NO:62 *Brachypodium distachyon* WRI1 polypeptide (XP_003578142.1)
SEQ ID NO:63 *Oryza sativa* WRI1 polypeptide (EAZ09147.1)
SEQ ID NO:64 *Sorghum bicolor* WRI1 polypeptide (XP_002460236.1)
SEQ ID NO:65 *Zea mays* WRI1 polypeptide (NP_001146338.1)
SEQ ID NO:66 *Glycine max* WRI1 polypeptide (XP_003519167.1)
SEQ ID NO:67 *Glycine max* WRI1 polypeptide (XP_003550676.1)
SEQ ID NO:68 *Medicago truncatula* WRI1 polypeptide (XP_003610261.1)
SEQ ID NO:69 *Glycine max* WRI1 polypeptide (XP_003524030.1)
SEQ ID NO:70 *Glycine max* WRI1 polypeptide (XP_003525949.1)
SEQ ID NO:71 *Populus trichocarpa* WRI1 polypeptide (XP_002325111.1)
SEQ ID NO:72 *Vitis vinifera* WRI1 polypeptide (CBI36586.3)
SEQ ID NO:73 *Vitis vinifera* WRI1 polypeptide (XP_002273046.2)
SEQ ID NO:74 *Populus trichocarpa* WRI1 polypeptide (XP_002303866.1)
SEQ ID NO:75 *Vitis vinifera* WRI1 polypeptide (CBI25261.3)
SEQ ID NO:76 Sorbi-WRL1
SEQ ID NO: 77 Lupan-WRL1
SEQ ID NO:78 Ricco-WRL1
SEQ ID NO:79 *Lupin angustifolius* WRI1 polypeptide
SEQ ID NO:80 *Aspergillus fumigatus* DGAT1 polypeptide (XP_755172.1)
SEQ ID NO:81 *Ricimus communis* DGAT1 polypeptide (AAR11479.1)
SEQ ID NO:82 *Vernicia fordii* DGAT1 polypeptide (ABC94472.1)
SEQ ID NO:83 *Vernonia galamensis* DGAT1 polypeptide (ABV21945.1)
SEQ ID NO:84 *Vernonia galamensis* DGAT1 polypeptide (ABV21946.1)
SEQ ID NO:85 *Euonymus alatus* DGAT1 polypeptide (AAV31083.1)
SEQ ID NO:86 *Caenorhabditis elegans* DGAT1 polypeptide (AAF82410.1)
SEQ ID NO:87 *Rattus norvegicus* DGAT1 polypeptide (NP_445889.1)
SEQ ID NO:88 *Homo sapiens* DGAT1 polypeptide (NP_036211.2)
SEQ ID NO:89 WRI1 motif (R G V T/S R H R W T G R)
SEQ ID NO:90 WRI1 motif (F/Y E A H L W D K)
SEQ ID NO:91 WRI1 motif (D L A L K Y W G)
SEQ ID NO:92 WRI1 motif (S X G F S/A R G X)
SEQ ID NO:93 WRI1 motif (H H H/Q N G R/K W E A R I G R/K V)
SEQ ID NO:94 WRI1 motif (Q E E A A A X Y D)
SEQ ID NO:95 *Brassica napus* oleosin polypeptide (CAA57545.1)
SEQ ID NO:96 *Brassica napus* oleosin S1-1 polypeptide (ACG69504.1)
SEQ ID NO:97 *Brassica napus* oleosin S2-1 polypeptide (ACG69503.1)
SEQ ID NO:98 *Brassica napus* oleosin S3-1 polypeptide (ACG69513.1)
SEQ ID NO:99 *Brassica napus* oleosin S4-1 polypeptide (ACG69507.1)
SEQ ID NO:100 *Brassica napus* oleosin S5-1 polypeptide (ACG69511.1)
SEQ ID NO:101 *Arachis hypogaea* oleosin 1 polypeptide (AAZ20276.1)
SEQ ID NO:102 *Arachis hypogaea* oleosin 2 polypeptide (AAU21500.1)
SEQ ID NO:103 *Arachis hypogaea* oleosin 3 polypeptide (AAU21501.1)
SEQ ID NO:104 *Arachis hypogaea* oleosin 5 polypeptide (ABC96763.1)
SEQ ID NO: 105 *Ricimis communis* oleosin 1 polypeptide (EEF40948.1)
SEQ ID NO:106 *Ricinus communis* oleosin 2 polypeptide (EEF51616.1)
SEQ ID NO:107 *Glycine max* oleosin isoform a polypeptide (P29530.2)
SEQ ID NO:108 *Glycine max* oleosin isoform b polypeptide (P29531.1)
SEQ ID NO:109 *Limum usitatissimum* oleosin low molecular weight isoform polypeptide (ABB01622.1)
SEQ ID NO:110 amino acid sequence of *Limum usitatissimum* oleosin high molecular weight isoform polypeptide (ABB01624.1)
SEQ ID NO:111 *Helianthus annuus* oleosin polypeptide (CAA44224.1)
SEQ ID NO:112 *Zea mays* oleosin polypeptide (NP_001105338.1)
SEQ ID NO:113 *Brassica napus* steroleosin polypeptide (ABM30178.1)
SEQ ID NO:114 *Brassica napus* steroleosin SLO1-1 polypeptide (ACG69522.1)
SEQ ID NO:115 *Brassica napus* steroleosin SLO2-1 polypeptide (ACG69525.1)
SEQ ID NO:116 *Sesamum indicum* steroleosin polypeptide (AAL13315.1)
SEQ ID NO:117 *Zea mays* steroleosin polypeptide (NP_001152614.1)
SEQ ID NO:118 *Brassica napus* caleosin CLO-1 polypeptide (ACG69529.1)
SEQ ID NO:119 *Brassica napus* caleosin CLO-3 polypeptide (ACG69527.1)
SEQ ID NO: 120 *Sesamum indicum* caleosin polypeptide (AAF13743.1)

SEQ ID NO:121 *Zea mays* caleosin polypeptide (NP_001151906.1)
SEQ ID NO:122 pJP3502 TDNA (inserted into genome) sequence
SEQ ID NO:123 pJP3507 vector sequence
SEQ ID NO:124 Linker sequence
SEQ ID NO:125 Partial *Nicotiana benthamiana* CGI-58 sequence selected for hpRNAi silencing (pTV46)
SEQ ID NO:126 Partial *N. tabacum* AGPase sequence selected for hpRNAi silencing (pTV35)
SEQ ID NO:127 GXSXG lipase motif
SEQ ID NO:128 HX(4)D acyltransferase motif
SEQ ID NO:129 VX(3)HGF probable lipid binding motif
SEQ ID NO:130 *Arabidopsis thaliana* CGi58 polynucleotide (NM_118548.1)
SEQ ID NO:131 *Brachypodium distachyon* CGi58 polynucleotide (XM_003578402.1)
SEQ ID NO:132 *Glycine max* CGi58 polynucleotide (XM_003523590.1)
SEQ ID NO:133 *Zea mays* CGi58 polynucleotide (NM_001155541.1)
SEQ ID NO:134 *Sorghum bicolor* CGi58 polynucleotide (XM_002460493.1)
SEQ ID NO: 135 *Ricimis communis* CGi58 polynucleotide (XM_002510439.1)
SEQ ID NO:136 *Medicago truncatula* CGi58 polynucleotide (XM_003603685.1)
SEQ ID NO:137 *Arabidopsis thaliana* LEC2 polynucleotide (NM_102595.2)
SEQ ID NO:138 *Medicago truncatula* LEC2 polynucelotide (X60387.1)
SEQ ID NO:139 *Brassica napus* LEC2 polynucelotide (HM370539.1)
SEQ ID NO:140 *Arabidopsis thaliana* BBM polynucleotide (NM_121749.2)
SEQ ID NO:141 *Medicago truncatula* BBM polynucleotide (AY899909.1)
SEQ ID NO:142 *Arabidopsis thaliana* LEC2 polypeptide (NP_564304.1)
SEQ ID NO:143 *Medicago truncatula* LEC2 polypeptide (CAA42938.1)
SEQ ID NO:144 *Brassica napus* LEC2 polypeptide (ADO16343.1)
SEQ ID NO:145 *Arabidopsis thaliana* BBM polypeptide (NP_197245.2)
SEQ ID NO:146 *Medicago truncatula* BBM polypeptide (AAW82334.1)
SEQ ID NO:147 Inducible *Aspergillus niger* alcA promoter
SEQ ID NO:148 AlcR inducer that activates the AlcA promotor in the presence of ethanol
SEQ ID NO: 149 *Arabidopsis thaliana* LEC1; (AAC39488)
SEQ ID NO:150 *Arabidopsis lyrata* LEC1 (XP_002862657)
SEQ ID NO: 151 *Brassica napus* LEC1 (ADF81045)
SEQ ID NO:152 *Ricimis communis* LEC1 (XP_002522740)
SEQ ID NO:153 *Glycine max* LEC1 (XP_006582823)
SEQ ID NO:154 *Medicago truncatula* LEC1 (AFK49653)
SEQ ID NO:155 *Zea mays* LEC1 (AAK95562)
SEQ ID NO:156 *Arachis hypogaea* LEC1 (ADC33213)
SEQ ID NO:157 *Arabidopsis thaliana* LEC1-like (AAN15924)
SEQ ID NO: 158 *Brassica napus* LEC1-like (AHI94922)
SEQ ID NO:159 *Phaseolus coccineus* LEC1-like (AAN01148)
SEQ ID NO:160 *Arabidopsis thaliana* FUS3 (AAC35247)
SEQ ID NO: 161 *Brassica napus* FUS3
SEQ ID NO:162 *Medicago truncatula* FUS3
SEQ ID NO:163 *Arabidopsis thaliana* SDP1 cDNA sequence, Accession No. NM_120486, 3275 nt
SEQ ID NO:164 *Brassica napus* SDP1 cDNA; Accession No. GN078290
SEQ ID NO:165 *Brachypodium distachyon* SDP1 cDNA, 2670 nt
SEQ ID NO: 166 *Populus trichocarpa* SDP1 cDNA, 3884 nt
SEQ ID NO: 167 *Medicago truncatula* SDP1 cDNA; XM_003591377; 2490 nt
SEQ ID NO:168 *Glycine max* SDP1 cDNA XM_003521103; 2783 nt
SEQ ID NO:169 *Sorghum bicolor* SDP1 cDNA XM_002458486; 2724 nt
SEQ ID NO:170 *Zea mays* SDP1 cDNA, NM_001175206; 2985 nt
SEQ ID NO:171 *Physcomitrella patens* SDP1 cDNA, XM_001758117; 1998 nt
SEQ ID NO:172 *Hordeum vulgare* SDP1 cDNA, AK372092; 3439 nt
SEQ ID NO:173 *Nicotiana benthamiana* SDP1 cDNA, Nbv5tr6404201
SEQ ID NO:174 *Nicotiana benthamiana* SDP1 cDNA region targeted for hpRNAi silencing
SEQ ID NO:175 Promoter of *Arabidopsis thaliana* SDP I gene, 1.5 kb
SEQ ID NO:176 Nucleotide sequence of the complement of the pSSU-Oleosin gene in the T-DNA of pJP3502. In order (complementary sequences): *Glycine max* Lectin terminator 348 nt, 3' exon 255 nt, UBQ10 intron 304 nt, 5' exon 213 nt, SSU promoter 1751 nt
SEQ ID NO:177 *Arabidopsis thaliana* plastidial GPAT cDNA, NM_179407
SEQ ID NO:178 *Arabidopsis thaliana* plastidial GPAT polypeptide, NM_179407
SEQ ID NO:179 *Populus trichocarpa* plastidial GPAT cDNA, XP_006368351
SEQ ID NO:180 *Jatropha curcas* plastidial GPAT cDNA, ACR61638
SEQ ID NO: 181 *Ricinus communis* plastidial GPAT cDNA, XP_002518993
SEQ ID NO: 182 *Helianthus annuus* plastidial GPAT cDNA, ADV16382
SEQ ID NO:183 *Medicago truncatula* plastidial GPAT cDNA, XP_003612801
SEQ ID NO:184 *Glycine max* plastidial GPAT cDNA, XP 003516958
SEQ ID NO: 185 *Carthamus tinctorius* plastidial GPAT cDNA, CAHG3PACTR
SEQ ID NO: 186 *Solanum tuberosum* plastidial GPAT cDNA, XP 006352898
SEQ ID NO:187 *Oryza sativa, Japonica* plastidial GPAT cDNA, NM_001072027
SEQ ID NO:188 *Sorghum bicolor* plastidial GPAT cDNA, XM 002467381
SEQ ID NO: 189 *Zea mays* plastidial GPAT cDNA, NM_001158637
SEQ ID NO: 190 *Hordeum vulgare* plastidial GPAT cDNA, AK371419
SEQ ID NO:191 *Physcomitrella patens* plastidial GPAT cDNA, XM_001771247

SEQ ID NO: 192 *Chlamydomonas reinhardtii* plastidial GPAT cDNA, XM_001694925

SEQ ID NO:193 *Cinnamomum camphora* 14:0-ACP thioesterase (Cinca-TE), chloroplastic, 382aa, (Accession No. Q39473.1)

SEQ ID NO:194 *Cocos micifera* acyl-ACP thioesterase FatB1 (Cocnu-TE1; 417aa, Accession No. AEM72519.1

SEQ ID NO:195 *Cocos micifera* acyl-ACP thioesterase FatB2 (Cocnu-TE2; 423aa, Accession No. AEM72520.1)

SEQ ID NO:196 *Cocos micifera* acyl-ACP thioesterase FatB3 (Cocnu-TE3; 414aa, Accession No. AEM72521.1)

SEQ ID NO: 197 *Cuphea lanceolata* acyl-(ACP) thioesterase type B (Cupla-TE, 419aa, Accession No. CAB60830.1)

SEQ ID NO:198 *Cuphea viscosissima* FatB1 (Cupvi-TE; 419aa, Accession No. AEM72522.1)

SEQ ID NO:199 *Umbellularia californica* 12:0-ACP thioesterase (Lauroyl-acyl carrier protein thioesterase) (Umbca-TE, 382aa; Accession No. Q41635.1)

SEQ ID NO:200 *Cocos micifera* LPAAT (Cocnu-LPAAT, 308aa, Accession No. Q42670.1)

SEQ ID NO:201 *Arabidopsis thaliana* plastidial LPAAT1 (Arath-PLPAAT; 356aa, Accession No. AEE85783.1)

SEQ ID NO:202 *Arabidopsis thaliana* FATA1

SEQ ID NO:203 *Arabidopsis thaliana* FATA2

SEQ ID NO:204 *Arabidopsis thaliana* FATB

SEQ ID NO:205 *Arabidopsis thaliana* WRI3

SEQ ID NO:206 *Arabidopsis thaliana* WRI4

SEQ ID NO:207 *Avena sativa* WRI1

SEQ ID NO:208 *Sorghum bicolor* WRI1

SEQ ID NO:209 *Zea mays* WRI1

SEQ ID NO:210 *Triadica sebifera* WRI1

SEQ ID NO:211 *S. tuberosum* Patatin B33 promoter sequence

SEQ ID NOs 212 to 215 and 245 to 254 Oligonucleotide primers

SEQ ID NO:216 *Z. mays* SEE1 promoter region (1970 nt from Accession number AJ494982)

SEQ ID NO:217 *A. littoralis* AlSAP promoter sequence, Accession No DQ885219

SEQ ID NO:218 *A. rhizogenes* ArRolC promoter sequence, Accession No. DQ160187

SEQ ID NO:219 hpRNAi construct containing a 732 bp fragment of *N. benthamiana* plastidial GPAT SEQ ID NO:220 *Elaeis guineensis* (oil palm) DGAT1

SEQ ID NO:221 *G. max* MYB73, Accession No. ABH02868

SEQ ID NO:222 *A. thaliana* bZIP53, Accession No. AAM14360

SEQ ID NO:223 *A. thaliana* AGL15, Accession No NP_196883

SEQ ID NO:224 *A. thaliana* MYB118, Accession No. AAS58517

SEQ ID NO:225 *A. thaliana* MYB115, Accession No. AAS10103

SEQ ID NO:226 *A. thaliana* TANMEI, Accession No. BAE44475

SEQ ID NO:227 *A. thaliana* WUS, Accession No. NP_565429

SEQ ID NO:228 *B. napus* GFR2a1, Accession No. AFB74090

SEQ ID NO:229 *B. napus* GFR2a2, Accession No. AFB74089

SEQ ID NO:230 *A. thaliana* PHR1, Accession No. AAN72198

SEQ ID NO:231 *N. benthamiana* TGD1 fragment

SEQ ID NO:232 Potato SDP1 amino acid

SEQ ID NO:233 Potato SDP1 nucleotide sequence

SEQ ID NO:234 Potato AGPase small subunit

SEQ ID NO:235 Potato AGPase small subunit nucleotide sequence:

SEQ ID NO:236 *Sapium sebiferum* LDAP-1 nucleotide sequence

SEQ ID NO:237 *Sapium sebiferum* LDAP-1 amino acid sequence

SEQ ID NO:238 *Sapium sebiferum* LDAP-2 nucleotide sequence

SEQ ID NO:239 *Sapium sebiferum* LDAP-2 amino acid sequence

SEQ ID NO:240 *Sapium sebiferum* LDAP-3 nucleotide sequence

SEQ ID NO:241 *Sapium sebiferum* LDAP-3 amino acid sequence

SEQ ID NO:242 *S. bicolor* SDP1 (accession number XM_002463620)

SEQ ID NO:243 *T. aestivum* SDP1 nucleotide sequence (Accession number AK334547)

SEQ ID NO:244 *S. bicolor* SDP1 hpRNAi fragment

DETAILED DESCRIPTION OF THE INVENTION

General Techniques

Unless specifically defined otherwise, all technical and scientific terms used herein shall be taken to have the same meaning as commonly understood by one of ordinary skill in the art (e.g., in cell culture, molecular genetics, plant biology, cell biology, protein chemistry, lipid and fatty acid chemistry, biofuel production, and biochemistry).

Unless otherwise indicated, the recombinant protein, cell culture, and immunological techniques utilized in the present invention are standard procedures, well known to those skilled in the art. Such techniques are described and explained throughout the literature in sources such as, J. Perbal, A Practical Guide to Molecular Cloning, John Wiley and Sons (1984), J. Sambrook et al., Molecular Cloning: A Laboratory Manual, Cold Spring Harbour Laboratory Press (1989), T. A. Brown (editor), Essential Molecular Biology: A Practical Approach, Volumes 1 and 2, IRL Press (1991), D. M. Glover and B. D. Hames (editors), DNA Cloning: A Practical Approach, Volumes 1-4, IRL Press (1995 and 1996), F. M. Ausubel et al. (editors), Current Protocols in Molecular Biology, Greene Pub. Associates and Wiley-Interscience (1988, including all updates until present), Ed Harlow and David Lane (editors) Antibodies: A Laboratory Manual, Cold Spring Harbour Laboratory, (1988), and J. E. Coligan et al. (editors) Current Protocols in Immunology, John Wiley & Sons (including all updates until present).

Selected Definitions

The term "transgenic non-human organism" refers to, for example, a whole plant, alga, non-human animal, or an organism suitable for fermentation such as a yeast or fungus, comprising one or more exogenous polynucleotides (transgene) or polypeptides. In an embodiment, the transgenic non-human organism is not an animal or part thereof. In one embodiment, the transgenic non-human organism is a phototrophic organism (for example, a plant or alga) capable of obtaining energy from sunlight to synthesize organic compounds for nutrition.

The term "exogenous" in the context of a polynucleotide or polypeptide refers to the polynucleotide or polypeptide when present in a cell which does not naturally comprise the polynucleotide or polypeptide. Such a cell is referred to herein as a "recombinant cell" or a "transgenic cell". In an embodiment, the exogenous polynucleotide or polypeptide is from a different genus to the cell comprising the exogenous polynucleotide or polypeptide. In another embodiment, the exogenous polynucleotide or polypeptide is from a different species. In one embodiment the exogenous polynucleotide or polypeptide is expressed in a host plant or plant cell and the exogenous polynucleotide or polypeptide is from a different species or genus. The exogenous polynucleotide or polypeptide may be non-naturally occurring, such as for example, a synthetic DNA molecule which has been produced by recombinant DNA methods. The DNA molecule may, often preferably, include a protein coding region which has been codon-optimised for expression in the cell, thereby producing a polypeptide which has the same amino acid sequence as a naturally occurring polypeptide, even though the nucleotide sequence of the protein coding region is non-naturally occurring. The exogenous polynucleotide may encode, or the exogenous polypeptide may be: a diacylglycerol acyltransferase (DGAT) such as a DGAT1 or a DGAT2, a Wrinkled 1 (WRI1) transcription factor, on OBC such as an Oleosin or preferably an LDAP, a fatty acid thioesterase such as a FATA or FATB polypeptide, or a silencing suppressor polypeptide.

As used herein, the term "extracted lipid" refers to a composition extracted from a transgenic organism or part thereof which comprises at least 60% (w/w) lipid.

As used herein, the term "non-polar lipid" refers to fatty acids and derivatives thereof which are soluble in organic solvents but insoluble in water. The fatty acids may be free fatty acids and/or in an esterified form. Examples of esterified forms include, but are not limited to, triacylglycerol (TAG), diacylyglycerol (DAG), monoacylglycerol (MAG). Non-polar lipids also include sterols, sterol esters and wax esters. Non-polar lipids are also known as "neutral lipids". Non-polar lipid is typically a liquid at room temperature. Preferably, the non-polar lipid predominantly (>50%) comprises fatty acids that are at least 16 carbons in length. More preferably, at least 50% of the total fatty acids in the non-polar lipid are C18 fatty acids for example, oleic acid. Preferably, at least 5% of the total fatty acids in the non-polar lipids are C12 or C14 fatty acids, or both. In an embodiment, at least 50%, more preferably at least 70%, more preferably at least 80%, more preferably at least 90%, more preferably at least 91%, more preferably at least 92%, more preferably at least 93%, more preferably at least 94%, more preferably at least 95%, more preferably at least 96%, more preferably at least 97%, more preferably at least 98%, more preferably at least 99% of the fatty acids in non-polar lipid of the invention can be found as TAG. The non-polar lipid may be further purified or treated, for example by hydrolysis with a strong base to release the free fatty acid, or by fractionation, distillation, or the like. Non-polar lipid may be present in or obtained from plant parts such as seed, leaves, tubers, beets or fruit, from recombinant cells or from non-human organisms such as yeast. Non-polar lipid of the invention may form part of "seedoil" if it is obtained from seed.

The free and esterified sterol (for example, sitosterol, campesterol, stigmasterol, brassicasterol, Δ5-avenasterol, sitostanol, campestanol, and cholesterol) concentrations in the extracted lipid may be as described in Phillips et al. (2002). Sterols in plant oils are present as free alcohols, esters with fatty acids (esterified sterols), glycosides and acylated glycosides of sterols. Sterol concentrations in naturally occurring vegetable oils (seedoils) ranges up to a maximum of about 1100 mg/100 g. Hydrogenated palm oil has one of the lowest concentrations of naturally occurring vegetable oils at about 60 mg/100 g. The recovered or extracted seedoils of the invention preferably have between about 100 and about 1000 mg total sterol/100 g of oil. For use as food or feed, it is preferred that sterols are present primarily as free or esterified forms rather than glycosylated forms. In the seedoils of the present invention, preferably at least 50% of the sterols in the oils are present as esterified sterols, except for soybean seedoil which has about 25% of the sterols esterified. The canola seedoil and rapeseed oil of the invention preferably have between about 500 and about 800 mg total sterol/100 g, with sitosterol the main sterol and campesterol the next most abundant. The corn seedoil of the invention preferably has between about 600 and about 800 mg total sterol/100 g, with sitosterol the main sterol. The soybean seedoil of the invention preferably has between about 150 and about 350 mg total sterol/100 g, with sitosterol the main sterol and stigmasterol the next most abundant, and with more free sterol than esterified sterol. The cottonseed oil of the invention preferably has between about 200 and about 350 mg total sterol/100 g, with sitosterol the main sterol. The coconut oil and palm oil of the invention preferably have between about 50 and about 100 mg total sterol/100 g, with sitosterol the main sterol. The safflower seedoil of the invention preferably has between about 150 and about 250 mg total sterol/100 g, with sitosterol the main sterol. The peanut seedoil of the invention preferably has between about 100 and about 200 mg total sterol/100 g, with sitosterol the main sterol. The sesame seedoil of the invention preferably has between about 400 and about 600 mg total sterol/100 g, with sitosterol the main sterol. The sunflower seedoil of the invention preferably has between about 200 and 400 mg total sterol/100 g, with sitosterol the main sterol. Oils obtained from vegetative plant parts according to the invention preferably have less than 200 mg total sterol/100 g, more preferably less than 100 mg total sterol/100 g, and most preferably less than 50 mg total sterols/100 g, with the majority of the sterols being free sterols.

As used herein, the term "seedoil" refers to a composition obtained from the seed/grain of a plant which comprises at least 60% (w/w) lipid, or obtainable from the seed/grain if the seedoil is still present in the seed/grain. That is, seedoil of the invention includes seedoil which is present in the seed/grain or portion thereof, as well as seedoil which has been extracted from the seed/grain. The seedoil is preferably extracted seedoil. Seedoil is typically a liquid at room temperature. Preferably, the total fatty acid (TFA) content in the seedoil predominantly (>50%) comprises fatty acids that are at least 16 carbons in length. More preferably, at least 50% of the total fatty acids in the seedoil are C18 fatty acids for example, oleic acid. The fatty acids are typically in an esterified form such as for example, TAG, DAG, acyl-CoA or phospholipid. The fatty acids may be free fatty acids and/or in an esterified form. In an embodiment, at least 50%, more preferably at least 70%, more preferably at least 80%, more preferably at least 90%, more preferably at least 91%, more preferably at least 92%, more preferably at least 93%, more preferably at least 94%, more preferably at least 95%, more preferably at least 96%, more preferably at least 97%, more preferably at least 98%, more preferably at least 99% of the fatty acids in seedoil of the invention can be found as TAG. In an embodiment, seedoil of the invention is "substantially purified" or "purified" oil that has been separated from one or more other lipids, nucleic acids, polypeptides, or other contaminating molecules with which it is associated in the seed or in a crude extract. It is preferred that the substantially purified seedoil is at least 60% free, more preferably at least 75% free, and more preferably, at least 90% free from other components with which it is associated in the seed or extract. Seedoil of the invention may further comprise non-fatty acid molecules such as, but not limited to, sterols. In an embodiment, the seedoil is canola oil (*Brassica* sp. such as *Brassica carinata, Brassica juncea, Brassica napobrassica, Brassica napus*) mustard oil (*Brassica juncea*), other *Brassica* oil (e.g., *Brassica napobrassica, Brassica camelina*), sunflower oil (*Helianthus* sp. such as *Helianthus annuus*), linseed oil (*Linum usitatissimum*), soybean oil (*Glycine max*), safflower oil (*Carthamus tinctorius*), corn oil (*Zea mays*), tobacco oil (*Nicotiana* sp. such as *Nicotiana tabacum* or *Nicotiana benthamiana*), peanut oil (*Arachis hypogaea*), palm oil (*Elaeis guineensis*), cottonseed oil (*Gossypium hirsutum*), coconut oil (*Cocos nucifera*), avocado oil (*Persea americana*), olive oil (*Olea europaea*), cashew oil (*Anacardium occidentale*), macadamia oil (*Macadamia intergrifolia*), almond oil (*Prunus* amygdalus), oat seed oil (*Avena sativa*), rice oil (*Oryza* sp. such as *Oryza sativa* and *Oryza glaberrima*), *Arabidopsis* seed oil (*Arabidopsis thaliana*), or oil from the seed of *Acrocomia aculeata* (macauba palm), *Aracinis hypogaea* (peanut), *Astrocaryum murumuru* (murumuru), *Astrocaryum vulgare* (tucumã), *Attalea geraensis* (Indaiá-rateiro), *Attalea humilis* (American oil palm), *Attalea oleifera* (andaiá), *Attalea phalerata* (uricuri), *Attalea speciosa* (babassu), *Beta vulgaris* (sugar beet), *Camelina sativa* (false flax), *Caryocar brasiliense* (pequi), *Crambe abyssinica* (Abyssinian kale), *Cucumis melo* (melon), *Hordeum vulgare* (barley), *Jatropha curcas* (physic nut), *Joannesia princeps* (arara nut-tree), *Licania rigida* (oiticica), *Lupinus angustifolius* (lupin), *Mauritia flexuosa* (buriti palm), *Maximiliana maripa* (inaja palm), *Miscanthus* sp. such as *Miscanthus* x *giganteus* and *Miscanthus sinensis, Oenocarpus bacaba* (bacaba-do-azeite), *Oenocarpus bataua* (patauã), *Oenocarpus distichus* (bacaba-de-leque), *Panicum virgatum* (switchgrass), *Paraqueiba paraensis* (mari), *Persea amencana* (avocado), *Pongamia pinnata* (Indian beech), *Populus trichocarpa, Ricinus communis* (castor), *Saccharum* sp. (sugarcane), *Sesamum indicum* (sesame), *Solanum tuberosum* (potato), *Sorghum* sp. such as *Sorghum* bicolor, *Sorghum vulgare*, needle palm) and *Triticum* sp. (wheat) such as *Triticum aestivum*. Seedoil may be extracted from seed/grain by any method known in the art. This typically involves extraction with nonpolar solvents such as diethyl ether, petroleum ether, chloroform/methanol or butanol mixtures, generally associated with first crushing of the seeds. Lipids associated with the starch in the grain may be extracted with water-saturated butanol. The seedoil may be "de-gummed" by methods known in the art to remove polysaccharides or treated in other ways to remove contaminants or improve purity, stability, or colour. The TAGs and other esters in the seedoil may be hydrolysed to release free fatty acids, or the seedoil hydrogenated, treated chemically, or enzymatically as known in the art.

As used herein, the term "fatty acid" refers to a carboxylic acid with an aliphatic tail of at least 8 carbon atoms in length, either saturated or unsaturated. Preferred fatty acids have a carbon-carbon bonded chain of at least 12 carbons in length. Most naturally occurring fatty acids have an even number of carbon atoms because their biosynthesis involves acetate which has two carbon atoms. The fatty acids may be in a free state (non-esterified) or in an esterified form such as part of a TAG, DAG, MAG, acyl-CoA (thio-ester) bound, acyl-ACP bound, or other covalently bound form. When covalently bound in an esterified form, the fatty acid is referred to herein as an "acyl" group. The fatty acid may be esterified as a phospholipid such as a phosphatidylcholine (PC), phosphatidylethanolamine, phosphatidylserine, phosphatidylglycerol, phosphatidylinositol, or diphosphatidylglycerol. Saturated fatty acids do not contain any double bonds or other functional groups along the chain. The term "saturated" refers to hydrogen, in that all carbons (apart from the carboxylic acid [—COOH] group) contain as many hydrogens as possible. In other words, the omega (ω) end contains 3 hydrogens (CH3—) and each carbon within the chain contains 2 hydrogens (—CH2—). Unsaturated fatty acids are of similar form to saturated fatty acids, except that one or more alkene functional groups exist along the chain, with each alkene substituting a singly-bonded "—CH2—CH2—" part of the chain with a doubly-bonded "—CH═CH—" portion (that is, a carbon double bonded to another carbon). The two next carbon atoms in the chain that are bound to either side of the double bond can occur in a cis or trans configuration.

As used herein, the terms "monounsaturated fatty acid" or "MUFA" refer to a fatty acid which comprises at least 12 carbon atoms in its carbon chain and only one alkene group (carbon-carbon double bond), which may be in an esterified or non-esterified (free) form. As used herein, the terms "polyunsaturated fatty acid" or "PUFA" refer to a fatty acid which comprises at least 12 carbon atoms in its carbon chain and at least two alkene groups (carbon-carbon double bonds), which may be in an esterified or non-esterified form.

As used herein, a fatty acid with a "medium chain length", also referred to as "MCFA", comprises an acyl chain of 8 to 14 carbons. The acyl chain may be modified (for example it may comprise one or more double bonds, a hydroxyl group, an expoxy group, etc) or unmodified (saturated). This terms at least includes one or more or all of caprylic acid (C8:0), capric acid (C10:0), lauric acid (C12:0), and myristic acid (C14:0).

"Monoacylglyceride" or "MAG" is glyceride in which the glycerol is esterified with one fatty acid. As used herein, MAG comprises a hydroxyl group at an sn-1/3 (also referred to herein as sn-1 MAG or 1-MAG or 1/3-MAG) or sn-2 position (also referred to herein as 2-MAG), and therefore MAG does not include phosphorylated molecules such as PA or PC. MAG is thus a component of neutral lipids in a cell.

"Diacylglyceride" or "DAG" is glyceride in which the glycerol is esterified with two fatty acids which may be the same or, preferably, different. As used herein, DAG comprises a hydroxyl group at a sn-1,3 or sn-2 position, and therefore DAG does not include phosphorylated molecules such as PA or PC. DAG is thus a component of neutral lipids in a cell. In the Kennedy pathway of DAG synthesis (FIG. 1), the precursor sn-glycerol-3-phosphate (G3P) is esterified to two acyl groups, each coming from a fatty acid coenzyme A ester, in a first reaction catalysed by a glycerol-3-phosphate acyltransferase (GPAT) at position sn-1 to form LysoPA, followed by a second acylation at position sn-2 catalysed by a lysophosphatidic acid acyltransferase (LPAAT) to form phosphatidic acid (PA). This intermediate is then de-phosphorylated by PAP to form DAG. DAG may also be formed from TAG by removal of an acyl group by a lipase, or from PC essentially by removal of a choline headgroup by any of the enzymes PDCT, PLC or PLD (FIG. 1).

"Triacylglyceride" or "TAG" is glyceride in which the glycerol is esterified with three fatty acids which may be the same (e.g. as in tri-olein) or, more commonly, different. In the Kennedy pathway of TAG synthesis, DAG is formed as described above, and then a third acyl group is esterified to the glycerol backbone by the activity of DGAT. Alternative pathways for formation of TAG include one catalysed by the enzyme PDAT (FIG. 1) and the MGAT pathway described herein.

As used herein, the term "wild-type" or variations thereof refers to a vegetative plant part, cell, seed or non-human organism or part thereof, such as a tuber or beet, that has not been genetically modified, such as comprise an exogenous polynucleotyide(s), according to this invention.

The term "corresponding" refers to a vegetative plant part, a cell, seed or non-human organism or part thereof (such as a tuber or beet) that has the same or similar genetic background as a vegetative plant part, a cell, seed or non-human organism or part thereof of the invention but which has not been modified as described herein (for example, a vegetative plant part, a cell, seed or non-human organism or part thereof which lacks the exogenous polynucleotide(s) and/or lacks the genetic modification(s)). In a preferred embodiment, the corresponding vegetative plant part, eukaryotic cell, seed or non-human organism or part thereof is at the same developmental stage as the vegetative plant part, eukaryotic cell, seed or non-human organism or part thereof of the invention. For example, if the non-human organism is a flowering plant, then preferably the corresponding plant is also flowering. A corresponding vegetative plant part, eukaryotic cell, seed or non-human organism or part thereof, can be used as a control to compare levels of nucleic acid or protein expression, or the extent and nature of trait modification, for example non-polar lipid production and/or content, with the vegetative plant part, eukaryotic cell, seed or non-human organism or part thereof of the invention which is modified as described herein. A person skilled in the art is readily able to determine an appropriate "corresponding" vegetative plant part, eukaryotic cell, seed or non-human organism or part thereof, tissue, organ or organism for such a comparison.

As used herein, "compared with" or "relative to" refers to comparing levels of a non-polar lipid, total non-polar lipid content, fatty acid content or other parameter of the vegetative plant part, eukaryotic cell, seed, non-human organism or part thereof (such as a tuber or beet) expressing the one or more exogenous polynucleotides or exogenous polypeptides with a vegetative plant part, eukaryotic cell, seed, non-human organism or part thereof lacking the one or more exogenous polynucelotides or polypeptides.

As used herein, "enhanced ability to produce non-polar lipid" is a relative term which refers to the total amount of non-polar lipid being produced by a vegetative plant part, eukaryotic cell, seed or non-human organism or part thereof (such as a tuber or beet) of the invention being increased relative to a corresponding vegetative plant part, eukaryotic cell, seed or non-human organism or part thereof. In one embodiment, the TAG and/or polyunsaturated fatty acid content, or the oleic acid content in the total fatty acid content of the non-polar lipid is increased, or the linolenic acid content in the total fatty acid content of the non-polar lipid is decreased, for example by at least 2% in absolute terms.

As used herein, "synergism", "synergistic", "acting synergistically" and related terms are each a comparative term that means that the effect of a combination of elements present in a cell, plant or part thereof of the invention, for example a combination of elements A and B, is greater than the sum of the effects of the elements separately in corresponding cells, plants or parts thereof, for example the sum of the effect of A and the effect of B. Where more than two elements are present in the cell, plant or part thereof, for example elements A, B and C, it means that the effect of the combination of all of the elements is greater than the sum of the effects of the individual effects of the elements. In a preferred embodiment, it means that the effect of the combination of elements A, B and C is greater than the sum of the effect of elements A and B combined and the effect of element C. In such a case, it can be said that element C acts synergistically with elements A and B. As would be understood, the effects are measured in corresponding cells, plants or parts thereof, for example grown under the same conditions and at the same stage of biological development.

As used herein, "germinate at a rate substantially the same as for a corresponding wild-type plant" refers to seed of a plant of the invention being relatively able to germinate when compared to seed of a wild-type plant lacking the defined exogenous polynucleotide(s). Germination may be measured in vitro on tissue culture medium or in soil as occurs in the field. In one embodiment, the number of seeds which germinate, for instance when grown under optimal greenhouse conditions for the plant species, is at least 75%, more preferably at least 90%, when compared to corresponding wild-type seed. In another embodiment, the seeds which germinate, for instance when grown under optimal glasshouse conditions for the plant species, produce seedlings which grow at a rate which, on average, is at least 75%, more preferably at least 90%, when compared to corresponding wild-type plants. This is referred to as "seedling vigour". In an embodiment, the rate of initial root growth and shoot growth of seedlings of the invention is essentially the same compared to a corresponding wild-type seedling grown under the same conditions. In an embodiment, the leaf biomass (dry weight) of the plants of the invention is at least 80%, preferably at least 90%, of the leaf biomass relative to a corresponding wild-type plant grown under the same conditions, preferably in the field. In an embodiment, the height of the plants of the invention is at least 70%, preferably at least 80%, more preferably at least 90%, of the plant height relative to a corresponding wild-type plant grown under the same conditions, preferably in the field and preferably at maturity.

As used herein, the term "an exogenous polynucleotide which down-regulates the production and/or activity of an endogenous polypeptide" or variations thereof, refers to a polynucleotide that encodes an RNA molecule (for example, encoding an amiRNA or hpRNAi) that down-regulates the production and/or activity, or itself down-regulates the production and/or activity (for example, is an amiRNA or hpRNA which can be delivered directly to, for example, a cell) of an endogenous polypeptide for example, SDP1 TAG lipase, plastidial GPAT, plastidial LPAAT, TGD polypeptide, AGPase, or delta-12 fatty acid desturase (FAD2), or a combination of two or more thereof. Typically, the RNA molecule decreases the expression of an endogenous gene encoding the polypeptide.

As used herein, the term "on a weight basis" refers to the weight of a substance (for example, TAG, DAG, fatty acid) as a percentage of the weight of the composition comprising the substance (for example, seed, leaf). For example, if a transgenic seed has 25 μg total fatty acid per 120 μg seed weight; the percentage of total fatty acid on a weight basis is 20.8%.

As used herein, the term "on a relative basis" refers to a parameter such as the amount of a substance in a composition comprising the substance in comparison with the parameter for a corresponding composition, as a percentage. For example, a reduction from 3 units to 2 units is a reduction of 33% on a relative basis.

As used herein, "plastids" are organelles in plants, including algae, which are the site of manufacture of carbon-based compounds from photosynthesis including sugars, starch and fatty acids. Plastids include chloroplasts which contain chlorophyll and carry out photosynthesis, etioplasts which are the predecessors of chloroplasts, as well as specialised plastids such as chromoplasts which are coloured plastids for synthesis and storage of pigments, gerontoplasts which control the dismantling of the photosynthetic apparatus during senescence, amyloplasts for starch synthesis and storage, elaioplasts for storage of lipids, and proteinoplasts for storing and modifying proteins.

As used herein, the term "biofuel" refers to any type of fuel, typically as used to power machinery such as automobiles, planes, boats, trucks or petroleum powered motors, whose energy is derived from biological carbon fixation. Biofuels include fuels derived from biomass conversion, as well as solid biomass, liquid fuels and biogases. Examples of biofuels include bioalcohols, biodiesel, synthetic diesel, vegetable oil, bioethers, biogas, syngas, solid biofuels, algae-derived fuel, biohydrogen, biomethanol, 2,5-Dimethylfuran (DMF), biodimethyl ether (bioDME), Fischer-Tropsch diesel, biohydrogen diesel, mixed alcohols and wood diesel.

As used herein, the term "bioalcohol" refers to biologically produced alcohols, for example, ethanol, propanol and butanol. Bioalcohols are produced by the action of microorganisms and/or enzymes through the fermentation of sugars, hemicellulose or cellulose.

As used herein, the term "biodiesel" refers to a composition comprising fatty acid methyl- or ethyl-esters derived from lipids by transesterification, the lipids being from living cells not fossil fuels.

As used herein, the term "synthetic diesel" refers to a form of diesel fuel which is derived from renewable feedstock rather than the fossil feedstock used in most diesel fuels.

As used herein, the term "vegetable oil" includes a pure plant oil (or straight vegetable oil) or a waste vegetable oil (by product of other industries), including oil produced in either a vegetative plant part or in seed.

As used herein, the term "biogas" refers to methane or a flammable mixture of methane and other gases produced by anaerobic digestion of organic material by anaerobes.

As used herein, the term "syngas" refers to a gas mixture that contains varying amounts of carbon monoxide and hydrogen and possibly other hydrocarbons, produced by partial combustion of biomass. Syngas may be converted into methanol in the presence of catalyst (usually copper-based), with subsequent methanol dehydration in the presence of a different catalyst (for example, silica-alumina).

As used herein, the term "Fischer-Tropsch" refers to a set of chemical reactions that convert a mixture of carbon monoxide and hydrogen into liquid hydrocarbons. The syngas can first be conditioned using for example, a water gas shift to achieve the required $H_2/CO$ ratio. The conversion takes place in the presence of a catalyst, usually iron or cobalt. The temperature, pressure and catalyst determine whether a light or heavy syncrude is produced. For example at 330° C. mostly gasoline and olefins are produced whereas at 180° to 250° ° C. mostly diesel and waxes are produced. The liquids produced from the syngas, which comprise various hydrocarbon fractions, are very clean (sulphur free) straight-chain hydrocarbons.

As used herein, the term "biochar" refers to charcoal made from biomass, for example, by pyrolysis of the biomass.

As used herein, the term "feedstock" refers to a material, for example, biomass or a conversion product thereof (for example, syngas) when used to produce a product, for example, a biofuel such as biodiesel or a synthetic diesel.

As used herein, the term "industrial product" refers to a hydrocarbon product which is predominantly made of carbon and hydrogen such as fatty acid methyl- and/or ethyl-esters or alkanes such as methane, mixtures of longer chain alkanes which are typically liquids at ambient temperatures, a biofuel, carbon monoxide and/or hydrogen, or a bioalcohol such as ethanol, propanol, or butanol, or biochar. The term "industrial product" is intended to include intermediary products that can be converted to other industrial products, for example, syngas is itself considered to be an industrial product which can be used to synthesize a hydrocarbon product which is also considered to be an industrial product. The term industrial product as used herein includes both pure forms of the above compounds, or more commonly a mixture of various compounds and components, for example the hydrocarbon product may contain a range of carbon chain lengths, as well understood in the art.

As used herein, "progeny" means the immediate and all subsequent generations of offspring produced from a parent, for example a second, third or later generation offspring.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The term "and/or", e.g., "X and/or Y" shall be understood to mean either "X and Y" or "X or Y" and shall be taken to provide explicit support for both meanings or for either meaning.

As used herein, the term about, unless stated to the contrary, refers to +/−10%, more preferably +/−5%, more preferably +/−2%, more preferably +/−1%, even more preferably +/−0.5%, of the designated value.

Production of Non-Polar Lipids and Triacylglycerols

The present invention is based on the finding that the non-polar lipid content in recombinant eukaryotic cells can be increased by a combination of modifications selected from those designated herein as: (A). Push, (B). Pull, (C). Protect, (D). Package, (E). Plastidial Export, (F). Plastidial Import and (G). Prokaryotic Pathway. As described herein, cells without plastids can comprise various combinations of A-D, whereas cells with plastids, such as plant and algal cells, can comprise various combinations of A-G.

Recombinant cells, transgenic non-human animals or a part thereof, and transgenic plants or part thereof, of the invention therefore have a number of combinations of exogenous polynucleotides and/or genetic modifications each of which provide for one of the modifications. These exogenous polynucleotides and/or genetic modifications include:

(A) an exogenous polynucleotide which encodes a transcription factor polypeptide that increases the expression of one or more glycolytic and/or fatty acid biosynthetic genes in the cell, transgenic non-human animal or a part thereof, or transgenic plant or part thereof, providing the “Push” modification, (B) an exogenous polynucleotide which encodes a polypeptide involved in the biosynthesis of one or more non-polar lipids in the cell, transgenic non-human animal or a part thereof, or transgenic plant or part thereof, providing the “Pull” modification, (C) a genetic modification which down-regulates endogenous production and/or activity of a polypeptide involved in the catabolism of triacylglycerols (TAG) in the cell, transgenic non-human animal or a part thereof, or transgenic plant or part thereof when compared to a corresponding the cell, transgenic non-human animal or a part thereof, or transgenic plant or part thereof lacking the genetic modification, providing the “Protect” modification, (D) an exogenous polynucleotide which encodes an oil body coating (OBC) polypeptide, providing the “Package” modification, (E) an exogenous polynucleotide which encodes a polypeptide which increases the export of fatty acids out of plastids of the cell, transgenic non-human animal or a part thereof, or transgenic plant or part thereof, when compared to a corresponding cell, transgenic non-human animal or a part thereof, or transgenic plant or part thereof lacking the exogenous polynucleotide, providing the “Plastidial Export” modification, (F) a genetic modification which down-regulates endogenous production and/or activity of a polypeptide involved in importing fatty acids into plastids of the cell, transgenic non-human animal or a part thereof, or transgenic plant or part thereof when compared to a corresponding cell, transgenic non-human animal or a part thereof, or transgenic plant or part thereof lacking the genetic modification, providing the “Plastidial Import” modification, and G) a genetic modification which down-regulates endogenous production and/or activity of a polypeptide involved in diacylglycerol (DAG) production in the plastid of the cell, transgenic non-human animal or a part thereof, or transgenic plant or part thereof when compared to a corresponding cell, transgenic non-human animal or a part thereof, or transgenic plant or part thereof lacking the genetic modification, providing the “prokaryotic Pathway” modification.

Preferred combinations (also referred to herein as sets) of exogenous polynucleotides and/or genetic modifications of the invention are;

1) A, B and optionally one of C, D, E, F or G;
2) A, C and optionally one of D, E, F or G;
3) A, D and optionally one of E, F or G;
4) A, E and optionally F or G;
5) A, F and optionally G;
6) A and G;
7) A, B, C and optionally one of D, E, F or G;
8) A, B, D and optionally one of E, F or G;
9) A, B, E and optionally F or G;
10) A, B, F and optionally G;
11) A, B, C, D and optionally one of E, F or G;
12) A, B, C, E and optionally F or G;
13) A, B, C, F and optionally G;
14) A, B, D, E and optionally F or G;
15) A, B, D, F and optionally G;
16) A, B, E, F and optionally G;
17) A, C, D and optionally one of E, F or G;
18) A, C, E and optionally F or G;
19) A, C, F and optionally G;
20) A, C, D, E and optionally F or G;
21) A, C, D, F and optionally G;
22) A, C, E, F and optionally a fifth modification G;
23) A, D, E and optionally F or G;
24) A, D, F and optionally G;
25) A, D, E, F and optionally G;
26) A, E, F and optionally G;
27) Six of A, B, C, D, E, F and G omitting one of A, B, C, D, E, F or G, and
28) Any one of 1-26 above where there are two or more exogenous polynucleotides encoding two or more different transcription factor polypeptides that increases the expression of one or more glycolytic and/or fatty acid biosynthetic genes in the cell, for example one exogenous polynucleotide encoding WRI1 and another exogenous polynucleotide encoding LEC2.

In each of the above preferred combinations there may be at least two different exogenous polynucleotides which encode at least two different transcription factor polypeptides that increases the expression of one or more glycolytic and/or fatty acid biosynthetic genes in the cell, transgenic non-human animal or a part thereof, or transgenic plant or part thereof.

These modifications are described as follows:

A. The “Push” modification is characterised by an increased synthesis of total fatty acids in the plastids of the eukaryotic cell. In an embodiment, this occurs by the increased expression and/or activity of a transcription factor which regulates fatty acid synthesis in the plastids. In one embodiment, this can be achieved by expressing in a transgenic cell an exogenous polynucleotide which encodes a transcription factor polypeptide that increases the expression of one or more glycolytic and/or fatty acid biosynthetic genes in the cell. In an embodiment, the increased fatty acid synthesis is not caused by the provision to the cell of an altered ACCase whose activity is less inhibited by fatty acids, relative to the endogenous ACCase in the cell. In an embodiment, the cell comprises an exogenous polynucleotide which encodes the transcription factor, preferably under the control of a promoter other than a constitutive promoter. The transcription factor may be selected from the group consisting of WRI1, LEC1, LEC1-like, LEC2, BBM, FUS3, ABI3, ABI4, ABI5, Dof4, Dof11 or the group consisting of MYB73, bZIP53, AGL15, MYB115, MYB118, TANMEI, WUS, GFR2a1, GFR2a2 and PHR1, and is preferably WRI1, LEC1 or LEC2. In a further embodiment, the increased synthesis of total fatty acids is relative to a corresponding wild-type cell. In an embodiment, there are two or more exogenous polynucleotides encoding two or more different transcription factor polypeptides.

B. The “Pull” modification is characterised by increased expression and/or activity in the cell of a fatty acyl acyltransferase which catalyses the synthesis of TAG, DAG or MAG in the cell, such as a DGAT, PDAT, LPAAT, GPAT or MGAT, preferably a DGAT or a PDAT. In one embodiment, this can be achieved by expressing in a transgenic cell an exogenous polynucleotide which encodes a polypeptide involved in the biosynthesis of one or more non-polar lipids. In an embodiment, the acyltransferase is a membrane-bound acyltransferase that uses an acyl-CoA substrate as the acyl donor in the case of DGAT, LPAAT, GPAT or MGAT, or an acyl group from PC as the acyl donor in the case of PDAT. The Pull modification can be relative to a corresponding wild-type cell or, preferably, relative to a corresponding cell which has the Push modification. In an embodiment, the cell comprises an exogenous polynucleotide which encodes the fatty acyl acyltransferase.

C. The "Protect" modification is characterised by a reduction in the catabolism of triacylglycerols (TAG) in the cell. In an embodiment, this can be achieved through a genetic modification in the cell which down-regulates endogenous production and/or activity of a polypeptide involved in the catabolism of triacylglycerols (TAG) in the cell when compared to a corresponding cell lacking the genetic modification. In embodiment, the cell has a reduced expression and/or activity of an endogenous TAG lipase in the cell, preferably an SDP1 lipase, a Cgi58 polypeptide, an acyl-CoA oxidase such as the ACX1 or ACX2, or a polypeptide involved in β-oxidation of fatty acids in the cell such as a PXA1 peroxisomal ATP-binding cassette transporter. This may occur by expression in the cell of an exogenous polynucleotide which encodes an RNA molecule which reduces the expression of, for example, an endogenous gene encoding the TAG lipase such as the SDP1 lipase, acyl-CoA oxidase or the polypeptide involved in β-oxidation of fatty acids in the cell, or by a mutation in an endogenous gene encoding, for example, the TAG lipase, acyl-CoA oxidase or polypeptide involved in β-oxidation of fatty acids. In an embodiment, the reduced expression and/or activity is relative to a corresponding wild-type cell or relative to a corresponding cell which has the Push modification.

D. The "Package" modification is characterised by an increased expression and/or accumulation of an oil body coating (OBC) polypeptide. In an embodiment, this can be achieved by expressing in a transgenic cell an exogenous polynucleotide which encodes an oil body coating (OBC) polypeptide. The OBC polypeptide may be an oleosin, such as for example a polyoleosin, a caoleosin or a steroleosin, or preferably an LDAP. In an embodiment, the level of oleosin that is accumulated in the eukaryotic cell is at least 2-fold higher relative to the corresponding cell comprising the oleosin gene from the T-DNA of pJP3502. In an embodiment, the increased expression or accumulation of the OBC polypeptide is not caused solely by the Push modification. In an embodiment, the expression and/or accumulation is relative to a corresponding wild-type cell or, preferably, relative to a corresponding cell which has the Push modification.

E. The "Plastidial Export" modification is characterised by an increased rate of export of total fatty acids out of the plastids of the eukaryotic cell. In one embodiment, this can be achieved by expressing in a transgenic cell an exogenous polynucleotide which encodes a polypeptide which increases the export of fatty acids out of plastids of the cell when compared to a corresponding cell lacking the exogenous polynucleotide. In an embodiment, this occurs by the increased expression and/or activity of a fatty acid thioesterase (TE), a fatty acid transporter polypeptide such as an ABCA9 polypeptide, or a long-chain acyl-CoA synthetase (LACS). In an embodiment, the cell comprises an exogenous polynucleotide which encodes the TE, fatty acid transporter polypeptide or LACS. The TE may be a FATB polypeptide or preferably a FATA polypeptide. In an embodiment, the TE is preferably a TE with specificity for MCFA. In an embodiment, the Plastidial Export modification is relative to a corresponding wild-type cell or, preferably, relative to a corresponding cell which has the Push modification.

F. The "Plastidial Import" modification is characterised by a reduced rate of import of fatty acids into the plastids of the cell from outside of the plastids. In an embodiment, this can be achieved through a genetic modification in the cell which down-regulates endogenous production and/or activity of a polypeptide involved in importing fatty acids into plastids of the cell when compared to a corresponding cell lacking the genetic modification. For example, this may occur by expression in the cell of an exogenous polynucleotide which encodes an RNA molecule which reduces the expression of an endogenous gene encoding an transporter polypeptide such as a TGD polypeptide, for example a TGD1, TGD2, TGD3 or TGD4 polypeptide, or by a mutation in an endogenous gene encoding the TGD polypeptide. In an embodiment, the reduced rate of import is relative to a corresponding wild-type cell or relative to a corresponding cell which has the Push modification.

G. The "Prokaryotic Pathway" modification is characterised by a decreased amount of DAG or rate of production of DAG in the plastids of the cell. In an embodiment, this can be achieved through a genetic modification in the cell which down-regulates endogenous production and/or activity of a polypeptide involved in diacylglycerol (DAG) production in the plastid when compared to a corresponding cell lacking the genetic modification. In an embodiment, the decreased amount or rate of production of DAG occurs by a decreased production of LPA from acyl-ACP and G3P in the plastids. The decreased amount or rate of production of DAG may occur by expression in the cell of an exogenous polynucleotide which encodes an RNA molecule which reduces the expression of an endogenous gene encoding a plastidial GPAT, plastidial LPAAT or a plastidial PAP, preferably a plastidial GPAT, or by a mutation in an endogenous gene encoding the plastidial polypeptide. In an embodiment, the decreased amount or rate of production of DAG is relative to a corresponding wild-type cell or, preferably, relative to a corresponding cell which has the Push modification.

The Push modification is essential to the invention, and the Pull modification is preferred. The Protect and Package modifications may be complementary i.e. one of the two may be sufficient. The cell may comprise one, two or all three of the Plastidial Export, Plastidial Import and Prokaryotic Pathway modifications. In an embodiment, at least one of the exogenous polynucleotides in the cell, preferably at least the exogenous polynucleotide encoding the transcription factor which regulates fatty acid synthesis in the plastids, is expressed under the control of (H) a promoter other than a constitutive promoter such as, for example, a developmentally related promoter, a promoter that is preferentially active in photosynthetic cells, a tissue-specific promoter, a promoter which has been modified by reducing its expression level relative to a corresponding native promoter, or is preferably a senesence-specific promoter. More preferably, at least the exogenous polynucleotide encoding the transcription factor which regulates fatty acid synthesis in the plastids is expressed under the control of a promoter other than a constitutive promoter and the exogenous polynucleotide which encodes an RNA molecule which down-regulates endogenous production and/or activity of a polypeptide involved in the catabolism of triacylglycerols is also expressed under the control of a promoter other than a constitutive promoter, which promoters may be the same or different.

Plants produce some, but not all, of their membrane lipids such as MGDG in plastids by the so-called prokaryotic pathway (FIG. 1). In plants, there is also a eukaryotic pathway for synthesis of galactolipids and glycerolipids which synthesizes FA first of all in the plastid and then assembles the FA into glycerolipids in the ER. MGDG synthesised by the eukaryotic pathway contains C18:3 (ALA) fatty acid esterified at the sn-2 position of MGDG.

The DAG backbone including the ALA for the MGDG synthesis by this pathway is assembled in the ER and then imported into the plastid. In contrast, the MGDG synthesized by the prokaryotic pathway contains C16:3 fatty acid esterified at the sn-2 position of MGDG. The ratio of the contribution of the prokaryotic pathway relative to the eukaryotic pathway in producing MGDG (16:3) vs MGDG (18:3) is a characteristic and distinctive feature of different plant species (Mongrand et a1. 1998). This distinctive fatty acid composition of MGDG allows all higher plants (angiosperms) to be classified as either so-called 16:3 or 18:3 plants. 16:3 species, exemplified by *Arabidopsis* and *Brassica napus*, generally have both of the prokaryotic and eukaryotic pathways of MGDG synthesis operating, whereas the 18:3 species exemplified by *Nicotiana tabacum, Pisum sativum* and *Glycine max* generally have only (or almost entirely) the eukaryotic pathway of MGDG synthesis, providing little or no C16:3 fatty acid accumulation in the vegetative tissues. As used herein, a "16:3 plant" or "16:3 species" is one which has more than 2% C16:3 fatty acid in the total fatty acid content of its photosynthetic tissues. As used herein, a "18:3 plant" or "18:3 species" is one which has less than 2% C16:3 fatty acid in the total fatty acid content of its photosynthetic tissues. As described herein, a plant can be converted from being a 16:3 plant to an 18:3 plant by suitable genetic modifications. The proportion of flux between the prokaryote and eukaryote pathways is not conserved across different plant species or tissues. In 16:3 species up to 40% of flux in leaves occurs via the prokaryotic pathway (Browse et al., 1986), while in 18:3 species, such as pea and soybean, about 90% of FAs which are synthesized in the plastid are exported out of the plastid to the ER to supply the source of FA for the eukaryotic pathway (Ohlrogge and Browse, 1995; Somerville et al., 2000).

Therefore different amounts of 18:3 and 16:3 fatty acids are found within the glycolipids of different plant species. This is used to distinguish between 18:3 plants whose fatty acids with 3 double bonds are almost entirely C18 fatty acids and the 16:3 plants that contain both $C_{16}$- and $C_{18}$-fatty acids having 3 double bonds. In chloroplasts of 18:3 plants, enzymic activities catalyzing the conversion of phosphatidate to diacylglycerol and of diacylglycerol to monogalactosyl diacylglycerol (MGD) are significantly less active than in 16:3 chloroplasts. In leaves of 18:3 plants, chloroplasts synthesize stearoyl-ACP2 in the stroma, introduce the first double bond into the saturated hydrocarbon chain, and then hydrolyze the thioester by thioesterases (FIG. 1). Released oleate is exported across chloroplast envelopes into membranes of the eucaryotic part of the cell, probably the endoplasmic reticulum, where it is incorporated into PC. PC-linked oleoyl groups are desaturated in these membranes and subsequently move back into the chloroplast. The MGD-linked acyl groups are substrates for the introduction of the third double bond to yield MGD with two linolenoyl residues. This galactolipid is characteristic of 18:3 plants such as Asteraceae and Fabaceae, for example. In photosynthetically active cells of 16:3 plants which are represented, for example, by members of Apiaceae and Brassicaceae, two pathways operate in parallel to provide thylakoids with MGD.

In one embodiment, the vegetative plant part, eukaryotic cell, seed or transgenic non-human organism or part thereof (such as a tuber or beet) of the invention produces higher levels of non-polar lipids such as TAG, or total fatty acid (TFA) content, preferably both, than a corresponding vegetative plant part, eukaryotic cell, seed or non-human organism or part thereof which lacks the genetic modifications or exogenous polynucleotides. In one example, plants of the invention produce seeds, leaves, or have leaf portions of at least 1 $cm^2$ in surface area, stems and/or tubers having an increased non-polar lipid content such as TAG or TFA content, preferably both, when compared to corresponding seeds, leaves, leaf portions of at least 1 $cm^2$ in surface area, stems or tubers.

In another embodiment, the vegetative plant part, transgenic non-human organism or part thereof (such as a tuber or beet), preferably a plant, tuber, beet or seed, produce TAGs that are enriched for one or more particular fatty acids. A wide spectrum of fatty acids can be incorporated into TAGs, including saturated and unsaturated fatty acids and short-chain and long-chain fatty acids. Some non-limiting examples of fatty acids that can be incorporated into TAGs and which may be increased in level include: capric (10:0), lauric (12:0), myristic (14:0), palmitic (16:0), palmitoleic (16:1), stearic (18:0), oleic (18:1), vaccenic (18:1), linoleic (18:2), eleostearic (18:3), γ-linolenic (18:3), α-linolenic (18:3ω3), stearidonic (18:4ω3), arachidic (20:0), eicosadienoic (20:2), dihomo-γ-linoleic (20:3), eicosatrienoic (20:3), arachidonic (20:4), eicosatetraenoic (20:4), eicosapentaenoic (20:503), behenic (22:0), docosapentaenoic (22:5ω), docosahexaenoic (22:6ω3), lignoceric (24:0), nervonic (24:1), cerotic (26:0), and montanic (28:0) fatty acids. In one embodiment of the present invention, the vegetative plant part, eukaryotic cell, seed or transgenic organism or parts thereof (such as a tuber or beet) is enriched for TAGs comprising oleic acid, and/or is reduced in linolenic acid (ALA), preferably by at least 2% or at least 5% on an absolute basis.

Preferably, the vegetative plant part, eukaryotic cell, seed or transgenic non-human organism or part thereof of the invention are transformed with one or more chimeric DNAs (exogenous polynucleotides). In the case of multiple chimeric DNAs, these are preferably covalently linked on one DNA molecule such as, for example, a single T-DNA molecule, and preferably integrated at a single locus in the host cell genome. Alternatively, the chimeric DNAs are on two or more DNA molecules which may be unlinked in the host genome, or the DNA molecule(s) is not integrated into the host genome, such as occurs in transient expression experiments. The plant, vegetative plant part, eukaryotic cell, seed or transgenic non-human organism or part thereof is preferably homozygous for the one DNA molecule inserted into its genome.

Transcription Factors

Various transcription factors are involved in eukaryotic cells in the synthesis of fatty acids and lipids incorporating the fatty acids such as TAG, and therefore can be manipulated for the Push modification. A preferred transcription factor is WRI1. As used herein, the term "Wrinkled 1" or "WRI" or "WRL1" refers to a transcription factor of the AP2/ERWEBP class which regulates the expression of several enzymes involved in glycolysis and de novo fatty acid biosynthesis. WRI1 has two plant-specific (AP2/EREB) DNA-binding domains. WRI1 in at least *Arabidopsis* also regulates the breakdown of sucrose via glycolysis thereby regulating the supply of precursors for fatty acid biosynthesis. In other words, it controls the carbon flow from the photosynthate to storage lipids. wri1 mutants in at least *Arabidopsis* have a wrinkled seed phenotype, due to a defect in the incorporation of sucrose and glucose into TAGs.

Examples of genes which are transcribed by WRI1 include, but are not limited to, one or more, preferably all, of genes encoding pyruvate kinase (At5g52920, At3g22960), pyruvate dehydrogenase (PDH) E1alpha subunit (At1g01090), acetyl-CoA carboxylase (ACCase), BCCP2 subunit (At5g15530), enoyl-ACP reductase (At2g05990; EAR), phosphoglycerate mutase (At1g22170), cytosolic fructokinase, and cytosolic phosphoglycerate mutase, sucrose synthase (SuSy) (see, for example, Liu et al., 2010b; Baud et al., 2007; Ruuska et al., 2002).

WRI1 contains the conserved domain AP2 (cd00018). AP2 is a DNA-binding domain found in transcription regulators in plants such as APETALA2 and EREBP (ethylene responsive element binding protein). In EREBPs the domain specifically binds to the 11 bp GCC box of the ethylene response element (ERE), a promotor element essential for ethylene responsiveness. EREBPs and the C-repeat binding factor CBF1, which is involved in stress response, contain a single copy of the AP2 domain. *APETALA2*-like proteins, which play a role in plant development contain two copies.

Other sequence motifs which may be found in WRI1 and its functional homologs include:

```
                                    (SEQ ID NO: 89)
1. R G V T/S R H R W T G R.
                                    (SEQ ID NO: 90)
2. F/Y E A H L W D K.
                                    (SEQ ID NO: 91)
3. D L A A L K Y W G.
                                    (SEQ ID NO: 92)
4. S X G F S/A R G X.
                                    (SEQ ID NO: 93)
5. H H H/Q N G R/K W E A R I G R/K V.
                                    (SEQ ID NO: 94)
6. Q E E A A A X Y D.
```

As used herein, the term "Wrinkled 1" or "WRI1" also includes "Wrinkled 1-like" or "WRI1-like" proteins. Examples of WRI1 proteins include Accession Nos: Q6X5Y6, (*Arabidopsis thaliana*; SEQ ID NO:22), XP_002876251.1 (*Arabidopsis lyrata* subsp. *Lyrata*, SEQ ID NO:23), ABD16282.1 (*Brassica napus*; SEQ ID NO:24), ADO16346.1 (*Brassica napus*; SEQ ID NO:25), XP_003530370.1 (*Glycine max*; SEQ ID NO:26), AEO22131.1 (*Jatropha curcas*; SEQ ID NO:27), XP_002525305.1 (*Ricimis communis*; SEQ ID NO:28), XP_002316459.1 (*Populus trichocarpa*; SEQ ID NO:29), CBI29147.3 (*Vitis vinifera*; SEQ ID NO:30), XP_003578997.1 (*Brachypodium distachyon*; SEQ ID NO:31), BAJ86627.1 (*Hordeum vulgare* subsp. *vulgare*; SEQ ID NO:32), EAY79792.1 (*Oryza sativa*; SEQ ID NO:33), XP_002450194.1 (*Sorghum bicolor*; SEQ ID NO:34), ACG32367.1 (*Zea mays*; SEQ ID NO:35), XP_003561189.1 (*Brachypodium distachyon*; SEQ ID NO:36), ABL85061.1 (*Brachypodium sylvaticum*; SEQ ID NO:37), BAD68417.1 (*Oryza sativa*; SEQ ID NO:38), XP_002437819.1 (*Sorghum bicolor*; SEQ ID NO:39), XP_002441444.1 (*Sorghum bicolor*; SEQ ID NO:40), XP_003530686.1 (*Glycine max*; SEQ ID NO:41), XP_003553203.1 (*Glycine max*; SEQ ID NO:42), XP_002315794.1 (*Populus trichocarpa*; SEQ ID NO:43), XP_002270149.1 (*Vitis vinifera*; SEQ ID NO:44), XP_003533548.1 (*Glycine max*; SEQ ID NO:45), XP_003551723.1 (*Glycine max*; SEQ ID NO:46), XP_003621117.1 (*Medicago truncatula*; SEQ ID NO:47), XP_002323836.1 (*Populus trichocarpa*; SEQ ID NO:48), XP_002517474.1 (*Ricinus communis*; SEQ ID NO:49), CAN79925.1 (*Vitis vinifera*; SEQ ID NO:50), XP_003572236.1 (*Brachypodium distachyon*; SEQ ID NO:51), BAD10030.1 (*Oryza sativa*; SEQ ID NO:52), XP_002444429.1 (*Sorghum bicolor*; SEQ ID NO:53), NP_001170359.1 (*Zea mays*; SEQ ID NO:54), XP_002889265.1 (*Arabidopsis lyrata* subsp. *lyrata*; SEQ ID NO:55), AAF68121.1 (*Arabidopsis thaliana*; SEQ ID NO:56), NP_178088.2 (*Arabidopsis thaliana*; SEQ ID NO:57), XP_002890145.1 (*Arabidopsis lyrata* subsp. *lyrata*; SEQ ID NO:58), BAJ33872.1 (*Thellungiella halophila*; SEQ ID NO:59), NP_563990.1 (*Arabidopsis thaliana*; SEQ ID NO:60), XP_003530350.1 (*Glycine max*; SEQ ID NO:61), XP_003578142.1 (*Brachypodium distachyon*; SEQ ID NO:62), EAZ09147.1 (*Oryza sativa*; SEQ ID NO:63), XP_002460236.1 (*Sorghum bicolor*; SEQ ID NO:64), NP_001146338.1 (*Zea mays*; SEQ ID NO:65), XP_003519167.1 (*Glycine max*; SEQ ID NO:66), XP_003550676.1 (*Glycine max*; SEQ ID NO:67), XP_003610261.1 (*Medicago truncatula*; SEQ ID NO:68), XP_003524030.1 (*Glycine max*; SEQ ID NO:69), XP_003525949.1 (*Glycine max*; SEQ ID NO:70), XP_002325111.1 (*Populus trichocarpa*; SEQ ID NO:71), CBI36586.3 (*Vitis vinifera*; SEQ ID NO:72), XP_002273046.2 (*Vitis vinifera*; SEQ ID NO:73), XP_002303866.1 (*Populus trichocarpa*; SEQ ID NO:74), and CBI25261.3 (*Vitis vinifera*; SEQ ID NO:75). Further examples include Sorbi-WRL1 (SEQ ID NO:76), Lupan-WRL1 (SEQ ID NO:77), Ricco-WRL1 (SEQ ID NO:78), and *Lupin angustifolius* WRI1 (SEQ ID NO:79). A preferred WRI1 is a maize WRI1 or a sorghum WRI1.

More recently, a subset of WRI1-like transcription factors have been re-classified as WRI2, WRI3 or WRI4 transcription factors, which are characterised by preferential expression in stems and/or roots of plants rather than in developing seeds (To et al., 2012). Despite their re-classification, these are included in the definition of "WRI1" herein. Preferred WRI1-like transcription factors are those which can complement the function of a wri1 mutation in a plant, particularly the function in developing seed of the plant such as in an *A. thaliana* wri1 mutant. The function of a WRI1-like polypeptide can also be assayed in the *N. benthamiana* transient assays as described herein.

As used herein, a "LEAFY COTYLEDON" or "LEC" polypeptide means a transcription factor which is a LEC1, LEC1-like, LEC2, ABI3 or FUS3 transcription factor which exhibits broad control on seed maturation and fatty acid synthesis. LEC2, FUS3 and ABI3 are related polypeptides that each contain a B3 DNA-binding domain of 120 amino acids (Yamasaki et al., 2004) that is only found in plant proteins. They can be distinguished by phylogenetic analysis to determine relatedness in amino acid sequence to the members of the *A. thaliana* polypeptides having the Accession Nos as follows: LEC2, Accession No. AAL12004.1; FUS3 (also known as FUSCA3), Accession No. AAC35247. LEC1 belongs to a different class of polypeptides and is homologous to a HAP3 polypeptide of the CBF binding factor class (Lee et al., 2003). The LEC1, LEC2 and FUS3 genes are required in early embryogenesis to maintain embryonic cell fate and to specify cotyledon identity and in later in initiation and maintenance of embryo maturation (Santos-Mendoza et al., 2008). They also induce expression of genes encoding seed storage proteins by binding to RY motifs present in the promoters, and oleosin genes. They can also be distinguished by their expression patterns in seed development or by their ability to complement the corresponding mutation in *A. thaliana*.

As used herein, the term "Leafy Cotyledon 1" or "LEC1" refers to a NF-YB-type transcription factor which participates in zygotic development and in somatic embryogenesis. The endogenous gene is expressed specifically in seed in both the embryo and endosperm. LEC1 activates the gene encoding WRI1 as well as a large class of fatty acid synthesis genes. Ectopic expression of LEC2 also causes rapid activation of auxin-responsive genes and may cause formation of somatic embryos. Examples of LEC1 polypeptides include proteins from *Arabidopsis thaliana* (AAC39488, SEQ ID NO:149), *Medicago truncatula* (AFK49653, SEQ ID NO:154) and *Brassica napus* (ADF81045, SEQ ID NO:151), *A. lyrata* (XP_002862657, SEQ ID NO:150), *R. communis* (XP_002522740, SEQ ID NO:152), *G. max* (XP_006582823, SEQ ID NO:153), *A. hypogaea* (ADC33213, SEQ ID NO:156), *Z. mays* (AAK95562, SEQ ID NO:155).

LEC1-like (LIL) is closely related to LEC1 but has a different pattern of gene expression, being expressed earlier during embryogenesis (Kwong et al., 2003). Examples of LEC1-like polypeptides include proteins from *Arabidopsis thaliana* (AAN15924, SEQ ID NO:157), *Brassica napus* (AHI94922, SEQ ID NO:158), and *Phaseolus coccineus* LEC1-like (AAN01148, SEQ ID NO: 159).

As used herein, the term "Leafy Cotyledon 2" or "LEC2" refers to a B3 domain transcription factor which participates in zygotic development and in somatic embryogenesis and which activates expression of a gene encoding WRI1. Its ectopic expression facilitates the embryogenesis from vegetative plant tissues (Alemanno et al., 2008). Examples of LEC2 polypeptides include proteins from *Arabidopsis thaliana* (Accession No. NP_564304.1, SEQ ID NO:142), *Medicago truncatula* (Accession No. CAA42938.1, SEQ ID NO:143) and *Brassica napus* (Accession No. ADO16343.1, SEQ ID NO:144).

In an embodiment, an exogenous polynucleotide of the invention which encodes a LEC2 comprises one or more of the following:

i) nucleotides encoding a polypeptide comprising amino acids whose sequence is set forth as any one of SEQ ID NOs:142 to 144, or a biologically active fragment thereof, or a polypeptide whose amino acid sequence is at least 30% identical to any one or more of SEQ ID NOs: 142 to 144, ii) nucleotides whose sequence is at least 30% identical to i), and iii) a polynucleotide which hybridizes to one or both of i) or ii) under stringent conditions.

As used herein, the term "FUS3" refers to a B3 domain transcription factor which participates in zygotic development and in somatic embryogenesis and is detected mainly in the protodermal tissue of the embryo (Gazzarrini et al., 2004). Examples of FUS3 polypeptides include proteins from *Arabidopsis thaliana* (AAC35247, SEQ ID NO:160), *Brassica napus* (XP_006293066.1, SEQ ID NO:161) and *Medicago truncatula* (XP_003624470, SEQ ID NO:162). Over-expression of any of LEC1, LIL, LEC2, FUS3 and ABI3 from an exogenous polynucleotide is preferably controlled by a developmentally regulated promoter such as a senescence specific promoter, an inducible promoter, or a promoter which has been engineered for providing a reduced level of expression relative to a native promoter, particularly in plants other than *Arabidopsis thaliana* and *B. napus* cv. Westar, in order to avoid developmental abnormalities in plant development that are commonly associated with over-expression of these transcription factors (Mu et al., 2008).

As used herein, the term "BABY BOOM" or "BBM" refers an AP2/ERF transcription factor that induces regeneration under culture conditions that normally do not support regeneration in wild-type plants. Ectopic expression of *Brassica napus* BBM (BnBBM) genes in *B. napus* and *Arabidopsis* induces spontaneous somatic embryogenesis and organogenesis from seedlings grown on hormone-free basal medium (Boutilier et al., 2002). In tobacco, ectopic BBM expression is sufficient to induce adventitious shoot and root regeneration on basal medium, but exogenous cytokinin is required for somatic embryo (SE) formation (Srinivasan et al., 2007). Examples of BBM polypeptides include proteins from *Arabidopsis thaliana* (Accession No. NP_197245.2, SEQ ID NO:145), maize (U.S. Pat. No. 7,579,529), *Sorghum bicolor* (Accession No. XP_002458927) and *Medicago truncatula* (Accession No. AAW82334.1, SEQ ID NO: 146).

In an embodiment, an exogenous polynucleotide of the invention which encodes BBM comprises, unless specified otherwise, one or more of the following:

i) nucleotides encoding a polypeptide comprising amino acids whose sequence is set forth as one of SEQ ID NOs: 145 or 146, or a biologically active fragment thereof, or a polypeptide whose amino acid sequence is at least 30% identical to one or both of SEQ ID NOs: 145 or 146, ii) nucleotides whose sequence is at least 30% identical to i), and iii) a polynucleotide which hybridizes to one or both of i) or ii) under stringent conditions.

An ABI3 polypeptide (*A. thaliana* Accession No. NP_189108) is related to the maize VP1 protein, is expressed at low levels in vegetative tissues and affects plastid development. An ABI4 polypeptide (*A. thaliana* Accession NP_181551) belongs to a family of transcription factors that contain a plant-specific AP2 domain (Finkelstein et al., 1998) and acts downstream of ABI3. ABI5 (*A. thaliana* Accession No. NP_565840) is a transcription factor of the bZIP family which affects ABA sensitivity and controls the expression of some LEA genes in seeds. It binds to an ABA-responsive element.

Each of the following transcription factors was selected on the basis that they functioned in embryogenesis in plants. Accession numbers are provided in Table 10. Homologs of each can be readily identified in many other plant species and tested as described in Example 10.

MYB73 is a transcription factor that has been identified in soybean, involved in stress responses.

bZIP53 is a transcription factor in the bZIP protein family, identified in *Arabidopsis*.

AGL15 (Agamous-like 15) is a MADS box transcription factor which is natively expressed during embryogenesis. AGL15 is also natively expressed in leaf primordia, shoot apical meristems and young floral buds, suggesting that AGL15 may also have a function during post-germinative development. AGL15 has a role in embryogenesis and gibberellic acid catabolism. It targets B3 domain transcription factors that are key regulators of embryogenesis.

MYB115 and MYB118 are transcription factors in the MYB family from *Arabidopsis* involved in embryogenesis.

TANMEI also known as EMB2757 encodes a WD repeat protein required for embryo development in *Arabidopsis*.

WUS, also known as Wuschel, is a homeobox gene that controls the stem cell pool in embryos. It is expressed in the stem cell organizing center of meristems and is required to keep the stem cells in an undifferentiated state. The transcription factor binds to a TAAT element core motif.

GFR2a1 and GFR2a2 are transcription factors at least from soybean.

Fatty Acyl Acyltransferases

As used herein, the term "fatty acyl acyltransferase" refers to a protein which is capable of transferring an acyl group from acyl-CoA, PC or acyl-ACP, preferably acyl-CoA or PC, onto a substrate to form TAG, DAG or MAG. These acyltransferases include DGAT, PDAT, MGAT, GPAT and LPAAT.

As used herein, the term "diacylglycerol acyltransferase" (DGAT) refers to a protein which transfers a fatty acyl group from acyl-CoA to a DAG substrate to produce TAG. Thus, the term "diacylglycerol acyltransferase activity" refers to the transfer of an acyl group from acyl-CoA to DAG to produce TAG. A DGAT may also have MGAT function but predominantly functions as a DGAT, i.e., it has greater catalytic activity as a DGAT than as a MGAT when the enzyme activity is expressed in units of nmoles product/min/mg protein (see for example, Yen et al., 2005). The activity of DGAT may be rate-limiting in TAG synthesis in seeds (Ichihara et al., 1988). DGAT uses an acyl-CoA substrate as the acyl donor and transfers it to the sn-3 position of DAG to form TAG. The enzyme functions in its native state in the endoplasmic reticulum (ER) of the cell.

There are three known types of DGAT, referred to as DGAT1, DGAT2 and DGAT3, respectively. DGAT1 polypeptides are membrane proteins that typically have 10 transmembrane domains, DGAT2 polypeptides are also membrane proteins but typically have 2 transmembrane domains, whilst DGAT3 polypeptides typically have none and are thought to be soluble in the cytoplasm, not integrated into membranes. Plant DGAT1 polypeptides typically have about 510-550 amino acid residues while DGAT2 polypeptides typically have about 310-330 residues. DGAT1 is the main enzyme responsible for producing TAG from DAG in most developing plant seeds, whereas DGAT2s from plant species such as tung tree (*Vernicia fordii*) and castor bean (*Ricinus communis*) that produce high amounts of unusual fatty acids appear to have important roles in the accumulation of the unusual fatty acids in TAG. Over-expression of AtDGAT1 in tobacco leaves resulted in a 6-7 fold increased TAG content (Bouvier-Nave et al., 2000).

Examples of DGAT1 polypeptides include DGAT1 proteins from *Aspergillus fumigatus* (XP_755172.1; SEQ ID NO:80), *Arabidopsis thaliana* (CAB44774.1; SEQ ID NO:1), *Ricinus communis* (AAR11479.1; SEQ ID NO:81), *Vernicia fordii* (ABC94472.1; SEQ ID NO:82), *Vernonia galamensis* (ABV21945.1 and ABV21946.1; SEQ ID NO:83 and SEQ ID NO:84, respectively), *Euonymus alatus* (AAV31083.1; SEQ ID NO:85), *Caenorhabditis elegans* (AAF82410.1; SEQ ID NO:86), *Rattus norvegicus* (NP_445889.1; SEQ ID NO:87), *Homo sapiens* (NP_036211.2; SEQ ID NO:88), as well as variants and/or mutants thereof. Examples of DGAT2 polypeptides include proteins encoded by DGAT2 genes from *Arabidopsis thaliana* (NP_566952.1; SEQ ID NO:2), *Ricinus communis* (AAY16324.1; SEQ ID NO:3), *Vernicia fordii* (ABC94474.1; SEQ ID NO:4), *Mortierella ramanniana* (AAK84179.1; SEQ ID NO:5), *Homo sapiens* (Q96PD7.2; SEQ ID NO:6) (Q58HT5.1; SEQ ID NO:7), *Bos taurus* (Q70VZ8.1; SEQ ID NO:8), *Mus musculus* (AAK84175.1; SEQ ID NO:9), as well as variants and/or mutants thereof. DGAT1 and DGAT2 amino acid sequences show little homology. Expression in leaves of an exogenous DGAT2 was twice as effective as a DGAT1 in increasing oil content (TAG). Further, *A. thaliana* DGAT2 had a greater preference for linoleoyl-CoA and linolenoyl-CoA as acyl donors relative to oleoyl-CoA, compared to DGAT1. This substrate preference can be used to distinguish the two DGAT classes in addition to their amino acid sequences.

Examples of DGAT3 polypeptides include proteins encoded by DGAT3 genes from peanut (*Arachis hypogaea*, Saha, et al., 2006), as well as variants and/or mutants thereof. A DGAT has little or no detectable MGAT activity, for example, less than 300 pmol/min/mg protein, preferably less than 200 pmol/min/mg protein, more preferably less than 100 pmol/min/mg protein.

In an embodiment, an exogenous polynucleotide of the invention which encodes a DGAT1 comprises one or more of the following:

i) nucleotides encoding a polypeptide comprising amino acids whose sequence is set forth as any one of SEQ ID NOs: 1 or 80 to 88, or a biologically active fragment thereof, or a polypeptide whose amino acid sequence is at least 30% identical to any one or more of SEQ ID NOs: 1 or 80 to 88,
ii) nucleotides whose sequence is at least 30% identical to i), and
iii) a polynucleotide which hybridizes to one or both of i) or ii) under stringent conditions.

In an embodiment, an exogenous polynucleotide of the invention which encodes a DGAT2 comprises one or more of the following:

i) nucleotides encoding a polypeptide comprising amino acids whose sequence is set forth as any one of SEQ ID NOs:2 to 9, or a biologically active fragment thereof, or a polypeptide whose amino acid sequence is at least 30% identical to any one or more of SEQ ID NOs: 2 to 9,
ii) nucleotides whose sequence is at least 30% identical to i), and
iii) a polynucleotide which hybridizes to one or both of i) or ii) under stringent conditions.

As used herein, the term "phospholipid:diacylglycerol acyltransferase" (PDAT; EC 2.3.1.158) or its synonym "phospholipid: 1,2-diacyl-sn-glycerol O-acyltransferase" means an acyltransferase that transfers an acyl group from a phospholipid, typically PC, to the sn-3 position of DAG to form TAG. This reaction is unrelated to DGAT and uses phospholipids as the acyl-donors. There are several forms of PDAT in plant cells including PDAT1, PDAT2 or PDAT3 (Ghosal et al., 2007).

As used herein, the term "monoacylglycerol acyltransferase" or "MGAT" refers to a protein which transfers a fatty acyl group from acyl-CoA to a MAG substrate, for example sn-2 MAG, to produce DAG. Thus, the term "monoacylglycerol acyltransferase activity" at least refers to the transfer of an acyl group from acyl-CoA to MAG to produce DAG. The term "MGAT" as used herein includes enzymes that act on sn-1/3 MAG and/or sn-2 MAG substrates to form sn-1,3 DAG and/or sn-1,2/2,3-DAG, respectively. In a preferred embodiment, the MGAT has a preference for sn-2 MAG substrate relative to sn-1 MAG, or substantially uses only sn-2 MAG as substrate. As used herein, MGAT does not include enzymes which transfer an acyl group preferentially to LysoPA relative to MAG, such enzymes are known as LPAATs. That is, a MGAT preferentially uses non-phosphorylated monoacyl substrates, even though they may also have low catalytic activity on LysoPA. A preferred MGAT does not have detectable activity in acylating LysoPA. A MGAT may also have DGAT function but predominantly functions as a MGAT, i.e., it has greater catalytic activity as a MGAT than as a DGAT when the enzyme activity is expressed in units of nmoles product/ min/mg protein (also see Yen et al., 2002). There are three known classes of MGAT, referred to as, MGAT1, MGAT2 and MGAT3, respectively. Examples of MGAT1, MGAT2 and MGAT3 polypeptides are described in WO2013/096993.

As used herein, an "MGAT pathway" refers to an anabolic pathway, different to the Kennedy pathway for the formation of TAG, in which DAG is formed by the acylation of either sn-1 MAG or preferably sn-2 MAG, catalysed by MGAT. The DAG may subsequently be used to form TAG or other lipids. WO2012/000026 demonstrated firstly that plant leaf tissue can synthesise MAG from G-3-P such that the MAG is accessible to an exogenous MGAT expressed in the leaf tissue, secondly MGAT from various sources can function in plant tissues, requiring a successful interaction with other plant factors involved in lipid synthesis and thirdly the DAG produced by the exogenous MGAT activity is accessible to a plant DGAT, or an exogenous DGAT, to produce TAG. MGAT and DGAT activity can be assayed by introducing constructs encoding the enzymes (or candidate enzymes) into *Saccharomyces cerevisiae* strain H1246 and demonstrating TAG accumulation.

Some of the motifs that have been shown to be important for catalytic activity in some DGAT2s are also conserved in MGAT acyltransferases. Of particular interest is a putative neutral lipid-binding domain with the concensus sequence FLXLXXXN (SEQ ID NO:14) where each X is independently any amino acid other than proline, and N is any nonpolar amino acid, located within the N-terminal transmembrane region followed by a putative glycerol/phospholipid acyltransferase domain. The FLXLXXXN motif (SEQ ID NO:14) is found in the mouse DGAT2 (amino acids 81-88) and MGAT1/2 but not in yeast or plant DGAT2s. It is important for activity of the mouse DGAT2. Other DGAT2 and/or MGAT1/2 sequence motifs include:

1. A highly conserved YFP tripeptide (SEQ ID NO:10) in most DGAT2 polypeptides and also in MGAT1 and MGAT2, for example, present as amino acids 139-141 in mouse DGAT2. Mutating this motif within the yeast DGAT2 with non-conservative substitutions rendered the enzyme non-functional.
2. HPHG tetrapeptide (SEQ ID NO:11), highly conserved in MGATs as well as in DGAT2 sequences from animals and fungi, for example, present as amino acids 161-164 in mouse DGAT2, and important for catalytic activity at least in yeast and mouse DGAT2. Plant DGAT2 acyltransferases have a EPHS (SEQ ID NO:12) conserved sequence instead, so conservative changes to the first and fourth amino acids can be tolerated.
3. A longer conserved motif which is part of the putative glycerol phospholipid domain. An example of this motif is RXGFX(K/R)XAXXXGXXX(L/V)VPXXXFG(E/Q) (SEQ ID NO:13), which is present as amino acids 304-327 in mouse DGAT2. This motif is less conserved in amino acid sequence than the others, as would be expected from its length, but homologs can be recognised by motif searching. The spacing may vary between the more conserved amino acids, i.e., there may be additional X amino acids within the motif, or less X amino acids compared to the sequence above.

One important component in glycerolipid synthesis from fatty acids esterified to ACP or CoA is the enzyme sn-glycerol-3-phosphate acyltransferase (GPAT), which is another of the polypeptides involved in the biosynthesis of non-polar lipids. This enzyme is involved in different metabolic pathways and physiological functions. It catalyses the following reaction: G3P+fatty acyl-ACP or -CoA→LPA+free-ACP or -CoA. The GPAT-catalyzed reaction occurs in three distinct plant subcellular compartments: plastid, endoplasmic reticulum (ER) and mitochondria. These reactions are catalyzed by three different types of GPAT enzymes, a soluble form localized in plastidial stroma which uses acyl-ACP as its natural acyl substrate (PGPAT in FIG. 1), and two membrane-bound forms localized in the ER and mitochondria which use acyl-CoA and acyl-ACP as natural acyl donors, respectively (Chen et al., 2011).

As used herein, the term "glycerol-3-phosphate acyltransferase" (GPAT; EC 2.3.1.15) and its synonym "glycerol-3-phosphate O-acyltransferase" refer to a protein which acylates glycerol-3-phosphate (G-3-P) to form LysoPA and/or MAG, the latter product forming if the GPAT also has phosphatase activity on LysoPA. The acyl group that is transferred is from acyl-CoA if the GPAT is an ER-type GPAT (an "acyl-CoA:sn-glycerol-3-phosphate 1-O-acyltransferase" also referred to as "microsomal GPAT") or from acyl-ACP if the GPAT is a plastidial-type GPAT (PGPAT). Thus, the term "glycerol-3-phosphate acyltransferase activity" refers to the acylation of G-3-P to form LysoPA and/or MAG. The term "GPAT" encompasses enzymes that acylate G-3-P to form sn-1 LPA and/or sn-2 LPA, preferably sn-2 LPA. Preferably, the GPAT which may be over-expressed in the Pull modification is a membrane bound GPAT that functions in the ER of the cell, more preferably a GPAT9, and the plastidial GPAT that is down-regulated in the Prokaryotic Pathway modification is a soluble GPAT ("plastidial GPAT"). In a preferred embodiment, the GPAT has phosphatase activity. In a most preferred embodiment, the GPAT is a sn-2 GPAT having phosphatase activity which produces sn-2 MAG.

As used herein, the term "sn-1 glycerol-3-phosphate acyltransferase" (sn-1 GPAT) refers to a protein which acylates sn-glycerol-3-phosphate (G-3-P) to preferentially form 1-acyl-sn-glycerol-3-phosphate (sn-1 LPA). Thus, the term "sn-1 glycerol-3-phosphate acyltransferase activity" refers to the acylation of sn-glycerol-3-phosphate to form 1-acyl-sn-glycerol-3-phosphate (sn-1 LPA).

As used herein, the term "sn-2 glycerol-3-phosphate acyltransferase" (sn-2 GPAT) refers to a protein which acylates sn-glycerol-3-phosphate (G-3-P) to preferentially form 2-acyl-sn-glycerol-3-phosphate (sn-2 LPA). Thus, the term "sn-2 glycerol-3-phosphate acyltransferase activity" refers to the acylation of sn-glycerol-3-phosphate to form 2-acyl-sn-glycerol-3-phosphate (sn-2 LPA).

The GPAT family is large and all known members contain two conserved domains, a plsC acyltransferase domain (PF01553; SEQ ID NO:15) and a HAD-like hydrolase (PF12710; SEQ ID NO:16) superfamily domain and variants thereof. In addition to this, at least in *Arabidopsis thaliana*, GPATs in the subclasses GPAT4-GPAT8 all contain a N-terminal region homologous to a phosphoserine phosphatase domain (PF00702; SEQ ID NO:17), and GPATs which produce MAG as a product can be identified by the presence of such a homologous region. Some GPATs expressed endogenously in leaf tissue comprise the conserved amino acid sequence GDL VICPEGTTCREP (SEQ ID NO:18). GPAT4 and GPAT6 both contain conserved residues that are known to be critical to phosphatase activity, specifically conserved amino acids in Motif I (DXDX[T/V][L/V]; SEQ ID NO:19) and Motif III (K-[G/S][D/S]XXX[D/N]; SEQ ID NO:20) located at the N-terminus (Yang et al., 2010).

Homologues of *Arabidopsis* GPAT4 (Accession No. NP_171667.1) and GPAT6 (NP_181346.1)) include AAF02784.1 (*Arabidopsis thaliana*), AAL32544.1 (*Arabi-*

*dopsis thaliana*), AAP03413.1 (*Oryza sativa*), ABK25381.1 (*Picea sitchensis*), ACN34546.1 (*Zea Mays*), BAF00762.1 (*Arabidopsis thaliana*), BAH00933.1 (*Oryza sativa*), EAY84189.1 (*Oryza sativa*), EAY98245.1 (*Oryza sativa*), EAZ21484.1 (*Oryza sativa*), EEC71826.1 (*Oryza sativa*), EEC76137.1 (*Oryza sativa*), EEE59882.1 (*Oryza sativa*), EFJ08963.1 (*Selaginella moellendorffii*), EFJ11200.1 (*Selaginella moellendorffii*), NP_001044839.1 (*Oryza sativa*), NP_001045668.1 (*Oryza sativa*), NP_001147442.1 (*Zea mays*), NP_001149307.1 (*Zea mays*), NP_001168351.1 (*Zea mays*), AFH02724.1 (*Brassica napus*) NP_191950.2 (*Arabidopsis thaliana*), XP_001765001.1 (*Physcomitrella patens*), XP_001769671.1 (*Physcomitrella patens*), (*Vitis vinifera*), XP_002275348.1 (*Vitis vinifera*), XP_002276032.1 (*Vitis vinifera*), XP 002279091.1 (*Vitis vinifera*), XP_002309124.1 (*Populus trichocarpa*), XP_002309276.1 ((*Populus trichocarpa*), XP_002322752.1 (*Populus trichocarpa*), XP_002323563.1 (*Populus trichocarpa*), XP_002439887.1 (*Sorghum bicolor*), XP_002458786.1 (*Sorghum bicolor*), XP_002463916.1 (*Sorghum bicolor*), XP_002464630.1 (*Sorghum bicolor*), XP_002511873.1 (*Ricinus communis*), XP_002517438.1 (*Ricinus communis*), XP_002520171.1 (*Ricinus communis*), ACT32032.1 (*Vernicia fordii*), NP_001051189.1 (*Oryza sativa*), AFH02725.1 (*Brassica napus*), XP_002320138.1 (*Populus trichocarpa*), XP_002451377.1 (*Sorghum bicolor*), XP_002531350.1 (*Ricinus communis*), and XP_002889361.1 (*Arabidopsis lyrata*).

The soluble plastidial GPATs (PGPAT, also known as ATS1 in *Arabidopsis thaliana*) have been purified and genes encoding them cloned from several plant species such as pea (*Pisum sativum*, Accession number: P30706.1), spinach (*Spinacia oleracea*, Accession number: Q43869.1), squash (*Cucurbita moschate*, Accession number: P10349.1), cucumber (*Cucumis sativus*, Accession number: Q39639.1) and *Arabidopsis thaliana* (Accession number: Q43307.2). The soluble plastidial GPAT is the first committed step for what is known as the prokaryotic pathway of glycerolipid synthesis and is operative only in the plastid (FIG. 1). The so-called prokaryotic pathway is located exclusively in plant plastids and assembles DAG for the synthesis of galactolipids (MGDG and DGMG) which contain C16:3 fatty acids esterified at the sn-2 position of the glycerol backbone.

Conserved motifs and/or residues can be used as a sequence-based diagnostic for the identification of GPAT enzymes. Alternatively, a more stringent function-based assay could be utilised. Such an assay involves, for example, feeding labelled glycerol-3-phosphate to cells or microsomes and quantifying the levels of labelled products by thin-layer chromatography or a similar technique. GPAT activity results in the production of labelled LPA whilst GPAT/phosphatase activity results in the production of labelled MAG.

As used herein, the term "lysophosphatidic acid acyltransferase" (LPAAT; EC 2.3.1.51) and its synonyms "1-acyl-glycerol-3-phosphate acyltransferase", "acyl-CoA: 1-acyl-sn-glycerol-3-phosphate 2-O-acyltransferase" and "1-acylglycerol-3-phosphate O-acyltransferase" refer to a protein which acylates lysophosphatidic acid (LPA) to form phosphatidic acid (PA). The acyl group that is transferred is from acyl-CoA if the LPAAT is an ER-type LPAAT or from acyl-ACP if the LPAAT is a plastidial-type LPAAT (PLPAAT). Thus, the term "lysophosphatidic acid acyltransferase activity" refers to the acylation of LPA to form PA.

Oil Body Coating Polypeptides

Plant seeds and pollen accumulate TAG in subcellular structures called oil bodies which generally range from 0.5-2.5 μm in diameter. As used herein, "lipid droplets", also referred to as "oil bodies", are lipid rich cellular organelles for storage or exchange of neutral lipids including predominantly TAG. Lipid droplets can vary greatly in size from about 20 nm to 100 μm. These organelles have a TAG core surround by a phospholipid monolayer containing several embedded proteins which are involved in lipid metabolism and storage as well as lipid trafficking to other membranes, including oleosins if the oil bodies are from plant seeds or floral tissues (Jolivet et al., 2004). They generally consist of 0.5-3.5% protein while the remainder is the lipid. They are the least dense of the organelles in most cells and can therefore be isolated readily by flotation centrifugation. Oleosins represent the most abundant (at least 80%) of the protein in the membrane of oil bodies from seeds.

As used herein, the term "Oleosin" refers to an amphipathic protein present in the membrane of oil bodies in the storage tissues of seeds (see, for example, Huang, 1996; Lin et al., 2005; Capuano et al., 2007; Lui et al., 2009; Shimada and Hara-Nishimura, 2010) and artificially produced variants (see for example WO2011/053169 and WO2011/127118).

Oleosins are of low $M_r$ (15-26,000), corresponding to about 140-230 amino acid residues, which allows them to become tightly packed on the surface of oil bodies. Within each seed species, there are usually two or more oleosins of different $M_r$. Each oleosin molecule contains a relatively hydrophilic, variable N-terminal domain (for example, about 48 amino acid residues), a central totally hydrophobic domain (for example, of about 70-80 amino acid residues) which is particularly rich in aliphatic amino acids such as alanine, glycine, leucine, isoleucine and valine, and an amphipathic α-helical domain of about 30-40 amino acid residues at or near the C-terminus. The central hydrophobic domain typically contains a proline knot motif of about 12 residues at its center. Generally, the central stretch of hydrophobic residues is inserted into the lipid core and the amphiphatic N-terminal and/or amphiphatic C-terminal are located at the surface of the oil bodies, with positively charged residues embedded in a phospholipid monolayer and the negatively charged ones exposed to the exterior.

As used herein, the term "Oleosin" encompasses polyoleosins which have multiple oleosin polypeptides fused together in a head-to-tail fashion as a single polypeptide (WO2007/045019), for example 2×, 4× or 6× oleosin peptides, and caleosins which bind calcium and which are a minor protein component of the proteins that coat oil bodies in seeds (Froissard et al., 2009), and steroleosins which bind sterols (WO2011/053169). However, generally a large proportion (at least 80%) of the oleosins of oil bodies will not be caleosins and/or steroleosins. The term "oleosin" also encompasses oleosin polypeptides which have been modified artificially, such oleosins which have one or more amino acid residues of the native oleosins artificially replaced with cysteine residues, as described in WO2011/053169. Typically, 4-8 residues are substituted artificially, preferably 6 residues, but as many as between 2 and 14 residues can be substituted. Preferably, both of the amphipathic N-terminal and C-terminal domains comprise cysteine substitutions. The modification increases the cross-linking ability of the oleosins and increases the thermal stability and/or the stability of the proteins against degradation by proteases.

A substantial number of oleosin protein sequences, and nucleotide sequences encoding therefor, are known from a large number of different plant species. Examples include, but are not limited to, oleosins from *Arabidposis*, canola, corn, rice, peanut, castor, soybean, flax, grape, cabbage, cotton, sunflower, sorghum and barley. Examples of oleosins (with their Accession Nos) include *Brassica napus* oleosin (CAA57545.1; SEQ ID NO:95), *Brassica napus* oleosin S1-1 (ACG69504.1; SEQ ID NO:96), *Brassica napus* oleosin S2-1 (ACG69503.1; SEQ ID NO:97), *Brassica napus* oleosin S3-1 (ACG69513.1; SEQ ID NO:98), *Brassica napus* oleosin S4-1 (ACG69507.1; SEQ ID NO:99), *Brassica napus* oleosin S5-1 (ACG69511.1; SEQ ID NO:100), *Arachis hypogaea* oleosin 1 (AAZ20276.1; SEQ ID NO:101), *Arachis hypogaea* oleosin 2 (AAU21500.1; SEQ ID NO:102), *Arachis hypogaea* oleosin 3 (AAU21501.1; SEQ ID NO:103), *Arachis hypogaea* oleosin 5 (ABC96763.1; SEQ ID NO:104), *Ricinus communis* oleosin 1 (EEF40948.1; SEQ ID NO: 105), *Ricinus communis* oleosin 2 (EEF51616.1; SEQ ID NO:106), *Glycine max* oleosin isoform a (P29530.2; SEQ ID NO:107), *Glycine max* oleosin isoform b (P29531.1; SEQ ID NO:108), *Linum usitatissimum* oleosin low molecular weight isoform (ABB01622.1; SEQ ID NO:109), *Linum usitatissimum* oleosin high molecular weight isoform (ABB01624.1; SEQ ID NO:110), *Helianthus annuus* oleosin (CAA44224.1; SEQ ID NO:111), *Zea mays* oleosin (NP_001105338.1; SEQ ID NO:112), *Brassica napus* steroleosin (ABM30178.1; SEQ ID NO:113), *Brassica napus* steroleosin SLO1-1 (ACG69522.1; SEQ ID NO:114), *Brassica napus* steroleosin SLO2-1 (ACG69525.1; SEQ ID NO:115), *Sesamum indicum* steroleosin (AAL13315.1; SEQ ID NO:116), *Zea mays* steroleosin (NP_001152614.1; SEQ ID NO:117), *Brassica napus* caleosin CLO-1 (ACG69529.1; SEQ ID NO:118), *Brassica napus* caleosin CLO-3 (ACG69527.1; SEQ ID NO:119), *Sesamum indicum* caleosin (AAF13743.1; SEQ ID NO: 120), *Zea mays* caleosin (NP_001151906.1; SEQ ID NO:121), *Glycine max* caleosin (AAB71227). Other lipid encapsulation polypeptides that are functionally equivalent are plastoglobulins and MLDP polypeptides (WO2011/127118).

In an embodiment, an exogenous polynucleotide of the invention which encodes an oleosin comprises, unless specified otherwise, one or more of the following:

i) nucleotides encoding a polypeptide comprising amino acids whose sequence is set forth as any one of SEQ ID NOs:95 to 112, or a biologically active fragment thereof, or a polypeptide whose amino acid sequence is at least 30% identical to any one or more of SEQ ID NOs: 95 to 112,
ii) nucleotides whose sequence is at least 30% identical to i), and
iii) a polynucleotide which hybridizes to one or both of i) or ii) under stringent conditions.

In an embodiment, an exogenous polynucleotide of the invention which encodes an steroleosin comprises, unless specified otherwise, one or more of the following:

i) nucleotides encoding a polypeptide comprising amino acids whose sequence is set forth as any one of SEQ ID NOs:113 to 117, or a biologically active fragment thereof, or a polypeptide whose amino acid sequence is at least 30% identical to any one or more of SEQ ID NOs: 113 to 117,
ii) nucleotides whose sequence is at least 30% identical to i), and
iii) a polynucleotide which hybridizes to one or both of i) or ii) under stringent conditions.

As used herein, a "lipid droplet associated protein" or "LDAP" means a polypeptide which is associated with lipid droplets in plants in tissues or organs other than seeds, anthers and pollen, such as fruit tissues including pericarp and mesocarp. LDAPs may be associated with oil bodies in seeds, anthers or pollen as well as in the tissues or organs other than seeds, anthers and pollen. They are distinct from oleosins which are polypeptides associated with the surface of lipid droplets in seed tissues, anthers and pollen. LDAPs as used herein include LDAP polypeptides that are produced naturally in plant tissues as well as amino acid sequence variants that are produced artificially. The function of such variants can be tested as exemplified in Example 15.

Horn et al. (2013) identified two LDAP genes which are expressed in avocado pericarp. The encoded avocado LDAP1 and LDAP2 polypeptides were 62% identical in amino acid sequence and had homology to polypeptide encoded by *Arabidopsis* At3g05500 and a rubber tree SRPP-like protein. Gidda et al. (2013) identified three LDAP genes that were expressed in oil palm (*Elaeis guineensis*) mesocarp but not in kernels and concluded that LDAP genes were plant specific and conserved amongst all plant species. LDAP polypeptides may contain additional domains (Gidda et al., (2013). Genes encoding LDAPs are generally up-regulated in non-seed tissues with abundant lipid and can be identified thereby, but are thought to be expressed in all non-seed cells that produce oil including for transient storage. Horn et al. (2013) shows a phylogenetic tree of SRPP-like proteins in plants. Exemplary LDAP polypeptides are described in Example 15 herein. Homologs of LDAPs in other plant species can be readily identified by those skilled in the art.

In an embodiment, an exogenous polynucleotide of the invention which encodes a LDAP comprises, unless specified otherwise, one or more of the following:

i) nucleotides encoding a polypeptide comprising amino acids whose sequence is set forth as any one of SEQ ID NOs: 237, 239 or 241, or a biologically active fragment thereof, or a polypeptide whose amino acid sequence is at least 30% identical to any one or more of SEQ ID NOs: 237, 239 or 241,
ii) nucleotides whose sequence is at least 30% identical to i), and
iii) a polynucleotide which hybridizes to one or both of i) or ii) under stringent conditions.

As used herein, the term a "polypeptide involved in starch biosynthesis" refers to any polypeptide, the downregulation of which in a cell below normal (wild-type) levels results in a reduction in the level of starch synthesis and a decrease in the levels of starch. An example of such a polypeptide is AGPase.

As used herein, the term "ADP-glucose phosphorylase" or "AGPase" refers to an enzyme which regulates starch biosynthesis, catalysing conversion of glucose-1-phosphate and ATP to ADP-glucose which serves as the building block for starch polymers. The active form of the AGPase enzyme consists of 2 large and 2 small subunits.

The ADPase enzyme in plants exists primarily as a tetramer which consists of 2 large and 2 small subunits. Although these subunits differ in their catalytic and regulatory roles depending on the species (Kuhn et al., 2009), in plants the small subunit generally displays catalytic activity. The molecular weight of the small subunit is approximately 50-55 kDa. The molecular weight of the large subunit is approximately 55-60 kDa. The plant enzyme is strongly activated by 3-phosphoglycerate (PGA), a product of carbon dioxide fixation; in the absence of PGA, the enzyme exhibits only about 3% of its activity. Plant AGPase is also strongly inhibited by inorganic phosphate (Pi). In contrast, bacterial and algal AGPase exist as homotetramers of 50 kDa. The algal enzyme, like its plant counterpart, is activated by PGA and inhibited by Pi, whereas the bacterial enzyme is activated by fructose-1, 6-bisphosphate (FBP) and inhibited by AMP and Pi.

TAG Lipases and Beta-Oxidation

As used herein, the term "polypeptide involved in the degradation of lipid and/or which reduces lipid content" refers to any polypeptide which catabolises lipid, the down-regulation of which in a cell below normal (wild-type) levels results an increase in the level of oil, such as fatty acids and/or TAGs, in the cell, preferably a cell of a vegetative part, tuber, beet or a seed of a plant. Examples of such polypeptides include, but are not limited to, lipases, or a lipase such as a CGi58 (Comparative Gene identifier-58-Like) polypeptide, a SUGAR-DEPENDENT1 (SDP1) triacylglycerol lipase (see, for example, Kelly et al., 2011) and a lipase described in WO 2009/027335.

As used herein, the term "TAG lipase" (EC.3.1.1.3) refers to a protein which hydrolyzes TAG into one or more fatty acids and any one of DAG, MAG or glycerol. Thus, the term "TAG lipase activity" refers to the hydrolysis of TAG into glycerol and fatty acids.

As used herein, the term "CGi58" refers to a soluble acyl-CoA-dependent lysophosphatidic acid acyltransferase encoded by the At4g24160 gene in *Arabidopsis thaliana* and its homologs in other plants and "Ict1p" in yeast and its homologs. The plant gene such as that from *Arabidopsis* gene locus At4g24160 is expressed as two alternative transcripts: a longer full-length isoform (At4g24160.1) and a smaller isoform (At4g24160.2) missing a portion of the 3' end (see James et al., 2010; Ghosh et al., 2009; US 201000221400). Both mRNAs code for a protein that is homologous to the human CGI-58 protein and other orthologous members of this a/ß hydrolase family (ABHD). In an embodiment, the CGI58 (At4g24160) protein contains three motifs that are conserved across plant species: a GXSXG lipase motif (SEQ ID NO:127), a HX(4)D acyltransferase motif (SEQ ID NO:128), and VX(3)HGF, a probable lipid binding motif (SEQ ID NO:129). The human CGI-58 protein has lysophosphatidic acid acyltransferase (LPAAT) activity but not lipase activity. In contrast, the plant and yeast proteins possess a canonical lipase sequence motif GXSXG (SEQ ID NO:127), that is absent from vertebrate (humans, mice, and zebrafish) proteins, and have lipase and phospholipase activity (Ghosh et al., 2009). Although the plant and yeast CGI58 proteins appear to possess detectable amounts of TAG lipase and phospholipase A activities in addition to LPAAT activity, the human protein does not.

Disruption of the homologous ('GI-58 gene in *Arabidopsis thaliana* results in the accumulation of neutral lipid droplets in mature leaves. Mass spectroscopy of isolated lipid droplets from cgi-58 loss-of-function mutants showed they contain triacylglycerols with common leaf-specific fatty acids. Leaves of mature cgi-58 plants exhibit a marked increase in absolute triacylglycerol levels, more than 10-fold higher than in wild-type plants. Lipid levels in the oil-storing seeds of cgi-58 loss-of-function plants were unchanged, and unlike mutations in β-oxidation, the cgi-58 seeds germinated and grew normally, requiring no rescue with sucrose (James et al., 2010).

Examples of nucleotides encoding CGi58 polypeptides include those from *Arabidopsis thaliana* (NM_118548.1 encoding NP_194147.2; SEQ ID NO:130), *Brachypodium distachyon* (XP_003578450.1; SEQ ID NO:131), *Glycine max* (XM_003523590.1 encoding XP_003523638.1; SEQ ID NO:132), *Zea mays* (NM_001155541.1 encoding NP_001149013.1; SEQ ID NO:133), *Sorghum bicolor* (XM_002460493.1 encoding XP_002460538.1; SEQ ID NO:134), *Ricinus communis* (XM_002510439.1 encoding XP_002510485.1; SEQ ID NO:135), *Medicago truncatula* (XM_003603685.1 encoding XP_003603733.1; SEQ ID NO:136), and *Oryza sativa* (encoding EAZ09782.1).

In an embodiment, a genetic modification of the invention down-regulates endogenous production of CGi58, wherein CGi58 is encoded by one or more of the following:

i) nucleotides comprising a sequence set forth as any one of SEQ ID NOs: 130 to 136, ii) nucleotides comprising a sequence which is at least 30% identical to any one or more of SEQ ID NOs: 130 to 136, and iii) a polynucleotide which hybridizes to one or both of i) or ii) under stringent conditions.

Other lipases which have lipase activity on TAG include SUGAR-DEPENDENT1 triacylglycerol lipase (SDP1, see for example Eastmond et al., 2006; Kelly et al., 2011) and SDP1-like polypeptides found in plant species as well as yeast (TGL4 polypeptide) and animal cells, which are involved in storage TAG breakdown. The SDP1 and SDP1-like polypeptides appear to be responsible for initiating TAG breakdown in seeds following germination (Eastmond et al., 2006). Plants that are mutant in SDP1, in the absence of exogenous WRI1 and DGAT1, exhibit increased levels of PUFA in their TAG. As used herein, "SDP1 polypeptides" include SDP1 polypeptides, SDP1-like polypeptides and their homologs in plant species. SDP1 and SDP1-like polypeptides in plants are 800-910 amino acid residues in length and have a patatin-like acylhydrolase domain that can associate with oil body surfaces and hydrolyse TAG in preference to DAG or MAG. SDP1 is thought to have a preference for hydrolysing the acyl group at the sn-2 position of TAG. *Arabidopsis* contains at least three genes encoding SDP1 lipases, namely SDP1 (Accession No. NP_196024, nucleotide sequence SEQ ID NO:163 and homologs in other species), SDP1L (Accession No. NM_202720 and homologs in other species, Kelly et al., 2011) and ATGLL (At1g33270) (Eastmond et al, 2006). Of particular interest for reducing gene activity are SDP1 genes which are expressed in vegetative tissues in plants, such as in leaves, stems and roots. Levels of non-polar lipids in vegetative plant parts can therefore be increased by reducing the activity of SDP1 polypeptides in the plant parts, for example by either mutation of an endogenous gene encoding a SDP1 polypeptide or introduction of an exogenous gene which encodes a silencing RNA molecule which reduces the expression of an endogenous SDP1 gene. Such a reduction is of particular benefit in tuber crops such as sugarbeet and potato, and in "high sucrose" plants such as sugarcane and sugarbeet.

Genes encoding SDP1 homologues (including SDP1-like homologues) in a plant species of choice can be identified readily by homology to known SDP1 gene sequences. Known SDP1 nucleotide or amino acid sequences include Accession Nos.: in *Brassica napus*, GN078290 (SEQ ID NO:164), GN078281, GN078283; *Capsella rubella*, XP_006287072; *Theobroma cacao*, XP_007028574.1; *Populus trichocarpa*, XP_002308909 (SEQ ID NO:166); *Prunus persica*, XP_007203312; *Prunus* mume, XP_008240737; *Malus domestica*, XP_008373034; *Ricinus communis*, XP_002530081; *Medicago truncatula*, XP_003591425 (SEQ ID NO:167); *Solanum lycopersicum*, XP_004249208; *Phaseolus vulgaris*, XP_007162133; *Glycine max*, XP_003554141 (SEQ ID NO:168); *Solanum tuberosum*, XP_006351284; *Glycine max*, XP_003521151; *Cicer arietinum*, XP_004493431; *Cucumis sativus*, XP_004142709; *Cucumis melo*, XP_008457586; *Jatropha curcas*, KDP26217; *Vitis vinifera*, CBI30074; *Oryza sativa*,

*Japonica* Group BAB61223; *Oryza sativa*, Indica Group EAY75912; *Oryza sativa, Japonica* Group NP_001044325; *Sorghum bicolor*, XP_002458531 (SEQ ID NO:169); *Brachypodium distachyon*, XP_003567139 (SEQ ID NO:165); *Zea mays, AFW*85009; *Hordeum vulgare*, BAK03290 (SEQ ID NO:172); *Aegilops tauschii*, EMT32802; *Sorghum bicolor*, XP_002463665; *Zea mays*, NP_001168677 (SEQ ID NO:170); *Hordeum vulgare*, BAK01155; *Aegilops tauschii*, EMT02623; *Triticum urartu*, EMS67257; *Physcomitrella patens*, XP_001758169 (SEQ ID NO:171). Preferred SDP1 sequences for use in genetic constructs for inhibiting expression of the endogenous genes are from cDNAs corresponding to the genes which are expressed most highly in the cells, vegetative plant parts or the seeds, whichever is to be modified. Nucleotide sequences which are highly conserved between cDNAs corresponding to all of the SDP1 genes in a plant species are preferred if it is desired to reduce the activity of all members of a gene family in that species.

In an embodiment, a genetic modification of the invention down-regulates endogenous production of SDP1, wherein SDP1 is encoded by one or more of the following:

i) nucleotides whose sequence is set forth as any one of SEQ ID NOs: 163 to 174.

ii) nucleotides whose sequence is at least 30% identical to any one or more of the sequences set forth as SEQ ID NOs: 163 to 174, and iii) a sequence of nucleotides which hybridizes to one or both of i) or ii) under stringent conditions.

As shown in the Examples, reduction of the expression and/or activity of SDP1 TAG lipase in plant leaves greatly increased the TAG content, both in terms of the amount of TAG that accumulated and the earlier timing of accumulation during plant development, in the context of co-expression of the transcription factor WRI1 and a fatty acyl acyltransferase. In particular, the increase was observed in plants prior to flowering, and was up to about 70% on a weight basis (% dry weight) at the onset of senescence. The increase was relative to the TAG levels observed in corresponding plant leaves transformed with exogenous polynucleotides encoding the WRI1 and fatty acyl acyltransferase but lacking the modification that reduced SDP1 expression and/or activity.

Reducing the expression of other TAG catabolism genes in plant parts can also increase TAG content, such as the ACX genes encoding acyl-CoA oxidases such as the Acx1 (At4g16760 and homologs in other plant species) or Acx2 (At5g65110 and homologs in other plant species) genes. Another polypeptide involved in lipid catabolismis PXA1 which is a peroxisomal ATP-binding cassette transporter that is requires for fatty acid import for β-oxidation (Zolman et al. 2001).

Export of Fatty Acids from Plastids

As used herein, the term "polypeptide which increases the export of fatty acids out of plastids of the cell" refers to any polypeptide which aids in fatty acids being transferred from within plastids (in cells which have plastids such as a cell of a vegetative part, tuber, beet or a seed of a plant) to outside the plastid, which may be any other part of the cell such as for example the endoplasmic reticulum (ER). Examples of such polypeptides include, but are not limited to, a C16 or C18 fatty acid thioesterase such as a FATA polypeptide or a FATB polypeptide, a C8 to C14 fatty acid thioesterase (which is also a FATB polypeptide), a fatty acid transporter such as an ABCA9 polypeptide or a long-chain acyl-CoA synthetase (LACS).

As used herein, the term "fatty acid thioesterase" or "FAT" refers to an enzyme which catalyses the hydrolysis of the thioester bond between an acyl moiety and acyl carrier protein (ACP) in acyl-ACP and the release of a free fatty acid. Such enzymes typically function in the plastids of an organism which is synthesizing de novo fatty acids. As used herein, the term "C16 or C18 fatty acid thioesterase" refers to an enzyme which catalyses the hydrolysis of the thioester bond between a C16 and/or C18 acyl moiety and ACP in acyl-ACP and the release of free C16 or C18 fatty acid in the plastid. The free fatty acid is then re-esterified to CoA in the plastid envelope as it is transported out of the plastid. The substrate specificity of the fatty acid thioesterase (FAT) enzyme in the plastid is involved in determining the spectrum of chain length and degree of saturation of the fatty acids exported from the plastid. FAT enzymes can be classified into two classes based on their substrate specificity and nucleotide sequences, FATA and FATB (EC 3.1.2.14) (Jones et al., 1995). FATA polypeptides prefer oleoyl-ACP as substrate, while FATB polypeptides show higher activity towards saturated acyl-ACPs of different chain lengths such as acting on palmitoyl-ACP to produce free palmitic acid. Examples of FATA polypeptides useful for the invention include, but are not limited to, those from *Arabidopsis thaliana* (NP_189147), *Arachis hypogaea* (GU324446), *Helianthus annuus* (AAL79361), *Carthamus tinctorius* (AAA33020), *Morus notabilis* (XP_010104178.1), *Brassica napus* (CDX77369.1), *Ricinus communis* (XP_002532744.1) and (*Camelina sativa* (AFQ60946.1). Examples of FATB polypeptides useful for the invention include, but are not limited to, those from *Zea mays* (AIL28766), *Brassica napus* (ABH11710), *Helianthus annuus* (AAX19387), *Arabidopsis thaliana* (AEE28300), *Umbellularia californica* (AAC49001), *Arachis hypogaea* (AFR54500), *Ricinus communis* (EEF47013) and *Brachypodium sylvaticum* (ABL85052.1).

A subclass of FATB polypeptides are fatty acid thioesterases which have hydrolysis activity on a C8-C14 saturated acyl moiety linked by a thioester bond to ACP. Such enzymes are also referred to as medium chain fatty acid (MCFA) thioesterases or MC-FAT enzymes. Such enzymes may also have thioesterase activity on C16-ACP, indeed they may have greater thioesterase activity on a C16 acyl-ACP substrate than on a MCFA-ACP substrate, nevertheless they are considered herein to be an MCFA thioesterase if they produce at least 0.5% MCFA in the total fatty acid content when expressed exogenously in a plant cell. Examples of MCFA thioesterases are given in Example 9 herein.

As used herein, the term "fatty acid transporter" relates to a polypeptide present in the plastid membrane which is involved in actively transferring fatty acids from a plastid to outside the plastid. Examples of ABCA9 (ABC transporter A family member 9) polypeptides useful for the invention include, but are not limited to, those from *Arabidopsis thaliana* (Q9FLT5), *Capsella rubella* (XP_006279962.1), *Arabis alpine* (KFK27923.1), *Camelina sativa* (XP_010457652.1), *Brassica napus* (CDY23040.1) and *Brassica rapa* (XP_009136512.1).

As used herein, the term "acyl-CoA synthetase" or "ACS" (EC 6.2.1.3) means a polypeptide which is a member of a ligase family that catalyzes the formation of fatty acyl-CoA by a two-step process proceeding through an adenylated intermediate, using a non-esterified fatty acid, CoA and ATP as substrates to produce an acyl-CoA ester, AMP and pyrophosphate as products. As used herein, the term "long-chain acyl-CoA synthetase" (LACS) is an ACS that has activity on at least a C18 free fatty acid substrate although it may have broader activity on any of C14-C20 free fatty acids. The endogenous plastidial LACS enzymes are localised in the outer membrane of the plastid and function with fatty acid thioesterase for the export of fatty acids from the plastid (Schnurr et al., 2002). In *Arabidopsis*, there are at least nine identified LACS genes (Shockey et al., 2002). Preferred LACS polypeptides are of the LACS9 subclass, which in *Arabidopsis* is the major plastidial LACS. Examples of LACS polypeptides useful for the invention include, but are not limited to, those from *Arabidopsis thaliana* (Q9CAP8), *Camelina sativa* (XP_010416710.1), *Capsella rubella* (XP_006301059.1), *Brassica napus* (CDX79212.1), *Brassica rapa* (XP_009104618.1), *Gossypium raimondii* (XP_012450538.1) and *Vitis Vinifera* (XP_002285853.1). Homologs of the above mentioned polypeptides in other species can readily be identified by those skilled in the art.

Polypeptides Involved in Diacylglycerol (DAG) Production in Plastids

Levels of non-polar lipids in, for example, vegetative plant parts can also be increased by reducing the activity of polypeptides involved in diacylglycerol (DAG) production in the plastid in the plant parts, for example by either mutation of an endogenous gene encoding such a polypeptide or introduction of an exogenous gene which encodes a silencing RNA molecule which reduces the expression of a target gene involved in diacylglycerol (DAG) production in the plastid.

As used herein, the term "polypeptide involved in diacylglycerol (DAG) production in the plastid" refers to any polypeptide in the plastid (in cells which have plastids such as a cell of a vegetative part, tuber, beet or a seed of a plant) that is directly involved in the synthesis of diacylglycerol. Examples of such polypeptides include, but are not limited to, a plastidial GPAT, a plastidial LPAAT or a plastidial PAP.

GPATs are described elsewhere in the present document. Examples of plastidial GPAT polypeptides which can be targeted for down-regulation in the invention include, but are not limited to, those from *Arabidopsis thaliana* (BAA00575), *Capsella rubella* (XP_006306544.1), *Camelina sativa* (010499766.1), *Brassica napus* (CDY43010.1), *Brassica rapa* (XP_009145198.1), *Helianthus annuus* (ADV16382.1) and *Citrus unshiu* (BAB79529.1). Homologs in other species can readily be identified by those skilled in the art.

LPAATs are described elsewhere in the present document. As the skilled person would appreciate, plastidial LPAATs to be targeted for down-regulation for reducing DAG synthesis in the plastid are not endogenous LPAATs which function outside of the plastid such as those in the ER, for example as described herein as being useful for producing TAG comprising medium chain length fatty acids. Examples of plastidial LPAAT polypeptides which can be targeted for down-regulation in the invention include, but are not limited to, those from *Brassica napus* (ABQ42862), *Brassica rapa* (XP_009137939.1), *Arabidopsis thaliana* (NP_194787.2), (*Camelina sativa* (XP_010432969.1), *Glycine max* (XP_006592638.1) and *Solanum tuberosum* (XP_006343651.1). Homologs in other species of the above mentioned polypeptides can readily be identified by those skilled in the art.

As used herein, the term "phosphatidic acid phosphatase" (PAP) (EC 3.1.3.4) refers to a protein which hydrolyses the phosphate group on 3-sn-phosphatidate to produce 1,2-diacyl-sn-glycerol (DAG) and phosphate. Examples of plastidial PAP polypeptides which can be targeted for down-regulation in the invention include, but are not limited to, those from *Arabidopsis thaliana* (Q6NLA5), *Capsella rubella* (XP_006288605.1), *Camelina sativa* (XP_010452170.1), *Brassica napus* (CDY10405.1), *Brassica rapa* (XP_009122733.1), *Glycine max* (XP_003542504.1) and *Solanum tuberosum* (XP_006361792.1). Homologs in other species of the above mentioned polypeptides can readily be identified by those skilled in the art.

Import of Fatty Acids into Plastids

Levels of non-polar lipids in vegetative plant parts can also be increased by reducing the activity of TGD polypeptides in the plant parts, for example by either mutation of an endogenous gene encoding a TGD polypeptide or introduction of an exogenous gene which encodes a silencing RNA molecule which reduces the expression of an endogenous TGD gene. As used herein, a "Trigalactosyldiacylglycerol (TGD) polypeptide" is one which is involved in the ER to chloroplast lipid trafficking (Xu et al., 2010) and involved in forming a protein complex which has permease function for lipids. Four such polypeptides are known to form or be associated with a TGD permease, namely TGD-1 (Accession No. At1g19800 and homologs in other species), TGD-2 (Accession No At2g20320 and homologs in other species), TGD-3 (Accession No. NM-105215 and homologs in other species) and TGD-4 (At3g06960 and homologs in other species) (US 20120237949). TGD-1, -2 and -3 polypeptides are thought to be components of an ATP-Binding Cassette (ABC) transporter associated with the inner envelope membrane of the chloroplast. TGD-2 and TGD-4 polypeptides bind to phosphatidic acid whereas TGD-3 polypeptide functions as an ATPase in the chloroplast stroma. As used herein, an "endogenous TGD gene" is a gene which encodes a TGD polypeptide in a plant. Mutations in TGD-1 gene in *A. thaliana* caused accumulation of triacylglycerols, oligogalactolipids and phosphatidic acid (PA) (Xu et al., 2005). Mutations in TGD genes or SDP1 genes, or indeed in any desired gene in a plant, can be introduced in a site-specific manner by artificial zinc finger nuclease (ZFN), TAL effector (TALEN) or CRISPR technologies (using a Cas9 type nuclease) as known in the art. Preferred exogenous genes encoding silencing RNAs are those encoding a double-stranded RNA molecule such as a hairpin RNA or an artificial microRNA precursor.

Fatty Acid Modifying Enzymes

As used herein, the term "FAD2" refers to a membrane bound delta-12 fatty acid desturase that desaturates oleic acid ($C18{:}1^{\Delta 9}$) to produce linoleic acid ($C18{:}2^{\Delta 9,12}$).

As used herein, the term "epoxygenase" or "fatty acid epoxygenase" refers to an enzyme that introduces an epoxy group into a fatty acid resulting in the production of an epoxy fatty acid. In preferred embodiment, the epoxy group is introduced at the 12th carbon on a fatty acid chain, in which case the epoxygenase is a A12-epoxygenase, especially of a C16 or C18 fatty acid chain. The epoxygenase may be a 49-epoxygenase, a Δ15 epoxygenase, or act at a different position in the acyl chain as known in the art. The epoxygenase may be of the P450 class. Preferred epoxygenases are of the mono-oxygenase class as described in WO98/46762. Numerous epoxygenases or presumed epoxygenases have been cloned and are known in the art. Further examples of expoxygenases include proteins comprising an amino acid sequence provided in SEQ ID NO:21 of WO 2009/129582, polypeptides encoded by genes from *Crepis paleastina* (CAA76156, Lee et al., 1998), *Stokesia laevis* (AAR23815) (monooxygenase type), *Euphorbia lagascae* (AAL62063) (P450 type), human CYP2J2 (arachidonic acid epoxygenase, U37143); human CYPIA1 (arachidonic acid epoxygenase, K03191), as well as variants and/or mutants thereof.

As used herein, the term, "hydroxylase" or "fatty acid hydroxylase" refers to an enzyme that introduces a hydroxyl group into a fatty acid resulting in the production of a hydroxylated fatty acid. In a preferred embodiment, the hydroxyl group is introduced at the 2nd, 12th and/or 17th carbon on a C18 fatty acid chain. Preferably, the hydroxyl group is introduced at the 12th carbon, in which case the hydroxylase is a Δ12-hydroxylase. In another preferred embodiment, the hydroxyl group is introduced at the 15th carbon on a C16 fatty acid chain. Hydroxylases may also have enzyme activity as a fatty acid desaturase. Examples of genes encoding Δ12-hydroxylases include those from *Ricinus communis* (AAC9010, van de Loo 1995); *Physaria lindheimeri*, (ABQ01458, Dauk et al., 2007); *Lesquerella fendleri*, (AAC32755, Broun et al., 1998); *Daucus carota*, (AAK30206); fatty acid hydroxylases which hydroxylate the terminus of fatty acids, for example: A, *thaliana* CYP86A1 (P48422, fatty acid ω-hydroxylase); *Vicia sativa* CYP94A1 (P98188, fatty acid ω-hydroxylase); mouse CYP2E1 (X62595, lauric acid ω-1 hydroxylase); rat CYP4A1 (M57718, fatty acid ω-hydroxylase), as well as variants and/or mutants thereof.

As used herein, the term "conjugase" or "fatty acid conjugase" refers to an enzyme capable of forming a conjugated bond in the acyl chain of a fatty acid. Examples of conjugases include those encoded by genes from *Calendula officinalis* (AF343064, Qiu et al., 2001); *Vernicia fordii* (AAN87574, Dyer et al., 2002); Punica granatum (AY178446, Iwabuchi et al., 2003) and *Trichosanthes kirilowii* (AY178444, Iwabuchi et al., 2003); as well as variants and/or mutants thereof.

As used herein, the term "acetylenase" or "fatty acid acetylenase" refers to an enzyme that introduces a triple bond into a fatty acid resulting in the production of an acetylenic fatty acid. In a preferred embodiment, the triple bond is introduced at the 2nd, 6th, 12th and/or 17th carbon on a C18 fatty acid chain. Examples acetylenases include those from *Helianthus annuus* (AA038032, ABC59684), as well as variants and/or mutants thereof.

Examples of such fatty acid modifying genes include proteins according to the following Accession Numbers which are grouped by putative function, and homologues from other species: A12-acetylenases ABC00769, CAA76158, AAO38036, AAO38032; Δ12 conjugases AAG42259, AAG42260, AAN87574; Δ12-desaturases P46313, ABS18716, AAS57577, AAL61825, AAF04093, AAF04094; Δ12 epoxygenases XP_001840127, CAA76156, AAR23815; Δ12-hydroxylases ACF37070, AAC32755, ABQ01458, AAC49010; and Δ12 P450 enzymes such as AF406732.

Silencing Suppressors

In an embodiment, a recombinant/transgenic cell of the invention may comprise a silencing suppressor.

As used herein, a "silencing suppressor" enhances transgene expression in a cell of the invention. For example, the presence of the silencing suppressor results in higher levels of a polypeptide(s) produced an exogenous polynucleotide(s) in a cell of the invention when compared to a corresponding cell lacking the silencing suppressor. In an embodiment, the silencing suppressor preferentially binds a dsRNA molecule which is 21 base pairs in length relative to a dsRNA molecule of a different length. This is a feature of at least the p19 type of silencing suppressor, namely for p19 and its functional orthologs. In another embodiment, the silencing suppressor preferentially binds to a double-stranded RNA molecule which has overhanging 5' ends relative to a corresponding double-stranded RNA molecule having blunt ends. This is a feature of the V2 type of silencing suppressor, namely for V2 and its functional orthologs. In an embodiment, the dsRNA molecule, or a processed RNA product thereof, comprises at least 19 consecutive nucleotides, preferably whose length is 19-24 nucleotides with 19-24 consecutive basepairs in the case of a double-stranded hairpin RNA molecule or processed RNA product, more preferably consisting of 20, 21, 22, 23 or 24 nucleotides in length, and preferably comprising a methylated nucleotide, which is at least 95% identical to the complement of the region of the target RNA, and wherein the region of the target RNA is i) within a 5' untranslated region of the target RNA, ii) within a 5' half of the target RNA, iii) within a protein-encoding open-reading frame of the target RNA, iv) within a 3' half of the target RNA, or v) within a 3' untranslated region of the target RNA.

Further details regarding silencing suppressors are well known in the art and described in WO 2013/096992 and WO 2013/096993.

Polynucleotides

The terms "polynucleotide", and "nucleic acid" are used interchangeably. They refer to a polymeric form of nucleotides of any length, either deoxyribonucleotides or ribonucleotides, or analogs thereof. A polynucleotide of the invention may be of genomic, cDNA, semisynthetic, or synthetic origin, double-stranded or single-stranded and by virtue of its origin or manipulation: (1) is not associated with all or a portion of a polynucleotide with which it is associated in nature, (2) is linked to a polynucleotide other than that to which it is linked in nature, or (3) does not occur in nature. The following are non-limiting examples of polynucleotides: coding or non-coding regions of a gene or gene fragment, exons, introns, messenger RNA (mRNA), transfer RNA (tRNA), ribosomal RNA (rRNA), ribozymes, cDNA, recombinant polynucleotides, plasmids, vectors, isolated DNA of any sequence, isolated RNA of any sequence, chimeric DNA of any sequence, nucleic acid probes, and primers. For in vitro use, a polynucleotide may comprise modified nucleotides such as by conjugation with a labeling component.

As used herein, an "isolated polynucleotide" refers to a polynucleotide which has been separated from the polynucleotide sequences with which it is associated or linked in its native state, or a non-naturally occurring polynucleotide.

As used herein, the term "gene" is to be taken in its broadest context and includes the deoxyribonucleotide sequences comprising the transcribed region and, if translated, the protein coding region, of a structural gene and including sequences located adjacent to the coding region on both the 5' and 3' ends for a distance of at least about 2 kb on either end and which are involved in expression of the gene. In this regard, the gene includes control signals such as promoters, enhancers, termination and/or polyadenylation signals that are naturally associated with a given gene, or heterologous control signals, in which case, the gene is referred to as a "chimeric gene". The sequences which are located 5' of the protein coding region and which are present on the mRNA are referred to as 5' non-translated sequences. The sequences which are located 3' or downstream of the protein coding region and which are present on the mRNA are referred to as 3' non-translated sequences. The term "gene" encompasses both cDNA and genomic forms of a gene. A genomic form or clone of a gene contains the coding region which may be interrupted with non-coding sequences termed "introns", "intervening regions", or "intervening sequences." Introns are segments of a gene which are transcribed into nuclear RNA (nRNA). Introns may contain regulatory elements such as enhancers. Introns are removed or "spliced out" from the nuclear or primary transcript; introns are therefore absent in the mRNA transcript. A gene which contains at least one intron may be subject to variable splicing, resulting in alternative mRNAs from a single transcribed gene and therefore polypeptide variants. A gene in its native state, or a chimeric gene may lack introns. The mRNA functions during translation to specify the sequence or order of amino acids in a nascent polypeptide. The term "gene" includes a synthetic or fusion molecule encoding all or part of the proteins of the invention described herein and a complementary nucleotide sequence to any one of the above.

As used herein, "chimeric DNA" refers to any DNA molecule that is not naturally found in nature; also referred to herein as a "DNA construct" or "genetic construct". Typically, a chimeric DNA comprises regulatory and transcribed or protein coding sequences that are not naturally found together in nature. Accordingly, chimeric DNA may comprise regulatory sequences and coding sequences that are derived from different sources, or regulatory sequences and coding sequences derived from the same source, but arranged in a manner different than that found in nature. The open reading frame may or may not be linked to its natural upstream and downstream regulatory elements. The open reading frame may be incorporated into, for example, the plant genome, in a non-natural location, or in a replicon or vector where it is not naturally found such as a bacterial plasmid or a viral vector. The term "chimeric DNA" is not limited to DNA molecules which are replicable in a host, but includes DNA capable of being ligated into a replicon by, for example, specific adaptor sequences.

A "transgene" is a gene that has been introduced into the genome by a transformation procedure. The term includes a gene in a progeny cell, plant, seed, non-human organism or part thereof which was introducing into the genome of a progenitor cell thereof. Such progeny cells etc may be at least a 3rd or 4th generation progeny from the progenitor cell which was the primary transformed cell, or of the progenitor transgenic plant (referred to herein as a TO plant). Progeny may be produced by sexual reproduction or vegetatively such as, for example, from tubers in potatoes or ratoons in sugarcane. The term "genetically modified", "genetic modification" and variations thereof, is a broader term that includes introducing a gene into a cell by transformation or transduction, mutating a gene in a cell and genetically altering or modulating the regulation of a gene in a cell, or the progeny of any cell modified as described above.

A "genomic region" as used herein refers to a position within the genome where a transgene, or group of transgenes (also referred to herein as a cluster), have been inserted into a cell, or predecessor thereof. Such regions only comprise nucleotides that have been incorporated by the intervention of man such as by methods described herein.

A "recombinant polynucleotide" of the invention refers to a nucleic acid molecule which has been constructed or modified by artificial recombinant methods. The recombinant polynucleotide may be present in a cell in an altered amount or expressed at an altered rate (e.g., in the case of mRNA) compared to its native state. In one embodiment, the polynucleotide is introduced into a cell that does not naturally comprise the polynucleotide. Typically an exogenous DNA is used as a template for transcription of mRNA which is then translated into a continuous sequence of amino acid residues coding for a polypeptide of the invention within the transformed cell. In another embodiment, the polynucleotide is endogenous to the cell and its expression is altered by recombinant means, for example, an exogenous control sequence is introduced upstream of an endogenous gene of interest to enable the transformed cell to express the polypeptide encoded by the gene, or a deletion is created in a gene of interest by ZFN, Talen or CRISPR methods.

A recombinant polynucleotide of the invention includes polynucleotides which have not been separated from other components of the cell-based or cell-free expression system, in which it is present, and polynucleotides produced in said cell-based or cell-free systems which are subsequently purified away from at least some other components. The polynucleotide can be a contiguous stretch of nucleotides or comprise two or more contiguous stretches of nucleotides from different sources (naturally occurring and/or synthetic) joined to form a single polynucleotide. Typically, such chimeric polynucleotides comprise at least an open reading frame encoding a polypeptide of the invention operably linked to a promoter suitable of driving transcription of the open reading frame in a cell of interest.

With regard to the defined polynucleotides, it will be appreciated that % identity figures higher than those provided above will encompass preferred embodiments. Thus, where applicable, in light of the minimum % identity figures, it is preferred that the polynucleotide comprises a polynucleotide sequence which is at least 60%, more preferably at least 65%, more preferably at least 70%, more preferably at least 75%, more preferably at least 80%, more preferably at least 85%, more preferably at least 90%, more preferably at least 91%, more preferably at least 92%, more preferably at least 93%, more preferably at least 94%, more preferably at least 95%, more preferably at least 96%, more preferably at least 97%, more preferably at least 98%, more preferably at least 99%, more preferably at least 99.1%, more preferably at least 99.2%, more preferably at least 99.3%, more preferably at least 99.4%, more preferably at least 99.5%, more preferably at least 99.6%, more preferably at least 99.7%, more preferably at least 99.8%, and even more preferably at least 99.9% identical to the relevant nominated SEQ ID NO.

A polynucleotide of, or useful for, the present invention may selectively hybridise, under stringent conditions, to a polynucleotide defined herein. As used herein, stringent conditions are those that: (1) employ during hybridisation a denaturing agent such as formamide, for example, 50% (v/v) formamide with 0.1% (w/v) bovine serum albumin, 0.1% Ficoll, 0.1% polyvinylpyrrolidone, 50 mM sodium phosphate buffer at pH 6.5 with 750 mM NaCl, 75 mM sodium citrate at 42° C.; or (2) employ 50% formamide, 5×SSC (0.75 M NaCl, 0.075 M sodium citrate), 50 mM sodium phosphate (pH 6.8), 0.1% sodium pyrophosphate, 5×Denhardt's solution, sonicated salmon sperm DNA (50 g/ml), 0.1% SDS and 10% dextran sulfate at 42° C. in 0.2×SSC and 0.1% SDS, and/or (3) employ low ionic strength and high temperature for washing, for example, 0.015 M NaCl/0.0015 M sodium citrate/0.1% SDS at 50° ° C.

Polynucleotides of the invention may possess, when compared to naturally occurring molecules, one or more mutations which are deletions, insertions, or substitutions of nucleotide residues. Polynucleotides which have mutations relative to a reference sequence can be either naturally occurring (that is to say, isolated from a natural source) or synthetic (for example, by performing site-directed mutagenesis or DNA shuffling on the nucleic acid as described above).

Polynucleotides for Reducing Expression of Genes

RNA Interference

RNA interference (RNAi) is particularly useful for specifically reducing the expression of a gene, which results in reduced production of a particular protein if the gene encodes a protein. Although not wishing to be limited by theory, Waterhouse et al. (1998) have provided a model for the mechanism by which dsRNA (duplex RNA) can be used to reduce protein production. This technology relies on the presence of dsRNA molecules that contain a sequence that is essentially identical to the mRNA of the gene of interest or part thereof. Conveniently, the dsRNA can be produced from a single promoter in a recombinant vector or host cell, where the sense and anti-sense sequences are flanked by an unrelated sequence which enables the sense and anti-sense sequences to hybridize to form the dsRNA molecule with the unrelated sequence forming a loop structure. The design and production of suitable dsRNA molecules is well within the capacity of a person skilled in the art, particularly considering Waterhouse et al. (1998), Smith et al. (2000), WO 99/32619, WO 99/53050, WO 99/49029, and WO 01/34815.

In one example, a DNA is introduced that directs the synthesis of an at least partly double stranded RNA product(s) with homology to the target gene to be inactivated such as, for example, a SDP1, TGD, plastidial GPAT, plastidial LPAAT, plastidial PAP, AGPase gene. The DNA therefore comprises both sense and antisense sequences that, when transcribed into RNA, can hybridize to form the double stranded RNA region. In one embodiment of the invention, the sense and antisense sequences are separated by a spacer region that comprises an intron which, when transcribed into RNA, is spliced out. This arrangement has been shown to result in a higher efficiency of gene silencing (Smith et al., 2000). The double stranded region may comprise one or two RNA molecules, transcribed from either one DNA region or two. The presence of the double stranded molecule is thought to trigger a response from an endogenous system that destroys both the double stranded RNA and also the homologous RNA transcript from the target gene, efficiently reducing or eliminating the activity of the target gene.

The length of the sense and antisense sequences that hybridize should each be at least 19 contiguous nucleotides, preferably at least 50 contiguous nucleotides, more preferably at least 100 or at least 200 contiguous nucleotides. Generally, a sequence of 100-1000 nucleotides corresponding to a region of the target gene mRNA is used. The full-length sequence corresponding to the entire gene transcript may be used. The degree of identity of the sense sequence to the targeted transcript (and therefore also the identity of the antisense sequence to the complement of the target transcript) should be at least 85%, at least 90%, or 95-100%. The RNA molecule may of course comprise unrelated sequences which may function to stabilize the molecule. The RNA molecule may be expressed under the control of a RNA polymerase II or RNA polymerase III promoter. Examples of the latter include tRNA or snRNA promoters.

Preferred small interfering RNA ("siRNA") molecules comprise a nucleotide sequence that is identical to about 19-25 contiguous nucleotides of the target mRNA. Preferably, the siRNA sequence commences with the dinucleotide AA, comprises a GC-content of about 30-70% (preferably, 30-60%, more preferably 40-60% and more preferably about 45%-55%), and does not have a high percentage identity to any nucleotide sequence other than the target in the genome of the organism in which it is to be introduced, for example, as determined by standard BLAST search.

microRNA

MicroRNAs (abbreviated miRNAs) are generally 19-25 nucleotides (commonly about 20-24 nucleotides in plants) non-coding RNA molecules that are derived from larger precursors that form imperfect stem-loop structures. miRNAs bind to complementary sequences on target messenger RNA transcripts (mRNAs), usually resulting in translational repression or target degradation and gene silencing. Artificial miRNAs (amiRNAs) can be designed based on natural miRNAs for reducing the expression of any gene of interest, as well known in the art.

In plant cells, miRNA precursor molecules are believed to be largely processed in the nucleus. The pri-miRNA (containing one or more local double-stranded or "hairpin" regions as well as the usual 5' "cap" and polyadenylated tail of an mRNA) is processed to a shorter miRNA precursor molecule that also includes a stem-loop or fold-back structure and is termed the "pre-miRNA". In plants, the pre-miRNAs are cleaved by distinct DICER-like (DCL) enzymes, yielding miRNA:miRNA* duplexes. Prior to transport out of the nucleus, these duplexes are methylated.

In the cytoplasm, the miRNA strand from the miRNA:miRNA duplex is selectively incorporated into an active RNA-induced silencing complex (RISC) for target recognition. The RISC-complexes contain a particular subset of Argonaute proteins that exert sequence-specific gene repression (see, for example, Millar and Waterhouse, 2005; Pasquinelli et al., 2005; Almeida and Allshire, 2005).

Cosuppression

Genes can suppress the expression of related endogenous genes and/or transgenes already present in the genome, a phenomenon termed homology-dependent gene silencing. Most of the instances of homology dependent gene silencing fall into two classes—those that function at the level of transcription of the transgene, and those that operate post-transcriptionally.

Post-transcriptional homology-dependent gene silencing (i.e., cosuppression) describes the loss of expression of a transgene and related endogenous or viral genes in transgenic plants. Cosuppression often, but not always, occurs when transgene transcripts are abundant, and it is generally thought to be triggered at the level of mRNA processing, localization, and/or degradation. Several models exist to explain how cosuppression works (see in Taylor, 1997).

Cosuppression involves introducing an extra copy of a gene or a fragment thereof into a plant in the sense orientation with respect to a promoter for its expression. The size of the sense fragment, its correspondence to target gene regions, and its degree of sequence identity to the target gene can be determined by those skilled in the art. In some instances, the additional copy of the gene sequence interferes with the expression of the target plant gene. Reference is made to WO 97/20936 and EP 0465572 for methods of implementing co-suppression approaches.

Antisense Polynucleotides

The term "antisense polynucletoide" shall be taken to mean a DNA or RNA molecule that is complementary to at least a portion of a specific mRNA molecule encoding an endogenous polypeptide and capable of interfering with a post-transcriptional event such as mRNA translation. The use of antisense methods is well known in the art (see for example, G. Hartmann and S. Endres, Manual of Antisense Methodology, Kluwer (1999)). The use of antisense techniques in plants has been reviewed by Bourque (1995) and Senior (1998). Bourque (1995) lists a large number of examples of how antisense sequences have been utilized in plant systems as a method of gene inactivation. Bourque also states that attaining 100% inhibition of any enzyme activity may not be necessary as partial inhibition will more than likely result in measurable change in the system. Senior (1998) states that antisense methods are now a very well established technique for manipulating gene expression.

In one embodiment, the antisense polynucleotide hybridises under physiological conditions, that is, the antisense polynucleotide (which is fully or partially single stranded) is at least capable of forming a double stranded polynucleotide with mRNA encoding an endogenous polypeptide, for example, a SDP1, TGD, plastidial GPAT, plastidial LPAAT, plastidial PAP or AGPase mRNA under normal conditions in a cell.

Antisense molecules may include sequences that correspond to the structural genes or for sequences that effect control over the gene expression or splicing event. For example, the antisense sequence may correspond to the targeted coding region of endogenous gene, or the 5'-untranslated region (UTR) or the 3'-UTR or combination of these. It may be complementary in part to intron sequences, which may be spliced out during or after transcription, preferably only to exon sequences of the target gene. In view of the generally greater divergence of the UTRs, targeting these regions provides greater specificity of gene inhibition.

The length of the antisense sequence should be at least 19 contiguous nucleotides, preferably at least 50 nucleotides, and more preferably at least 100, 200, 500 or 1000 nucleotides. The full-length sequence complementary to the entire gene transcript may be used. The length is most preferably 100-2000 nucleotides. The degree of identity of the antisense sequence to the targeted transcript should be at least 90% and more preferably 95-100%. The antisense RNA molecule may of course comprise unrelated sequences which may function to stabilize the molecule.

Recombinant Vectors

One embodiment of the present invention includes a recombinant vector, which comprises at least one polynucleotide defined herein and is capable of delivering the polynucleotide into a host cell. Recombinant vectors include expression vectors. Recombinant vectors contain heterologous polynucleotide sequences, that is, polynucleotide sequences that are not naturally found adjacent to a polynucleotide defined herein, that preferably, are derived from a different species. The vector can be either RNA or DNA, and typically is a viral vector, derived from a virus, or a plasmid. Plasmid vectors typically include additional nucleic acid sequences that provide for easy selection, amplification, and transformation of the expression cassette in prokaryotic cells, e.g., pUC-derived vectors, pGEM-derived vectors or binary vectors containing one or more T-DNA regions. Additional nucleic acid sequences include origins of replication to provide for autonomous replication of the vector, selectable marker genes, preferably encoding antibiotic or herbicide resistance, unique multiple cloning sites providing for multiple sites to insert nucleic acid sequences or genes encoded in the nucleic acid construct, and sequences that enhance transformation of prokaryotic and eukaryotic (especially plant) cells.

"Operably linked" as used herein, refers to a functional relationship between two or more nucleic acid (e.g., DNA) segments. Typically, it refers to the functional relationship of a transcriptional regulatory element (promoter) to a transcribed sequence. For example, a promoter is operably linked to a coding sequence of a polynucleotide defined herein, if it stimulates or modulates the transcription of the coding sequence in an appropriate cell. Generally, promoter transcriptional regulatory elements that are operably linked to a transcribed sequence are physically contiguous to the transcribed sequence, i.e., they are cis-acting. However, some transcriptional regulatory elements such as enhancers need not be physically contiguous or located in close proximity to the coding sequences whose transcription they enhance.

When there are multiple promoters present, each promoter may independently be the same or different.

Recombinant vectors may also contain one or more signal peptide sequences to enable an expressed polypeptide defined herein to be retained in the endoplasmic reticulum (ER) in the cell, or transfer into a plastid, and/or contain fusion sequences which lead to the expression of nucleic acid molecules as fusion proteins. Examples of suitable signal segments include any signal segment capable of directing the secretion or localisation of a polypeptide defined herein.

To facilitate identification of transformants, the recombinant vector desirably comprises a selectable or screenable marker gene. By "marker gene" is meant a gene that imparts a distinct phenotype to cells expressing the marker gene and thus, allows such transformed cells to be distinguished from cells that do not have the marker. A selectable marker gene confers a trait for which one can "select" based on resistance to a selective agent (e.g., a herbicide, antibiotic). A screenable marker gene (or reporter gene) confers a trait that one can identify through observation or testing, that is, by "screening" (e.g., β-glucuronidase, luciferase, GFP or other enzyme activity not present in untransformed cells). Exemplary selectable markers for selection of plant transformants include, but are not limited to, a hyg gene which encodes hygromycin B resistance; a neomycin phosphotransferase (nptII) gene conferring resistance to kanamycin, paromomycin; a glutathione-S-transferase gene from rat liver conferring resistance to glutathione derived herbicides as for example, described in EP 256223; a glutamine synthetase gene conferring, upon overexpression, resistance to glutamine synthetase inhibitors such as phosphinothricin as for example, described in WO 87/05327; an acetyltransferase gene from *Streptomyces viridochromogenes* conferring resistance to the selective agent phosphinothricin as for example, described in EP 275957; a gene encoding a 5-enolshikimate-3-phosphate synthase (EPSPS) conferring tolerance to N-phosphonomethylglycine as for example, described by Hinchee et al. (1988); a bar gene conferring resistance against bialaphos as for example, described in WO91/02071; a nitrilase gene such as bxn from *Klebsiella ozaenae* which confers resistance to bromoxynil (Stalker et al., 1988); a dihydrofolate reductase (DHFR) gene conferring resistance to methotrexate (Thillet et al., 1988); a mutant acetolactate synthase gene (ALS) which confers resistance to imidazolinone, sulfonylurea, or other ALS-inhibiting chemicals (EP 154,204); a mutated anthranilate synthase gene that confers resistance to 5-methyl tryptophan; or a dalapon dehalogenase gene that confers resistance to the herbicide.

Preferably, the recombinant vector is stably incorporated into the genome of the cell such as the plant cell. Accordingly, the recombinant vector may comprise appropriate elements which allow the vector to be incorporated into the genome, or into a chromosome of the cell.

Expression Vector

As used herein, an "expression vector" is a DNA vector that is capable of transforming a host cell and of effecting expression of one or more specified polynucleotides.

Expression vectors of the present invention contain regulatory sequences such as transcription control sequences, translation control sequences, origins of replication, and other regulatory sequences that are compatible with the host cell and that control the expression of polynucleotides of the present invention. In particular, expression vectors of the present invention include transcription control sequences. Transcription control sequences are sequences which control the initiation, elongation, and termination of transcription. Particularly important transcription control sequences are those which control transcription initiation such as promoter, enhancer, operator and repressor sequences. The choice of the regulatory sequences used depends on the target organism such as a plant and/or target organ or tissue of interest. Such regulatory sequences may be obtained from any eukaryotic organism such as plants or plant viruses, or may be chemically synthesized. A number of vectors suitable for stable transfection of plant cells or for the establishment of transgenic plants have been described in for example, Pouwels et al., Cloning Vectors: A Laboratory Manual, 1985, supp. 1987, Weissbach and Weissbach, Methods for Plant Molecular Biology, Academic Press, 1989, and Gelvin et al., Plant Molecular Biology Manual, Kluwer Academic Publishers, 1990. Typically, plant expression vectors include for example, one or more cloned plant genes under the transcriptional control of 5' and 3' regulatory sequences and a dominant selectable marker. Such plant expression vectors also can contain a promoter regulatory region (e.g., a regulatory region controlling inducible or constitutive, environmentally- or developmentally-regulated, or cell- or tissue-specific expression), a transcription initiation start site, a ribosome binding site, a transcription termination site, and/or a polyadenylation signal.

A number of constitutive promoters that are active in plant cells have been described. Suitable promoters for constitutive expression in plants include, but are not limited to, the cauliflower mosaic virus (CaMV) 35S promoter, the Figwort mosaic virus (FMV) 35S, the light-inducible promoter from the small subunit (SSU) of the ribulose-1,5-bis-phosphate carboxylase, the rice cytosolic triosephosphate isomerase promoter, the adenine phosphoribosyltransferase promoter of *Arabidopsis*, the rice actin 1 gene promoter, the mannopine synthase and octopine synthase promoters, the Adh promoter, the sucrose synthase promoter, the R gene complex promoter, and the chlorophyll α/β binding protein gene promoter. These promoters have been used to create DNA vectors that have been expressed in plants, see for example, WO 84/02913. All of these promoters have been used to create various types of plant-expressible recombinant DNA vectors.

For the purpose of expression in source tissues of the plant such as the leaf, seed, root or stem, it is preferred that the promoters utilized in the present invention have relatively high expression in these specific tissues. For this purpose, one may choose from a number of promoters for genes with tissue- or cell-specific, or -enhanced expression. Examples of such promoters reported in the literature include, the chloroplast glutamine synthetase GS2 promoter from pea, the chloroplast fructose-1,6-biphosphatase promoter from wheat, the nuclear photosynthetic ST-LSI promoter from potato, the serine/threonine kinase promoter and the glucoamylase (CHS) promoter from *Arabidopsis thaliana*. Also reported to be active in photosynthetically active tissues are the ribulose-1,5-bisphosphate carboxylase promoter from eastern larch (*Larix laricina*), the promoter for the Cab gene, Cab6, from pine, the promoter for the Cab-1 gene from wheat, the promoter for the Cab-1 gene from spinach, the promoter for the Cab 1R gene from rice, the pyruvate, orthophosphate dikinase (PPDK) promoter from *Zea mays*, the promoter for the tobacco Lhcb1*2 gene, the *Arabidopsis thaliana* Suc2 sucrose-$H^{30}$ symporter promoter, and the promoter for the thylakoid membrane protein genes from spinach (PsaD, PsaF, PsaE, PC, FNR, AtpC, AtpD, Cab, RbcS). Other promoters for the chlorophyll α/β-binding proteins may also be utilized in the present invention such as the promoters for LhcB gene and PsbP gene from white mustard (*Sinapis alba*).

A variety of plant gene promoters that are regulated in response to environmental, hormonal, chemical, and/or developmental signals, also can be used for expression of RNA-binding protein genes in plant cells, including promoters regulated by (1) heat, (2) light (e.g., pea RbcS-3A promoter, maize RbcS promoter), (3) hormones such as abscisic acid, (4) wounding (e.g., WunI), or (5) chemicals such as methyl jasmonate, salicylic acid, steroid hormones, alcohol, Safeners (WO 97/06269), or it may also be advantageous to employ (6) organ-specific promoters.

As used herein, the term "plant storage organ specific promoter" refers to a promoter that preferentially, when compared to other plant tissues, directs gene transcription in a storage organ of a plant. For the purpose of expression in sink tissues of the plant such as the tuber of the potato plant, the fruit of tomato, or the seed of soybean, canola, cotton, *Zea mays*, wheat, rice, and barley, it is preferred that the promoters utilized in the present invention have relatively high expression in these specific tissues. The promoter for β-conglycinin or other seed-specific promoters such as the napin, zein, linin and phaseolin promoters, can be used. Root specific promoters may also be used. An example of such a promoter is the promoter for the acid chitinase gene. Expression in root tissue could also be accomplished by utilizing the root specific subdomains of the CaMV 35S promoter that have been identified.

In a particularly preferred embodiment, the promoter directs expression in tissues and organs in which lipid biosynthesis take place. Such promoters may act in seed development at a suitable time for modifying lipid composition in seeds. Preferred promoters for seed-specific expression include: 1) promoters from genes encoding enzymes involved in lipid biosynthesis and accumulation in seeds such as desaturases and elongases, 2) promoters from genes encoding seed storage proteins, and 3) promoters from genes encoding enzymes involved in carbohydrate biosynthesis and accumulation in seeds. Seed specific promoters which are suitable are, the oilseed rape napin gene promoter (U.S. Pat. No. 5,608,152), the *Vicia faba* USP promoter (Baumlein et al., 1991), the *Arabidopsis* oleosin promoter (WO 98/45461), the *Phaseolus vulgaris* phaseolin promoter (U.S. Pat. No. 5,504,200), the *Brassica* Bce4 promoter (WO 91/13980), or the legumin B4 promoter (Baumlein et al., 1992), and promoters which lead to the seed-specific expression in monocots such as maize, barley, wheat, rye, rice and the like. Notable promoters which are suitable are the barley lpt2 or lpt1 gene promoter (WO 95/15389 and WO 95/23230), or the promoters described in WO 99/16890 (promoters from the barley hordein gene, the rice glutelin gene, the rice oryzin gene, the rice prolamin gene, the wheat gliadin gene, the wheat glutelin gene, the maize zein gene, the oat glutelin gene, the sorghum kasirin gene, the rye secalin gene). Other promoters include those described by Broun et al. (1998), Potenza et al. (2004), US 20070192902 and US 20030159173. In an embodiment, the seed specific promoter is preferentially expressed in defined parts of the seed such as the cotyledon(s) or the endosperm. Examples of cotyledon specific promoters include, but are not limited to, the FP1 promoter (Ellerstrom et al., 1996), the pea legumin promoter (Perrin et al., 2000), and the bean phytohemagglutnin promoter (Perrin et al., 2000). Examples of endosperm specific promoters include, but are not limited to, the maize zein-1 promoter (Chikwamba et al., 2003), the rice glutelin-1 promoter (Yang et al., 2003), the barley D-hordein promoter (Horvath et al., 2000) and wheat HMW glutenin promoters (Alvarez et al., 2000). In a further embodiment, the seed specific promoter is not expressed, or is only expressed at a low level, in the embryo and/or after the seed germinates.

In another embodiment, the plant storage organ specific promoter is a fruit specific promoter. Examples include, but are not limited to, the tomato polygalacturonase, E8 and Pds promoters, as well as the apple ACC oxidase promoter (for review, see Potenza et al., 2004). In a preferred embodiment, the promoter preferentially directs expression in the edible parts of the fruit, for example the pith of the fruit, relative to the skin of the fruit or the seeds within the fruit.

In an embodiment, the inducible promoter is the *Aspergillus nidulans* alc system. Examples of inducible expression systems which can be used instead of the *Aspergillus nidulans* alc system are described in a review by Padidam (2003) and Corrado and Karali (2009). In another embodiment, the inducible promoter is a safener inducible promoter such as, for example, the maize In2-1 or In2-2 promoter (Hershey and Stoner, 1991), the safener inducible promoter is the maize GST-27 promoter (Jepson et al., 1994), or the soybean GH2/4 promoter (Ulmasov et al., 1995).

In another embodiment, the inducible promoter is a senescence inducible promoter such as, for example, senescence-inducible promoter SAG (senescence associated gene) 12 and SAG 13 from *Arabidopsis* (Gan, 1995; Gan and Amasino, 1995) and LSC54 from *Brassica napus* (Buchanan-Wollaston, 1994). Such promoters show increased expression at about the onset of senescence of plant tissues, in particular the leaves.

For expression in vegetative tissue leaf-specific promoters, such as the ribulose biphosphate carboxylase (RBCS) promoters, can be used. For example, the tomato RBCS1, RBCS2 and RBCS3A genes are expressed in leaves and light grown seedlings (Meier et al., 1997). A ribulose bisphosphate carboxylase promoters expressed almost exclusively in mesophyll cells in leaf blades and leaf sheaths at high levels, described by Matsuoka et al. (1994), can be used. Another leaf-specific promoter is the light harvesting chlorophyll a/b binding protein gene promoter (see, Shiina et al., 1997). The *Arabidopsis thaliana* myb-related gene promoter (Atmyb5) described by Li et al. (1996), is leaf-specific. The Atmyb5 promoter is expressed in developing leaf trichomes, stipules, and epidermal cells on the margins of young rosette and cauline leaves, and in immature seeds. A leaf promoter identified in maize by Busk et al. (1997), can also be used.

In some instances, for example when LEC2 or BBM is recombinantly expressed, it may be desirable that the transgene is not expressed at high levels. An example of a promoter which can be used in such circumstances is a truncated napin A promoter which retains the seed-specific expression pattern but with a reduced expression level (Tan et al., 2011).

The 5' non-translated leader sequence can be derived from the promoter selected to express the heterologous gene sequence of the polynucleotide of the present invention, or may be heterologous with respect to the coding region of the enzyme to be produced, and can be specifically modified if desired so as to increase translation of mRNA. For a review of optimizing expression of transgenes, see Koziel et al. (1996). The 5' non-translated regions can also be obtained from plant viral RNAs (Tobacco mosaic virus, Tobacco etch virus, Maize dwarf mosaic virus, Alfalfa mosaic virus, among others) from suitable eukaryotic genes, plant genes (wheat and maize chlorophyll a/b binding protein gene leader), or from a synthetic gene sequence. The present invention is not limited to constructs wherein the non-translated region is derived from the 5' non-translated sequence that accompanies the promoter sequence. The leader sequence could also be derived from an unrelated promoter or coding sequence. Leader sequences useful in context of the present invention comprise the maize Hsp70 leader (U.S. Pat. Nos. 5,362,865 and 5,859,347), and the TMV omega element.

The termination of transcription is accomplished by a 3' non-translated DNA sequence operably linked in the expression vector to the polynucleotide of interest. The 3' non-translated region of a recombinant DNA molecule contains a polyadenylation signal that functions in plants to cause the addition of adenylate nucleotides to the 3' end of the RNA. The 3' non-translated region can be obtained from various genes that are expressed in plant cells. The nopaline synthase 3' untranslated region, the 3' untranslated region from pea small subunit Rubisco gene, the 3' untranslated region from soybean 7S seed storage protein gene are commonly used in this capacity. The 3' transcribed, non-translated regions containing the polyadenylate signal of *Agrobacterium* tumor-inducing (Ti) plasmid genes are also suitable.

Recombinant DNA technologies can be used to improve expression of a transformed polynucleotide by manipulating, for example, the efficiency with which the resultant transcripts are translated by codon optimisation according to the host cell species or the deletion of sequences that destabilize transcripts, and the efficiency of post-translational modifications.

Transfer Nucleic Acids

Transfer nucleic acids can be used to deliver an exogenous polynucleotide to a cell and comprise one, preferably two, border sequences and one or more polynucleotides of interest. The transfer nucleic acid may or may not encode a selectable marker. Preferably, the transfer nucleic acid forms part of a binary vector in a bacterium, where the binary vector further comprises elements which allow replication of the vector in the bacterium, selection, or maintenance of bacterial cells containing the binary vector. Upon transfer to a eukaryotic cell, the transfer nucleic acid component of the binary vector is capable of integration into the genome of the eukaryotic cell or, for transient expression experiments, merely of expression in the cell.

As used herein, the term "extrachromosomal transfer nucleic acid" refers to a nucleic acid molecule that is capable of being transferred from a bacterium such as *Agrobacterium* sp., to a eukaryotic cell such as a plant leaf cell. An extrachromosomal transfer nucleic acid is a genetic element that is well-known as an element capable of being transferred, with the subsequent integration of a nucleotide sequence contained within its borders into the genome of the recipient cell. In this respect, a transfer nucleic acid is flanked, typically, by two "border" sequences, although in some instances a single border at one end can be used and the second end of the transferred nucleic acid is generated randomly in the transfer process. A polynucleotide of interest is typically positioned between the left border-like sequence and the right border-like sequence of a transfer nucleic acid. The polynucleotide contained within the transfer nucleic acid may be operably linked to a variety of different promoter and terminator regulatory elements that facilitate its expression, that is, transcription and/or translation of the polynucleotide. Transfer DNAs (T-DNAs) from *Agrobacterium* sp. such as *Agrobacterium tumefaciens* or *Agrobacterium rhizogenes*, and man made variants/mutants thereof are probably the best characterized examples of transfer nucleic acids. Another example is P-DNA ("plant-DNA") which comprises T-DNA border-like sequences from plants.

As used herein, "T-DNA" refers to a T-DNA of an *Agrobacterium tumefaciens* Ti plasmid or from an *Agrobacterium rhizogenes* Ri plasmid, or variants thereof which function for transfer of DNA into plant cells. The T-DNA may comprise an entire T-DNA including both right and left border sequences, but need only comprise the minimal sequences required in cis for transfer, that is, the right T-DNA border sequence. The T-DNAs of the invention have inserted into them, anywhere between the right and left border sequences (if present), the polynucleotide of interest. The sequences encoding factors required in trans for transfer of the T-DNA into a plant cell such as vir genes, may be inserted into the T-DNA, or may be present on the same replicon as the T-DNA, or preferably are in trans on a compatible replicon in the *Agrobacterium* host. Such "binary vector systems" are well known in the art. As used herein, "P-DNA" refers to a transfer nucleic acid isolated from a plant genome, or man made variants/mutants thereof, and comprises at each end, or at only one end, a T-DNA border-like sequence.

As used herein, a "border" sequence of a transfer nucleic acid can be isolated from a selected organism such as a plant or bacterium, or be a man made variant/mutant thereof. The border sequence promotes and facilitates the transfer of the polynucleotide to which it is linked and may facilitate its integration in the recipient cell genome. In an embodiment, a border-sequence is between 10-80 bp in length. Border sequences from T-DNA from *Agrobacterium* sp. are well known in the art and include those described in Lacroix et al. (2008).

Whilst traditionally only *Agrobacterium* sp. have been used to transfer genes to plants cells, there are now a large number of systems which have been identified/developed which act in a similar manner to *Agrobacterium* sp. Several non-*Agrobacterium* species have recently been genetically modified to be competent for gene transfer (Chung et al., 2006; Broothaerts et al., 2005). These include *Rhizobium* sp. NGR234, *Sinorhizobium meliloti* and *Mezorhizobium loti.*

Direct transfer of eukaryotic expression plasmids from bacteria to eukaryotic hosts was first achieved several decades ago by the fusion of mammalian cells and protoplasts of plasmid-carrying *Escherichia coli* (Schaffner, 1980). Since then, the number of bacteria capable of delivering genes into mammalian cells has steadily increased (Weiss, 2003), being discovered by four groups independently (Sizemore et al. 1995; Courvalin et al., 1995; Powell et al., 1996; Darji et al., 1997).

As used herein, the terms "transfection", "transformation" and variations thereof are generally used interchangeably. "Transfected" or "transformed" cells may have been manipulated to introduce the polynucleotide(s) of interest, or may be progeny cells derived therefrom.

Recombinant Cells

The invention also provides a recombinant cell, for example, a recombinant plant cell or fungal cell, which is a host cell transformed with one or more polynucleotides or vectors defined herein, or combination thereof. Suitable cells of the invention include any cell that can be transformed with a polynucleotide or recombinant vector of the invention, encoding an RNA, polypeptide or enzyme described herein. The cell is a cell which is thereby capable of being used for producing lipid. The recombinant cell may be a cell in culture, a cell in vitro, or in an organism such as for example, a plant, or in an organ such as, for example, a seed or a leaf. Preferably, the cell is in a plant, more preferably in the seed of a plant. In one embodiment, the recombinant cell is a non-human cell.

Host cells into which the polynucleotide(s) are introduced can be either untransformed cells or cells that are already transformed with at least one nucleic acid. Such nucleic acids may be related to lipid synthesis, or unrelated. Host cells of the present invention either can be endogenously (i.e., naturally) capable of producing polypeptide(s) defined herein, in which case the recombinant cell derived therefrom has an enhanced capability of producing the polypeptide(s), or can be capable of producing said polypeptide(s) only after being transformed with at least one polynucleotide of the invention. In an embodiment, a recombinant cell of the invention has an enhanced capacity to produce non-polar lipid such as TAG.

Host cells of the present invention can be any cell capable of producing at least one protein described herein, and include fungal (including yeast), animal such as arthropod, and plant cells such as algal cells. In a preferred embodiment, the plant cell is a seed cell, in particular, a cell in a cotyledon or endosperm of a seed. The host cells may be of an organism suitable for a fermentation process, such as, for example, *Yarrowia lipolytica* or other yeasts. In one embodiment, the cell is an animal cell. The animal cell may be of any type of animal such as, for example, a non-human animal cell, a non-human vertebrate cell, a non-human mammalian cell, or cells of aquatic animals such as fish or crustacea, invertebrates, insects, etc. Examples of algal cells useful as host cells of the present invention include, for example, *Chlamydomonas* sp. (for example, *Chlamydomonas reinhardtii*), *Dunaliella* sp., *Haematococcus* sp., *Chlorella* sp., *Thraustochytrium* sp., *Schizochytrium* sp., and *Volvox* sp.

Transgenic Plants

The invention also provides a plant comprising one or more exogenous polynucleotides or polypeptides and one or more genetic modifications of the invention, a cell of the invention, a vector of the invention, or a combination thereof. The term "plant" when used as a noun refers to whole plants, whilst the term "part thereof" refers to plant organs (e.g., leaves, stems, roots, flowers, fruit), single cells (e.g., pollen), seed, seed parts such as an embryo, endosperm, scutellum or seed coat, plant tissue such as vascular tissue, plant cells and progeny of the same. As used herein, plant parts comprise plant cells.

As used herein, the terms "in a plant" and "in the plant" in the context of a modification to the plant means that the modification has occurred in at least one part of the plant, including where the modification has occurred throughout the plant, and does not exclude where the modification occurs in only one or more but not all parts of the plant. For example, a tissue-specific promoter is said to be expressed "in a plant", even though it might be expressed only in certain parts of the plant. Analogously, "a transcription factor polypeptide that increases the expression of one or more glycolytic and/or fatty acid biosynthetic genes in the plant" means that the increased expression occurs in at least a part of the plant.

As used herein, the term "plant" is used in it broadest sense, including any organism in the Kingdom Plantae. It also includes red and brown algae as well as green algae. It includes, but is not limited to, any species of flowering plant, grass, crop or cereal (e.g., oilseed, maize, soybean), fodder or forage, fruit or vegetable plant, herb plant, woody plant or tree. It is not meant to limit a plant to any particular structure. It also refers to a unicellular plant (e.g., microalga). The term "part thereof" in reference to a plant refers to a plant cell and progeny of same, a plurality of plant cells, a structure that is present at any stage of a plant's development, or a plant tissue. Such structures include, but are not limited to, leaves, stems, flowers, fruits, nuts, roots, seed, seed coat, embryos. The term "plant tissue" includes differentiated and undifferentiated tissues of plants including those present in leaves, stems, flowers, fruits, nuts, roots, seed, for example, embryonic tissue, endosperm, dermal tissue (e.g., epidermis, periderm), vascular tissue (e.g., xylem, phloem), or ground tissue (comprising parenchyma, collenchyma, and/or sclerenchyma cells), as well as cells in culture (e.g., single cells, protoplasts, callus, embryos, etc.). Plant tissue may be in planta, in organ culture, tissue culture, or cell culture.

As used herein, the term "vegetative tissue" or "vegetative plant part" is any plant tissue, organ or part other than organs for sexual reproduction of plants. The organs for sexual reproduction of plants are specifically seed bearing organs, flowers, pollen, fruits and seeds. Vegetative tissues and parts include at least plant leaves, stems (including bolts and tillers but excluding the heads), tubers and roots, but excludes flowers, pollen, seed including the seed coat, embryo and endosperm, fruit including mesocarp tissue, seed-bearing pods and seed-bearing heads. In one embodiment, the vegetative part of the plant is an aerial plant part. In another or further embodiment, the vegetative plant part is a green part such as a leaf or stem.

A "transgenic plant" or variations thereof refers to a plant that contains a transgene not found in a wild-type plant of the same species, variety or cultivar. Transgenic plants as defined in the context of the present invention include plants and their progeny which have been genetically modified using recombinant techniques to cause production of at least one polypeptide defined herein in the desired plant or part thereof. Transgenic plant parts has a corresponding meaning.

The terms "seed" and "grain" are used interchangeably herein. "Grain" refers to mature grain such as harvested grain or grain which is still on a plant but ready for harvesting, but can also refer to grain after imbibition or germination, according to the context. Mature grain commonly has a moisture content of less than about 18%. In a preferred embodiment, the moisture content of the grain is at a level which is generally regarded as safe for storage, preferably between 5% and 15%, between 6% and 8%, between 8% and 10%, or between 10% and 15%. "Developing seed" as used herein refers to a seed prior to maturity, typically found in the reproductive structures of the plant after fertilisation or anthesis, but can also refer to such seeds prior to maturity which are isolated from a plant. Mature seed commonly has a moisture content of less than about 12%.

As used herein, the term "plant storage organ" refers to a part of a plant specialized to store energy in the form of for example, proteins, carbohydrates, lipid. Examples of plant storage organs are seed, fruit, tuberous roots, and tubers. A preferred plant storage organ of the invention is seed.

As used herein, the term "phenotypically normal" refers to a genetically modified plant or part thereof, for example a transgenic plant, or a storage organ such as a seed, tuber or fruit of the invention not having a significantly reduced ability to grow and reproduce when compared to an unmodified plant or part thereof. Preferably, the biomass, growth rate, germination rate, storage organ size, seed size and/or the number of viable seeds produced is not less than 90% of that of a plant lacking said genetic modifications or exogenous polynucleotides when grown under identical conditions. This term does not encompass features of the plant which may be different to the wild-type plant but which do not effect the usefulness of the plant for commercial purposes such as, for example, a ballerina phenotype of seedling leaves. In an embodiment, the genetically modified plant or part thereof which is phenotypically normal comprises a recombinant polynucleotide encoding a silencing suppressor operably linked to a plant storage organ specific promoter and has an ability to grow or reproduce which is essentially the same as a corresponding plant or part thereof not comprising said polynucleotide.

As used herein, the term "commencement of flowering" or "initiation of flowering" with respect to a plant refers to the time that the first flower on the plant opens, or the time of onset of anthesis.

As used herein, the term "seed set" with respect to a seed-bearing plant refers to the time when the first seed of the plant reaches maturity. This is typically observable by the colour of the seed or its moisture content, well known in the art.

As used herein, the term "senescence" with respect to a whole plant refers to the final stage of plant development which follows the completion of growth, usually after the plant reaches maximum aerial biomass or height. Senescence begins when the plant aerial biomass reaches its maximum and begins to decline in amount and generally ends with death of most of the plant tissues. It is during this stage that the plant mobilises and recycles cellular components from leaves and other parts which accumulated during growth to other parts to complete its reproductive development. Senescence is a complex, regulated process which involves new or increased gene expression of some genes. Often, some plant parts are senescing while other parts of the same plant continue to grow. Therefore, with respect to a plant leaf or other green organ, the term "senescence" as used herein refers to the time when the amount of chlorophyll in the leaf or organ begins to decrease. Senescence is typically associated with dessication of the leaf or organ, mostly in the last stage of senescence. Senescence is usually observable by the change in colour of the leaf from green towards yellow and eventually to brown when fully dessicated. It is believed that cellular senescence underlies plant and organ senescence.

Plants provided by or contemplated for use in the practice of the present invention include both monocotyledons and dicotyledons. In preferred embodiments, the plants of the present invention are crop plants (for example, cereals and pulses, maize, wheat, potatoes, rice, sorghum, millet, cassava, barley) or legumes such as soybean, beans or peas. The plants may be grown for production of edible roots, tubers, leaves, stems, flowers or fruit. The plants may be vegetable plants whose vegetative parts are used as food. The plants of the invention may be: *Acrocomia aculeata* (macauba palm), *Arabidopsis thaliana, Aracinis hypogaea* (peanut), *Astrocaryum murumuru* (*murumuru*), *Astrocaryum vulgare* (tucumã), *Attalea geraensis* (Indaiá-rateiro), *Attalea humilis* (American oil palm), *Attalea oleifera* (andaiá), *Attalea phalerata* (uricuri), *Attalea speciosa* (babassu), *Avena sativa* (oats), *Beta vulgaris* (sugar beet), *Brassica* sp. such as *Brassica carinata, Brassica juncea, Brassica napobrassica, Brassica napus* (canola), *Camelina sativa* (false flax), *Can-*

*nabis sativa* (hemp), *Carthamus tinctorius* (safflower), *Caryocar brasiliense* (pequi), *Cocos nucifera* (Coconut), *Crambe abyssinica* (Abyssinian kale), *Cucumis melo* (melon), *Elaeis guineensis* (African palm), *Glycine max* (soybean), *Gossypium hirsutum* (cotton), *Helianthus* sp. such as *Helianthus annuus* (sunflower), *Hordeum vulgare* (barley), *Jatropha curcas* (physic nut), *Joannesia princeps* (arara nut-tree), *Lemna* sp. (duckweed) such as *Lemna aequinoctialis, Lemna disperma, Lemna ecuadoriensis, Lemna gibba* (swollen duckweed), *Lemna japonica, Lemna minor, Lemna minuta, Lemna obscura, Lemna paucicostata, Lemna perpusilla, Lemna tenera, Lemna trisulca, Lemna turionifera, Lemna valdiviana, Lemna yungensis, Licania rigida* (oiticica), *Linum usitatissimum* (flax), *Lupinus angustifolius* (lupin), *Mauritia flexuosa* (buriti palm), *Maximiliana maripa* (inaja palm), *Miscanthus* sp. such as *Miscanthus* x *giganteus* and *Miscanthus sinensis, Nicotiana* sp. (tabacco) such as *Nicotiana tabacum* or *Nicotiana benthamiana, Oenocarpus bacaba* (bacaba-do-azeite), *Oenocarpus bataua* (patauã), *Oenocarpus distichus* (bacaba-de-leque), *Oryza* sp. (rice) such as *Oryza sativa* and *Oryza glaberrima, Panicum virgatum* (switchgrass), *Paraqueiba paraensis* (mari), *Persea amencana* (avocado), *Pongamia pinnata* (Indian beech), *Populus trichocarpa, Ricinus communis* (castor), *Saccharum* sp. (sugarcane), *Sesamum indicum* (sesame), *Solanum tuberosum* (potato), *Sorghum* sp. such as *Sorghum* bicolor, *Sorghum vulgare*, needle palm), *Triticum* sp. (wheat) such as *Triticum aestivum, Zea mays* (corn), alfalfa (*Medicago sativa*), rye (*Secale cerale*), sweet potato (*Lopmoea batatus*), cassava (*Manihot esculenta*), coffee (*Cofea* spp.), pineapple (*Anana comosus*), citris tree (*Citrus* spp.), cocoa (*Theobroma cacao*), tea (*Camellia senensis*), banana (*Musa* spp.), avocado (*Persea americana*), fig (*Ficus casica*), guava (*Psidium guajava*), mango (*Mangifer indica*), olive (*Olea europaea*), *papaya* (*Carica papaya*), cashew (*Anacardium occidentale*), macadamia (*Macadamia intergrifolia*) and almond (*Prumis amygdalus*).

Other preferred plants include C4 grasses such as, in addition to those mentioned above, *Andropogon gerardi, Bouteloua curtipendula, B. gracilis, Buchloe dactyloides, Schizachyrium scoparium, Sorghastrum nutans, Sporobolus cryptandrus*; C3 grasses such as *Elymus canadensis*, the legumes *Lespedeza capitata* and *Petalostemum villosum*, the forb *Aster azureus*; and woody plants such as *Quercus ellipsoidalis* and *Q. macrocarpa*. Other preferred plants include C3 grasses.

In a preferred embodiment, the plant is an angiosperm.

In an embodiment, the plant is an oilseed plant, preferably an oilseed crop plant. As used herein, an "oilseed plant" is a plant species used for the commercial production of lipid from the seeds of the plant. The oilseed plant may be, for example, oil-seed rape (such as canola), maize, sunflower, safflower, soybean, sorghum, flax (linseed) or sugar beet. Furthermore, the oilseed plant may be other Brassicas, cotton, peanut, poppy, rutabaga, mustard, castor bean, sesame, safflower, *Jatropha curcas* or nut producing plants. The plant may produce high levels of lipid in its fruit such as olive, oil palm or coconut. Horticultural plants to which the present invention may be applied are lettuce, endive, or vegetable Brassicas including cabbage, broccoli, or cauliflower. The present invention may be applied in tobacco, cucurbits, carrot, strawberry, tomato, or pepper.

In a preferred embodiment, the transgenic plant is homozygous for each and every gene that has been introduced (transgene) so that its progeny do not segregate for the desired phenotype. The transgenic plant may also be heterozygous for the introduced transgene(s), preferably uniformly heterozygous for the transgene such as for example, in F1 progeny which have been grown from hybrid seed. Such plants may provide advantages such as hybrid vigour, well known in the art.

Transformation of Plants

Transgenic plants can be produced using techniques known in the art, such as those generally described in Slater et al., Plant Biotechnology—The Genetic Manipulation of Plants, Oxford University Press (2003), and Christou and Klee, Handbook of Plant Biotechnology, John Wiley and Sons (2004).

As used herein, the terms "stably transforming", "stably transformed" and variations thereof refer to the integration of the polynucleotide into the genome of the cell such that they are transferred to progeny cells during cell division without the need for positively selecting for their presence. Stable transformants, or progeny thereof, can be identified by any means known in the art such as Southern blots on chromosomal DNA, or in situ hybridization of genomic DNA, enabling their selection.

*Agrobacterium*-mediated transfer is a widely applicable system for introducing genes into plant cells because DNA can be introduced into cells in whole plant tissues, plant organs, or explants in tissue culture, for either transient expression, or for stable integration of the DNA in the plant cell genome. For example, floral-dip (in planta) methods may be used. The use of *Agrobacterium*-mediated plant integrating vectors to introduce DNA into plant cells is well known in the art. The region of DNA to be transferred is defined by the border sequences, and the intervening DNA (T-DNA) is usually inserted into the plant genome. It is the method of choice because of the facile and defined nature of the gene transfer.

Acceleration methods that may be used include for example, microprojectile bombardment and the like. One example of a method for delivering transforming nucleic acid molecules to plant cells is microprojectile bombardment. This method has been reviewed by Yang et al., Particle Bombardment Technology for Gene Transfer, Oxford Press, Oxford, England (1994). Non-biological particles (microprojectiles) that may be coated with nucleic acids and delivered into cells, for example of immature embryos, by a propelling force. Exemplary particles include those comprised of tungsten, gold, platinum, and the like.

In another method, plastids can be stably transformed. Methods disclosed for plastid transformation in higher plants include particle gun delivery of DNA containing a selectable marker and targeting of the DNA to the plastid genome through homologous recombination (U.S. Pat. Nos. 5,451,513, 5,545,818, 5,877,402, 5,932,479, and WO 99/05265). Other methods of cell transformation can also be used and include but are not limited to the introduction of DNA into plants by direct DNA transfer into pollen, by direct injection of DNA into reproductive organs of a plant, or by direct injection of DNA into the cells of immature embryos followed by the rehydration of desiccated embryos.

The regeneration, development, and cultivation of plants from single plant protoplast transformants or from various transformed explants is well known in the art (Weissbach et al., In: Methods for Plant Molecular Biology, Academic Press, San Diego, Calif., (1988)). This regeneration and growth process typically includes the steps of selection of transformed cells, culturing those individualized cells through the usual stages of embryonic development through the rooted plantlet stage. Transgenic embryos and seeds are similarly regenerated. The resulting transgenic rooted shoots are thereafter planted in an appropriate plant growth medium such as soil.

The development or regeneration of plants containing the foreign, exogenous gene is well known in the art. Preferably, the regenerated plants are self-pollinated to provide homozygous transgenic plants. Otherwise, pollen obtained from the regenerated plants is crossed to seed-grown plants of agronomically important lines. Conversely, pollen from plants of these important lines is used to pollinate regenerated plants. A transgenic plant of the present invention containing a desired polynucleotide is cultivated using methods well known to one skilled in the art.

To confirm the presence of the transgenes in transgenic cells and plants, a polymerase chain reaction (PCR) amplification or Southern blot analysis can be performed using methods known to those skilled in the art. Expression products of the transgenes can be detected in any of a variety of ways, depending upon the nature of the product, and include Northern blot hybridisation, Western blot and enzyme assay. Once transgenic plants have been obtained, they may be grown to produce plant tissues or parts having the desired phenotype. The plant tissue or plant parts, may be harvested, and/or the seed collected. The seed may serve as a source for growing additional plants with tissues or parts having the desired characteristics. Preferably, the vegetative plant parts are harvested at a time when the yield of non-polar lipids are at their highest. In one embodiment, the vegetative plant parts are harvested about at the time of flowering, or after flowering has initiated. Preferably, the plant parts are harvested at about the time senescence begins, usually indicated by yellowing and drying of leaves.

Transgenic plants formed using *Agrobacterium* or other transformation methods typically contain a single genetic locus on one chromosome. Such transgenic plants can be referred to as being hemizygous for the added gene(s). More preferred is a transgenic plant that is homozygous for the added gene(s), that is, a transgenic plant that contains two added genes, one gene at the same locus on each chromosome of a chromosome pair. A homozygous transgenic plant can be obtained by self-fertilising a hemizygous transgenic plant, germinating some of the seed produced and analyzing the resulting plants for the gene of interest.

It is also to be understood that two different transgenic plants that contain two independently segregating exogenous genes or loci can also be crossed (mated) to produce offspring that contain both sets of genes or loci. Selfing of appropriate F1 progeny can produce plants that are homozygous for both exogenous genes or loci. Back-crossing to a parental plant and out-crossing with a non-transgenic plant are also contemplated, as is vegetative propagation. Similarly, a transgenic plant can be crossed with a second plant comprising a genetic modification such as a mutant gene and progeny containing both of the transgene and the genetic modification identified. Descriptions of other breeding methods that are commonly used for different traits and crops can be found in Fehr, In: Breeding Methods for Cultivar Development, Wilcox J. ed., American Society of Agronomy, Madison Wis. (1987).

Tilling

In one embodiment, TILLING (Targeting Induced Local Lesions IN Genomes) can be used to produce plants in which endogenous genes comprise a mutation, for example genes encoding an SDP1 or TGD polypeptide, a plastidial GPAT, plastidial LPAAT, phosphatidic acid phosphatase (PAP), or a combination of two or more thereof. In a first step, introduced mutations such as novel single base pair changes are induced in a population of plants by treating seeds (or pollen) with a chemical mutagen, and then advancing plants to a generation where mutations will be stably inherited. DNA is extracted, and seeds are stored from all members of the population to create a resource that can be accessed repeatedly over time. For a TILLING assay, heteroduplex methods using specific endonucleases can be used to detect single nucleotide polymorphisms (SNPs). Alternatively, Next Generation Sequencing of DNA from pools of mutagenised plants can be used to identify mutants in the gene of choice. Typically, a mutation frequency of one mutant per 1000 plants in the mutagenised population is achieved. Using this approach, many thousands of plants can be screened to identify any individual with a single base change as well as small insertions or deletions (1-30 bp) in any gene or specific region of the genome. TILLING is further described in Slade and Knauf (2005), and Henikoff et al. (2004).

In addition to allowing efficient detection of mutations, high-throughput TILLING technology is ideal for the detection of natural polymorphisms. Therefore, interrogating an unknown homologous DNA by heteroduplexing to a known sequence reveals the number and position of polymorphic sites. Both nucleotide changes and small insertions and deletions are identified, including at least some repeat number polymorphisms. This has been called Ecotilling (Comai et al., 2004).

Genome Editing Using Site-Specific Nucleases

Genome editing uses engineered nucleases such as RNA guided DNA endonucleases or nucleases composed of sequence specific DNA binding domains fused to a non-specific DNA cleavage module. These engineered nucleases enable efficient and precise genetic modifications by inducing targeted DNA double stranded breaks that stimulate the cell's endogenous cellular DNA repair mechanisms to repair the induced break. Such mechanisms include, for example, error prone non-homologous end joining (NHEJ) and homology directed repair (HDR).

In the presence of donor plasmid with extended homology arms, HDR can lead to the introduction of single or multiple transgenes to correct or replace existing genes. In the absence of donor plasmid, NHEJ-mediated repair yields small insertion or deletion mutations of the target that cause gene disruption.

Engineered nucleases useful in the methods of the present invention include zinc finger nucleases (ZFNs), transcription activator-like (TAL) effector nucleases (TALEN) and CRISPR/Cas9 type nucleases.

Typically nuclease encoded genes are delivered into cells by plasmid DNA, viral vectors or in vitro transcribed mRNA.

A zinc finger nuclease (ZFN) comprises a DNA-binding domain and a DNA-cleavage domain, wherein the DNA binding domain is comprised of at least one zinc finger and is operatively linked to a DNA-cleavage domain. The zinc finger DNA-binding domain is at the N-terminus of the protein and the DNA-cleavage domain is located at the C-terminus of said protein.

A ZFN must have at least one zinc finger. In a preferred embodiment, a ZFN would have at least three zinc fingers in order to have sufficient specificity to be useful for targeted genetic recombination in a host cell or organism. Typically, a ZFN having more than three zinc fingers would have progressively greater specificity with each additional zinc finger.

The zinc finger domain can be derived from any class or type of zinc finger. In a particular embodiment, the zinc finger domain comprises the $Cis_2His_2$ type of zinc finger that is very generally represented, for example, by the zinc finger transcription factors TFIIIA or Sp1. In a preferred embodiment, the zinc finger domain comprises three $Cis_2His_2$ type zinc fingers. The DNA recognition and/or the binding specificity of a ZFN can be altered in order to accomplish targeted genetic recombination at any chosen site in cellular DNA. Such modification can be accomplished using known molecular biology and/or chemical synthesis techniques. (see, for example, Bibikova et al., 2002).

The ZFN DNA-cleavage domain is derived from a class of non-specific DNA cleavage domains, for example the DNA-cleavage domain of a Type II restriction enzyme such as FokI (Kim et al., 1996). Other useful endonucleases may include, for example, HhaI, HindIII, Nod, BbvCI, EcoRI, BglI, and AlwI.

A transcription activator-like (TAL) effector nuclease (TALEN) comprises a TAL effector DNA binding domain and an endonuclease domain.

TAL effectors are proteins of plant pathogenic bacteria that are injected by the pathogen into the plant cell, where they travel to the nucleus and function as transcription factors to turn on specific plant genes. The primary amino acid sequence of a TAL effector dictates the nucleotide sequence to which it binds. Thus, target sites can be predicted for TAL effectors, and TAL effectors can be engineered and generated for the purpose of binding to particular nucleotide sequences.

Fused to the TAL effector-encoding nucleic acid sequences are sequences encoding a nuclease or a portion of a nuclease, typically a nonspecific cleavage domain from a type II restriction endonuclease such as FokI (Kim et al., 1996). Other useful endonucleases may include, for example, HhaI, HindIII, Nod, BbvCI, EcoRI, BglI, and AlwI. The fact that some endonucleases (e.g., FokI) only function as dimers can be capitalized upon to enhance the target specificity of the TAL effector. For example, in some cases each FokI monomer can be fused to a TAL effector sequence that recognizes a different DNA target sequence, and only when the two recognition sites are in close proximity do the inactive monomers come together to create a functional enzyme. By requiring DNA binding to activate the nuclease, a highly site-specific restriction enzyme can be created.

A sequence-specific TALEN can recognize a particular sequence within a preselected target nucleotide sequence present in a cell. Thus, in some embodiments, a target nucleotide sequence can be scanned for nuclease recognition sites, and a particular nuclease can be selected based on the target sequence. In other cases, a TALEN can be engineered to target a particular cellular sequence.

Genome Editing Using Programmable RNA-Guided DNA Endonucleases

Distinct from the site-specific nucleases described above, the clustered regulatory interspaced short palindromic repeats (CRISPR)/Cas system provides an alternative to ZFNs and TALENs for inducing targeted genetic alterations, via RNA-guided DNA cleavage.

CRISPR systems rely on CRISPR RNA (crRNA) and transactivating chimeric RNA (tracrRNA) for sequence-specific cleavage of DNA. Three types of CRISPR/Cas systems exist: in type II systems, Cas9 serves as an RNA-guided DNA endonuclease that cleaves DNA upon crRNA-tracrRNA target recognition. CRISPR RNA base pairs with tracrRNA to form a two-RNA structure that guides the Cas9 endonuclease to complementary DNA sites for cleavage.

The CRISPR system can be portable to plant cells by co-delivery of plasmids expressing the Cas endonuclease and the necessary crRNA components. The Cas endonuclease may be converted into a nickase to provide additional control over the mechanism of DNA repair (Cong et al., 2013).

CRISPRs are typically short partially palindromic sequences of 24-40 bp containing inner and terminal inverted repeats of up to 11 bp. Although isolated elements have been detected, they are generally arranged in clusters (up to about 20 or more per genome) of repeated units spaced by unique intervening 20-58 bp sequences. CRISPRs are generally homogenous within a given genome with most of them being identical. However, there are examples of heterogeneity in, for example, the Archaea (Mojica et al., 2000).

Plant Biomass

An increase in the total lipid content of plant biomass equates to greater energy content, making its use as a feed or forage or in the production of biofuel more economical.

The main components of naturally occurring plant biomass are carbohydrates (approximately 75%, dry weight) and lignin (approximately 25%), which can vary with plant type. The carbohydrates are mainly cellulose or hemicellulose fibers, which impart strength to the plant structure, and lignin, which holds the fibers together. Plant biomass typically has a low energy density as a result of both its physical form and moisture content. This also makes it inconvenient and inefficient for storage and transport without some kind of pre-processing. There are a range of processes available to convert it into a more convenient form including: 1) physical pre-processing (for example, grinding) or 2) conversion by thermal (for example, combustion, gasification, pyrolysis) or chemical (for example, anaerobic digestion, fermentation, composting, transesterification) processes. In this way, the biomass is converted into what can be described as a biomass fuel.

Combustion

Combustion is the process by which flammable materials are allowed to burn in the presence of air or oxygen with the release of heat. The basic process is oxidation. Combustion is the simplest method by which biomass can be used for energy, and has been used to provide heat. This heat can itself be used in a number of ways: 1) space heating, 2) water (or other fluid) heating for central or district heating or process heat, 3) steam raising for electricity generation or motive force. When the flammable fuel material is a form of biomass the oxidation is of predominantly the carbon (C) and hydrogen (H) in the cellulose, hemicellulose, lignin, and other molecules present to form carbon dioxide ($CO_2$) and water ($H_2O$). The plants of the invention provide improved fuel for combustion by virtue of the increased lipid content.

Gasification

Gasification is a partial oxidation process whereby a carbon source such as plant biomass, is broken down into carbon monoxide (CO) and hydrogen ($H_2$), plus carbon dioxide ($CO_2$) and possibly hydrocarbon molecules such as methane ($CH_4$). If the gasification takes place at a relatively low temperature, such as 700° C. to 1000° C., the product gas will have a relatively high level of hydrocarbons compared to high temperature gasification. As a result it may be used directly, to be burned for heat or electricity generation via a steam turbine or, with suitable gas clean up, to run an internal combustion engine for electricity generation. The combustion chamber for a simple boiler may be close coupled with the gasifier, or the producer gas may be cleaned of longer chain hydrocarbons (tars), transported, stored and burned remotely. A gasification system may be closely integrated with a combined cycle gas turbine for electricity generation (IGCC—integrated gasification combined cycle). Higher temperature gasification (1200° ° C. to 1600° C.) leads to few hydrocarbons in the product gas, and a higher proportion of CO and $H_2$. This is known as synthesis gas (syngas or biosyngas) as it can be used to synthesize longer chain hydrocarbons using techniques such as Fischer-Tropsch (FT) synthesis. If the ratio of $H_2$ to CO is correct (2:1) FT synthesis can be used to convert syngas into high quality synthetic diesel biofuel which is compatible with conventional fossil diesel and diesel engines.

Pyrolysis

As used herein, the term "pyrolysis" means a process that uses slow heating in the absence of oxygen to produce gaseous, oil and char products from biomass. Pyrolysis is a thermal or thermo-chemical conversion of lipid-based, particularly triglyceride-based, materials. The products of pyrolysis include gas, liquid and a sold char, with the proportions of each depending upon the parameters of the process. Lower temperatures (around 400° C.) tend to produce more solid char (slow pyrolysis), whereas somewhat higher temperatures (around 500° C.) produce a much higher proportion of liquid (bio-oil), provided the vapour residence time is kept down to around Is or less. Temperatures of about 275° C. to about 375° C. can be used to produce liquid bio-oil having a higher proportion of longer chain hydrocarbons. Pyrolysis involves direct thermal cracking of the lipids or a combination of thermal and catalytic cracking. At temperatures of about 400-500° C., cracking occurs, producing short chain hydrocarbons such as alkanes, alkenes, alkadienes, aromatics, olefins and carboxylic acid, as well as carbon monoxide and carbon dioxide.

Four main catalyst types can be used including transition metal catalysts, molecular sieve type catalysts, activated alumina and sodium carbonate (Maher et al., 2007). Examples are given in U.S. Pat. No. 4,102,938. Alumina ($Al_2O_3$) activated by acid is an effective catalyst (U.S. Pat. No. 5,233,109). Molecular sieve catalysts are porous, highly crystalline structures that exhibit size selectivity, so that molecules of only certain sizes can pass through. These include zeolite catalysts such as ZSM-5 or HZSM-5 which are crystalline materials comprising $AlO_4$ and $SiO_4$ and other silica-alumina catalysts. The activity and selectivity of these catalysts depends on the acidity, pore size and pore shape, and typically operate at 300-500° C. Transition metal catalysts are described for example in U.S. Pat. No. 4,992,605. Sodium carbonate catalyst has been used in the pyrolysis of oils (Dandik and Aksoy, 1998).

As used herein, "hydrothermal processing", "HTP", also referred to as "thermal depolymerisation" is a form of pyrolysis which reacts the plant-derived matter, specifically the carbon-containing material in the plant-derived matter, with hydrogen to produce a bio-oil product comprised predominantly of paraffinic hydrocarbons along with other gases and solids. A significant advantage of HTP is that the vegetative plant material does not need to be dried before forming the composition for the conversion reaction, although the vegetative plant material can be dried beforehand to aid in transport or storage of the biomass. The biomass can be used directly as harvested from the field. The reactor is any vessel which can withstand the high temperature and pressure used and is resistant to corrosion. The solvent used in the HTP includes water or is entirely water, or may include some hydrocarbon compounds in the form of an oil. Generally, the solvent in HTP lacks added alcohols. The conversion reaction may occur in an oxidative, reductive or inert environment. "Oxidative" as used herein means in the presence of air, "reductive" means in the presence of a reducing agent, typically hydrogen gas or methane, for example 10-15% $H_2$ with the remainder of the gas being $N_2$, and "inert" means in the presence of an inert gas such as nitrogen or argon. The conversion reaction is preferably carried out under reductive conditions. The carbon-containing materials that are converted include cellulose, hemicellulose, lignin and proteins as well as lipids. The process uses a conversion temperature of between 270° ° C. and 400° C. and a pressure of between 70 and 350 bar, typically 300° ° C. to 350° C. and a pressure between 100-170bar. As a result of the process, organic vapours, pyrolysis gases and charcoal are produced. The organic vapours are condensed to produce the bio-oil. Recovery of the bio-oil may be achieved by cooling the reactor and reducing the pressure to atmospheric pressure, which allows bio-oil (organic) and water phases to develop and the bio-oil to be removed from the reactor.

The yield of the recovered bio-oil is calculated as a percentage of the dry weight of the input biomass on a dry weight basis. It is calculated according to the formula: weight of bio-oil×100/dry weight of the vegetative plant parts. The weight of the bio-oil does not include the weight of any water or solids which may be present in a bio-oil mixture, which are readily removed by filtration or other known methods.

The bio-oil may then be separated into fractions by fractional distillation, with or without additional refining processes. Typically, the fractions that condense at these temperatures are termed: about 370° C., fuel oil; about 300° C., diesel oil; about 200° ° C., kerosene; about 150° C., gasoline (petrol). Heavier fractions may be cracked into lighter, more desirable fractions, well known in the art. Diesel fuel typically is comprised of C13-C22 hydrocarbon compounds.

As used herein, "petroleum diesel" (petrodiesel) means a diesel fuel made from fossil fuel and which falls under the specifications outlined by ASTM D975 in the United States and EN 590 in Europe. The term "renewable diesel" as used herein means a diesel fuel derived from recently living biomass (not fossil fuel) that meets the standards of ASTM D975 and are not mono-alkyl esters. Typical features of renewable diesel are: cetane number of 75-90, energy density of about 44 MJ/kg, density of about 0.78 g/ml, energy content of about 123 K BTU/gal, sulphur levels less than 10 ppm, cloud point below 0° C.

Transesterification

"Transesterification" as used herein is the conversion of lipids, principally triacylglycerols, into fatty acid methyl esters or ethyl esters by reaction with short chain alcohols such as methanol or ethanol, in the presence of a catalyst such as alkali or acid. Methanol is used more commonly due to low cost and availability, but ethanol, propanol or butanol or mixtures of the alcohols can also be used. The catalysts may be homogeneous catalysts, heterogeneous catalysts or enzymatic catalysts. Homogeneous catalysts include ferric sulphate followed by KOH. Heterogeneous catalysts include CaO, $K_3PO_4$, and $WO_3/ZrO_2$. Enzymatic catalysts include Novozyme 435 produced from *Candida antarctica.*

Transesterification can be carried out on extracted oil, or preferably directly in situ in the vegetative plant material. The vegetative plant parts may be dried and milled prior to being used to prepare the composition for the conversion reaction, but does not need to be. The advantage of direct conversion to fatty acid esters, preferably FAME, is that the conversion can use lower temperatures and pressures and still provide good yields of the product, for example, comprising at least 50% FAME by weight. The yield of recovered bio-oil by transesterification is calculated as for the HTP process.

Production of Non-Polar Lipids

Techniques that are routinely practiced in the art can be used to extract, process, purify and analyze the lipids such as the TAG produced by cells, organisms or parts thereof of the instant invention. Such techniques are described and explained throughout the literature in sources such as, Fereidoon Shahidi, Current Protocols in Food Analytical Chemistry, John Wiley & Sons, Inc. (2001) D1.1.1-D1.1.11, and Perez-Vich et al. (1998).

Production of Oil from Vegetative Plant Parts or Seed

Typically, plant seeds are cooked, pressed, and/or extracted to produce crude seedoil, which is then degummed, refined, bleached, and deodorized. Generally, techniques for crushing seed are known in the art. For example, oilseeds can be tempered by spraying them with water to raise the moisture content to, for example, 8.5%, and flaked using a smooth roller with a gap setting of 0.23 to 0.27 mm. Depending on the type of seed, water may not be added prior to crushing. Application of heat deactivates enzymes, facilitates further cell rupturing, coalesces the lipid droplets, and agglomerates protein particles, all of which facilitate the extraction process.

In an embodiment, the majority of the seedoil is released by passage through a screw press. Cakes expelled from the screw press are then solvent extracted for example, with hexane, using a heat traced column. Alternatively, crude seedoil produced by the pressing operation can be passed through a settling tank with a slotted wire drainage top to remove the solids that are expressed with the seedoil during the pressing operation. The clarified seedoil can be passed through a plate and frame filter to remove any remaining fine solid particles. If desired, the seedoil recovered from the extraction process can be combined with the clarified seedoil to produce a blended crude seedoil.

Once the solvent is stripped from the crude seedoil, the pressed and extracted portions are combined and subjected to normal lipid processing procedures (i.e., degumming, caustic refining, bleaching, and deodorization).

Extraction of the lipid from vegetative plant parts of the invention uses analogous methods to those known in the art for seedoil extraction. One way is physical extraction, which often does not use solvent extraction. Expeller pressed extraction is a common type, as are the screw press and ram press extraction methods. Mechanical extraction is typically less efficient than solvent extraction where an organic solvent (e.g., hexane) is mixed with at least the plant biomass, preferably after the biomass is dried and ground. The solvent dissolves the lipid in the biomass, which solution is then separated from the biomass by mechanical action (e.g., with the pressing processes above). This separation step can also be performed by filtration (e.g., with a filter press or similar device) or centrifugation etc. The organic solvent can then be separated from the non-polar lipid (e.g., by distillation). This second separation step yields non-polar lipid from the plant and can yield a re-usable solvent if one employs conventional vapor recovery. In an embodiment, the oil and/or protein content of the plant part or seed is analysed by near-infrared reflectance spectroscopy as described in Hom et al. (2007) prior to extraction.

If the vegetative plant parts are not to be used immediately to extract the lipid it is preferably processed to ensure the lipid content is minimized as much as possible (see, for example, Christie, 1993), such as by drying the vegetative plant parts.

Degumming

Degumming is an early step in the refining of oils and its primary purpose is the removal of most of the phospholipids from the oil, which may be present as approximately 1-2% of the total extracted lipid. Addition of ~2% of water, typically containing phosphoric acid, at 70-80° ° C. to the crude oil results in the separation of most of the phospholipids accompanied by trace metals and pigments. The insoluble material that is removed is mainly a mixture of phospholipids and triacylglycerols and is also known as lecithin. Degumming can be performed by addition of concentrated phosphoric acid to the crude seedoil to convert non-hydratable phosphatides to a hydratable form, and to chelate minor metals that are present. Gum is separated from the seedoil by centrifugation. The seedoil can be refined by addition of a sufficient amount of a sodium hydroxide solution to titrate all of the fatty acids and removing the soaps thus formed.

Alkali Refining

Alkali refining is one of the refining processes for treating crude oil, sometimes also referred to as neutralization. It usually follows degumming and precedes bleaching. Following degumming, the seedoil can treated by the addition of a sufficient amount of an alkali solution to titrate all of the fatty acids and phosphoric acids, and removing the soaps thus formed. Suitable alkaline materials include sodium hydroxide, potassium hydroxide, sodium carbonate, lithium hydroxide, calcium hydroxide, calcium carbonate and ammonium hydroxide. This process is typically carried out at room temperature and removes the free fatty acid fraction. Soap is removed by centrifugation or by extraction into a solvent for the soap, and the neutralised oil is washed with water. If required, any excess alkali in the oil may be neutralized with a suitable acid such as hydrochloric acid or sulphuric acid.

Bleaching

Bleaching is a refining process in which oils are heated at 90-120° C. for 10-30 minutes in the presence of a bleaching earth (0.2-2.0%) and in the absence of oxygen by operating with nitrogen or steam or in a vacuum. This step in oil processing is designed to remove unwanted pigments (carotenoids, chlorophyll, gossypol etc), and the process also removes oxidation products, trace metals, sulphur compounds and traces of soap.

Deodorization

Deodorization is a treatment of oils and fats at a high temperature (200-260° C.) and low pressure (0.1-1 mm Hg). This is typically achieved by introducing steam into the seedoil at a rate of about 0.1 ml/minute/100 ml of seedoil. Deodorization can be performed by heating the seedoil to 260° C. under vacuum, and slowly introducing steam into the seedoil at a rate of about 0.1 ml/minute/100 ml of seedoil. After about 30 minutes of sparging, the seedoil is allowed to cool under vacuum. The seedoil is typically transferred to a glass container and flushed with argon before being stored under refrigeration. If the amount of seedoil is limited, the seedoil can be placed under vacuum for example, in a Parr reactor and heated to 260° C. for the same length of time that it would have been deodorized. This treatment improves the colour of the seedoil and removes a majority of the volatile substances or odorous compounds including any remaining free fatty acids, monoacylglycerols and oxidation products.

Winterisation

Winterization is a process sometimes used in commercial production of oils for the separation of oils and fats into solid (stearin) and liquid (olein) fractions by crystallization at sub-ambient temperatures. It was applied originally to cottonseed oil to produce a solid-free product. It is typically used to decrease the saturated fatty acid content of oils.

Algae for the Production of Lipids

Algae can produce 10 to 100 times as much mass as terrestrial plants in a year and can be cultured in open-ponds (such as raceway-type ponds and lakes) or in photobioreactors. The most common oil-producing algae can generally include the diatoms (bacillariophytes), green algae (chlorophytes), blue-green algae (cyanophytes), and golden-brown algae (chrysophytes). In addition a fifth group known as haptophytes may be used. Groups include brown algae and heterokonts. Specific non-limiting examples algae include the Classes: Chlorophyceae, Eustigmatophyceae, Prymnesiophyceae, Bacillariophyceae. Bacillariophytes capable of oil production include the genera *Amphipleura, Amphora, Chaetoceros, Cyclotella, Cymbella, Fragilaria, Hantzschia, Navicula, Nitzschia, Phaeodactylum*, and *Thalassiosira*. Specific non-limiting examples of chlorophytes capable of oil production include *Ankistrodesmus, Botryococcus, Chlorella, Chlorococcum, Dunaliella, Monoraphidium, Oocystis, Scenedesmus*, and *Tetraselmis*. In one aspect, the chlorophytes can be *Chlorella* or *Dunaliella*. Specific non-limiting examples of cyanophytes capable of oil production include Oscillatoria and Synechococcus. A specific example of chrysophytes capable of oil production includes Boekelovia. Specific non-limiting examples of haptophytes include Isochysis and Pleurochysis.

Specific algae useful in the present invention include, for example, *Chlamydomonas* sp. such as *Chlamydomonas reinhardtii, Dunaliella* sp. such as *Dunaliella salina, Dunaliella tertiolecta, D. acidophila, D. Lateralis. D. martima. D. parva, D. polmorpha, D. primolecta, D. pseudosalina, D. quartolecta. D. viridis, Haematococcus* sp., *Chlorella* sp. such as *Chlorella vulgaris, Chlorella sorokiniana* or *Chlorella* protothecoides, *Thraustochytrium* sp., *Schizochytrium* sp., *Volvox* sp, *Nannochloropsis* sp., *Botryococcus braunii* which can contain over 60 wt % lipid, *Phaeodactylum tricormitum, Thalassiosira pseudonana, Isochrysis* sp., *Pavlova* sp., *Chlorococcum* sp, *Ellipsoidion* sp., *Neochloris* sp., *Scenedesmus* sp.

Algae of the invention can be harvested using microscreens, by centrifugation, by flocculation (using for example, chitosan, alum and ferric chloride) and by froth flotation. Interrupting the carbon dioxide supply can cause algae to flocculate on its own, which is called "autoflocculation". In froth flotation, the cultivator aerates the water into a froth, and then skims the algae from the top. Ultrasound and other harvesting methods are currently under development.

Lipid may be extracted from the algae by mechanical crushing. When algal mass is dried it retains its lipid content, which can then be "pressed" out with an oil press. Osmotic shock may also be used to release cellular components such as lipid from algae, and ultrasonic extraction can accelerate extraction processes. Chemical solvents (for example, hexane, benzene, petroleum ether) are often used in the extraction of lipids from algae. Enzymatic extraction using enzymes to degrade the cell walls may also be used to extract lipids from algae. Supercritical $CO_2$ can also be used as a solvent. In this method, $CO_2$ is liquefied under pressure and heated to the point that it becomes supercritical (having properties of both a liquid and a gas), allowing it to act as a solvent.

As used herein, an "oleaginous organism" is one which accumulates at least 20% of its dry weight as triacylglycerols. As used herein, "yeast" includes *Saccharomyces* spp., *Saccharomyces cerevisiae, Saccharomyces carlbergensis, Candida* spp., *Kluveromyces* spp., *Pichia* spp., *Hansemila* spp., *Trichoderma* spp., *Lipomyces starkey*, and *Yarrowia lipolytica*. Preferred yeast include *Yarrowia lipolytica* or other oleaginous yeasts and strains of the *Saccharomyces* spp.

Uses of Plant Lipids

The lipids produced by the methods described have a variety of uses. In some embodiments, the lipids are used as food oils. In other embodiments, the lipids are refined and used as lubricants or for other industrial uses such as the synthesis of plastics. In some preferred embodiments, the lipids are refined to produce biodiesel. Biodiesel can be made from oils derived from the plants, algae and fungi of the invention. Use of plant triacylglycerols for the production of biofuel is reviewed in Durrett et al. (2008). The resulting fuel is commonly referred to as biodiesel and has a dynamic viscosity range from 1.9 to 6.0 $mm^2s^{-1}$ (ASTM D6751). Bioalcohol may produced from the fermentation of sugars or the biomass other than the lipid left over after lipid extraction. General methods for the production of biofuel can be found in, for example, Maher and Bressler (2007), Greenwell et al. (2010), Karmakar et al. (2010), Alonso et al. (2010), Liu et al. (2010a). Gong and Jiang (2011), Endalew et al. (2011) and Semwal et al. (2011).

The present invention provides methods for increasing oil content in vegetative tissues. Plants of the present invention have increased energy content of leaves and/or stems such that the whole above-ground plant parts may be harvested and used to produce biofuel. Furthermore, the level of oleic acid is increased significantly while the polyunsaturated fatty acid alpha linolenic acid (ALA) was reduced. The plants, algae and fungi of the present invention thereby reduce the production costs of biofuel.

Biodiesel

The production of biodiesel, or alkyl esters, is well known. There are three basic routes to ester production from lipids: 1) Base catalysed transesterification of the lipid with alcohol; 2) Direct acid catalysed esterification of the lipid with methanol; and 3) Conversion of the lipid to fatty acids, and then to alkyl esters with acid catalysis. Any method for preparing fatty acid alkyl esters and glyceryl ethers (in which one, two or three of the hydroxy groups on glycerol are etherified) can be used. For example, fatty acids can be prepared, for example, by hydrolyzing or saponifying TAG with acid or base catalysts, respectively, or using an enzyme such as a lipase or an esterase. Fatty acid alkyl esters can be prepared by reacting a fatty acid with an alcohol in the presence of an acid catalyst. Fatty acid alkyl esters can also be prepared by reacting TAG with an alcohol in the presence of an acid or base catalyst. Glycerol ethers can be prepared, for example, by reacting glycerol with an alkyl halide in the presence of base, or with an olefin or alcohol in the presence of an acid catalyst. The alkyl esters can be directly blended with diesel fuel, or washed with water or other aqueous solutions to remove various impurities, including the catalysts, before blending.

Aviation Fuel

For improved performance of biofuels, thermal and catalytic chemical bond-breaking (cracking) technologies have been developed that enable converting bio-oils into bio-based alternatives to petroleum-derived diesel fuel and other fuels, such as jet fuel.

The use of medium chain fatty acid source, such produced by a recombinant eukaryotic cell of the invention, a transgenic non-human organism or a part thereof of the invention, a transgenic plant or part thereof of the invention, a seed of the invention, or a transgenic cell or transgenic plant or part thereof of the invention, precludes the need for high-energy fatty acid chain cracking to achieve the shorter molecules needed for jet fuels and other fuels with low-temperature flow requirements. This method comprises cleaving one or more medium chain fatty acid groups from the glycerides to form glycerol and one or more free fatty acids. In addition, the method comprises separating the one or more medium chain fatty acids from the glycerol, and decarboxylating the one or more medium chain fatty acids to form one or more hydrocarbons for the production of the jet fuel.

Feedstuffs

The present invention includes compositions which can be used as feedstuffs. For purposes of the present invention, "feedstuffs" include any food or preparation for human or animal consumption and which serves to nourish or build up tissues or supply energy, and/or to maintain, restore or support adequate nutritional status or metabolic function. Feedstuffs of the invention include nutritional compositions for babies and/or young children.

Feedstuffs of the invention comprise for example, a cell of the invention, a plant of the invention, the plant part of the invention, the seed of the invention, an extract of the invention, the product of a method of the invention or a composition along with a suitable carrier(s). The term "carrier" is used in its broadest sense to encompass any component which may or may not have nutritional value. As the person skilled in the art will appreciate, the carrier must be suitable for use (or used in a sufficiently low concentration) in a feedstuff, such that it does not have deleterious effect on an organism which consumes the feedstuff.

The feedstuff of the present invention comprises a lipid produced directly or indirectly by use of the methods, cells or organisms disclosed herein. The composition may either be in a solid or liquid form. Additionally, the composition may include edible macronutrients, vitamins, and/or minerals in amounts desired for a particular use. The amounts of these ingredients will vary depending on whether the composition is intended for use with normal individuals or for use with individuals having specialized needs such as individuals suffering from metabolic disorders and the like.

Examples of suitable carriers with nutritional value include, but are not limited to, macronutrients such as edible fats, carbohydrates and proteins. Examples of such edible fats include, but are not limited to, coconut oil, borage oil, fungal oil, black current oil, soy oil, and mono- and diglycerides. Examples of such carbohydrates include, but are not limited to, glucose, edible lactose, and hydrolyzed starch. Additionally, examples of proteins which may be utilized in the nutritional composition of the invention include, but are not limited to, soy proteins, electrodialysed whey, electrodialysed skim milk, milk whey, or the hydrolysates of these proteins.

With respect to vitamins and minerals, the following may be added to the feedstuff compositions of the present invention, calcium, phosphorus, potassium, sodium, chloride, magnesium, manganese, iron, copper, zinc, selenium, iodine, and vitamins A, E, D, C, and the B complex. Other such vitamins and minerals may also be added.

A feedstuff composition of the present invention may also be added to food even when supplementation of the diet is not required. For example, the composition may be added to food of any type, including, but not limited to, margarine, butter, cheeses, milk, yogurt, chocolate, candy, snacks, salad oils, cooking oils, cooking fats, meats, fish and beverages.

Additionally, lipid produced in accordance with the present invention or host cells transformed to contain and express the subject genes may also be used as animal food supplements to alter an animal's tissue or milk fatty acid composition to one more desirable for human or animal consumption. Examples of such animals include sheep, cattle, horses and the like. Furthermore, feedstuffs of the invention can be used in aquaculture to increase the levels of fatty acids in fish for human or animal consumption.

Preferred feedstuffs of the invention are the plants, seed and other plant parts such as leaves, fruits and stems which may be used directly as food or feed for humans or other animals. For example, animals may graze directly on such plants grown in the field, or be fed more measured amounts in controlled feeding. The invention includes the use of such plants and plant parts as feed for increasing the polyunsaturated fatty acid levels in humans and other animals.

For consumption by non-human animals the feedstuff may be in any suitable form for such as, but not limited to, silage, hay or pasture growing in a field. In an embodiment, the feedstuff for non-human consumption is a leguminous plant, or part thereof, which is a member of the family Fabaceae family (or Leguminosae) such as alfalfa, clover, peas, lucerne, beans, lentils, lupins, mesquite, carob, soybeans, and peanuts.

Compositions

The present invention also encompasses compositions, particularly pharmaceutical compositions, comprising one or more lipids produced using the methods of the invention.

A pharmaceutical composition may comprise one or more of the lipids, in combination with a standard, well-known, non-toxic pharmaceutically-acceptable carrier, adjuvant or vehicle such as phosphate-buffered saline, water, ethanol, polyols, vegetable oils, a wetting agent, or an emulsion such as a water/oil emulsion. The composition may be in either a liquid or solid form. For example, the composition may be in the form of a tablet, capsule, ingestible liquid, powder, topical ointment or cream. Proper fluidity can be maintained for example, by the maintenance of the required particle size in the case of dispersions and by the use of surfactants. It may also be desirable to include isotonic agents for example, sugars, sodium chloride, and the like. Besides such inert diluents, the composition can also include adjuvants such as wetting agents, emulsifying and suspending agents, sweetening agents, flavoring agents and perfuming agents.

A typical dosage of a particular fatty acid is from 0.1 mg to 20 g, taken from one to five times per day (up to 100 g daily) and is preferably in the range of from about 10 mg to about 1, 2, 5, or 10 g daily (taken in one or multiple doses). As known in the art, a minimum of about 300 mg/day of fatty acid, especially polyunsaturated fatty acid, is desirable. However, it will be appreciated that any amount of fatty acid will be beneficial to the subject.

Possible routes of administration of the pharmaceutical compositions of the present invention include for example, enteral and parenteral. For example, a liquid preparation may be administered orally. Additionally, a homogenous mixture can be completely dispersed in water, admixed under sterile conditions with physiologically acceptable diluents, preservatives, buffers or propellants to form a spray or inhalant.

The dosage of the composition to be administered to the subject may be determined by one of ordinary skill in the art and depends upon various factors such as weight, age, overall health, past history, immune status, etc., of the subject.

Additionally, the compositions of the present invention may be utilized for cosmetic purposes. The compositions may be added to pre-existing cosmetic compositions, such that a mixture is formed, or a fatty acid produced according to the invention may be used as the sole "active" ingredient in a cosmetic composition.

Polypeptides

The terms "polypeptide" and "protein" are generally used interchangeably herein.

A polypeptide or class of polypeptides may be defined by the extent of identity (% identity) of its amino acid sequence to a reference amino acid sequence, or by having a greater % identity to one reference amino acid sequence than to another. The % identity of a polypeptide to a reference amino acid sequence is typically determined by GAP analysis (Needleman and Wunsch, 1970; GCG program) with parameters of a gap creation penalty=5, and a gap extension penalty=0.3. The query sequence is at least 100 amino acids in length and the GAP analysis aligns the two sequences over a region of at least 100 amino acids. Even more preferably, the query sequence is at least 250 amino acids in length and the GAP analysis aligns the two sequences over a region of at least 250 amino acids. Even more preferably, the GAP analysis aligns two sequences over their entire length. The polypeptide or class of polypeptides may have the same enzymatic activity as, or a different activity than, or lack the activity of, the reference polypeptide. Preferably, the polypeptide has an enzymatic activity of at least 10% of the activity of the reference polypeptide.

As used herein a "biologically active fragment" is a portion of a polypeptide of the invention which maintains a defined activity of a full-length reference polypeptide for example, MGAT activity. Biologically active fragments as used herein exclude the full-length polypeptide. Biologically active fragments can be any size portion as long as they maintain the defined activity. Preferably, the biologically active fragment maintains at least 10% of the activity of the full length polypeptide.

With regard to a defined polypeptide or enzyme, it will be appreciated that % identity figures higher than those provided herein will encompass preferred embodiments. Thus, where applicable, in light of the minimum % identity figures, it is preferred that the polypeptide/enzyme comprises an amino acid sequence which is at least 60%, more preferably at least 65%, more preferably at least 70%, more preferably at least 75%, more preferably at least 80%, more preferably at least 85%, more preferably at least 90%, more preferably at least 91%, more preferably at least 92%, more preferably at least 93%, more preferably at least 94%, more preferably at least 95%, more preferably at least 96%, more preferably at least 97%, more preferably at least 98%, more preferably at least 99%, more preferably at least 99.1%, more preferably at least 99.2%, more preferably at least 99.3%, more preferably at least 99.4%, more preferably at least 99.5%, more preferably at least 99.6%, more preferably at least 99.7%, more preferably at least 99.8%, and even more preferably at least 99.9% identical to the relevant nominated SEQ ID NO.

Amino acid sequence mutants of the polypeptides defined herein can be prepared by introducing appropriate nucleotide changes into a nucleic acid defined herein, or by in vitro synthesis of the desired polypeptide. Such mutants include for example, deletions, insertions, or substitutions of residues within the amino acid sequence. A combination of deletions, insertions and substitutions can be made to arrive at the final construct, provided that the final polypeptide product possesses the desired characteristics.

Mutant (altered) polypeptides can be prepared using any technique known in the art, for example, using directed evolution or rathional design strategies (see below). Products derived from mutated/altered DNA can readily be screened using techniques described herein to determine if they possess transcription factor, fatty acid acyltransferase or OBC activities.

In designing amino acid sequence mutants, the location of the mutation site and the nature of the mutation will depend on characteristic(s) to be modified. The sites for mutation can be modified individually or in series for example, by (1) substituting first with conservative amino acid choices and then with more radical selections depending upon the results achieved, (2) deleting the target residue, or (3) inserting other residues adjacent to the located site.

Amino acid sequence deletions generally range from about 1 to 15 residues, more preferably about 1 to 10 residues and typically about 1 to 5 contiguous residues.

Substitution mutants have at least one amino acid residue in the polypeptide removed and a different residue inserted in its place. The sites of greatest interest for substitutional mutagenesis to inactivate enzymes include sites identified as the active site(s). Other sites of interest are those in which particular residues obtained from various strains or species are identical. These positions may be important for biological activity. These sites, especially those falling within a sequence of at least three other identically conserved sites, are preferably substituted in a relatively conservative manner. Such conservative substitutions are shown in Table 1 under the heading of "exemplary substitutions".

TABLE 1

Exemplary substitutions.

| Original Residue | Exemplary Substitutions |
|---|---|
| Ala (A) | val; leu; ile; gly |
| Arg (R) | lys |
| Asn (N) | gln; his |
| Asp (D) | glu |
| Cys (C) | ser |
| Gln (Q) | asn; his |
| Glu (E) | asp |
| Gly (G) | pro, ala |
| His (H) | asn; gln |
| Ile (I) | leu; val; ala |
| Leu (L) | ile; val; met; ala; phe |
| Lys (K) | arg |
| Met (M) | leu; phe |
| Phe (F) | leu; val; ala |
| Pro (P) | gly |
| Ser (S) | thr |
| Thr (T) | ser |
| Trp (W) | tyr |
| Tyr (Y) | trp; phe |
| Val (V) | ile; leu; met; phe, ala |

In a preferred embodiment a mutant/variant polypeptide has only, or not more than, one or two or three or four conservative amino acid changes when compared to a naturally occurring polypeptide. Details of conservative amino acid changes are provided in Table 1. As the skilled person would be aware, such minor changes can reasonably be predicted not to alter the activity of the polypeptide when expressed in a recombinant cell. Mutants with desired activity may be engineered using standard procedures in the art such as by performing random mutagenesis, targeted mutagenesis, or saturation mutagenesis on known genes of interest, or by subjecting different genes to DNA shuffling.

EXAMPLES

Example 1. General Materials and Methods

Expression of Genes in Plant Cells in a Transient Expression System

Genes were expressed in plant cells using a transient expression system essentially as described by Voinnet et al. (2003) and Wood et al. (2009). Binary vectors containing the coding region to be expressed by a strong constitutive e35S promoter containing a duplicated enhancer region were introduced into *Agrobacterium tumefaciens* strain AGL1. A chimeric binary vector, 35S:p19, for expression of the p19 viral silencing suppressor was separately introduced into AGL1, as described in WO2010/057246. A chimeric binary vector, 35S:V2, for expression of the V2 viral silencing suppressor was separately introduced into AGL1. The recombinant cells were grown to stationary phase at 28° C. in LB broth supplemented with 50 mg/L kanamycin and 50 mg/L rifampicin. The bacteria were then pelleted by centrifugation at 5000 g for 5 min at room temperature before being resuspended to OD600=1.0 in an infiltration buffer containing 10 mM MES pH 5.7, 10 mM $MgCl_2$ and 100 uM acetosyringone. The cells were then incubated at 28° C. with shaking for 3 hours after which the OD600 was measured and a volume of each culture, including the viral suppressor construct 35S:p19 or 35S:V2, required to reach a final concentration of OD600=0.125 added to a fresh tube. The final volume was made up with the above buffer. Leaves were then infiltrated with the culture mixture and the plants were typically grown for a further three to five days after infiltration before leaf discs were recovered for either purified cell lysate preparation or total lipid isolation.

*Brassica napus* Transformation

*Brassica napus* seeds were sterilized using chlorine gas as described by Kereszt et al. (2007) and germinated on tissue culture medium. Cotyledonary petioles with 2-4 mm stalk were isolated as described by Belide et al. (2013) and used as explants. *A. tumefaciens* AGL1 (Lazo et al., 1991) cultures containing the binary vector were prepared and cotyledonary petioles inoculated with the cultures as described by Belide et al. (2013). Infected cotyledonary petioles were cultured on MS medium supplemented with 1 mg/L TDZ+0.1 mg/L NAA+3 mg/L $AgNO_3$+250 mg/L cefotaxime, 50 mg/L timentin and 25 mg/L kanamycin and cultured for 4 weeks at 24° C. with 16 hr/8 hr light-dark photoperiod with a biweekly subculture on to the same medium. Explants with green callus were transferred to shoot initiation medium (MS+1 mg/L kinetin+3 mg/L $AgNO_3$+250 mg/L cefotaxime+50 mg/L timentin+25 mg/L kanamycin) and cultured for another 2-3 weeks. Small shoots (~1 cm) were isolated from the resistant callus and transferred to shoot elongation medium (MS medium with 0.1 mg/L gibberelic acid+3 mg/L $AgNO_3$+250 mg/L cefotaxime+25 mg/L kanamycin) and cultured for another two weeks. Healthy shoots with one or two leaves were selected and transferred to rooting media (½ MS with 1 mg/L NAA+20 mg/L ADS+3 mg/L $AgNO_3$+250 mg/L cefotaxime) and cultured for 2-3 weeks. DNA was isolated from small leaves of resistant shoots using the plant DNA isolation kit (Bioline, Alexandria, NSW, Australia) as described by the manufacturer's protocol. The presence of T-DNA sequences was tested by PCR amplification on genomic DNA. Positive, transgenic shoots with roots were transferred to pots containing seedling raising mix and grown in a glasshouse at 24° C. daytime/16° C. night-time (standard conditions).

Purified Leaf Lysate—Enzyme Assays

*Nicotiana benthamiana* leaf tissues previously infiltrated as described above were ground in a solution containing 0.1 M potassium phosphate buffer (pH 7.2) and 0.33 M sucrose using a glass homogenizer. Leaf homogenate was centrifuged at 20,000 g for 45 minutes at 4° C. after which each supernatant was collected. Protein content in each supernatant was measured according to Bradford (1976) using a Wallac1420 multi-label counter and a Bio-Rad Protein Assay dye reagent (Bio-Rad Laboratories, Hercules, CA USA). Acyltransferase assays used 100 μg protein according to Cao et al. (2007) with some modifications. The reaction medium contained 100 mM Tris-HCl (pH 7.0), 5 mM $MgCl_2$, 1 mg/mL BSA (fatty acid-free), 200 mM sucrose, 40 mM cold oleoyl-CoA, 16.4 uM sn-2 monooleoylglycerol [$^{14}$C] (55 mCi/mmol, American Radiochemicals, Saint Louis, MO USA) or 6.0 uM [$^{14}$C]glycerol-3-phosphate (G-3-P) disodium salt (150 mCi/mmol, American Radiochemicals). The assays were carried out for 7.5, 15, or 30 minutes.

Lipid Analysis

Analysis of Oil Content in Arabidposis Seeds

When seed oil content or total fatty acid composition was to be determined in small seeds such as *Arabidopsis* seeds, fatty acids in the seeds were directly methylated without crushing of seeds. Seeds were dried in a desiccator for 24 hours and approximately 4 mg of seed was transferred to a 2 ml glass vial containing a Teflon-lined screw cap. 0.05 mg triheptadecanoin (TAG with three C17:0 fatty acids) dissolved in 0.1 ml toluene was added to the vial as internal standard. Seed fatty acids were methylated by adding 0.7 ml of IN methanolic HCl (Supelco) to the vial containing seed material. Crushing of the seeds was not necessary for complete methylation with small seeds such as *Arabidopsis* seeds. The mixture was vortexed briefly and incubated at 80° C. for 2 hours. After cooling the mixtures to room temperature, 0.3 ml of 0.9% NaCl (w/v) and 0.1 ml hexane was added to the vial and mixed well for 10 minutes in a Heidolph Vibramax 110. The FAME were collected into a 0.3 ml glass insert and analysed by GC with a flame ionization detector (FID) as described below.

The peak area of individual FAME were first corrected on the basis of the peak area responses of a known amount of the same FAMEs present in a commercial standard GLC-411 (NU-CHEK PREP, INC., USA). GLC-411 contains equal amounts of 31 fatty acids (% by weight), ranging from C8:0 to C22:6. In case of fatty acids which were not present in the standard, the peak area responses of the most similar FAME was taken. For example, the peak area response of FAMEs of 16:1d9 was used for 16:1d7 and the FAME response of C22:6 was used for C22:5. The corrected areas were used to calculate the mass of each FAME in the sample by comparison to the internal standard mass. Oil is stored mainly in the form of TAG and its weight was calculated based on FAME weight. Total moles of glycerol was determined by calculating moles of each FAME and dividing total moles of FAMEs by three. TAG content was calculated as the sum of glycerol and fatty acyl moieties using a relation: % oil by weight=100×((41× total mol FAME/3)+(total g FAME−(15× total mol FAME)))/g seed, where 41 and 15 are molecular weights of glycerol moiety and methyl group, respectively.

Analysis of Fatty Acid Content in *Camelina* Seeds and Canola Seeds

To determine fatty acid composition in single seeds that were larger, such as canola and (*Camelina* seeds, direct methylation of fatty acids in the seed was performed as for *Arabidopsis* seeds except with breaking of the seed coats. This method extracted sufficient oil from the seed to allow fatty acid composition analysis. To determine the fatty acid composition of total extracted lipid from seeds, seeds were crushed and lipids extracted with $CHCl_3$/MeOH. Aliquots of the extracted lipid were methylated and analysed by GC. Pooled seed-total lipid content (seed oil content) of canola was determined by two extractions of lipid using $CHCl_3$/MeOH from a known weight of desiccated seeds after crushing, followed by methylation of aliquots of the lipids together with the 17:0 fatty acids as internal standard. In the case of *Camelina*, the lipid from a known amount of seeds was methylated together with known amount of 17:0 fatty acids as for the *Arabidopsis* oil analysis and FAME were analysed by GC. For TAG quantitation, TAG was fractionated from the extracted lipid using TLC and directly methylated in silica using 17:0 TAG as an internal standard. These methods are described more fully as follows.

After harvest at plant maturity, *Camelina* or canola seeds were desiccated by storing the seeds for 24 hours at room temperature in a desiccator containing silica gel as desiccant. Moisture content of the seeds was typically 6-8%. Total lipids were extracted from known weights of the desiccated seeds by crushing the seeds using a mixture of chloroform and methanol (2/1 v/v) in an eppendorf tube using a Reicht tissue lyser (22 frequency/seconds for 3 minutes) and a metal ball. One volume of 0.1M KCl was added and the mixture shaken for 10 minutes. The lower non-polar phase was collected after centrifuging the mixture for 5 minutes at 3000 rpm. The remaining upper (aqueous) phase was washed with 2 volumes of chloroform by mixing for 10 minutes. The second non-polar phase was also collected and pooled with the first. The solvent was evaporated from the lipids in the extract under nitrogen flow and the total dried lipid was dissolved in a known volume of chloroform.

To measure the amount of lipid in the extracted material, a known amount of 17:0-TAG was added as internal standard and the lipids from the known amount of seeds incubated in 1 N methanolic-HCl (Supelco) for 2 hours at 80° C. FAME thus made were extracted in hexane and analysed by GC. Individual FAME were quantified on the basis of the amount of 17:0 TAG-FAME. Individual FAME weights, after subtraction of weights of the esterified methyl groups from FAME, were converted into moles by dividing by molecular weights of individual FAME. Total moles of all FAME were divided by three to calculate moles of TAG and therefore glycerol. Then, moles of TAG were converted in to weight of TAG. Finally, the percentage oil content on a seed weight basis was calculated using seed weights, assuming that all of the extracted lipid was TAG or equivalent to TAG for the purpose of calculating oil content. This method was based on Li et al. (2006). Seeds other than (*Camelina* or canola seeds that are of a similar size can also be analysed by this method.

Canola and other seed oil content was also measured by nuclear magnetic resonance techniques (Rossell and Pritchard, 1991) by a pulsed wave NMS 100 Minispec (Bruker Pty Ltd Scientific Instruments, Germany) as described in Example 14. The NMR method simultaneously measured moisture content. Seed oil content can also be measured by near infrared reflectance (NIR) spectroscopy such as using a NIR Systems Model 5000 monochromator. Moisture content can also be measured on a sample from a batch of seeds by drying the seeds in the sample for 18 hours at about 100° C., according to Li et al. (2006).

Analysis of Lipids from Leaf Lysate Assays

Lipids from the lysate assays were extracted using chloroform:methanol:0.1 M KCl (2:1:1) and recovered. The different lipid classes in the samples were separated on Silica gel 60 thin layer chromatography (TLC) plates (MERCK, Dermstadt, Germany) impregnated with 10% boric acid. The solvent system used to fractionate TAG from the lipid extract was chloroform/acetone (90/10 v/v). Individual lipid classes were visualized by exposing the plates to iodine vapour and identified by running parallel authentic standards on the same TLC plate. The plates were exposed to phosphor imaging screens overnight and analysed by a Fujifilm FLA-5000 phosphorimager before liquid scintillation counting for DPM quantification.

Total Lipid Isolation and Fractionation of Lipids from Vegetative Tissues

Fatty acid composition of total lipid in leaf and other vegetative tissue samples was determined by direct methylation of the fatty acids in freeze-dried samples. For total lipid quantitation, fatty acids in a known weight of freeze-dried samples, with 17:0 FFA, were directly methylated. To determine total TAG levels in leaf samples, TAG was fractionated by TLC from extracted total lipids, and methylated in the presence of 17:0 TAG internal standard, because of the presence of substantial amounts of polar lipids in leaves. This was done as follows. Tissues including leaf samples were freeze-dried, weighed (dry weight) and total lipids extracted as described by Bligh and Dyer (1959) or by using chloroform:methanol:0.1 M KCl (CMK; 2:1:1) as a solvent. Total lipids were extracted from *N. benthamiana* leaf samples, after freeze dying, by adding 900 μL of a chloroform/methanol (2/1 v/v) mixture per 1 cm diameter leaf sample. 0.8 μg DAGE was added per 0.5 mg dry leaf weight as internal standard when TLC-FID analysis was to be performed. Samples were homogenized using an IKA ultra-turrax tissue lyser after which 500 μL 0.1 M KCl was added. Samples were vortexed, centrifuged for 5 min and the lower phase was collected. The remaining upper phase was extracted a second time by adding 600 μL chloroform, vortexing and centrifuging for 5 min. The lower phase was recovered and pooled into the previous collection. Lipids were dried under a nitrogen flow and resuspended in 2 μL chloroform per mg leaf dry weight. Total lipids of *N. tabacum* leaves or leaf samples were extracted as above with some modifications. If 4 or 6 leaf discs (each approx 1 $cm^2$ surface area) were combined, 1.6 ml of CMK solvent was used, whereas if 3 or less leaf discs were combined, 1.2 ml CMK was used. Freeze dried leaf tissues were homogenized in an eppendorf tube containing a metallic ball using a Reicht tissue lyser (Qiagen) for 3 minutes at 20 frequency/sec.

Separation of Neutral Lipids Via TLC and Transmethylation

Known volumes of total leaf extracts such as, for example, 30 μL were loaded on a TLC silica gel 60 plate (1×20 cm) (Merck KGaA, Germany). The neutral lipids were fractionated into the different types and separated from polar lipids via TLC in an equilibrated development tank containing a hexane/DEE/acetic acid (70/30/1 v/v/v/) solvent system. The TAG bands were visualised by primuline spraying, marked under UV, scraped from the TLC plate, transferred to 2 mL GC vials and dried with $N_2$. 750 μL of IN methanolic-HCl (Supelco analytical, USA) was added to each vial together with a known amount of C17:0 TAG as an internal standard, depending on the amount of TAG in each sample. Typically, 30 μg of the internal standard was added for low TAG samples whilst up to 200 μg of internal standard was used in the case of high TAG samples.

Lipid samples for fatty acid composition analysis by GC were transmethylated by incubating the mixtures at 80° C. for 2 hours in the presence of the methanolic-HCl. After cooling samples to room temperature, the reaction was stopped by adding 350 μl $H_2O$. Fatty acyl methyl esters (FAME) were extracted from the mixture by adding 350 μl hexane, vortexing and centrifugation at 1700 rpm for 5 min. The upper hexane phase was collected and transferred into GC vials with 300 μl conical inserts. After evaporation, the samples were resuspended in 30 μl hexane. One μl was injected into the GC.

The amount of individual and total fatty acids (TFA) present in the lipid fractions was quantified by GC by determining the area under each peak and calculated by comparison with the peak area for the known amount of internal standard. TAG content in leaf was calculated as the sum of glycerol and fatty acyl moieties in the TAG fraction using a relation: % TAG by weigh=100×((41×total mol FAME/3)+(total g FAME−(15×total mol FAME)))/g leaf dry weight, where 41 and 15 are molecular weights of glycerol moiety and methyl group, respectively.

Capillary Gas-Liquid Chromatography (GC)

FAME were analysed by GC using an Agilent Technologies 7890A GC (Palo Alto, California, USA) equipped with an SGE BPX70 (70% cyanopropyl polysilphenylene-siloxane) column (30 m×0.25 mm i.d., 0.25 μm film thickness), an FID, a split/splitless injector and an Agilent Technologies 7693 Series auto sampler and injector. Helium was used as the carrier gas. Samples were injected in split mode (50:1 ratio) at an oven temperature of 150° C. After injection, the oven temperature was held at 150° C. for 1 min, then raised to 210° C. at 3° $C.min^{-1}$ and finally to 240° C. at 50° $C.min^{-1}$. Peaks were quantified with Agilent Technologies ChemStation software (Rev B.04.03 (16), Palo Alto, California, USA) based on the response of the known amount of the external standard GLC-411 (Nucheck) and C17:0-Me internal standard.

Quantification of TAG via Iatroscan

One μL of lipid extract was loaded on one Chromarod-SII for TLC-FID Iatroscan™ (Mitsubishi Chemical Medience Corporation—Japan). The Chromarod rack was then transferred into an equilibrated developing tank containing 70 mL of a hexane/$CHCl_3$/2-propanol/formic acid (85/10.716/0.567/0.0567 v/v/v/v) solvent system. After 30 min of incubation, the Chromarod rack was dried for 3 min at 100° C. and immediately scanned on an Iatroscan MK-6s TLC-FID analyser (Mitsubishi Chemical Medience Corporation—Japan). Peak areas of DAGE internal standard and TAG were integrated using SIC-480II integration software (Version: 7.0-E SIC System instruments Co., LTD—Japan).

TAG quantification was carried out in two steps. First, DAGE was scanned in all samples to correct the extraction yields after which concentrated TAG samples were selected and diluted. Next, TAG was quantified in diluted samples with a second scan according to the external calibration using glyceryl trilinoleate as external standard (Sigma-Aldrich).

Quantification of TAG in Leaf Samples by GC

The peak area of individual FAME were first corrected on the basis of the peak area responses of known amounts of the same FAMEs present in a commercial standard GLC-411 (NU-CHEK PREP, Inc., USA). The corrected areas were used to calculate the mass of each FAME in the sample by comparison to the internal standard. Since oil is stored primarily in the form of TAG, the amount of oil was calculated based on the amount of FAME in each sample. Total moles of glycerol were determined by calculating the number of moles of FAMEs and dividing total moles of FAMEs by three. The amount of TAG was calculated as the sum of glycerol and fatty acyl moieties using the formula: % oil by weight=100×((41×total mol FAME/3)+(total g FAME-(15×total mol FAME)))/g leaf dry weight, where 41 and 15 were the molecular weights of glycerol moiety and methyl group, respectively.

Example 2. Increasing Lipid Content in *Nicotiana benthamiana* Vegetative Parts The genetic construct pJP3502 was used to produce stably transformed plants of *Nicotiana benthamiana* by the *Agrobacterium*-mediated transformation protocol as described for *Nicotiana tabacum* in WO2013/096993. Transgenic plants were selected for kanamycin resistance and grown to maturity in the glasshouse. Leaf samples were harvested at seed set and freeze-dried. Total fatty acid (TFA) content (% of dry mass) and composition following Bligh and Dyer (1959) extraction of total lipids from the samples, and the triacylglycerol (TAG) fraction content and composition, were determined. Data are shown in Table 2 and Table 3. The highest leaf oil sample was from transgenic plant #16 which had a TFA content of 33% by weight. This sample contained 22.5% TAG by weight (dry weight).

A strong correlation between alterations in the fatty acid composition and the TFA or TAG contents was observed. Oleic acid (C18:1n-9) increased with increasing TFA and TAG contents, so that it was the dominant fatty acid in leaves with high TAG content, for example comprising 66.8% of the TFA and 66.9% of the TAG fatty acids in the leaves with the highest TAG content. Similar correlations were observed for other fatty acids, for example ALA levels were reduced to 4.9% of TFA and 3.9% of TAG in the leaves with the highest TAG content. A strong correlation between C16:3 levels and both TFA and TAG contents was also observed with C16:3 decreasing substantially in high TFA and TAG samples.

Two of the high oil plants, #14 and #16, were also analysed during the leaf senescence phase when the leaves had begun yellowing (Table 4 and Table 5). Whilst there was little change in the total fatty acid content of the highest sample (32.9% vs 33%) the amount of TAG had increased to 32.6%. In these samples TAG comprised almost all of the leaf lipids.

TABLE 2

Total fatty acid (TFA) composition and amount (% dry weight) in leaves of *Nicotiana benthamiana* plants stably transformed with the T-DNA from construct pJP3502. The samples also contained 0.1-0.3% C14:0 and 0.0-0.7% C20:1

| | Sample | C16:0 | C16:1 | C16:3 | C18:0 | C18:1 | C18:1d11 | C18:2 | C18:3n3 | C20:0 | C22:0 | C24:0 | % TFA |
|---|---|---|---|---|---|---|---|---|---|---|---|---|---|
| Controls | 1 | 24.9 | 0.9 | 6.9 | 4.2 | 11.7 | 0.0 | 2.6 | 46.4 | 0.8 | 0.6 | 0.8 | 0.6 |
| | 2 | 23.9 | 0.9 | 12.0 | 4.8 | 13.4 | 0.0 | 2.8 | 39.1 | 0.9 | 0.6 | 1.3 | 0.6 |

TABLE 2-continued

Total fatty acid (TFA) composition and amount (% dry weight) in leaves of *Nicotiana benthamiana* plants stably transformed with the T-DNA from construct pJP3502. The samples also contained 0.1-0.3% C14:0 and 0.0-0.7% C20:1

| | Sample | C16:0 | C16:1 | C16:3 | C18:0 | C18:1 | C18:1d11 | C18:2 | C18:3n3 | C20:0 | C22:0 | C24:0 | % TFA |
|---|---|---|---|---|---|---|---|---|---|---|---|---|---|
| | 3 | 24.1 | 0.9 | 10.4 | 4.7 | 10.5 | 0.0 | 2.8 | 43.7 | 0.9 | 0.6 | 1.2 | 0.5 |
| | 4 | 24.0 | 0.9 | 10.0 | 4.7 | 13.7 | 0.0 | 2.9 | 40.8 | 0.9 | 0.6 | 1.2 | 0.7 |
| Transgenics | 7 | 18.6 | 0.2 | 2.3 | 4.2 | 35.8 | 0.3 | 4.7 | 28.0 | 2.3 | 1.5 | 1.3 | 2.4 |
| | 8 | 16.3 | 0.6 | 0.7 | 4.9 | 62.9 | 0.7 | 4.1 | 6.6 | 1.4 | 0.7 | 0.6 | 21.8 |
| | 11 | 25.9 | 1.2 | 2.8 | 3.2 | 47.3 | 0.8 | 3.1 | 13.3 | 1.3 | 0.7 | 0.1 | 14.7 |
| | 12 | 24.7 | 1.1 | 1.6 | 3.2 | 46.0 | 1.1 | 3.1 | 16.8 | 1.1 | 0.6 | 0.2 | 3.8 |
| | 13 | 20.3 | 0.6 | 21.1 | 4.7 | 15.0 | 0.0 | 2.9 | 33.4 | 1.2 | 0.0 | 0.6 | 1.2 |
| | 14 | 15.6 | 0.5 | 0.6 | 5.1 | 64.4 | 0.6 | 2.7 | 6.5 | 1.8 | 0.9 | 0.7 | 21.3 |
| | 15 | 17.7 | 0.4 | 0.2 | 5.6 | 60.7 | 0.4 | 2.7 | 7.5 | 2.2 | 1.2 | 0.9 | 21.0 |
| | 16 | 15.3 | 0.6 | 0.6 | 5.8 | 66.8 | 0.6 | 1.7 | 4.9 | 1.7 | 0.8 | 0.7 | 33.0 |
| | 17 | 25.5 | 0.0 | 7.4 | 4.2 | 8.6 | 0.0 | 3.7 | 48.8 | 0.7 | 0.0 | 0.9 | 1.4 |
| | 18 | 27.0 | 0.6 | 5.7 | 2.5 | 6.7 | 2.0 | 5.1 | 48.7 | 0.5 | 0.4 | 0.6 | 2.6 |
| | 19 | 21.1 | 0.8 | 2.1 | 5.2 | 35.9 | 1.0 | 10.0 | 20.8 | 1.5 | 0.9 | 0.2 | 4.3 |
| | 20 | 15.4 | 1.8 | 4.6 | 3.4 | 10.5 | 0.0 | 5.6 | 56.4 | 0.8 | 0.5 | 0.8 | 2.3 |
| | 21 | 16.3 | 0.7 | 6.6 | 3.6 | 10.2 | 0.0 | 10.1 | 49.7 | 1.4 | 0.8 | 0.7 | 1.6 |

TABLE 3

Fatty acid composition and amount (% dry weight) of the TAG in leaves of *Nicotiana benthamiana* plants stably transformed with the T-DNA from the construct pJP3502. The samples also contained 0.1-0.3% C14:0 and 0.0-0.7% C20:1

| | Sample | C16:0 | C16:1 | C16:3 | C18:0 | C18:1 | C18:1d11 | C18:2 | C18:3n3 | C20:0 | C22:0 | C24:0 | % TAG |
|---|---|---|---|---|---|---|---|---|---|---|---|---|---|
| Control | 1 | 57.7 | 0.0 | 0.0 | 6.6 | 7.4 | 0.0 | 0.0 | 28.3 | 0.0 | 0.0 | 0.0 | 0.1 |
| | 2 | 61.7 | 0.0 | 1.8 | 8.1 | 7.5 | 0.0 | 1.9 | 19.0 | 0.0 | 0.0 | 0.0 | 0.1 |
| | 3 | 69.9 | 0.0 | 0.0 | 8.7 | 6.0 | 0.0 | 0.0 | 15.5 | 0.0 | 0.0 | 0.0 | 0.1 |
| | 4 | 59.2 | 0.0 | 1.1 | 7.6 | 8.8 | 0.0 | 2.1 | 18.2 | 1.3 | 0.0 | 1.7 | 0.2 |
| Transgenics | 7 | 26.7 | 0.2 | 1.0 | 6.1 | 38.1 | 0.4 | 3.8 | 16.8 | 3.6 | 2.1 | 0.2 | 2.5 |
| | 8 | 17.3 | 0.7 | 0.2 | 5.3 | 64.4 | 0.8 | 2.9 | 5.1 | 1.5 | 0.7 | 0.6 | 15.4 |
| | 11 | 28.9 | 1.5 | 0.2 | 3.4 | 49.9 | 1.0 | 2.6 | 9.3 | 1.3 | 0.7 | 0.8 | 9.7 |
| | 12 | 27.0 | 1.4 | 0.3 | 3.4 | 51.4 | 1.4 | 2.6 | 9.6 | 1.2 | 0.6 | 0.7 | 5.2 |
| | 13 | 39.7 | 1.3 | 4.0 | 5.5 | 17.2 | 0.0 | 2.4 | 27.9 | 1.0 | 0.0 | 0.6 | 0.6 |
| | 14 | 16.2 | 0.6 | 0.2 | 5.3 | 65.1 | 0.6 | 2.8 | 5.2 | 1.8 | 0.9 | 0.7 | 19.6 |
| | 15 | 18.4 | 0.4 | 0.1 | 5.9 | 61.0 | 0.4 | 2.9 | 5.8 | 2.3 | 1.3 | 1.0 | 14.9 |
| | 16 | 15.9 | 0.7 | 0.2 | 5.9 | 66.9 | 0.7 | 2.1 | 3.9 | 1.7 | 0.8 | 0.7 | 22.5 |
| | 17 | 29.8 | 0.0 | 0.0 | 4.2 | 13.5 | 0.0 | 5.1 | 47.4 | 0.0 | 0.0 | 0.0 | 0.4 |
| | 18 | 40.2 | 5.9 | 0.0 | 3.2 | 10.8 | 2.0 | 5.6 | 32.4 | 0.0 | 0.0 | 0.0 | 0.6 |
| | 19 | 24.6 | 1.0 | 0.7 | 6.8 | 43.6 | 1.1 | 9.4 | 8.7 | 1.9 | 1.0 | 0.8 | 3.7 |
| | 20 | 23.1 | 0.0 | 1.1 | 6.0 | 18.6 | 0.0 | 7.6 | 41.5 | 2.1 | 0.0 | 0.0 | 0.6 |
| | 21 | 28.1 | 0.0 | 2.5 | 6.2 | 19.9 | 0.0 | 11.5 | 27.7 | 2.7 | 1.3 | 0.0 | 0.7 |

TABLE 4

Yellow leaf stage total fatty acid (TFA) composition and amount (% dry weight) in leaves from *Nicotiana benthamiana* plants stably transformed with the T-DNA from the construct pJP3502. The samples also contained 0.1-0.3% C14:0 and 0.0-0.7% C20:1

| | Sample | C16:0 | C16:1 | C16:3 | C18:0 | C18:1 | C18:1d11 | C18:2 | C18:3n3 | C20:0 | 22:0 | C24:0 | % TFA |
|---|---|---|---|---|---|---|---|---|---|---|---|---|---|
| Control | 1 | 24.9 | 0.9 | 6.9 | 4.2 | 11.7 | 0.0 | 2.6 | 46.4 | 0.8 | 0.6 | 0.8 | 0.6 |
| Transgenic | 14 | 17.2 | 0.5 | 0.7 | 6.0 | 64.7 | 0.6 | 0.1 | 6.8 | 2.1 | 0.0 | 0.6 | 29.0 |
| | 16 | 17.4 | 0.6 | 0.8 | 7.0 | 64.7 | 0.7 | 0.1 | 5.5 | 1.9 | 0.0 | 0.6 | 32.9 |

TABLE 5

Yellow leaf stage fatty acid composition and amount (% dry weight) of TAG in leaves of *Nicotiana benthamiana* plants stably transformed with the T-DNA from the construct pJP3502. The samples also contained 0.1-0.3% C14:0 and 0.0-0.7% C20:1

| | Sample | C16:0 | C16:1 | C16:3 | C18:0 | C18:1 | C18:1d11 | C18:2 | C18:3n3 | C20:0 | 22:0 | C24:0 | % TAG |
|---|---|---|---|---|---|---|---|---|---|---|---|---|---|
| Control | 1 | 38.1 | 0.0 | 0.0 | 7.0 | 10.6 | 0.0 | 2.9 | 40.3 | 1.1 | 0.0 | 0.0 | 0.1 |
| Transgenic | 14 | 16.9 | 0.5 | 0.2 | 5.5 | 62.8 | 0.6 | 3.0 | 6.5 | 1.9 | 0.9 | 0.6 | 27.7 |
| | 16 | 17.3 | 0.7 | 0.2 | 6.4 | 63.3 | 0.6 | 2.2 | 5.5 | 1.8 | 0.8 | 0.6 | 32.6 |

Example 3. Increasing Lipid Content in Vegetative *Nicotiana tabacum* Plant Parts The construct pJP3502 had previously been used to transform *Nicotiana tabacum* (WO2013/096993). Seed obtained from a homozygous T1 plant transformed with the T-DNA from pJP3502 and having high TFA and TAG content was harvested and sown out to establish a new generation of T2 progeny plants, uniformly homozygous for the transgenes. Pots were arranged in the glasshouse such that mature plant leaves either overlapped in a typical canopy formation ('canopy') as would occur when grown in the field, or were maximally exposed to direct sunlight ('non-canopy'). Leaf samples were taken from each plant when fully grown, at seed-setting stage, and freeze-dried. Fatty acid content was determined for the TAG fraction (Table 6) following Bligh and Dyer (1959) extraction of total lipids from the samples. TAG levels in mature leaf tissue from non-canopy plants were typically higher than for canopy plants, with the highest observed leaf TAG content of 20.6% of leaf dry weight.

TABLE 6

TAG content (% dry weight) in mature leaf tissue of T2 transgenic progeny plants (Line 49) transformed with T-DNA of pJP3502, compared to wild-type (wt).

| Plant | Growing condition | TAG content |
|---|---|---|
| wt 1 | Canopy | 0.0 |
| wt 2 | Canopy | 0.1 |
| wt 3 | Canopy | 0.1 |
| 49.1 | Canopy | 6.4 |
| 49.2 | Canopy | 3.6 |
| 49.3 | Canopy | 3.7 |
| 49.4 | Canopy | 1.9 |
| 49.5 | Canopy | 2.2 |
| wt 4 | Non-canopy | 0.0 |
| wt 5 | Non-canopy | 0.0 |
| 49.6 | Non-canopy | 5.1 |
| 49.7 | Non-canopy | 5.6 |
| 49.8 | Non-canopy | 14.7 |
| 49.9 | Non-canopy | 6.3 |
| 49.10 | Non-canopy | 6.7 |
| 49.11 | Non-canopy | 19.5 |
| 49.12 | Non-canopy | 16.4 |
| 49.13 | Non-canopy | 20.6 |
| 49.14 | Non-canopy | 15.7 |
| 49.15 | Non-canopy | 15.1 |
| 49.16 | Non-canopy | 6.3 |
| 49.17 | Non-canopy | 18.6 |

Example 4. Increasing Oil Content in Vegetative Parts of Monocotyledonous Plants Chimeric DNA constructs were designed to increase oil content in monocotyledonous plants, for example the C4 plant *S. bicolor* (sorghum), by expressing a combination of genes encoding WRI1, *Z. mays* LEC1 (Accession number AAK95562; SEQ ID NO:155), DGAT and Oleosin in the transgenic plants. Several pairs of constructs for biolistic co-transformation were designed and produced by restriction enzyme-ligation cloning, as follows.

The genetic construct pOIL136 was a binary vector containing three monocot expression cassettes, namely a selectable marker gene encoding phosphinothricin acetyltransferase (PAT) for plant selection, a second cassette for expressing DGAT and a third for expressing Oleosin. pJP136 was first produced by amplifying an actin gene promoter from *Oryza sativa* (McElroy et al., 1990) and inserting it as a blunt-ClaI fragment into pORE04 (Coutu et al., 2007) to produce pOIL094. pOIL095 was then produced by inserting a version of the *Sesamum indicum* Oleosin gene which had been codon optimised for monocot expression into pOIL094 at the KpnI site. pOIL093 was produced by cloning a monocot codon optimised version of the *Umbelopsis ramanniana* DGAT2a gene (Lardizabal et al., 2008) as a SmaI-KpnI fragment into a vector already containing a *Zea mays* Ubiquitin gene promoter. pOIL134 was then produced by cloning the NotI DGAT2a expression cassette from pOIL093 into pOIL095 at the NotI sites. pOIL141 was produced by inserting the selectable marker gene coding for PAT as a BamHI-SacI fragment into a vector containing the *Z. mays* Ubiquitin promoter. Finally, pOIL136 was produced by cloning the *Z. mays* Ubiquitin::PAT expression cassette as a blunt-AscI fragment into the ZraI-AscI of pOIL096. The genetic construct pOIL136 therefore contained the following expression cassettes: promoter *O. sativa* Actin::*S. indicum* Oleosin, promoter *Z. mays* Ubiquitin::*U. ramanniana* DGAT2a and promoter *Z. mays* Ubiquitin::PAT.

A similar vector pOIL197, containing NPTII instead of PAT was constructed by subcloning of the *Z. mays* Ubiquitin::NPTII cassette from pUKN as a HindIII-SmaI fragment into the AscI (blunted) and HindIII sites of pJP3343. The resulting vector, pOIL196, was then digested with HindIII (blunted) and AgeI. The resulting 3358 bp fragment was cloned into the ZraI-AgeI sites of pOIL134, yielding pOIL197.

A set of constructs containing genes encoding the *Z. mays* WRI1 (ZmWRI) or the LEC1 (ZmLEC1) transcription factors under the control of different promoters were designed and produced for biolistic co-transformation in combination with pOIL136 to test the effect of promoter strength and cell specificity on the function of WRI1 or LEC1, or both if combined, when expressed in vegetative tissues of a C4 plant such as sorghum. This separate set of constructs did not contain a selectable marker gene, except for pOIL333 which contained NPTII as selectable marker. The different promoters tested were as follows. The *Z. mays* Ubiquitin gene promoter (pZmUbi) was a strong constitutive monocot promoter while the enhanced CaMV 35S promoter (e35S) having a duplicated enhancer region was reported to result in lower transgene expression levels (reviewed in Girijashankar and Swathisree, 2009). Whilst the *Z. mays* phosphoenolpyruvate carboxylase (pZmPEPC) gene promoter was active in leaf mesophyl cells (Matsuoka and Minami, 1989), the site of photosynthesis in C4 plant species, the *Z. mays* Rubisco small subunit (pZmSSU) gene promoter was specific for the bundle sheath cell layer (Nomura et al., 2000; Lebrun et al., 1987), the cells where carbon fixation takes place in C4 plants.

The expression of the *Z. mays* gene encoding the SEE1 cysteine protease (Accession number AJ494982) was identified as similar to that of the *A. thaliana* SAG12 senescence-specific promoter during plant development. Therefore a 1970 bp promoter from the SEE1 gene (SEQ ID NO:216) was also selected to drive expression of the genes encoding the *Z. mays* WRI1 and LEC1 transcription factors. Further, the promoter from the gene encoding *Aeluropus littoralis* zinc finger protein AlSAP (Ben Saad et al., 2011; Accession number DQ885219; SEQ ID NO:217) and the promoter from the sucrose-responsive ArRolC gene from *A. rhizogenes* (Yokoyama et al., 1994; Accession number DQ160187; SEQ ID NO:218) were also selected for expression of ZmWRI1 expression in stem tissue. Therefore, each of these promoters was individually joined upstream of the ZmWRI1 or ZmLEC1 coding regions, as follows.

An intermediate vector, pOIL100, was first produced by cloning the *Z. mays* WRI1 coding sequence and a transcription terminator/polyadenylation region, flanked by AscI-NcoI sites, into the same sites in the binary vector pJP3343. The different versions of the constructs for WRI1 expression were based on this vector and were produced by cloning the various promoters into pOIL100. pOIL101 was produced by cloning a XhoI-SalI fragment containing the e35S promoter with duplicated enhancer region into the XhoI site of pOIL100. pOIL102 was produced by cloning a HindIII-AvrII fragment containing the *Z. mays* Ubiquitin gene promoter into the HindIII-XbaI sites of pOIL100. pOIL103 was produced by cloning a HindIII-NcoI fragment containing a *Z. mays* PEPC gene promoter into the HindIII-NcoI sites of pOIL100. pOIL104 was produced by cloning a HindIII-AvrII fragment containing a *Z. mays* SSU gene promoter into the HindIII-AvrII sites of pOIL100.

A synthetic fragment containing the *Z. mays* SEE1 promoter region flanked by HindIII-XhoI unique sites is synthesized. This fragment is cloned upstream of the *Z. mays* WRI1 protein coding region using the HindIII-XhoI sites in pOIL100. The resulting vector is designated pOIL329. A synthetic fragment containing the *A. littoralis* AlSAP promoter region flanked by XhoI-XbaI unique sites is synthesized. This fragment is cloned upstream of the *Z. mays* WRI1 coding region using the XbaI-XhoI sites in pOIL100. The resulting vector is designated pOIL330. A synthetic fragment containing the *A. rhizogenes* ArRolC promoter region flanked by PspOMI-XhoI unique sites is synthesized. This fragment is cloned upstream of the *Z. mays* WRI1 coding region using the PspOMI-XhoI sites in pOIL100. The resulting vector is designated pOIL335. Finally, a binary vector (pOIL333) containing the *Z. mays* SEE1::ZmLEC1 expression cassette is obtained in three steps. First, a 35S::GUS expression vector is constructed by amplifying the GUS coding region with flanking primers containing AvrII and KpnI sites. The resulting fragment is subsequently cloned into the SpeI-KpnI sites of pJP3343. The resulting vector is designated pTV111. Next, the 35S promoter region of pTV111 is replaced by the *Z. mays* SEE1 promoter. To this end, the *Z. mays* SEE1 sequence is amplified using flanking primers containing HindIII and XhoI unique sites. The resulting fragment is cut with the respective restriction enzymes and subcloned into the SalI-HindIII sites of pTV111. The resulting vector is designated pOIL332. Next the ZmLEC1 coding sequence is amplified using flanking primers containing NotI and EcoRV sites. This resulting fragment is subcloned into the respective sites of pOIL332, yielding pOIL333.

DNA is prepared for biolistic transformation by excising the vector backbones from pOIL101, pOIL102, pOIL103, pOIL104, pOIL197, pOIL329, pOIL330, pOIL333 and pOIL335 by restriction digestion followed by gel isolation. pOIL197 DNA is then mixed with either pOIL101, pOIL102, pOIL103, pOIL104, pOIL329, pOIL330, pOIL333 or pOIL335 DNA and transformed by biolistic-mediated transformation into *S. bicolor* explants. Alternatively, constructs for expression of the same combinations of genes are transformed separately or co-transformed by *Agrobacterium*-mediated transformation (Gurel et al., 2009; Wu et al., 2014).

Transgenic plants are regenerated and selected by antibiotic resistance. Where the two constructs co-transform in the same event, increased oil content is observed in the non-seed tissues of the transgenic plants.

The chimeric DNA constructs for *Agrobacterium*-mediated transformation are used to transform *Zea mays* (corn) as described by Gould et al., (1991). Briefly, shoot apex explants are co-cultivated with transgenic *Agrobacterium* for two days before being transferred onto a MS salt media containing kanamycin and carbenicillin. After several rounds of sub-culture, transformed shoots and roots spontaneously form and are transplanted to soil. The constructs are similarly used to transform *Hordeum vulgare* (barley) and *Avena sativa* (oats) using transformation methods known for these species. Briefly, for barley, the *Agrobacterium* cultures are used to transform cells in immature embryos of barley (cv. Golden Promise) according to published methods (Tingay et al., 1997; Bartlett et al., 2008) with some modifications in that embryos between 1.5 and 2.5 mm in length are isolated from immature caryopses and the embryonic axes removed. The resulting explants are co-cultivated for 2-3 days with the transgenic *Agrobacterium* and then cultured in the dark for 4-6 weeks on media containing timentin and hygromycin to generate embryogenic callus before being moved to transition media in low light conditions for two weeks. Calli are then transferred to regeneration media to allow for the regeneration of shoots and roots before transfer of the regenerated plantlets to soil. Transformed plants are obtained and grown to maturity in the glasshouse.

Example 5. Increasing Oil Content in Dicotyledonous Plants

Oil content in the dicotyledonous plant species *Trifolium repens* (clover), a legume commonly used as a pasture species, was increased by expressing the combination of WRI1, DGAT and Oleosin genes in vegetative parts. The construct pJP3502 was used to transform *T. repens* by *Agrobacterium*-mediated transformation (Larkin et al., 1996). Briefly, the genetic construct pJP3502 was introduced into *A. tumefaciens* via a standard electroporation procedure. The binary vector also contained a 35S:NptII selectable marker gene within the T-DNA. The transformed *Agrobacterium* cells were grown on solid LB media supplemented with kanamycin (50 mg/L) and rifampicin (25 mg/L) and incubated at 28° C. for two days. A single colony was used to initiate a fresh culture. Following 48 hours vigorous culture, the *Agrobacterium* cells was used to treat *T. repens* (cv. Haifa) cotyledons that had been dissected from imbibed seed as described by Larkin et al. (1996). Following co-cultivation for three days the explants were exposed to 25 mg/L kanamycin to select transformed shoots and then transferred to rooting medium to form roots, before transfer to soil.

Six transformed plants containing the T-DNA from pJP3502 were obtained and transferred to soil in the glasshouse. Increased oil content was observed in the non-seed tissue of some of the plants, with one plant showing greater than 4-fold increase in TAG levels in the leaves. Such plants are useful as animal feed, for example by growing the plants in pastures, providing feed with an increased energy content per unit weight (energy density) and resulting in increased growth rates in the animals.

The construct pJP3502 is also used to transform other leguminous plants such as alfalfa (*Medicago sativa*) and barrel medic (*Medicago truncatula*) by the method of Wright et al. (2006) to obtain transgenic plants which have increased TAG content in vegetative parts. Three putative transgenic *M. truncatula* plants were obtained. The transgenic plants are useful as pasture species or as hay or silage as a source of feed for animals such as, for example, cattle, sheep and horses, providing an increased energy density in the feed.

For increasing the oil content in legume seeds, a DNA fragment was synthesised containing a combination of two chimeric genes, namely (a) a first chimeric gene encoding *A. thaliana* WRI1 expressed from the *Phaseolus vulgaris* beta-type phaseolin storage protein promoter and 5' UTR plus (b) a second chimeric gene encoding *A. thaliana* DGAT1 expressed from a *Pisum sativum* vicilin promoter and 5' UTR. The DNA fragment was inserted into a binary vector pORE04 containing a chimeric gene encoding oleosin to generate a T-DNA construct comprising the three chimeric genes and a selectable marker gene (FIG. 2) which was used to transform *Lupinus angustifolius*, another leguminous plant, by the method as described by Pigeaire et al. (1997). Briefly, shoot apex explants of *L. angustifolius* are co-cultivated with transgenic *Agrobacterium* before being thoroughly wetted with kanamycin solution (20 mg/ml) and transferred onto a kanamycin-free regeneration medium. The multiple axillary shoots developing from the shoot apices are excised onto a medium containing 50 mg/L kanamycin and the surviving shoots transferred onto fresh medium containing 50 mg/L kanamycin. Healthy shoots are then transferred to soil. The genes on the T-DNA are expressed in cells of the transformed plants, increasing the oil content in the vegetative tissues and the seeds. A seed specific promoter driving the WRI1 gene is also used to increase the oil content in transgenic *Lupinus* seeds.

The construct was also used to transform *Glycine max* as described by Zhang et al. (1999) to obtain transgenic soybean plants which have increased TAG content in seeds. Transgenic plants were obtained as demonstrated by PCR on DNA obtained from samples of the plants. The plants were grown to maturity and seed was harvested from the. The oil content of the seed is expected to be increased as determined by non-destructive NMR.

A second genetic construct for increasing seed oil content in lupin and soybean was constructed by synthesising a DNA insert comprising three gene expression cassettes, namely a first having a *Glycine max* β-conglycinin promoter expressing *Umbelopsis ramanniana* DGAT2A, a second having a *Glycine max* KTi3 promoter expressing *A. thaliana* WRI1 and a third having the *Glycine max* β-conglycinin promoter expressing *Mus musculus* MGAT2. The SbfI-PstI fragment of this insert was cloned into the binary vector pORE04 at the PstI site to yield pJP3569. A version without the MGAT2 gene was made by cloning the smaller SbfI-SwaI fragment into pORE04 at the EcoRV-PstI sites to yield pJP3570. Versions containing only the WRI1 gene and only the DGAT2A gene were similarly produced. These binary vectors were used to transform *Glycine max* to generate transgenic seed. The oil content in the seed from the primary transformants is analysed by non-destructive NMR before being sown out to produce T2 seed.

A version of pJP3569 suitable for lupin transformation is made by PCR amplifying the WRI1 and DGAT2A expression cassettes in a single amplicon adapted with NotI restriction sites. The NotI fragment is cloned into pJP3416 at the PspOMI site to yield pJP3678, a binary vector containing the PAT selectable marker gene.

Example 6. Experiments to Increase Oil Content in Vegetative Parts of Canola

Two binary expression vectors were used to transform *B. napus* (cv. Oscar) in order to investigate the effect on TAG accumulation in seed and/or vegetative tissues. Firstly, the plasmid pJP3414 was constructed by inserting a codon optimised *A. thaliana* WRI1 protein coding sequence into binary vector 35S-pORE04 which contained an empty 35S expression cassette. The T-DNA of pJP3414 therefore containing a codon optimized version of the *A. thaliana* WRI1 transcription factor under the control of the constitutive 35S promoter. Leaf tissue from 11 independently transformed *B. napus* TO seedlings, transformed with pJP3414 as described in Example 1, each contained elevated TAG levels compared to the empty vector (pORE04) transformed plants. However, in no case did the level of TAG exceed 1%. Maximum levels were detected in line 31 which contained up to 0.58% TAG on a dry weight basis. The oil content in T1 transgenic seed was not significantly elevated compared to wild type (Oscar) and empty vector control seeds. T1 seeds of three lines exhibiting the highest TAG levels in leaf tissue were germinated on MS media containing 3% sucrose. No difference in germination was observed after 5 and 8 days when compared to the untransformed control (Oscar).

In an attempt to further increase TAG levels in *B. napus* vegetative tissues, the second vector, pJP3502 (Vanhercke et al., 2014), was used to transform *B. napus* (cv. Oscar). TAG levels were quantitated in transgenic leaves sampled before flowering. However, the TAG content was not further increased and the fatty acid composition did not differ from untransformed control plants at this stage of growth.

The observations for *B. napus* described in this Example, providing a TAG content of less than 1% in leaves, were in stark contrast to those reported in Examples 2 and 3 for *Nicotiana* species, providing about 20-30% TAG. The inventors considered these observations thoroughly, seeking an explanation for the difference between the species. Several differences were identified between the species. One difference that the inventors conceived as providing the essential difference was that *Brassica napus* is a so-called 16:3 species whereas *Nicotiana* species are so-called 18:3 species. This relates to the relative contribution of the so-called prokaryotic and eukaryotic pathways for plastid lipid synthesis (FIG. 1), and therefore, the inventors thought, the amount of DAG that is available for TAG synthesis. This led the inventors to conceive of the model that modification of the ratio of the synthesis of fatty acids via the eukaryotic pathway relative to the prokaryotic pathway, for example by decreasing the accumulation of 16:3 relative to 18:3, would alter the level of TAG that accumulates in plant cells or photosynthetic, microbial cells. They expected such modification that tipped the balance in favour of the eukaryotic pathway would be advantageous for TAG accumulation levels, especially in so-called 16:3 plants. In short, to convert a "16:3" cell into more like an "18:3" cell.

The inventors hypothesized that the presence of C18:1-ACP in the plastid which inhibits ACCase by feedback inhibition could be stronger in 16:3 plants due to the synthesis and retention of fatty acids in the plastid by the prokaryotic pathway. In contrast, they hypothesized that C18:3 plants are capable of accumulating higher TAG levels in vegetative tissues due to increased C18:1 export out of the plastids for provision into the eukaryotic pathway. As shown in Examples 2 to 4 herein, this was observed in species such as *N. tabacum* and *N. benthamiana* which have higher C18:3/C16:3 plastidial lipid ratios relative to species such as *B. napus* which has low levels of C18:3 in plastidial lipids. This model, the inventors hypothesized, would explain why stable transformation of the WRI+DGAT+Oleosin expression genes from vector pJP3502 into both *N. tabacum* and *N. benthamiana* resulted in high levels of TAG accumulation and extensive changes in fatty acid composition. In contrast, transformation of the same vector into *B. napus* resulted in only a minor increase in TAG accumulation and a small change in fatty acid composition. This model was examined as described below.

Example 7. Modification of Plastidial GPAT Expression

Over-Expression of Plastidial GPAT in Plant Cells

A number of experiments were performed to test the hypothesis that the presence of a highly active 16:3 prokaryotic pathway in a plant (i.e. a so-called 16:3 plant) would provide much lower TAG levels in vegetative tissues upon introduction of the gene combination on pJP3502, relative to 18:3 plants. These experiments are described in the following Examples. Initially, the inventors tested whether the high level TAG accumulation observed in transgenic *N. benthamiana* could be disrupted by over-expression of a plastidial GPAT, increasing the flux in the prokaryotic pathway.

A coding region for expression of the *Arabidopsis thaliana* plastidial GPAT, ATS1 (Nishida et al., 1993), was amplified by RT-PCR from *A. thaliana* total RNA and cloned as an EcoRI-PstI fragment into the binary expression vector pJP3343 under the control of the 35S promoter to produce the constitutive expression vector pOIL098. The effect of over-expressing a plastidial GPAT in a high oil leaf background is determined by infiltration of the chimeric vector pOIL098 into high oil leaf tissue. The high oil leaf tissue is generated either by co-infiltration of WRI1 and DGAT binary expression vectors (Example 1) or by infiltrating pOIL098 into leaves of a *Nicotiana* plant stably transformed with the T-DNA from pJP3502 or another high oil vector. Oil content is expected to be reduced in the infiltrated leaf spots co-expressing the ATS1-encoding gene. This is determined by analysing TFA and TAG as proportions of sample dry mass. This is also determined by observing incorporation of labelled acetate into fatty acids produced by microsomes or leaf lysates made from infiltrated leaf spots.

Oil Accumulation in a Plastidial GPAT Mutant of *Arabidopsis thaliana*

The ats1 mutant of *A. thaliana* has a disruptive mutation in the gene encoding plastidial GPAT which reduced plastidial GPAT activity to a level of only 3.8% of the wild-type (Kunst et al., 1988). Non-seed TAG accumulation levels, at least in leaves, stems and roots, in both parental and ats1 mutant *A. thaliana* is tested and compared. The T-DNA of the pJP3502 construct for over-expression of the combination of genes encoding WRI1, DGAT and Oleosin is introduced by transformation into plants of both genotypes. The gene combination in the T-DNA of pJP3502 increases fatty acid synthesis in both plant backgrounds. However, the accumulation of TAG in the ats1 mutant is expected to be significantly higher on average than in the transgenic plants derived from the wild-type (parental) genotype due to the reduction in plastidial GPAT activity and therefore the reduced flux of fatty acids into the plastidial prokaryotic pathway. The ratio of the fatty acids C16:3 to C18:3 is significantly reduced in leaves of the ats1 mutant, both transformed and untransformed.

Silencing the Gene Encoding Plastidial GPAT in Plant Cells

In addition to genetically modifying a plant by introducing a mutation in a gene encoding a plastidial GPAT, the flux of fatty acids through the prokaryotic 16:3 pathway can be reduced and thereby increase oil content in vegetative parts by silencing the plastidial GPAT. This is demonstrated by producing a transgenic cassette having a constitutive or leaf-specific promoter expressing an RNA hairpin corresponding to a region of the gene encoding the plastidial GPAT from the selected species. As an example, an RNAi hairpin expression cassette is produced using the 581 bp SalI-EcoRV fragment of the *A. thaliana* plastidial GPAT cDNA sequence (NM_179407, SEQ ID NO:177). A region of any gene encoding a plastidial GPAT which has a high degree of sequence identity to the nucleotide sequence of NM_179407 can also be used to construct a gene for expression of a hairpin RNA for silencing an endogenous plastidial GPAT gene. A hpRNAi construct containing a 732 bp fragment (SEQ ID NO:219) of the *N. benthamiana* plastidial GPAT flanked by SmaI and KasI unique sites was designed for stable transformation into *N. tabacum*. The synthesized *N. benthamiana* plastidial GPAT fragment was subcloned into the SmaI-KasI sites of pJP3303, resulting in pOIL113. It is expected that reducing plastidial fatty acid retention will result in an increase in TAG accumulation, particularly when combined with a "Push" component such as over-expression of a transcription factor such as WRI1, or by a "Pull" component such as a DGAT or PDAT, and/or reduced SDP1 or TGD activity.

Inactivation of the gene encoding a plastidial GPAT or indeed any gene can be achieved using CRISPR/Cas9 methods. For example, inactivation of the gene encoding *A. thaliana* plastidial GPAT (Accession No. NM_179407) can be carried out by CRISPR/Cas9/sgRNA-mediated gene disruption and subsequent mutagenesis by non homologous end joining (NHEJ) DNA repair. Before targeted DNA cleavage, Cas9 stimulates DNA strand separation and allows a sgRNA to hybridize with a specific 20 nt sequence in the targeted gene. This positions the target DNA into the active site of Cas9 in proper orientation in relation to a PAM (tandem guanosine nucleotides) binding site. This positioning allows separate nuclease domains of Cas9 to independently cleave each strand of the target DNA sequence at a point 3-nt upstream of the PAM site. The double-strand break then undergoes error-prone NHEJ DNA repair during which deletions or insertions of a few nucleotides occur and result in inactivation of the plastidial GPAT gene. SgRNA sequences targeting the *A. thaliana* GPAT gene are identified and selected through the use of the CRISPRP web tool (Xie et al., 2014). The 20 nt target sequence can be any 20 nt sequence within the target gene, including within non-coding regions of the gene such as a promoter or intron, provided that it is a specific sequence within the genome. The sequence can be inserted into a binary vector containing the CRISPR/Cas9/sgRNA expression cassette and kanamycin plant selectable marker (Jiang et al., 2013) and transformed into the plant cells by *Agrobacterium*-mediated transformation. Transgenic T1 plants can be screened for mutations in the plastidial GPAT gene by PCR amplification and DNA sequencing.

Example 8. Increasing Expression of Thioesterase in Plant Cells

De novo fatty acid synthesis takes place in the plastids of eukaryotic cells where the fatty acids are synthesized while bound to acyl carrier protein as acyl-ACP conjugates. Following chain elongation to C16:0 and C18:0 acyl groups and then desaturation to C18:1 while linked to ACP, the fatty acids are cleaved from the ACP by thioesterases and enter the eukaryotic pathway by export from the plastids and transport to the ER where they participate in membrane and storage lipid biogenesis. In chloroplasts, the export process has two steps: firstly, acyl chains are released as free fatty acids by the enzymatic activity of acyl-ACP thioesterases (fatty acyl thioesterase; FAT), secondly by reaction with CoA to form acyl-CoA esters which is catalysed by long chain acyl-CoA synthetases (LACS). *A. thaliana* contains 3 fatty acyl thioesterases which can be distinguished based on their acyl chain specificity. FATA1 and FATA2 preferentially hydrolyze unsaturated acyl-ACPs while saturated acyl-ACP chains are typically cleaved by FATB.

To explore the effect upon total fatty acid content, TAG content, and fatty acid composition of the co-expression of a thioesterase and genes encoding the WRI1 and/or DGAT polypeptides, chimeric genes were made for each of the three *A. thaliana* thioesterases by insertion of the coding regions into the pJP3343 binary expression vector for transient expression in *N. benthamiana* leaf cells from the 35S promoter. Protein coding regions for the *A. thaliana* FATAL (Accession No. NP_189147.1, SEQ ID NO:202) and FATA2 (Accession No. NP_193041.1, SEQ ID NO:203) thioesterases were amplified from silique cDNA using primers containing EcoRI and PstI sites and subsequently cloned into pJP3343 using the same restriction sites. The resulting expression vectors were designated pOIL079 and pOIL080, respectively. The protein coding region of the *A. thaliana* FATB gene (Accession No. NP_172327.1, SEQ ID NO:204) was amplified using primers containing NotI and SacI flanking sites and cloned into the corresponding restriction sites of pJP3343, resulting in pOIL081. Constructs pOIL079, pOIL080 and pOIL081 are infiltrated into *N. benthamiana* leaf tissue, either individually or in combination with constructs containing the genes for the *A. thaliana* WRI1 transcription factor (AtWRI1) (pJP3414) and/or DGAT1 acyltransferase (AtDGAT1) (pJP3352). For comparison, chimeric genes encoding the *Cocos nucifera* FatB1 (CnFATB1) (pJP3630), *C. nucifera* FatB2 (CnFATB2) (pJP3629) were introduced into *N. benthamiana* leaf tissue in parallel with the *Arabidopsis* thioesterases, to compare the effect of the FatB polypeptides having MCFA specificity to the *Arabidopsis* thioesterases which do not have MCFA specificity. All of the infiltrations included a chimeric gene for expression of the p19 silencing suppressor as described in Example 1. The negative control infiltrated only the p19 T-DNA.

A synergistic effect was observed between thioesterase expression and WRI1 and/or DGAT over-expression on TAG levels in *N. benthamiana* leaves. Expression of the thioesterase genes without the WRI1 or DGAT genes significantly increased TAG levels above the low level in the negative control (p19 alone). For example, expression of the coconut FATB2 thioesterase resulted in an 8.2-fold increase in TAG levels in the leaves compared to the negative control. Co-expression of the *A. thaliana* WRI1 transcription factor with each of the thioesterases further increased TAG levels compared to the AtWRI1 control. Co-expression of each of the coconut thioesterases CnFATB1 and CnFATB2 with WRI1 resulted in higher TAG levels than each of the three *A. thaliana* thioesterases with WRI1. Interestingly, the converse was observed when the *A. thaliana* DGAT1 acyltransferase was co-expressed in combination with a thioesterase and WRI1. This suggested a better match in acyl-chain specificity of the *A. thaliana* thioesterases and the *A. thaliana* DGAT1 acyltransferase, resulting in a greater flux of acyl-chains from the acyl-ACP into TAG. The non-MCFA thioesterases were also considerably more effective in elevating the percentage of oleic acid in the total fatty acid content in the leaves. Co-expression of the AtWRI1, AtDGAT1 and AtFATA2 resulted in the greatest level of TAG in the leaves, providing a level which was 1.6-fold greater than when AtWRI1 and AtDGAT1 were co-expressed without the thioesterase. These experiments confirmed the synergistic increase in oil synthesis and accumulation when both WRI1 and DGAT were co-expressed as well as showing the further synergistic increase obtained by adding a thioesterase to the combination.

Three different binary expression vectors were constructed to test the effect of co-expression of genes encoding WRI1, DGAT1 and FATA on TAG levels and fatty acid composition in stably transformed *N. tabacum* leaves. The vector pOIL121 contained an SSU::AtWRI1 gene for expression of AtWRI1 from the SSU promoter, a 35S::AtDGAT1 gene for expression of AtDGAT from the 35S promoter, and an enTCUP2::AtFATA2 gene for expression of AtFATA2 from the enTCUP2 promoter which is a constitutive promoter. These genetic constructs were derived from pOIL38 by first digesting the DNA with NotI to remove the gene coding for the *S. indicum* oleosin. The protein coding region of the *A. thaliana* FATA2 gene was amplified and flanked with NotI sites using pOIL80 DNA as template. This fragment was then inserted into the NotI site of pOIL38. pOIL121 then served as a parent vector for pOIL122 which contained an additional enTCUP2::SDP1 hairpin RNA cassette for RNAi-mediated silencing of the endogenous SDP1 gene in the transgenic plants. To do this, the entire *N. benthamiana* SDP1 hairpin cassette was isolated from pOIL51 (Example 11) as an SfoI-SmaI fragment and cloned into the SfoI site of pOIL121, producing pOIL122 (FIG. 3). A third vector, pOIL123, containing the SSU::WRI1 and 35S::DGAT1 genes and the enTCUP2::SDP1 hairpin RNA gene was obtained in a similar way by cloning the enTCUP2::SDP1 hairpin RNA cassette as a SfoI-SmaI fragment into the SfoI site of pOIL36.

In summary, the vectors contained the gene combinations:

pOIL121: SSU::AtWRI1, 35S::AtDGAT1, enTCUP2::AtFATA2.

POIL122: SSU::AtWRI1, 35S::AtDGAT1, enTCUP2::AtFATA2, enTCUP2::SDP1 hairpin.

pOIL123: SSU::AtWRI1, 35S::AtDGAT1, enTCUP2::SDP1 hairpin.

The three constructs were each used to produce transformed *N. tabacum* plants (cultivar Wi38) by *Agrobacterium*-mediated transformation. Co-expression of the *A. thaliana* FATA2 thioesterase or silencing of the endogenous SDP1 TAG lipase in combination with AtWRI1 and AtDGAT1 expression each resulted in further elevated TAG levels compared to expression of AtWRI1 and AtDGAT1 in the absence of both of the thioesterase gene and the SDP1-silencing gene. The greatest TAG yields were obtained using pOIL122 by the combined action of all four chimeric genes.

It is noted that *N. benthamiana* is an 18:3 plant. The same constructs pOIL079, pOIL080 and pOIL081 are used to transform *A. thaliana*, a 16:3 plant.

The inventors conceived of the model that increasing plastidial fatty acid export such as by increased fatty acyl thioesterase activity reduces acyl-ACP accumulation in the plastids, thereby increasing fatty acid biosynthesis as a result of reduced feedback inhibition on the acetyl-CoA carboxylase (ACCase) (Andre et al., 2012; Moreno-Perez et al., 2012). Thioesterase over-expression increases export of acyl chains from the plastids into the ER, thereby providing an efficient link between so-called 'Push' and 'Pull' metabolic engineering strategies.

Example 9. Medium-Chain Fatty Acid Production in Vegetative Plant Cells

Eccleston et al. (1996) studied the accumulation of C12:0 and C14:0 fatty acids in both seeds and leaves of transgenic *Brassica napus* plants transformed with a constitutively expressed gene encoding California Bay Laurel 12:0-ACP thioesterase (*Umbellularia californica*). That study reported that substantial levels of C12:0 accumulated in mature *B. napus* seeds but only very low levels of C12:0 were observed in leaf tissue, despite high levels of 12:0-ACP thioesterase expression and activity. The same results were obtained when the gene was transformed into *A. thaliana* (Voelker et al., 1992). That research was extended by the co-expression of the *Cocos nucifera* LPAAT and *Umbellularia californica* thioesterase which resulted in an increased accumulation of total C12:0 as well as an increased fraction of trilaurin in the seeds of *B. napus* (Knutzon et al., 1999). The prior art therefore indicated that medium chain fatty acids (MCFA) synthesis in vegetative plant cells was problematic.

To test the effect of introducing thioesterases having specificity for MCFA in combination with other genes described herein, chimeric DNAs for expressing several different thioesterases were synthesized and introduced into plant cells either singly or in combinations. The protein coding regions for thioesterases from organisms known to produce MCFAs (Jing et al., 2011) were synthesised and inserted as EcoRI fragments into the binary vector pJP3343 which contained a 35S-promoter expression cassette (Vanhercke et al., 2013). The thioesterases were: *Cinnamomum camphora* 14:0-ACP thioesterase (referred to as Cinca-TE) (Yuan et al., 1995; Accession No. Q39473.1; SEQ ID NO: 193), *Cocos nucifera* acyl-ACP thioesterase FatB1 (Cocnu-TE1; Accession No. AEM72519.1 SEQ ID NO: 194), *Cocos nucifera* acyl-ACP thioesterase FatB2 (Cocnu-TE2; Accession No. AEM72520.1; SEQ ID NO: 195), *Cocos nucifera* acyl-ACP thioesterase FatB3 (Cocnu-TE3; Accession No. AEM72521.1; SEQ ID NO: 196), *Cuphea lanceolata* acyl-(ACP) thioesterase type B (Cupla-TE) (Topfer et al., 1995; Accession No. CAB60830.1; SEQ ID NO: 197), *Cuphea viscosissima* FatB1 (Cupvi-TE; Accession No. AEM72522.1; SEQ ID NO: 198) and *Umbellularia californica* 12:0-ACP thioesterase (Umbca-TE) (Voelker et al., 1992; Accession No. Q41635.1; SEQ ID NO: 199). These thioesterases were all in the FATB class and had specificity for MCFA. The protein coding regions for ('. *nucifera* LPAAT (Cocnu-LPAAT, MCFA type) (Knutzon et al., 1995; Accession No. Q42670.1; SEQ ID NO: 200) and *A. thaliana* plastidial LPAAT1 (Arath-PLPAAT; Accession No. AEE85783.1; SEQ ID NO: 201), were also cloned. Cocnu-LPAAT had previously been shown to increase MCFA incorporation on the sn-2 position of TAG in seeds (Knutzon et al., 1995) whilst *A. thaliana* plastidial LPAAT (Arath-PLPAAT) (Kim et al., 2004) was used as a control LPAAT to determine the effect of any MCFA specificity that the Cocnu-LPAAT might have. The former LPAAT uses acyl-CoA as one substrate and operates in the ER in its native context, whereas the latter PLPAAT uses acyl-ACP as substrate and works in the plastid.

The thioesterase genes were introduced into *Nicotiana benthamiana* leaves by *Agrobacterium*-mediated infiltration as described in Example 1 along with the gene for co-expression of the p19 silencing suppressor and either the Cocnu-LPAAT or Arath-PLPAAT to determine whether MCFA could be produced in *N. benthamiana* leaf tissue. Infiltrated leaf zones were harvested and freeze-dried five days after infiltration with the *Agrobacterium* mixtures, after which the total fatty acid content and composition were determined by GC as described in Example 1 (Table 7). For the data shown in Table 7, errors are the standard deviation of triplicate infiltrations. The infiltrated zones of control leaves contained only trace (<0.1%) or zero levels of fatty acids C12:0 and C14:0 whereas C16:0 was present at 14.9%±0.6 of the TFA in the total leaf lipids. C12:0 levels were only increased significantly by expression of the Cocnu-TE3 (1.2%±0.1) and Umbca-TE (1.6%±0.1). Expression of each of the tested thioesterases resulted in the accumulation of C14:0 in the *N. benthamiana* leaves, with Cinca-TE giving the highest level of 11.3%±1.0. Similarly, expression of each of the thioesterases with the exception of Umbca-TE resulted in increased C16:0 levels. The highest level of C16:0 accumulation (35.4%±4.7) was observed with expression of Cocnu-TE1. Substantial necrosis of the infiltrated zones was observed in the leaves when the FATB genes were expressed alone, which appeared to correlate with the level of MCFA production. The inventors considered that the necrosis was probably due to levels of free fatty acids (FFA) greater than optimum, and also due to the extensive accumulation of MCFA in phospholipid lipid pools rather than in TAG.

TABLE 7

Total leaf fatty acid composition (% total leaf fatty acid) of selected fatty acids in *Nicotiana benthamiana* leaves infiltrated with various thioesterases (TE) and LPAATs. Results are grouped by the co-infiltrated gene (single genes (other than p19 present in all samples), Arath-LPAAT + various TE, Cocnu-LPAAT + various TE). 'Control' denotes uninfiltrated *N. benthamiana* leaf whereas 'p19 only' contains the silencing suppressor gene alone. 16:3 is 16:3$^{\Delta7, 10, 13}$; 18:3 is 18:3$^{\Delta9, 12, 15}$. Gene identities are defined in the text.

| | | 12:0 | 14:0 | 16:0 | 16:3 | 18:3 |
|---|---|---|---|---|---|---|
| | Control | 0.2 ± 0 | 0.1 ± 0 | 14.0 ± 0.2 | 8.1 ± 0.1 | 57.2 ± 0 |
| | p19 only | 0.2 ± 0 | 0.1 ± 0 | 14.9 ± 0.6 | 7.0 ± 0.8 | 53.1 ± 0.7 |
| Single-gene tests | Cinca-TE | 0.4 ± 0 | 11.3 ± 1.0 | 21.9 ± 0.7 | 5.0 ± 0.2 | 38.5 ± 1.0 |
| | Cocnu-TE1 | 0.2 ± 0 | 6.3 ± 0.6 | 35.4 ± 4.7 | 4.2 ± 1.4 | 29.9 ± 5.5 |
| | Cocnu-TE2 | 0.2 ± 0 | 7.1 ± 0.3 | 31.9 ± 2.2 | 4.7 ± 0.5 | 32.9 ± 2.8 |
| | Cocnu-TE3 | 1.2 ± 0.1 | 7.2 ± 1.3 | 19.6 ± 1.6 | 5.7 ± 0.5 | 44.8 ± 2.9 |
| | Cupla-TE | 0.2 ± 0 | 1.1 ± 0.2 | 21.8 ± 2.9 | 6.0 ± 0.6 | 48.2 ± 3.1 |
| | Cupvi-TE | 0.2 ± 0 | 0.6 ± 0.1 | 17.3 ± 1.3 | 6.4 ± 0.4 | 52.9 ± 2.1 |
| | Umbca-TE | 1.6 ± 0.1 | 1.1 ± 0.2 | 14.4 ± 0.8 | 6.5 ± 0.3 | 52.7 ± 0.1 |
| | Arath-LPAAT | 0.2 ± 0 | 0.4 ± 0.5 | 17.4 ± 1.0 | 6.2 ± 0.3 | 51.4 ± 1.3 |
| | Cocnu-LPAAT | 0.1 ± 0.1 | 0.1 ± 0 | 15.1 ± 1.5 | 6.7 ± 0.5 | 52.2 ± 4.2 |
| +Arath-LPAAT | Cinca-TE | 0.2 ± 0 | 7.8 ± 0.1 | 24.6 ± 0.4 | 5.3 ± 0.2 | 39.2 ± 1.5 |
| | Cocnu-TE1 | 0.2 ± 0 | 4.6 ± 1.3 | 35.3 ± 1.4 | 4.4 ± 0.7 | 32.7 ± 2.0 |

TABLE 7-continued

Total leaf fatty acid composition (% total leaf fatty acid) of selected fatty acids in *Nicotiana benthamiana* leaves infiltrated with various thioesterases (TE) and LPAATs. Results are grouped by the co-infiltrated gene (single genes (other than p19 present in all samples), Arath-LPAAT + various TE, Cocnu-LPAAT + various TE). 'Control' denotes uninfiltrated *N. benthamiana* leaf whereas 'p19 only' contains the silencing suppressor gene alone. 16:3 is 16:3$^{\Delta 7, 10, 13}$; 18:3 is 18:3$^{\Delta 9, 12, 15}$. Gene identities are defined in the text.

| | | 12:0 | 14:0 | 16:0 | 16:3 | 18:3 |
|---|---|---|---|---|---|---|
| | Cocnu-TE2 | 0.2 ± 0 | 6.1 ± 0.4 | 32.5 ± 1.8 | 4.7 ± 0.1 | 34.1 ± 0.6 |
| | Cocnu-TE3 | 0.9 ± 0.2 | 8.5 ± 0.4 | 21.4 ± 1.9 | 5.6 ± 0.2 | 41.7 ± 0.6 |
| | Cupla-TE | 0.2 ± 0 | 1.0 ± 0.1 | 23.4 ± 2.7 | 5.9 ± 0.5 | 47.3 ± 1.2 |
| | Cupvi-TE | 0.2 ± 0 | 0.6 ± 0 | 19.0 ± 0.2 | 6.3 ± 0.1 | 51.4 ± 1.0 |
| | Umbca-TE | 1.2 ± 0.2 | 1.1 ± 0.1 | 15.4 ± 0.2 | 6.5 ± 0.2 | 52.3 ± 1.3 |
| +Cocnu-LPAAT | Cinca-TE | 0.7 ± 0.2 | 14.9 ± 1.6 | 23.0 ± 3.7 | 4.8 ± 1.4 | 35.4 ± 3.3 |
| | Cocnu-TE1 | 0.2 ± 0 | 5.4 ± 0.9 | 40.2 ± 2.8 | 3.3 ± 0 | 27.8 ± 1.1 |
| | Cocnu-TE2 | 0.2 ± 0 | 6.6 ± 1.0 | 38.3 ± 1.1 | 3.7 ± 0.2 | 28.2 ± 1.1 |
| | Cocnu-TE3 | 2.0 ± 0.3 | 10.9 ± 1.0 | 24.4 ± 1.8 | 4.9 ± 0.5 | 37.7 ± 0.9 |
| | Cupla-TE | 0.5 ± 0.1 | 1.6 ± 0.3 | 22.2 ± 0.6 | 6.0 ± 0.3 | 46.9 ± 2.0 |
| | Cupvi-TE | 0.5 ± 0 | 1.1 ± 0 | 19.6 ± 0.8 | 6.0 ± 0.2 | 49.8 ± 0.3 |
| | Umbca-TE | 3.3 ± 0.5 | 1.2 ± 0.1 | 13.9 ± 0.4 | 6.4 ± 0.2 | 51.3 ± 1.7 |

Co-infiltration of the chimeric gene for expressing Arath-PLPAAT with the thioesterases tended to reduce the accumulation of both C12:0 and C14:0 compared to the absence of the LPAAT, whilst slightly increasing the accumulation of C16:0. In contrast, co-infiltration of the genes for expressing Cocnu-LPAAT or Umbca-TE increased the accumulation of C12:0 to 3.3%±0.5 whilst C14:0 was found to accumulate to 14.9%±1.6 in the Cinca-TE+Cocnu-LPAAT sample. The highest C16:0 levels were observed after co-expression of Cocnu-TE1 and Cocnu-LPAAT (40.2%±2.8). Addition of an LPAAT to each inoculated zone decreased the degree of necrosis of the leaf tissue. Surprisingly, both C8:0 and C10:0 fatty acids were also produced in the plant cells in the transient expression studies. The accumulation of C8:0 and C10:0 was not observed when the thioesterase was expressed alone. However, when thioesterase expression was combined with the co-expression of CuphoFatB with CnLPAAT and AtWRI1, C8:0 was found to be present at a concentration of 0.27±0.09% of the total fatty acid content in the plant cells. Similarly, when CuplaFatB was co-expressed with CnLPAAT and AtWRI1, C10:0 was found to be present at 0.54±0.16% of the total fatty acid content.

These results indicated that the previously-reported acyl specificities of the thioesterases, observed from seed expression, were essentially maintained in *N. benthamiana* leaves and that this expression system was a valid system for testing acyl specificity. The addition of the plastidial *A. thaliana* PLPAAT did not increase the accumulation of MCFAs although it did result in slightly increased accumulation of C16:0 in *A. thaliana* cells. In contrast, the *C. nucifera* LPAAT increased the accumulation of C12:0, C14:0 and C16:0 in *N. benthamiana* leaves, which fatty acids are found in *C. nucifera* oil (Laureles et al., 2002). This indicated that the native *N. benthamiana* LPAAT was either not highly expressed in leaf tissue or did not have high activity on C12:0, C14:0 and C16:0 substrates.

Medium-Chain Fatty Acid Production in Vegetative Plant Cells Accumulating High Levels of TAG The inventors previously obtained the production of 15% TAG in *N. tabacum* leaves by the coordinate expression of chimeric genes encoding *A. thaliana* WRI1, *A. thaliana* DGAT1 and *S. indicum* Oleosin (Vanhercke et al., 2014). To test whether the accumulation of MCFA that was observed after expression of thioesterases in combination with an LPAAT would also occur or be increased in plant cells producing high levels of TAG (Vanhercke et al., 2013), these genes were co-expressed. The best performing C12:0, C14:0 and C16:0 thioesterase/LPAAT combinations (Cocnu-LPAAT plus Umbca-TE, Cinca-TE and Cocnu-TE2 thioesterases, respectively) were infiltrated with and without the Arath-WRI1+DGAT combinations previously described (Vanhercke et al., 2013). The data are shown in FIG. 4.

The accumulation of the relevant MCFA (C12:0 for Umbca-TE, C14:0 for Cinca-TE and C16:0 for Cocnu-TE2) was consistently and substantially increased most by the addition of Arath-WRI1 to the combinations: C12:0 comprised 9.5%±0.9 of total leaf fatty acids in the Umbca-TE+Cocnu-LPAAT+Arath-WRI1 samples, the C14:0 level was 18.5%±2.6 in the Cinca-TE+Cocnu-LPAAT+Arath-WRI1 samples and the C16:0 level was 38.3%±3.0 in the Cocnu-TE2+Cocnu-LPAAT+Arath-WRI1 samples. Thioesterase plus Arath-WRI1 infiltrations were found to have a significantly greater effect on C12:0 in the presence of Umbca-TE, C14:0 in the presence of Cinca-TE and C16:0 in the presence of Cocnu-TE2 relative to infiltration with thioesterase plus Cocnu-LPAAT in the absence of WRI1 (FIG. 5). The addition of the Cocnu-LPAAT to the thioesterase plus Arath-WRI1 mixtures did have an effect on the fatty acid composition with relatively small increases in C12:0 and C14:0 observed in the Umbca-TE and Cinca-TE sets and a small decrease in C16:0 in the Cocnu-TE2 set. The maximum levels observed were: 8.8%±1.1 of C12:0 in total leaf fatty acids observed in the Umbca-TE+Arath-WRI1+Cocnu-LPAAT samples, 14.1%±3.5 of C14:0 in the Cinca-TE+Arath-WRI1+Cocnu-LPAAT samples and 48.6%±3.7 of C16:0 in the Cocnu-TE2+Arath-WRI1 sample.

Interestingly, the only thioesterase in which the Arath-WRI1 did not increase MCFA accumulation as much was the Cocnu-TE2, although it still increased significantly. The addition of this gene alone resulted in the increased accumulation of C16:0 from 16.0%±0.4 to 37.3%±0.6 whereas the further addition of Arath-WRI1 only increased this to 48.6%±1.7. This may have been due to the C12:0 and C14:0 intermediates being relatively transient during plastidial fatty acid synthesis compared to C16:0.

Other effects that were noted included the increase in C16:0 and C18:1$^{\Delta 9}$ and decrease in C18:3:$^{\Delta 9,12,15}$ levels in the presence of Arath-WRI1. The further addition of the Cinca-TE and Cocnu-TE2 decreased C18:3$^{\Delta 9,12,15}$ levels further still. In contrast, the extra C12:0 produced following the addition of Arath-WRI1 to Umbca-TE appeared to come at the cost of C16:0 rather than additional C18:3$^{\Delta9,12,15}$ (FIG. 5).

A subset of samples were also analysed by LC-MS to gain a better understanding of MCFA accumulation. The plastidial galactolipids monogalactosyl diacylglycerol (MGDG) and digalactosyl diacylglycerol (DGDG) contained only low levels of C12:0 and C14:0 and reduced levels of C16:0 relative to the p19 control infiltration. The major C12:0-containing MGDG species in the Umbca-TE samples was 30:3 indicating that one C18:3 and one C12:0 were co-located on the monogalactosyl backbone. The other main C12:0-containing MGDG species was 28:0, indicating that the second fatty acid was C16:0. The major C14:0-containing MGDG species in the Cinca-TE samples were 28:0 and 30:0, indicating that a significant proportion of the C14:0 in MGDG was either di-C14:0 or with C16:0. The C12:0-containing and C14:0-containing MGDG species were not detected in the p19 control sample. In contrast, C16:0-containing MGDG species tended to be reduced in the Cocnu-TE2 samples. The major MGDG species in the wildtype samples (C16:3-containing 34:6, C18:3-containing 34:6, and C18:3-containing 36:6) all tended to be reduced by the expression of the transgenes. This reduction was greatest in the presence of the WRI+DGAT combination.

Only trace levels of C12:0-containing DGDG species were observed in the Umbca-TE samples. The major C14:0-containing species observed in the Cinca-TE samples were 28:0 and 30:0, both of which were absent in the control. These species were also observed at elevated levels in the Cocnu-TE2 samples but only at trace levels in the Umbca-TE samples. The major DGDG species in the wildtype samples (C16:0-containing 34:3, C18:3-containing 34:3, and C18:3-containing 36:6) all tended to be reduced by the expression of the transgenes. This reduction was greatest in the presence of WRI.

Similarly, TAG species were generally increased considerably in all the samples containing WRI+DGAT as previously described (Vanhercke et al., 2013). C12:0 species were found to be dominant in the high TAG Umbca-TE sample, C14:0 in the high TAG Cinca-TE sample and C16:0 in the high TAG Cocnu-TE2 sample. LC-MS analysis of the TAG fraction showed that the C12:0-containing 36:0 was found to be the dominant TAG species, twice the level of TAG species containing C18:3, in all Umbca-TE samples containing the WRI transcription factor. Similarly, C14:0-containing 42:0 was the dominant TAG species in the Cinca-TE samples co-transformed with either LPAAT, DGAT, WRI or WRI+DGAT, although the response was considerably higher in the case of the samples containing WRI. Several C16:0-containing TAG species were significantly elevated in both the high TAG Cinca-TE (e.g. 44:0 and 50:3) and Cocnu-TE2 (e.g. 46:0, 48:0, 50:2 and 50:3) samples. Again, the greatest C16:0 increases were observed in the presence of WRI.

Stable Transformation for Production of MCFA in Vegetative Tissues.

A series of genetic constructs were made in a binary vector in order to stably transform plants such as tobacco with combinations of genes for production of MCFA in vegetative tissues, to identify optimal combinations of genes. These constructs included a gene for expression of WRI1 under the control of either the SSU promoter (see Example 8, pOIL121) or the senescence-specific SAG12 promoter, a gene encoding an oil palm DGAT (below), a gene encoding the coconut LPAAT (CocnuLPAAT, see above) under the control of an enTCUP promoter and several genes expressing a variety of fatty acyl thioesterases (FATB) expressed from either a 35S promoter or a SAG12 promoter. These are described below.

Cloning of a Gene Encoding *Elaeis guineensis* (Oil Palm) DGAT

In order to firstly test different DGAT enzymes, including representative DGAT1, DGAT2 and DGAT3 enzymes, candidate oil palm DGAT sequences were identified from the published transcriptome (Dussert et al., 2013) and codon optimised for expression in *Nicotiana tabacum*. The protein coding regions were then each cloned individually into binary expression vectors under the control of the 35S promoter for testing in transient *N. benthamiana* leaf assays as described in Example 1. The gene combinations tested were as follows:

1 P19 (negative control)
2 P19+CnLPAAT+WRI1
3 P19+CnLPAAT+AtWRI1+AtDGAT1
4 P19+CnLPAAT+AtWRI1+EgDGAT1
5 P19+CnLPAAT+AtWRI1+EgDGAT2
6 P19+CnLPAAT+AtWRI1+EgDGAT3
7 P19+CincaFatB
8 P19+CincaFatB+CnLPAAT+WRI1
9 P19+CincaFatB+CnLPAAT+AtWRI1+AtDGAT1
10 P19+CincaFatB+CnLPAAT+AtWRI1+EgDGAT1
11 P19+CincaFatB+CnLPAAT+AtWRI1+EgDGAT2
12 P19+CincaFatB+CnLPAAT+AtWRI1+EgDGAT3

The results for the TFA and TAG levels, and the levels of total MCFA in the TFA or the TAG contents, are shown in FIG. 6. Compared to AtDGAT1, the expression of EgDGAT1 led to greater accumulation of total fatty acids and increased TAG levels. The total MCFA content in the total fatty acid content was reduced with the expression of EgDGAT1 relative to AtDGAT1, but the levels of MCFA present in TAG remained about the same (FIG. 6).

Preparation of Genetic Constructs

Genetic constructs for stable transformation (Table 8) were assembled through the sequential insertion of gene cassettes through the use of compatible restriction enzyme sites. The four gene constructs (Table 8) each contained a gene encoding the oil palm DGAT1 (EgDGAT1) expressed from the 35S promoter, a gene encoding the *C. nucifera* LPAAT (CnLPAAT) expressed from the constitutive enTCUP2 promoter, and a gene encoding AtWRI1 expressed from either the SSU promoter or the SAG12 promoter in addition to one of a series of genes encoding FATB enzymes.

The five gene constructs also contained a gene for expression of a hairpin RNA for reducing expression of an endogenous gene encoding acyl-activating enzyme (AAE). The hairpin was constructed based on sequence similarity with the identified AAE15 from *Arabidopsis lyrata* (EFH44575.1) and the *N. benthamiana* genome. AAE has been shown to be involved in the reactivation of MCFA, and hence further elongation. It was considered that silencing of AAE might increase MCFA accumulation. The hairpin cassette was constructed in the vector pKANNIBAL and then subcloned into the expression vector pWBVec2 (Wang et al., 2004), with the expression of the hairpin being driven by the 35S promoter.

TABLE 8

Summary of assembled genetic constructs.

| | Construct | Gene Combination |
|---|---|---|
| Single Gene Constructs | pKR1 | 35S::UmbcaFATB |
| | pKR2 | 35S::CincaFATB |
| | pKR3 | 35S::CocnuFATB2 |

TABLE 8-continued

Summary of assembled genetic constructs.

| | Construct | Gene Combination |
|---|---|---|
| | pOIL115 | SAG12::CincaFATB |
| | pOIL116 | SAG12::UmbcaFATB |
| | pOIL117 | SAG12::CocnuFATB2 |
| Construction Components | pOIL300 | 35S::EgDGAT1 |
| | pOIL301 | enTCUP::CnLPAAT inFATBrmediaFATB construct |
| | pOIL302 | 35S::EgDGAT1 + enTCUP::CnLPAAT |
| | pOIL303 | 35S::EgDGAT1 + enTCUP::CnLPAAT + SSU:AtWRI1 |
| | pOIL304 | 35S::EgDGAT1 + enTCUP::CnLPAAT + SAG12:AtWRI1 |
| Four Gene Constructs | pOIL305 | 35S::EgDGAT1 + enTCUP::CnLPAAT + SSU:AtWRI1 + 35S::UmbcaFATB |
| | pOIL306 | 35S::EgDGAT1 + enTCUP::CnLPAAT + SSU:AtWRI1 + 35S::CincaFATB |
| | pOIL307 | 35S::EgDGAT1 + enTCUP::CnLPAAT + SSU:AtWRI1 + 35S::CocnuFATB2 |
| | pOIL308 | 35S::EgDGAT1 + enTCUP::CnLPAAT + SSU:AtWRI1 + SAG12::UmbcaFATB |
| | pOIL309 | 35S::EgDGAT1 + enTCUP::CnLPAAT + SSU:AtWRI1 + SAG12::CincaFATB |
| | pOIL310 | 35S::EgDGAT1 + enTCUP::CnLPAAT + SSU:AtWRI1 + SAG12::CocnuFATB2 |
| | pOIL311 | 35S::EgDGAT1 + enTCUP::CnLPAAT + SAG12:AtWRI1 + 35S::UmbcaFATB |
| | pOIL312 | 35S::EgDGAT1 + enTCUP::CnLPAAT + SAG12:AtWRI1 + 35S::CincaFATB |
| | pOIL313 | 35S::EgDGAT1 + enTCUP::CnLPAAT + SAG12:AtWRI1 + 35S::CocnuFATB2 |
| | pOIL314 | 35S::EgDGAT1 + enTCUP::CnLPAAT + SAG12:AtWRI1 + SAG12::UmbcaFATB |
| | pOIL315 | 35S::EgDGAT1 + enTCUP::CnLPAAT + SAG12:AtWRI1 + SAG12::CincaFATB |
| | pOIL316 | 35S::EgDGAT1 + enTCUP::CnLPAAT + SAG12:AtWRI1 + SAG12::CocnuFATB2 |
| Five Gene Constructs | pOIL317 | 35S::EgDGAT1 + enTCUP::CnLPAAT + SSU:AtWRI1 + 35S::UmbcaFATB + 35S::hpNbAAE |
| | pOIL318 | 35S::EgDGAT1 + enTCUP::CnLPAAT + SSU:AtWRI1 + 35S::CincaFATB + 35S::hpNbAAE |
| | pOIL319 | 35S::EgDGAT1 + enTCUP::CnLPAAT + SSU:AtWRI1 + 35S::CocnuFATB2 + 35S::hpNbAAE |
| | pOIL320 | 35S::EgDGAT1 + enTCUP::CnLPAAT + SSU:AtWRI1 + SAG12::UmbcaFATB + 35S::hpNbAAE |
| | pOIL321 | 35S::EgDGAT1 + enTCUP::CnLPAAT + SSU:AtWRI1 + SAG12::CincaFATB + 35S::hpNbAAE |
| | pOIL322 | 35S::EgDGAT1 + enTCUP::CnLPAAT + SSU:AtWRI1 + SAG12::CocnuFATB2 + 35S::hpNbAAE |
| | pOIL323 | 35S::EgDGAT1 + enTCUP::CnLPAAT + SAG12:AtWRI1 + 35S::UmbcaFATB + 35S::hpNbAAE |
| | pOIL324 | 35S::EgDGAT1 + enTCUP::CnLPAAT + SAG12:AtWRI1 + 35S::CincaFATB + 35S::hpNbAAE |
| | pOIL325 | 35S::EgDGAT1 + enTCUP::CnLPAAT + SAG12:AtWRI1 + 35S::CocnuFATB2 + 35S::hpNbAAE |
| | pOIL326 | 35S::EgDGAT1 + enTCUP::CnLPAAT + SAG12:AtWRI1 + SAG12::UmbcaFATB + 35S::hpNbAAE |
| | pOIL327 | 35S::EgDGAT1 + enTCUP::CnLPAAT + SAG12:AtWRI1 + SAG12::CincaFATB + 35S::hpNbAAE |
| | pOIL328 | 35S::EgDGAT1 + enTCUP::CnLPAAT + SAG12:AtWRI1 + SAG12::CocnuFATB2 + 35S::hpNbAAE |

These genetic constructs were used to produce transformed tobacco plants of cultivars Wisconsin 38 and a high oil line transformed with the T-DNA from pJP3502. It was observed that plants transformed with the single gene FATB constructs expressed from the 35S promoter were significantly smaller than those transformed with the corresponding FATB construct expressed from the SAG12 promoter or from the four gene constructs. The smaller plant size was considered to be caused by a buildup of MCFA which was not incorporated efficiently into TAG.

Discussion

The present study found that C12:0 production in leaf cells was only about 1.6% of the total fatty acid content after expression of Umbca-TE alone (Table 7). The addition of a gene for expression of Arath-WRI had a much stronger effect on C12:0 and C14:0 accumulation in leaf tissue than the addition of the coconut LPAAT (FIGS. 4 and 5). This indicated that WRI1 in combination with the thioesterase greatly increased MCFA accumulation in leaf cells, acting synergistically. Importantly, much of the C12:0, C14:0 and C16:0 was found to accumulate in the leaves in TAG, which lipid does not accumulate at substantial levels in wild-type leaves. These experiments showed that the cells in the vegetative parts of plants could be modified to produce MCFA, particularly C12:0 and C14:0 in TAG at high levels. C16:0 levels were also increased substantially.

Example 10. The Effect of Different Transcription Factor Polypeptides on TAG Accumulation Previously reported experiments with WRI1 and DGAT (Vanhercke et al., 2013) used a synthetic gene encoding *A. thaliana* AtWRI1 (Accession No. AAP80382.1) and a synthetic gene encoding AtDGAT1, also from *A. thaliana* (Accession No. AAF19262; SEQ ID NO: 1). To compare other WRI polypeptides with AtWRI1 for their ability to combine with DGAT to increase oil content, other WRI coding sequences were identified and used to generate constructs for expression in *N. benthamiana* leaves. Nucleotide sequences encoding the *A. thaliana* WRI3 (Accession No. AAM91814.1, SEQ ID NO:205) and WRI4 (Accession No. NP_178088.2, SEQ ID NO:206) transcription factors (To et al., 2012) were synthesized and inserted as EcoRI fragments into pJP3343 under the control of the 35S promoter. The resulting binary expression vectors were designated pOIL027 and pOIL028, respectively. The coding sequence for the oat (*Avena sativa*) WRI1 (AsWRI1, SEQ ID NO:207) was PCR amplified from a vector provided by Prof. Sten Stymne (Swedish University of Agricultural Sciences) using flanking primers containing additional EcoRI sites. The amplified fragment was inserted into pJP3343 resulting in pOIL055. A WRI1 candidate sequence from *S. bicolor* (Accession No. XP_002450194.1, SEQ ID NO:208) was identified by a BLASTp search on the NCBI server using the *Zea mays* WRI1 amino acid sequence (Accession No. NP_001137064.1, SEQ ID NO:209) as query. The protein coding region of the *S. bicolor* WRI1 gene (SbWRI1) was synthesized and inserted as an EcoRI fragment into pJP3343, yielding pOIL056. A gene candidate encoding a WRI1 was identified from the Chinese tallow (*Triadica sebifera*; TsWRI1, SEQ ID NO:210) transcriptome (Uday et al., submitted). The protein coding region was synthesized and inserted as an EcoRI fragment into pJP3343 resulting in pOIL070. The pJP3414 and pJP3352 binary vectors containing the coding sequences for expression of the *A. thaliana* WRI1 and DGAT1 polypeptides were as described by Vanhercke et al. (2013).

Plasmids containing the various WRI coding sequences were introduced into *N. benthamiana* leaf tissue for transient expression using a gene encoding the p19 viral suppressor protein in all inoculations as described in Example 1. The genes encoding the WRI polypeptides were either tested alone or in combination with the DGAT1 acyltransferase gene, the latter to provide greater TAG biosynthesis and accumulation. The positive control in this experiment was the combination of the genes encoding *A. thaliana* WRI1 transcription factor and AtDGAT1. All infiltrations were done in triplicate using three different plants and TAG levels were analyzed as described in Example 1. Expression of most of the individual WRI polypeptides in the absence of exogenously added DGAT1 resulted in increased, yet still low, TAG levels (<0.23% on dry weight basis) in infiltrated leaf spots, compared to the control which had only the p19 construct (FIG. 7). The exception was TsWRI1 which, by itself, did not appear to increase TAG levels significantly. In addition, differences in TAG levels produced by expression of the different WRI transcription factors on their own were not great. Both AsWRI1 and SbWRI1 yielded TAG levels similar to AtWRI1 on its own. Analysis of the TAG fatty acid composition revealed only minor changes except for increased C18:1Δ9 levels from expression of AtWRI3 in the infiltrated leaf tissues (Table 9).

co-expressed with DGAT to increase TAG levels in vegetative plant parts. The inventors also concluded that a transcription factor, for example a WRI1, from a monocotyledonous plant could function well in a dicotyledonous plant cell, indeed might even have superior activity compared to a corresponding transcription factor from a dicotyledonous plant. Likewise, a transcription factor from a dicotyledonous plant could function well in a monocotyledonous plant cell.

Use of Other Transcription Factors

Genetic constructs were prepared for expression of each of 14 different transcription factors in plant cells to test their ability to function for increasing TAG levels in combination with other genes involved in TAG biosynthesis and accumulation. These transcription factors were candidates as alternatives for WRI1 or for addition to combinations including one or more of WRI1, LEC1 and LEC2 transcription factors for use in plant cells, particularly in vegetative plant parts. Their selection was largely based on their reported involvement in embryogenesis (reviewed in Baud and Lepiniec (2010), and Ikeda et al. (2006)), similar to LEC2. Experiments were therefore carried out to assay their function, using the *N. benthamiana* expression system (Example 1), as follows.

TABLE 9

TAG fatty acid composition in *N. benthamiana* leaf samples infiltrated with different chimeric genes for expression of WRI (n = 3). All samples were also infiltrated with the P19 construct. The TAG samples also contained 0.1-0.4% C14:0; 0.5-1.2% C16:3 and; 0.1-0.7% C18:1Δ11.

| Infiltrated genes | C16:0 | C16:1 | C18:0 | C18:1 | C18:2 | C18:3n3 | C20:0 | C20:1 | C22:0 | C24:0 |
|---|---|---|---|---|---|---|---|---|---|---|
| Control (P19) | 33.6 ± 4.7 | 0.5 ± 0.4 | 8.9 ± 2.2 | 4.7 ± 0.6 | 16.9 ± 1.0 | 32.2 ± 7.8 | 1.1 ± 0.2 | 0.8 ± 1.5 | 0.0 | 0.0 |
| WRI1 | 35.5 ± 3.4 | 0.7 ± 0.2 | 5.2 ± 0.8 | 5.4 ± 1.3 | 17.1 ± 1.0 | 33.1 ± 2.7 | 0.8 ± 0.1 | 0.5 ± 0.6 | 0.3 ± 0.0 | 0.0 |
| WRI3 | 27.3 ± 1.6 | 0.9 ± 0.2 | 4.8 ± 0.3 | 10.2 ± 1.5 | 16.1 ± 1.0 | 37.8 ± 1.2 | 0.8 ± 0.1 | 0.6 ± 0.7 | 0.1 ± 0.2 | 0.0 |
| WRI4 | 30.1 ± 0.4 | 1.0 ± 0.4 | 5.2 ± 0.8 | 4.6 ± 0.6 | 17.2 ± 0.4 | 38.1 ± 1.6 | 0.8 ± 0.1 | 1.3 ± 1.3 | 0.0 | 0.0 |
| AsWRI | 35.7 ± 3.0 | 1.7 ± 0.4 | 5.3 ± 0.7 | 6.5 ± 0.3 | 15.4 ± 0.4 | 31.6 ± 1.6 | 0.8 ± 0.1 | 0.4 ± 0.7 | 0.3 ± 0.1 | 0.0 |
| SbWRI | 37.4 ± 0.8 | 1.9 ± 0.3 | 4.8 ± 0.3 | 7.0 ± 1.2 | 15.2 ± 0.3 | 30.8 ± 0.3 | 0.8 ± 0.1 | 0.4 ± 0.6 | 0.3 ± 0.0 | 0.0 |
| TsWRI | 34.5 ± 4.8 | 0.0 | 9.4 ± 8.2 | 5.9 ± 1.7 | 16.0 ± 0.7 | 29.3 ± 12.4 | 0.0 | n.d. | 0.0 | 0.0 |
| Control (P19) | 31.0 ± 2.1 | 0.9 ± 0.1 | 8.7 ± 1.3 | 8.0 ± 2.3 | 24.9 ± 1.5 | 22.1 ± 4.7 | 2.0 ± 0.1 | 0.0 | 0.6 ± 0.6 | 0.2 ± 0.4 |
| WRI1 + DGAT | 27.7 ± 0.1 | 0.3 ± 0.0 | 7.0 ± 0.1 | 17.2 ± 0.7 | 27.9 ± 0.9 | 14.7 ± 0.3 | 2.4 ± 0.2 | 0.3 ± 0.0 | 1.1 ± 0.1 | 0.8 ± 0.2 |
| WRI3 + DGAT | 30.0 ± 0.8 | 0.6 ± 0.1 | 5.9 ± 0.4 | 13.9 ± 2.9 | 21.5 ± 1.1 | 21.3 ± 0.8 | 2.8 ± 0.1 | 0.2 ± 0.0 | 1.8 ± 0.1 | 1.0 ± 0.2 |
| WRI4 + DGAT | 27.0 ± 0.5 | 0.2 ± 0.1 | 8.5 ± 0.2 | 5.8 ± 0.7 | 23.9 ± 0.8 | 25.2 ± 1.3 | 3.5 ± 0.1 | 0.2 ± 0.0 | 2.1 ± 0.2 | 1.7 ± 0.2 |
| AsWRI + DGAT | 33.8 ± 0.5 | 1.1 ± 0.1 | 5.5 ± 0.9 | 12.2 ± 1.6 | 26.0 ± 1.9 | 16.3 ± 1.3 | 2.2 ± 0.2 | 0.2 ± 0.0 | 1.2 ± 0.1 | 0.8 ± 0.1 |
| SbWRI + DGAT | 34.6 ± 0.5 | 1.3 ± 0.1 | 5.6 ± 0.4 | 13.9 ± 1.6 | 23.6 ± 1.3 | 15.8 ± 0.6 | 2.2 ± 0.1 | 0.2 ± 0.0 | 1.2 ± 0.1 | 0.9 ± 0.1 |
| TsWRI + DGAT | 25.4 ± 0.5 | 0.2 ± 0.0 | 9.4 ± 0.1 | 7.7 ± 1.0 | 27.0 ± 1.3 | 22.1 ± 2.4 | 3.6 ± 0.2 | 0.2 ± 0.0 | 1.8 ± 0.2 | 1.3 ± 0.2 |

In contrast, differences in TAG yields from expression of the different WRI polypeptides were more pronounced upon co-expression with the AtDGAT1 acyltransferase. This again demonstrated the synergistic effect of WRI1 and DGAT co-expression on TAG biosynthesis in infiltrated *N. benthamiana* leaf tissue, as reported by Vanhercke et al. (2013). Intermediate TAG levels were observed upon co-expression of DGAT1 with AtWRI3, AtWRI4 and TsWRI1 expressing vectors while levels obtained with the AsWRI1 and AtWRI1 were significantly lower. In a result that could not have been predicted beforehand, the highest TAG yields were obtained with co-expression of DGAT with SbWRI1, even though the assay was done in dicotyledonous cells. TAG fatty acid composition analysis revealed increased levels of $C18{:}1^{\Delta 9}$ and decreased levels of $C18{:}3^{\Delta 9,12,15}$ (ALA) in the case of SbWRI1, AsWRI1 and the AtWRI1 positive control (Table 9). Unlike AtWRI1, however, expression of AsWRI1 and SbWRI1 both displayed increased C16:0 levels compared to the p19 negative control. Interestingly, AtWRI3 infiltrated leaf samples exhibited a distinct TAG profile with $C18{:}1^{\Delta 9}$ being enriched while C16:0 and ALA were only slightly affected.

This experiment showed that the *S. bicolor* WRI1 transcription factor, SbWRI1, was superior to AtWRI1 when Nucleotide sequences of the protein coding regions of the following transcription factors were codon optimized for expression in *N. benthamiana* and *N. tabacum*, synthesized and subcloned as NotI-SacI fragments into the respective sites of pJP3343: *A. thaliana* FUS3 (pOIL164) (Luerssen et al., 1998; Accession number AAC35247; SEQ ID NO:160), *A. thaliana* LEC1L (pOIL165) (Kwong et al. 2003; Accession number AAN15924; SEQ ID NO:157), *A. thaliana* LEC1 (pOIL166) (Lotan et al., 1998; Accession number AAC39488; SEQ ID NO:149), *G. max* MYB73 (pOIL167) (Liu et al., 2014; Accession number ABH02868; SEQ ID NO:221), *A. thaliana* bZIP53 (pOIL168) (Alonso et al., 2009; Accession number AAM14360; SEQ ID NO:222), *A. thaliana* AGL15 (pOIL169) (Zheng et al., 2009; Accession number NP_196883; SEQ ID NO:223), *A. thaliana* MYB118 (Accession number AAS58517; pOIL170; SEQ ID NO:224), MYB115 (Wang et al., 2002; Accession number AAS10103; pOIL171; SEQ ID NO:225), *A. thaliana* TANMEI (pOIL172) (Yamagishi et al., 2005; Accession number BAE44475; SEQ ID NO:226), *A. thaliana* WUS (pOIL173) (Laux et al., 1996; Accession number NP_565429; SEQ ID NO:227), *A. thaliana* BBM (pOIL174) (Boutilier et al., 2002; Accession number AAM33893, SEQ ID NO:145), *B. napus* GFR2a1 (Accession number AFB74090; pOIL177; SEQ ID NO:228) and GFR2a2 (Accession number AFB74089; pOIL178; SEQ ID NO:229) (Liu et al. (2012c)). In addition, a codon optimized version of the *A. thaliana* PHR1 transcription factor involved in adaptation to high light phosphate starvation conditions was similarly subcloned into pJP3343 (pOIL189) (Nilsson et al (2012); Accession number AAN72198; SEQ ID NO:230). These transcription factors are summarised in Table 10.

As a screening assay to determine the function of these transcription factors, the genetic constructs are introduced into *N. benthamiana* leaf cells as described in Example 1, either with or without a gene encoding DGAT1, or other gene combinations such as encoding WRI1, LEC2, hpSDP1 or FATA thioesterase, and total lipid content and fatty acid composition of the leaf cells is measured. Transcription factors that increased total lipid contents significantly are identified and selected.

For stable transformation of plants using genes encoding the alternative transcription factors, the following binary constructs are made. The genes for expression of the transcription factors use either the SSU promoter or the SAG12 promoter. Over-expression of embryogenic transcription factors such as LEC1 and LEC2 has been shown to induce a variety of pleotropic effects, undesirable in the present context, including somatic embryogenesis (Feeney et al. (2012); Santos-Mendoza et al. (2005); Stone et al. (2008); Stone et al. (2001); Shen et al. (2010)). To minimize possible negative impact on plant development and biomass yield, tissue or developmental-stage specific promoters are preferred over constitutive promoters to drive the ectopic expression of master regulators of embryogenesis.

TABLE 10

Additional transcription factors and the genetic constructs for their expression

| Plasmid | Transcription factor | Species | Length (amino acid) | Accession number |
|---|---|---|---|---|
| pOIL164 | FUS3 | *A. thaliana* | 312 | AAC35247 |
| pOIL165 | LEC1L | *A. thaliana* | 234 | AAN15924 |
| pOIL166 | LEC1 | *A. thaliana* | 208 | AAC39488 |
| pOIL167 | MYB73 | *G. max* | 74 | ABH02868 |
| pOIL168 | bZIP53 | *A. thaliana* | 146 | AAM14360 |
| pOIL169 | AGL15 | *A. thaliana* | 268 | NP_196883 |
| pOIL170 | MYB118 | *A. thaliana* | 437 | AAS58517 |
| pOIL171 | MYB115 | *A. thaliana* | 359 | AAS10103 |
| pOIL172 | TANMEI | *A. thaliana* | 386 | BAE44475 |
| pOIL173 | WUS | *A. thaliana* | 292 | NP_565429 |
| pOIL174 | BBM | *A. thaliana* | 584 | AAM33803 |
| pOIL177 | GFR2a1 | *B. napus* | 453 | AFB74090 |
| pOIL178 | GFR2a2 | *B. napus* | 461 | AFB74089 |
| pOIL189 | PHR1 | *A. thaliana* | 409 | AAN72198 |

Example 11. Silencing of a TAG Lipase in Plants Accumulating High Levels of TAG in Leaf Tissue The Sugar Dependent 1 (SDP1) TAG lipase has been demonstrated to play a role in TAG turnover in non-seed tissues of *A. thaliana* as well as during seed germination (Eastmond et al., 2006; Kelly et al., 2011; Kelly et al., 2013). SDP1 is expressed in developing seed and the SDP1 polypeptide is also present in mature seed in association with (but not coating) oil bodies. Silencing of the gene encoding SDP1 resulted in a small but significant increase in TAG levels in *A. thaliana* roots and stems (<0.4% on dry weight basis) while an even smaller increase was observed in leaf tissue (Kelly et al., 2013).

To determine whether TAG levels could be increased further in leaf and stem tissues relative to co-expression of AtWRI1 and AtDGAT1, an experiment was designed to silence an endogenous SDP1 gene in *N. tabacum* plants which were homozygous for a T-DNA having genes for transgenic expression of the WRI, DGAT1 and Oleosin polypeptides (Vanhercke et al., 2014). A BLAST search of the *N. benthamiana* transcriptome (Naim et al., 2012) using the AtSDP1 nucleotide sequence as query identified a transcript (Nbv5tr6385200, SEQ ID NO:173) with homology to the *A. thaliana* SDP1 gene. A 713 bp region (SEQ ID NO:174) was selected for hairpin mediated gene silencing. A 3.903 kb synthetic fragment was designed, based on the pHELLSGATE12 vector, which comprised, in order, the enTCUP2 constitutive promoter, the 713 bp *N. benthamiana* SDP1 fragment in sense orientation flanked by attB1 and attB2 sites, a Pdk intron, a cat intron sequence in reverse orientation, a second 713 bp *N. benthamiana* SDP1 fragment flanked by attB1 and attB2 sites in reverse (antisense) orientation, and the OCS 3' region terminator/polyadenylation site (FIG. 8). The insert was subcloned into pJP3303 using SmaI and KasI restriction sites and the resulting expression vector was designated pOIL051. This chimeric DNA contains a hygromycin resistance selectable marker gene.

pOIL051 was used to produce transformed *N. tabacum* plants by *Agrobacterium*-mediated transformation. The starting plant cells were from transgenic plants which were homozygous for the T-DNA of pJP3502 (Vanhercke et al., 2014). Transgenic plants containing the T-DNA from pOIL051 were selected by hygromycin resistance and transferred to soil in the glasshouse or in a controlled environment cabinet for continued growth. Leaf samples were harvested from confirmed double-transformants (TO plants) before flowering, at flowering and at seed setting stages of plant development, and the TAG level in each determined. Transgenic plants containing only low levels of leaf TAG, or TAG at the same level as controls, were identified by means of lipid extraction from leaf samples and analysis by spot TLC and discarded. TAG levels in the remaining population of transformants were quantified by GC as described in Example 1. Before flowering, the majority of these plants exhibited greatly increased TAG levels (>5% of leaf dry weight) in their leaf tissue while 4 plants contained TAG levels above 10% (Table 11). The maximum TAG level observed in leaves of these plants, before flowering, was 11.3% in plant 51-13. As a comparison, the transgenic plants of the parental *N. tabacum* line expressing AtWRI1, AtDGAT1 and Oleosin displayed TAG levels of about 2% before flowering and about 6% during flowering (Vanhercke et al., 2014). The addition of the SDP1-inhibitory construct to the AtWRI1 plus AtDGAT1 combination was therefore synergistic for increasing the TAG levels in these plants. Surprisingly, the TAG content in leaves harvested from the doubly-transformed plants at flowering stage was greatly increased, observing 30.5% on a dry weight basis (Table 12), representing a 5-fold increase relative to the plants not silenced for SDP1. To the great amazement of the inventors, the TAG level reached an astonishing 70.7% (% of dry weight) in samples of senescing leaves (green and yellow) at the seed setting stage (Table 13). When NMR was used to measure the oil content of entire leaves from the tobacco plants at seed setting stage, the TAG content in some green leaves that had started senescing was about 43% and in some brown, desiccated leaves was 42%. When such leaves were pressed between two brown paper filters, the exuded oil soaked into the paper and made it translucent, whereas control tobacco leaves did not do so, providing a simple screening method for detecting plants having high oil content.

Two primary transformants (#61, #69) containing each of the T-DNAs from pJP3502 and pOIL51 and displaying high TAG levels were analyzed by digital PCR (ddPCR) using a hygromycin gene-specific primer pair to determine the number of pOIL51 T-DNA insertions. The plant designated #61 contained one T-DNA insertion from pOIL51, whereas plant #69 contained three T-DNA insertions from pOIL51. T1 progeny plants of both lines were screened again by ddPCR to identify homozygous, heterozygous and null plants. Progeny plants of plant #61 containing no insertions from pOIL51 (nulls; total of 7) or 2 T-DNA insertions (i.e. homozygous for that T-DNA; total of 12) were selected for further analysis. Similarly, progeny plants of line #69 containing zero T-DNA insertions from pOIL51 (nulls; total of 2) or 2 such insertions (total of 15) or 4 or 5 insertions (total of 5) were maintained for further analysis.

TABLE 11

TAG levels (% leaf dry weight) and TAG fatty acid composition in leaf tissue from *N. tabacum* plants (T0 generation) expressing WRI1, DGAT1 and Oleosin transgenes and super-transformed with a T-DNA encoding an SDP1 hairpin construct (pOIL051), compared to wild-type (untransformed). Leaf samples were harvested during vegetative stage (before flowering). Lipid samples also contained 0.0-0.2% C16:3, 0.0-0.4% C20:1; 0.0-0.1% C20:2n-6.

| Line | C14:0 | C16:0 | C16:1 | C18:0 | C18:1 | C18:1d11 | C18:2 | C18:3n3 | C20:0 | C22:0 | C24:0 | % TAG |
|---|---|---|---|---|---|---|---|---|---|---|---|---|
| wild-type | 2.5 | 20.2 | 0.0 | 8.6 | 5.6 | 0.0 | 18.9 | 44.2 | 0.0 | 0.0 | 0.0 | 0.1 |
| 23-31 | 0.0 | 66.0 | 0.0 | 0.0 | 34.0 | 0.0 | 0.0 | 0.0 | 0.0 | 0.0 | 0.0 | 0.0 |
| 23-29 | 0.0 | 36.1 | 1.4 | 5.1 | 21.0 | 0.8 | 23.3 | 7.1 | 2.4 | 1.5 | 1.1 | 2.9 |
| 57 | 0.1 | 47.2 | 0.3 | 5.4 | 19.2 | 1.9 | 0.0 | 21.2 | 2.1 | 1.2 | 1.1 | 3.4 |
| 23-1 | 0.2 | 30.8 | 1.9 | 4.9 | 41.2 | 1.0 | 13.7 | 2.4 | 1.9 | 1.1 | 0.7 | 4.0 |
| 58 | 0.1 | 31.4 | 0.2 | 3.8 | 12.2 | 1.6 | 33.6 | 13.2 | 1.7 | 1.0 | 0.7 | 4.0 |
| 21 | 0.1 | 31.9 | 0.3 | 3.9 | 10.7 | 1.5 | 32.3 | 15.2 | 1.9 | 1.1 | 0.8 | 4.7 |
| 23-30 | 0.2 | 34.1 | 0.7 | 4.9 | 29.4 | 0.9 | 17.5 | 5.7 | 2.9 | 1.8 | 1.7 | 4.9 |
| 40 | 0.1 | 34.4 | 0.2 | 4.3 | 14.3 | 1.5 | 29.7 | 11.8 | 1.7 | 1.0 | 0.7 | 5.1 |
| 22 | 0.1 | 35.8 | 0.2 | 4.3 | 12.8 | 1.5 | 29.8 | 11.7 | 1.8 | 1.0 | 0.7 | 5.1 |
| 15 | 0.1 | 37.2 | 0.1 | 3.9 | 8.6 | 1.7 | 29.3 | 16.0 | 1.5 | 0.8 | 0.6 | 5.1 |
| 16 | 0.1 | 35.2 | 0.1 | 3.9 | 13.9 | 1.7 | 28.5 | 13.6 | 1.4 | 0.7 | 0.6 | 5.3 |
| 25 | 0.1 | 34.4 | 0.2 | 3.9 | 15.4 | 1.8 | 27.6 | 13.2 | 1.6 | 0.9 | 0.7 | 5.4 |
| 65 | 0.1 | 26.9 | 0.2 | 3.8 | 19.2 | 1.5 | 35.7 | 9.1 | 1.7 | 0.8 | 0.6 | 5.5 |
| 12 | 0.2 | 31.7 | 0.2 | 3.6 | 15.9 | 1.7 | 30.5 | 12.8 | 1.6 | 0.9 | 0.7 | 5.5 |
| 28 | 0.1 | 31.4 | 0.2 | 3.5 | 13.5 | 1.7 | 32.7 | 13.7 | 1.5 | 0.8 | 0.6 | 5.6 |
| 26 | 0.1 | 31.4 | 0.2 | 3.5 | 13.5 | 1.7 | 32.7 | 13.7 | 1.5 | 0.8 | 0.6 | 5.8 |
| 19 | 0.1 | 30.5 | 0.2 | 3.7 | 14.9 | 1.6 | 31.7 | 13.7 | 1.7 | 0.9 | 0.7 | 5.9 |
| 30 | 0.1 | 30.4 | 0.2 | 3.7 | 21.3 | 2.2 | 31.2 | 7.4 | 1.6 | 0.8 | 0.7 | 5.9 |
| 6 | 0.1 | 37.5 | 0.2 | 4.4 | 10.5 | 1.7 | 31.9 | 10.6 | 1.5 | 0.7 | 0.6 | 6.0 |
| 4 | 0.1 | 34.2 | 0.2 | 3.9 | 11.9 | 1.7 | 32.6 | 12.5 | 1.4 | 0.6 | 0.5 | 6.1 |
| 42 | 0.1 | 30.6 | 0.2 | 4.5 | 17.3 | 1.8 | 32.7 | 9.2 | 1.7 | 0.9 | 0.7 | 6.3 |
| 45 | 0.1 | 31.6 | 0.2 | 3.9 | 18.2 | 1.8 | 30.4 | 10.5 | 1.6 | 0.8 | 0.6 | 6.6 |
| 56 | 0.1 | 26.8 | 0.2 | 4.2 | 20.0 | 1.5 | 34.3 | 8.7 | 1.9 | 1.0 | 0.8 | 6.7 |
| 43 | 0.1 | 28.5 | 0.2 | 3.8 | 18.6 | 1.6 | 34.1 | 9.6 | 1.7 | 0.9 | 0.6 | 7.1 |
| 32 | 0.1 | 28.1 | 0.2 | 3.4 | 16.8 | 1.8 | 35.5 | 10.6 | 1.6 | 0.8 | 0.6 | 7.2 |
| 70 | 0.1 | 26.3 | 0.2 | 3.5 | 25.5 | 1.8 | 31.0 | 8.9 | 1.3 | 0.6 | 0.5 | 7.4 |
| 69 | 0.1 | 30.9 | 0.2 | 4.0 | 15.7 | 1.7 | 31.7 | 12.9 | 1.5 | 0.7 | 0.5 | 7.4 |
| 61 | 0.1 | 31.0 | 0.2 | 4.0 | 16.4 | 1.6 | 34.1 | 9.5 | 1.5 | 0.7 | 0.5 | 7.5 |
| 20 | 0.1 | 33.3 | 0.1 | 3.8 | 11.7 | 1.6 | 31.4 | 14.8 | 1.5 | 0.8 | 0.6 | 7.8 |
| 53 | 0.1 | 33.1 | 0.1 | 3.8 | 18.2 | 1.9 | 29.8 | 10.4 | 1.3 | 0.6 | 0.5 | 8.4 |
| 18 | 0.1 | 29.4 | 0.2 | 3.7 | 18.4 | 1.7 | 32.8 | 10.9 | 1.4 | 0.6 | 0.5 | 9.1 |
| 51-1 | 0.1 | 29.0 | 2.0 | 3.6 | 17.1 | 1.6 | 33.8 | 9.9 | 1.4 | 0.7 | 0.5 | 9.2 |
| 47 | 0.1 | 30.5 | 0.1 | 4.2 | 20.3 | 1.5 | 31.9 | 8.3 | 1.5 | 0.7 | 0.5 | 9.3 |
| 51-60 | 0.1 | 30.7 | 2.6 | 3.4 | 15.8 | 1.9 | 31.2 | 11.6 | 1.3 | 0.7 | 0.5 | 10.2 |
| 46 | 0.1 | 24.8 | 0.1 | 3.6 | 28.8 | 1.6 | 30.3 | 7.9 | 1.3 | 0.6 | 0.5 | 10.2 |
| 48 | 0.1 | 33.1 | 0.1 | 3.8 | 16.5 | 1.7 | 30.4 | 11.4 | 1.4 | 0.7 | 0.5 | 10.7 |
| 51-13 | 0.1 | 25.4 | 2.2 | 3.3 | 23.8 | 1.6 | 32.7 | 8.3 | 1.3 | 0.6 | 0.4 | 11.3 |

TABLE 12

TAG levels (% leaf dry weight) and TAG composition in leaf tissue from *N. tabacum* plants (T0 generation) expressing WRI1, DGAT1 and Oleosin transgenes and supertransformed with a T-DNA encoding an SDP1 hairpin construct (pOIL051). Leaf samples were harvested during flowering.

| Line | C14:0 | C16:0 | C16:1 | C18:0 | C18:1 | C18:1d11 | C18:2 | C18:3n3 | C20:0 | C22:0 | C24:0 | % TAG |
|---|---|---|---|---|---|---|---|---|---|---|---|---|
| wild-type | 0.2 | 14.8 | 0.6 | 8.5 | 9.2 | 0.3 | 20.0 | 44.5 | 0.6 | 0.3 | 0.4 | 0.3 |
| 21 | 0.1 | 25.7 | 2.1 | 3.7 | 21.2 | 1.0 | 31.0 | 11.7 | 1.5 | 0.8 | 0.6 | 8.8 |
| 56 | 0.1 | 33.2 | 1.4 | 4.9 | 20.7 | 1.0 | 26.3 | 7.4 | 2.1 | 1.3 | 0.9 | 9.2 |
| 65 | 0.1 | 24.7 | 1.5 | 3.8 | 28.5 | 1.0 | 29.0 | 7.5 | 1.7 | 0.9 | 0.6 | 12.0 |
| 42 | 0.1 | 34.0 | 1.5 | 4.4 | 16.8 | 1.1 | 29.4 | 7.6 | 2.2 | 1.4 | 1.1 | 13.1 |
| 28 | 0.1 | 29.5 | 2.4 | 3.5 | 16.4 | 1.2 | 28.7 | 14.6 | 1.5 | 1.0 | 0.6 | 13.2 |
| 30 | 0.1 | 19.1 | 1.9 | 3.3 | 31.8 | 1.0 | 30.6 | 9.3 | 1.3 | 0.7 | 0.4 | 13.6 |
| 20 | 0.1 | 22.4 | 1.8 | 3.7 | 27.4 | 0.9 | 29.0 | 10.8 | 1.7 | 0.9 | 0.7 | 14.6 |
| 19 | 0.1 | 20.9 | 1.7 | 3.1 | 28.4 | 1.0 | 31.6 | 10.0 | 1.4 | 0.8 | 0.5 | 15.7 |
| 12 | 0.1 | 24.4 | 1.6 | 3.6 | 22.1 | 0.9 | 35.1 | 8.9 | 1.4 | 0.8 | 0.5 | 15.8 |

TABLE 12-continued

TAG levels (% leaf dry weight) and TAG composition in leaf tissue from *N. tabacum* plants (T0 generation) expressing WRI1, DGAT1 and Oleosin transgenes and supertransformed with a T-DNA encoding an SDP1 hairpin construct (pOIL051). Leaf samples were harvested during flowering.

| Line | C14:0 | C16:0 | C16:1 | C18:0 | C18:1 | C18:1d11 | C18:2 | C18:3n3 | C20:0 | C22:0 | C24:0 | % TAG |
|---|---|---|---|---|---|---|---|---|---|---|---|---|
| 16 | 0.1 | 21.5 | 1.8 | 3.4 | 34.9 | 1.0 | 26.2 | 7.9 | 1.4 | 0.7 | 0.5 | 16.4 |
| 57 | 0.1 | 25.0 | 1.7 | 4.1 | 27.7 | 1.0 | 28.4 | 8.4 | 1.6 | 0.9 | 0.6 | 17.2 |
| 26 | 0.1 | 22.5 | 1.6 | 3.5 | 28.4 | 1.1 | 31.2 | 7.6 | 1.7 | 1.0 | 0.7 | 18.0 |
| 39 | 0.1 | 30.0 | 2.2 | 3.7 | 22.7 | 1.6 | 24.3 | 11.6 | 1.5 | 0.9 | 0.7 | 18.1 |
| 70 | 0.1 | 22.1 | 2.1 | 3.6 | 36.3 | 1.0 | 24.2 | 7.2 | 1.4 | 0.7 | 0.5 | 18.3 |
| 45 | 0.1 | 21.4 | 1.8 | 3.7 | 34.4 | 1.0 | 27.5 | 6.9 | 1.4 | 0.8 | 0.5 | 19.1 |
| 32 | 0.1 | 23.3 | 1.6 | 3.2 | 24.4 | 1.1 | 33.6 | 9.0 | 1.5 | 0.9 | 0.6 | 19.5 |
| 18 | 0.1 | 23.4 | 2.1 | 3.3 | 26.4 | 0.9 | 30.2 | 10.3 | 1.4 | 0.7 | 0.5 | 20.6 |
| 20Y | 0.1 | 22.3 | 1.6 | 3.6 | 30.3 | 0.9 | 28.5 | 9.1 | 1.6 | 0.9 | 0.6 | 20.8 |
| 43 | 0.1 | 28.1 | 2.0 | 3.5 | 21.5 | 1.2 | 29.9 | 10.2 | 1.5 | 0.9 | 0.6 | 21.2 |
| 4 | 0.1 | 27.9 | 1.9 | 3.7 | 26.3 | 1.2 | 26.2 | 9.3 | 1.5 | 0.8 | 0.5 | 21.8 |
| 1 | 0.1 | 23.8 | 2.0 | 3.7 | 30.2 | 1.1 | 28.1 | 8.0 | 1.4 | 0.7 | 0.5 | 22.3 |
| 61 | 0.1 | 24.2 | 2.2 | 4.0 | 32.0 | 1.1 | 25.2 | 7.8 | 1.5 | 0.8 | 0.6 | 23.9 |
| 60 | 0.1 | 24.4 | 2.2 | 3.7 | 31.0 | 1.1 | 25.4 | 8.6 | 1.5 | 0.8 | 0.6 | 25.0 |
| 46 | 0.1 | 23.3 | 2.0 | 3.7 | 32.9 | 1.0 | 24.0 | 9.2 | 1.6 | 0.9 | 0.7 | 25.7 |
| 6 | 0.1 | 31.5 | 2.6 | 3.5 | 19.5 | 1.6 | 25.5 | 12.7 | 1.3 | 0.7 | 0.5 | 26.3 |
| 13 | 0.1 | 21.8 | 1.9 | 3.6 | 35.1 | 1.0 | 25.1 | 8.1 | 1.5 | 0.8 | 0.5 | 26.8 |
| 69 | 0.1 | 21.8 | 1.6 | 4.3 | 33.4 | 0.8 | 26.9 | 7.6 | 1.7 | 0.8 | 0.5 | 26.9 |
| 53 | 0.1 | 27.1 | 2.1 | 3.5 | 24.1 | 1.2 | 29.4 | 9.2 | 1.4 | 0.8 | 0.5 | 29.2 |
| 48 | 0.1 | 29.5 | 2.5 | 3.9 | 21.1 | 1.3 | 29.0 | 9.2 | 1.6 | 0.8 | 0.6 | 29.5 |
| 47 | 0.1 | 30.9 | 2.5 | 3.4 | 19.4 | 1.5 | 28.5 | 10.6 | 1.3 | 0.8 | 0.5 | 30.5 |

TABLE 13

TAG levels (% leaf dry weight) and TAG composition in leaf tissue from *N. tabacum* plants (T0 generation) expressing WRI1, DGAT1 and Oleosin transgenes and supertransformed with a T-DNA encoding an SDP1 hairpin construct (pOIL051). Leaf samples were harvested at seed setting stage.

| Sample | C14:0 | C16:0 | C16:1 | 16:3 | C18:0 | C18:1 | C18:1d11 | C18:2 | C18:3n3 | C20:0 | C20:1d11 | C22:0 | C24:0 | TAG content (% dw) |
|---|---|---|---|---|---|---|---|---|---|---|---|---|---|---|
| wt | 0.0 | 13.0 | 0.0 | 0.0 | 8.4 | 7.0 | 0.0 | 24.7 | 46.8 | 0.0 | 0.0 | 0.0 | 0.0 | 0.3 |
| 73 | 0.0 | 26.6 | 1.7 | 0.0 | 8.5 | 9.4 | 0.0 | 27.0 | 25.6 | 1.1 | 0.0 | 0.0 | 0.0 | 0.6 |
| 18 | 0.1 | 15.0 | 1.8 | 0.0 | 4.8 | 14.4 | 0.4 | 43.9 | 16.3 | 1.7 | 0.4 | 0.7 | 0.5 | 3.3 |
| 41 | 0.1 | 22.3 | 1.2 | 0.3 | 4.4 | 24.0 | 0.6 | 32.8 | 10.8 | 1.7 | 0.3 | 0.8 | 0.5 | 5.2 |
| 19 | 0.1 | 14.5 | 1.5 | 0.3 | 3.0 | 21.6 | 0.7 | 44.8 | 10.6 | 1.4 | 0.4 | 0.7 | 0.4 | 7.2 |
| 20 | 0.1 | 26.7 | 2.4 | 0.1 | 4.3 | 24.9 | 1.0 | 25.2 | 11.3 | 1.9 | 0.3 | 1.0 | 0.8 | 9.6 |
| 30 | 0.1 | 18.6 | 1.5 | 0.3 | 3.5 | 24.8 | 0.7 | 38.9 | 8.9 | 1.4 | 0.3 | 0.7 | 0.4 | 9.9 |
| 65 | 0.1 | 22.2 | 1.4 | 0.3 | 3.5 | 30.9 | 0.7 | 29.1 | 8.1 | 1.7 | 0.3 | 1.0 | 0.6 | 11.3 |
| 42 | 0.1 | 23.6 | 1.5 | 0.2 | 4.1 | 29.0 | 0.9 | 30.3 | 5.9 | 2.0 | 0.4 | 1.3 | 0.8 | 12.0 |
| 32 | 0.1 | 21.3 | 1.3 | 0.3 | 3.3 | 21.4 | 0.9 | 40.7 | 7.1 | 1.7 | 0.3 | 1.0 | 0.6 | 13.7 |
| 39 | 0.1 | 25.8 | 1.7 | 0.3 | 3.6 | 27.2 | 1.2 | 27.2 | 8.2 | 2.0 | 0.4 | 1.4 | 0.9 | 14.0 |
| 45 | 0.1 | 23.0 | 1.5 | 0.1 | 3.8 | 28.0 | 0.9 | 32.6 | 6.3 | 1.8 | 0.3 | 1.0 | 0.6 | 14.4 |
| 13 | 0.1 | 26.9 | 2.8 | 0.1 | 3.7 | 32.6 | 1.1 | 21.6 | 7.6 | 1.6 | 0.3 | 0.8 | 0.7 | 14.6 |
| R45 | 0.1 | 23.4 | 1.5 | 0.2 | 4.1 | 27.8 | 0.9 | 32.2 | 6.1 | 1.8 | 0.3 | 1.0 | 0.6 | 14.6 |
| 21 | 0.1 | 23.1 | 1.6 | 0.2 | 3.5 | 27.4 | 0.8 | 31.2 | 8.2 | 1.8 | 0.3 | 1.1 | 0.7 | 15.0 |
| 9 | 0.1 | 23.2 | 1.4 | 0.2 | 3.5 | 23.3 | 0.8 | 35.6 | 8.5 | 1.6 | 0.3 | 0.9 | 0.5 | 15.4 |
| 12 | 0.1 | 24.5 | 1.4 | 0.2 | 3.4 | 22.3 | 0.8 | 36.2 | 7.4 | 1.7 | 0.3 | 1.1 | 0.7 | 15.9 |
| 4 | 0.1 | 21.9 | 1.8 | 0.2 | 3.6 | 22.8 | 0.9 | 35.9 | 9.5 | 1.6 | 0.3 | 0.9 | 0.6 | 16.1 |
| 49 | 0.1 | 23.5 | 1.4 | 0.2 | 4.0 | 25.3 | 0.8 | 34.3 | 6.6 | 1.8 | 0.3 | 1.1 | 0.7 | 16.8 |
| 26 | 0.1 | 22.2 | 1.3 | 0.2 | 3.8 | 25.4 | 0.8 | 35.2 | 6.5 | 2.1 | 0.3 | 1.3 | 0.8 | 17.2 |
| 16 | 0.1 | 22.2 | 1.8 | 0.3 | 3.4 | 29.9 | 0.8 | 30.1 | 8.1 | 1.5 | 0.3 | 0.9 | 0.6 | 18.2 |
| 1 | 0.1 | 27.4 | 2.7 | 0.1 | 4.0 | 32.0 | 1.2 | 22.9 | 6.3 | 1.6 | 0.3 | 0.8 | 0.7 | 18.7 |
| 70 | 0.1 | 27.1 | 2.7 | 0.2 | 3.7 | 32.6 | 1.0 | 21.5 | 7.6 | 1.6 | 0.3 | 0.8 | 0.7 | 19.0 |
| 6 | 0.1 | 30.6 | 2.6 | 0.2 | 3.3 | 13.0 | 1.4 | 32.8 | 12.9 | 1.4 | 0.2 | 0.9 | 0.6 | 21.5 |
| 47 | 0.1 | 28.0 | 2.1 | 0.2 | 3.6 | 18.5 | 1.3 | 33.2 | 9.9 | 1.5 | 0.2 | 0.9 | 0.5 | 21.6 |
| 69 | 0.1 | 25.4 | 2.3 | 0.1 | 4.3 | 32.4 | 0.9 | 23.5 | 7.4 | 1.8 | 0.3 | 0.8 | 0.6 | 22.5 |
| 53 | 0.1 | 23.9 | 2.1 | 0.2 | 3.4 | 28.2 | 1.1 | 30.2 | 7.6 | 1.5 | 0.3 | 0.9 | 0.5 | 23.2 |
| 46 | 0.1 | 25.9 | 2.7 | 0.2 | 3.7 | 32.0 | 1.1 | 22.8 | 8.2 | 1.6 | 0.3 | 0.8 | 0.7 | 24.0 |
| 43 | 0.1 | 23.7 | 1.6 | 0.2 | 3.1 | 22.6 | 0.9 | 37.6 | 7.4 | 1.4 | 0.2 | 0.8 | 0.5 | 24.0 |
| 48 | 0.1 | 27.4 | 2.2 | 0.1 | 4.1 | 23.0 | 1.1 | 31.3 | 6.9 | 1.9 | 0.3 | 1.0 | 0.7 | 24.4 |
| 28 | 0.1 | 23.0 | 1.4 | 0.2 | 3.3 | 24.8 | 1.0 | 35.6 | 7.3 | 1.6 | 0.3 | 0.9 | 0.6 | 26.6 |
| 1Y | 0.1 | 24.3 | 2.5 | 0.1 | 3.8 | 35.7 | 1.1 | 22.6 | 6.7 | 1.6 | 0.3 | 0.7 | 0.6 | 28.1 |
| 56G | 0.1 | 25.5 | 1.8 | 0.2 | 3.7 | 26.7 | 0.9 | 29.8 | 7.3 | 1.8 | 0.3 | 1.1 | 0.7 | 33.9 |
| 57 | 0.1 | 25.1 | 1.9 | 0.2 | 3.2 | 20.1 | 1.0 | 35.2 | 10.0 | 1.5 | 0.3 | 0.9 | 0.6 | 35.4 |
| 56Y | 0.2 | 24.8 | 1.4 | 0.2 | 4.1 | 27.2 | 0.8 | 31.0 | 6.0 | 2.0 | 0.4 | 1.2 | 0.8 | 39.6 |
| 69Y | 0.1 | 24.7 | 2.1 | 0.2 | 4.1 | 32.0 | 0.8 | 24.3 | 7.8 | 1.9 | 0.3 | 0.9 | 0.7 | 46.5 |
| R69Y | 0.1 | 24.7 | 2.1 | 0.2 | 4.1 | 32.0 | 0.8 | 24.4 | 7.9 | 1.9 | 0.3 | 0.9 | 0.7 | 46.8 |

TABLE 13-continued

TAG levels (% leaf dry weight) and TAG composition in leaf tissue from *N. tabacum* plants (T0 generation) expressing WRI1, DGAT1 and Oleosin transgenes and supertransformed with a T-DNA encoding an SDP1 hairpin construct (pOIL051). Leaf samples were harvested at seed setting stage.

| Sample | C14:0 | C16:0 | C16:1 | 16:3 | C18:0 | C18:1 | C18:1d11 | C18:2 | C18:3n3 | C20:0 | C20:1d11 | C22:0 | C24:0 | TAG content (% dw) |
|---|---|---|---|---|---|---|---|---|---|---|---|---|---|---|
| 61 | 0.1 | 26.6 | 2.7 | 0.1 | 3.6 | 31.6 | 1.1 | 23.8 | 7.4 | 1.4 | 0.3 | 0.7 | 0.5 | 49.2 |
| 61Y | 0.1 | 25.8 | 2.4 | 0.1 | 3.7 | 32.4 | 1.1 | 24.3 | 6.9 | 1.5 | 0.3 | 0.7 | 0.5 | 58.1 |
| 60 | 0.1 | 24.6 | 2.4 | 0.2 | 3.6 | 34.1 | 1.0 | 24.4 | 6.4 | 1.5 | 0.3 | 0.7 | 0.5 | 70.7 |

Y = yellow leaf, G = green leaf.

The selected T1 plants were grown in the glasshouse at the same time and under the same conditions as control plants. Green leaf tissue samples from the T1 plants before flowering were dried and total fatty acid (TFA) and TAG contents determined by GC analysis. TFA contents of the plants containing both T-DNAs ranged from 4.6% to 16.1% on a dry weight basis including TAG levels in the same leaves of 1.2% to 11.8% on a dry weight basis (FIG. 9). This was much greater compared to the plants containing only the T-DNA from pJP3502 and growing alongside under the same conditions and analysed at the same stage of growth, again showing the synergism between reducing TAG lipase activity and the WRI1 plus DGAT combination. Plants containing only the pJP3502 T-DNA contained between 4.2% and 6.8% TFA including TAG levels of 1.4% to 4.1% on a dry weight basis (FIG. 9). Wild-type plants contained, on average, about 0.8% TFA including less than 0.5% TAG on a dry weight basis. The fatty acid composition in the total fatty acid content and the TAG content of leaves from each of lines #61 and #69 were similar to the composition in leaves containing only the T-DNA from pJP3502 (parent). Compared to the wild-type control leaves, plants containing both of the T-DNAs from pOIL51 and pJP3502 exhibited increased levels of C16:0, C18:1 and C18:2 fatty acids. This significant shift in fatty acid composition came largely at the expense of C18:3 which was reduced from about 50-55% to about 20-30% as a percentage of the total fatty acid content.

The substantial increase in TFA levels including the TAG levels between the plants containing only the pJP3502 T-DNA and plants containing the T-DNAs from both pOIL51 and pJP3502 was maintained throughout plant development. Control plants containing only the T-DNA from pJP3502 contained 7.7% to 17.5% TAG during flowering while TAG levels ranged from 14.1% to 20.7% on a dry weight basis during seed setting. The TAG content in leaves from plants containing both pJP3502 and pOIL51 T-DNAs varied between 6.3% and 23.3% during flowering and 12.6% and 33.6% during seed setting. Similar changes in fatty acid composition of the TAG fraction at both stages were detected as described earlier for the vegetative growth stage.

TAG levels were also found to be increased further in other vegetative tissues of the transgenic plants such as roots and stem. Some root tissues of the transgenic *N. tabacum* plants transformed with the T-DNA of pOIL051 contained 4.4% TAG, and some stem tissues 7.4% TAG, on a dry weight basis (FIG. 10). Wild-type plants and *N. tabacum* containing only the T-DNA from pJP3502 exhibited much lower TAG levels in both tissues. The addition of the hairpin SDP1 construct to decrease expression of the endogenous TAG lipase was clearly synergistic with the genes encoding the transcription factor and biosynthesis of TAG (WRI1 and DGAT) for increasing TAG content in the stems and roots. Of note, TAG levels in the roots were lower compared to stem tissue within the same plant while an inverse trend was observed in wild-type plants and *N. tabacum* containing only the T-DNA from pJP3502. The TAG composition of root and stem tissues exhibited similar changes in C18:1 and C18:3 fatty acids as observed previously in transgenic leaf tissue. C18:2 levels in TAG were reduced in transgenic stem tissue while C16 fatty acids were typically reduced in transgenic root tissues when compared to the wild-type control.

Therefore, the inventors concluded that addition of an exogenous gene for silencing the endogenous SDP1 gene to the combination of WRI1 and DGAT increased the total fatty acid content, including the TAG content, at all stages of the plant growth, and acted synergistically with WRI1 and DGAT, particularly in the stems and roots. T1 seeds from the transgenic plants were plated on tissue culture media in vitro at room temperature to test the extent and timing of germination. Germination of T1 seed from three independently transformed lines was the same compared to seed from the transgenic plants transformed with the T-DNA from pJP3502. Furthermore, early seedling vigour appeared to be unaffected. This was surprising given the role of SDP1 in germination in *A. thaliana* seeds and the observed defects in germination in SDP1 mutants (Eastmond et al., 2006). To overcome any germination defects if such had occurred, a second construct is designed in which the SDP1 inhibitory RNA is expressed from a promoter which is essentially not expressed, or at low levels, in seed, such as for example a promoter from a photosynthetic gene such as SSU. The inventors consider that it is beneficial to reduce the risk of deleterious effects on seed germination or early seedling vigour to avoid a constitutive promoter, or at least to avoid a promoter expressed in seeds, to drive expression of the SDP1 inhibitory RNA.

It was noted that the TO plants with the highest TAG levels had been grown under high light conditions in the controlled environment room (500 micro moles light intensity, 16 hr light/26° C.-8 hr dark/18° C. day cycle) and appeared smaller (about 70% in height relative to the plants transformed with the T-DNA from pJP3502) than the wild-type control plants. The inventors concluded that the combination of transgenes and/or genetic modifications for the “push”, “pull”, “protect” and “package” approaches was particularly favourable for achieving high levels of TAG in vegetative plant parts. In this example, WRI1 provided the “push”, DGAT provided the “pull”, silencing of SDP1 provided the “protect” and Oleosin provided the “packaging” of TAG.

Example 12. Senescence-Specific Expression of a Transcription Factor

Ectopic expression of master regulators of embryo and seed development such as LEC2 have been reported to increase TAG levels in non-seed tissues (Santos-Mendoza et al., 2005; Slocombe et al., 2009; Andrianov et al., 2010). However, constitutive over-expression of LEC2 in plants transformed with a 35S-LEC2 gene resulted in unwanted pleiotropic effects on plant development and morphology including somatic embryogenesis and abnormal leaf structures (Stone et al., 2001; Santos-Mendoza et al., 2005). To test whether limiting LEC2 expression to the leaf senescence stage of plant development, i.e. after plants had fully grown and reached their full biomass, would minimize undesirable phenotypic effects but still increase leaf lipid levels, a chimeric DNA was designed and made for expression of LEC2 under the control of a *A. thaliana* senescence specific promoter from the SAG12 gene (U37336; Gan and Amasino, 1995).

To make the genetic construct, a 3.635 kb synthetic DNA fragment was made comprising, in order, an *A. thaliana* SAG12 senescence-specific promoter, the LEC2 protein coding sequence and a *Glycine max* Lectin gene terminator/polyadenylation region. This fragment was inserted between the SacI and NotI restriction sites of pJP3303. This construct was designated pOIL049 and tested in leaves of *N. tabacum* plants which were stably transformed with genes encoding WRI1, DGAT1 and Oleosin polypeptides, containing the T-DNA from pJP3502. Using *Agrobacterium*-mediated transformation methods, the pOIL049 construct was used to transform *N. tabacum* plant cells which were homozygous for the T-DNA of pJP3502 (Example 3). Transgenic plants comprising the genes from pOIL049 were selected by hygromycin resistance and were grown to maturity in the glasshouse. Samples are taken from transgenic leaf tissue at different stages of growth including at leaf senescence and contain increased TAG levels compared to the *N. tabacum* pJP3502 parent line.

A total of 149 independent TO plants (i.e. primary transformants) were obtained. Upper green leaves of all plants and the lower brown, fully senesced leaves of selected events were sampled at the seed setting stage of plant development and TAG contents were quantified by TLC-GC. The number of pOIL49 T-DNA insertions in selected plants was determined by ddPCR using a hygromycin gene-specific primer pair. A TAG level of 30.2% on a dry weight basis was observed in green leaf tissue harvested at seed setting stage. TAG levels in brown leaves were lower in most of the plants sampled. However, three plants (#32b, #8b and #23c) displayed greater TAG levels in brown senesced leaf tissue than in the green expanding leaves. These plants contained 1, 2 or 3 T-DNA insertions from pOIL49.

T1 progeny of plants #23c and #32b were screened by ddPCR to identify nulls, heterozygous and homozygous plants for the T-DNA from pOIL049. Progeny plants of plant #23c containing zero T-DNA insertions from pOIL049 (nulls; total of 7) or two T-DNA insertions of the T-DNA from pOIL049 (homozygous; total of 4) were selected for further analysis. Similarly, progeny plants of plant #32b containing zero insertions (nulls; total of 6) or two insertions (homozygous; total of 9) were maintained for further analysis. Green leaf tissue was sampled before flowering and TFA and TAG contents were determined by GC. Wild-type plants and plants transformed with the T-DNA from pJP3502 were the same as before (Example 11) and were grown alongside in the same glasshouse. TFA levels in leaves of the transformants containing the T-DNA from pOIL049 ranged from 5.2% to 19.5% on a dry weight basis before flowering (FIG. 12). TAG levels in the same tissues ranged from 0.8% to 15.4% on a dry weight basis. This was considerably greater than in plants containing only the T-DNA from pJP3502. TAG levels in plants containing the T-DNAs from pJP3502 and pOIL049 further increased to 38.5% and 34.9% during flowering and seed setting, respectively. When the fatty acid composition of the total fatty acid content was analysed for leaves homozygous for the T-DNA from pOIL049, increased levels of C18:2 and reduced levels of C18:3 were observed (FIG. 12) while the percentages of C16:0 and C18:1 remained about the same relative to leaves transformed only with the T-DNA from pJP3502. These data demonstrated that the addition of a second transcription factor gene under the control of a non-constitutive promoter to provide developmentally-regulated expression was able to further increase TAG levels in vegetative tissues of a plant. The data also indicated that the senescence-specific promoter SAG12 had some expression in the green tissue prior to senescence of the leaves.

TAG levels were much increased in stem tissue when compared to both wild-type *N. tabacum* plants and transgenic plants containing the T-DNA from pJP3502 alone. Some stem tissues of the transgenic *N. tabacum* plants transformed with the T-DNA from pOIL049 contained 4.9% TAG on a dry weight basis (FIG. 11). On the other hand, TAG levels in root tissue exhibited large variation between the three pOIL049 plants with some root tissuest containing 3.4% TAG. Of note, TAG levels in roots were lower compared to stem tissue within the same plant while an inverse trend was observed in wild-type plants and *N. tabacum* containing only the T-DNA from pJP3502. The TAG composition of root and stem tissues exhibited similar changes in C18:1 and C18:3 fatty acids as observed previously in transgenic leaf tissue. C18:2 levels in TAG were reduced in transgenic stem tissue while C16 fatty acids were typically reduced in transgenic root tissues when compared to the wild-type control.

Corresponding genetic constructs are made encoding other transcription factors under the control of the SAG12 promoter, namely LEC1, LEC1like, FUS3, ABI3, ABI4 and ABI5 and others (Example 10). For example, additional constructs were made for the expression of the monocot transcription factor *Zea mays* LEC1 (Shen et al., 2010) or *Sorghum bicolor* LEC1 (Genbank Accession No. XM_002452582.1) under the control of monocot-derived homolog of the *A. thaliana* SAG12 promoter such as the maize SEE1 promoter (Robson et al., 2004). Further constructs are made for expression of the transcription factors under developmentally controlled promoters, for example which are preferentially expressed at flowering (e.g. day length sensitive promoters), Phytochrome promoters, Chryptochrome promoters, or in plant stems during secondary growth such as a promoter from a CesA gene. These constructs are used to transform plants, and plants which produce at least 8% TAG in vegetative parts are selected.

Starch and Sugar Levels

Starch and soluble sugar levels were measured in leaf tissue sampled from wild-type and transgenic plants containing the T-DNA from pJP3502, or the T-DNAs from both pJP3502 and pOIL51 or pJP3502 and pOIL049. In general, an inverse correlation was found between TAG and starch levels in leaf tissue on a dry weight basis in the leaves having both T-DNAs (FIG. 13). In contrast, leaf soluble sugars levels were about the same in the transgenic plants relative to the wild-type, suggesting that there was no significant bottleneck in the conversion from sugars to TAG. An effect of the leaf position in the plant was observed in wild-type plants where starch levels tended to increase from lower leaf to higher leaf position. No such effect was detected in the transgenic plants.

Example 13. Stem-Specific Expression of a Gene Encoding a Transcription Factor

Leaves of *N. tabacum* plants expressing transgenes encoding WRI1, DGAT and Oleosin contain about 16% TAG at seed setting stage of development. However, the TAG levels were much lower in stems (1%) and roots (1.4%) of the plants (Vanhercke et al., 2014). The inventors considered whether the lower TAG levels in stems and roots were due to poor promoter activity of the Rubisco SSU promoter used to express the gene encoding WRI1 in the transgenic plants. The DGAT transgene in the T-DNA of pJP3502 was expressed by the CaMV35S promoter which is expressed more strongly in stems and roots and therefore was unlikely to be the limiting factor for TAG accumulation in stems and roots.

In an attempt to increase TAG biosynthesis in stem tissue, a construct was designed in which the gene encoding WRI1 was placed under the control of an *A. thaliana* SDP1 promoter. A 3.156 kb synthetic DNA fragment was synthesized comprising 1.5 kb of the *A. thaliana* SDP1 promoter (SEQ ID NO: 175) (Kelly et al., 2013), followed by the coding region for the *A. thaliana* WRI1 polypeptide and the *G. max* lectin terminator/polyadenylation region. This fragment was inserted between the SacI and NotI sites of pJP3303. The resulting vector was designated pOIL050, which was then used to transform cells from the *N. tabacum* plants homozygous for the T-DNA from pJP3502 by *Agrobacterium*-mediated transformation. Transgenic plants were selected for hygromycin resistance and a total of 86 independent transgenic plants were grown to maturity in the glasshouse. Samples were taken from transgenic leaf and stem tissue at seed setting stage and contain increased TAG levels compared to the *N. tabacum* parental plants transformed with pJP3502.

Example 14. Increasing Oil Content in Seeds

Several groups have reported increased TAG levels in seed tissue of maize, canola or *Arabidopsis thaliana* upon over-expression of individual genes encoding WRI1 and DGAT1 (Shen et al., 2010; Liu et al., 2010; Weselake et al., 2008; Jako et al., 2001; reviewed in Liu et al., 2012). Recently, van Erp et al. (2014) explored the effect of WRI1 and DGAT1 co-expression on seed oil content in *A. thaliana*. Absolute TAG levels increased from 38% in the wild type and empty vector control to 44% in transgenic lines. Silencing of the SDP1 TAG lipase in combination with WRI1 and DGAT1 over-expression further increased TAG levels up to 45%. Of note, while average seed weight was found to be increased, the number of seeds per plant was lower compared to control plants.

A synthetic DNA fragment of about 14.3 kb in length and containing the open reading frames coding for the *M. musculus* MGAT2, *A. thaliana* DGAT1, *A. thaliana* WRI1 and *A. thaliana* GPAT4 polypeptides under the control of the seed specific promoters from genes encoding FAE1, Conlinin1 and Conlinin2 was synthesized and inserted as a NotI-PstI fragment into pJP3416. The resulting vector was designated pTV55 (FIG. 14). A series of derived vectors were constructed from pTV55 by sequential removal of individual expression cassettes, each step using restriction enzyme digestion followed by self ligation. The GPAT4 cassette was deleted by PacI digestion, resulting in pTV56. A subsequent digest with SrfI removed the MGAT2 expression cassette, yielding pTV57. The WRI1 cassette was deleted using the flanking SbfI restrictions sites, resulting in pTV58. Finally, the DGAT1 cassette in pTV58 was exchanged for the WRI1 cassette by digestion with SrfI and PacI, followed by T4 DNA polymerase treatment and ligation. The WRI1 cassette was excised from pTV57 using SbfI and treated with T4 polymerase. Ligation of the blunt end WRI cassette into the SrfI-PacI digested pTV58 backbone yielded pTV59. Each vector contained the e35S (containing dual enhancer region)::PAT gene as selectable marker gene, providing resistance to BASTA.

In summary, the constructs contained the following combinations of genes:

pTV55: ProCnl1::MGAT2+ProCnl2::DGAT1+ProCnl1::GPAT4+ProFAE1::WRI1;
pTV56: ProCnl1::MGAT2+ProCnl2::DGAT1+ProFAE1::WRI1;
pTV57: ProCnl2::DGAT1+ProFAE1::WRI1;
pTV58; ProCnl2::DGAT1;
pTV59: ProFAE1::WRI1.

The constructs pTV55-pTV59 were introduced separately into *A. tumefaciens* strain AGL1 and used to transform *C. sativa* (cv. Celine) by a floral dip method adapted from Liu et al (2012). Briefly, the freshly opened flower buds were dipped in *A. tumefaciens* solution for 15 sec, wrapped in plastic film and left overnight in the dark at 24° C. after which the plastic was removed. A total of 3-4 floral dips were performed based on the quality of the flowers available. Plants were grown to maturity and T1 seed were harvested. Following germination of the T1 seed in soil, established T1 seedlings (7-10 days) were sprayed with 0.1% BASTA herbicide (250 g/L glufosinate ammonium; Bayer Crop Science Pty Ltd, VIC Australia) to select for plants expressing the PAT selectable marker gene. Surviving seedlings were separated and transferred to fresh soil pots and grown until maturity in the glasshouse at 22±1° C. (day) and 18±1° C. (night). T2 seeds were harvested and the oil content (which is at least 95% TAG) of 3 independent batches of 50 mg seed of each line was measured by NMR (MQC, Oxford Instruments). Calibration samples were prepared with dried Kimwipes papers containing known amounts of *C. sativa* seed oil in 10 mm diameter NMR test tubes, to generate a range of oil content based on the weights of paper and oil. The calibration samples were sealed with parafilm, and maintained at 40° C. heating block minimal 1 hour before using to allow for the oil to distribute uniformly in the tissue. The calibration samples were measured three times with a 0.55 Tesla magnet and 10 mm diameter probe operating at a proton resonance frequency of 23.4 MHz for 16 seconds. Magnet temperature was maintained at 40° C. Seeds samples were first dried in a 105° C. oven overnight to ensure the moisture content was less than 5%. Samples were subsequently weighed, transferred to a 10 mm diameter glass tube and incubated at 40° C. for 1 hr prior to NMR analysis. The oil content was measured in triplicate by NMR against the calibration, based on the mass weight.

Copy number of the T-DNA(s) inserted in each transformed line was determined by digital PCR (dPCR). Genomic DNA was first digested with EcoRI and BamHI to ensure physical separation of T-DNAs in case of multiple insertions. The *C. sativa* LEAFY gene (lfy) was chosen as a reference gene and the selectable marker as the target gene in a dPCR multiplex reaction. Probes were labelled with either HEX (reference gene) or FAM (target gene). The amplification reaction conditions were as follows: 95° C. for 10 min (ramping of 2.5° C./s), 39 cycles of 94° C. for 30 s (ramping 2.5° C./s) and 61° C. for 1 min (ramping 2.5° C./s), 98° C. for 10 min. After PCR amplification, fluorescence of individual droplets was measured in a QX100 droplet reader (BioRad) and the copy number was calculated using the QuantaSoft software (version 1.3.2.0, BioRad).

Transformation of *C. sativa* yielded multiple transgenic events exhibiting increased TAG levels in segregating T2 seeds compared to the untransformed wild type control (FIG. 15). Interestingly, the highest TAG levels were obtained with pTV57 which contains the genes coding for WRI1 and DGAT1. The additional insertion of MGAT2 (pTV56) and MGAT2+GPAT4 (pTV55) resulted in slightly lower TAG levels compared to pTV55. Copy number determination revealed 1 or 2 T-DNA insertions for the pTV57 lines displaying the second highest and highest seed oil content, respectively (Table 14).

Homozygous T2 plants transformed with the T-DNA from pTV057 were also crossed with *C. sativa* plants transformed with genes for expression of the fatty acid desaturases and elongases required for the synthesis and accumulation of DHA in seed (WO2013/185184). F1 seeds showed increased oil content as measured by NMR compared to the ('. *sativa* seeds transformed with the DHA construct and without the T-DNA of pTV57. The DHA content in the seeds is determined by measuring the levels of DHA in the TAG fraction compared to the *C. sativa* DHA parent plant. The total DHA content of the seeds (mg DHA/g of seeds) containing both T-DNAs is increased relative to the total DHA content of the seeds containing only the DHA construct.

TABLE 14

Oil content (%) in T2 seed and copy number (by digital PCR) of *C. sativa* pTV57 transgenic events.

| pTV57 line | Seed oil (%) | Copy number |
|---|---|---|
| CMD29-1 | 36.97 | ? |
| CMD29-2 | 36.69 | ? |
| CMD29-3 | 35.16 | 1.02 |
| CMD29-4 | 28.47 | 6.6 |
| CMD29-5 | 40.60 | 2 |
| CMD29-6 | 37.86 | 4.68 |
| CMD29-7 | 39.17 | 2.94 |
| CMD29-8 | 39.88 | 0.947 |
| CMD29-9 | 36.70 | 1.04 |
| CMD29-10 | 37.19 | 0.935 |
| CMD29-11 | 31.20 | 14.3 |
| CMD29-20 | 33.08 | 6 |

Example 15. Effect of Oil Body Protein Expression on TAG Accumulation and Turnover

*N. tabacum* plants transformed with the T-DNA of pJP3502 and expressing transgenes encoding *A. thaliana* WRI1, DGAT1 and *S. indicum* Oleosin had increased TAG levels in vegetative tissues. As shown in Example 11 above, when the endogenous gene encoding SDP1 TAG lipase was silenced in those plants, the leaf TAG levels further increased, which indicated to the inventors that substantial TAG turnover was occurring in the plants that retained SDP1 activity. Therefore, the level of expression of the transgenes in the plants was determined. While Northern hybridisation blotting confirmed strong WRI1 and DGAT1 expression and some oleosin mRNA expression, expression analysis by digital PCR and qRT-PCR detected only very low levels of oleosin transcripts. The expression analysis revealed that the gene encoding the Oleosin was poorly expressed compared to the WRI1 and DGAT1 transgenes. From these experiments, the inventors concluded that the oil bodies in the leaf tissue were not completely protected from TAG breakdown because of inadequate production of Oleosin protein when encoded by the T-DNA in pJP3502. To improve stable accumulation of TAG throughout plant development, several pJP3502 modifications were designed in which the Oleosin gene was substituted. These modified constructs were as follows.

1. pJP3502 contains a gene (SEQ ID NO:176 provides the sequence of its complement) encoding the *S. indicum* oleosin which was poorly expressed. That gene has an internal UBQ10 intron which might be reducing the expression level. To test this, a 502 bp synthetic DNA fragment containing the *S. indicum* oleosin gene and lacking the internal UBQ10 intron was synthesized and inserted into pJP3502 as a NotI fragment, to substitute the oleosin gene containing the intron in pJP3502. The resultant plasmid was designated pOIL040.
2. The Rubisco small subunit (SSU) promoter driving expression of the oleosin gene in pJP3502 was replaced by the constitutive enTCUP2 promoter. To this end, a 2321 bp fragment containing the enTCUP2 promoter, Oleosin protein coding region, *G. max* lectin terminator/polyadenylation region and the first 643 bp of the downstream SSU promoter driving wri1 expression was synthesized and subcloned into the AscI and SpeI sites of pJP3502 resulting in pOIL038.
3. A similar strategy was followed for the expression of an engineered version of the *S. indicum* oleosin gene containing 6 introduced cysteine residues (03-3) under the control of the enTCUP2 promoter (Winichayakul et al., 2013). A 2298 bp fragment containing the enTCUP2 promoter, Oleosin 03-3 protein coding region, *G. max* lectin terminator/polyadenylation region and the first 643 bp of the downstream SSU promoter driving wriI expression was synthesized and subcloned into the AscI and SpeI sites of pJP3502 resulting in pOIL037.
4. The NotI sites flanking the *S. indicum* oleosin gene in pJP3502 were used to exchange the protein coding region for one encoding peanut Oleosin3 (Accession No. AAU21501.1) (Parthibane et al., 2012a; Parthibane et al., 2012b). A 528 bp fragment containing the oleosin3 gene, flanked by NotI sites, was synthesized and subcloned into the respective site of pJP3502. The resulting vector was designated pOIL041.
5. Similarly, a 1077 bp NotI flanked fragment containing the gene coding for the *A. thaliana* steroleosin (Arab-1) (Accession No. AAM10215.1) (Jolivet et al., 2014) was synthesized and subcloned into the NotI site of pJP3502, resulting in pOIL043.
6. The *Nannochloropsis* oceanic lipid droplet surface protein (LDSP) (Accession No. AFB75402.1) (Vieler et al., 2012) was synthesized as a 504 bp NotI-flanked fragment and subcloned into the NotI site of pJP3502, yielding pOIL044.
7. Finally, the *A. thaliana* caleosin (CLO3) (Accession No. 022788.1) (Shimada et al., 2014) was synthesized as a 612 bp NotI flanked fragment and subcloned into pJP3502, resulting in pOIL042.

Each of these constructs was introduced into *N. benthamiana* leaf cells as described in Example 1. Transient expression of both pJP3502 and pOIL040 in *N. benthamiana* leaf tissue resulted in elevated TAG levels and similar changes in the TAG fatty acid profile but pOIL040 increased the TAG level more (1.3% compared to 0.9%). Each of the constructs pOIL037, pOIL038, pOIL041, pOIL042 and pOIL043 were used to stably transform *N. tabacum* plants (cultivar W38) by *Agrobacterium*-mediated methods. Transgenic plants were selected on the basis of kanamycin resistance and are grown to maturity in the glasshouse. Samples are taken from transgenic leaf tissue at different stages during plant development and contain increased TAG levels compared to wild-type *N. tabacum* and *N. tabacum* plants transformed with pJP3502.

Cloning and Characterisation of LDAP Polypeptides from *Sapium sebifera*

Oleosins are not highly expressed in non-seed oil accumulating plant tissues such as the mesocarp of olive, oil palm, and avocado (Murphy, 2012). Instead, lipid droplet associated proteins (LDAP) have been identified in these tissues that may play a similar role to that of oleosin in seed tissues (Horn et al., 2013). The inventors therefore considered it possible that oleosin might not be the optimal packaging protein to protect the accumulated oil from TAG lipase or other cytosolic enzyme activities in vegetative tissues of plants. LDAP polypeptides were therefore identified and evaluated for enhancement of TAG accumulation, as follows.

The fruit of Chinese tallow tree, *Sapium sebifera*, a member of the family Euphorbiaceae, was of particular interest to the inventors as it contains an oil-rich tissue outside of the seed. A recent study (Divi et al, submitted for publication) indicated that this oleoginous tissue, called a tallow layer, might be derived from the mesocarp of its fruit. Therefore, the inventors queried the transcriptome of *S. sebifera* for LDAP sequences. A comparative analysis of expressed genes in the fruit coat and seed tissues revealed a group of three previously unidentified LDAP genes which were highly expressed in the tallow layer.

Nucleotide sequences encoding the three LDAPs were obtained by RT-PCR using RNAs derived from tallow tissue using three pairs of primers. The primer sequences were based on the DNA sequences flanking the entire coding region of each of the three genes. The primer sequences were: for LDAP1, 5'-TTTTAACGATATCCGCTAAAGG-3' (SEQ ID NO: 245) and 5'-AATGAATGAACAAGAATTAAGTC-3' (SEQ ID NO: 246) AT-3'; LDAP2, 5'-CTTTTCTCACACCGTATCTCCG-3' (SEQ ID NO: 247) and 5'-AGCATGATATA CTTGTCGAGAAAGC-3' (SEQ ID NO: 248); LDAP3, 5'-GCGACAGTGTAGCGTTTT-3' (SEQ ID NO: 249) and 5'-ATACATAAAATGAAAACTATTGTGC-3' (SEQ ID NO: 250).

Analysis of the *S. sebifera* transcriptome revealed multiple orthologs for each of the LDAP genes, including eight LDAP1, six LDAP2, and six LDAP3 genes, with less than 10% sequence divergence within each gene family. The putative peptide sequences were aligned and a phylogenetic tree was constructed using Genious software (FIG. 16), together with LDAPs homologs from other plant species, including two from avocado (Pam), one from oil palm, one from *Parthenium argentatum* (Par), two from *Arabidopsis* (Ath), five from *Taraxacum brevicorniculatum* (Tbr), three from *Hevea brasiliensis* (Hbr), as presented in FIG. 16. The phylogenetic tree was revealed that the SsLDAP3 shared greater amino acid sequence identity to the LDAP1 and LDAP2 polypeptides from avocado and the LDAP from oil palm, while the SsLDAP1 and SsLDAP2 polypeptides were more divergent.

Genetic Constructs for Over-Expression of LDAP

In order to test the function of the LDAPs from *S. sebifera*, expression vectors were made to express each of these polypeptides under the control of the 35S promoter in leaf cells. The full length SsLDAP cDNA sequences were inserted into the pDONR207 destination vector by recombination reactions, replacing the CcdB and Cm(R) regions of the destination vector with the SsLDAP cDNA fragments. Following confirmation by restriction digestion analysis and DNA sequencing, the constructs were introduced into *Agrobacterium tumefaciens* strain AGL1 and used for both transient expression in *N. benthamiana* leaf cells and stable transformation of *N. tabacum*.

The expression of each of the three SsLDAP genes under the transcriptional control of the 35S promoter in *N. benthamiana* leaves in combination with the expression of 35S::AtDGAT1 and 35S::AtWRI1 yielded substantially higher levels of TAG accumulation relative to the cells infiltrated with the 35S::AtDGAT1 and 35S::AtWRI1 genes without the LDAP construct. The TAG level was increased about 2-fold above the TAG level in the control cells. A significant increase in the level of α-linolenic acid (ALA) and a reduced level of saturated fatty acids was observed in the cells receiving the combination of genes, relative to the control cells.

Co-Localisation of YFP-Fused LDAP Polypeptides with Lipid Droplets in Leaf Cells In order to characterise SsLDAPs in vivo and observe their dynamic behaviour, expression constructs were made for expression of fusion polypeptides consisting of the LDAP polypeptides fused to yellow fluorescent protein (YFP). For each fusion polypeptide, the YFP was fused in-frame to the C-terminus of the SsLDAP. The full open reading frame of each of the three LDAP genes without a stop codon, at its 3' end, was fused to the YFP sequence and the chimeric genes inserted into pDONR207. Following confirmation of the resultant constructs by restriction digestion and DNA sequencing, the constructs were introduced into *A. tumefaciens* strain AGL1 and used for both transient expression in *N. benthamiana* leaf cells and stable transformation of *N. tabacum*. Three days following infiltration of the leaf cells with the LDAP-YFP constructs, leaf discs from the infiltrated zones were stained with Nile Red, which positively stained lipid droplets, and observed under a confocal microscope to detect both the red stain (lipid droplets) and fluorescence from the YFP polypeptide. Co-localisation of LDAP-YFP with the lipid droplets was observed, indicating that the LDAP associated with the lipid droplets in the leaf cells.

Example 16. Modification of Fatty Acids in Different Lipid Pools in Leaves Accumulating High Levels of TAG The inventors have described the production of increased levels of TAG in *N. tabacum* leaves by co-expression of transgenes encoding *A. thaliana* WRI1, *A. thaliana* DGAT1 and *S. indicum* Oleosin (Vanhercke et al, 2014). To explore if fatty acid modifications in different lipid pools that exist in leaves were possible with co-expression of the WRI1 and DGAT1 gene combination, transient expression experiments were carried out to see if fatty acids in the acyl-CoA and acyl-PC pools could occur. In one experiment, expression of a transgene encoding *A. thaliana* fatty acid elongase (AtFae1) which elongates C18:1-CoA to C20:1-CoA was combined with genes encoding WRI1 and DGAT to test modification in the acyl-CoA pool. In a second experiment, a transgene encoding *A. thaliana* fatty acid desaturase 2 (AtFAD2) which desaturates C18:1-PC to C18:2-PC was combined with the WRI1 and DGAT genes to test modification in the PC pool. These experiments were designed to test the availability of the acyl substrates in the ER of the plant cells.

The gene encoding AtFAE1 was expressed from a CaMV35S promoter in *N. benthamiana* leaves separately or in combination with WRI1 and DGAT1 as described in Example 1, in triplicate. Leaf samples were harvested 5 days after infiltration with the *Agrobacterium* cells comprising the different gene combinations. Total lipid was extracted from the leaf samples and the TAG fraction was separated from each by TLC. The fatty acid composition of each TAG fraction was determined and quantified with GC using a known amount of C17:0-TAG as an internal standard. As shown in Table 15, the C20:1 proportion in TAG was significantly increased when AtAFE1 was expressed. Co-expressing WRI1 and DGAT1 with AtFAE1 also increased the level of C20:1 product compared to the control, while the total TAG amount was increased from 0.8 to 14.9 μg/mg leaf. The C20:1 product in TAG accumulated as high as 0.96 μg per mg, compared to 0.04 μg per mg without the WRI1 and DGAT1 combination.

TABLE 15

Modified fatty acid levels after transgenic expression of modifying enzymes in *N. benthamiana* leaves.

| Sample | C18:1 (%) | C20:1 (%) | TAG (μg/mg dw) | C20:1 (μg/mg dw) |
|---|---|---|---|---|
| Control | 6.9 ± 1.5 | 0.4 ± 0.4 | 0.4 ± 0.3 | 0.01 |
| WRI1 + DGAT1 | 17.1 ± 1.0 | 0.4 ± 0.2 | 16.3 ± 2.1 | 0.06 |
| AtFAE1 | 7.0 ± 3.0 | 4.7 ± 3.1 | 0.8 ± 0.8 | 0.04 |
| WRI1 + DGAT1 + AtFAE1 | 15.3 ± 0.5 | 6.4 ± 0.2 | 14.9 ± 2.5 | 0.96 |

Similarly, AtFAD2 was co-expressed from the CaMV35S promoter in *N. benthamiana* leaves separately or in combination with WRI1 and DGAT1. The fatty acid composition of the TAG fraction was determined and quantified as above. The level of C18:2 fatty acid in TAG was significantly increased when AtFAD2 was co-expressed with WRI1 and DGAT1, from 10.7% to 37.9%, and the level of C18:1 decreased from 19.5% to 7.6%. In addition, substantial levels of TAG (13.4 μg/mg leaf) were observed when WRI+DGAT1+AtFAD2 were co-expressed in the leaves. These results clearly demonstrated that the fatty acid composition and amount could be modified by addition of fatty acid modification enzymes in combination with at least WRI1 and DGAT, and therefore could be used for increased accumulation of modified fatty acid products generated in either or both of the acyl-CoA and PC pools, and eventually stored in TAG in the vegetative plant parts.

Example 17. Silencing of TGD Genes in Plants

Li-Beisson et al. (2013) estimated that in *Arabidopsis* leaves (a 16:3 plant), approximately 40% of the fatty acids synthesized in chloroplasts enter the prokaryotic pathway, whereas 60% were exported to enter the eukaryotic pathway. After they were desaturated in the ER, about half of these exported fatty acids are returned to the plastid to support galactolipid synthesis for thylakoid membranes. The transport (import) of the fatty acids as DAG or phospholipids into the plastid involves TGD1, a permease-like protein of the inner chloroplast envelope. The *Arabidopsis* ABC lipid transporter comprising TGD1, 2, and 3 proteins was identified by Benning et al. (2008 and 2009) and more recently by Roston et al. (2012). This protein complex is localized in the inner chloroplast envelope membrane and is proposed to mediate the transfer of phosphatidate across this membrane. TGD2 polypeptide is a phosphatidic-binding protein, and TGD3 an ATPase. A novel *Arabidopsis* protein, TGD4, was identified by a genetic approach (Xu et al., 2008) and inactivation of the TGD4 gene also blocked lipid transfer from the ER to plastids. Recent biochemical data indicate that TGD4 is phosphatidate binding protein residing in the outer chloroplast envelope membrane (Wang and Benning, 2012).

Xu et al. (2005) described leaky tgd1 alleles in *A. thaliana* resulting in reduced plant growth and high occurrence of embryo abortion. Leaf tissue of *A. thaliana* tgd1 mutants contained increased TAG levels, likely as cytosol oil droplets. In addition, elevated TAG levels were also found in roots of tgd1 mutants. No difference in seed oil content was detected. Similar TAG accumulation in leaf tissue has been reported for *A. thaliana* tgd2 (Awai et al., 2006), tgd3 (Lu et al., 2007) and tgd4 mutants (Xu et al., 2008). All tgd mutant alleles were either sufficiently leaky or severely impairing in plant development.

TGD1 Silencing

A silencing construct directed against the TGD1 plastidial importer was generated based on a full length mRNA transcript identified in the *N. benthamiana* transcriptome. A 685 bp fragment was amplified from *N. benthamiana* leaf cDNA while incorporating a PmlI site at the 5' end. The TGD1 fragment was first cloned into pENTR/D-TOPO (Invitrogen) and subsequently inserted into the pHELLSGATE12 destination vector via LR cloning (Gateway). The resulting expression vector was designated pOIL025 and is transiently expressed in *N. benthamiana* to assess the effect of TGD1 gene silencing on leaf TAG levels. The TGD1 hairpin construct is placed under the control of the *A. niger* inducible alcA promotor by subcloning as a PmlI-EcoRV fragment into the NheI (klenow)-SfoI sites of pOIL020 (below). The resulting vector, designated pOIL026, is supertransformed into a homozygous *N. tabacum* pJP3502 line to further increase leaf oil levels.

Further constructs are made for expressing hairpin RNA for reducing expression of the TGD-2, -3 and -4 genes. Transformed plants are produced using these constructs and oil content determined in the transformants. The transformed plants are crossed with the transformants generated with pJP3502 or other combinations of genes as described above.

Example 18. Expression of Gene Combinations in Potato Tubers

Construction of pJP3506

A genetic construct containing three genes for expression in potato tubers was made and used for potato transformation. This construct was designated as pJP3506 and was based on an existing vector pJP3502 (WO2013/096993) with replacement of promoters to provide for tuber-specific expression. pJP3506 contained (i) an NPTII kanamycin resistance gene driven by 35S promoter with duplicated enhancer region (e35S) as the selectable marker gene and three gene expression cassettes, which were (ii) 35S::AtDGAT1 encoding the *Arabidopsis thaliana* DGAT1, (iii) B33::AtWRI1 encoding the *Arabidopsis thaliana* WRI1, and (iv) B33::sesame oleosin, encoding the oleosin from *Sesame indicum*. The nucleotide sequences encoding these polypeptides were as in pJP3502. The patatin B33 promoter (B33) was a tuber specific promoter derived from *Solanum*

*tuberosum*, which was provided by Dr Alisdair Fernie, Max Planck Institute of Molecular Plant Physiology, Potsdam, Germany. A circular plasmid map of pJP3506 is presented in FIG. 17.

The *S. tuberosum* Patatin B33 promoter sequence used in the pJP3506 construct was a truncated version having 183 nucleotides deleted from the 5' end and 261 nucleotides deleted from the 3' end relative to GenBank Accession No. X14483. The nucleotide sequence of the patatin B33 promoter as used in pJP3506 is given as SEQ ID NO: 211.

Transformation of Potato

Potato seedlings (*Solanum tuberosum*) of cultivar Atlantic which had been grown asceptically in tissue culture were purchased from Toolangi Elite, Victorian Certified Seed Potato Authority (ViCSPA), Victoria, Australia. Stem internodes were excised into pieces of approximately 1 cm in length under a suspension of *Agrobacterium tumefaciens* strain LBA4404 containing pJP3506. The *Agrobacterium* cells had been grown to an OD of 0.2 and diluted with an equal volume MS medium. Excess *Agrobacterium* suspension was removed by brief blotting the stem pieces on sterile filter paper, which were then plated onto MS medium and maintained at 24° C. for two days (co-cultivation). The internodes were then transferred onto fresh MS medium supplemented with 200 μg/L NAA, 2 mg/L BAP and 250 mg/L Cefetaxime. Selection of transgenic calli was initiated 10 days later when the internodes were transferred onto fresh MS medium supplemented with 2 mg/L BAP, 5 mg/L GA3, 50 mg/L kanamycin and 250 mg/L Cefetaxime. Shoots regenerated from calli were excised and placed onto plain MS medium for root induction prior to transplanting into a 15 cm diameter pot containing potting mix and grown in the greenhouse until plant maturity including tuber growth.

DNA Extraction and Molecular Identification of the Transgenic Plants by PCR

Disks of about 1 cm in diameter were obtained from potato leaves from the plants in the greenhouse. These were placed in a deep-well microtiter plate and freeze dried for 48 hr. The freeze dried leaf samples were then ground into powder by adding a steel ball bearing to each well and shaking the plate in a Reicht tissue lyser (Qiagen) at a maximum frequency of 28/sec for 2 min each side of the microtiter plate. 375 μL of extraction buffer containing 0.1 M Tris-HCl pH8.0, 0.05 M EDTA and 1.25% SDS was added to each well containing the powdered leaf tissue. Following 1 hr incubation at 65° C., 187 μL of 6M ammonium acetate was added to each well and the mixtures stored at 4° ° C. for 30 min prior to centrifugation of the plates for 30 min at 3000 rpm. 340 μL supernatant from each well was transferred into a new deep well microtiter plate containing 220 μL isopropanol and maintained for 5 min at room temperature prior to centrifugation at 3000 rpm for 30 min. The precipitated DNA pellets were washed with 70% ethanol, air dried and resuspended in 225 μL $H_2O$ per sample.

Two μL from each leaf sample DNA preparation was added to a 20 μL PCR reaction mix using the HotStar PCR system (Qiagen). A pair of oligonucleotide primers based on 5' and 3' sequences from the *Arabidopsis thaliana* WRI1 gene, codon-optimized for tobacco, was used in the PCR reactions. Their sequences were: Nt-Wri-P3: 5'-CACTCGTGCTTTCCATCATC-3' (SEQ ID NO: 212) and Nt-Wri-P1: 5'-GAAGGCTGAGCAACAAGAGG-3' (SEQ ID NO: 213). A pair of oligonucleotide primers based on the *Arabidopsis thaliana* DGAT1 gene, codon-optimized for tobacco, was also used in a separate PCR reaction on each DNA sample. Their sequences were: Nt-DGAT-P2: 5'-GGCGATTTTGGATTCTGC-3' (SEQ ID NO: 214) and Nt-DGAT-P3: 5'-CCCAACCCTTCCGTATACAT-3' (SEQ ID NO: 215). Amplification was carried out with an initial cycle at 95° C. for 15 min, followed by 40 cycles of 95° C. for 30 sec, 57° C. for 30 sec and 72° C. for 60 sec. The PCR products were electrophoresed on a 1% agarose gel to detect specific amplification products.

Lipid Analysis of Potato Tubers

Thin slices of tubers harvested from regenerated potato plants, for confirmed transgenic plants and non-transformed controls, were freeze-dried for 72 hr and analysed for lipid content and composition. Total lipids were extracted from the dried tuber tissues using chloroform:methanol: 0.1 M KCl (2:1:1 v/v/v) as follows. The freeze-dried tuber tissues were first homogenized in chloroform:methanol (2:1, v/v) in an eppendorf tube containing a metallic ball using a Reicht tissue lyser (Qiagen) for 3 min at a frequency of 29 per sec. After mixing each homogenate with a Vibramax 10 (Heidolph) at 2,000 rpm for 15 min, 1/3 volume of 0.1 M KCl solution was added to each sample and mixed further. Following centrifugation at 10,000 g for 5 min, the lower phase containing lipids from each sample was collected and evaporated completely using $N_2$ flow. Each lipid preparation was dissolved in 3 μL of $CHCl_3$ per milligram of tuber dry weight. Aliquots of the lipid preparations were loaded on a thin layer chromatography (TLC) plate (20 cm×20 cm, Silica gel 60, Merck) and developed in hexane:diethyl ether:acetic acid (70:30:1, v/v/v). The TLC plate was sprayed with Primuline and visualized under UV to show lipid spots. TAG and PL were recovered by scraping the silica of the appropriate bands and converted to fatty acid methyl esters (FAME) by incubating the material in 1 N methanolic-HCl (Supelco, Bellefonte, PA) at 80° C. for 2 hr together with known amount of Triheptadecanoin (Nu-Chek PREP, Inc. USA) as internal standard for lipid quantification. FAME were analysed by GC-FID (7890A GC, Agilent Technologies, Palo Alto, CA) equipped with a 30 m BPX70 column (0.25 mm inner diameter, 0.25 mm film thickness, SGE, Austin, USA) as described previously (Petrie et al., 2012). Peaks were integrated with Agilent Technologies ChemStation software (Rev B.04.03).

Among the approximately 100 individual transgenic lines regenerated, analysis of lipids derived from young potato tubers of about 2 cm in diameter revealed increased levels in total lipids, TAG and phospholipids fractions in tubers from many of the transgenic plants, with a range observed between no increase to substantial increases. The first analysis of the potato tuber lipids indicated that a typical wild-type potato tuber at its early stage of development (about 2 cm in diameter) contained about the 0.03% TAG on dry weight basis.

The content of total lipids was increased to 0.5-4.7% by weight (dry weight) in tubers of 21 individual transgenic plants, representing 16 independently transformed lines (Table 16). Tubers of line #69 showed the highest TAG accumulation at an average 3.3% on dry weight basis. This was approximately a 100-fold increase relative to the wild-type tubers at the same developmental stage. Tubers of the same transgenic line also accumulated the highest observed levels of phospholipids at 1.0% by weight in the young tubers on a dry weight basis (Table 18). The enhanced lipid accumulation was also accompanied by an altered fatty acid composition in transgenic tubers. The transgenic tubers consistently accumulated higher percentages of saturated and monounsaturated fatty acids (MUFA) and lower level of polyunsaturated fatty acids (PUFA) in both the total fatty acid content and in the TAG fraction of the total fatty acid content (Table 17), particularly a reduced level of 18:3

(ALA) which was reduced from about 17% in the wild-type to less than 10% in the transgenic tubers. The level of oleic acid (18:1) in the total fatty acid content increased from about 1% in the wild-type to more than 5% in many of the lines and more than 15% in some of the tubers. Although palmitic acid levels were increased, the stearic acid (18:0) levels decreased in the best transgenic lines (Tables 16 and 17).

The transgenic potato plants were maintained in the glasshouse to allow for continued growth of the tubers. Larger tubers of line #69 contained greater levels of TFA and TAG than the tubers of about 2 cm in diameter.

Further increased levels of TFA and TAG are obtained in potato tubers by addition of a chimeric gene that encodes a silencing RNA for down-regulating the expression of the endogenous SDP1 gene, in combination with the WRI1 and DGAT genes.

Further Gene Combinations for Transformation of Potato

Total RNA from fresh developing potato (*Solanum tuberosum* L. cv. Atlantic) tubers was extracted by the TRIzol method (Invitrogen). Selected regions of the cDNAs encoding potato AGPase small subunit and SDP1 were obtained through RT-PCR using the following primers: st-AGPs1: 5'-ACAGACATGTCTAGACCCAGATG-3' (SEQ ID NO: 251), st-AGPa1: 5'-CACTCTCATCC-CAAGTGAAGTTGC-3' (SEQ ID NO: 252); st-SDP1-s1: 5'-CTGAGATGGAAGTGAAGCACAGATG-3' (SEQ ID NO: 253), and st-SDP1-a1: 5'-CCATTGT-TAGTCCTTTCAGTC-3' (SEQ ID NO: 254). The PCR products were then purified and ligated to pGEMT Easy.

TABLE 16

Total lipid yield (% weight of potato tuber dry weight) and its fatty acid composition in representative young potato tubers transformed with the T-DNA of pJP3506, prior to flowering of the plants. Tubers of line 65 were equivalent to the wild-type (non-transgenic) tubers.

| Sample | C14:0 | C16:0 | C16:1 | C16:3 | C18:0 | C18:1 | C18:1d11 | C18:2 | C18:3 | C20:0 | C20:1 | C22:0 | C24:0 | % TFA |
|---|---|---|---|---|---|---|---|---|---|---|---|---|---|---|
| 4-2 | 0.2 | 16.1 | 0.2 | 0.0 | 5.8 | 0.5 | 11.7 | 55.5 | 5.5 | 2.1 | 0.2 | 0.6 | 1.5 | 1.4 |
| 19 | 0.2 | 18.1 | 0.2 | 0.0 | 5.8 | 0.4 | 12.9 | 52.2 | 5.9 | 2.0 | 0.2 | 0.7 | 1.5 | 1.5 |
| 27-2 | 0.2 | 18.9 | 0.3 | 0.0 | 6.5 | 0.5 | 5.5 | 55.0 | 8.0 | 2.0 | 0.2 | 0.8 | 2.1 | 0.7 |
| 27-4 | 0.2 | 19.0 | 0.3 | 0.0 | 6.5 | 5.4 | 0.5 | 57.0 | 7.9 | 1.6 | 0.0 | 0.5 | 1.1 | 0.6 |
| 27-5 | 0.2 | 17.8 | 0.6 | 0.0 | 6.4 | 2.2 | 0.4 | 57.6 | 11.7 | 1.5 | 0.0 | 0.4 | 1.2 | 0.7 |
| 27-6 | 0.2 | 18.7 | 0.4 | 0.0 | 6.9 | 6.3 | 0.5 | 55.9 | 8.2 | 1.6 | 0.0 | 0.4 | 0.9 | 0.8 |
| 55 | 0.2 | 17.8 | 0.6 | 0.0 | 6.4 | 7.9 | 0.5 | 55.7 | 8.6 | 1.4 | 0.0 | 0.3 | 0.7 | 1.0 |
| 65 | 0.2 | 19.4 | 0.4 | 0.0 | 5.7 | 1.2 | 0.5 | 53.6 | 17.2 | 0.9 | 0.0 | 0.0 | 1.0 | 0.5 |
| 69 | 0.3 | 19.8 | 0.1 | 0.0 | 3.2 | 16.5 | 0.9 | 53.2 | 3.7 | 1.1 | 0.3 | 0.4 | 0.6 | 4.7 |
| 78 | 0.2 | 19.5 | 0.5 | 0.0 | 5.3 | 4.9 | 0.5 | 54.7 | 11.7 | 1.2 | 0.0 | 0.4 | 1.0 | 0.9 |
| 83 | 0.2 | 16.7 | 0.4 | 0.0 | 6.5 | 7.3 | 0.5 | 56.2 | 8.5 | 1.7 | 0.6 | 0.5 | 0.9 | 1.3 |
| 95-1 | 0.3 | 21.0 | 0.2 | 0.1 | 3.1 | 15.2 | 0.8 | 52.8 | 4.2 | 1.1 | 0.2 | 0.3 | 0.7 | 3.0 |
| 95-2 | 0.4 | 21.3 | 0.3 | 0.1 | 4.1 | 7.1 | 1.0 | 56.1 | 7.3 | 1.2 | 0.2 | 0.3 | 0.7 | 2.7 |
| 95-3 | 0.4 | 21.4 | 0.3 | 0.0 | 4.3 | 8.5 | 0.9 | 54.5 | 7.4 | 1.3 | 0.0 | 0.3 | 0.7 | 1.5 |
| 100 | 0.4 | 19.0 | 0.5 | 0.0 | 5.4 | 7.6 | 0.8 | 55.5 | 7.3 | 1.4 | 0.5 | 0.5 | 0.9 | 1.0 |
| 104 | 0.2 | 18.0 | 0.2 | 0.0 | 6.1 | 0.5 | 6.8 | 56.1 | 7.6 | 2.3 | 0.1 | 0.6 | 1.5 | 0.9 |
| 106 | 0.2 | 19.7 | 0.2 | 0.1 | 4.6 | 0.9 | 10.7 | 54.1 | 5.7 | 1.7 | 0.1 | 0.6 | 1.3 | 1.3 |

TABLE 17

TAG yield (% weight of potato tuber dry weight) and its fatty acid composition in representative young potato tubers, transformed with the T-DNA of pJP3506, prior to flowering of the plants.

| Sample | C14:0 | C16:0 | C16:1 | C16:3 | C18:0 | C18:1 | C18:1d11 | C18:2 | C18:3 | C20:0 | C20:1 | C22:0 | C24:0 | % TAG |
|---|---|---|---|---|---|---|---|---|---|---|---|---|---|---|
| WT | 0.4 | 13.4 | 0.0 | 0.0 | 4.6 | 5.5 | 0.5 | 59.9 | 15.7 | 0.0 | 0.0 | 0.0 | 0.0 | 0.03 |
| 4-2 | 0.3 | 15.4 | 0.2 | 0.0 | 7.0 | 0.6 | 16.4 | 52.5 | 3.1 | 2.6 | 0.2 | 0.6 | 1.1 | 0.5 |
| 19 | 0.2 | 16.3 | 0.1 | 0.0 | 7.2 | 18.0 | 0.5 | 50.9 | 3.6 | 1.9 | 0.2 | 0.4 | 0.6 | 0.8 |
| 27-2 | 0.0 | 19.0 | 0.0 | 0.0 | 11.2 | 9.8 | 0.0 | 52.8 | 4.4 | 2.8 | 0.0 | 0.0 | 0.0 | 0.2 |
| 27-4 | 0.4 | 17.4 | 0.0 | 0.0 | 10.2 | 9.4 | 0.0 | 55.4 | 4.7 | 2.6 | 0.0 | 0.0 | 0.0 | 0.2 |
| 27-5 | 0.0 | 17.9 | 0.0 | 0.0 | 12.5 | 4.4 | 0.0 | 54.9 | 7.1 | 3.2 | 0.0 | 0.0 | 0.0 | 0.1 |
| 27-6 | 0.0 | 17.1 | 0.0 | 0.0 | 9.9 | 10.6 | 0.0 | 55.0 | 4.9 | 2.5 | 0.0 | 0.0 | 0.0 | 0.2 |
| 55 | 0.3 | 17.6 | 0.5 | 0.0 | 8.5 | 12.5 | 0.6 | 52.5 | 5.2 | 1.9 | 0.0 | 0.0 | 0.6 | 0.5 |
| 65 | 0.0 | 18.1 | 0.0 | 0.0 | 12.0 | 0.0 | 0.0 | 55.6 | 14.4 | 0.0 | 0.0 | 0.0 | 0.0 | 0.0 |
| 69 | 0.3 | 20.1 | 0.6 | 0.0 | 3.8 | 20.3 | 1.0 | 49.4 | 2.2 | 1.3 | 0.2 | 0.3 | 0.5 | 3.3 |
| 78 | 0.0 | 19.1 | 0.0 | 0.0 | 8.2 | 9.4 | 0.0 | 52.5 | 8.4 | 2.4 | 0.0 | 0.0 | 0.0 | 0.2 |
| 83 | 0.3 | 16.4 | 0.2 | 0.0 | 8.7 | 11.1 | 0.6 | 53.4 | 5.4 | 2.6 | 0.0 | 0.5 | 0.7 | 0.5 |
| 95-1 | 0.3 | 21.7 | 0.4 | 0.1 | 3.6 | 18.5 | 1.0 | 50.1 | 2.8 | 0.9 | 0.2 | 0.2 | 0.3 | 2.2 |
| 95-2 | 0.6 | 23.4 | 0.4 | 0.0 | 5.1 | 10.1 | 1.2 | 51.9 | 5.3 | 1.4 | 0.0 | 0.0 | 0.5 | 0.9 |
| 95-3 | 0.3 | 17.2 | 0.3 | 0.0 | 7.7 | 0.6 | 11.6 | 49.7 | 8.9 | 2.5 | 0.0 | 0.0 | 1.1 | 0.1 |
| 100 | 0.0 | 18.8 | 0.5 | 0.0 | 8.0 | 12.0 | 0.8 | 54.0 | 3.9 | 2.0 | 0.0 | 0.0 | 0.0 | 0.4 |
| 104 | 0.3 | 17.7 | 0.0 | 0.0 | 8.4 | 0.6 | 11.0 | 52.1 | 4.7 | 3.2 | 0.0 | 0.7 | 1.3 | 0.3 |
| 106 | 0.4 | 20.1 | 0.3 | 0.0 | 5.4 | 15.5 | 1.1 | 51.8 | 3.6 | 1.4 | 0.0 | 0.0 | 0.4 | 0.7 |

TABLE 18

Phospholipids yield (% weight of potato tuber dry weight) and its fatty acid composition in representative young potato tubers, transformed with the T-DNA of pJP3506, prior to flowering.

| Sample | C14:0 | C16:0 | C16:1 | C16:3 | C18:0 | C18:1 | C18:1d11 | C18:2 | C18:3 | C20:0 | C20:1 | C22:0 | C24:0 | % PL |
|---|---|---|---|---|---|---|---|---|---|---|---|---|---|---|
| 4-2 | 0.2 | 21.2 | 0.2 | 0.0 | 4.6 | 0.4 | 3.8 | 57.8 | 9.3 | 0.9 | 0.0 | 0.0 | 1.7 | 0.3 |
| 19 | 0.1 | 22.7 | 0.2 | 0.0 | 4.4 | 5.1 | 0.3 | 54.9 | 8.9 | 0.7 | 1.0 | 0.5 | 1.2 | 0.4 |
| 27-2 | 0.2 | 21.0 | 0.3 | 0.0 | 5.2 | 2.8 | 0.4 | 56.9 | 9.3 | 0.9 | 1.3 | 0.4 | 1.4 | 0.4 |
| 27-4 | 0.0 | 22.9 | 0.0 | 0.0 | 6.0 | 2.3 | 0.0 | 57.2 | 8.8 | 1.1 | 0.0 | 0.0 | 1.6 | 0.3 |
| 27-5 | 0.0 | 19.6 | 0.5 | 0.0 | 5.0 | 1.2 | 0.0 | 58.7 | 12.6 | 1.0 | 0.0 | 0.0 | 1.4 | 0.4 |
| 27-6 | 0.0 | 22.9 | 0.0 | 0.0 | 6.3 | 2.6 | 0.0 | 56.3 | 9.3 | 1.2 | 0.0 | 0.0 | 1.5 | 0.3 |
| 55 | 0.1 | 21.2 | 0.4 | 0.0 | 5.1 | 2.1 | 0.0 | 57.8 | 11.4 | 0.7 | 0.0 | 0.0 | 1.0 | 0.4 |
| 65 | 0.0 | 21.4 | 0.4 | 0.0 | 5.9 | 1.1 | 0.0 | 53.2 | 15.7 | 1.0 | 0.0 | 0.0 | 1.3 | 0.3 |
| 69 | 0.2 | 21.5 | 0.2 | 0.0 | 2.3 | 3.7 | 0.6 | 61.9 | 7.9 | 0.6 | 0.0 | 0.4 | 0.8 | 1.0 |
| 78 | 0.0 | 22.1 | 0.4 | 0.0 | 4.4 | 2.7 | 0.4 | 55.6 | 12.2 | 0.8 | 0.0 | 0.0 | 1.3 | 0.4 |
| 83 | 0.2 | 21.1 | 0.3 | 0.0 | 5.0 | 2.9 | 0.4 | 57.1 | 10.7 | 0.8 | 0.0 | 0.4 | 1.1 | 0.5 |
| 95-1 | 0.2 | 24.8 | 0.5 | 0.0 | 2.6 | 3.5 | 0.6 | 59.1 | 7.6 | 0.6 | 0.0 | 0.0 | 0.6 | 0.6 |
| 95-2 | 0.3 | 22.1 | 0.0 | 0.0 | 2.7 | 2.1 | 0.6 | 61.0 | 9.6 | 0.7 | 0.0 | 0.0 | 0.9 | 0.6 |
| 95-3 | 0.2 | 23.2 | 0.5 | 0.0 | 3.1 | 3.6 | 0.7 | 57.7 | 9.3 | 0.7 | 0.0 | 0.0 | 0.9 | 0.5 |
| 100 | 0.0 | 23.3 | 0.5 | 0.0 | 4.6 | 3.0 | 0.4 | 57.2 | 9.0 | 0.8 | 0.0 | 0.0 | 1.1 | 0.4 |
| 104 | 0.0 | 21.3 | 0.0 | 0.0 | 4.8 | 2.7 | 0.0 | 58.3 | 10.1 | 1.0 | 0.0 | 0.0 | 1.7 | 0.4 |
| 106 | 0.2 | 23.2 | 0.2 | 0.0 | 3.8 | 3.0 | 0.6 | 57.1 | 8.6 | 0.7 | 1.0 | 0.4 | 1.1 | 0.4 |

Following verification by DNA sequencing, the cloned PCR products were either directly used as the target gene sequence to make a hairpin RNAi construct or fused by overlapping PCR. Three PCR fragments (SDP1, AGPase, SDP+AGP) were subsequently cloned into the pKannibal vector that contained specific restriction sites to clone the desired fragment in sense and antisense orientation. The restriction sites selected were BamHI and HindIII for cloning the fragment in the sense orientation and KpnI and XhoI for inserting the fragment in the antisense orientation. Primers sets used for amplification of the three target gene fragments were altered by addition of restriction sites which direct the fragment into cloning sites of pKannibal. The expression cassettes containing the target DNA fragment between the 35S promoter and OCS terminator in pKannibal were released with Not1 and cloned into a binary vector pWBVec2 with hygromycin as the plant selectable marker. Such binary vectors were introduced into *A. tumefaciens* AGL1 strain and used for potato transformation as described above.

Example 19. Increasing Oil Content in Monocotyledonous Plants

Expression in Endosperm

The oil content in the endosperm of the monocotyledonous plant species *Triticum aestivum* (wheat) and therefore in the grain of the plants was increased by expressing a combination of genes encoding WRI1, DGAT and Oleosin in the endosperm during grain development using endosperm-specific promoters. The construct (designated pOIL-Endo2) contained the chimeric genes: (a) the promoter of the Glu1 gene of *Brachypodium distachyon*::protein coding region of the *Zea mays* gene encoding the ZmWRI1 polypeptide (SEQ ID NO:35)::terminator/polyadenylation region from the *Glycine max* lectin gene, (b) the promoter of the Bx17 glutenin gene of *Triticum aestivum*::protein coding region of the *A. thaliana* gene encoding the AtDGAT1 polypeptide (SEQ ID NO:1)::terminator/polyadenylation region from the *Agrobacterium tumefaciens* Nos gene, (c) the promoter of the GluB4 gene of *Oryza sativa*::protein coding region of the *Sesame indicum* gene encoding the Oleosin polypeptide::terminator/polyadenylation region from the *Glycine max* lectin gene and (d) a 35S promoter::hygromycin resistance coding region as a selectable marker gene. The construct was used to transform immature embryos of *T. aestivum* (cv. Fielder) by *Agrobacterium*-mediated transformation. The inoculated immature embryos were exposed to hygromycin to select transformed shoots and then transferred to rooting medium to form roots, before transfer to soil.

Thirty transformed plants were obtained which set T1 seed and contained the T-DNA from pOIL-Endo2. Mature seeds were harvested from all 30 plants, and 6 seed of each family cut in half. The halves containing the embryo were stored for later germination; the other half containing mainly endosperm was extracted and tested for oil content. The T-DNA inserted into the wheat genome was still segregating in the T1 seeds from these plants, so the T1 seeds were a mixture of homozygous transformed, heterozygous transformed and nulls for the T-DNA. Increased oil content was observed in the endosperm of some of the grains, with some grains showing greater than a 5-fold increase in TAG levels. The endosperm halves of six wild-type grains (cv. Fielder) had a TAG content of about 0.47% by weight (range 0.37% to 0.60%), compared to a TAG content of 2.5% in some grains. Some families had all six grains with TAG in excess of 1.7%; others were evidently segregating with both wild type and elevated content of TAG. In endosperms with elevated TAG content the fatty acid composition was also altered, showing increases in the percentages of oleic acid and palmitic acid, and a decrease in the percentage of linoleic acid (Table 19). The T1 grain germinated without difficulty at the same rate as the corresponding wild-type grain and plants representing both high oil and low oil individuals from 14 TO families were grown to maturity. These plants were fully male and female fertile.

The grain is useful for preparing food products for human consumption or as animal feed, providing grain with an increased energy content per unit weight (energy density) and resulting in increased growth rates in the animals such as, for example, poultry, pigs, cattle, sheep and horses.

TABLE 19

Fatty acid composition (% of total fatty acids) of TAG content and the total TAG content (% oil by weight of half endosperms) in transgenic wheat endosperm

| Sample | C14:0 | C16:0 | C16:1 | C16:3 | C18:0 | C18:1 | C18:1d11 |
|---|---|---|---|---|---|---|---|
| Control 1 | 0.3 | 16.9 | 0.1 | 0.0 | 1.6 | 15.6 | 0.6 |
| Control 2 | 0.3 | 16.0 | 0.1 | 0.1 | 1.6 | 15.1 | 0.6 |
| F5.3 | 0.1 | 20.1 | 0.1 | 0.1 | 2.6 | 23.5 | 0.6 |
| F16.3 | 0.1 | 19.1 | 0.1 | 0.1 | 2.8 | 24.2 | 0.6 |

| Sample | C18:2 | C18:3n3 | C20:0 | C20:1 | C22:0 | C24:0 | % oil by wt. |
|---|---|---|---|---|---|---|---|
| Control 1 | 60.4 | 4.0 | 0.1 | 0.4 | 0.0 | 0.0 | 0.5 |
| Control 2 | 61.3 | 4.3 | 0.1 | 0.3 | 0.0 | 0.0 | 0.49 |
| F5.3 | 48.5 | 2.4 | 0.8 | 0.7 | 0.3 | 0.4 | 2.5 |
| F16.3 | 48.1 | 2.9 | 0.7 | 0.5 | 0.3 | 0.4 | 1.8 |

The construct pOIL-Endo2 is also used to transform corn (*Zea mays*) and rice (*Oryza sativa*) to obtain transgenic plants which have increased TAG content in endosperm and therefore in grain.

Expression in Leaves and Stems

A series of binary expression vectors was designed for *Agrobacterium*-mediated transformation of sorghum (*S. bicolor*) and wheat (*Triticum aestivum*) to increase the oil content in vegetative tissues. The starting vectors for the constructions were pOIL093-095, pOIL134 and pOIL100-104 (see Example 4). Firstly, a DNA fragment encoding the *Z. mays* WRI1 polypeptide was amplified by PCR using pOIL104 as a template and primers containing KpnI restriction sites. This fragment was subcloned downstream of the constitutive *Oryza sativa* Actin1 promoter of pOIL095, using the KpnI site. The resulting vector was designated pOIL154. The DNA fragment encoding the *Umbelopsis ramanniana* DGAT2a under the control of the *Z. mays* ubiquitin promoter (pZmUbi) was isolated from pOIL134 as a NotI fragment and inserted into the NotI site of pOIL154, resulting in pOIL155. An expression cassette consisting of the PAT coding region under the control of the pZmUbi promoter and flanked at the 3' end by the *A. tumefaciens* NOS terminator/polyadenylation region was constructed by amplifying the PAT coding region using pJP3416 as a template. Primers were designed to incorporate BamHI and SacI restriction sites at the 5' and 3' ends, respectively. After BamHI+SacI double digestion, the PAT fragment was cloned into the respective sites of pZLUbi1casNK. The resulting intermediate was designated pOIL141. Next, the PAT selectable marker cassette was introduced into the pOIL155 backbone. To this end, pOIL141 was first cut with NotI, blunted with Klenow fragment of DNA polymerase I and subsequently digested with AscI. This 2622 bp fragment was then subcloned into the ZraI-AscI sites of pOIL155, resulting in pOIL156. Finally, the Actin1 promoter driving WRI1 expression in pOIL156 was exchanged for the *Z. mays* Rubisco small subunit promoter (pZmSSU) resulting in pOIL157. This vector was obtained by PCR amplification of the *Z. mays* SSU promoter using pOIL104 as a template and flanking primers containing AsiSI and PmlI restriction sites. The resulting amplicon was then cut with SpeI+MluI and subcloned into the respective sites of pOIL156.

These vectors therefore contained the following expression cassettes:

pOIL156: promoter *O. sativa* Actin1::*Z. mays* WRI1, promoter *Z. mays* Ubiquitin::*U. rammaniana* DGAT2a and promoter *Z. mays* Ubiquitin::PAT pOIL157: promoter *Z. mays* SSU:*Z. mays* WRI1, promoter *Z. mays* Ubiquitin::*U. rammaniana* DGAT2a and *Z. mays* Ubiquitin::PAT.

A second series of binary expression vectors containing the *Z. mays* SEE1 senescence promoter (Robson et al., 2004, see Example 4), *Z. mays* LEC1 transcription factor (Shen et al., 2010) and a *S. bicolor* SDP1 hpRNAi fragment were constructed as follows. First, a matrix attachment region (MAR) was introduced into pORE04 by AatII+SnaBI digest of pDCOT and subcloning into the AatII+EcoRV sites of pORE04. The resulting intermediate vector was designated pOIL158. Next, the PAT selectable marker gene under the control of the *Z. mays* Ubiquitin promoter was subcloned into pOIL158. To this end, pOIL141 was first digested with NotI, treated with Klenow fragment of DNA polymerase I and finally digested with AscI. The resulting fragment was inserted into the AscI+ZraI sites of pOIL158, resulting in pOIL159. The original RK2 oriV origin of replication in pOIL159 was exchanged for the RiA4 origin by SwaI+SpeI restriction digestion of pJP3416, followed by subcloning into the SwaI+AvrII sites of pOIL159. The resulting vector was designated pOIL160. A 10.019 kb 'Monocot senescence part1' fragment containing the following expression cassettes is synthesized: *O. sativa* Actin1::*A. thaliana* DGAT1, codon optimized for *Z. mays* expression, *Z. mays* SEE1::*Z. mays* WRI1, *Z. mays* SEE1:*Z. mays* LEC1. This fragment is subcloned as a SpeI-EcoRV fragment into the SpeI-StuI sites of pOIL160, resulting in pOIL161. A second 7.967 kb 'Monocot senescence part2' fragment is synthesized and contains the following elements: MAR, *Z. mays* Ubiquitin:: hpRNAi fragment targeted against *S. bicolor/T. aestivum* SDP1, empty cassette under the control of the *O. sativa* Actin promoter. The sequences of two *S. bicolor* SDP1 TAG lipases (Accession Nos. XM_002463620; SEQ ID NO. 242 and XM_002458486; SEQ ID NO:169) and one *T. aestivum* SDP1 sequence (Accession No. AK334547) (SEQ ID NO: 243) were obtained by a BLAST search with the *A. thaliana* SDP1 sequence (Accession No. NM_120486). A synthetic hairpin construct (SEQ ID NO:244) was designed including four fragments (67 bp, 90 bp, 50 bp, 59 bp) of the *S. bicolor* XM 002458486 sequence that showed highest degree of identity with the *T. aestivum* SDP1 sequence. In addition, a 278 bp fragment originating from the *S. bicolor* XM 002463620 SDP1 lipase was included to increase silencing efficiency against both *S. bicolor* SDP1 sequences. The 'Monocot senescence part2' fragment is subcloned as a BsiWI-EcoRV fragment into the BsiWI-FspI sites of pOIL161. The resulting vector is designated pOIL162.

The genetic constructs pOIL156 pOIL157, pOIL162 and pOIL163 are used to transform *S. bicolor* and *T. aestivum* using *Agrobacterium*-mediated transformation. Transgenic plants are selected for hygromycin resistance and contain elevated levels of TAG and TFA in vegetative tissues compared to untransformed control plants. Such plants are useful for providing feed for animals as hay or silage, as well as producing grain, or may be used to extract oil.

Example 20. Extraction of Oil and Production of Biodiesel

Extraction of Lipid from Leaves

Transgenic tobacco leaves which had been transformed with the T-DNA from pJP3502 were harvested from plants grown in a glasshouse during the summer months. The leaves were dried and then ground to 1-3 mm sized pieces prior to extraction. The ground material was subject to soxhlet (refluxing) extraction over 24 hours with selected solvents, as described below. 5 g of dried tobacco leaf material and 250 ml of solvent was used in each extraction experiment.

Hexane Solvent Extraction

Hexane is commonly used as a solvent commercially for oil extraction from pressed oil seeds such as canola, extracting neutral (non-polar) lipids, and was therefore tried first. The extracted lipid mass was 1.47 g from 5 g of leaf material, a lipid recovery of 29% by weight. 1H NMR analysis of the hexane extracted lipid in DMSO was preformed. The analysis showed typical signals for long chain triglyceride fatty acids, with no aromatic products being present. The lipid was then subjected to GCMS for identification of major components. Direct GCMS analysis of the hexane extracted lipid proved to be difficult as the boiling point was too high and the material decomposed in the GCMS. In such situations, a common analysis technique is to first make methyl esters of the fatty acids, which was done as follows: 18 mg lipid extract was dissolved in 1 mL toluene, 3 mL of dry 3N methanolic HCL was added and stirred overnight at 60° C. 5 mL of 5% NaCl and 5 mL of hexane were added to the cooled vial and shaken. The organic layer was removed and the extraction was repeated with another 5 mL of hexane. The combined organic fractions were neutralized with 8 mL of 2% KHCO3, separated and dried with Na2SO4. The solvent was evaporated under a stream of N2 and then made up to a concentration of 1 mg/mL in hexane for GCMS analysis. The main fatty acids present were 16:0 (palmitic, 38.9%) and 18:1 (oleic, 31.3%).

| FA | 16:0 | 16:1 | 18:0 | 18:1 | 18:2 | 20:0 | 22:0 |
|---|---|---|---|---|---|---|---|
| % wt | 38.9 | 4.6 | 6.4 | 31.3 | 2.5 | 1.5 | 0.6 |

Acetone Solvent Extraction

Acetone was used as an extraction solvent because its solvent properties should extract almost all lipid from the leaves, i.e. both non-polar and polar lipids. The acetone extracted oil looked similar to the hexane extracted lipid. The extracted lipid mass was 1.59 g from 5 g of tobacco leaf, i.e. 31.8% by weight. 1H NMR analysis of the lipid in DMSO was performed. Signals typical of long chain triglyceride fatty acids were observed, with no signal for aromatic products.

Hot Water Solvent Extraction

Hot water was attempted as an extraction solvent to see if it was suitable to obtain oil from the tobacco leaves. The water extracted material was gel like in appearance and gelled when cooled. The extracted mass was 1.9 g, or 38% by weight. This material was like a thick gel and was likely to have included polar compounds from the leaves such as sugars and other carbohydrates. The 1H NMR analysis of the material in DMSO was preformed. The analysis showed typical signals for long chain triglyceride fatty acids, with no aromatic products being extracted. The left over solid material was extracted with hexane, yielding 20% of lipid by weight, indicating that the water extraction had not efficiently extracted non-polar lipids.

Ethanol Solvent Extraction

Ethanol was used as an extraction solvent to see if it was suitable to obtain oil from the tobacco leaves. The ethanol extracted lipid was similar in appearance to both the water- and hexane-extracted lipid, being yellow-red in colour, had a gel-like appearance and gelled when cooled. The extracted lipid mass was 1.88 g from 5 g tobacco, or 37.6% by weight. The ethanol solvent would also have extracted some of the polar compounds in the tobacco leaves.

Ether Solvent Extraction

Diethyl ether was attempted as an extraction solvent since it was thought that it might extract less impurities than other solvents. The extraction yielded 1.4 g, or 28% by weight. The ether extracted lipid was similar to the hexane extracted material in appearance, was yellowish in colour, and it did appeared a little cleaner than the hexane extract. While the diethyl ether extraction appeared to have given the cleanest oil, the NMR analysis showed a mixture of more organic compounds.

Production of Biodiesel from Tobacco Plants

A batch of transgenic tobacco plants was grown over winter (not its normal growing season) to assess oil production in the leaves during the colder season with less natural light. The leaves from mature plants had approx 10% oil on a dry weight basis; much lower than plants grown during the summer season. Nevertheless, lipid was extracted and converted to biodiesel as follows. The stages in the process were: (a) extraction of crude lipid, (b) purification of TAG from the lipid, and (c) conversion of the purified TAG to biodiesel.

Hexane (petroleum ether 40-60 C) was used as the extraction solvent for obtaining oil comprising mostly non-polar lipid. 500 g of tobacco leaf material was dried, weighed and then soaked in hexane overnight with stirring. The mixture was filtered and the hexane extract was then dried with magnesium sulphate and treated with active carbon to decolorise the oil. The solution was filtered and the resulting liquid evaporated in a rotary evaporator, resulting in about 42 grams of crude oil. This was yellow/green in colour and had a viscous consistency when cooled. Some of this oil was used in an attempt to make biodiesel directly but the number of impurities and high amount of free fatty acids gave rise to the production of a lot of soap which hindered the methylation reaction and product separation. Therefore, further purification of this oil to enrich the TAG fraction was necessary prior to the transesterfication reaction to make biodiesel.

One problem with the winter grown sample was the presence of relatively high levels of free fatty acids (FFAs) in the extracted material, resulting in excessive soap being made which hindered separation of the methyl esters and the glycerol products. To purify the TAG in the oil, several solvent systems were investigated and a hexane/ethyl acetate mixture of 80:20 was chosen as suitable for column chromatography. Separation on a silica column using hexane: ethyl acetate (80:20) was performed. The more hydrophobic TAG was the first to elute from the column as an orange/ yellow oil. Next eluted was a dark green band, containing a mixture of hexane-soluble components in the tobacco leaves including chlorophyl mixed with some TAG and FFAs. The final product washed off the column with pure ethyl acetate and was mainly FFAs.

The purified TAG that was enriched away from FFAs and phosphates and other impurities could now be made into biodiesel. This was done by reacting the TAG with methanol in the presence of a base catalyst to produce the methyl ester (biodiesel) and glycerol as a by product. An alternative method, acid-catalyzed esterification, can be used to react fatty acids with alcohol to produce biodiesel in the presence of FFAs, requiring less pure TAG. Other methods such as fixed-bed reactors, supercritical reactors and ultrasonic reactors forgo or decrease the use of chemical catalysts and can also be used for biodiesel production from lipids. However, base-catalyzed methods are the most economical for converting purified TAG, requiring only low temperatures and pressures and producing over 98% conversion yields provided the starting oil is low in moisture and free fatty acids.

The purified TAG was treated with methoxide solution (NaOH and methanol mixed until fully dissolved) at an oil temperature of 60° C. The mixture was maintained at 60° C. and stirred for 2 hours as the transesterification reaction took place. The reaction mixture was cooled to room temperature and two phases separated which were an upper biodiesel layer and a lower glycerol layer. The phases were then separated using a separating funnel and the biodiesel recovered.

Hydrothermal Processing of High Oil Vegetative Tissues

Another, more direct approach to converting vegetative plant parts into industrial products such as liquid fuels is via hydrothermal processing (HTP). This was employed to convert the transgenic tobacco leaf material containing about 30% TFA by weight into a renewable bio-oil that could be added to a conventional petroleum refinery feedstock to produce renewable diesel (paraffinic diesel). Petroleum diesel is a mixture of many hydrocarbon compounds, mainly alkanes, and is defined as being the fraction from the refinery between 200-300° C., typically comprising predominantly C13-C22 hydrocarbons. In a typical conversion of transgenic tobacco leaf via HTP, the solid transgenic tobacco vegetative plant material was mixed with water to create a solids concentration between 16-50%. This slurry was then subject to temperatures between 270-400° C. and 70-350 bar pressure. The reaction times varied between 1-60 minutes and experiments were conducted with and without NaOH and KOH as catalyst.

Once the HTP processing had finished and reaction cooled, it was separated into 3 different product streams, namely gas, solid and liquid bio-oil. The bio-oil yields were between 25-40% on a dry weight basis relative to the feedstock amount. FIG. 18 shows that much greater bio-oil yields were obtained for the transgenic tobacco leaf material relative to the corresponding wild-type tobacco leaf material.

Direct In Situ Conversion of Lipid in Vegetative Plant Parts to Bio-Diesel

In another series of experiments the water component of the HTP reaction was replaced with the solvent methanol. There are a number of reasons for trying to use methanol, one being trying to convert TAG oil in the leaf directly (in situ) in one step to produce the methyl esters of the fatty acids (FAME) in the plant lipid and produce biodiesel directly. Using the same reaction conditions and equipment as the previous HTP experiments, the water was replaced with methanol, the reaction temperature was 335° C. at a pressure of 240 bar with NaOH as catalyst. The transgenic tobacco vegetative plant parts produced 47% bio-oil by weight relative to the input weight, while the wild-type tobacco produced 35% bio-oil by weight. $H^1$ NMR of the two resultant bio-oils showed only a small amount of FAME, while the NMR of the transgenic tobacco bio-oil showed a large amount of the biodiesel FAME.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

All publications discussed and/or referenced herein are incorporated herein in their entirety.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

REFERENCES

Alemanno et al. (2008) Planta 227:853-866.
Almeida and Allshire (2005) TRENDS Cell Biol. 15:251-258.
Alonso et al. (2009) Plant Cell 21: 1747-1761.
Alonso et al. (2010) Green Chem. 12:1493-1513.
Alvarez et al. (2000) Theor. Appl. Genet. 100:319-327.
Andre at al (2012) Proc. Natl. Acad. Sci. U.S.A. 109:10107-10112.
Andrianov et al. (2010) Plant Biotech. J. 8:277-287.
Awai et al (2006) Biochem. Soc. Trans. 34:395-398.
Bartlett et al. (2008) Plant Methods 4:22.
Baud et al. (2007) Plant J. 50:825-838.
Baud and Lepiniec (2010) Progr. Lipid Res. 49: 235-249.
Baumlein et al. (1991) Mol. Gen. Genet. 225:459-467.
Baumlein et al. (1992) Plant J. 2:233-239.
Belide et al. (2013) Plant Cell Tiss. Org. Cult. DOI 10.1007/s11240-013-0295-1.
Ben Saad et al. (2011) Transgenic Res 20: 1003-1018.
Benning et al (2008) Prog. Lipid Res. 47:381-389.
Benning et al (2009) J. Biol. Chem 284:17420-17427.
Bibikova et al. (2002) Genetics 161:1169-1175.
Bligh and Dyer (1959) Canadian Journal of Biochemistry and Physiology 37:911-917.
Bourque (1995) Plant Sci. 105:125-149.
Boutilier et al. (2002) Plant Cell 14:1737-1749.
Bouvier-Nave et al. (2000) European Journal of Biochemistry/FEBS 267:85-96.
Bradford (1976) Anal. Biochem. 72:248-254.
Broothaerts et al. (2005) Nature 433:629-633.
Broun et al. (1998) Plant J. 13:201-210.
Browse et al. (1986) Biochem J 235: 25-31.
Buchanan-Wollaston (1994) Plant Physiol. 105:839-846.
Busk et al. (1997) Plant J. 11:1285-1295.
Cao et al. (2007) J. Lipid Res. 48:583-591.
Capuano et al. (2007) Biotechnol. Adv. 25:203-206.
Chen et al (2011) Plant Physiol. 155:851-865.
Chikwamba et al. (2003) Proc. Natl. Acad. Sci. U.S.A. 100:11127-11132.
Christie (1993) Advances in Lipid Methodology-Two, Oily Press, Dundee, pp 195-213.
Chung et al. (2006) BMC Genomics 7:120.
Comai et al. (2004) Plant J 37: 778-786.

Cong et al. (2013) Science 339:819-823.
Corrado and Karali (2009) Biotechnol. Adv. 27:733-743.
Courvalin et al. (1995) Life Sci. 318: 1207-1212.
Coutu et al. (2007) Transgenic Res. 16:771-781.
Dandik and Aksoy (1998) Fuel Process Technol. 57: 81-92.
Darji et al. (1997) Cell 91:765-775.
Dauk et al (2007) Plant Sci. 173:43-49.
Dulermo and Nicaud (2011) Metab. Eng. 13:482-491.
Durrett et al. (2008) Plant J. 54:593-607.
Dussert et al. (2013) Plant Physiol. 162:1337-1358.
Dyer et al. (2002) Plant Physiol. 130:2027-2038.
Eastmond et al. (2006) Plant Cell 18: 665-675.
Eccleston et al (1996) Planta 198:46-53.
Ellerstrom et al. (1996) Plant Mol. Biol. 32:1019-1027.
Endalew et al. (2011) Biomass and Bioenergy 35:3787-3809.
Feeney et al. (2012) Plant Physiol 162: 1881-1896.
Finkelstein et al. (1998) Plant Cell 10:1043-1054.
Froissard et al. (2009) FEMS Yeast Res 9:428-438.
Gan (1995) Molecular characterization and genetic manipulation of plant senescence.
PhD thesis. University of Wisconsin, Madison.
Gan and Amasino (1995) Science 270:1986-1988.
Gazzarrini et al. (2004) Dev. Cell 7:373-385.
Ghosal et al. (2007) Biochimica et Biophysica Acta 1771: 1457-1463.
Ghosh et al. (2009) Plant Physiol. 151:869-881.
Gidda et al (2013) Plant Signaling Behav. 8:e27141.
Girijashankar and Swathisree, (2009) Physiol. Mol. Biol. Plants 15: 287-302.
Gong and Jiang (2011) Biotechnol. Lett. 33:1269-1284.
Gould et al. (1991) Plant Physiol. 95:426-434.
Greenwell et al. (2010) J. R. Soc. Interface 7:703-726.
Gurel et al. (2009) Plant Cell Rep. 28:429-444.
Hershey and Stoner (1991) Plant Mol. Biol. 17:679-690.
Hinchee et al. (1988) Biotechnology 6:915-922.
Hom et al. (2007) Euphytica 153:27-34.
Horn et al. (2013). Plant Physiol 162:1926-1936.
Horvath et al. (2000) Proc. Natl. Acad. Sci. U.S.A. 97:1914-1919.
Huang (1996) Plant Physiol. 110:1055-1061.
Ichihara et al (1988) Biochim. Biophys. Acta 958:125-129.
Ikeda et al. (2006) Pl Biotech J. 23: 153-161.
Iwabuchi et al. (2003) J. Biol. Chem. 278:4603-4610.
Jako et al (2001) Plant Physiol. 126:861-874.
James et al. (2010) Proc. Natl. Acad. Sci. USA 107:17833-17838.
Jepson et al. (1994) Plant Mol. Biol. 26:1855-1866.
Jiang, et al. (2013) Nucleic Acids Research 41(20) e188.
Jing et al. (2011) BMC Biochemistry 12:44.
Jolivet et al. (2014) Plant Physiol. Biochem. 42:501-509.
Jones et al. (1995) Plant Cell 7: 359-371.
Karmakar et al. (2010) Bioresource Technology 101:7201-7210.
Kelly et al. (2011) Plant Physiol. 157: 866-875.
Kelly et al (2013a) Plant Biotech. J. 11:355-361.
Kelly et al. (2013b) Plant Physiol. 162:1282-1289.
Kereszt et al. (2007) Nature Protocols 2:948-952.
Kim et al. (1996) Proc. Natl. Acad. Sci. USA 93:1156-1160.
Kim et al. (2004) Plant Physiol. 134:1206-1216.
Knutzon et al. (1995) Plant Physiol. 109:999-1006.
Koziel et al. (1996) Plant Mol. Biol. 32:393-405.
Kuhn et al. (2009) J. Biol. Chem. 284:34092-102.
Kunst et al. (1988) Proc. Natl. Acad. Sci. U.S.A. 85:4143-4147.
Kwong et al. (2003) Plant Cell 15:5-18.
Lacroix et al. (2008) Proc. Natl. Acad. Sci. U.S.A. 105: 15429-15434.
Lardizabal et al. (2008) Plant Physiol. 148: 89-96.
Larkin et al. (1996) Transgenic Res. 5:325-335.
Laureles et al. (2002) J. of Agric. and Food Chem. 50:1581-1586.
Lebrun et al. (1987) Nucl. Acids Res. 15:4360.
Laux et al. (1996) Development 122: 87-96.
Lazo et al. (1991) Bio/Technology 9:963-967.
Lee et al. (1998) Science 280:915-918.
Lee et al., (2003) Proc. Natl. Acad. Sci. U.S.A. 100:2152-2158.
Li-Beisson et al (2013) The *Arabidopsis* Book, 2013.
Li et al. (1996) FEBS Lett. 379:117-121.
Li et al. (2006) Phytochemistry 67: 904-915.
Lin et al. (2005) Plant Physiol. Biochem. 43:770-776.
Liu et al. (2010a) Fuel 89:2735-2740.
Liu et al. (2010b) Plant Physiol. Biochem. 48: 9-15.
Liu et al (2012a) Prog. Lipid Res. 51:350-377.
Liu et al. (2012b) In Vitro Cellular and Dev. Biol. Plant 48:462-468.
Liu et al. (2012c) J Exp Bot 63: 3727-3740.
Liu et al. (2014) BMC Plant Biol. 14: 73.
Lotan et al. (1998) Cell 93: 1195-1205.
Lu et al (2007) J. Biol. Chem. 282: 35945-35953.
Luerssen et al. (1998) Plant J. 15: 755-764.
Lui et al. (2009) J. Agric. Food Chem. 57: 2308-2313.
Maher and Bressler (2007) Bioresource Technology 98:2351-2368.
Matsuoka et al. (1994) Plant J. 6:311-319.
Matsuoka and Minami (1989) Eur. J. Biochem. 181: 593-598.
McElroy et al. (1990) Plant Cell 2: 163-171.
Meier et al. (1997) FEBS Lett. 415:91-95.
Millar and Waterhouse (2005). Funct Integr Genomics 5:129-135.
Mojica et al. (2000) Mol Microbiol 36:244-246.
Mongrand et al. (1998) Phytochemistry 49:1049-1064.
Moreno-Perez (2012) PNAS 109: 10107-10112.
Mu et al. (2008) Plant Physiol. 148:1042-1054.
Murphy et al. (2012). Protoplasma 249:541-585.
Naim et al. (2012) PLOS One 7: e52717.
Needleman and Wunsch (1970) J. Mol Biol. 45: 443-453.
Nilsson et al. (2012) Physiol. *Plantarum* 144: 35-47.
Nishida et al (1993) Plant Mol. Biol. 21:267-277.
Nomura et al. (2000) Plant Mol. Biol. 44: 99-106.
Ohlrogge and Browse (1995) Plant Cell 7: 957-970.
Padidam (2003) Curr. Opin. Plant Biol. 6:169-77.
Padidam et al. (2003) Transgenic Res. 12:101-9.
Parthibane et al. (2012a) J. Biol. Chem. 287:1946-1965.
Parthibane et al. (2012b) Plant Physiol. 159:95-104.
Pasquinelli et al. (2005). Curr. Opin. Genet. Develop. 15:200-205.
Perez-Vich et al. (1998) J.A.O.C.S. 75:547-555.
Perrin et al. (2000) Mol. Breed. 6:345-352.
Petrie et al. (2012) PLOS One 7: e35214.
Phillips et al. (2002) Journal of Food Composition and Analysis 12:123-142.
Pigeaire et al. (1997) Mol. Breed. 3:341-349.
Potenza et al. (2004) In Vitro Cell Dev. Biol. Plant 40:1-22.
Powell et al. (1996) Vaccines 183, Abstract.
Qiu et al. (2001) J. Biol. Chem. 276:31561-3156.
Robson et al. (2004) Plant Biotechnol J 2:101-112.
Rossell and Pritchard (1991) Analysis of Oilseeds, Fats and Fatty Foods. Elsevier Science Publishers Ltd: London (Chapter 2, pp. 48-53).
Roston et al (2012) J. Biol. Chem. 287:21406-21415.

Ruuska et al. (2002) Plant Cell 14:1191-1206.
Saha et al. (2006) Plant Physiol. 141:1533-1543.
Santos-Mendoza et al. (2005) FEBS Lett. 579:4666-4670.
Santos-Mendoza et al. (2008) Plant J. 54:608-620.
Schaffner (1980) Proc. Natl. Acad. Sci. U.S.A. 77:2163-2167.
Schnurr et al. (2002) Plant Physiol 129:1700-1709.
Scott et al. (2010) Plant Biotechnol. J. 8:912-27.
Shen et al. (2010) Plant Phys. 153: 980-987.
Semwal et al. (2011) Bioresource Technology 102:2151-2161.
Senior (1998) Biotech. Genet. Engin. Revs. 15:79-119.
Shen et al. (2010) Plant Physiol. 153:980-987.
Shiina et al. (1997) Plant Physiol. 115:477-483.
Shimada and Hara-Nishimura (2010) Biol. Pharm. Bull. 33:360-363.
Shimada et al. (2014) Plant Physiol. 164:105-118.
Shockey et al. (2002) Plant Physiol 129:1710-1722.
Sizemore et al. (1995) Science 270:299-302.
Slade and Knauf (2005) Transgenic Res. 14: 109-115.
Slocombe et al. (2009) Plant Biotechnol. J. 7: 694-703.
Smith et al. (2000) Nature 407:319-320.
Somerville et al. (2000) Lipids. In BB Buchanan, W Gruissem, R L Jones, eds, Biochemistry and Molecular Biology of Plants. American Society of Plant Physiologists, Rockville, MD, pp 456-527.
Srinivasan et al. (2007) Planta 225:341-51.
Stalker et al. 1988 Science 242: 419-423.
Stone et al. (2001) Proc. Natl. Acad. Sci. U.S.A. 98: 11806-11811.
Stone et al. (2008) Proc. Natl. Acad. Sci. U.S.A. 105: 3151-3156.
Tan et al. (2011) Plant Physiol. 156:1577-1588.
Taylor (1997) The Plant Cell 9:1245-1249.
Thillet et al. (1988) J. Biol. Chem 263:12500-12508.
Tingay et al. (1997) Plant J. 11:1369-1376.
To et al. (2012) Plant Cell 24:5007-5023.
Topfer et al. (1995) Science 268:681-686.
Ulmasov et al. (1995) Plant Physiol. 108:919-927.
van de Loo et al. (1995) Proc Natl Acad Sci USA. 92:6743-6747.
Van Erp et al. (2014) Plant Physiol. 165-30-36.
Vanhercke et al. (2013) FEBS Letters 587:364-369.
Vanhercke et al. (2014). Plant Biotech. J. 12:231-239.
Vieler et al. (2012) Plant Physiol. 158:1562-1569.
Voelker et al. (1992) Science 257:72-74.
Voinnet et al. (2003) Plant J. 33:949-956.
Wang and Benning (2012) Plant J 70:614-623.
Wang et al. (2002) Plant J 32:831-843.
Wang et al. (2004) PNAS 101:3275-3280.
Waterhouse et al. (1998). Proc. Natl. Acad. Sci. U.S.A. 95:13959-13964.
Weiss (2003) Int. J. Med. Microbiol. 293:95-106.
Weselake et al. (2008) J. Exp. Botany 59: 3543-3549.
Winichayakul et al. (2013) Plant Physiol. 162:626-639.
Wood et al. (2009). Plant Biotech. J. 7: 914-924.
Wright et al. (2006) Methods Mol Biol. 343:120-135.
Wu et al. (2014) In Vitro Cellular and Dev. Biol.-Plant 50:9-18.
Xie et al. (2014) Mol. Plant 7:923-926.
Xu et al (2010) Plant and Cell Physiol. 51:1019-1028.
Xu et al (2005) Plant Cell 17:3094-3110.
Xu et al (2008) Plant Cell 20:2190-2204.
Yamagishi et al. (2005) Pl Physiol 139: 163-173.
Yamasaki et al. (2004) Plant Cell 16:3448-3459.
Yang et al. (2003) Planta 216:597-603.
Yang et al. (2010) Proc. Natl. Acad. Sci. U.S.A. 107:12040-12045.
Yen et al. (2002) Proc. Natl. Acad. Sci. U.S.A. 99:8512-8517.
Yen et al. (2005) J. Lipid Res. 46: 1502-1511.
Yokoyama et al. (1994) Mol Gen Genet 244: 15-22.
Yuan et al. (1995) Proc. Natl. Acad. Sci. U.S.A. 92:10639-10643.
Zhang et al. (1999) Plant Cell, Tissue and Organ Culture 56:37-46.
Zheng et al. (2009) Pl Physiol 21: 2563-2577.
Zolman et al (2001) Plant Physiol. 127:1266-1274.

The invention claimed is:

1. A process for producing an industrial product, the process comprising i) converting at least some of the lipid in plant leaf pieces to the industrial product by applying heat, chemical, or enzymatic means, or any combination thereof, to the lipid in situ in the plant leaf pieces, wherein the plant leaf pieces express an exogenous Wrinkled 1 (WRI1) polypeptide and an exogenous diacylglycerol acyltransferase (DGAT), and have reduced triacylglycerol (TAG) lipase activity or express an exogenous Leafy Cotyledon 2 (LEC2) polypeptide or both reduced TAG lipase activity and express an exogenous LEC2 polypeptide, the leaf pieces having a total non-polar lipid content of between 5% and 30% by weight on a dry weight basis, and an increased total non-polar lipid content relative to a corresponding leaf piece which expresses the exogenous WRI1 polypeptide and the DGAT polypeptide but which does not have reduced TAG lipase activity and does not express the LEC2 polypeptide, and ii) recovering the industrial product, thereby producing the industrial product.

2. The process of claim 1, wherein the leaf pieces in total have a dry weight of at least 2 g.

3. The process of claim 1, wherein the leaf pieces are harvested from one or more plants at a time between about the time of flowering of the plants to about the time senescence of the plants has started.

4. The process of claim 1, wherein the industrial product is a hydrocarbon product.

5. The process of claim 4, wherein the hydrocarbon product comprises fatty acid esters, an alkane, an alkene, or combinations thereof.

6. A process an industrial product, the process comprising i) physically processing plant leaf pieces and subsequently or simultaneously converting at least some of the lipid in the processed plant leaf pieces to the industrial product by applying heat, chemical, or enzymatic means, or any combination thereof, to the lipid in the processed plant leaf pieces, wherein the plant leaf pieces express an exogenous Wrinkled 1 (WRI1) polypeptide and an exogenous diacylglycerol acyltransferase (DGAT), and have reduced triacylglycerol (TAG) lipase activity or express an exogenous Leafy Cotyledon 2 (LEC2) polypeptide or both reduced TAG lipase activity and express an exogenous LEC2 polypeptide, the leaf pieces having a total non-polar lipid content of between 5% and 30% by weight on a dry weight basis, and an increased total non-polar lipid content relative to a corresponding leaf piece which expresses the exogenous WRI1 polypeptide and the DGAT polypeptide but which does not have reduced TAG lipase activity and does not express the LEC2 polypeptide, and ii) recovering the industrial product, thereby producing the industrial product.

7. The process of claim 6, wherein physically processing the plant leaf pieces comprises one or more of rolling, pressing, crushing or grinding the plant leaf pieces.

8. The process of claim 6, wherein the leaf pieces in total have a dry weight of at least 2 g.

9. The process of claim 6, wherein the leaf pieces are harvested from one or more plants at a time between about the time of flowering of the plants to about the time senescence of the plants has started.

10. The process of claim 6, wherein the industrial product is a hydrocarbon product.

11. The process of claim 10, wherein the hydrocarbon product comprises fatty acid esters, an alkane, an alkene, or combinations thereof.

12. A process for producing a synthetic diesel fuel, the process comprising:

i) converting the lipid in plant leaf pieces as defined in claim 1 to a bio-oil by a process comprising pyrolysis or hydrothermal processing or to a syngas by gasification, and ii) converting the bio-oil to synthetic diesel fuel by a process comprising fractionation, or converting the syngas to a biofuel using a metal catalyst or a microbial catalyst.

13. The process of claim 12, wherein the fractionation comprises selecting hydrocarbon compounds which condense between about 150° C. to about 200° C. or between about 200° C. to about 300° C.

14. A process for producing a biofuel, the process comprising converting the lipid in plant leaf pieces as defined in claim 1 to bio-oil by pyrolysis, a bioalcohol by fermentation, or a biogas by gasification or anaerobic digestion.

* * * * *

SEQUENCE LISTING

```
Sequence total quantity: 254
SEQ ID NO: 1           moltype = AA  length = 520
FEATURE                Location/Qualifiers
source                 1..520
                       mol_type = protein
                       organism = Arabidopsis thaliana
SEQUENCE: 1
MAILDSAGVT TVTENGGGEF VDLDRLRRRK SRSDSSNGLL LSGSDNNSPS DDVGAPADVR  60
DRIDSVVNDD AQGTANLAGD NNGGGDNNGG GRGGGEGRGN ADATFTYRPS VPAHRRARES  120
PLSSDAIFKQ SHAGLFNLCV VVLIAVNSRL IIENLMKYGW LIRTDFWFSS RSLRDWPLFM  180
CCISLSIFPL AAFTVEKLVL QKYISEPVVI FLHIIITMTE VLYPVYVTLR CDSAFLSGVT  240
LMLLTCIVWL KLVSYAHTSY DIRSLANAAD KANPEVSYYV SLKSLAYFMV APTLCYQPSY  300
PRSACIRKGW VARQFAKLVI FTGFMGFIIE QYINPIVRNS KHPLKGDLLY AIERVLKLSV  360
PNLYVWLCMF YCFFHLWLNI LAELLCFGDR EFYKDWWNAK SVGDYWRMWN MPVHKWMVRH  420
IYFPCLRSKI PKTLAIIIAF LVSAVFHELC IAVPCRLFKL WAFLGIMFQV PLVFITNYLQ  480
ERFGSTVGNM IFWFIFCIFG QPMCVLLYYH DLMNRKGSMS                       520

SEQ ID NO: 2           moltype = AA  length = 314
FEATURE                Location/Qualifiers
source                 1..314
                       mol_type = protein
                       organism = Arabidopsis thaliana
SEQUENCE: 2
MGGSREFRAE EHSNQFHSII AMAIWLGAIH FNVALVLCSL IFLPPSLSLM VLGLLSLFIF  60
IPIDHRSKYG RKLARYICKH ACNYFPVSLY VEDYEAFQPN RAYVFGYEPH SVLPIGVVAL  120
CDLTGFMPIP NIKVLASSAI FYTPFLRHIW TWLGLTAASR KNFTSLLDSG YSCVLVPGGV  180
QETFHMQHDA ENVFLSRRRG FVRIAMEQGS PLVPVFCFGQ ARVYKWWKPD CDLYLKLSRA  240
IRFTPICFWG VFGSPLPCRQ PMHVVVGKPI EVTKTLKPTD EEIAKFHGQY VEALRDLFER  300
```

```
HKSRVGYDLE LKIL                                              314

SEQ ID NO: 3            moltype = AA  length = 340
FEATURE                 Location/Qualifiers
source                  1..340
                        mol_type = protein
                        organism = Ricinus communis
SEQUENCE: 3
MGEEANHNNN NNNINSNDEK NEEKSNYTVV NSRELYPTNI FHALLALSIW IGSIHFNLFL  60
LFISYLFLSF PTFLLIVGFF VVLMFIPIDE HSKLGRRLCR YVCRHACSHF PVTLHVEDMN  120
AFHSDRAYVF GYEPHSVFPL GVSVLSDHFA VLPLPKMKVL ASNAVFRTPV LRHIWTWCGL  180
TSATKKNFTA LLASGYSCIV IPGGVQETFY MKHGSEIAFL KARRGFVRVA MEMGKPLVPV  240
FCFGQSNVYK WWKPDGELFM KIARAIKFSP IVFWGVLGSH LPLQRPMHVV VGKPIEVKQN  300
PQPTVEEVSE VQGQFVAALK DLFERHKARV GYADLTLEIL                      340

SEQ ID NO: 4            moltype = AA  length = 322
FEATURE                 Location/Qualifiers
source                  1..322
                        mol_type = protein
                        organism = Vernicia fordii
SEQUENCE: 4
MGMVEVKNEE EVTIFKSGEI YPTNIFQSVL ALAIWLGSFH FILFLVSSSI FLPFSKFLLV  60
IGLLLFFMVI PINDRSKLGQ CLFSYISRHV CSYFPITLHV EDINAFRSDR AYVFGYEPHS  120
VFPIGVMILS LGLIPLPNIK FLASSAVFYT PFLRHIWSWC GLTPATRKNF VSLLSSGYSC  180
ILVPGGVQET FYMKQDSEIA FLKARRGFIR IAMQTGTPLV PVFCFGQMHT FKWWKPDGEL  240
FMKIARAIKF TPTIFWGVLG TPLPFKNPMH VVVGRPIEVK QNPQPTAEEV AEVQREFIAS  300
LKNLFERHKA RVGYSDLKLE IF                                         322

SEQ ID NO: 5            moltype = AA  length = 355
FEATURE                 Location/Qualifiers
source                  1..355
                        mol_type = protein
                        organism = Mortierella ramanniana
SEQUENCE: 5
MASKDQHLQQ KVKHTLEAIP SPRYAPLRVP LRRRLQTLAV LLWCSMMSIC MFIFFFLCSI  60
PVLLWFPIIL YLTWILVWDK APENGGRPIR WLRNAAWWKL FAGYFPAHVI KEADLDPSKN  120
YIFGYHPHGI ISMGSFCTFS TNATGFDDLF PGIRPSLLTL TSNFNIPLYR DYLMACGLCS  180
VSKTSCQNIL TKGGPGRSIA IVVGGASESL NARPGVMDLV LKRRFGFIKI AVQTGASLVP  240
TISFGENELY EQIESNENSK LHRWQKKIQH ALGFTMPLFH GRGVFNYDFG LLPHRHPIYT  300
IVGKPIPVPS IKYGQTKDEI IRELHDSYMH AVQDLYDRYK DIYAKDRVKE LEFVE       355

SEQ ID NO: 6            moltype = AA  length = 388
FEATURE                 Location/Qualifiers
source                  1..388
                        mol_type = protein
                        organism = Homo sapiens
SEQUENCE: 6
MKTLIAAYSG VLRGERQAEA DRSQRSHGGP ALSREGSGRW GTGSSILSAL QDLFSVTWLN  60
RSKVEKQLQV ISVLQWVLSF LVLGVACSAI LMYIFCTDCW LIAVLYFTWL VFDWNTPKKG  120
GRRSQWVRNW AVWRYFRDYF PIQLVKTHNL LTTRNYIFGY HPHGIMGLGA FCNFSTEATE  180
VSKKFPGIRP YLATLAGNFR MPVLREYLMS GGICPVSRDT IDYLLSKNGS GNAIIIVVGG  240
AAESLSSMPG KNAVTLRNRK GFVKLALRHG ADLVPIYSFG ENEVYKQVIF EEGSWGRWVQ  300
KKFQKYIGFA PCIFHGRGLF SSDTWGLVPY SKPITTVVGE PITIPKLEHP TQQDIDLYHT  360
MYMEALVKLF DKHKTKFGLP ETEVLEVN                                   388

SEQ ID NO: 7            moltype = AA  length = 328
FEATURE                 Location/Qualifiers
source                  1..328
                        mol_type = protein
                        organism = Homo sapiens
SEQUENCE: 7
MAHSKQPSHF QSLMLLQWPL SYLAIFWILQ PLFVYLLFTS LWPLPVLYFA WLFLDWKTPE  60
RGGRRSAWVR NWCVWTHIRD YFPITILKTK DLSPEHNYLM GVHPHGLLTF GAFCNFCTEA  120
TGFSKTFPGI TPHLATLSWF FKIPFVREYL MAKGVCSVSQ PAINYLLSHG TGNLVGIVVG  180
GVGEALQSVP NTTTLILQKR KGFVRTALQH GAHLVPTFTF GETEVYDQVL FHKDSRMYKF  240
QSCFRRIFGF YCCVFYGQSF CQGSTGLLPY SRPIVTVVGE PLPLPQIEKP SQEMVDKYHA  300
LYMDALHKLF DQHKTHYGCS ETQKLFFL                                   328

SEQ ID NO: 8            moltype = AA  length = 361
FEATURE                 Location/Qualifiers
source                  1..361
                        mol_type = protein
                        organism = Bos taurus
SEQUENCE: 8
MKTLIAAYSG VLRGTGSSIL SALQDLFSVT WLNRAKVEKQ LQVISVLQWV LSFLVLGVAC  60
SVILMYTFCT DCWLIAVLYF TWLVFDWNTP KKGGRRSQWV RNWAVWRYFR DYFPIQLVKT  120
HNLLTSRNYI FGYHPHGIMG LGAFCNFSTE ATEVSKKFPG IRPYLATLAG NFRMPVLREY  180
LMSGGICPVN RDTIDYLLSK NGSGNAIIIV VGGAAESLSS MPGKNAVTLR NRKGFVKLAL  240
RHGADLVPTY SFGENEVYKQ VIFEEGSWGR WVQKKFQKYI GFAPCIFHGR GLFSSDTWGL  300
```

```
VPYSKPITTV VGEPITIPRL ERPTQQDIDL YHAMYVQALV KLFDQHKTKF GLPETEVLEV  360
N                                                                  361

SEQ ID NO: 9           moltype = AA  length = 388
FEATURE                Location/Qualifiers
source                 1..388
                       mol_type = protein
                       organism = Mus musculus
SEQUENCE: 9
MKTLIAAYSG VLRGERRAEA ARSENKNKGS ALSREGSGRW GTGSSILSAL QDIFSVTWLN  60
RSKVEKQLQV ISVLQWVLSF LVLGVACSVI LMYTFCTDCW LIAVLYFTWL AFDWNTPKKG  120
GRRSQWVRNW AVWRYFRDYF PIQLVKTHNL LTTRNYIFGY HPHGIMGLGA FCNFSTEATE  180
VSKKFPGIRP YLATLAGNFR MPVLREYLMS GGICPVNRDT IDYLLSKNGS GNAIIIVVGG  240
AAESLSSMPG KNAVTLKNRK GFVKLALRHG ADLVPTYSFG ENEVYKQVIF EEGSWGRWVQ  300
KKFQKYIGFA PCIFHGRGLF SSDTWGLVPY SKPITTVVGE PITVPKLEHP TQKDIDLYHA  360
MYMEALVKLF DNHKTKFGLP ETEVLEVN                                     388

SEQ ID NO: 10          moltype =   length =
SEQUENCE: 10
000

SEQ ID NO: 11          moltype = AA  length = 4
FEATURE                Location/Qualifiers
REGION                 1..4
                       note = conserved sequence
source                 1..4
                       mol_type = protein
                       organism = synthetic construct
SEQUENCE: 11
HPHG                                                               4

SEQ ID NO: 12          moltype = AA  length = 4
FEATURE                Location/Qualifiers
REGION                 1..4
                       note = conserved sequence
source                 1..4
                       mol_type = protein
                       organism = synthetic construct
SEQUENCE: 12
EPHS                                                               4

SEQ ID NO: 13          moltype = AA  length = 24
FEATURE                Location/Qualifiers
REGION                 1..24
                       note = conserved sequence
VARIANT                2
                       note = X can be any amino acid
VARIANT                5
                       note = X can be any amino acid
VARIANT                6
                       note = Lysine (K) or Arginine (R)
VARIANT                7
                       note = X can be any amino acid
VARIANT                9..11
                       note = X can be any amino acid
VARIANT                13..15
                       note = X can be any amino acid
VARIANT                16
                       note = Leucine (L) or Valine (V)
VARIANT                19..21
                       note = X can be any amino acid
VARIANT                24
                       note = Glutamic Acid (E) or Glutamine (Q)
source                 1..24
                       mol_type = protein
                       organism = synthetic construct
SEQUENCE: 13
RXGFXXXAXX XGXXXXVPXX XFGX                                         24

SEQ ID NO: 14          moltype = AA  length = 8
FEATURE                Location/Qualifiers
REGION                 1..8
                       note = conserved sequence
VARIANT                3
                       note = X can be any amino acid
VARIANT                5..7
                       note = X can be any amino acid
source                 1..8
                       mol_type = protein
```

```
                     organism = synthetic construct
SEQUENCE: 14
FLXLXXXN                                                   8

SEQ ID NO: 15        moltype = AA  length = 118
FEATURE              Location/Qualifiers
REGION               1..118
                     note = conserved sequence
source               1..118
                     mol_type = protein
                     organism = synthetic construct
SEQUENCE: 15
ALVVANHQSF LDPLVLSALL PRKGGRVRFV AKKELFYVPL LGWLLRLLGA IFIDRENGRL  60
ARAALREAVR LLRDGGWLLI FPEGTRSRPG KLLPFKKGAA RLALEAGVPI VPVAIRGT    118

SEQ ID NO: 16        moltype = AA  length = 187
FEATURE              Location/Qualifiers
REGION               1..187
                     note = conserved sequence
VARIANT              15
                     note = X can be any amino acid
VARIANT              18
                     note = X can be any amino acid
VARIANT              23
                     note = X can be any amino acid
VARIANT              25..26
                     note = X can be any amino acid
VARIANT              28..30
                     note = X can be any amino acid
VARIANT              32..33
                     note = X can be any amino acid
VARIANT              35..38
                     note = X can be any amino acid
VARIANT              41
                     note = X can be any amino acid
VARIANT              46..48
                     note = X can be any amino acid
VARIANT              53
                     note = X can be any amino acid
VARIANT              55..57
                     note = X can be any amino acid
VARIANT              61
                     note = X can be any amino acid
VARIANT              67
                     note = X can be any amino acid
VARIANT              72
                     note = X can be any amino acid
VARIANT              74..77
                     note = X can be any amino acid
VARIANT              79
                     note = X can be any amino acid
VARIANT              114
                     note = X can be any amino acid
VARIANT              127..128
                     note = X can be any amino acid
VARIANT              136
                     note = X can be any amino acid
VARIANT              139..142
                     note = X can be any amino acid
VARIANT              144
                     note = X can be any amino acid
VARIANT              150
                     note = X can be any amino acid
VARIANT              164..165
                     note = X can be any amino acid
VARIANT              167..172
                     note = X can be any amino acid
source               1..187
                     mol_type = protein
                     organism = synthetic construct
SEQUENCE: 16
AVFDKDGTLT EDDTXFLXYL LKXLXXLXXX LXXDXXXXGS XLTLSXXXDL LEXLXXXGGI  60
XVIGLAXRYL EXLXXXXEXA KLFEGFIKPD AAELLKELHE AGLRVVVLTG DPRXIAKPVA  120
KELGIDXXNV LATELXDEXX XXVXGRITGX LDKARAVERL VVLXXKXXXX XXVVAIGDSA  180
NDLPALK                                                    187

SEQ ID NO: 17        moltype = AA  length = 190
FEATURE              Location/Qualifiers
REGION               1..190
```

```
                        note = conserved sequence
source                  1..190
                        mol_type = protein
                        organism = synthetic construct
SEQUENCE: 17
IKAVVFDKDG TLTDGEPPIA EAIVEAAAEL GLPLLLPLEE VEKLLGRGVE GIERILLEGG  60
LTAELLLELE GELAAGKTAV LVALDGEVLG LIALADKLYP GAREALKALK ERGIKVAILT  120
NGDRANAEAV LEALGLADLF DVIVDSDDVG PVKPKPEIFL KALERLGVKP EEVLMVGDGV  180
NDAPALAAAG                                                        190

SEQ ID NO: 18           moltype = AA  length = 15
FEATURE                 Location/Qualifiers
REGION                  1..15
                        note = conserved sequence
source                  1..15
                        mol_type = protein
                        organism = synthetic construct
SEQUENCE: 18
GDLVICPEGT TCREP                                                  15

SEQ ID NO: 19           moltype =   length =
SEQUENCE: 19
000

SEQ ID NO: 20           moltype =   length =
SEQUENCE: 20
000

SEQ ID NO: 21           moltype = AA  length = 356
FEATURE                 Location/Qualifiers
source                  1..356
                        mol_type = protein
                        organism = Arabidopsis thaliana
SEQUENCE: 21
MDWEIRGSSL GQKLLEFDSE QERQTRFRAY DSEEAAAHTY DLAALKYWGP DTILNFPAET  60
YTKELEEMQR VTKEEYLASL RRQSSGFSRG VSKYRGVARH HHNGRWEARI GRVFGNKYLY  120
LGTYNTQEEA AAAYDMAAIE YRGANAVTNF DISNYIDRLK KKGVFPFPVN QANHQEGILV  180
EAKQEVETRE AKEEPREEVK QQYVEEPPQE EEEKEEEKAE QQEAEIVGYS EEAAVVNCCI  240
DSSTIMEMDR CGDNNELAWN FCMMDTGFSP FLTDQNLANE NPIEYPELFN ELAFEDNIDF  300
MFDDGKHECL NLENLDCCVV GRESPPSSSS PLSCLSTDSA SSTTTTTTSV SCNYLV      356

SEQ ID NO: 22           moltype = AA  length = 430
FEATURE                 Location/Qualifiers
source                  1..430
                        mol_type = protein
                        organism = Arabidopsis thaliana
SEQUENCE: 22
MKKRLTTSTC SSSPSSSVSS STTTSSPIQS EAPRPKRAKR AKKSSPSGDK SHNPTSPAST  60
RRSSIYRGVT RHRWTGRFEA HLWDKSSWNS IQNKKGKQVY LGAYDSEEAA AHTYDLAALK  120
YWGPDTILNF PAETYTKELE EMQRVTKEEY LASLRRQSSG FSRGVSKYRG VARHHHNGRW  180
EARIGRVFGN KYLYLGTYNT QEEAAAAYDM AAIEYRGANA VTNFDISNYI DRLKKKGVFP  240
FPVNQANHQE GILVEAKQEV ETREAKEEPR EEVKQQYVEE PPQEEEEKEE EKAEQQEAEI  300
VGYSEEAAVV NCCIDSSTIM EMDRCGDNNE LAWNFCMMDT GFSPFLTDQN LANENPIEYP  360
ELFNELAFED NIDFMFDDGK HECLNLENLD CCVVGRESPP SSSSPLSCLS TDSASSTTTT  420
TTSVSCNYLV                                                        430

SEQ ID NO: 23           moltype = AA  length = 430
FEATURE                 Location/Qualifiers
source                  1..430
                        mol_type = protein
                        organism = Arabidopsis lyrata
SEQUENCE: 23
MKRRLTTSTS SSSPSSSVSS STTTSSPIQS EAPRPKRAKR AKKSSPSGDK SHNPTSPAST  60
RRSSIYRGVT RHRWTGRFEA HLWDKSSWNS IQNKKGKQGA YDSEEAAAHT YDLAALKYWG  120
PDTILNFPAE TYTKELEEMQ RVTKEEYLAS LRRQSSGFSR GVSKYRGVAR HHHNGRWEAR  180
IGRVFGNKYL YLGTYNTQEE AAAAYDMAAI EYRGANAVTN FDISNYIDRL KKKGVFPFPV  240
NQPNHQEAIL VEAKQEIETR EAKEEPREEV KQQYVEEPPQ EEKEEEKAEQ QEAEFVGYKD  300
EGAVVNCCID SSAIMEMNRC GDNNELAWNF CMMDSGFAPF LTDQNLSNEN PIEYPELFNE  360
LAFEDNIDFM FDEAKNDCLS LENLDCCVVG RESPTSSSSP LSCFSTDSAS STTTTTSVSC  420
NYLGLFVGSE                                                        430

SEQ ID NO: 24           moltype = AA  length = 413
FEATURE                 Location/Qualifiers
source                  1..413
                        mol_type = protein
                        organism = Brassica napus
SEQUENCE: 24
MKRPLTTSPS SSSSTSSSAC ILPTQSETPR PKRAKRAKKS SLRSDVKPQN PTSPASTRRS  60
SIYRGVTRHR WTGRYEAHLW DKSSWNSIQN KKGKQVYLGA YDSEEAAAHT YDLAALKYWG  120
```

```
PNTILNFPVE TYTKELEEMQ RCTKEEYLAS LRRQSSGFSR GVSKYRGVAR HHHNGRWEAR  180
IGRVFGNKYL YLGTYNTQEE AAAAYDMAAI EYRGANAVTN FDIGNYIDRL KKKGVFPFPV  240
SQANHQEAVL AETKQEVEAK EEPTEEVKQC VEKEEAKEEK TEKKQQQEVE EAVITCCIDS  300
SESNELAWDF CMMDSGFAPF LTDSNLSSEN PIEYPELFNE MGFEDNIDFM FEEGKQDCLS  360
LENLDCCDGV VVVGRESPTS LSSSPLSCLS TDSASSTTTT ATTVTSVSWN YSV         413

SEQ ID NO: 25          moltype = AA  length = 415
FEATURE                Location/Qualifiers
source                 1..415
                       mol_type = protein
                       organism = Brassica napus
SEQUENCE: 25
MKRPLTTSPS TSSSTSSSAC ILPTQPETPR PKRAKRAKKS SIPTDVKPQN PTSPASTRRS  60
SIYRGVTRHR WTGRYEAHLW DKSSWNSIQN KKGKQVYLGA YDSEEAAAHT YDLAALKYWG  120
PDTILNFPAE TYTKELEEMQ RCTKEEYLAS LRRQSSGFSR GVSKYRGVAR HHHNGRWEAR  180
IGRVFGNKYL YLGTYNTQEE AAAAYDMAAI EYRGANAVTN FDISNYIDRL KKKGVFPFPV  240
SQANHQEAVL AEAKQEVEAK EEPTEEVKQC VEKEEPQEAK EEKTEKKQQQ QEVEEAVVTC  300
CIDSSESNEL AWDFCMMDSG FAPFLTDSNL SSENPIEYPE LFNEMGFEDN IDFMFEEGKQ  360
DCLSLENLDC CDGVVVVGRE SPTSLSSSPL SCLSTDSASS TTTTTITSVS CNYSV       415

SEQ ID NO: 26          moltype = AA  length = 285
FEATURE                Location/Qualifiers
source                 1..285
                       mol_type = protein
                       organism = Glycine max
SEQUENCE: 26
MKRSPASSCS SSTSSVGFEV HHPIEKRRPK HPRRNNLKSQ KCKQNQTTTG GRRSSIYRGV  60
TRHRWTGRFE AHLWDKSSWN NIQSKKGKQV YLGAYDTEES AARTYDLAAL KYWGKDATLN  120
FPIETYTKDL EEMDKVSREE YLASLRRQSS GFSRGISKYR GVARHHHNGR WEARIGRVCG  180
NKYLYLGTYK TQEEAAVAYD MAAIEYRGVN AVTNFDISNY MDKIKKKNDQ TLQQQQTEVQ  240
TETVPNSSDS EEAEVEQQHT TTITTPPPSE NLHMLPQEHQ VGGWV                 285

SEQ ID NO: 27          moltype = AA  length = 417
FEATURE                Location/Qualifiers
source                 1..417
                       mol_type = protein
                       organism = Jatropha curcas
SEQUENCE: 27
MKRSSASSCS SSSSSSSSPS SSSSSACSAS SSCLDSVSPP NHHQLRSEKS KSKRIRKIQT  60
KQDKCQTTAT TTSPSGGGRR SSIYRGVTRH RWTGRFEAHL WDKSSWNNIQ NKKGRQVYLG  120
AYDNEEAAAH TYDLAALKYW GQDTTLNFPI ETYSKELEEM QKMSKEEYLA SLRRRSSGFS  180
RGVSKYRGVA RHHHNGRWEA RIGRVFGNKY LYLGTYNTQE EAAAAYDMAA IEYRGANAVT  240
NFDVSHYIDR LKKKGIPLDK ILPETLSKGS KESEEIERTS PLPLPSPPSP SITPLHEEIV  300
SPQLLETECP QHPPCMDTCT MIVMDPIEEH ELTWSFCLDS GLVPLPVPDL PLANGCELPD  360
LLDDTGFEDN IDLIFDACCF GNDANPADEN GKERLSSAST SPSCSTTLTS VSCNYSV     417

SEQ ID NO: 28          moltype = AA  length = 443
FEATURE                Location/Qualifiers
source                 1..443
                       mol_type = protein
                       organism = Ricinus communis
SEQUENCE: 28
MKRSPTSPCS SSSSSSYSSS SASSSCVGPD DTPVAPGSHH HHDHHQLRSQ KSSKRIRKVK  60
KKQQNHNIDQ NNTNTTITAP TSARRSSIYR GVTRHRWTGR FEAHLWDKSS WNNIQNKKGR  120
QGAYDNEEAA AHTYDLAALK YWGPETTLNF PIETYPKELE EMQKMSKEEY LASLRRQSSG  180
FSRGVSKYRG VARHHHNGRW EARIGRVFGN KYLYLGTYNT QEEAAAAYDM AAIEYRGANA  240
VTNFDISNYI DRLKKKGILL DQILPDQPLR KCSSESEEAE AEAEVERLPS LPSSILPQEQ  300
DTISPQLQCT QLLPSMDSCT MINMDPIEDN ELTWSFCLDS GLTLFSVPEL PLENACELPD  360
LFDDTGFEDN IDLIFDGCCF GNDDDGGGGA NHQEFMVESR GCRVGEVGIS GSMEEENGKE  420
MCCSSSSPSC STTTSVSCCN YSV                                         443

SEQ ID NO: 29          moltype = AA  length = 402
FEATURE                Location/Qualifiers
source                 1..402
                       mol_type = protein
                       organism = Populus trichocarpa
SEQUENCE: 29
MKRSSSCSSS SSSSSSSCVA SESIHKPKAK RIRKNQKSNQ GKSQNAAAAA ANNSHNSGKR  60
SSIYRGVTRH RWTGRFEAHL WDKSSWNSIQ NKKGKQGAYD NEEAAAHTYD LAALKYWGSE  120
TTLNFPIETY TKEIEEMQKV TKEEYLASLR RQSSGFSRGV SKYRGVARHH HNGRWEARIG  180
RVYGNKYLYL GTYNTQEEAA AAYDMAAIQY RGANAVTNFD VSNYIERLRK KGIPIDRILQ  240
EQQLLNNSVD SSVEVEVEQP TPPPQQQQEE QEQKIVSSSS QLQCSQLNSS LDGTPPMVIM  300
DTIEEHELAW SFCMDSGLSL TMPDLPLENS CELPDLFDHT GFEDNIDLIF DACCYGKEAN  360
PAGYTLEDNS TGGVEEDRLS SDSVSNSPTS STTTSVSCNY SV                    402

SEQ ID NO: 30          moltype = AA  length = 409
FEATURE                Location/Qualifiers
source                 1..409
                       mol_type = protein
```

```
                        organism = Vitis vinifera
SEQUENCE: 30
MVKRSSPGSS SSPSSSSTSS DAASRPAPPS GGKPKSRKKE AKKNSNGNGS NSKNKRTSIY  60
RGVTKHRWTG RFEAHLWDKS SWNDISNKRG RQGAYYNEEA AARTYDLAAL KYWGPTTPLN  120
FPLETYQKDA EEMEKMSKEE YLALLRRQSN GFSRGVSKHH HNGRWEARIG RVLGNKYLYL  180
GTYSTQEEAA AAYDMAAIEY RGLNAVTNFD ISNYVKLGRV EAQVQELAQQ LQPNTPIGPQ  240
NELQKEEEEQ LQEPVLSSSQ HLPSMDSSAM EIMDPADDPD LPWNFCAYST LLVPDVPLGK  300
GGELSDLFYE KGFEDNIDYM FEGAAGNEEE SNSAENGVKE NGFMHELEVD GKLQNVVGFF  360
FLSFFFLPKR AGIRKRGVDS CMQLFLYFVF LFYPFLPEVS KFLFHLSLD            409

SEQ ID NO: 31           moltype = AA  length = 420
FEATURE                 Location/Qualifiers
source                  1..420
                        mol_type = protein
                        organism = Brachypodium distachyon
SEQUENCE: 31
MKRSPPQPSP SPSSSPASSS SSPSSSDSSS SIAIPRKRAR TAAAAAGGGK ARAAAAKRPK  60
KDGKDSGSSS NGGGGGGGKR SSIYRGVTRH RWTGRFEAHL WDKNCFTSLQ NKKKGRQVYL  120
GAYDTEEAAA RAYDLAALKY WGPETTLNFS ADDYGKERSE MEAVSREEYL AALRRRSSGF  180
SRGVSKYRGV ARHHHNGRWE ARIGRVLGNK YLYLGTFDTQ EEAARAYDLA AIQYRGANAV  240
TNFDISRYLD QPQLLEQLQQ QQGPQVVAAL QEEAQRDHQS DNAVQELNSG EAQTPGGIDE  300
PIAIGDSTED INTSLTVDDI IEESLWSPYE FDIMAGVNVS NSMNLSELFS DVAFEGNIGC  360
LFEECSGIDD CSSRHGAGLA AFGLFTEGDD KLKDVSEMEM EVNPQANDVS CPPKMITVCN  420

SEQ ID NO: 32           moltype = AA  length = 423
FEATURE                 Location/Qualifiers
source                  1..423
                        mol_type = protein
                        organism = Hordeum vulgare
SEQUENCE: 32
MKRSPPPQPS PSSSPACSPS PSSPSSSDSS SIAIPRKRAR TQKAGSAKAK AAPKRAKKDS  60
GRSTKDSDAS ANGAAASGKR SSIYRGVTRH RWTGRFEAHL WDKNCFTSIQ NKKKGRQVYL  120
GAYDTEEAAA RAYDLAALKY WGPETTLNFT VDEYAKERSE MEAVSREEYL AALRRRSSGF  180
SRGVSKYRGV ARHHHNGRWE ARIGRVLGNK YLYLGTFDTQ EEAARAYDLA AIEYRGANAV  240
TNFDISRYLD QPQLLAQLEQ GPQVVPALQE ELQHDHQSDN AVQELNSGEA QKPGSVSEPI  300
AVDDTDNTGD IGAPLVFDSG VEENLWSPCM DYDVDPIFGP NISSSMNLSE WFNDPAFESN  360
IGYMFEGCSD VDDCSTRHGA GLSALGFLKE GDDKLKDGSD MEAEITPQAN DVSCPPKMIT  420
VCN                                                              423

SEQ ID NO: 33           moltype = AA  length = 443
FEATURE                 Location/Qualifiers
source                  1..443
                        mol_type = protein
                        organism = Oryza sativa
SEQUENCE: 33
MAKRSSPDPA SSSPSASSSP SSPSSSSSED SSSPMSMPCK RRARPRTDKS TGKAKRPKKE  60
SKEVVDPSSN GGGGGKRSSI YRGVTRHRWT GRFEAHLWDK NCSTSLQNKK KGRQGAYDSE  120
EAAARAYDLA ALKYWGPETV LNFPLEEYEK ERSEMEGVSR EEYLASLRRR SSGFSRGVSK  180
YRGVARHHHN GRWEARIGRV LGNKYLYLGT FDTQEEAAKA YDLAAIEYRG ANAVTNFDIS  240
CYLDQPQLLA QLQQEPQLLA QLQQEPQVVP ALHEEPQDDD RSENAVQELS SSEANTSSDN  300
NEPLAADDSA ECMNEPLPIV DGIEESLWSP CLDYELDTMP GAYFSNSMNF SEWFNDEAFE  360
GGMEYLFEGC SSITEGGNSM DNSGVTEYNL FEECNMLEKD ISDFLDKDIS DFLDKDISIS  420
DGERISPQAN NISCPQKMIS VCN                                        443

SEQ ID NO: 34           moltype = AA  length = 420
FEATURE                 Location/Qualifiers
source                  1..420
                        mol_type = protein
                        organism = Sorghum bicolor
SEQUENCE: 34
MDMERSQQQK SPTESPPPPS PSSSSSSVSA DTVLPPPGKR RRAATTAKAK AGAKPKRARK  60
DAAAAADPPP PPAAAAAGKR SSVYRGVTRH RWTGRFEAHL WDKHCLAALH NKKKGRQVYL  120
GAYDSEEAAA RAYDLAALKY WGPETLLNFP VEDYSSEMPE MEGVSREEYL ASLRRRSSGF  180
SRGVSKYRGV ARHHHNGRWE ARIGRVFGNK YLYLGTFDTQ EEAAKAYDLA AIEYRGVNAV  240
TNFDISCYLD HPLFLAQLQQ EPQVVPALNQ EAQPDQSETE TIAQESVSSE AKTPDDNAEP  300
DDNAEPDDIA EPLITVDDSI EESLWSPCMD YELDTMSRSN FGSSINLSEW FNDADFDSNI  360
GCLFDGCSAV DEGGKDGVGL ADFSLLEDFS LFEAGDGQLK DVLSDMEEGI QPPTMISVCN  420

SEQ ID NO: 35           moltype = AA  length = 395
FEATURE                 Location/Qualifiers
source                  1..395
                        mol_type = protein
                        organism = Zea mays
SEQUENCE: 35
MERSQRQSPP PPSPSSSSSS VSADTVLVPP GKRRRAATAK AGAEPNKRIR KDPAAAAAGK  60
RSSVYRGVTR HRWTGRFEAH LWDKHCLAAL HNKKKGRQVY LGAYDSEEAA ARAYDLAALK  120
YWGPETLLNF PVEDYSSEMP EMEAVSREEY LASLRRRSSG FSRGVSKYRG VARHHHNGRW  180
EARIGRVFGN KYLYLGTFDT QEEAAKAYDL AAIEYRGVNA VTNFDISCYL DHPLFLAQLQ  240
QEPQVVPALN QEPQPDQSET GTTEQEPESS EAKTPDGSAE PDENAVPDDT AEPLSTVDDS  300
```

```
IEEGLWSPCM DYELDTMSRP NFGSSINLSE WFADADFDCN IGCLFDGCSA ADEGSKDGVG  360
LADFSLFEAG DVQLKDVLSD MEEGIQPPAM ISVCN                             395

SEQ ID NO: 36          moltype = AA  length = 413
FEATURE                Location/Qualifiers
source                 1..413
                       mol_type = protein
                       organism = Brachypodium distachyon
SEQUENCE: 36
MEAYCSTLVK DELINGGGGG SAGGMRYCEA APRVSPPVAI KSVKRRKREP PAVSGMTTVS  60
GGGKDGDKSA GNAAAKRSSR FRGVSRHRWT GRFEAHLWDK GTWNPTQKKK GKQVYLGAYN  120
EEEAAARAYD LAALKYWGPT TYTNFPVVDY EKELKVMQGV SREEYLASIR RKSNGFSRGV  180
SKYRGVARHH HNGRWEARIG RVFGNKYLYL GTYSTQEEAA RAYDIAAIEY RGINAVTNFD  240
LSSYIRWLKP NSTINTNTPA AELAILGGGG TPAALITPPP TMHVPRLLPP LVKGRGSSIA  300
DDVSAGSCVF GGPSPSPSPT TTALSLLLRS SVFQELVAQQ QPPSTVDDDD DIGGHAAVSD  360
AAQRAAEENE ESFGEVLYGA GEGEAATAFS CSMYELGLDD NFARIEESLW GCL         413

SEQ ID NO: 37          moltype = AA  length = 423
FEATURE                Location/Qualifiers
source                 1..423
                       mol_type = protein
                       organism = Brachypodium sylvaticum
SEQUENCE: 37
MEAYCSSLVK DELINGGGGG AGGMRYCEAA PRVSPPVAIK SVKRRKREPP AVSGMTTVSG  60
GGGGNGKDGD KSAGNAAAAK RSSRFRGVSR HRWTGRFEAH LWDKGTWNPT QKKKGKQVYL  120
GAYNEEEAAA RAYDLAALKY WGPTTYTNFP VVDYEKELKV MQGVSREEYL ASIRRKSNGF  180
SRGVSKYRGV ARHHHNGRWE ARIGRVFGNK YLYLGTYSTQ EEAARAYDIA AIEYRGINAV  240
TNFDLSSYIR WLKPNSAANT NTPPAAAAEL AILGGAPAAL ISPAPAPTTM RVPRLLPPLV  300
RGRGGSIPDD VSAGGSCVFG SPSPSPSPTT TSALSLLLRS SVFQELVAQQ QPPSIVDDDD  360
GVGGQEAVSD AAERAAEENE ESFGEVLYGA GEGEAAAAFS CSMYELGLDD SFARIEESLW  420
GCL                                                                423

SEQ ID NO: 38          moltype = AA  length = 399
FEATURE                Location/Qualifiers
source                 1..399
                       mol_type = protein
                       organism = Oryza sativa
SEQUENCE: 38
METYGLVKDE LLHGIGGGQG RLYCEVKPTA APAVITAAGG GAKSVKRRKR EPSAAAMSAV  60
TVAGNGKEAG GSNAANKRSS RFRGVSRHRW TGRFEAHLWD KGTWNPTQKK KGKQVYLGAY  120
NEEDAAARAY DLAALKYWGP TTYTNFPVAD YEKELKLMQG VSKEEYLASI RRKSNGFSRG  180
VSKYRGVARH HHNGRWEARI GRVFGNKYLY LGTYSTQEEA ARAYDIAAIE YRGINAVTNF  240
DLSTYIRWLK PPSSSSAAGT PHHHGGGMVV GADRVLAPAQ SYPISAAADD DVAGCWRPLP  300
SPSSSTTTAL SLLLRSSMFQ ELVARQPVVE GDDGQLAVVS GDDADADADS DVKEPPPESE  360
YGEVFASDEA AAAAAYGCSM YELDDSFALI DDSVWNCLI                         399

SEQ ID NO: 39          moltype = AA  length = 488
FEATURE                Location/Qualifiers
source                 1..488
                       mol_type = protein
                       organism = Sorghum bicolor
SEQUENCE: 39
METYSLQVKD ELHGGGIGIG GGGQGLYCGA TPRPAAPAAT GGGGGGGDGA VKSNKRSRKR  60
EPPPPPPSSL VTMSNGGKDE AVAGSGDKSA SSNSNASKRS SRFRGVSRHR WTGRFEAHLW  120
DKGTWNPTQK KKGKQVYLGA YNEEDAAARA YDLAALKYWG PTTYTNFPVV DYERELKVMQ  180
NVSKEEYLAS IRRKSNGFSR GVSKYRGVAR HHHNGRWEAR IGRVFGNKYL YLGTYSTQEE  240
AARAYDIAAI EYRGINAVTN FDLSTYIRWL KPGGGVEDSA AGTPTSGVRA PGIPPASLSL  300
QAGGLLQHPH GAAAGMLQVD VDDLYRGQLA AARGAALFSG GIDDVGSVYA AGSAGPSPTA  360
LCAGRPSPSP SPSSSTTALS LLLRSSVFQE LVARNAGGGA AQQQQLVVAD DDGAVSPADV  420
VDAKVEQPEA EGELGRHGDQ LYGAARADED EDAFACSMYE LDDSFARMEQ SLWGCLRSSD  480
APDNMNNL                                                           488

SEQ ID NO: 40          moltype = AA  length = 443
FEATURE                Location/Qualifiers
source                 1..443
                       mol_type = protein
                       organism = Sorghum bicolor
SEQUENCE: 40
MESSGMMMVK SEIESCGYPG PSSSTAPAAG VVIGGSATTE RGEGGHHHHH HQVVVRRRRR  60
EPPLLAPIAG GGIGKPLPSI TVKRSSRFRG VSRHRWTGRF EAHLWDKNSW NPTQRKKGKQ  120
VYLGAYDEEE AAARAYDLAA LKYWGPTTYT NFPVMDYEKE LKIMENLTKE EYLASLRRKS  180
SGFSRGVSKY RGVARHHQNG RWEARIGRVF GNKYLYLGTY STQEEAARAY DIAAIEYKGV  240
NAVTNFDLRS YITWLKPSGA PAAFNPEAAL LMQAAPAEQL LHPAETAQML PRVGNPFLLD  300
HGAAPPGSSG GGGQDASMSS MVSPGAGGGM RRRGSSTALS LLLKSSMFRQ LVEKNSDAEE  360
GVRDREDAAA AAAAAHPAGP GDAYEYHNFF QGEAPPDMCD LFSSGGGGDH ARNAGFHGEI  420
AACYDDGEGL DGWNGFGNMS SLQ                                          443

SEQ ID NO: 41          moltype = AA  length = 407
FEATURE                Location/Qualifiers
```

```
source                1..407
                      mol_type = protein
                      organism = Glycine max
SEQUENCE: 41
MELAPVKSEL SPRSHRLLMI DGSEVIGTKC VKRRRRDSST AVLGGNGQQG EQLEEQKQLG  60
GQSTATTVKR SSRFRGVSRH RWTGRFEAHL WDKGTWNPTQ KKKGKQVYLG AYNDEEAAAR  120
AYDLAALKYW GISTFTNFPV SDYEKEIEIM KTVTKEEYLA SLRRRSSGFS RGVSKYRGVA  180
RHHHNGRWEA RIGRVFGNKY LYLGTYSTQE EAARAYDIAA IEYRGINAVT NFDLSTYIRW  240
LRPGTHPTAS HDQKPSTDAQ PFATSNSMQA RGNIEVSNSN KNSFPSGKLD STKKRDFSKY  300
MNPLSPCNKP SSPTALGLLL KSSVFRELMQ RNLNSSSEEA EEVELKYPHE GNDGVGGIYD  360
NENTNNSYFC SSNISRLPNL ESSEESPLPM YHGTVQSLWN SAFNMSN                407

SEQ ID NO: 42         moltype = AA  length = 406
FEATURE               Location/Qualifiers
source                1..406
                      mol_type = protein
                      organism = Glycine max
SEQUENCE: 42
MELAPVKSEL SPRSHRLVII DGSDVISTKC AKRRRRDSSM AVLGGNGQQG EQLEEQKQLG  60
GQSTATTVKR SSRFRGVSRH RWTGRFEAHL WDKGTWNPTQ KKKGKQVYLG AYNDEEAAAR  120
AYDLAALKYW GTSTFTNFPV SDYEKEIEIM KTVTKEEYLA SLRRRSSGFS RGVSKYRGVA  180
RHHHNGRWEA RIGRVFGNKY LYLGTYSTQE EAARAYDIAA IEYRGINAVT NFDLSTYIRW  240
LRPGTHPTAS HDQKPSTDAQ LFATSNSMQT RGNIEVSNSN MHSFPSGELD STKKRDFSKY  300
MNPLSPCNKP SSPTALGLLL KSSVFRELMQ RNLNSSSEEA DVELKYPQEG NDGVGGIYDN  360
DNTSNSYFCS SNISRLPNLE SSEECPLPMY HGTMQSLWNS AFNMSN                 406

SEQ ID NO: 43         moltype = AA  length = 418
FEATURE               Location/Qualifiers
source                1..418
                      mol_type = protein
                      organism = Populus trichocarpa
SEQUENCE: 43
MEMTRNTGDQ ISLGRRRLCM IEEERRAGEA GKCIKRRRRD PSTFALSCNI NDQQSDQQQQ  60
QQSLGDRTAA VATTVKRSSR FRGVSRHRWT GRFEAHLWDK GTWNPTQRKK GKQGAYDEEE  120
SAARAYDLAA LKYWGTSTFT NFPASDYEKE IEIMKTVTKE EYLASLRRRS SGFSRGVSKY  180
RGVARHHHNG RWEARIGRVF GNKYLYLGTY STQEEAAHAY DIAAIEYRGI NAVTNFDLST  240
YIRWLKPEAS LPAPQTQESK PASDPLPMAT FSNHLPSEKP TQLSVLQMDP SLMDNLNTPK  300
NEDIFHRKTL PVSPLTRSSS STALSLLFKS SIFKELVEKN LNTTSEEIEE NDSKNPHNGN  360
NNAGEAFYDG LSPIPHTGTS TEDPFLCSEQ GETNTLPPYS GMEQSLWNGA LSMPSRFH    418

SEQ ID NO: 44         moltype = AA  length = 336
FEATURE               Location/Qualifiers
source                1..336
                      mol_type = protein
                      organism = Vitis vinifera
SEQUENCE: 44
MEMTTVKSEL GLERGRLCTA ETDALEVTKC VKRRRRDPSA VTPGCSKQGE QQKQVLLQAG  60
QSITAIATTM KRSSRFRGVS RHRWTGRFEA HLWDKGSWNV TQRKKGKQVY LGAYDEEESA  120
ARAYDLAALK YWGPSTFTNF PVSDYEKEIE IMQGLTKEEY LASLRRRSSG FSRGVSKYRG  180
VARHHHNGRW EARIGRVFGN KYLYLGTYST QEEAAHAYDI AAIEYRGINA VTNFELSTYV  240
RWLRPRATAL TPQEPRSNSI MQASSNCLPN EEVELSFLSP NPFTVDDLAT PLKQEKFQRE  300
VSISPCTKSS SPTALSLLHR SSVFRQLVEK NSNSIE                            336

SEQ ID NO: 45         moltype = AA  length = 389
FEATURE               Location/Qualifiers
source                1..389
                      mol_type = protein
                      organism = Glycine max
SEQUENCE: 45
MAMMKENIIE VSLGRRQMSM TEGEFQGTRS VKRRRREVAA AAGSGDDNHQ QQLPQQEVGE  60
NTTVNTTKRS SRFRGVSRHR WTGRYEAHLW DKLSWNITQK KKGKQGAYDE EESAARAYDL  120
AALKYWGTST FTNFPISDYE KEIQIMQTMT KEEYLATLRR KSSGFSRGVS KYRGVARHHH  180
NGRWEARIGR VFGNKYLYLG TYSTQEEAAR AYDIAAIEYR GIHAVTNFDL STYIKWLKPS  240
GGGTLEANLE SHAALEHQKV ASPSNYALTE ESKSLALHNS FFSPYSLDSP VKHERFGNKT  300
YQFSSNKSSS PTALGLLLRS SLFRELVEKN SNVSGEEDDG EATKDQQTQI ATDDDLGGIF  360
FDSFSDIPFV CDPNRYDLEL QERDLHSIF                                    389

SEQ ID NO: 46         moltype = AA  length = 389
FEATURE               Location/Qualifiers
source                1..389
                      mol_type = protein
                      organism = Glycine max
SEQUENCE: 46
MVMMKENIIE EKLGRSQMSM VEGEFQGTWG VKRRRREVAA AASSGDDNHH QQLPQQEVGE  60
NSSISTTKRS SRFRGVSRHR WTGRYEAHLW DKLSWNITQK KKGKQGAYDE EESAARAYDL  120
AALKYWGNST FTNFPISDYE KEIEIMQTMT KEEYLATLRR KSSGFSRGVS KYRGVARHHH  180
NGRWEARIGR VFGNKYLYLG TYSTQEEAAR AYDIAAIEYR GIHAVTNFDL STYIKWLKPS  240
GGGTPEENLE SHAVLEHQKL ASPSNYALTE ESKSLVLPNS FISPDSLDSP VKHESFGNKT  300
YQFSRNKSSS PTALGLLLRS SLFRELVEKN SNVSGEEADG EVTKDQQPQL ASDDDLDGIF  360
```

```
FDSFGDIPFV CDPTRYNLEL QERDLHSIF                                389

SEQ ID NO: 47          moltype = AA  length = 392
FEATURE                Location/Qualifiers
source                 1..392
                       mol_type = protein
                       organism = Medicago truncatula
SEQUENCE: 47
MAMLIENEVM CLGKSQRSMD GKEVKGARRV KRQRRDAIVP KIGDDANKMA QKQVGENSTT  60
NTSKRSSRFR GVSRHRWTGR FEAHLWDKLS WNTTQKKKGK QGAYDEEESA ARAYDLAALK  120
YWGTSTFTNF PISDYDKEIE IMNTMTKEEY LATLRRKSSG FSRGVSKYRG VARHHHNGRW  180
EARIGRVFGN KYLYLGTYST QEEAARAYDI AAIEYRGIHA VTNFELSSYI KWLKPETTTE  240
ENHESQILQK ESRTLAPPNN STLLQESKLL ALQKSFFIPN DLNSTEKQES SFENKNYHFL  300
SNKSTSPTAL SLLLRSSLFR ELLEKNSNVS EDEVTKEQQQ QQITSDDELG GIFYDGIDNI  360
SFDFDPNSCN IELQERDLHS ISCLYQYLNF GQ                            392

SEQ ID NO: 48          moltype = AA  length = 386
FEATURE                Location/Qualifiers
source                 1..386
                       mol_type = protein
                       organism = Populus trichocarpa
SEQUENCE: 48
MMMIKNEENP GRRRGCIADS EAQVARCVKR RRRDPAIVAL GSDDNQSQQQ MPQKQTDQTS  60
AATTVKRSSR FRGVSRHRWT GRFEAHLWDK LSWNVTQKKK GKQGAYDEEE SAARAYDLAA  120
LKYWGTSTFT NFPISDYEKE IEIMQTVTKE EYLASLRRKS SGFSRGVSKY RGVARHHHNG  180
RWEARIGRVF GNKYLYLGTY STQEEARAY DIAAIEYRGI NAVTNFDLST YIRWIKPGVA  240
AQAAANELQT VTDPQTAATL TDTYTPREET KPSLFLPNQF TADYLNSPPK LDAFQNNIFV  300
DSSNKTSSPT ALSLSLLRSSV FRELVEKNSN VCEEETDGNE IKNQPMAGSD DEYGGIFYDG  360
IGDIPFVYSS NKYSLGLEER ELQFVL                                   386

SEQ ID NO: 49          moltype = AA  length = 372
FEATURE                Location/Qualifiers
source                 1..372
                       mol_type = protein
                       organism = Ricinus communis
SEQUENCE: 49
MEMMMVKNEE ISGRRRASVT ESEAYVARCV KRRRRDAAVV TVGGDDSQSH QQQQQQQPEQ  60
QAHQISAATT VKRSSRYRGV SRHRWTGRFE AHLWDKLSWN VTQKKKGKQG AYDEEESAAR  120
AYDLAALKYW GTSTFTNFPI SDYEKEIEIM QTVTKEEYLA SLRRKSSGFS RGVSKYRGVA  180
RHHHNGRWEA RIGRVFGNKY LYLGTYSTQE EAARAYDIAA IEYRGINAVT NFDLSTYIRW  240
LKPEVAAQVA ANEPQTVAES RMLPSINNRI AREESKPSFF SATPFSLDCW SYPRKQEEFQ  300
NRTPITPCSK TSSPTALSLL LRSSIFRELV EKNSNVSEDE NEGEETKNQS QIGSDDEFGG  360
LFYERIGDIP FI                                                  372

SEQ ID NO: 50          moltype = AA  length = 404
FEATURE                Location/Qualifiers
source                 1..404
                       mol_type = protein
                       organism = Vitis vinifera
SEQUENCE: 50
MEMMRVKSEE NLGRRRMCVA DAEAQGTRCV KRRRRDPAIV TLGCDDQSQQ QQLPNQQPDQ  60
ASAATTVKRS SRFRGVSRHR WTGRFEAHLW DKFSWNVTQK KKGKQGAYDE EESAARAYDL  120
AALKYWGAST FTNFPVSDYE KEIEIMQSVT KEEYLACLRR KSSGFSRGVS KYRGVARHHH  180
NGRWEARIGR VFGNKYLYLG TYSTQEEAAR AYDIAAIEYR GINAVTNFDL STYIRWLNPA  240
ANNPVVPHES RANTEPQALA SSNFVLSEES EPLFFHSNSF TMDDLNPPHK QEVFQTKIPI  300
EPCSKSSSPT ALGLLLRSSI FRELVEKNSN APEDETDAED TKNQQQVGSD DEYGIFYDGI  360
GDIPFVCPSN GDRNELQERL PLPFTISQGN PYGTAVLTSM QSIN               404

SEQ ID NO: 51          moltype = AA  length = 378
FEATURE                Location/Qualifiers
source                 1..378
                       mol_type = protein
                       organism = Brachypodium distachyon
SEQUENCE: 51
MAKQRTDSAG TDAAAVQLTK PKRTRKSVPR RESPSRRTSA YRGVTRHRWT GRFEAHLWDK  60
NTWTQSQRKK KGRQVYLGAY GGEEAAARAY DLAALKYWGR DTVLNFPLSN YDEEWKEMEG  120
QSREEYIGSL RRKSTGFSRG VSKYRGVARH HHNGKWEARI GRVYGNKYLY LGTYGTQEEA  180
AMAYDIAAIE HRGLNAVTNF DVSRYIDWHR RLCRDLGDNI ITPLTNPTVD LEEAMAGDDD  240
DGQFLLPSQA TTPPSTSSAL GLLLLSPRLK EVIEGSGAAS AMAASTSESS AAGSPPPSWS  300
SSSCSPSPPS PSHSPPETQQ KQQQQEYGAS AAAARCSFPD DVQTYFGCED GCAEVDTFLF  360
GDLSAYAAPM FQFELLDV                                            378

SEQ ID NO: 52          moltype = AA  length = 416
FEATURE                Location/Qualifiers
source                 1..416
                       mol_type = protein
                       organism = Oryza sativa
SEQUENCE: 52
MAKRRSNGET AAASSDDSSS GVCGGGGGGE VEPRRRQKRP RRSAPRDCPS QRSSAFRGVT  60
```

```
RHRWTGRFEA HLWDKNTWNE SQSKKGRQGA YDGEEAAARA YDLAALKYWG HDTVLNFPLS  120
TYDEELKEME GQSREEYIGS LRRKSSGFSR GVSKYRGVAR HHHNGKWEAR IGRVFGNKYL  180
YLGTYATQEE AAVAYDIAAI EHRGLNAVTN FDINLYIRWY HGSCRSSSAA AATTIEDDDF  240
AEAIAAALQG VDEQPSSSPA TTRQLQTADD DDDDLVAQLP PQLRPLARAA STSPIGLLLR  300
SPKFKEIIEQ AAAAAASSSG SSSSSSTDSP SSSSSSSLSP SPLPSPPPQQ QPTVPKDDQY  360
NVDMSSVAAA RCSFPDDVQT YFGLDDDGFG YPEVDTFLFG DLGAYAAPMF QFELDV      416

SEQ ID NO: 53          moltype = AA  length = 440
FEATURE                Location/Qualifiers
source                 1..440
                       mol_type = protein
                       organism = Sorghum bicolor
SEQUENCE: 53
MARPRKNAGT DEDNPNAATG VSVTGKPPKL KRVRRKGEPR ESSTPSQRSS AYRGVTRHRW  60
TGRFEAHLWD KDARNGSRNK KGKQGAYDDE EAAARAHDLA ALKYWGPATV LNFPLCGYDE  120
ELREMEAQPR EEYIGSLRRR SSGFSRGVSK YRGVARHHHN GRWEARIGRV LGNKYLYLGT  180
FATQEEAAVA YDIAAIEHRG LNAVTNFDIS HYVNHWHRHC HGPSDDSLGV VVDDVAAFQL  240
PDDLPECPAA AIGVEETTGG DAEFHNGEEG YLQHHTSGPF GAQQQLPDET GALAAHQMAP  300
NSSALDMVLQ SPKFKELMEQ VSAAAAAVAS ESSIGGSMSS SSPSPSLSSF SPSPLQLPSP  360
SSLSSFSPSS PLQQPSPPLQ QPEFVEGAPA ARCSFPDDVQ TFFDFENESD MSFMYAEVDT  420
FLFGDLGAYA APIFHFDLDV                                              440

SEQ ID NO: 54          moltype = AA  length = 408
FEATURE                Location/Qualifiers
source                 1..408
                       mol_type = protein
                       organism = Zea mays
SEQUENCE: 54
MARPRKNGGT DEDDANAATG ATGKPKKLMK RARRKSESPS PRSSAYRGVT RHRWTGRFEA  60
HLWDKDARNG SRSKKGKQVY LGAYDDEDAA ARAHDLAALK YWGPAGTVLN FPLSGYDEER  120
REMEGQPREE YVASLRRRSS GFARGVSKYR GVARHHHNGR WEARIGRVLG NKYLYLGTYA  180
TQEEAAVAYD MAAIEHRGFN AVTNFDISHY INHWHRHCHG PCDGSLGAMD VAPNVSLELD  240
LLECPATVGL GLEETTGDDE FHNREDYLGH LFGVQQLPDE MGPPAHQMAP ASSALDLVLQ  300
SPRFKELMQQ VSAAGASETN GGSMRSSPST SLCSFSPSPL ELPSPPLQQP TEFIDGAPPR  360
CSFPDDVQSF FDFKNDNDMS FVYAEVDTFL FGDLGAYAPP MFDFDLYE                408

SEQ ID NO: 55          moltype = AA  length = 304
FEATURE                Location/Qualifiers
source                 1..304
                       mol_type = protein
                       organism = Arabidopsis lyrata
SEQUENCE: 55
MAKVSRRSKK TIVEDEISDK TASASEAASI VFKSKRKRKS PPRNAPPQRS SPYRGVTRHR  60
WTGRYEAHLW DKNSWNETQT KKGRQVYIGA YDEEEAAARA YDLAALKYWG RDTLLNFPLL  120
IYDEDVKEME GQSKEEYIGS LRRKSSGFSR GVSKYRGVAR HHHNGRWEAR IGRVFGNKYL  180
YLGTYATQEE AAIAYDIAAI EYRGLNAVTN FDVSRYLNPD AADSKPIRND PESSDDNKCP  240
KSEEIIEPST SPEAITTRRS FPDDIQTYFG CQDSGKLATE EDVIFGGLNS FINPGFYNEF  300
DYGP                                                               304

SEQ ID NO: 56          moltype = AA  length = 308
FEATURE                Location/Qualifiers
source                 1..308
                       mol_type = protein
                       organism = Arabidopsis thaliana
SEQUENCE: 56
MAKVSGRSKK TIVDDEISDK TASASESASI ALTSKRKRKS PPRNAPLQRS SPYRGVTRWT  60
GRYEAHLWDK NSWNDTQTKK GRQGAYDEEE AAARAYDLAA LKYWGRDTLL NFPLPSYDED  120
VKEMEGQSKE EYIGSLRRKS SGFSRGVSKY RGVARHHHNG RWEARIGRVF GNKYLYLGTY  180
ATQEEAAIAY DIAAIEYRGL NAVTNFDVSR YLNPNAAADK ADSDSKPIRS PSREPESSDD  240
NKSPKSEEVI EPSTSPEVIP TRRSFPDDIQ TYFGCQDSGK LATEEDVIFD CFNSYINPGF  300
YNEFDYGP                                                           308

SEQ ID NO: 57          moltype = AA  length = 303
FEATURE                Location/Qualifiers
source                 1..303
                       mol_type = protein
                       organism = Arabidopsis thaliana
SEQUENCE: 57
MAKVSGRSKK TIVDDEISDK TASASESASI ALTSKRKRKS PPRNAPLQRS SPYRGVTRHR  60
WTGRYEAHLW DKNSWNDTQT KKGRQVYLGA YDEEEAAARA YDLAALKYWG RDTLLNFPLP  120
SYDEDVKEME GQSKEEYIGS LRRKSSGFSR GVSKYRGVAR HHHNGRWEAR IGRVFATQEE  180
AAIAYDIAAI EYRGLNAVTN FDVSRYLNPN AAADKADSDS KPIRSPSREP ESSDDNKSPK  240
SEEVIEPSTS PEVIPTRRSF PDDIQTYFGC QDSGKLATEE DVIFDCFNSY INPGFYNEFD  300
YGP                                                                303

SEQ ID NO: 58          moltype = AA  length = 332
FEATURE                Location/Qualifiers
source                 1..332
                       mol_type = protein
```

```
                         organism = Arabidopsis lyrata
SEQUENCE: 58
MEEITRKSKK TSVENETGDD QSATSVVVKA KRKRRSQPRD APPQRSSVHR GVTRHRWTGR  60
YEAHLWDKNS WNETQSKKGR QGAYDEEDAA ARAYDLAALK YWGRDTILNF PLCNYEEDIK  120
EMESQSKEEY IGSLRRKSSG FSRGVSKYRG VAKHHHNGRW EARIGRVFGN KYLYLGTYAT  180
QEEAAIAYDI AAIEYRGLNA VTNFDISRYM KLPVPENPID AANNLLESPH SDSSPFINPT  240
HESDLSQSQS SSDDNDDRKT KLLKSSPLNA EEVIGPSTPP EIAPPRRSFP EDIQTYFGCQ  300
NSGKLTTEED DVIFGDLDSF LTPDFYSELN DC                                332

SEQ ID NO: 59            moltype = AA  length = 328
FEATURE                  Location/Qualifiers
source                   1..328
                         mol_type = protein
                         organism = Thellungiella halophila
SEQUENCE: 59
MAKVSQRSKK TIVNDEISDK KAVAVASVSS SAFLKSKRKR KLPPQNAPPQ RSSSYRGVTR  60
HRWTGRYEAH LWDKNCWNET QTKKGRQVYL GAYDEEEAAA RAYDLAALKY WGRDTLLNFP  120
LPTYEEDVKE MEGHSREEYI GSLRRKSSGF SRGVSKYRGV ARHHHNGRWE ARIGRVFGNK  180
YLYLGTYATQ EEAARAYDIA AIEYRGLNAV TNFDVSRYLN LPESKNPSAA ANHLPDESDY  240
YDSMPVRNPN HEPRSPDGQT SSEDNDYTKT EETLDPEAIP SRRSFPDDIQ TYFGCQDSGK  300
LATEEDVIFG GFNSFINPGF YNDFDYAP                                    328

SEQ ID NO: 60            moltype = AA  length = 345
FEATURE                  Location/Qualifiers
source                   1..345
                         mol_type = protein
                         organism = Arabidopsis thaliana
SEQUENCE: 60
MFIAVEVSPV MEDITRQSKK TSVENETGDD QSATSVVLKA KRKRRSQPRD APPQRSSVHR  60
GVTRHRWTGR YEAHLWDKNS WNETQTKKGR QVYLGAYDEE DAAARAYDLA ALKYWGRDTI  120
LNFPLCNYEE DIKEMESQSK EEYIGSLRRK SSGFSRGVSK YRGVAKHHHN GRWEARIGRV  180
FGNKYLYLGT YATQEEAAIA YDIAAIEYRG LNAVTNFDIS RYLKLPVPEN PIDTANNLLE  240
SPHSDLSPFI KPNHESDLSQ SQSSSEDNDD RKTKLLKSSP LVAEEVIGPS TPPEIAPPRR  300
SFPEDIQTYF GCQNSGKLTA EEDDVIFGDL DSFLTPDFYS ELNDC                 345

SEQ ID NO: 61            moltype = AA  length = 299
FEATURE                  Location/Qualifiers
source                   1..299
                         mol_type = protein
                         organism = Glycine max
SEQUENCE: 61
MAKKSQKSLK NNNNNNTTRK RTRKSVPRDS PPQRSSIYRG VTRHRWTGRY EAHLWDKNCW  60
NESQSKKGRQ VYLGAYDDEE AAARAYDLAA LKYWGQDTIL NFPLSNYEEK LKEMEGQSKE  120
EYIGSLRRKS SGFSRGVSKY RGVARHHHNG RWEARIGRVF GNKYLYLGTY ATQEEAAAAY  180
DMAAIEYRGL NAVTNFDLSR YINWPRPKTE ENHQNTPSNQ NVNSNAELEL GSASDEITEE  240
GVARSSESES NPSRRTFPED IQTIFENNQD SGIYIENDDI IFGDLGSFGA PIFHFELDV   299

SEQ ID NO: 62            moltype = AA  length = 393
FEATURE                  Location/Qualifiers
source                   1..393
                         mol_type = protein
                         organism = Brachypodium distachyon
SEQUENCE: 62
MAKPRKNSAA ANNNNNDNST NANNAVAEAA AADVRAKPKK RTRKSVPRES PSQRSSIYRG  60
VTRHRWTGRF EAHLWDKNSW NESQNKKGKQ VYLGAYDEEE AAARAYDLAA LKYWGPDTIL  120
NFPLSVYDDE LKEMEGQSRE EYIGSLRRKS SGFSRGVSKY RGVARHHHNG RWEARIGRVF  180
GNKYLYLGTY ATQEEAAMAY DMAAIEYRGL NAVTNFDLSR YIKWLRPGGG VDSAAAAAAR  240
NPHPMLAGLA TQEELPAIDH LLDGMAFQQH GLHSSSAAAA AAQEFPLPPA LGHAPTTSAL  300
SLLLQSPKFK EMIERTSAAE TTTTATTTSS SSSPRPAASP QCSFPEDIQT FFGCDDGVGV  360
GVGAVGYTDV DGLFFGDLSA YASSTAFHFE LDL                               393

SEQ ID NO: 63            moltype = AA  length = 379
FEATURE                  Location/Qualifiers
source                   1..379
                         mol_type = protein
                         organism = Oryza sativa
SEQUENCE: 63
MAKPRKNSTT TNTSSSGVAA AAAAAAVKPK RTRKSVPRES PSQRSSVYRG VTRHRWTGRF  60
EAHLWDKNSW NESQNKKGKQ VYLGAYDDEE AAARAYDLAA LKYWGPDTIL NFPLSAYEGE  120
LKEMEGQSRE EYIGSLRRKS SGFSRGVSKY RGVARHHHNG RWEARIGRVF GNKYLYLGTY  180
ATQEEAAMAY DMAAIEYRGL NAVTNFDLSR YIKWLRPGAD GAGAAQNPHP MLGALSAQDL  240
PAIDLDAMAS SFQHDGHGAA AAAAQLIPAR HSLGHTPTTS ALSLLLQSPK FKEMIERTSA  300
AETTTTSSTT TSSSSPSPPQ ATKDDGASPQ CSFPKDIQTY FGCAAEDGAA GAGYADVDGL  360
FFGDLTAYAS PAFHFELDL                                              379

SEQ ID NO: 64            moltype = AA  length = 398
FEATURE                  Location/Qualifiers
source                   1..398
                         mol_type = protein
```

```
                          organism = Sorghum bicolor
SEQUENCE: 64
MAKPRKNSAA ANNNNSSSNG AGDLTPRAKP KRTRKSVPRE SPTQRSSVYR GVTRHRWTGR  60
FEAHLWDKNS WNESQNKKGK QVYLGAYDDE EAAARAYDLA ALKYWGPDTI LNFPASAYEG  120
EMKGMEGQSR EEYIGSLRRK SSGFSRGVSK YRGVARHHHN GRWEARIGRV FGNKYLYLGT  180
YATQEEAAMA YDMAAIEYRG LNAVTNFDLS RYIKWLRPGA GGMAAAAAAA QNPHPMLGGL  240
AQQLLLPPPA DTTTTDGAGA AAFQHDHHGA EAFPLPPRTS LGHTPTTSAL SLLLQSPKFK  300
EMIQRTESGT TTTTTTTSSL SSSPPPTPSP SPPRRSPAPT QPPVQAAARD ASPHQRGFPE  360
DVQTFFGCED TAGIDVEALF FGDLAAYATP AFHFEMDL                          398

SEQ ID NO: 65             moltype = AA  length = 396
FEATURE                   Location/Qualifiers
source                    1..396
                          mol_type = protein
                          organism = Zea mays
SEQUENCE: 65
MARPRKNSAA AANNNNSNTT NAGNAAVDLA ARVKPKRTRK SVPRESPSQR SSVYRGVTRH  60
RWTGRFEAHL WDKNSWNESQ NKKGKQVYLG AYDDEDAAAR AYDLAALKYW GPDTILNFPA  120
SAYEAELKEM EGQSREEYIG SLRRKSSGFS RGVSKYRGVA RHHHNGRWEA RIGRVFGNKY  180
LYLGTYGTQE EAAMAYDMAA IEYRGLNAVT NFDLSRYIKW LRPGAGAAQN PHPMLDGLAQ  240
QLLLSPEGTI DGAAFHQQQH DHRQQGAAEL PLPPRASLGH TPTTSALGLL LQSSKFKEMI  300
QRASAAESGT TTVTTTSSSS SQPPTPTPTP SPSPPPTPPV QPARDASPQC SFPEDIQTFF  360
GCEDVAGVGA GVDVDALFFG DLAAYASPAF HFEMDL                            396

SEQ ID NO: 66             moltype = AA  length = 362
FEATURE                   Location/Qualifiers
source                    1..362
                          mol_type = protein
                          organism = Glycine max
SEQUENCE: 66
MAKKSQLRTQ KNNATNDDIN LNATNTVITK VKRTRRSVPR DSPPQRSSIY RGVTRHRWTG  60
RYEAHLWDKH CWNESQNKKG RQGAYDNEEA AAHAYDLAAL KYWGQDTILN FPLSNYLNEL  120
KEMEGQSREE YIGSLRRKSS GFSRGISKYR GVARHHHNGR WEARIGKVFG NKYLYLGTYA  180
TQEEAATAYD LAAIEYRGLN AVTNFDLSRY IKWLKPNNTN SNNDQISINL TNINNNCTNN  240
FIPNPDQEQE VSFFHNQDSL NNTIVEEATL VPHQPRPASA TLALELLLQS SKFKEMVEMT  300
SVANLSTQME SDQLPQCTFP DHIQTYFEYE DSNKYEEGDD LLFKFSEFSS IVPFYHCDEF  360
ES                                                                 362

SEQ ID NO: 67             moltype = AA  length = 370
FEATURE                   Location/Qualifiers
source                    1..370
                          mol_type = protein
                          organism = Glycine max
SEQUENCE: 67
MAKKSQLRTQ KNNVTTNDDN NLNVTNTVTT KVKRTRRSVP RDSPPQRSSI YRGVTRHRWT  60
GRYEAHLWDK HCWNESQNKK GRQVYLGAYD NEEAAAHAYD LAALKYWGQD TILNFPLSNY  120
LNELKEMEGQ SREEYIGSLR RKSSGFSRGI SKYRGVARHH HNGRWEARIG KVFGNKYLYL  180
GTYATQEEAA TAYDLAAIEY RGLNAVTNFD LSRYIKWLKP NNNTNNVIDD QISINLTNIN  240
NNNNCTNSFT PSPDQEQEAS FFHNKDSLNN TIVEEVTLVP HQPRPASATS ALELLLQSSK  300
FKEMMEMTSV ANLSSTQMES ELPQCTFPDH IQTYFEYEDS NRYEEGDDLM FKFNEFSSIV  360
PFYQCDEFES                                                         370

SEQ ID NO: 68             moltype = AA  length = 356
FEATURE                   Location/Qualifiers
source                    1..356
                          mol_type = protein
                          organism = Medicago truncatula
SEQUENCE: 68
MAKKSQKQIE KDDNASNDND NLNPSNTVTT KAKRTRKSVP RTSPPQRSSI YRGVTRHRWT  60
GRYEAHLWDK NCWNESQNKK GRQGAYDNEE TAAHAYDLAA LKYWGQDTII NFPLSNYQKE  120
LIEMESQSRE EYIGSLRRKS SGFSRGVSKY RGVARHHHNG RWEARIGKVF GNKYLYLGTY  180
ATQEEAATAY DMAAIEYRGL NAVTNFDLSR YIKWLKPNNN NNDDNNKSNI NLCDINSNSS  240
ANDSNSNEEL EFSLVDNEIS LNNSIDEATL VQPRPTSATS ALELLLQSSK FKEMVEMASM  300
TSNVSTTLES DQLSQCAFPD DIQTYFEYEN FNDTMLEDLN SIMPTFHYDF EGAEVL      356

SEQ ID NO: 69             moltype = AA  length = 347
FEATURE                   Location/Qualifiers
source                    1..347
                          mol_type = protein
                          organism = Glycine max
SEQUENCE: 69
MAKQQTHKIN ASTNNNISTT NTVTAKVKRT RRSVPRDSPP QRSSIYRGVT RHRWTGRYEA  60
HLWDKNCWNE SQNKKGRQGA YDDEEAAAHA YDLAALKYWG QDTILNFPLS TYQNELKEME  120
GQSREEYIGS LRRKSSGFSR GVSKYRGVAR HHHNGRWEAR IGRVFGNKYL YLGTYATQEE  180
AATAYDMAAI EYRGVNAVTN FDLSRYIKWL KPNNNNTTVN SNLIDSNPNC ETNFTSNSNQ  240
QQGFNFFNRQ ESFNNEEAAM TQPRPAVATS ALGLLLQSSK FKEMMEMTSA TDLSTPPSES  300
ELPSCTFPDD IQTYFECEDS HRYGEGDDIM FSVLNGFVPP MFHCDDF                347

SEQ ID NO: 70             moltype = AA  length = 351
```

```
FEATURE                Location/Qualifiers
source                 1..351
                       mol_type = protein
                       organism = Glycine max
SEQUENCE: 70
MAKQQTHEIN ASTNNNINTT KTVTTKVKRT RRSVPRNSPP QRSSIYRGVT RHRWTGRYEA  60
HLWDKNCWNE SQNKKGRQGA YDDEEAAAHA YDLAALKYWG QDTILNFPLS TYQNELKEME  120
GQSREEYIGS LRRKSSGFSR GVSKYRGVAR HHHNGRWEAR IGRVFGNKYL YLGTYATQEE  180
AATAYDMAAI EYRGLNAVTN FDLSRYIKWL KPNNNNNKVN SNNLIVSIPN CATNFTPNSN  240
QQQGFNFFNS QESFNNNEEA AMTQPRPAAA TSALGLLLQS SKFKEMMEMT SAIDLSTPPS  300
ESELPPCTFP DDIQTYFECE DSHRYGEGDD IMFSELNGFV PPMFHCDDFE A           351

SEQ ID NO: 71          moltype = AA  length = 353
FEATURE                Location/Qualifiers
source                 1..353
                       mol_type = protein
                       organism = Populus trichocarpa
SEQUENCE: 71
MAKLSQKNTK NTASNNNNTT NGVTKVKRTR RSVPRDSPPQ RSSIYRGVTR HRWTGRYEAH  60
LWDKNCWNES QNKKGRQGAY DDEEAAAHAY DLAALKYWGP ETILNFPLST YQNELKEMEG  120
QSREECIGSL RRKSSGFSRG VSKYRGVARH HHNGRWEARI GRVFGNKYLY LGTYATQEEA  180
ATAYDMAAIE YRGLNAVTNF DLSRYIKWLK PNQNNTDNNN GLDLPNPIIG TDNSTHPNPN  240
QELGTTFLQI NQQTYQPSET TLTQPRPATN PSSALGLLLQ SSKFKEMMEM TAVTDCPPTP  300
PSGLDPTPCS FLEDVQTYFD CLDSSNYGDQ GDDMIFGDLN SFVPPMFQCD FET         353

SEQ ID NO: 72          moltype = AA  length = 323
FEATURE                Location/Qualifiers
source                 1..323
                       mol_type = protein
                       organism = Vitis vinifera
SEQUENCE: 72
MAKLSQQNHK NSANSNATNT TLSVTKVKRT RKTVPRDSPP QRSSIYRGVT RHRWTGRYEA  60
HLWDKNCWNE SQNKKGRQVY LGAYHDEEAA AHAYDLAALK YWGPETILNF PLSTYEKELK  120
EMEGLSREEY IGSLRRRSSG FSRGVSKYRG VARHHHNGRW EARIGRVFGN KYLYLGTYAT  180
QEEAATAYDM AAIEYRGLNA VTNFDLSRYI KWLKPNQNNP CEQPNNPNLD SNLTPNPNHD  240
FGISFLNHPQ TSGTAACKMM EMTTAADHLS TPPESELPRC SFPDDIQTYF ECQDSGSYEE  300
GDDVIFSELN SFIPPMFQCD FSA                                          323

SEQ ID NO: 73          moltype = AA  length = 347
FEATURE                Location/Qualifiers
source                 1..347
                       mol_type = protein
                       organism = Vitis vinifera
SEQUENCE: 73
MAKLSQQNHK NSANSNATNT TLSVTKVKRT RKTVPRDSPP QRSSIYRGVT RHRWTGRYEA  60
HLWDKNCWNE SQNKKGRQGA YHDEEAAAHA YDLAALKYWG PETILNFPLS TYEKELKEME  120
GLSREEYIGS LRRRSSGFSR GVSKYRGVAR HHHNGRWEAR IGRVFGNKYL YLGTYATQEE  180
AATAYDMAAI EYRGLNAVTN FDLSRYIKWL KPNQNNPCEQ PNNPNLDSNL TPNPNHDFGI  240
SFLNHPQTSG TAACSEPPLT QTRPPIASSA LGLLLQSSKF KEMMEMTTAA DHLSTPPESE  300
LPRCSFPDDI QTYFECQDSG SYEEGDDVIF SELNSFIPPM FQCDFSA                347

SEQ ID NO: 74          moltype = AA  length = 275
FEATURE                Location/Qualifiers
source                 1..275
                       mol_type = protein
                       organism = Populus trichocarpa
SEQUENCE: 74
MGKTSKQSLK NSANTSINPA TKVKRTRKSV PRDSPPQRSS IYRGVTRHRW TGRYEAHLWD  60
KNCWNESQNK KGRQGAYDDE EAAGHAYDLA ALKYWGQDTI LNFPLSTYEE EFKEMEGHSK  120
EEYIGSLRRK SSGFSRGVSK YRGVARHHHN GRWEARIGRV FGNKYLYLGT YATQEEAATA  180
YDMAAIEYRG LNAVTNFDLS RYSSKFKEML ERTSASDCPL TPPESDRDPP RRSFPDDIQT  240
YFDCQDSSSY TDGDDIIFGD LHSFASPIFH CELDG                             275

SEQ ID NO: 75          moltype = AA  length = 304
FEATURE                Location/Qualifiers
source                 1..304
                       mol_type = protein
                       organism = Vitis vinifera
SEQUENCE: 75
MAKTSQKSQK TTGNSTNNNG GSVAKVKRTR KSVPRDSPPQ RSSIFRGVTR HRWTGRYEAH  60
LWDKNCWNES QNKKGRQVYL GAYDDEEAAA HAYDLAALKY WGQETILNFP LSAYQEELKE  120
MEGQSKEEYI GSLRRKSSGF SRGVSKYRGV ARHHHNGRWE ARIGRVFGNK YLYLGTYATQ  180
EEAATAYDMA AIEYRGLNAV TNFDLSRYIN SPAPNPNPSD HELGLSFLQQ QHGSDATELP  240
LSHARSDCPL TPPDQIEMPR SSFPDDIQTY FDCQETNSYG ESDDIIFGDL KYFSSPMFQC  300
ELDT                                                               304

SEQ ID NO: 76          moltype = AA  length = 393
FEATURE                Location/Qualifiers
source                 1..393
```

```
                        mol_type = protein
                        organism = Sorghum bicolor
SEQUENCE: 76
MASPNPEAAA GLQTVAVAAG GGEGGSSSSL GAVAGAAAVS SSGELVPRRS LAVRKERVCT  60
AKERISRMPP CAAGKRSSIY RGVTRHRWTG RYEAHLWDKS TWNQNQNKKG KQGAYDDEEA  120
AARAYDLAAL KYWGAGTQIN FPVSDYARDL EEMQMISKED YLVSLRRQLH NSRWDTSLGL  180
GNDYMSLSCG KDIMLDGKFA GSFGLERKID LTNYIRWWLP KKTRQSDTSK TEEIADEIRA  240
IESSMQQTEP YKLPSLGLGS PSKPSSVGLS ACSILSQSDA FKSFLEKSTK LSEECTLSKE  300
IVEGKTVASV PATGYDTGAI NINMNELLVQ RSTYSMAPVM PTPMKTTWSP ADPSVDPLFW  360
SNFVLPSSQP VTMATITTTT NEVSSSDPFQ SQE                               393

SEQ ID NO: 77           moltype = AA  length = 428
FEATURE                 Location/Qualifiers
source                  1..428
                        mol_type = protein
                        organism = Lupinus angustifolius
SEQUENCE: 77
MASSSSDPGK SEIGGGAAET SEAAAVAVAV TNDQSLLYRG LKKAKKERGC TAKERISKMP  60
PCAAGKRSSI YRGVTRHRWT GRYEAHLRDK STWNQNQNKK GKQVYLGAYD DEEAAARAYD  120
LAALKYWGPG TLINFPVTDY TRDLEEMQNV SREEYLASLR RKSSGFSRGI SKYRALSSRW  180
EPSYSRFAGS DYFNSMHYGA GDDSAAESEY ASGFCIERKI DLTGHIKWWG SNKSRQPDAG  240
TRLSEEKRHG FAGDICSEPK TLEQKVQPTE PYQMPELGRS HNEKKHRSSA VSALSILSQS  300
AAYKSLQEKA SKKQENSTDN DENENKNTVN KLDHGKAVEK SSNHDGGSDR VDIEIGTTGA  360
LSLQRNIYPL TPFLSAPLLT AYNTVDPSLV DPVLWTSLVP MLSAGLSCPT QVTKTETSSS  420
YTIFQPEG                                                           428

SEQ ID NO: 78           moltype = AA  length = 440
FEATURE                 Location/Qualifiers
source                  1..440
                        mol_type = protein
                        organism = Ricinus communis
SEQUENCE: 78
MASSSSDPGL KPELGGGSGG ESSEAVIAND QLLLYRQLKK PKKERGCTAK ERISKMPPCT  60
AGKRSSIYRG VTRHRWTGRY EAHLWDKSTW NQNQNKKGKQ GAYDDEEAAA RAYDLAALKY  120
WGPGTLINFP VTDYSRDLEE MQNVSREEYL ASLRRKSSGF SRGISKYRGL SSQWDSSFGR  180
MPGSEYFSSI NYGAADDPAA ESEYVGSLCF ERKIDLTSYI RWWGFNKTRE SVSKSSDERK  240
HGYGEDISEL KSSEWAVQST EPYQMPRLGM PDNGKKHKCS KISALSILSH SAAYKNLQEK  300
ASKKQENCTD NDEKENKKTN KMDYGKAVEK STSHDGSNER LGAALGMSGG LSLQRNAYQL  360
APFLSAPLLT NYNAIDPLVD PILWTSLVPV LPAGFSRNSE VGMGLQIVSC HKDRDKFNLY  420
LLSAGGVSTF LLLVVHWRFC                                              440

SEQ ID NO: 79           moltype = AA  length = 428
FEATURE                 Location/Qualifiers
source                  1..428
                        mol_type = protein
                        organism = Lupinus angustifolius
SEQUENCE: 79
MASSSSDPGK SEIGGGAAET SEAAAVAVAV TNDQSLLYRG LKKAKKERGC TAKERISKMP  60
PCAAGKRSSI YRGVTRHRWT GRYEAHLRDK STWNQNQNKK GKQVYLGAYD DEEAAARAYD  120
LAALKYWGPG TLINFPVTDY TRDLEEMQNV SREEYLASLR RKSSGFSRGI SKYRALSSRW  180
EPSYSRFAGS DYFNSMHYGA GDDSAAESEY ASGFCIERKI DLTGHIKWWG SNKSRQPDAG  240
TRLSEEKRHG FAGDICSEPK TLEQKVQPTE PYQMPELGRS HNEKKHRSSA VSALSILSQS  300
AAYKSLQEKA SKKQENSTDN DENENKNTVN KLDHGKAVEK SSNHDGGSDR VDIEIGTTGA  360
LSLQRNIYPL TPFLSAPLLT AYNTVDPSLV DPVLWTSLVP MLSAGLSCPT QVTKTETSSS  420
YTIFQPEG                                                           428

SEQ ID NO: 80           moltype = AA  length = 508
FEATURE                 Location/Qualifiers
source                  1..508
                        mol_type = protein
                        organism = Aspergillus fumigatus
SEQUENCE: 80
MKMSASKTVT SSASAVSTSS GRSTPSKLVN GATRNGSAAA GNGSTGTAKG KRRSKYRHVA  60
AYHSELRHSS LSRETSVVPS FLGFRNLMVI VLVAMNLRLI IENFMKYGVL ICIKCHDYRK  120
QDVVLGSILF ALVPCHLFLA YIIELVAAQQ SKKTVGRQKK DLSTEERERE QQAFRSTWRY  180
TAFFHTVNAT LCLAVTSFVV YFYINHPGIG TICELHAIIV WLKNCSYAFT NRDLRQAMVD  240
PSAESALPEI YSTCPYPRNI TLGNLTYFWL APTLVYQPVY PRSSHIRWSF VAKRLAEFFG  300
LAVFIWLLSA QYAAPVLRNS IDKIAVMDIA SILERVMKLS TISLVIWLAG FFALFQSLLN  360
ALAEVMRFGD REFYTDWWNS PSLGAYWRSW NRPVYLFMKR HVFSPLVGRG WSPFAASFMV  420
FSLSAVLHEM LVGIPTHNLI GVAFAGMMFQ LPLIAVTAPF EKVNDALGKI VGNSIFWVSF  480
CLVGQPLGAL LYFFAWQAKY GSVSKIHV                                     508

SEQ ID NO: 81           moltype = AA  length = 521
FEATURE                 Location/Qualifiers
source                  1..521
                        mol_type = protein
                        organism = Ricinus communis
SEQUENCE: 81
MTILETPETL GVISSSATSD LNLSLRRRRT SNDSDGALAD LASKFDDDDD VRSEDSAENI  60
```

-continued

IEDPVAAVTE LATAKSNGKD CVANSNKDKI DSHGGSSDFK LAYRPSVPAH RSLKESPLSS 120
DLIFKQSHAG LFNLCIVVLV AVNSRLIIEN LMKYGWLIKT GFWFSSRSLR DWPLFMCCLS 180
LPVFPLAAYL VEKAAYRKYI SPPIVIFLHV IITSAAVLYP ASVILSCESA FLSGVTLMEL 240
ACMVWLKLVS YAHTNYDMRA IADTIHKEDA SNSSSTEYCH DVSFKTLAYF MVAPTLCYQP 300
SYPRTAFIRK GWVFRQFVKL IIFTGFMGFI IEQYINPIVQ NSQHPLKGDL LYAIERVLKL 360
SVPNLYVWLC LFYCFFHLWL NIVAELLRFG DREFYKDWWN AKTVEEYWRM WNMPVHKWMV 420
RHIYFPCLRR KIPRGVAIVI AFFVSAVFHE LCIAVPCHMF KLWAFFGIMF QIPLVVITNY 480
FQRKFRSSMV GNMIFWFFFC ILGQPMCVLL YYHDLMNRDG N 521

SEQ ID NO: 82 moltype = AA length = 526
FEATURE Location/Qualifiers
source 1..526
mol_type = protein
organism = Vernicia fordii
SEQUENCE: 82
MTIPETPDNS TDATTSGGAE SSSDLNLSLR RRRTASNSDG AVAELASKID ELESDAGGGQ 60
VIKDPGAEMD SGTLKSNGKD CGTVKDRIEN RENRGGSDVK FTYRPSVPAH RALKESPLSS 120
DNIFKQSHAG LFNLCIVVLV AVNSRLIIEN IMKYGWLIKT GFWFSSRSLR DWPLLMCCLT 180
LPIFSLAAYL VEKLACRKYI SAPTVVFLHI LFSSTAVLYP VSVILSCESA VLSGVALMLF 240
ACIVWLKLVS YAHTNFDMRA IANSVDKGDA LSNASSAESS HDVSFKSLVY FMVAPTLCYQ 300
PSYPRTASIR KGWVVRQFVK LIIFTGFMGF IIEQYINPIV QNSQHPLKGD LLYAIERVLK 360
LSVPNLYVWL CMFYCFFHLW LNILAELLRF GDREFYKDWW NARTVEEYWR MWNMPVHKWM 420
VRHIYFPCLR HKIPRGVALL ITFFVSAVFH ELCIAVPCHI FKLWAFIGIM FQIPLVGITN 480
YLQNKFRSSM VGNMIFWFIF CILGQPMCLL LYYHDLMNRK GTTESR 526

SEQ ID NO: 83 moltype = AA length = 523
FEATURE Location/Qualifiers
source 1..523
mol_type = protein
organism = Vernonia galamensis
SEQUENCE: 83
MALLDTPQIG EITTTATTTI RRRTTVKPDA GIGDGLFDSS SSSKTNSSFE DGDSLNGDFN 60
DKFKEQIGAG DESKDDSKGN GQKIDHGGVK KGRETTVVHY AYRPSSPAHR RIKESPLSSD 120
AIFKQSHAGL FNLCIVVLVA VNGRLIIENL MKYGLLINSN FWFSSRSLRD WPLLMCCLTP 180
SDFPLAAYIV EKLAWKKRIS DPVVITLHVI ITTTAILYPV FMILRFDSVV LSGVSLMLCA 240
CINWLKLVSF VHTNYDMRSL LNSTDKGEVE PMSSNMDYFY DVNFKSLVYF MVAPTLCYQI 300
SYPRTAFIRK GWVLRQLIKL VIFTGFMGFI IEQYINPIVK NSRHPLKGDF LYAIERVLKL 360
SVPNLYVWLC MFYCFFHLWL NILAELLCFG DREFYKDWWN AQTIEEYWRL WNMPVHKWIV 420
RHLYFPCLRN GIPKGAAILV AFFMSAVFHE LCIAVPCHIF KFWAFIGIMF QVPLVLLTNY 480
LQHKFQNSMV GNMIFWCFFS IFGQPMCVLL YYHDVMNQKG KSK 523

SEQ ID NO: 84 moltype = AA length = 517
FEATURE Location/Qualifiers
source 1..517
mol_type = protein
organism = Vernonia galamensis
SEQUENCE: 84
MALLDTPQIG EITTTATTTI RQHPLGKPDA GIGDGLFSSS SSKTNSSFED GDSLNGDFND 60
KFKEQIGAGD ESKKGNGKID HGGVKKGRET TVVHYAYRPS SPAHRRIKES PLSSDAIFKQ 120
SHAGLFNLCI VVLVAVNGRL IIENLMKYGL LINSKFWFSS RSLRDWPLLM CWLTPSDFPL 180
AAYIVEKLAW KKRISDPVVI TLHVVITTTA ILYPIFMILR FDSVVLLGVS LMLCACINWL 240
KLVSFVHTNY DMRSLLNSTG KGEVEPMSSN MDYFYDINFK SLVYFMVAPT LCYQISYPRT 300
AFIRKGWVFR QLIKLVIFTG FMGFIIEQYI NPIVKNSRHP LNGDFLYAIE RVLKVSVPNL 360
YVWLCMFYCF FHLWLNILAE LLWFGDREFY KDWWNTQTIE EYWRLWNMPV HKWIVRHLYF 420
PCLRNGISKG AAILVAFFMS AVFHELCIAV PCHILKFWAF IGIMFQVPLV LLTNYLQHKF 480
QNSMVGNMIF WCFFSIFGQP MCVFLYYHEV NQKGKSK 517

SEQ ID NO: 85 moltype = AA length = 507
FEATURE Location/Qualifiers
source 1..507
mol_type = protein
organism = Euonymus alatus
SEQUENCE: 85
MAANLNEASD LNFSLRRRTG GISSTTVPDS SSETSSSEAD YLDGGKGAAD VKDRGDGAVE 60
FQNSMKNVER IEKHESRVGL DSRFTYRPSV PAHRTIKESP LSSDAIFKQS HAGLFNLCIV 120
VLVAVNSRLI IENLMKYGWL IRSGFWFSSR SLRDWPLFMC CLTLPVFPLA AFLFEKLAQK 180
NLISEPVVVL LHIVNTTAAV LYPVLVILRC DSAFMSGVTL MLFACIVWLK LVSYAHTNYD 240
MRALTKSVEK GDTPLSSQNM DYSFDVNIKS LAYFMVAPTL CYQISYPRTP YVRKGWVVRQ 300
FVKLIIFTGL MGFIIEQYIN PIVQNSQHPL KGNFLYAIER VLKLSVPNLY VWLCMFYCLF 360
HLWLNILAEL LCFGDREFYK DWWNAKTVEE YWRMWNMPVH KWMVRHIYFP CLRNGIPKGV 420
AFVISFLVSA VFHELCIAVP CHIFKLWAFF GIMLQVPLVL ITSYLQNKFR SSMVGNMMFW 480
FSFCIFGQPM CLLLYYHDLM NRNGKME 507

SEQ ID NO: 86 moltype = AA length = 498
FEATURE Location/Qualifiers
source 1..498
mol_type = protein
organism = Caenorhabditis elegans
SEQUENCE: 86

```
MQMRQQTGRR RRQPSETSNG SLASSRRSSF AQNGNSSRKS SEMRGPCEKV VHTAQDSLFS  60
TSSGWTNFRG FFNLSILLLV LSNGRVALEN VIKYGILITP LQWISTFVEH HYSIWSWPNL  120
ALILCSNIQI LSVFGMEKIL ERGWLGNGFA AVFYTSLVIA HLTIPVVVTL THKWKNPLWS  180
VVMMGVYVIE ALKFISYGHV NYWARDARRK ITELKTQVTD LAKKTCDPKQ FWDLKDELSM  240
HQMAAQYPAN LTLSNIYYFM AAPTLCYEFK FPRLLRIRKH FLIKRTVELI FLSFLIAALV  300
QQWVVPTVRN SMKPLSEMEY SRCLERLLKL AIPNHLIWLL FFYTFFHSFL NLIAELLRFA  360
DREFYRDFWN AETIGYFWKS WNIPVHRFAV RHIYSPMMRN NFSKMSAFFV VFFVSAFFHE  420
YLVSVPLKIF RLWSYYGMMG QIPLSIITDK VVRGGRTGNI IVWLSLIVGQ PLAILMYGHD  480
WYILNFGVSA VQNQTVGI                                               498

SEQ ID NO: 87          moltype = AA  length = 498
FEATURE                Location/Qualifiers
source                 1..498
                       mol_type = protein
                       organism = Rattus norvegicus
SEQUENCE: 87
MGDRGGAGSS RRRRTGSRVS VQGGSGPKVE EDEVREAAVS PDLGAGGDAP APAPAPAHTR  60
DKDRQTSVGD GHWELRCHRL QDSLFSSDSG FSNYRGILNW CVVMLILSNA RLSLENLIKY  120
GILVDPIQVV SLFLKDPYSW PAPCLIIASN IFIVATFQIE KRLSVGALTE QMGLLLHVVN  180
LATIICFPAA VALLVESITP VGSLFALASY SIIFLKLSSY RDVNLWCRQR RVKAKAVSAG  240
KKVSGAAAQN TVSYPDNLTY RDLYYFIFAP TLCYELNFPR SPRIRKRFLL RRVLEMLFFT  300
QLQVGLIQQW MVPTIQNSMK PFKDMDYSRI IERLLKLAVP NHLIWLIFFY WLFHSCLNAV  360
AELLQFGDRE FYRDWWNAES VTYFWQNWNI PVHKWCIRHF YKPMLRLGSN KWMARTGVFW  420
ASAFFHEYLV SIPLRMFRLW AFTAMMAQVP LAWIVNRFFQ GNYGNAAVWV TLIIGQPVAV  480
LMYVHDYYVL NYDAPVGA                                               498

SEQ ID NO: 88          moltype = AA  length = 488
FEATURE                Location/Qualifiers
source                 1..488
                       mol_type = protein
                       organism = Homo sapiens
SEQUENCE: 88
MGDRGSSRRR RTGSRPSSHG GGGPAAAEEE VRDAAAGPDV GAAGDAPAPA PNKDGDAGVG  60
SGHWELRCHR LQDSLFSSDS GFSNYRGILN WCVVMLILSN ARLFLENLIK YGILVDPIQV  120
VSLFLKDPYS WPAPCLVIAA NVFAVAAFQV EKRLAVGALT EQAGLLLHVA NLATILCFPA  180
AVVLLVESIT PVGSLLALMA HTILFLKLFS YRDVNSWCRR ARAKAASAGK KASSAAAPHT  240
VSYPDNLTYR DLYYFLFAPT LCYELNFPRS PRIRKRFLLR RILEMLFFTQ LQVGLIQQWM  300
VPTIQNSMKP FKDMDYSRII ERLLKLAVPN HLIWLIFFYW LFHSCLNAVA ELMQFGDREF  360
YRDWWNSESV TYFWQNWNIP VHKWCIRHFY KPMLRRGSSK WMARTGVFLA SAFFHEYLVS  420
VPLRMFRLWA FTGMMAQIPL AWFVGRFFQG NYGNAAVWLS LIIGQPIAVL MYVHDYYVLN  480
YEAPAAEA                                                          488

SEQ ID NO: 89          moltype = AA  length = 11
FEATURE                Location/Qualifiers
REGION                 1..11
                       note = conserved sequence
VARIANT                4
                       note = Threonine (T) or Serine (S)
source                 1..11
                       mol_type = protein
                       organism = synthetic construct
SEQUENCE: 89
RGVXRHRWTG R                                                      11

SEQ ID NO: 90          moltype = AA  length = 8
FEATURE                Location/Qualifiers
REGION                 1..8
                       note = conserved sequence
VARIANT                1
                       note = Phenylalanine (F) or Tyrosine (Y)
source                 1..8
                       mol_type = protein
                       organism = synthetic construct
SEQUENCE: 90
XEAHLWDK                                                          8

SEQ ID NO: 91          moltype = AA  length = 9
FEATURE                Location/Qualifiers
REGION                 1..9
                       note = conserved sequence
source                 1..9
                       mol_type = protein
                       organism = synthetic construct
SEQUENCE: 91
DLAALKYWG                                                         9

SEQ ID NO: 92          moltype = AA  length = 8
FEATURE                Location/Qualifiers
REGION                 1..8
```

```
                        note = conserved sequence
VARIANT                 2
                        note = X can be any naturally occurring amino acid
VARIANT                 5
                        note = Serine (S) or Alanine (A)
VARIANT                 8
                        note = X can be any amino acid
source                  1..8
                        mol_type = protein
                        organism = synthetic construct
SEQUENCE: 92
SXGFXRGX                                                 8

SEQ ID NO: 93           moltype = AA  length = 14
FEATURE                 Location/Qualifiers
REGION                  1..14
                        note = conserved sequence
VARIANT                 3
                        note = Histidine (H) or Gutamine (Q)
VARIANT                 6
                        note = Arginine (R) or Lysine (K)
VARIANT                 12
                        note = Arginine (R) or Lysine (K)
VARIANT                 13
                        note = X can be any naturally occurring amino acid
source                  1..14
                        mol_type = protein
                        organism = synthetic construct
SEQUENCE: 93
HHXNGXWEAR IGXV                                          14

SEQ ID NO: 94           moltype = AA  length = 9
FEATURE                 Location/Qualifiers
REGION                  1..9
                        note = conserved sequence
source                  1..9
                        mol_type = protein
                        organism = synthetic construct
VARIANT                 7
                        note = X can be any amino acid
SEQUENCE: 94
QEEAAAXYD                                                9

SEQ ID NO: 95           moltype = AA  length = 165
FEATURE                 Location/Qualifiers
source                  1..165
                        mol_type = protein
                        organism = Brassica napus
SEQUENCE: 95
MGILRKKKHE RKPSFKSVLT AILATHAATF LLLIAGVSLA GTAAAFIATM PLFVVFSPIL  60
VPAGITTGLL TTGLAAAGGA GATAVTIILW LYKRATGKAP PKVLEKVLKK IIPGAAAAPA  120
AAPGAAPAAA PAAAPAVAPA AAPAAAPAPK PAAPPAPKPA AAPSI             165

SEQ ID NO: 96           moltype = AA  length = 193
FEATURE                 Location/Qualifiers
source                  1..193
                        mol_type = protein
                        organism = Brassica napus
SEQUENCE: 96
MADVRTHAHQ VQVHPLRQQE GGIKVVYPQS GPSSTQVLAV IAGVPVGGTL LTLAGLTLAG  60
SVIGLMLAFP LFLIFSPVIV PAAFVIGLAM TGFMASGAIG LTGLSSMSWV LNHIRRVRER  120
MPDELEEAKQ RLADMAEYVG QRTKDAGQTI EEKAHDVRES KTYDVRDRDT KGHTATGGDR  180
DTKTTREVRV ATT                                           193

SEQ ID NO: 97           moltype = AA  length = 188
FEATURE                 Location/Qualifiers
source                  1..188
                        mol_type = protein
                        organism = Brassica napus
SEQUENCE: 97
MANVDRRVNV DRTDKGLQLQ PQYEDRVGYG YGYGGNTDYK SCGPSTNQIV ALIAGVPIGG  60
SLLALAGLTL AGSVIGFMLS IPLFLLFSPV IVPAALTIGL AVTGILASGL FGLTGLSSVS  120
WVLNYIRGRS DTVPEQLDYA KRRMADAVGY AGQKGKEMGQ YVQDKAHEAH DTSLTTETNG  180
KTRRAHIA                                                 188

SEQ ID NO: 98           moltype = AA  length = 180
FEATURE                 Location/Qualifiers
source                  1..180
                        mol_type = protein
```

```
                          organism = Brassica napus
SEQUENCE: 98
MADTARTHHD ITSRDQYPIL GRDRDQYPYG RSDYQTSGQD YSKTRQIAKA ATAVTAGGSL  60
LVLSSLTLVG TVIALTVATT LLVIFSPILV PALITVALLI TGFLSSGGFG IADITVFSWI  120
YKYATGEHPQ GSDKLDSARM KLGTKAQDIK DRAQYYGQQH TGGEHDRDRT RGTHHTTTTT  180

SEQ ID NO: 99             moltype = AA  length = 210
FEATURE                   Location/Qualifiers
source                    1..210
                          mol_type = protein
                          organism = Brassica napus
SEQUENCE: 99
MADTHRVDRT DRHLQFQSPY EGGRVSIQYE GGGGAGGYGG RGGGYGAEGY KSMMPERGPS  60
STQVLSFLVG VPIVGSLLAI AGLLLAGSVI GLLISIPLFL LFSPVIVPAA LTIGLAATGF  120
LASGMFGLTG LSSVSWVLNY LRGTRKSSVP EQLEYAKKRM ADAVGYAGQK GKGMGQHVQN  180
KAQEAKQYDI SKTHDTTTKG HETTQRTAAA                                210

SEQ ID NO: 100            moltype = AA  length = 149
FEATURE                   Location/Qualifiers
source                    1..149
                          mol_type = protein
                          organism = Brassica napus
SEQUENCE: 100
MANQTRTHQD IIVRDSRITL DRDHPKTGAQ MVKVATGVAA GGSLLVLSGL TLAGTVIAFA  60
VATPLLIIFS PVLVPAVITV VLIITGFLAS GGFGIAAITA FSWLYRHMTG SGSDQKIESA  120
RMKVGSRGYD TKYGQHNIGV HQQHQQAAS                                 149

SEQ ID NO: 101            moltype = AA  length = 137
FEATURE                   Location/Qualifiers
source                    1..137
                          mol_type = protein
                          organism = Arachis hypogaea
SEQUENCE: 101
MAEALYYGGR QRQEQPRSTQ LVKATTAVVA GGSLLILAGL VLAGTVIGLT TITPLFVIFS  60
PVLVPAVITV ALLGLGFLAS GGFGVAAITV LTWIYRYVTG KHPPGANQLD TARHKLMGKA  120
REIKDFGQQQ TSGAQAS                                              137

SEQ ID NO: 102            moltype = AA  length = 150
FEATURE                   Location/Qualifiers
source                    1..150
                          mol_type = protein
                          organism = Arachis hypogaea
SEQUENCE: 102
MTDRTQPHAV QVHTTAGRFG DTAAGTNRYA DRGPSTSKVI AVITGLPIGG TLLLFAGLAL  60
AGTLLGLAVT TPLFILFSPV IVPATIVVGL SVAGFLTSGA CGLTGLSSFS WVMNYIRQTH  120
GSVPEQLEMA KHRMADVAGY VGQKTKDVGQ                                150

SEQ ID NO: 103            moltype = AA  length = 166
FEATURE                   Location/Qualifiers
source                    1..166
                          mol_type = protein
                          organism = Arachis hypogaea
SEQUENCE: 103
MSDQTRTGYG GGGSYGSSYG GGGTYGSSYG TSYDPSTNQP IRQAIKFMTA STIGVSFLIL  60
SGLILTGTVI GLIIATPLLV IFSPILVPAA ITLALAAGGF LFSGGCGVAA IAALSWLYSY  120
VTGKHPAGSD RLDYAKGVIA DKARDVKDRA KDYAGAGRAQ EGTPGY                166

SEQ ID NO: 104            moltype = AA  length = 176
FEATURE                   Location/Qualifiers
source                    1..176
                          mol_type = protein
                          organism = Arachis hypogaea
SEQUENCE: 104
MATATDRAPH QVQVHTPTTQ RVDVPRRGYD VSGGGIKTLL PERGPSTSQI IAVLVGVPTG  60
GTLLLLSGLS LLGTIIGLAI ATPVFIFFSP VIVPAVVTIG LAVTGILTAG ACGLTGLMSL  120
SWMINFIRQV HGTTVPDQLD SVKRRMADMA DYVGQKTKDA GQEIQTKAQD VKRSSS      176

SEQ ID NO: 105            moltype = AA  length = 153
FEATURE                   Location/Qualifiers
source                    1..153
                          mol_type = protein
                          organism = Ricinus communis
SEQUENCE: 105
MADRPQPHQV QVHRYDPTTG YKGQQKGPSA SKVLAVLTFL PVGGGLLSLS GITLTNTLIG  60
MAIATPLFIL FGPIILPAAV VIGLAMMAFM VAGALGLSGL TSQSWALKYF REGTAMPESL  120
DQAKKRMQDM AGYVGMKTKE VGQDIQRKAQ EGK                            153

SEQ ID NO: 106            moltype = AA  length = 138
FEATURE                   Location/Qualifiers
```

```
source                  1..138
                        mol_type = protein
                        organism = Ricinus communis
SEQUENCE: 106
MAEHQQSPVV SHRPRVNQLV KAGTAATAGS SLLFLSGLTL TGTVIALALA TPLMVLFSPV  60
LLPAVIIISL IGAGFLTSGG FGFGAILVLS WIYRYVTGKQ PPGAESLDQA RLKLAGKARE  120
MKDRAEQFGQ HVTGQQTS                                               138

SEQ ID NO: 107          moltype = AA  length = 226
FEATURE                 Location/Qualifiers
source                  1..226
                        mol_type = protein
                        organism = Glycine max
SEQUENCE: 107
MTTQVPPHSV QVHTTTTHRY EAGVVPPGAR FETSYEAGVK AASIYHSERG PTTSQVLAVL  60
AGLPVGGILL LLAGLTLAGT LTGLAVATPL FVLFSPVLVP ATVAIGLAVA GFLTSGAFGL  120
TALSSFSWIL NYIRETQPAS ENLAAAAKHH LAEAAAEYVGQ KTKEVGQKTK EVGQDIQSKA  180
QDTREAAARD AREAAARDAR EAAARDAKVE ARDVKRTTVT ATTATA                226

SEQ ID NO: 108          moltype = AA  length = 223
FEATURE                 Location/Qualifiers
source                  1..223
                        mol_type = protein
                        organism = Glycine max
SEQUENCE: 108
MTTVPPHSVQ VHTTTHRYEA GVVPPARFEA PRYEAGIKAP SSIYHSERGP TTSQVLAVVA  60
GLPVGGILLL LAGLTLAGTL TGLVVATPLF IIFSPVLIPA TVAIGLAVAG FLTSGVFGLT  120
ALSSFSWILN YIRETQPASE NLAAAAKHHL AEAAAEYVGQK TKEVGQKTKE VGQDIQSKAQ  180
DTREAAARDA RDAREAAARD ARDAKVEARD VKRTTVTATT ATA                   223

SEQ ID NO: 109          moltype = AA  length = 155
FEATURE                 Location/Qualifiers
source                  1..155
                        mol_type = protein
                        organism = Linum usitatissimum
SEQUENCE: 109
MDQTHQTYAG TTQNPSYGGG GTMYQQQQPR SYQAVKAATA ATAGGSLIVL SGLILTATVI  60
SLIIATPLLV IFSPVLVPAL ITVGLLITGF LASGGFGVAA VTVLSWIYRY VTGGHPAGGD  120
SLDQARSKLA GKAREVKDRA SEFAQQHVTG GQQTS                            155

SEQ ID NO: 110          moltype = AA  length = 180
FEATURE                 Location/Qualifiers
source                  1..180
                        mol_type = protein
                        organism = Linum usitatissimum
SEQUENCE: 110
MADRTTQPHQ VQVHTQHHYP TGGAFGRYEG VLKGGPYHQQ GTGSGPSASK VLAVMTALPI  60
GGTLLALAGI TLAGTMIGLA ITTPIFVICS PVLVPAALLI GFAVSAFLAS GMAGLTGLTS  120
LSWFARYLQQ AGQGVGVGVP DSFDQAKRRM QDAAGYMGQK TKEVGQEIQR KSQDVKASDK  180

SEQ ID NO: 111          moltype = AA  length = 181
FEATURE                 Location/Qualifiers
source                  1..181
                        mol_type = protein
                        organism = Helianthus annuus
SEQUENCE: 111
TTTTYDRHFT TTQPHYRQDD RSRYDQQTHS QSTSRTLAII ALLPVGGILL GLAALTFIGT  60
LIGLALATPL FVIFSPIIVP AVLTIGLAVT GFLASGTFGL TGLSSLSYLF NMVRQTAGSV  120
PESLDYVKGT LQDAGEYAGQ KTKDFGQKIQ STAHEMGDQG QVGVHAQVGG GKEGRKSGDR  180
T                                                                 181

SEQ ID NO: 112          moltype = AA  length = 156
FEATURE                 Location/Qualifiers
source                  1..156
                        mol_type = protein
                        organism = Zea mays
SEQUENCE: 112
MADHHRGATG GGGGYGDLQR GGGMHGEAQQ QQKQGAMMTA LKAATAATFG GSMLVLSGLI  60
LAGTVIALTV ATPVLVIFSP VLVPAAIALA LMAAGFVTSG GLGVAALSVF SWMYKYLTGK  120
HPPAADQLDH AKARLASKAR DVKDAAQHRI DQAQGS                           156

SEQ ID NO: 113          moltype = AA  length = 244
FEATURE                 Location/Qualifiers
source                  1..244
                        mol_type = protein
                        organism = Brassica napus
SEQUENCE: 113
VSKPDDCRRI VDETISHFGR LDHLVNNAGI MQISMFENIE EITRTRAVMD TNFWGSVYTT  60
RAALPYLRQS NGKIVAMSSS AAWLTAPRMS FYNASKAALL NFFETLRIEL GSDVHITIVT  120
```

```
PGYIESELTQ GKYFSGEGEL VVNQDIRDVQ IGAFPVTSVS GCAKGIVKGV CRKQRYVTEP  180
SWFKVTYLWK VFCPELIEWG CRLLFLSGHG TSEKNALNKK ILDIPGVRSA LYPESIRTPE  240
IKSE                                                              244

SEQ ID NO: 114         moltype = AA  length = 349
FEATURE                Location/Qualifiers
source                 1..349
                       mol_type = protein
                       organism = Brassica napus
SEQUENCE: 114
MELINDFLNL TAPFFTFFGL CFFLPPFYFF KFVQSIFSTI FSENVYGKVV LITGASSGIG  60
EQLAYEYASK GACLALTARR KNRLEEVAEI AREVGSPNVV TVHADVSKPD DCRRIVDETI  120
SHFGRLDHLV NNAGIMQISM FENIEEITRT RAVMDTNFWG AVYTTRAALP YLRQSNGKIV  180
AMSSSAAWLT APRMSFYNAS KAALLNFFET LRIELGSDVH ITIVTPGYIE SELTQGKYVS  240
GEGELVVNQD IRDVQIGAFP VTSVSGRAKG IVKGVCRKER YVTEPSWFKV TYLWKVFCPE  300
LIEWGCRLMF LSGHGTPEEN ALNKKILDIP GVRSALYPEP IRTPEIKSE             349

SEQ ID NO: 115         moltype = AA  length = 456
FEATURE                Location/Qualifiers
source                 1..456
                       mol_type = protein
                       organism = Brassica napus
SEQUENCE: 115
MVDLLNSVMN LVAPPATMVV MAFSWPLLCF ITFSERLYNS YFVTEDMEDK VVVITGASPA  60
IGEQIAYEYA KRGANLVLVA RREQRLRVVS NNARQIGANH VIIIAADVVK EDDCRRFITQ  120
AVNYYGRVDH LVNSASLGHT FYFDEVSDTT VFPHLLDINF WGNVYPTYVA LPHLQKTNGR  180
IVVNASVENW LPLPRMSLYS AAKAALVNFY ETLRFELNGD VGITIATHGW IGSEMSRGKF  240
MLEEGAEMQW KEEREVPANG GPLEEFAKMI VAGACRGDAY VKFPNWYDVF LLYRVFTPNV  300
LRWTFKLLLS SEGSRQSSLV GVGQGLPPEE SSSQMKLMLE GGSPRVTASP PRYTPSPSPP  360
HHTASPPRYT PSPSPPHHTS SPQRYTPSPS PPHYTSSRHR YTPSPSPPHY TESPPLYTES  420
PPHYTTSPNW YTESPPRYTP SPSPPRFSRF NIQELP                           456

SEQ ID NO: 116         moltype = AA  length = 348
FEATURE                Location/Qualifiers
source                 1..348
                       mol_type = protein
                       organism = Sesamum indicum
SEQUENCE: 116
MDLIHTFLNL IAPPFTFFFL LFFLPPFQIF KFFLSILGTL FSEDVAGKVV VITGASSGIG  60
ESLAYEYAKR GACLVLAARR ERSLQEVAER ARDLGSPDVV VVRADVSKAE DCRKVVDQTM  120
NRFGRLDHLV NNAGIMSVSM LEEVEDITGY RETMDINFWG YVYMTRFAAP YLRNSRGRIV  180
VLSSSSSWMP TPRMSFYNAS KAAISQFFET LRVEFGPDIG ITLVTPGFIE SELTQGKFYN  240
AGERVIDQDM RDVQVSTTPI LRVESAARSI VRSAIRGERY VTEPAWFRVT YWWKLFCPEV  300
MEWVFRLMYL ASPGEPEKET FGKKVLDYTG VKSLLYPETV QVPEPKND              348

SEQ ID NO: 117         moltype = AA  length = 350
FEATURE                Location/Qualifiers
source                 1..350
                       mol_type = protein
                       organism = Zea mays
SEQUENCE: 117
MLGMSRTGLA GAALRVALTA LLPLVLPAYY VYKLTTYLLG AVFPEDVAGK VVLITGASSG  60
IGEHLAYEYA KRGAYLALVA RREASLREVG DVALGLGSPG VLVLPADVSK PRDCEGFIDD  120
TISYFGRLDH LVNNASIWQV CKFEEIQDVR HLRALMDINF WGHVYPTRLA IPHLRRSRGR  180
IVGVTSNSSY IFIGRNTFYN ASKAAALSFY DTLRMELGSD IRITEVVPGV VESEITKGKM  240
LTKGGEMKVD QDERDAILGP TPAEPVGDFA RTVVRDVCRG ARYVFEPRWY MGVYLLRACL  300
PEVLAWNSRL LTVDTVGAST TDTLGKWLVE LPGVRRVVQP PSLRSPEIKD             350

SEQ ID NO: 118         moltype = AA  length = 245
FEATURE                Location/Qualifiers
source                 1..245
                       mol_type = protein
                       organism = Brassica napus
SEQUENCE: 118
MGTATEIMER DAMATVAPYA PVTFHRRARV DLDDRLPKPY MPRALQAPDR EHPYGTPGHK  60
NYGLSVLQQH VAFFDIDDNG IIYPWETYSG LRMIGFNIIG SLIIAAVINL ALSYATLPGW  120
LPSPFFPIYI HNIHKSKHGS DSRTYDNEGR FMPVNLELIF SKYAKTLPDK LSLGELWDMT  180
EGQRDAWDIF GWFASKIEWG LLYLLARDEE GFLSKEAIRR CFDGSLFEYC AKIYVGINED  240
KTAYY                                                             245

SEQ ID NO: 119         moltype = AA  length = 244
FEATURE                Location/Qualifiers
source                 1..244
                       mol_type = protein
                       organism = Brassica napus
SEQUENCE: 119
MVRESMGEES EAFATTAPLA PVTGERKVRN DLEETLPKPY LARALVAPDT EHPNGSEGHD  60
SKGMSVTQQH VAFFDQNGDG IVYPWETYAG FRDLGFNPIS SVFWAIFINF AFSYVTLPSW  120
LPSPLLPVYI DNIHKAKHGS DSSTYDTEGR YVPVNLENIF SKYALTAPNK ITLKELWNLT  180
```

```
EGNRMAIDPF GWLANKVEWL LVYLLAKDEE GFVSKEAVRG VFDASFFEYC AKKNKEKADS  240
RKQD                                                               244

SEQ ID NO: 120          moltype = AA  length = 245
FEATURE                 Location/Qualifiers
source                  1..245
                        mol_type = protein
                        organism = Sesamum indicum
SEQUENCE: 120
MATHVLAAAA ERNAALAPDA PLAPVTMERP VRTDLETSIP KPYMARGLVA PDMDHPNGTP  60
GHVHDNLSVL QQHCAFFDQD DNGIIYPWET YSGLRQIGFN VIASLIMAIV INVALSYPTL  120
PGWIPSPFFP IYLYNIHKAK HGSDSGTYDT EGRYLPMNFE NLFSKHARTM PDRLTLGELW  180
SMTEANREAF DIFGWIASKM EWTLLYILAR DQDGFLSKEA IRRCYDGSLF EYCAKMQRGA  240
EDKMK                                                              245

SEQ ID NO: 121          moltype = AA  length = 243
FEATURE                 Location/Qualifiers
source                  1..243
                        mol_type = protein
                        organism = Zea mays
SEQUENCE: 121
MSSYSPPPPP PRDQSMDTEA PNAPITRERR LNPDLQEQLP KPYLARALEA VDPSHPQGTK  60
GRDPRGMSVL QQHAAFFDRN GDGVIYPWET FQGLRAIGCG LTVSFAFSIL INLFLSYPTQ  120
PGWLPSPLLS IRIDNIHKGK HGSDSETYDT EGRFDPSKFD AIFSKYGRTH PNAITRDELS  180
SMLQGNRNTY DFLGWLAAAG EWLLLYSLAK DKDGLLQRET VRGLFDGSLF ERLEDDNNKK  240
KSS                                                                243

SEQ ID NO: 122          moltype = DNA  length = 11142
FEATURE                 Location/Qualifiers
misc_feature            1..11142
                        note = TDNA sequence
source                  1..11142
                        mol_type = other DNA
                        organism = synthetic construct
SEQUENCE: 122
tcctgtggtt ggcatgcaca tacaaatgga cgaacggata aaccttttca cgccctttta  60
aatatccgat tattctaata aacgctcttt tctcttaggt ttacccgcca atatatcctg  120
tcaaacactg atagtttaaa ctgaaggcgg gaaacgacaa tctgctagtg gatctcccag  180
tcacgacgtt gtaaaacggg cgccctagaa tctaattatt ctattcagac taaattagta  240
taagtatttt tttaatcaat aaataataat taataattta ttagtaggag tgattgaatt  300
tataatatat tttttttaat catttaaaga atcttatatc tttaaattga caagagtttt  360
aaatggggag agtgttatca tatcacaagt aggattaatg tgttatagtt tcacatgcat  420
tacgataagt tgtgaaagat aacattatta tatataacaa tgacaatcac tagcgatcga  480
gtagtgagag tcgtcttatt acactttctt ccttcgatct gtcacatggc ggcggcccga  540
attctcacac aaggtagttg caagacactg aagtggtggt agtggtagta gaagaagcag  600
aatcggtaga aaggcaagac aatggagaag atgaagatgg tggagattct cttcccacaa  660
cgcagcaatc aaggttttca aggttaaggc actcgtgctt tccatcatcg aacatgaagt  720
cgatgttatc ctcgaaagca agctcgttga agagttctgg gtactcaatt gggttctcgt  780
tagcaaggtt ttgatcggta aggaatgggg agaatccagt atccatcatg cagaagttcc  840
aagcaagttc gttgttatct ccgcacctat ccatttccat gatggtggaa gaatcaatgc  900
agcagttaac aacggcagct tcctcagaat atcccacaat ttcagcctct tgttgctcag  960
ccttctcttc ctctttttct tcttcctctt gaggtggttc ctcaacgtat tgttgcttaa  1020
cctcttccct aggttcctct ttagcttctc tagtctcaac ctcttgctta gcctcaacaa  1080
gaatacccct ttgatggtta gcctggttaa ctgggaatgg gaaaacgccc ttcttcttaa  1140
gcctgtcgat gtagttggag atatcgaagt tggtaacagc gttagcacct ctgtactcaa  1200
tagcagccat atcataagca gctgcagcct cttcttgagt gttgtaagtt ccgaggtaga  1260
ggtacttgtt tccgaaaact cttccaatcc tagcttccca tcttccgtta tgatgatgcc  1320
tagcaactcc cctatactta gaaactcccc tagagaatcc agatgactgc cttctaaggg  1380
aagcaagata ctcttctttg gtcaccctct gcatctcttc aagttctttg gtgtaagtct  1440
cagctgggaa gttaagaatg gtatctgggc cccaatactt aagagcagca agatcatagg  1500
tatgagcagc agcctcttca gaatcataag ctccaaggta aacctgcttg cccttcttgt  1560
tttggatgga gttccaagag gacttatccc aaaggtgagc ttcgaatctt ccagtccatc  1620
tatgcctagt aacacctctg tagatagatg accttctggt agaagctgga gaagttgggt  1680
tatgagactt atcgccagat ggagatgact tcttagccct cttagctctc tttggtcttg  1740
gagcttcaga ttgaattggg ctagaggtag tagtagaaga ggacactgaa gaagatggag  1800
aactagagca ggtagaggta gtgagcctct tcttcatgaa ttctgttctt ctttactctt  1860
tgtgtgactg aggtttggtc tagtgctttg gtcatctata tataatgata acaacaatga  1920
gaacaagctt tggagtgatc ggagggtcta ggatacatga gattcaagtg gactaggatc  1980
tacaccgttg gattttgagt gtggatatgt gtgaggttaa ttttacttgg taacggccac  2040
aaaggcctaa ggagaggtgt tgagaccctt atcggcttga accgctggaa taatgccacg  2100
tggaagataa ttccatgaat cttatcgtta tctatgagtg aaattgtgtg atggtggagt  2160
ggtgcttgct cattttactt gcctggtgga cttggccctt tccttatggg gaatttatat  2220
tttacttact atagagcttt catacctttt ttttaccttg gatttagtta atatataatg  2280
gtatgattca tgaataaaaa tgggaaattt ttgaatttgt actgctaaat gcataagatt  2340
aggtgaaact gtggaatata tattttttttc atttaaaagc aaaatttgcc ttttactaga  2400
attataaata tagaaaaata tataacattc aaataaaaat gaaaataaga actttcaaaa  2460
aacagaacta tgtttaatgt gtaaagatta gtcgcacatc aagtcatctg ttacaatatg  2520
ttacaacaag tcataagccc aacaaagtta gcacgtctaa ataaactaaa gagtccacga  2580
aaatattaca aatcataagc ccaacaaagt tattgatcaa aaaaaaaaaa cgcccaacaa  2640
```

```
agctaaacaa agtccaaaaa aaacttctca agtctccatc ttcctttatg aacattgaaa  2700
actatacaca aaacaagtca gataaatctc tttctgggcc tgtcttccca acctcctaca  2760
tcacttccct atcggattga atgttttact tgtacctttt ccgttgcaat gatattgata  2820
gtatgtttgt gaaaactaat agggttaaca atcgaagtca tggaatatgg atttggtcca  2880
agatttttccg agagctttct agtagaaagc ccatcaccag aaatttacta gtaaaataaa  2940
tcaccaatta ggtttcttat tatgtgccaa attcaatata attatagagg atatttcaaa  3000
tgaaaacgta tgaatgttat tagtaaatgg tcaggtaaga cattaaaaaa atcctacgtc  3060
agatattcaa ctttaaaaat tcgatcagtg tggaattgta caaaaatttg ggatctacta  3120
tatatatata atgctttaca acacttggat tttttttttgg aggctggaat ttttaatcta  3180
catatttgtt ttggccatgc accaactcat tgtttagtgt aatactttga ttttgtcaaa  3240
tatatgtgtt cgtgtatatt tgtataagaa tttctttgac catatacaca cacacatata  3300
tatatatata tatatattat atatcatgca cttttaattg aaaaaataat atatatatat  3360
atagtgcatt ttttctaaca accatatatg ttgcgattga tctgcaaaaa tactgctaga  3420
gtaatgaaaa atataatcta ttgctgaaat tatctcagat gttaagattt tcttaaagta  3480
aattctttca aattttagct aaaagtcttg taataactaa agaataatac acaatctcga  3540
ccacggaaaa aaaacacata ataaatttgg ggccccctaga atctaattat tctattcaga  3600
ctaaattagt ataagtattt ttttaatcaa taaataataa ttaataattt attagtagga  3660
gtgattgaat ttataatata ttttttttaa tcatttaaag aatcttatat ctttaaattg  3720
acaagagttt taaatgggga gagtgttatc atatcacaag taggattaat gtgttatagt  3780
ttcacatgca ttacgataag ttgtgaaaga taacattatt atatataaca atgacaatca  3840
ctagcgatcg agtagtgaga gtcgtcttat tacactttct tccttcgatc tgtcacatgg  3900
cggcggcccg cggccgcttc attactcgag ccaggaggat ggatcgatgc tggtctgaga  3960
ccctgctacc ggttgctgac tgaactgctc ggcacggtcc ttcatttcac gggccttgct  4020
cgccaacttt gtcttggccg actccaactg atccgctccg ggtggatgtt tccccgtcag  4080
gtaacggtag atccaggaca gcacagacag agcggcaaca ccaaatcccc cgcttgccag  4140
aaaacccgct cccaacagga agatggtgat gactgcagat cagaaaaact cagattaatc  4200
gacaaattcg atcgcacaaa ctagaaacta acaccagatc tagatagaaa tcacaaatcg  4260
aagagtaatt attcgacaaa actcaaatta tttgaacaaa tcggatgata tctatgaaac  4320
cctaatcgag aattaagatg atatctaacg atcaaaccca gaaaatcgtc ttcgatctaa  4380
gattaacaga atctaaacca aagaacatat acgaaattgg gatcgaacga aaacaaaatc  4440
gaagattttg agagaataag gaacacagaa atttacctgc agggaccagt acaggcgaga  4500
agatcaccag gagaggtgtg gcgattgtca gcgcaatgac cgttccagcc agggtcaacc  4560
cggataacac caacaggcta cctccggcag taaccgcggt cgctgccttt acaacacgct  4620
gagcacgcgg ttgcagttgc aagtgggggg cacgtgtttg ttgctgctgc ccgtagtgct  4680
ctgccatggt ttttttaac ggagcaagcg gccgctgttc ttctttactc tttgtgtgac  4740
tgaggtttgg tctagtgctt tggtcatcta tatataatga taacaacaat gagaacaagc  4800
tttggagtga tcggagggtc taggatacat gagattcaag tggactagga tctacaccgt  4860
tggatttga gtgtggatat gtgtgaggtt aattttactt ggtaacggcc acaaaggcct  4920
aaggagaggt gttgagaccc ttatcggctt gaaccgctgg aataatgcca cgtggaagat  4980
aattccatga atcttatcgt tatctatgag tgaaattgtg tgatggtgga gtggtgcttg  5040
ctcattttac ttgcctggtg gacttggccc tttccttatg gggaatttat attttactta  5100
ctatagagct ttcatacctt ttttttacct tggatttagt taatatataa tggtatgatt  5160
catgaataaa aatgggaaat ttttgaattt gtactgctaa atgcataaga ttaggtgaaa  5220
ctgtggaata tatattttttt tcatttaaaa gcaaaatttg ccttttacta gaattataaa  5280
tatagaaaaa tatataacat tcaaataaaa atgaaaataa gaactttcaa aaaacagaac  5340
tatgtttaat gtgtaaagat tagtcgcaca tcaagtcatc tgttacaata tgttacaaca  5400
agtcataagc ccaacaaagt tagcacgtct aaataaacta aagagtccac gaaaatatta  5460
caaatcataa gcccaacaaa gttattgatc aaaaaaaaaa aacgcccaac aaagctaaac  5520
aaagtccaaa aaaaacttct caagtctcca tcttccttta tgaacattga aaactataca  5580
caaaacaagt cagataaatc tctttctggg cctgtcttcc caacctccta catcacttcc  5640
ctatcggatt gaatgtttta cttgtacctt ttccgttgca atgatattga tagtatgttt  5700
gtgaaaacta atagggttaa caatcgaagt catggaatat ggatttggtc caagattttc  5760
cgagagcttt ctagtagaaa gcccatcacc agaaatttac tagtaaaata aatcaccaat  5820
taggtttctt attatgtgcc aaattcaata taattataga ggatatttca aatgaaaacg  5880
tatgaatgtt attagtaaat ggtcaggtaa gacattaaaa aaatcctacg tcagatattc  5940
aactttaaaa attcgatcag tgtggaattg tacaaaaatt tgggatctac tatatatata  6000
taatgcttta caacacttgg attttttttt ggaggctgga atttttaatc tacatatttg  6060
ttttggccat gcaccaactc attgtttagt gtaatacttt gattttgtca aatatatgtg  6120
ttcgtgtata tttgtataag aatttctttg accatataca cacacacata tatatatata  6180
tatatatatt atatatcatg cacttttaat tgaaaaaata atatatatat atatagtgca  6240
tttttctaa caaccatata tgttgcgatt gatctgcaaa aatactgcta gagtaatgaa  6300
aaatataatc tattgctgaa attatctcag atgttaagat tttcttaaag taaattcttt  6360
caaattttag ctaaaagtct tgtaataact aaagaataat acacaatctc gaccacggaa  6420
aaaaaacaca taataaattt gggcgcgccg cgtattggct agagcagctt gccaacatgg  6480
tggagcacga cactctcgtc tactccaaga atatcaaaga tacagtctca gaagaccaaa  6540
gggctattga gacttttcaa caaagggtaa tatcgggaaa cctcctcgga ttccattgcc  6600
cagctatctg tcacttcatc aaaaggacag tagaaaagga aggtggcacc tacaaatgcc  6660
atcattgcga taaaggaaag gctatcgttc aagatgcctc tgccgacagt ggtcccaaag  6720
atggaccccc acccacgagg agcatcgtgg aaaaagaaga cgttccaacc acgtcttcaa  6780
agcaagtgga ttgatgtgat aacatggtgg agcacgacac tctcgtctac tccaagaata  6840
tcaaagatac agtctcagaa gaccaaaggg ctattgagac ttttcaacaa agggtaatat  6900
cgggaaacct cctcggattc cattgcccag ctatctgtca cttcatcaaa aggacagtag  6960
aaaaggaagg tggcacctac aaatgccatc attgcgataa aggaaaggct atcgttcaag  7020
atgcctctgc cgacagtggt cccaaagatg gacccccacc cacgaggagc atcgtggaaa  7080
aagaagacgt tccaaccacg tcttcaaagc aagtggattg atgtgatatc tccactgacg  7140
taagggatga cgcacaatcc cactatcctt cgcaagacct tcctctatat aaggaagttc  7200
atttcatttg gagaggacac gctgaaatca ccagtctctc tctacaaatc tatctctgcg  7260
atcgcatggc gattttggat tctgctggcg ttactacggt gacggagaac ggtggcggag  7320
agttcgtcga tcttgatagg cttcgtcgac ggaaatcgag atcggattct tctaacggac  7380
```

```
ttcttctctc tggttccgat aataattctc cttcggatga tgttggagct cccgccgacg  7440
ttagggatcg gattgattcc gttgttaacg atgacgctca gggaacagcc aatttggccg  7500
gagataataa cggtggtggc gataataacg gtggtggaag aggcggcgga gaaggaagag  7560
gaaacgccga tgctacgttt acgtatcgac cgtcggttcc agctcatcgg agggcgagag  7620
agagtccact tagctccgac gcaatcttca aacagagcca tgccggatta ttcaacctct  7680
gtgtagtagt tcttattgct gtaaacagta gactcatcat cgaaaatctt atgaagtatg  7740
gttggttgat cagaacggat ttctggttta gttcaagatc gctgcgagat tggccgcttt  7800
tcatgtgttg tatatccctt tcgatctttc ctttggctgc ctttacggtt gagaaattgg  7860
tacttcagaa atacatatca gaacctgttg tcatctttct tcatattatt atcaccatga  7920
cagaggtttt gtatccagtt tacgtcaccc taaggtgtga ttctgctttt ttatcaggtg  7980
tcactttgat gctcctcact tgcattgtgt ggctaaagtt ggtttcttat gctcatacta  8040
gctatgacat aagatcccta gccaatgcag ctgataaggc caatcctgaa gtctcctact  8100
acgttagctt gaagagcttg gcatatttca tggtcgctcc cacattgtgt tatcagccaa  8160
gttatccacg ttctgcatgt atacggaagg gttgggtggc tcgtcaattt gcaaaactgg  8220
tcatattcac cggattcatg ggatttataa tagaacaata tataaatcct attgtcagga  8280
actcaaagca tcctttgaaa ggcgatcttc tatatgctat tgaaagagtg ttgaagcttt  8340
cagttccaaa tttatatgtg tggctctgca tgttctactg cttcttccac ctttggttaa  8400
acatattggc agagcttctc tgcttcgggg atcgtgaatt ctacaaagat tggtggaatg  8460
caaaaagtgt gggagattac tggagaatgt ggaatatgcc tgttcataaa tggatggttc  8520
gacatatata cttcccgtgc ttgcgcagca agataccaaa gacactcgcc attatcattg  8580
ctttcctagt ctctgcagtc tttcatgagc tatgcatcgc agttccttgt cgtctcttca  8640
agctatgggc ttttcttggg attatgtttc aggtgccttt ggtcttcatc acaaactatc  8700
tacaggaaag gtttggctca acggtgggga acatgatctt ctggttcatc ttctgcattt  8760
tcggacaacc gatgtgtgtg cttctttatt accacgacct gatgaaccga aaaggatcga  8820
tgtcatgagc gatcgcgatc gttcaaacat ttggcaataa agtttcttaa gattgaatcc  8880
tgttgccggt cttgcgatga ttatcatata atttctgttg aattacgtta agcatgtaat  8940
aattaacatg taatgcatga cgttatttat gagatgggtt tttatgatta gagtcccgca  9000
attatacatt taatacgcga tagaaaacaa aatatagcgc gcaaactagg ataaattatc  9060
gcgcgcggtg tcatctatgt tactagatcc ctgcagggcg tattggctag agcagcttgc  9120
caacatggtg gagcacgaca ctctcgtcta ctccaagaat atcaaagata cagtctcaga  9180
agaccaaagg gctattgaga cttttcaaca aagggtaata tcgggaaacc tcctcggatt  9240
ccattgccca gctatctgtc acttcatcaa aaggacagta gaaaaggaag gtggcaccta  9300
caaatgccat cattgcgata aaggaaaggc tatcgttcaa gatgcctctg ccgacagtgg  9360
tcccaaagat ggacccccac ccacgaggag catcgtggaa aaagaagacg ttccaaccac  9420
gtcttcaaag caagtggatt gatgtgataa catggtggag cacgacactc tcgtctactc  9480
caagaatatc aaagatacag tctcagaaga ccaaagggct attgagactt ttcaacaaag  9540
ggtaatatcg ggaaacctcc tcggattcca ttgcccagct atctgtcact tcatcaaaag  9600
gacagtagaa aaggaaggtg gcacctacaa atgccatcat tgcgataaag gaaaggctat  9660
cgttcaagat gcctctgccg acagtggtcc caaagatgga cccccaccca cgaggagcat  9720
cgtggaaaaa gaagacgttc caaccacgtc ttcaaagcaa gtggattgat gtgatatctc  9780
cactgacgta agggatgacg cacaatccca ctatccttcg caagaccttc ctctatataa  9840
ggaagttcat ttcatttgga gaggacacgc tgaaatcacc agtctctctc tacaaatcta  9900
tctctctcga gatgattgaa caagatggat tgcacgcagg ttctccggcc gcttgggtgg  9960
agaggctatt cggctatgac tgggcacaac agacaatcgg ctgctctgat gccgccgtgt  10020
tccggctgtc agcgcagggg aggccggttc tttttgtcaa gaccgacctg tccggtgccc  10080
tgaatgaact tcaagacgag gcagcgcggc tatcgtggct ggccacgacg ggcgttcctt  10140
gcgcagctgt gctcgacgtt gtcactgaag cgggaaggga ctggctgcta ttgggcgaag  10200
tgccggggca ggatctcctg tcatctcacc ttgctcctgc cgagaaagta tccatcatgg  10260
ctgatgcaat gcggcggctg catacgcttg atccggctac ctgcccattc gaccaccaag  10320
cgaaacatcg catcgagcga gcacgtactc ggatggaagc cggtcttgtc gatcaggatg  10380
atctggacga agagcatcag gggctcgcgc cagccgaact gttcgccagg ctcaaggcgc  10440
gcatgcccga cggcgaggat ctcgtcgtga ctcatggcga tgcctgcttg ccgaatatca  10500
tggtggaaaa tggccgcttt tctggattca tcgactgtgg ccggctgggt gtggcggacc  10560
gctatcagga catagcgttg gctacccgtg atattgctga agagcttggc ggcgaatggg  10620
ctgaccgctt cctcgtgctt tacggtatcg ccgctcccga ttcgcagcgc atcgccttct  10680
atcgccttct tgacgagttc ttctgaaacg cgtgatcgtt caaacatttg gcaataaagt  10740
ttcttaagat tgaatcctgt tgccggtctt gcgatgatta tcatataatt tctgttgaat  10800
tacgttaagc atgtaataat taacatgtaa tgcatgacgt tatttatgag atgggttttt  10860
atgattagag tcccgcaatt atacatttaa tacgcgatag aaaacaaaat atagcgcgca  10920
aactaggata aattatcgcg cgcggtgtca tctatgttac tagatcgacg tccgtacggt  10980
taaaaccacc ccagtacatt aaaaacgtcc gcaatgtgtt attaagttgt ctaagcgtca  11040
atttgtttac accacaatat atcctgccac cagccagcca acagctcccc gaccggcagc  11100
tcggcacaaa atcaccactc gatacaggca gcccatcagt cc                    11142
```

```
SEQ ID NO: 123          moltype = DNA  length = 16749
FEATURE                 Location/Qualifiers
misc_feature            1..16749
                        note = vector sequence
source                  1..16749
                        mol_type = other DNA
                        organism = synthetic construct
SEQUENCE: 123
gcttcctcgt gctttacggt atcgccgctc ccgattcgca gcgcatcgcc ttctatcgcc  60
ttcttgacga gttcttctga aacgcgtgat cgttcaaaca tttggcaata aagtttctta  120
agattgaatc ctgttgccgg tcttgcgatg attatcatat aatttctgtt gaattacgtt  180
aagcatgtaa taattaacat gtaatgcatg acgttattta tgagatgggt ttttatgatt  240
agagtcccgc aattatacat ttaatacgcg atagaaaaca aaatatagcg cgcaaactag  300
gataaattat cgcgcgcggt gtcatctatg ttactagatc gacgtccgta cggttaaaac  360
caccccagta cattaaaaac gtccgcaatg tgttattaag ttgtctaagc gtcaatttgt  420
```

```
ttacaccaca atatatcctg ccaccagcca gccaacagct ccccgaccgg cagctcggca  480
caaaatcacc actcgataca ggcagcccat cagtccacta gacgctcacc gggctggttg  540
ccctcgccgc tgggctggcg gccgtctatg gccctgcaaa cgcgccagaa acgccgtcga  600
agccgtgtgc gagacaccgc agccgccggc gttgtggata cctcgcggaa aacttggccc  660
tcactgacag atgaggggcg gacgttgaca cttgaggggc cgactcaccc ggcgcggcgt  720
tgacagatga ggggcaggct cgatttcggc cggcgacgtg gagctggcca gcctcgcaaa  780
tcggcgaaaa cgcctgattt tacgcgagtt tcccacagat gatgtggaca agcctgggga  840
taagtgccct gcggtattga cacttgaggg gcgcgactac tgacagatga ggggcgcgat  900
ccttgacact tgaggggcag agtgctgaca gatgaggggc gcacctattg acatttgagg  960
ggctgtccac aggcagaaaa tccagcattt gcaagggttt ccgcccgttt ttcggccacc  1020
gctaacctgt cttttaacct gcttttaaac caatatttat aaaccttgtt tttaaccagg  1080
gctgcgccct gtgcgcgtga ccgcgcacgc cgaagggggg tgcccccct tctcgaaccc  1140
tcccggcccg ctctcgcgtt ggcagcatca cccataattg tggtttcaaa atcggctccg  1200
tcgatactat gttatacgcc aactttgaaa acaactttga aaaagctgtt ttctggtatt  1260
taaggtttta gaatgcaagg aacagtgaat tggagttcgt cttgttataa ttagcttctt  1320
ggggtattta aatactgtag aaaagaggaa ggaaataata aatggctaaa atgagaatat  1380
caccggaatt gaaaaaactg atcgaaaaat accgctgcgt aaaagatacg gaaggaatgt  1440
ctcctgctaa ggtatataag ctggtgggag aaaatgaaaa cctatattta aaaatgacgg  1500
acagccggta taaagggacc acctatgatg tggaacggga aaaggacatg atgctatggc  1560
tggaaggaaa gctgcctgtt ccaaaggtcc tgcaccttga acggcatgat ggctggagca  1620
atctgctcat gagtgaggcc gatggcgtcc tttgctcgga agagtatgaa gatgaacaaa  1680
gccctgaaaa gattatcgag ctgtatgcgg agtgcatcag gctctttcac tccatcgaca  1740
tatcggattg tccctatacg aatagcttag acagccgctt agccgaattg gattacttac  1800
tgaataacga tctggccgat gtggattgcg aaaactggga agaagacacc ccatttaaag  1860
atccgcgcga gctgtatgat tttttaaaga cggaaaagcc cgaagaggaa cttgtctttt  1920
cccacggcga cctgggagac agcaacatct ttgtgaaaga tggcaaagta agtggcttta  1980
ttgatcttgg gagaagcggc agggcggaca agtggtatga cattgccttc tgcgtccggt  2040
cgatcaggga ggatattggg gaagaacagt atgtcgagct attttttgac ttactgggga  2100
tcaagcctga ttgggagaaa ataaaatatt atattttact ggatgaattg ttttagtacc  2160
tagatgtggc gcaacgatgc tggcgacaag caggagcgca ccgacttctt ccgcatcaag  2220
tgttttggct ctcaggccga ggcccacggc aagtatttgg gcaaggggtc gctggtattc  2280
gtgcagggca agattcggaa taccaagtac gagaaggacg gccagacggt ctacgggacc  2340
gacttcattg ccgataaggt ggattatctg gacaccaagg caccaggcgg atcaaatcag  2400
gaataagggc acattgcccc ggcgtgagtc ggggcaatcc cgcaaggagg gtgaatgaat  2460
cggacgtttg accggaaggc atacaggcaa gaactgatcg acgcggggtt ttccgccgag  2520
gatgccgaaa ccatcgcaag ccgcaccgtc atgcgtgcgc cccgcgaaac cttccagtcc  2580
gtcggctcga tggcccagca agctacggcc aagatcgagc gcgacagcgt gcaactggct  2640
ccccctgccc tgcccgcgcc atcggccgcc gtggagcgtt cgcgtcgtct cgaacaggag  2700
gcggcaggtt tggcgaagtc gatgaccatc gacacgcgag gaactatgac gaccaagaag  2760
cgaaaaaccg ccggcgagga cctggcaaaa caggtcagcg aggccaagca agccgcgttg  2820
ctgaaacaca cgaagcagca gatcaaggaa atgcagcttt ccttgttcga tattgcgccg  2880
tggccggaca cgatgcgagc gatgccaaac gacacggccc gctctgccct gttcaccacg  2940
cgcaacaaga aaatcccgcg cgaggcgctg caaaacaagg tcattttcca cgtcaacaag  3000
gacgtgaaga tcacctacac cggcgtcgag ctgcgggccg acgatgacga actggtgtgg  3060
cagcaggtgt tggagtacgc gaagcgcacc cctatcggcg agccgatcac cttcacgttc  3120
tacgagcttt gccaggacct gggctggtcg atcaatggcc ggtattacac gaaggccgag  3180
gaatgcctgt cgcgcctaca ggcgacggcg atgggcttca cgtccgaccg cgttgggcac  3240
ctggaatcgg tgtcgctgct gcaccgcttc cgcgtcctgg accgtggcaa gaaaacgtcc  3300
cgttgccagg tcctgatcga cgaggaaatc gtcgtgctgt ttgctggcga ccactacacg  3360
aaattcatat gggagaagta ccgcaagctg tcgccgacgg cccgacggat gttcgactat  3420
ttcagctcgc accgggagcc gtacccgctc aagctggaaa ccttccgcct catgtgcgga  3480
tcggattcca cccgcgtgaa gaagtggcgc gagcaggtcg gcgaagcctg cgaagagttg  3540
cgaggcagcg gcctggtgga acacgcctgg gtcaatgatg acctggtgca ttgcaaacgc  3600
tagggccttg tggggtcagt tccggctggg ggttcagcag ccagcgcttt actgagatcc  3660
tcttccgctt cctcgctcac tgactcgctg cgctcggtcg ttcggctgcg gcgagcggta  3720
tcagctcact caaaggcggt aatacggtta tccacagaat caggggataa cgcaggaaag  3780
aacatgtgag caaaaggcca gcaaaaggcc aggaaccgta aaaaggccgc gttgctggcg  3840
tttttccata ggctccgccc ccctgacgag catcacaaaa atcgacgctc aagtcagagg  3900
tggcgaaacc cgacaggact ataaagatac caggcgtttc cccctggaag ctccctcgtg  3960
cgctctcctg ttccgaccct gccgcttacc ggatacctgt ccgcctttct cccttcggga  4020
agcgtggcgc tttctcatag ctcacgctgt aggtatctca gttcggtgta ggtcgttcgc  4080
tccaagctgg gctgtgtgca cgaacccccc gttcagcccg accgctgcgc cttatccggt  4140
aactatcgtc ttgagtccaa cccggtaaga cacgacttat cgccactggc agcagccact  4200
ggtaacagga ttagcagagc gaggtatgta ggcggtgcta cagagttctt gaagtggtgg  4260
cctaactacg gctacactag aagaacagta tttggtatct gcgctctgct gaagccagtt  4320
accttcggaa aaagagttgg tagctcttga tccggcaaac aaaccaccgc tggtagcggt  4380
ggtttttttg tttgcaagca gcagattacg cgcagaaaaa aaggatctca agaagatcct  4440
ttgatctttt ctacggggtc tgacgctcag tggaacgaaa actcacgtta agggattttg  4500
gtcatgagat tatcaaaaag gatcttcacc tagatccttt tggatctcct gtggttggca  4560
tgcacataca aatggacgaa cggataaacc ttttcacgcc cttttaaata tccgattatt  4620
ctaataaacg ctcttttctc ttaggtttac ccgccaatat atcctgtcaa acactgatag  4680
tttaaactga aggcgggaaa cgacaatctg ctagtggatc tcccagtcac gacgttgtaa  4740
aacgggcgtc tgcgatcgct gaagttccta tacttttcag agaataggaa cttcggaata  4800
ggaacttccc atgggatcta gtaacataga tgacaccgcg cgcgataatt tatcctagtt  4860
tgcgcgctat attttgtttt ctatcgcgta ttaaatgtat aattgcggga ctctaatcat  4920
aaaaacccat ctcataaata acgtcatgca ttacatgtta attattacat gcttaacgta  4980
attcaacaga aattatatga taatcatcgc aagaccggca acaggattca atcttaagaa  5040
actttattgc caaatgtttg aacgatcacg ctagcggata acaatttcac acaggatat  5100
cactagtaaa aggtaccgag ctcctgcagt atcgatgcgg ccgcaaagtc gacgaattct  5160
```

```
cattagcaga actcaagatg ctgatcctct ggaacgttga acttgagctt gtgttcctcg  5220
aaaagcttgc acaactcttt gatgtaacgc tggtgaagtc tatcaacttc ctctctagaa  5280
ggctgaggag tcatttgaac ctcgataggc tttccaacga tagtagtgat aggctgtctg  5340
aaaggcatga gtccgaaaga gtattggaaa actccccttc catggaaaag tggaaggctg  5400
attcccataa tcttttggag tctgttctgg atccatctaa gccaagttcc aggagtgttc  5460
tcaacctggt tgaagaggtt gttctctccg aatgagaaga taggaacaag agcagcacca  5520
tgcataagag caagtctgat gaatccctta cggttcttca agagaagtct gtaagcacca  5580
ggtctagcat caagagcctc ttgagcacct ccaacgatga tagcaagaag gtttccacca  5640
cccttctgc taaggatgtg atcagcagaa actttctcgc tagacacgag tccaccagac  5700
atgatgtaat ctctgaagaa tggagccctg aaccaaacgg taagcatcat aaggtaggat  5760
ctgattccag ggaacaaaga ggtgaatcca gtagactcag tacagaggtt aaggaaagca  5820
ccagcagcaa gaacaccatg aggatggaat ccagcaatgt agttacggct aggatcaagc  5880
tcagcagtct taacgagaga cacagggaag taatccttca tgtacttcca gatggccaat  5940
cttctgaaga attggatagg tctaccacct tgtctaggct tatcccaatc caagtaccac  6000
caggtagcgt aaagaacaga gaaaagccag aacctggtga acaagagtcc aacgaagata  6060
acgatgcaga gttgagcaag agcaaggaat gagaaaaccc actgaagaac agcgaaagtc  6120
tgcaatcttc tctcccaagg aacaagaagt ggagcgaact cgaccatgaa ttcagtcccc  6180
cgtgttctct ccaaatgaaa tgaacttcct tatatagagg aagggtcttg cgaaggatag  6240
tgggattgtg cgtcatccct tacgtcagtg gagatatcac atcaatccac ttgctttgaa  6300
gacgtggttg gaacgtcttc tttttccacg atgctcctcg tgggtggggg tccatctttg  6360
ggaccactgt cggcagaggc atcttcaacg atggcctttc ctttatcgca atgatggcat  6420
ttgtaggagc caccttcctt ttccactatc ttcacaataa agtgacagat agctgggcaa  6480
tggaatccga ggaggtttcc ggatattacc ctttgttgaa aagtctcaat tgccctttgg  6540
tcttctgaga ctgtatcttt gatatttttg gagtagacaa gtgtgtcgtg ctccaccatg  6600
ttgacgaaga ttttcttctt gtcattgagt cgtaagagac tctgtatgaa ctgttcgcca  6660
gtctttacgg cgagttctgt taggtcctct atttgaatct ttgactccat gggatccaag  6720
ggccctagaa tctaattatt ctattcagac taaattagta taagtatttt tttaatcaat  6780
aaataataat taataattta ttagtaggag tgattgaatt tataatatat ttttttttaat  6840
catttaaaga atcttatatc tttaaattga caagagtttt aaatggggag agtgttatca  6900
tatcacaagt aggattaatg tgttatagtt tcacatgcat tacgataagt tgtgaaagat  6960
aacattatta tatataacaa tgacaatcac tagcgatcga gtagtgagag tcgtcttatt  7020
acactttctt ccttcgatct gtcacatggc ggcggcccga attctcacac aaggtagttg  7080
caagacactg aagtggtggt agtggtagta gaagaagcag aatcggtaga aaggcaagac  7140
aatggagaag atgaagatgg tggagattct cttcccacaa cgcagcaatc aaggtttca  7200
aggttaaggc actcgtgctt tccatcatcg aacatgaagt cgatgttatc ctcgaaagca  7260
agctcgttga agagttctgg gtactcaatt gggttctcgt tagcaaggtt ttgatcggta  7320
aggaatgggg agaatccagt atccatcatg cagaagttcc aagcaagttc gttgttatct  7380
ccgcacctat ccatttccat gatggtggaa gaatcaatgc agcagttaac aacggcagct  7440
tcctcagaat atcccacaat ttcagcctct tgttgctcag ccttctcttc ctctttttct  7500
tcttcctctt gaggtggttc ctcaacgtat tgttgcttaa cctcttccct aggttcctct  7560
ttagcttctc tagtctcaac ctcttgctta gcctcaacaa gaataccctc ttgatggtta  7620
gcctggttaa ctgggaatgg gaaaacgccc ttcttcttaa gcctgtcgat gtagttggag  7680
atatcgaagt tggtaacagc gttagcacct ctgtactcaa tagcagccat atcataagca  7740
gctgcagcct cttcttgagt gttgtaagtt ccgaggtaga ggtacttgtt tccgaaaact  7800
cttccaatcc tagcttccca tcttccgtta tgatgatgcc tagcaactcc cctatactta  7860
gaaactcccc tagagaatcc agatgactgc cttctaaggg aagcaagata ctcttctttg  7920
gtcaccctct gcatctcttc aagttctttg gtgtaagtct cagctgggaa gttaagaatg  7980
gtatctgggc cccaatactt aagagcagca agatcatagg tatgagcagc agcctcttca  8040
gaatcataag ctccaaggta aacctgcttg cccttcttgt tttggatgga gttccaagag  8100
gacttatccc aaaggtgagc ttcgaatctt ccagtccatc tatgcctagt aacacctctg  8160
tagatagatg accttctggt agaagctgga gaagttgggt tatgagactt atcgccagat  8220
ggagatgact tcttagccct cttagctctc tttggtcttg gagcttcaga ttgaattggg  8280
ctagaggtag tagtagaaga ggacactgaa gaagatggag aactagagca ggtagaggta  8340
gtgagcctct tcttcatgaa ttcactagtg attaaatttt gttggtgctt tgagcatata  8400
acaagcatgg tatatatagg cacgtaaaca agttgagaaa ttttactttg agtttgacat  8460
aaccaataaa agttagtgct gtttattacc tcactcagtt tgcaccgcaa ctgtcgttag  8520
tgatgtttac ctttcctttt tctattattt attagtatta tataatatat atatatgtgt  8580
gatgagactt gaaattgttt agcaccgcaa atgtccttct tgaggggagg ttttcttttg  8640
ctgaggttgg ggtgtcacat acaccccct ctatggactc aacgtccttg ctgaggttta  8700
ccccacacta catgagattt ttctagactc aatactatga tatttctcgc cttatcggaa  8760
ttggttaaac tcagttgaag ttagggtcat atcgataaaa ttgacacatg atcgactctg  8820
atattaaaca gattctctcc ctcgaacctc actcactttc ctttttctat tctttattag  8880
tattatataa tagatccgtt ccaaccattc acgtacataa gaagagagat attttttttt  8940
aatggactaa catgacaaat aaaacaaaca aaggagtaat gatcactaca acaaattaga  9000
ttatgaggga caaataattt catcatctat aaatcatgtt tcgtcactaa aaattttgtg  9060
tgacgaaaaa gatttcgtca atcagttgtc actaaaaata tacaaagacg atttaatgat  9120
gtttaccttt ccttttctat tctttattag tattatataa taaatatatg tgtgatgaga  9180
cttgaaattg tttagcaccg caaatgtcct tgttgaaggg aggttttctt ttgctgaggt  9240
tggggtgtca catacacccc ctctatggac tgaacgtcct ttttgaggtt tattttacac  9300
tgcatgagat ttttctagat tcaacattat gatttctaga ctcaacacta cgatcgtcac  9360
taaagactat tttttatata taaaaaaaat actttgtcct taaatgtata aattagggat  9420
aaatttatta ttataaaaaa ggttaataat tttgtgatta aatctattat tttgtcactg  9480
aaagtgtttg cttttaccga cgacatatat gtcactaaat attatcataa gtagtgacaa  9540
ttacaattgt cacaaaataa aaaaaattat tcatattcaa caaaaaaggg tactacgaca  9600
atacattttt tgtcactgaa agtaatcaag ttgtgataaa ttaatttatt taatgacaaa  9660
aatatttgta tcaaaattca cccatgatca tataataaaa ataactaaaa ttatactaaa  9720
gcataaatga caagaaaatc taactaaaac atatcaaata ttactcctaa acaaagacat  9780
ataagtaaaa atttcttcca aagtatcaat aacgtggtga cacatagctt gcaatcaatc  9840
ttgcttcaat tttcaccttt tatacctgta aaaagaaaga gaaaataaaa caatgattta  9900
```

```
aaaatcgaat tcccgcggcc cctagaatct aattattcta ttcagactaa attagtataa  9960
gtattttttt aatcaataaa taataattaa taatttatta gtaggagtga ttgaatttat  10020
aatatatttt ttttaatcat ttaaagaatc ttatatcttt aaattgacaa gagttttaaa  10080
tggggagagt gttatcatat cacaagtagg attaatgtgt tatagtttca catgcattac  10140
gataagttgt gaaagataac attattatat ataacaatga caatcactag cgatcgagta  10200
gtgagagtcg tcttattaca ctttcttcct tcgatctgtc acatggcggc ggcccgcggc  10260
cgcttcatta ctcgagccag gaggatggat cgatgctggt ctgagaccct gctaccggtt  10320
gctgactgaa ctgctcggca cggtccttca tttcacgggc cttgctcgcc aactttgtct  10380
tggccgactc caactgatcc gctccgggtg gatgtttccc cgtcaggtaa cggtagatcc  10440
aggacagcac agacagagcg gcaacaccaa atccccgct tgccagaaaa cccgctccca  10500
acaggaagat ggtgatgact gcagatcaga aaaactcaga ttaatcgaca aattcgatcg  10560
cacaaactag aaactaacac cagatctaga tagaaatcac aaatcgaaga gtaattattc  10620
gacaaaactc aaattatttg aacaaatcgg atgatatcta tgaaacccta atcgagaatt  10680
aagatgatat ctaacgatca aacccagaaa atcgtcttcg atctaagatt aacagaatct  10740
aaaccaaaga acatatacga aattgggatc gaacgaaaac aaaatcgaag attttgagag  10800
aataaggaac acagaaattt acctgcaggg accagtacag gcgagaagat caccaggaga  10860
ggtgtggcga ttgtcagcgc aatgaccgtt ccagccaggg tcaacccgga taacaccaac  10920
aggctacctc cggcagtaac cgcggtcgct gcctttacaa cacgctgagc acgcggttgc  10980
agttgcaagt ggggggcacg tgtttgttgc tgctgcccgt agtgctctgc catggaaatt  11040
ttgttggtgc tttgagcata taacaagcat ggtatatata ggcacgtaaa caagttgaga  11100
aattttactt tgagtttgac ataaccaata aaagttagtg ctgtttatta cctcactcag  11160
tttgcaccgc aactgtcgtt agtgatgttt acctttcctt tttctattat ttattagtat  11220
tatataatat atatatatgt gtgatgagac ttgaaattgt ttagcaccgc aaatgtcctt  11280
cttgagggga ggttttcttt tgctgaggtt ggggtgtcac atacaccccc ctctatggac  11340
tcaacgtcct tgctgaggtt taccccacac tacatgagat ttttctagac tcaatactat  11400
gatatttctc gccttatcgg aattggttaa actcagttga agttagggtc atatcgataa  11460
aattgacaca tgatcgactc tgatattaaa cagattctct ccctcgaacc tcactcactt  11520
tcctttttct attctttatt agtattatat aatagatccg ttccaaccat tcacgtacat  11580
aagaagagag atattttttt ttaatggact aacatgacaa ataaaacaaa caaaggagta  11640
atgatcacta caacaaatta gattatgagg gacaaataat ttcatcatct ataaatcatg  11700
tttcgtcact aaaaatttg tgtgacgaaa aagatttcgt caatcagttg tcactaaaaa  11760
tatacaaaga cgatttaatg atgtttacct ttcctttttct attctttatt agtattatat  11820
aataaatata tgtgtgatga gacttgaaat tgtttagcac cgcaaatgtc cttgttgaag  11880
ggaggttttc ttttgctgag gttggggtgt cacatacacc ccctctatgg actgaacgtc  11940
ctttttgagg tttattttac actgcatgag atttttctag attcaacatt atgatttcta  12000
gactcaacac tacgatcgtc actaaagact atttttttata tataaaaaaa atactttgtc  12060
cttaaatgta taaattaggg ataaatttat tattataaaa aaggttaata attttgtgat  12120
taaatctatt attttgtcac tgaaagtgtt tgcttttacc gacgacatat atgtcactaa  12180
atattatcat aagtagtgac aattacaatt gtcacaaaat aaaaaaaatt attcatattc  12240
aacaaaaaag ggtactacga caatacattt tttgtcactg aaagtaatca agttgtgata  12300
aattaattta tttaatgaca aaaatatttg tatcaaaatt cacccatgat catataataa  12360
aaataactaa aattatacta aagcataaat gacaagaaaa tctaactaaa acatatcaaa  12420
tattactcct aaacaaagac atataagtaa aaatttcttc caaagtatca ataacgtggt  12480
gacacatagc ttgcaatcaa tcttgcttca attttcacct tttatacctg taaaaagaaa  12540
gagaaaataa aacaatgatt taaaggcgcg ccgcgtattg gctagagcag cttgccaaca  12600
tggtggagca cgacactctc gtctactcca agaatatcaa agatacagtc tcagaagacc  12660
aaagggctat tgagactttt caacaaaggg taatatcggg aaacctcctc ggattccatt  12720
gcccagctat ctgtcacttc atcaaaagga cagtagaaaa ggaaggtggc acctacaaat  12780
gccatcattg cgataaagga aaggctatcg ttcaagatgc ctctgccgac agtggtccca  12840
aagatggacc cccacccacg aggagcatcg tggaaaaaga agacgttcca accacgtctt  12900
caaagcaagt ggattgatgt gataacatgg tggagcacga cactctcgtc tactccaaga  12960
atatcaaaga tacagtctca gaagaccaaa gggctattga gacttttcaa caaagggtaa  13020
tatcgggaaa cctcctcgga ttccattgcc cagctatctg tcacttcatc aaaaggacag  13080
tagaaaagga aggtggcacc tacaaatgcc atcattgcga taaaggaaag gctatcgttc  13140
aagatgcctc tgccgacagt ggtcccaaag atggaccccc acccacgagg agcatcgtgg  13200
aaaaagaaga cgttccaacc acgtcttcaa agcaagtgga ttgatgtgat atctccactg  13260
acgtaaggga tgacgcacaa tcccactatc cttcgcaaga ccttcctcta tataaggaag  13320
ttcatttcat ttggagagga cacgctgaaa tcaccagtct ctctctacaa atctatctct  13380
gcgatcgcat ggcgatttg gattctgctg gcgttactac ggtgacggag aacggtggcg  13440
gagagttcgt cgatcttgat aggcttcgtc gacggaaatc gagatcggat tcttctaacg  13500
gacttcttct ctctggttcc gataataatt ctccttcgga tgatgttgga gctcccgccg  13560
acgttaggga tcggattgat tccgttgtta acgatgacgc tcagggaaca gccaatttgg  13620
ccggagataa taacggtggt ggcgataata acggtggtgg aagaggcggc ggagaaggaa  13680
gaggaaacgc cgatgctacg tttacgtatc gaccgtcggt tccagctcat cggagggcga  13740
gagagagtcc acttagctcc gacgcaatct tcaaacagag ccatgccgga ttattcaacc  13800
tctgtgtagt agttcttatt gctgtaaaca gtagactcat catcgaaaat cttatgaagt  13860
atggttggtt gatcagaacg gatttctggt ttagttcaag atcgctgcga gattggccgc  13920
ttttcatgtg ttgtatatcc ctttcgatct ttcctttggc tgcctttacg gttgagaaat  13980
tggtacttca gaaatacata tcagaacctg ttgtcatctt tcttcatatt attatcacca  14040
tgacagaggt tttgtatcca gtttacgtca ccctaaggtg tgattctgct tttttatcag  14100
gtgtcacttt gatgctcctc acttgcattg tgtggctaaa gttggtttct tatgctcata  14160
ctagctatga cataagatcc ctagccaatg cagctgataa ggccaatcct gaagtctcct  14220
actacgttag cttgaagagc ttggcatatt tcatggtcgc tcccacattg tgttatcagc  14280
caagttatcc acgttctgca tgtatacgga agggttgggt ggctcgtcaa tttgcaaaac  14340
tggtcatatt caccggattc atgggattta taatagaaca atatataaat cctattgtca  14400
ggaactcaaa gcatcctttg aaaggcgatc ttctatatgc tattgaaaga gtgttgaagc  14460
tttcagttcc aaatttatat gtgtggctct gcatgttcta ctgcttcttc cacctttggt  14520
taaacatatt ggcagagctt ctctgcttcg ggatcgtgga attctacaaa gattggtgga  14580
atgcaaaaag tgtgggagat tactggagaa tgtggaatat gcctgttcat aaatggatgg  14640
```

```
ttcgacatat atacttcccg tgcttgcgca gcaagatacc aaagacactc gccattatca  14700
ttgctttcct agtctctgca gtctttcatg agctatgcat cgcagttcct tgtcgtctct  14760
tcaagctatg ggcttttctt gggattatgt ttcaggtgcc tttggtcttc atcacaaact  14820
atctacagga aaggtttggc tcaacggtgg ggaacatgat cttctggttc atcttctgca  14880
ttttcggaca accgatgtgt gtgcttcttt attaccacga cctgatgaac cgaaaaggat  14940
cgatgtcatg agcgatcgcg atcgttcaaa catttggcaa taaagtttct taagattgaa  15000
tcctgttgcc ggtcttgcga tgattatcat ataatttctg ttgaattacg ttaagcatgt  15060
aataattaac atgtaatgca tgacgttatt tatgagatgg gtttttatga ttagagtccc  15120
gcaattatac atttaatacg cgatagaaaa caaaatatag cgcgcaaact aggataaatt  15180
atcgcgcgcg gtgtcatcta tgttactaga tccctgcagg gcgtattggc tagagcagct  15240
tgccaacatg gtggagcacg acactctcgt ctactccaag aatatcaaag atacagtctc  15300
agaagaccaa agggctattg agacttttca acaaagggta atatcgggaa acctcctcgg  15360
attccattgc ccagctatct gtcacttcat caaaaggaca gtagaaaagg aaggtggcac  15420
ctacaaatgc catcattgcg ataaaggaaa ggctatcgtt caagatgcct ctgccgacag  15480
tggtcccaaa gatggacccc cacccacgag gagcatcgtg gaaaaagaag acgttccaac  15540
cacgtcttca aagcaagtgg attgatgtga taacatggtg gagcacgaca ctctcgtcta  15600
ctccaagaat atcaaagata cagtctcaga agaccaaagg gctattgaga cttttcaaca  15660
aagggtaata tcgggaaacc tcctcggatt ccattgccca gctatctgtc acttcatcaa  15720
aaggacagta gaaaaggaag gtggcaccta caaatgccat cattgcgata aaggaaaggc  15780
tatcgttcaa gatgcctctg ccgacagtgg tcccaaagat ggacccccac ccacgaggag  15840
catcgtggaa aaagaagacg ttccaaccac gtcttcaaag caagtggatt gatgtgatat  15900
ctccactgac gtaagggatg acgcacaatc ccactatcct tcgcaagacc ttcctctata  15960
taaggaagtt catttcattt ggagaggaca cgctgaaatc accagtctct ctctacaaat  16020
ctatctctct cgagatgatt gaacaagatg gattgcacgc aggttctccg gccgcttggg  16080
tggagaggct attcggctat gactgggcac aacagacaat cggctgctct gatgccgccg  16140
tgttccggct gtcagcgcag gggaggccgg ttctttttgt caagaccgac ctgtccggtg  16200
ccctgaatga acttcaagac gaggcagcgc ggctatcgtg gctggccacg acgggcgttc  16260
cttgcgcagc tgtgctcgac gttgtcactg aagcgggaag ggactggctg ctattgggcg  16320
aagtgccggg gcaggatctc ctgtcatctc accttgctcc tgccgagaaa gtatccatca  16380
tggctgatgc aatgcggcgg ctgcatacgc ttgatccggc tacctgccca ttcgaccacc  16440
aagcgaaaca tcgcatcgag cgagcacgta ctcggatgga agccggtctt gtcgatcagg  16500
atgatctgga cgaagagcat caggggctcg cgccagccga actgttcgcc aggctcaagg  16560
cgcgcatgcc cgacggcgag gatctcgtcg tgactcatgg cgatgcctgc ttgccgaata  16620
tcatggtgga aaatggccgc ttttctggat tcatcgactg tggccggctg ggtgtggcgg  16680
accgctatca ggacatagcg ttggctaccc gtgatattgc tgaagagctt ggcggcgaat  16740
gggctgacc                                                          16749

SEQ ID NO: 124         moltype = DNA  length = 137
FEATURE                Location/Qualifiers
misc_feature           1..137
                       note = linker sequence
source                 1..137
                       mol_type = other DNA
                       organism = synthetic construct
SEQUENCE: 124
atttaaatgc ggccgcgaat tcgtcgattg aggacgtccc tactagacct gctggacctc  60
ctcctgctac ttactacgat tctctcgctg tgcatatggt cagtcatgcc cgggcctgca  120
ggcggccgca tttaaat                                                 137

SEQ ID NO: 125         moltype = DNA  length = 434
FEATURE                Location/Qualifiers
misc_feature           1..434
                       note = hpRNAi
source                 1..434
                       mol_type = other DNA
                       organism = synthetic construct
SEQUENCE: 125
gtgagcaatg aaccaagatt tatcaatacc gttacttttg atagcaaaga gggttctcct  60
actcttgtta tggtccacgg atatggtgcc tctcagggtt tcttctttcg gaatttttat  120
gcccttgcga ggcatttcaa agttattgct attgatcagc ttggctgggg tggttcaagc  180
aggcctgact tcacatgcag aagtacagaa gagactgaag attggtttat tgattccttt  240
gaggagtggc gcaaagccaa aaaccttagc aactttattt tgcttgggca ctcctttgga  300
gggtatgtcg ctgcaaaata tgctctcaag catccagagc atgttcagca gttgattctg  360
gtaggaccag ctggatttac atcagagact gaacatatgt ccgagcggct tacccagttt  420
agagcaacat ggaa                                                    434

SEQ ID NO: 126         moltype = DNA  length = 593
FEATURE                Location/Qualifiers
misc_feature           1..593
                       note = hpRNAi
source                 1..593
                       mol_type = other DNA
                       organism = synthetic construct
SEQUENCE: 126
actgctgatg ctgtcaggca gtatctatgg ttgtttgagg agcataatgt tcttgaattc  60
ctcgtacttg ctggagatca tctatatcga atggattatg aaaagttcat tcaagcccac  120
agagaaacag atgctgatat tactgttgcc gcactgccaa tggatgaaaa gcgagccact  180
gcatttggtc tcatgaagat tgacgaagaa ggacgcatta ttgaatttgc agagaaaccg  240
aaaggagagc aattgaaagc aatgaaagtg gatactacca ttttaggtct tgatgatgag  300
```

```
agagctaaag agatgccttt tatcgcaagt atgggtatat atgtcattag caaagatgtg  360
atgttaaact tacttcgtga taagttccct ggtgccaatg attttggcag tgaagttatt  420
cctggtgcaa cttcgcttgg gatgagagtg caagcttatt tatatgatgg atactgggaa  480
gatattggta ccatcgaagc tttctacaat gccaatttgg gcattaccaa aaagccagtc  540
ccagatttta gcttctatga ccgatcagct ccaatctaca cccaacctcg ata         593

SEQ ID NO: 127         moltype =   length =
SEQUENCE: 127
000

SEQ ID NO: 128         moltype =   length =
SEQUENCE: 128
000

SEQ ID NO: 129         moltype = AA  length = 7
FEATURE                Location/Qualifiers
REGION                 1..7
                       note = probable lipid binding motif
VARIANT                2..4
                       note = X can be any amino acid
source                 1..7
                       mol_type = protein
                       organism = synthetic construct
SEQUENCE: 129
VXXXHGF                                                            7

SEQ ID NO: 130         moltype = DNA  length = 1224
FEATURE                Location/Qualifiers
source                 1..1224
                       mol_type = other DNA
                       organism = Arabidopsis thaliana
SEQUENCE: 130
atggcggaag aaatctcaaa gacgaaggtg ggatcttctt ctactgcttc ggtggctgat  60
tcatctgctg ctgcgtcggc tgcaacgaat gcggccaaat caagatggaa aattttgtgg  120
cctaattcgc tccggtggat tcctacgtcc accgattaca tcatcgccgc cgagaaacgt  180
cttctctcca tcctcaagac gccttatgta caagagcaag tcagtattgg ttcaggacca  240
ccaggttcta aaatcaggtg gtttaggtct acgagcaatg agtcacgtta catcaacact  300
gttacatttg atgccaagga gggagctcct acactcgtca tggttcatgg ttatggtgct  360
tctcaagggt tttcttccg taattttgat gctcttgcca gtcgatttag agtgatcgct  420
attgatcaac ttgggtgggg tggttcaagt aggcctgatt ttacatgtag aagcacagaa  480
gaaactgagg catggtttat cgactccttt gaggaatggc gtaaagccca gaatctcagt  540
aactttattc tattaggaca ttcttttgga ggctatgttg ctgctaaata cgcgcttaag  600
catcctgaac atgttcaaca cttaattctg gtgggatctg ctgggttctc agcagaagca  660
gatgccaaat cagaatggct cactaaattt agagcaacat ggaaaggtgc agtcctaaat  720
catttatggg agtcaaattt cactcctcag aagctggtta gaggattagg tccttggggt  780
ccaggtcttg taaatcggta tacaactgca agatttggtg cacattcgga gggaactggg  840
ctaacagaag aggaagccaa attgctaacc gattatgtgt accatacttt ggctgcaaag  900
gctagtggag agttatgctt gaaatacatc ttctcatttg gagcatttgc taggaagccc  960
ctcttacaaa gtgcatcaga gtggaaagtg ccaacaacgt ttatctatgg aatgaatgat  1020
tggatgaact atcaaggtgc ggtggaagcg aggaaatcca tgaaggtccc ttgcgaaatc  1080
attcgggttc cacagggtgg tcattttgtg ttcatagaca acccaattgg ttttcattct  1140
gcagtgcttt atgcttgccg caagtttata tctcaagact cctctcatga tcaacaactc  1200
ctagatggtc tacgattggt ttag                                         1224

SEQ ID NO: 131         moltype = DNA  length = 1700
FEATURE                Location/Qualifiers
source                 1..1700
                       mol_type = other DNA
                       organism = Brachypodium distachyon
SEQUENCE: 131
tccgcgcccg aaacgatccc aacagaagct ctaatctcca aagccgccgc gcgtgttgag  60
ggtggtgcgg ggaaaagctt ggtgtcgtga gcccccgtgt cgcatgcgcc gcgctgccgc  120
cgtgacgagg atggcagcga ccgaggagat gaggcaggcg tccgccgccg ccgccgccac  180
ggtgaccgag gcctcggcgt cggcggcccc gcccgcgggg tccaggtggg cgcgggtgtg  240
gccggccgcg ctgcgctgga tccccacctc caccgagcgc atcatcgccg ccgagaagcg  300
cctcctctcc gtactcaaaa ctgggtatgt ccaagaacaa gttaacattg gctcggctcc  360
acccgggtca aaagtaagat ggtttagatc atcaagtgat gagccaaggt tcatcaatac  420
agtgacattt gatagcaagg agaatgctcc cactcttgtc atggtccatg gttatggtgc  480
ttcacagggt ttcttcttta gaaattttga tgcccttgca agccgtttcc gagtgattgc  540
cattgatcag cttggttggg gtggatcaag tagacctgac ttcacctgta aaagtaccga  600
agaaactgag gcttggttca tagattcttt agaggaatgg cgtaaagcaa agaacctcag  660
taattttata ttgctcggtc attctttcgg aggatatgtt gcagcaaaat atgccttgca  720
gcatcctgaa cacgtgcagc acttaatttt ggtcggttct gctgggtttt catcagaaac  780
agatcatagc tctgagtggt taaccaagtt tcgagcaaca tggaaaggca tgctagtgaa  840
ccaactatgg gagtccaatt ttactcctca aagaattgta agaggattgg gtccttgggg  900
cccagatttg gttcgcagat ataccactgc taggtttggc tcatattcaa caggtgaatt  960
actaacagaa catgagtccg gcttgctgac agattacatt taccatacat tagctgccaa  1020
agctagtgga gagctgtgct tgaaatatat tttttccttg ggggcatttg caaggaaacc  1080
tcttctgcag agtgcatctg actggaaagt gccgaccact ttcatatatg gccatgacga  1140
```

```
ttggatgaaa taccaggggg cacagcaagc acgcaaggat atgaaagttc cttgcgaaat  1200
catcagagtc ccacagggag gacattttgt gttcatagat aacccttccg ggttccattc  1260
ggcagtcttc tatgcgtgcc ggaaattttt atctggagat gcagaggagg gtctctctct  1320
tcctgatggc ctgatatctg catgacagca tgaggcgcga tgtcatacca attagcggta  1380
tgaacacaaa gcaaagctat acggagctag gaaatgttac aaatgtcacg actcaccaga  1440
aatgttacaa atgtcaccac tcaccagttt ccttttttgta tgtatgaatt gtgtgaatat  1500
acacgtcatt catatttgcc ggcgtatcag tacttcaata gtgataaaac atgatcatat  1560
atatatgtat gatttctcta gtcggttctc atcaagtcaa gttattgtga ttggtgaatg  1620
atatactttc caggtcaact ttgtgtttgc atgtacaaac tatcatggaa catatcagta  1680
tagtttatga tttgtcttcc                                              1700

SEQ ID NO: 132          moltype = DNA  length = 1484
FEATURE                 Location/Qualifiers
source                  1..1484
                        mol_type = other DNA
                        organism = Glycine max
SEQUENCE: 132
gtcatggatg cgcgtcactg ctcgcgttca ttataatggc ggaagagata accaagaacg  60
acgtcggagt aacctccaaa accaccagaa gcagctccag gttctggcct cgttggattc  120
ccacttccac cgatcacatc atcgctgccg agaagcgcct tctttccgtc gtcaagactg  180
gttatgttca agagcatgtt aacattggct ctggtcctcc tggctccaaa gtgaggtggt  240
tccgttcatc cagcaacgag ccgcggttta ttaacaccgt tacatttgac agtaaacccc  300
attctccaac gcttgtcatg attcatggtt atgctgcttc acaggggttc tttttttcgca  360
attttgacgc gcttgcgtct cgatttagag tcattgctgt tgatcaactt ggatggggtg  420
gatcgagcag acctgatttc acatgcaaaa gcactgaaga aactgaggca tggtttattg  480
attcttttga ggaatggaga aaagccaaaa acttgagcaa ttttatactg ctcggacatt  540
cttttggtgg ttatgttgct gccaaatatg cgctcaagca ccctgagcat gtacaacact  600
tgattctggt tggatctgct ggattttcat ctgaatcaga tgcaaagtct gagtggataa  660
caaggtttcg agcaacatgg aagggggcag ttttgaacca tctttgggaa tcaaatttca  720
cacctcagaa acttgtcagg ggtttaggtc cttggggtcc caacatagtc cgcaagtata  780
caagtgctag gtttggtaca cattcaactg gggaaatact gactgaagag gaatcaacat  840
tgctgacaga ctatgtttac cacacattgg cggccaaagc tagtggagag ctgtgcttaa  900
aatatatttt ttcatttgga gcatttgcta ggatgcccct tcttctcagt gcctcagagt  960
ggaaggtgcc caccactttc atgtatggtt tccaagactg gatgaattat caaggtgccc  1020
aagaagctcg caagcatatg aaggttccat gcgaaatcat caggattcct cagggtgggc  1080
actttgcgtt cattgacaac ccaactgcct tccattcagc tgttttttat gcttgtcgaa  1140
ggtttcttac acctgatcca gacaatgaat ctcttcctaa agggctaacc tctgcatagg  1200
ttaggtctta attttgtgct attcctgtct atatgtattt taatattttt ttttactaat  1260
taaatttcat aattgaatga aatcatatgt atattgtttc agtaaagtgg aatttactga  1320
aaatatttgt aatagcaact tcaacaaaaa tcgatttgta ggagaaattt cttccctgga  1380
aattgttcta ttttaaatct tgttgctcat aagatattat gacttcattc aactaataat  1440
tcatgtcgtt taggaaaagt agttagttat attaaatttg tcaa                  1484

SEQ ID NO: 133          moltype = DNA  length = 1662
FEATURE                 Location/Qualifiers
source                  1..1662
                        mol_type = other DNA
                        organism = Zea mays
SEQUENCE: 133
accatacggg cggggccgca ccgaccgaac ctaaccgaga gcacgagcat acccgtcccg  60
actccgactg cagagcatca gccgaggaga aaagtcggga gaaacgcgcg tgacgtctgc  120
ccgcgtcgta tgcgccgcgc tgccgtcgcc gcgacgacga cgacgaccag gatggcagcc  180
gaggagatga gacgggcctc cgcctcaacg gccacggcgg agatgccggc gtcgccggcg  240
ccggcgcaag cggggtcgag gtgggcgcgg gtgtggccgc gcgcgctccg gtggatcccc  300
acctccacgg accgcatcat cgccgccgag aagcgactcc tcacgatagt caaaactgga  360
tatgtccagg aacgagtcaa cattggctct gctccacctg ggtcaaaagt aagatggttt  420
aggtcagcaa gtgatgaacc aaggttcatt aatactgtaa catttgatag caaggagaat  480
gcccccaccc tggttatggt ccatggctat ggagcttcac aggggttctt ctttcgaaac  540
tttgatgccc ttgcaagccg ttttagggtg attgccattg atcagcttgg ctggggtggt  600
tcaagcagac ctgacttcac atgtaaaagt accgaagaaa ctgaggcatg gttcatagat  660
tctttcgagg agtggcgcaa ggccaagaac ctcagtaatt ttatattgct tggtcactct  720
tttggaggat atgttgctgc aaaatatgcg ctaaagcacc ctgaacacgt tcaacagttg  780
attttggttg gtcctgctgg cttctcatca gaaacagagc atagctctga gtggttaacc  840
aagtttcgag caacatggaa aggcatgcta atgaatcgtc tttgggagtc caattttact  900
ccccaaaggg ttattagggg attgggtcct tggggtccag gtctagtaca gagatatacc  960
agtgccaggt ttggtacaag ttctactggt gaattactaa cagatgaaga atcggcattg  1020
atgacagatt atatgtacca tacgttagct gccaaagcta gtggagagct gtgcttgaaa  1080
tatatatttt ccttcggggc atttgcaagg aaacctcttc tgcagtgcgc gtccgattgg  1140
aaagtgccga ctactttcat atatgggcag caagattgga tgaactacca aggcgctcag  1200
caagcacgga aggacatgaa agttccttgt gaaataatca gggtgccgca gggtggacat  1260
tttgtgttca tagacaaccc ttcagggttc cactcggctg tcttctatgc gtgccgtaat  1320
cttctatcag taaatggaga ggagggattc acatttcctg atggcctaat atctgcgtga  1380
agtggcatgt tcaacaagct tgctcaacaa cagtttacat aaagcaaaga tatacgattg  1440
tggaaatcat tgcccatttc caccaatttg cttgtatacg gattatgctg tgtatatatt  1500
acataacaaa tgtattagta tcatttaatg cacgatttgt gaaagggcct gagtttgtat  1560
ttagcgaatt ttaggttggt ttttttccct ttttcttctt tcagtgcgct tgctagtcaa  1620
tcccatacta taagccgtga tcatttaaaa aaaaaaaaaa aa                    1662

SEQ ID NO: 134          moltype = DNA  length = 1763
```

```
FEATURE                Location/Qualifiers
source                 1..1763
                       mol_type = other DNA
                       organism = Sorghum bicolor
SEQUENCE: 134
actgcagatg cgcggtcgtc ggctccggct cgcggaggcg agaacggcga accagcccgt  60
gtctctgttc cctttcttcc ctttaaaaac acggcaaaaa aaaagctagc cggttacgct  120
accgaaccga acggctcggc acgcgggcac gggcgcgggg tcgcaccgga aaagcacgag  180
cagagcagac ctgacgtctc cagactgcag gagcatcatc agtcgaggag gaggaagtgt  240
gggggggga aagggaaacg tgcgcgtcgt atgcgcctcg ctgccgtcgc caggacgacc  300
aggatggcag ccgaggagat gaggcgggcc tcggcctccg cggcggtcgc ggccacgacg  360
gaggcggcgc cggcgccggc gcaagcgggg tccaggtggg cgcgggtgtg gccgagcgcg  420
ctccggtgga tccccacctc cacggatcgc atcatcgccg cggagaagcg gctcctctcg  480
atagtcaaaa ctgggtatgt ccaggaacaa gtcaacattg gctcagctcc acctgggtca  540
aaagtaagat ggtttaggtc agcgagtgat gaaccaaggt tcattaatac tgtaacattt  600
gatggcaagg agaacgcccc caccctggtt atggtccatg gctatggagc ttcacagggg  660
ttcttcttc gaaactttga cgcccttgca agtcgtttta gggtgattgc cattgatcag  720
cttggctggg gtggttcaag cagacctgac ttcacatgta aaagtaccga agaaactgag  780
gcatggttca tagattcttt tgaggagtgg cgcaaggcca agaacctcag taattttata  840
ttgcttggtc actcctttgg aggatatgtt gcggcaaagt atgccctaaa gcaccctgaa  900
cacattcagc acttagtttt ggttggtcct gctggcttct cgtcagaaac agaccatagc  960
tctgagtggt taaccaagtt tcgagcaaca tggaaaggca tgctagtgaa tcatctttgg  1020
gagtccaatt ttactcccca aagagttatt agaggattgg gcccttgggg tccaggtcta  1080
gtacaaagat ataccagtgc caggtttggt acacgttcaa ctggtgatat actaacagat  1140
caagaatcaa cattgttgac agattatatt taccatacct tagctgccaa agctagtgga  1200
gagctgtgct tgaaatatat attttccttc ggggcatttg caaggaaacc tcttctgcag  1260
tgcgcatccg attggaaagt gccgactact ttcatatatg gtcaggaaga ttggatgaac  1320
taccaagggg ctcagcaagc acggaaggac atgaaagttc cttgtgaaat aatcagggtg  1380
ccacagagtg gacattttgt gtttatagac aacccttcag ggttccactc ggctgtcttc  1440
tacgcgtgcc gtaatctttt atcccaaaat ggggaggagg gcttcacatt tcctggtggc  1500
ctaatatctg catgaagtgg catgttcaac aatcttatcg tgcccaacaa tagtttatat  1560
gaagcaaaga tatacgatgg tggaaatctt tgctcatttc caccaatctg gaaatatttg  1620
tgccctcttc caccaatttg tttgtatacg gattatgccg tgtatatatt ctgtgttgac  1680
tgtaagaaac ataatgtatt aacattatgt aatgtatgta cgattcttta tttgattttc  1740
aacttgcaat acgcaagaac cac                                           1763

SEQ ID NO: 135         moltype = DNA  length = 1399
FEATURE                Location/Qualifiers
source                 1..1399
                       mol_type = other DNA
                       organism = Ricinus communis
SEQUENCE: 135
cgccttttta ccagtcaatt tccattttta tatataagtg cttttgctta atttaagact  60
aactacagcg acgaattcgc gtttatgaaa ttgcttcgcc tacgactgct acgagtatct  120
agctcctcaa tatcatcaat aatggcggaa ggggctgctg ccacatcagc atcagcatca  180
gcgtcagcgt cagcgtcatg ggcaaaaaca agatctctac ggccatctgc tctccgttgg  240
atcccaactt caaccgatca catcatcgcc gccgaaaagc gtcttctctc cctcgtcaag  300
actccctatg ttgtggaaca agtgaatata gggtctggcc caccggggtc gaaggtgagg  360
tggtttcgtt ctaaaagcga cgaggcacgg tttattaaca cggttacttt tgatagcaaa  420
gaggaggatt ctcctacact ggttatggtt catggatatg ctgcttctca aggcttcttc  480
tttcgcaatt ttgatgctct tgcttctcgt ttcaggctca ttgctattga tcagctcggt  540
tggggtggat caagtagacc tgattttacg tgtaagagca ctgaagaaac tgaggcatgg  600
ttcattgact cctttgaggc ttggcgtaaa gagaaaaacc tcagtaactt catcttactt  660
ggacattctt tcggagggta tattgcagct aaatatgcac tcaagcatcc tgagcatgtt  720
caacatctga ttttagtggg atctgctgga ttttcatcag aatctgaaga caaatctgag  780
cagcttactc ggttcagagc aacatggaag ggagcagttt tgaatcattt atgggagtct  840
aattttactc ctcagaaggt tattagaggt ttaggtcctt ggggtccaga tctcgtacgc  900
aagtacacaa ctgctagatt tggttcatat tcaactggtg agatattaaa ggaggaggag  960
tccaaattgc ttacagacta tgtgtaccat accttagccg ccaaagctag tggagagcta  1020
tgcttgaaat atatattttc ttttggagca tttgctcgga tgccccttct acaaagcgcg  1080
tcacaatgga aagtgccaac tactttcata tatgggatgc aagattggat gaattatcaa  1140
ggggcccaaa gagctcgcaa agatatgaat gtcccatgtg aaatcattag ggttcctcag  1200
ggcgggcact tcgttttcat agacaaccca actgggtttc attcagctgt gttatatgcc  1260
tgccggagat ttctctcacc cgatcctgat aatgaatctc ttcctgaagg tctgatatct  1320
gcgtaggaag tgtggtttgt aattatttct tttttatttg ttgtgtataa tttatctgag  1380
aatttccaat tctttcaat                                                1399

SEQ ID NO: 136         moltype = DNA  length = 1480
FEATURE                Location/Qualifiers
source                 1..1480
                       mol_type = other DNA
                       organism = Medicago truncatula
SEQUENCE: 136
ggttggctca tagttccttt tacctgttga aaacaaaaca tatggagtaa cattttagtc  60
agaaattcaa agctacgcac ttgattaaac taattatcga aaaatggcgg aagaaattag  120
acaaaaggac gacgtcgatt catcttcgaa atctaaaagc ttctggtctt cactccgttg  180
gattcccact tctaccgatc atatcatcgc cgctgagaaa cgccttcttt ccattatcaa  240
gactgggtat gctcaagagc atgttaatat aggttctggt cctcctggct ctaaagttag  300
atggttccgt tcaaccagta acgagccacg ctttctcaac actgttacat ttgatagtaa  360
```

```
acccgattct cctacacttg ttatggttca tggatacgct gcttctcagg gtttcttctt  420
tcgcaatttt gatgctctcg cctctcgttt cagaatcatt gctgttgatc aacttggttg  480
gggaggatca agcagacctg atttcacatg caaaagtacc gaagaaactg aggcatggtt  540
cattgattct ttcgaggaat ggagaaaagc caaaaatctt accaatttca tactgcttgg  600
acattctttt ggtggttatg ttgcttccaa atacgcgctc aagcaccctc agcacgtaca  660
acacttaatt ttggtgggac ctgccgggtt tacagaagaa acagatccaa agactgagtt  720
tgttactaag tttcgagcaa catggaaggg agcagttctg aaccatctat gggaatctaa  780
ttttacacct cagaaaattg tcagaggttt aggtccttgg ggtcctaaca tggtccgcaa  840
atatacaagt gctaggtttg gtacacattc aaccgggcaa aaactgattg acgaggaatc  900
aagtctgctg actgattatg tttatcatac attggcggcc aaagctagtg gggagctgtg  960
tttaaaatat atttttgcat ttggagcatt tgctaggatg ccccttcttc aaagtgctca  1020
agagtggaag gtgcccacca cattcatata tggttacgaa gattggatga attatgaagg  1080
tgcccaagaa gctcgcaagc atatgaaggt tccatgtgaa attatcaggg tccctaaggc  1140
cggccatttt gtgttcattg acaacccaag tggcttccat tcagctgtgt tttatgcttg  1200
tcgaaggttt cttaccccaa attcggacaa tgaatctctt cccgaagggc tatcgtctgc  1260
ttaggattta attttgcatc aatccagtgt atattaatat ggttattaat tttttttac  1320
ttcataactg aatgaagccg tgtcttgttt ctcagtgaag tggaatataa tggaaatata  1380
tgtaattgta ataacaataa tattgatttg ttggggaact ttgaggacaa aaacatattc  1440
tggtaaaatt ttgttgcaca tgcgacaaac atatgctgtg                        1480

SEQ ID NO: 137          moltype = DNA  length = 1317
FEATURE                 Location/Qualifiers
source                  1..1317
                        mol_type = other DNA
                        organism = Arabidopsis thaliana
SEQUENCE: 137
gatctctctc cctctctctc tctctctctc cgggaaaaat ggataacttc ttaccctttc  60
cctcttctaa cgcaaactct gtccaagaac tctctatgga tcctaacaac aatcgctcgc  120
acttcacaac agtccctact tatgatcatc atcaggctca gcctcatcac ttcttgcctc  180
cgttttcata cccggtggag cagatggcgg cggtgatgaa tcctcagccg gtttacttat  240
cggagtgtta tcctcagatc ccggttacgc aaaccggaag tgaattcggt tctctggttg  300
gtaatccttg tttgtggcaa gagagaggtg gttttcttga tccgcgtatg acgaagatgg  360
caaggatcaa caggaaaaac gccatgatga gatcaagaaa caactctagc cctaattcta  420
gtccaagtga gttggttgat tcaaagagac agctgatgat gcttaacttg aaaaataacg  480
tgcagatctc cgacaagaaa gatagctacc aacagtccac atttgataac aagaagctta  540
gggttttgtg tgagaaggaa ttgaagaaca gcgatgttgg gtcactcggg aggatagttc  600
taccaaagag agatgcagaa gcaaatcttc cgaagctatc tgataaagaa ggaatcgttg  660
tacagatgag agatgttttc tctatgcagt cttggtcttt caaatacaag ttttggtcca  720
ataacaagag cagaatgtat gtcctcgaga acacaggaga atttgtgaag caaaatggag  780
ctgagatagg agacttttta acaatatacg aggacgaaag caagaatctc tacttcgcca  840
tgaatggaaa ttcgggaaaa caaaatgaag gaagagaaaa tgagtcgagg gaaaggaacc  900
actacgaaga ggcaatgctt gattacatac caagagacga agaggaagct tccattgcaa  960
tgctcatcgg aaatctaaac gatcactatc ccatccctaa cgatctcatg gacctcacca  1020
ctgaccttca gcaccatcaa gccacgtcct catcaatgcc acctgaggat cacgcgtacg  1080
tgggttcatc cgatgatcag gtgagcttta acgactttga gtggtggtga tatggtggtg  1140
gaagttctca agttcataac cccctttatg aaaatagacc ttaagatata caaaagagat  1200
taaaagaaaa aaaagttagt atatttcatc atatctctca ttgaagatga gatttatatc  1260
tataattgtt taatagtgtt tttattactt ttctatcaat atattaaagt tttaatt     1317

SEQ ID NO: 138          moltype = DNA  length = 1439
FEATURE                 Location/Qualifiers
source                  1..1439
                        mol_type = other DNA
                        organism = Medicago truncatula
SEQUENCE: 138
tttcatcctt acatatttg catattgaaa cacgtaggat ggaataagat tgataacaaa  60
aattgcattg tttgcatatt gaaaacatgg gacaattgca tgggttcatg tgcttcatta  120
taagccacac attaggaaac acaggttgat attcaccact atttaacata agaatatctc  180
atgtgtaagc attcatacaa atatcacaat tgaattaaaa accaaagaaa tgtcttcctc  240
taacttctct tgtatcctat ccatctcctt aacattcttc atcttgctac tgaacaaggt  300
gaattcagca gaaacaactt ccttttccat cacaaaattt gtcccagatc aaaagaatct  360
catcttccaa ggcgatgcga aaactgcctc aacagggaag ttagaactct ccaaggcagt  420
caagaactct attggtagag ctctttattc cgcccctatt cacatttggg atagcaaaac  480
cggtagtgtg gctaactttc aaactacctt cacctttaca ataacggcgc ctaatactta  540
taatgttgca gacggtcttg cattcttcat tgcaccaatt gatactaagc cgaaatcaat  600
tcatcatgga ggataccttg gagttttcga tagcaaaact tacaaaaaat caattcaaac  660
tgttgcagtt gaaattgaca ctttctataa tgctcaatgg gatccaaatc ccggaaatat  720
aagtagcact ggtcgacata ttggaatcga tgtaaactct atcaaatcaa taagcaccgt  780
gccgtggagt ttggaaaaca ataaaaaggc taatgttgcg atagggttta atggtgcaac  840
aaatgtgttg agtgttgatg tggaatatcc tttgattcgt cattataccc taagtcatgt  900
tgtgcctttg aaggatgttg ttcctgagtg ggtaaggatt ggtttctctt cttctactgg  960
agccgaatat tcagcacatg atattttatc gtggtctttt gattcaaagt tgaacctagg  1020
ttttgagaac aatatcaatg ccaatgtttc aagctctact caagctgcat agttgaaaac  1080
ttatccatta tgtatgtgtg agtgtaacca accagtctaa gaaaactata ataagatacc  1140
tgaaataatg gttcattatc gtgtagtaga aatatggtca caccatatct tcttttttt  1200
ttaataaatt atggaataat gctatttctc gcgagagtta tgtttcggaa agattcatga  1260
atagatgtta atcaattaga tctatatata tatatatata tatatatata tatatatata  1320
tagcattttc ttaaattatg catatgtaat atcgtgtaat gctattgttt atatcaatga  1380
atggtgtttt gtagtcacat aattcgtaat ttctctccat gagaacagcg aaccaatta   1439
```

```
SEQ ID NO: 139          moltype = DNA  length = 1393
FEATURE                 Location/Qualifiers
source                  1..1393
                        mol_type = other DNA
                        organism = Brassica napus
SEQUENCE: 139
gagatgggta tccctataag gtgcagcatc gaaccatctg caacattttg actcgttttc  60
ttttgtgttt ttataacatc tgtctcttct tcactcgatc tccctctctt ttctttttca  120
atctccccaa cgaacctccc ttcataactc tctttctctc cccgggaaat atggataact  180
tcttgccctt ttcctcttct aacgcaaact ctgtccaaga actctccatg gatcttaaca  240
agaatcgctc gcacttctcc atggcgcagc ctcagcactt gttgccgcct tactcgtacg  300
ttgcatgtcc ggcacttgat cagacgggga ccatgaatca tcagcctctt cactcatcgg  360
atgcttttcc tcagatcccg gttgtacaaa ccggaggtga attcggctat ttggtttgta  420
agcccggtgt gaggcaggaa cgaggtggat ttcttgatcc acactccact aagatggcta  480
ggatcaacag gaagaaggcg atgctaagat caagaaacaa ctctaaccct aattctagtt  540
cgaatgagtt ggttgattca aggagacaag tggctcttac catgaaaaat aatgccgaga  600
ttgctgctag aaaagatttt tatcgattct cctcattcga taacaagaaa cttagggttt  660
tgttggtgaa gcacttgaag aacagcgatg ttgggtcact tggaaggatt gttctaccaa  720
agagagaagc agaaggaaat cttccggagc tatctgataa agaaggaatg gtattagaga  780
tgagagatgt tgactctgtg cagtcttggt ctttcaaata caagtactgg tccaataaca  840
agagcagaat gtatgtcctc gaaaacacag gagaatttgt gaagaaaaat ggagtattga  900
tgggagacta tctaacaatc tacgaggacg aaagcaagaa tctctacttc tccatcagaa  960
agcacccaca caaacaaaat gatggaagag aggatgagtc gatggaagtt atcgagatga  1020
acttctatga agatataatg tttgattaca taccaaatga tgaagacgat tccattgcaa  1080
tgctcctcgg aaatctaaac gagcactatc cctacccaaa tgatcttatg gatctcactg  1140
tcaatcttga tcagcatcag caagccacct cctcgtcgcc acctgctgat cacatgagct  1200
cgaacgattt cttatggtga tgtgatggac gttgatatgg attccctttg agatgatata  1260
caagggatga aaagaaaaga gtatcatatt catatccata tttgtttgat aaaatgtgtt  1320
tgttcccaat ctattattta tgaaaaactt atttgtgttt aactccagat taattaaata  1380
tttttcattt gac                                                     1393

SEQ ID NO: 140          moltype = DNA  length = 1755
FEATURE                 Location/Qualifiers
source                  1..1755
                        mol_type = other DNA
                        organism = Arabidopsis thaliana
SEQUENCE: 140
atgaactcga tgaataactg gttaggcttc tctctctctc ctcatgatca aaatcatcac  60
cgtacggatg ttgactcctc caccaccaga accgccgtag atgttgccgg agggtactgt  120
tttgatctgg ccgctccctc cgatgaatct tctgccgttc aaacatcttt tctttctcct  180
ttcggtgtca ccctcgaagc tttcaccaga gacaataata gtcactcccg agattgggac  240
atcaatggtg gtgcatgcaa taacattaac aataacgaac aaaatggacc aaagcttgag  300
aatttcctcg gccgcaccac cacgatttac aataccaacg agaccgttgt agatggaaat  360
ggcgattgtg gaggaggaga cggtggtggt ggcggctcac taggcctttc gatgataaaa  420
acatggctga gtaatcattc ggttgctaat gctaatcatc aagacaatgg taacggtgca  480
cgaggcttgt ccctctctat gaattcatct actagtgata gcaacaacta caacaacaat  540
gatgatgtcg tccaagagaa gactattgtt gatgtcgtag aaactacacc gaagaaaact  600
attgagagtt ttggacaaag gacgtctata taccgcggtg ttacaaggca tcggtggaca  660
ggtagatacg aggcacattt atgggacaat agttgcaaaa gagaaggcca gactcgcaaa  720
ggaagacaag tttatctggg aggttatgac aaagaagaaa aagcagctag ggcttacgat  780
ttagccgcac taaagtattg gggaaccacc actactacta acttcccctt gagtgaatat  840
gagaaagagg tagaagagat gaagcacatg acgaggcaag agtatgttgc ctctctgcgc  900
aggaaaagta gtggtttctc tcgtggtgca tcgatttatc gaggagtaac aaggcatcac  960
caacatggaa ggtggcaagc taggatcgga agagtcgccg gtaacaaaga cctctacttg  1020
ggaactttcg gcacacagga agaggctgct gaggcttatg acattgcagc cattaaattc  1080
agaggattaa gcgcagtgac taacttcgac atgaacagat acaatgttaa agcaatcctc  1140
gagagcccga gtctacctat tggtagttct gcgaaacgtc tcaaggacgt taataatccg  1200
gttccagcta tgatgattag taataacgtt tcagagagtg caaataatgt tagcggttgg  1260
caaaacactg cgtttcagca tcatcaggga atggatttga gcttattgca gcaacagcag  1320
gagaggtacg ttggttatta caatggagga aacttgtcta ccgagagtac tagggtttgt  1380
ttcaaacaag aggaggaaca acaacacttc ttgagaaact cgccgagtca catgactaat  1440
gttgatcatc atagctcgac ctctgatgat tctgttaccg tttgtggaaa tgttgttagt  1500
tatggtggtt atcaaggatt cgcaatccct gttggaacat cggttaatta cgatcccttt  1560
actgctgctg agattgctta caacgcaaga aatcattatt actatgctca gcatcagcaa  1620
caacagcaga ttcagcagtc gccgggagga gattttccgg tggcgatttc gaataaccat  1680
agctctaaca tgtactttca cggggaaggt ggtggagaag gggctccaac gttttcagtt  1740
tggaacgaca cttag                                                   1755

SEQ ID NO: 141          moltype = DNA  length = 2061
FEATURE                 Location/Qualifiers
source                  1..2061
                        mol_type = other DNA
                        organism = Medicago truncatula
SEQUENCE: 141
atgaacttgt taggtttctc tctatctcca caagaacaac atccatcaac acaagatcaa  60
acggtggctt cccgttttgg gttcaaccct aatgaaatct caggctctga tgttcaagga  120
gatcactgct atgatctctc ttctcacaca actcctcatc attcactcaa cctttctcat  180
cctttttcca tttatgaagc tttccacaca aataacaaca ttcacaccac tcaagattgg  240
```

```
aaggagaact acaacaacca aaacctacta ttgggaacat catgcatgaa ccaaaatgtg  300
aacaacaaca accaacaagc acaaccaaag ctagaaaact tcctcggtgg acactctttc  360
accgaccatc aagaatacgg tggtagcaac tcatactctt cattacacct cccacctcat  420
cagccggaag catcctgtgg cggtggtgat ggtagtacaa gtaacaataa ctcaataggt  480
ttatctatga taaaaacatg gctcagaaac caaccaccac caccagaaaa caacaacaat  540
aacaacaatg aaagtggtgc acgtgtgcag acactatcac tttctatgag tactggctca  600
cagtcaagtt catctgtgcc tcttctcaat gcaaatgtga tgagtggtga gatttcctca  660
tcggaaaaca aacaaccacc cacaactgca gttgtacttg atagcaacca aacaagtgtc  720
gttgaaagtg ctgtgcctag aaaatccgtt gatacatttg gacaaagaac ttccatttac  780
cgtggtgtaa caaggcatag atggacaggg agatatgaag ctcacctttg ggataatagt  840
tgtagaagag aggggcagac tcgcaaagga aggcaagttt acttgggagg ttatgacaaa  900
gaagaaaaag cagctagagc ctatgatttg gcagcactaa aatattgggg aacaactact  960
acaacaaatt ttccaattag ccattatgaa aaagaagtgg aagaaatgaa gcatatgaca  1020
aggcaagagt acgttgcgtc attgagaagg aaaagtagtg gtttttcacg aggtgcatcc  1080
atttaccgag gagtaacaag acatcatcaa catggtagat ggcaagctag gattggaaga  1140
gttgcaggca acaaagatct ctacctagga actttcagca ctcaagaaga ggcagcagag  1200
gcatatgatg tggcagcaat aaaattcaga ggactgagtg cagttacaaa ctttgacatg  1260
agcagatatg atgtcaaaac catacttgag agcagcacat taccaattgg tggtgctgca  1320
aagcgtttaa aagacatgga gcaagttgaa ttgaatcatg tgaatgttga tattagccat  1380
agaactgaac aagatcatag catcatcaac aacacttccc atttaacaga acaagccatc  1440
tatgcagcaa caaatgcatc taattggcat gcactttcat tccaacatca acaaccacat  1500
catcattaca atgccaacaa catgcagtta cagaattatc cttatggaac tcaaactcaa  1560
aagctttggt gcaaacaaga acaagattct gatgatcata gtacttatac tactgctact  1620
gatattcatc aactacagtt agggaataat aataacaata ctcacaattt ctttggttta  1680
caaaatatca tgagtatgga ttctgcttcc atggataata gttctggatc taattctgtt  1740
gtttatggtg gtggagatca tggtggttat ggaggaaatg gtggatatat gattccaatg  1800
gctattgcaa atgatggtaa ccaaaatcca agaagcaaca acaattttgg tgagagtgag  1860
attaaaggat ttggttatga aaatgttttt gggactacta ctgatcctta tcatgcacag  1920
gcagcaagga acttgtacta tcagccacaa caattatctg ttgatcaagg atcaaattgg  1980
gttccaactg ctattccaac acttgctcca aggactacca atgtctctct atgtcctcct  2040
ttcactttgt tgcatgaata g                                             2061

SEQ ID NO: 142         moltype = AA  length = 363
FEATURE                Location/Qualifiers
source                 1..363
                       mol_type = protein
                       organism = Arabidopsis thaliana
SEQUENCE: 142
MDNFLPFPSS NANSVQELSM DPNNNRSHFT TVPTYDHHQA QPHHFLPPFS YPVEQMAAVM  60
NPQPVYLSEC YPQIPVTQTG SEFGSLVGNP CLWQERGGFL DPRMTKMARI NRKNAMMRSR  120
NNSSPNSSPS ELVDSKRQLM MLNLKNNVQI SDKKDSYQQS TFDNKKLRVL CEKELKNSDV  180
GSLGRIVLPK RDAEANLPKL SDKEGIVVQM RDVFSMQSWS FKYKFWSNNK SRMYVLENTG  240
EFVKQNGAEI GDFLTIYEDE SKNLYFAMNG NSGKQNEGRE NESRERNHYE EAMLDYIPRD  300
EEEASIAMLI GNLNDHYPIP NDLMDLTTDL QHHQATSSSM PPEDHAYVGS SDDQVSFNDF  360
EWW                                                                 363

SEQ ID NO: 143         moltype = AA  length = 280
FEATURE                Location/Qualifiers
source                 1..280
                       mol_type = protein
                       organism = Medicago truncatula
SEQUENCE: 143
MSSSNFSCIL SISLTFFILL LNKVNSAETT SFSITKFVPD QKNLIFQGDA KTASTGKLEL  60
SKAVKNSIGR ALYSAPIHIW DSKTGSVANF QTTFTFTITA PNTYNVADGL AFFIAPIDTK  120
PKSIHHGGYL GVFDSKTYKK SIQTVAVEID TFYNAQWDPN PGNISSTGRH IGIDVNSIKS  180
ISTVPWSLEN NKKANVAIGF NGATNVLSVD VEYPLIRHYT LSHVVPLKDV VPEWVRIGFS  240
SSTGAEYSAH DILSWSFDSK LNLGFENNIN ANVSSSTQAA                         280

SEQ ID NO: 144         moltype = AA  length = 349
FEATURE                Location/Qualifiers
source                 1..349
                       mol_type = protein
                       organism = Brassica napus
SEQUENCE: 144
MDNFLPFSSS NANSVQELSM DLNKNRSHFS MAQPQHLLPP YSYVACPALD QTGTMNHQPL  60
HSSDAFPQIP VVQTGGEFGY LVCKPGVRQE RGGFLDPHST KMARINRKKA MLRSRNNSNP  120
NSSSNELVDS RRQVALTMKN NAEIAARKDF YRFSSFDNKK LRVLLVKHLK NSDVGSLGRI  180
VLPKREAEGN LPELSDKEGM VLEMRDVDSV QSWSFKYKYW SNNKSRMYVL ENTGEFVKKN  240
GVLMGDYLTI YEDESKNLYF SIRKHPHKQN DGREDESMEV IEMNFYEDIM FDYIPNDEDD  300
SIAMLLGNLN EHYPYPNDLM DLTVNLDQHQ QATSSSPPAD HMSSNDFLW               349

SEQ ID NO: 145         moltype = AA  length = 584
FEATURE                Location/Qualifiers
source                 1..584
                       mol_type = protein
                       organism = Arabidopsis thaliana
SEQUENCE: 145
MNSMNNWLGF SLSPHDQNHH RTDVDSSTTR TAVDVAGGYC FDLAAPSDES SAVQTSFLSP  60
FGVTLEAFTR DNNSHSRDWD INGGACNTLT NNEQNGPKLE NFLGRTTTIY NTNETVVDGN  120
```

```
GDCGGGDGGG GGSLGLSMIK TWLSNHSVAN ANHQDNGNGA RGLSLSMNSS TSDSNNYNNN  180
DDVVQEKTIV DVVETTPKKT IESFGQRTSI YRGVTRHRWT GRYEAHLWDN SCKREGQTRK  240
GRQVYLGGYD KEEKAARAYD LAALKYWGPT TTTNFPLSEY EKEVEEMKHM TRQEYVASLR  300
RKSSGFSRGA SIYRGVTRHH QHGRWQARIG RVAGNKDLYL GTFGTQEEAA EAYDIAAIKF  360
RGLSAVTNFD MNRYNVKAIL ESPSLPIGSS AKRLKDVNNP VPAMMISNNV SESANNVSGW  420
QNTAFQHHQG MDLSLLQQQQ ERYVGYYNGG NLSTESTRVC FKQEEEQQHF LRNSPSHMTN  480
VDHHSSTSDD SVTVCGNVVS YGGYQGFAIP VGTSVNYDPF TAAEIAYNAR NHYYYAQHQQ  540
QQQIQQSPGG DFPVAISNNH SSNMYFHGEG GGEGAPTFSV WNDT                    584

SEQ ID NO: 146          moltype = AA  length = 686
FEATURE                 Location/Qualifiers
source                  1..686
                        mol_type = protein
                        organism = Medicago truncatula
SEQUENCE: 146
MNLLGFSLSP QEQHPSTQDQ TVASRFGFNP NEISGSDVQG DHCYDLSSHT TPHHSLNLSH  60
PFSIYEAFHT NNNIHTTQDW KENYNNQNLL LGTSCMNQNV NNNNQQAQPK LENFLGGHSF  120
TDHQEYGGSN SYSSLHLPPH QPEASCGGGD GSTSNNNSIG LSMIKTWLRN QPPPPENNNN  180
NNNESGARVQ TLSLSMSTGS QSSSSVPLLN ANVMSGEISS SENKQPPTTA VVLDSNQTSV  240
VESAVPRKSV DTFGQRTSIY RGVTRHRWTG RYEAHLWDNS CRREGQTRKG RQVYLGGYDK  300
EEKAARAYDL AALKYWGTTT TTNFPISHYE KEVEEMKHMT RQEYVASLRR KSSGFSRGAS  360
IYRGVTRHHQ HGRWQARIGR VAGNKDLYLG TFSTQEEAAE AYDVAAIKFR GLSAVTNFDM  420
SRYDVKTILE SSTLPIGGAA KRLKDMEQVE LNHVNVDISH RTEQDHSIIN NTSHLTEQAI  480
YAATNASNWH ALSFQHQQPH HHYNANNMQL QNYPYGTQTQ KLWCKQEQDS DDHSTYTTAT  540
DIHQLQLGNN NNNTHNFFGL QNIMSMDSAS MDNSSGSNSV VYGGGDHGGY GGNGGYMIPM  600
AIANDGNQNP RSNNNFGESE IKGFGYENVF GTTTDPYHAQ AARNLYYQPQ QLSVDQGSNW  660
VPTAIPTLAP RTTNVSLCPP FTLLHE                                        686

SEQ ID NO: 147          moltype = DNA  length = 336
FEATURE                 Location/Qualifiers
misc_feature            1..336
                        note = inducible promoter
source                  1..336
                        mol_type = other DNA
                        organism = synthetic construct
SEQUENCE: 147
tcgatagttg tgatagttcc cacttgtccg tccgcatcgg catccgcagc tcgggatagt  60
tccgacctag gattggatgc atgcggaacc gcacgagggc ggggcggaaa ttgacacacc  120
actcctctcc acgcaccgtt caagaggtac gcgtatagag ccgtatagag cagagacgga  180
gcactttctg gtactgtccg cacgggatgt ccgcacggag agccacaaac gagcggggcc  240
ccgtacgtgc tctcctaccc caggatcgca tccccgcata gctgaacatc tatataaaga  300
cccccaaggt tctcagtctc accaacatca tcaacc                             336

SEQ ID NO: 148          moltype = DNA  length = 2466
FEATURE                 Location/Qualifiers
misc_feature            1..2466
                        note = inducer
source                  1..2466
                        mol_type = other DNA
                        organism = synthetic construct
SEQUENCE: 148
atggccgaca ctagaagaag gcagaaccac tcttgtgacc catgccgtaa gggcaagaga  60
agatgtgatg ctccagagaa ccgtaacgag gctaatgaga acggatgggt gtcatgctct  120
aactgcaaga ggtggaacaa ggactgcacc ttcaactggc ttagctccca aaggtctaag  180
gctaagggtg ctgctccaag agctaggact aagaaggcta ggactgctac tactacctcc  240
gagccttcta cttccgctgc tactattcca actcccgagt ccgataatca cgatgctcca  300
ccagtgatca actcccacga tgctttgcca tcttggactc agggacttct ttctcaccct  360
ggcgatctct tcgacttctc ccattctgct attccagcta acgctgagga tgctgctaac  420
gtgcaatctg atgctccatt cccatgggat cttgctatcc caggcgattt ctctatggga  480
cagcaacttg agaagcccct ctccccattg tctttccagg ctgttcttct tccaccacac  540
tccccaaaca ctgatgatct cattcgtgag cttgaggaac agactaccga tccagattcc  600
gtgactgaca ctaactccgt tcagcaagtt gctcaggatg gctctctttg gtctgatagg  660
cagtctccac tcctcccaga aaacagtttg tgcatggctt ccgactctac cgctagaagg  720
tatgctaggt ccaccatgac caagaacctc atgaggatct accacgactc catggaaaac  780
gccctttctt gctggcttac tgagcacaac tgcccatact ccgaccagat ttcttacctc  840
ccaccaaagc aaagggctga gtggggacca aattggtcta acaggatgtg cattagggtg  900
tgcaggctcg atagggtgtc aacttctctt agaggaaggg ctctctccgc tgaagaagat  960
aaggctgctg ctagggcact tcaccttgct attgtggctt tcgcttctca gtggactcaa  1020
catgctcaaa ggggagctgg acttaacgtc ccagctgata ttgctgctga cgagcgttct  1080
attaggcgta acgcttggaa tgaggctagg catgcacttc agcacactac tggaatccca  1140
tccttcaggg tgatcttcgc caacatcatc ttcagcctca ctcagtccgt gctcgatgat  1200
gatgagcaac atggaatggg agctaggctc gataagcttc tcgagaatga tggtgctcca  1260
gtgttcctcg agactgctaa taggcagctc tacaccttca ggcacaagtt cgctaggatg  1320
cagagaaggg gtaaggcttt caataggctt cctggtggat ccgtggcttc tactttcgct  1380
ggaattttcg agactcccac cccctcatct gagtctccac aacttgatcc agtggtggct  1440
tctgaggaac acaggtctac tctgtctctc atgttctggc tcgggatcat gttcgacact  1500
ctgtctgctg ctatgtacca gaggccactt gttgtgtccg atgaggactc ccagatctct  1560
tctgcttctc caccaagaag aggtgccgag actcctatta accttgattg ctgggagcca  1620
ccaaggcagg tcccatctaa tcaagagaag tctgatgtgt ggggcgacct gttccttagg  1680
```

```
acttctgatt ctttgcccga ccacgagtcc cacactcaaa tttctcaacc agctgctagg  1740
tggccatgca cttatgaaca agctgctgct gctctctcct ctgctactcc tgttaaggtg  1800
ttgctttaca ggcgtgtgac tcagctccag actttgttgt ataggggagc ttctccagct  1860
aggcttgagg ctgctattca gaggactctc tacgtgtaca accactggac tgctaagtac  1920
cagccattca tgcaggattg cgttgccaac catgagcttc tcccatccag gatccagtct  1980
tggtacgtga tccttgatgg acactggcac cttgctgcta tgcttttggc tgatgtgctc  2040
gagtccatcg acagggattc ctactccgat atcaaccaca tcgacctcgt gactaagctc  2100
aggcttgata acgctcttgc tgtgtctgct ctcgctaggt catctcttag aggccaagaa  2160
ctcgatccag gcaaggcttc tccaatgtac aggcacttcc acgactccct tactgaggtt  2220
gcattccttg ttgagccatg gactgtggtg ctcatccact catttgctaa ggctgcttac  2280
atcctcctcg attgccttga tcttgatggt cagggaaacg ctctcgctgg ataccttcaa  2340
cttaggcaga actgcaacta ctgcatcagg gctctccagt tccttggccg taagtctgat  2400
atggctgctc tcgtggctaa ggatcttgag aggggactca acggaaaggt cgacagcttc  2460
ctctaa                                                              2466

SEQ ID NO: 149         moltype = AA  length = 208
FEATURE                Location/Qualifiers
source                 1..208
                       mol_type = protein
                       organism = Arabidopsis thaliana
SEQUENCE: 149
MTSSVIVAGA GDKNNGIVVQ QQPPCVAREQ DQYMPIANVI RIMRKTLPSH AKISDDAKET  60
IQECVSEYIS FVTGEANERC QREQRKTITA EDILWAMSKL GFDNYVDPLT VFINRYREIE  120
TDRGSALRGE PPSLRQTYGG NGIGFHGPSH GLPPPGPYGY GMLDQSMVMG GGRYYQNGSS  180
GQDESSVGGG SSSSINGMPA FDHYGQYK                                    208

SEQ ID NO: 150         moltype = AA  length = 236
FEATURE                Location/Qualifiers
source                 1..236
                       mol_type = protein
                       organism = Arabidopsis lyrata
SEQUENCE: 150
MERGAPFSHY QLPKSISELN LDQHSNPNPM TSSVVVADAS DNNKGIVAQQ QPPCMAREQD  60
QYMPIANVIR IMRKILPSHA KISDDAKETI QECVSEYISF VTGEANERCQ REQRKTITAE  120
DILWAMSKLG FDNYVDPLTV FINRYREIET DRGSALREPP SLRQAYGGNG IGFHGPSHGL  180
PPPGPYGYGM LDQSMVMGGG RYYQNGSSGQ DESSAGGGSS SSINGMPAFD SYGQYK      236

SEQ ID NO: 151         moltype = AA  length = 230
FEATURE                Location/Qualifiers
source                 1..230
                       mol_type = protein
                       organism = Brassica napus
SEQUENCE: 151
MERGAPLSHY QLPKSNSGLN LDQHNNSIPT MTGSISACDD KNKTILPQQQ PSMPREQDQY  60
MPIANVIRIM RKILPPHAKI SDDAKETIQE CVSEYISFVT GEANERCQRE QRKTITAEDI  120
LWAMSKLGFD DYVGPLNVFI NRYREFETDR GCSLRGESSF KPVYGGSGMG FHGPPPPGSY  180
GYGMLDQSMV MGGGRYYHNG SGQDGSVSGG GGSSSSMNGM PVYDQYGQYK            230

SEQ ID NO: 152         moltype = AA  length = 252
FEATURE                Location/Qualifiers
source                 1..252
                       mol_type = protein
                       organism = Ricinus communis
SEQUENCE: 152
MERGGRVHRY RRHAKQPTPT TSATASTSPG MSSVQTTICS NINLPSTLSL SNSTAAPQAP  60
QQQQLQPSQC LVREQDQYMP IANVIRIMRR ILPPHAKISD DAKETIQECV SEYISFITGE  120
ANDRCQREQR KTITAEDVLW AMGKLGFDDY VEPLTLFLNR YREMENERST IRDPILKRSS  180
VGVVDYGNLG MNPFMPTFPM IPPPQGYFDS NMLGGYYRDA PDGASGAASG SNLAASSAPN  240
SLLHFDPFAQ FK                                                     252

SEQ ID NO: 153         moltype = AA  length = 198
FEATURE                Location/Qualifiers
source                 1..198
                       mol_type = protein
                       organism = Glycine max
SEQUENCE: 153
MNMNMRQQQV ASSDQNCSNH SAAGEENECT VREQDRFMPI ANVIRIMRKI LPPHAKISDD  60
AKETIQECVS EYISFITGEA NERCQREQRK TITAEDVLWA MSKLGFDDYI EPLTMYLHRY  120
RELEGDRTSM RGEPLGKRTV EYATLATAFV PPPFHHHNGY FGAAMPMGTY VRETPPNAAS  180
SHHHHGISNA HEPNARSI                                               198

SEQ ID NO: 154         moltype = AA  length = 240
FEATURE                Location/Qualifiers
source                 1..240
                       mol_type = protein
                       organism = Medicago truncatula
SEQUENCE: 154
METGGGFHGY RKLPTNTNSS AVAGTLKLSS VSEMNTRQQV GEQNNNGTEQ DNECIVREQD  60
RFMPIANVIR IMRKILPPHA KISDDAKETI QECVSEYISF ITGEANERCQ REQRKTITAE  120
```

```
DVLWAMSKLG FDDYIEPLTM YLHRYRELEG DRTSMRVEPL GKRGMEYGNL GGFVPQFHIG  180
HPNGGYYGNA APTYMMRDGN NNNNNNNNAP NAANAAGGSS HSQALANAEA NGHHHHHQYK  240

SEQ ID NO: 155         moltype = AA  length = 278
FEATURE                Location/Qualifiers
source                 1..278
                       mol_type = protein
                       organism = Zea mays
SEQUENCE: 155
MDSSSFLPAA GAENGSAAGG ANNGGAAQQH AAPAIREQDR LMPIANVIRI MRRVLPAHAK  60
ISDDAKETIQ ECVSEYISFI TGEANERCQR EQRKTITAED VLWAMSRLGF DDYVEPLGAY  120
LHRYREFEGD ARGVGLVPGA APSRGGDHHP HSMSPAAMLK SRGPVSGAAM LPHHHHHHDM  180
QMHAAMYGGT AVPPPAGPPH HGGFLMPHPQ GSSHYLPYAY EPTYGGEHAM AAYYGGAAYA  240
PGNGGSGDGS GSGGGGGSAS HTPQGSGGLE HPHPFAYK                         278

SEQ ID NO: 156         moltype = AA  length = 225
FEATURE                Location/Qualifiers
source                 1..225
                       mol_type = protein
                       organism = Arachis hypogaea
SEQUENCE: 156
METGGGFHGY RNLPTTTSGL KLSVSEMNMR AVENNTGSSN NNHTDDNECT VREQDRFMPI  60
ANVIRIMRKI LPPHAKISDD AKETIQECVS EYISFITGEA NERCQREQRK TITAEDVLWA  120
MSKLGFDDYI EPLTMYLHRY RELEGDRTSM RGEPLGKRTV DYGTLGVAAA STFVPPFHIG  180
HHHHHPHPSS YYGTPMGNYI RDAPNAGSSL QPPSLAHAEP NTQYK                  225

SEQ ID NO: 157         moltype = AA  length = 234
FEATURE                Location/Qualifiers
source                 1..234
                       mol_type = protein
                       organism = Arabidopsis thaliana
SEQUENCE: 157
MERGGFHGYR KLSVNNTTPS PPGLAANFLM AEGSMRPPEF NQPNKTSNGG EEECTVREQD  60
RFMPIANVIR IMRRILPAHA KISDDSKETI QECVSEYISF ITGEANERCQ REQRKTITAE  120
DVLWAMSKLG FDDYIEPLTL YLHRYRELEG ERGVSCSAGS VSMTNGLVVK RPNGTMTEYG  180
AYGPVPGIHM AQYHYRHQNG FVFSGNEPNS KMSGSSSGAS GARVEVFPTQ QHKY        234

SEQ ID NO: 158         moltype = AA  length = 231
FEATURE                Location/Qualifiers
source                 1..231
                       mol_type = protein
                       organism = Brassica napus
SEQUENCE: 158
MERGGFHGYR KFSLNTTNPS EPARFLMAEG SMQLAEPNQT NKTANGGEEE CVVREQDRFM  60
PIANVIRIMR RILPAHAKIS DDSKETIQEC VSEYISFITG EANERCQREQ RKTITAEDVL  120
WAMSKLGFDD YIEPLTLYLH RYRELEGDRG VGYNAGSVGM TSGMVVKRPN GTMGEYGAYG  180
VVPGMHMAPY HYRHQNGYAY SGNEPDSKMG GPSSAANGSR VELFPTQQHK Y          231

SEQ ID NO: 159         moltype = AA  length = 216
FEATURE                Location/Qualifiers
source                 1..216
                       mol_type = protein
                       organism = Phaseolus coccineus
SEQUENCE: 159
MESGGFHGYR KLPNTTSPGL KLSVSDMNNV NTSRQVAGDN NHTADESNEC TVREQDRFMP  60
IANVIRIMRK ILPPHAKISG DAKETIQECV SEYISFITGE ANERCQREQR KTITAEDVLW  120
AMSKLGFDDY MEPLTMYLHR YRELEGDRTS MRGESLGKRT IEYAPMGVGV ATAFVPPQFH  180
PNGYYGPAMG AYVAPPNAAS SHHHGMPNTE PNARSM                           216

SEQ ID NO: 160         moltype = AA  length = 312
FEATURE                Location/Qualifiers
source                 1..312
                       mol_type = protein
                       organism = Arabidopsis thaliana
SEQUENCE: 160
MVDENVETKA STLVASVDHG FGSGSGHDHH GLSASVPLLG VNWKKRRMPR QRRSSSSFNL  60
LSFPPPMPPI SHVPTPLPAR KIDPRKLRFL FQKELKNSDV SSLRRMILPK KAAEAHLPAL  120
ECKEGIPIRM EDLDGFHVWT FKYRYWPNNN SRMYVLENTG DFVNAHGLQL GDFIMVYQDL  180
YSNNYVIQAR KASEEEEVDV INLEEDDVYT NLTRIENTVV NDLLLQDFNH HNNNNNNNSN  240
SNSNKCSYYY PVIDDVTTNT ESFVYDTTAL TSNDTPLDFL GGHTTTTNNY YSKFGTFDGL  300
GSVENISLDD FY                                                     312

SEQ ID NO: 161         moltype = AA  length = 321
FEATURE                Location/Qualifiers
source                 1..321
                       mol_type = protein
                       organism = Brassica napus
SEQUENCE: 161
MMADENVETK ASTLIASVGH QGHGFGSGSG GHHGLSASVP LLGVNSKKRR MPRQRRSSSS  60
```

```
FNLLSLPPPM PLSPHVPTPL SARKIDPRKL RFLFQKELKN SDVSSLRRMI LPKKAAEAHL  120
PALECKEGIP IRMEDLDGLH VWTFKYRYWP NNNSRMYVLE NTGDFVNAHG LQLGDFIMVY  180
LDLDSNNYVI QARKASEEEE EEEDVTIIEE DDVYTNLTKI ENTVVNDLLI QDFNHHNDNS  240
SNNNSNNNIN NNKCSYYYPV IDDITTNTAS FVYDTTTLTS NDSPLDFLGG HTTTTTNTYY  300
SKFGSFEGLG SVENISLDDF Y                                           321

SEQ ID NO: 162         moltype = AA  length = 314
FEATURE                Location/Qualifiers
source                 1..314
                       mol_type = protein
                       organism = Medicago truncatula
SEQUENCE: 162
MMMDEGEGKK KVVVQKTEAC GFMAGVEDEL GFVNVKGDNN NGSGQRIHHD HGFVAAAFGT  60
VHRKKRMARQ RRSSSSTITI HLKNLPSSTT TTTTTTTSHV PISPIPPLFH SLPPAREIDH  120
RRLRFLFQKE LKNSDVSSLR RMVLPKKAAE AFLPVLESKE GILLSMDDLD GLHVWSFKYR  180
FWPNNNSRMY VLENTGDFVS THGLRFGDSI MVYQDNQNHN YVIQAKKACD QDEYMEEAND  240
TINHIFVDDY EVNKSCFDVA YPAMNDTSMS FIYDTTISND SPLDFLGGSM TNYSRIGSVE  300
TFGSVENLSL DDFY                                                   314

SEQ ID NO: 163         moltype = DNA  length = 3275
FEATURE                Location/Qualifiers
source                 1..3275
                       mol_type = other DNA
                       organism = Arabidopsis thaliana
SEQUENCE: 163
ggttggctat atggtccaaa ttttgatttg caatatgaga ttgcacagag agaacaatct  60
ttcattatga ttaattattg tacaagtaac aaacaccaat ctccgatata ctttggctct  120
ttagcacatt gttatgctag aagttagcgg aaatctatat gttgttaaac gcagcgttta  180
aattgaacag tgtaatttac cttgaaattt taagactaca tgctgtttag aatttcagat  240
gaaaacatct tgatgtttta gaaatccacg tgggaatagc gtaaaatctt atccaacgaa  300
cttattttgg ttttgttgta tttgtgcaag tcgtcacgct aatcgaaaaa agaaaagaaa  360
aaaagaagcc gtcatgatcg gccatttctc ggccgagtct gagtctgact ctgcgtccgt  420
gtcaccatta tcagatcgag cctgtcttat ctcgttgcga ttccctatgc aaaaatcttc  480
ttcttttttt tattccccca tttatctctg atctcttctc tcttctcaag taaacctctc  540
tgcttcacgt ctcttctttt cttgtcgatt ttccccagat aatcagttga aaacacaccc  600
aaattcatct tcgaatcaat aatggatata agtaatgagg ctagtgtcga tccctttttcg  660
attggaccat catctatcat gggtcgaacc attgctttca gagtcttgtt ctgtagatca  720
atgtcacagc ttaggcgtga tctctttcgg ttcttgttgc attggtttct tagatttaag  780
ctgaccgttt caccgtttgt gtcgtggttt catcctcgga accctcaagg gatttagcg  840
gtggttacaa tcattgcctt tgtgttgaaa cgatacacga atgtgaaaat aaaggcggaa  900
atggcttacc ggaggaagtt ttggaggaat atgatgcgga cggctttgac ttatgaggaa  960
tgggctcatg ctgctaagat gttagagaag gaaacaccaa agatgaatga atctgatctt  1020
tatgatgaag agttggttaa gaacaagctt caggagcttc gtcatcgtcg ccaagaaggc  1080
tcacttagag acattatgtt ttgtatgaga gctgatttgg tgaggaatct cggtaatatg  1140
tgtaattcgg agcttcataa aggtagactt caggttccta gacatatcaa agagtacatt  1200
gatgaggtgt ctactcagtt gagaatggtt tgtaactctg attcagagga gctttcttta  1260
gaagagaagc tttcttttat gcatgaaaca cggcatgcct ttggtagaac ggctttgctt  1320
ttgagtggtg gggcttctct tggtgcgttt catgttggtg tggttaggac tttggttgag  1380
cataagcttt tacctcgaat aattgctggt tctagtgttg gatccatcat ttgtgctgtt  1440
gtggcctcaa ggtcttggcc agaactacag agtttctttg agaattcttt gcattcttta  1500
cagttctttg atcagctcgg aggcgtgttc tcaatagtga aacgggtaat gacacaaggg  1560
gctctacacg atatcagaca gttgcaatgt atgcttagaa acctcacaag caatctcaca  1620
ttccaagaag cttatgacat gacaggaagg attctcggga tcaccgtttg ctccccaaga  1680
aagcatgaac ctcctcggtg tcttaactat ttgacttcgc ctcatgtggt tatatggagc  1740
gcagtgactg cttcttgtgc ttttcctggt ctctttgaag ctcaagagct aatggctaaa  1800
gatcgaagtg gagagatcgt accgtatcat ccacctttca atttggatcc agaagtaggc  1860
actaaatcat catctggacg ccggtggaga gatggtagtt tggaggttga tttaccaatg  1920
atgcagctta aagaactgtt caatgtcaat cattttattg tgagccaagc caatcctcac  1980
attgctccat tactgcgtct aaaggattta gttcgagctt atggtggtag attcgcagct  2040
aagctcgcgc atctagtgga gatggaggtc aaacatagat gcaaccaggt attagagctc  2100
ggttttcctc tcggtggact cgcaaagctt tttgctcagg agtgggaagg tgatgttaca  2160
gttgtaatgc ctgctactct tgctcagtac tcgaagatta tacaaaatcc gactcatgtc  2220
gagcttcaga aagcggctaa ccaaggaaga agatgcactt gggagaagct ctcagccata  2280
aaatcaaact gcgggatcga gcttgcgctt gatgattctg tagctattct taaccatatg  2340
cggaggctca agaaaagtgc ggagagagcc gccactgcca cgtcttcgtc tcatcacgga  2400
ttggcttcaa ccaccagatt caatgcttca agaagaatcc catcttggaa cgtccttgcc  2460
agagagaact caacaggctc actggatgat ctagtcactg acaataacct ccacgcttct  2520
tcgggcagga atttaagcga cagtgaaaca gagagcgtgg agttgagttc ttggacaaga  2580
actggtggac ctttaatgag aacagcttct gctaataagt tcattgattt tgttcagagt  2640
cttgatatcg acattgcatt ggtcagagga tttagtagca gtcccaattc tccagcagtt  2700
cctcctggtg gctcgtttac tccaagcccg agatccatag cggctcattc ggatatcgaa  2760
tcaaacagca atagcaacaa tcttggaaca agcacttcaa gcataacagt tactgaaggt  2820
gatcttctac agcctgagag aacgagtaac ggatttgtgt taaacgtcgt taaaagagag  2880
aacttgggaa tgccatcgat tgggaaccaa aatacagagt taccagagag tgtacagctc  2940
gatataccgg agaaggagat ggattgtagc tctgtatcag aacacgaaga agatgataac  3000
gacaatgaag aagaacataa cggctcgagt ctggttactg tttcttcaga agattccggt  3060
ttacaagaac cggtgtctgg tagtgttata gatgcttaga gtgtgattga ttcaagtgag  3120
tatagattct taattaaatt tgcagagttt ccaaagggtt tagtgcacca cttgtgtatg  3180
tttgtattgc ttattgtttg aaattcattt gtgaaatcga aatatatctg taaattcaga  3240
```

```
aaatattctc tcatccatta caaaatattt gagtc                          3275

SEQ ID NO: 164          moltype = DNA  length = 2795
FEATURE                 Location/Qualifiers
source                  1..2795
                        mol_type = other DNA
                        organism = Brassica napus
SEQUENCE: 164
tcccacgctc aggttctaat tgcaaaaaag gatcatactt tccttattaa aatcaatttc  60
ctgtgcttga tttctatctt aggaagctcg tagtagtttc tctgatagtg aatttgatga  120
aacaaagaaa aaaatgctga cttggtctca gattctaatt aaacacacac acacacataa  180
cctccaatgg atataagcaa cgaggccaat gtcgatccct tctcaatcgg accaacctcc  240
atcctcggcc gaaccatcgc cttcagagtc ctcttctgca aatcaatgct ccagctccgc  300
cgcgacctct tccgcttcct cctccactgg ttcctcacac tcaagctcgc cgtctccccc  360
tttgtctcct ggttccaccc ccggaacccc caggggatcc tcgccgtcgt cacgatcatc  420
gccttcgtcc tgaaacgcta caccaacgtg aaggccaagg ccgagatggc ctaccgtaga  480
aagttctgga ggaacatgat gcgcgcggcg ttgacttacg aggaatgggc tcacgccgct  540
aagatgttgg ataaagagac tccgaagatg aacgagtccg atctttacga tgaagagttg  600
gttaagaaca agctaatgga gcttcgtcat cgacgtcatg agggctctct tagagacatt  660
attttctgta tgagagctga tcttgtgaga aatctcggta atatgtgtaa ccctgagctt  720
cacaagggaa ggcttcacgt gccgagactc atcaaagagt atatcgatga ggtctctaca  780
cagcttagga tggtttgcga catggacact gaagagcttt ctctggagga gaaactttct  840
tttatgcatg agaccagaca cgcgtatgga agaacagctc tacttctcag tggaggagct  900
tctcttgggg ctttccatct tggtgtggtc aagacgcttg tggaacataa gctattgcca  960
agaattatag ctggttcaag cgtggggtct gtaatgtgtg cggttgtggg gacaaggtca  1020
tggcccgagt tgcagagctt ctttgaaggg tcctggcatg ctctgcagtt ctttgatcag  1080
atgggaggaa ttttcactac tgtgaagcgg gttatgactc aaggcgcagt ccatgagatc  1140
cggcatctgc aatggaagtt gaggaatctc accaacaatc tcacagtccg gaatttccgg  1200
gtcgacgact tcgaggatac tcgggataac ggtttgctca ccgacgaagc actagccgcc  1260
tcggtgctta actatctcac ttctcctcac gtggtgatat ggagcgcggt gactgcttct  1320
tgcgctttcc ctggtttgtt tgaagctcag gagctgatgg ctaaagatag gagtggggag  1380
atagtgccgt atcatccgcc ttttaatttg gaaccggagg aaggtgggga taagtcgtct  1440
acgaggaggt ggagagatgg gagtttggag gttgatttgc cgatgatgca gcttaaggag  1500
ctgtttaatg ttaatcattt tattgtgagc caggctaatc ctcacattgc tccgttgctg  1560
cgtttgaagg atatagttag agcttatgga ggtcgatttg cagcaaagct cgcgcaactc  1620
gcggagatgg aagtgaagca tagatgtaat caagtactag aactcgggct tcctctaaga  1680
gaagtagctt cactatttgc tcaagaatgg gaaggcgatg tcacaattgt catgccagct  1740
actttttctc agtacttgaa gatcatacaa gtcgacgatt tcgtcgagct tcaaaaagcc  1800
gctaaccaag gaaggagatg cacttgggag aagctatcag ccataaaagc aaactgtggg  1860
atcgagcttg cgcttgatga gtgtgtaact aatcttaacc atatgcgtag gctcaacaga  1920
agcgctgaga gagccgctgc tgctgctggc acgtcctcct cgtctcatca cggattagct  1980
tcaacgacaa gattcaatgc ttctagaaga atcccgtctt ggaacgtcat cgctagagag  2040
aactcaactg gctcactgga cgacctcgtc actgacagta acaataataa tctccacgcg  2100
gggaggaacc taagcgacag cgaaacggag agcgtggaga tgagttcttg gacgaggact  2160
ggtggaccgt tgatgagaac agcttctgct aataggttca ctgactttgt ccatggtctt  2220
gacgtggaca ttgcgttgac aagagggttt actagcagcc ctaactctcc agcggttcct  2280
ggcccggtta gtccgagttt tagtccaaga tcgagatcct tggcggctca atccgagagc  2340
gaatctgaca agagggaaag tagcaacagt tctagtatat cagctactga aggtgatctt  2400
ctgcagcctg agagaacgag taacggtttt gttttgaacg ttgttagaag agagaacttg  2460
gggatgcctg tggagaacca gagcggtgag ctgccggaga gtgtacagat agatatacct  2520
gagagggaga tggataatag ctctgtctca ggacatgaag atgataatga tgataatgat  2580
gatgaagaag aagaacataa gggctcggtt ccggttaaag attccggttt acaagattct  2640
tgtagtgtaa tagatgctta gactgatttg atccgagtga agagattctt gttcagcaaa  2700
gatcttggag tgttttagtg ctttgtaaat agtacaacta taggccgcaa gtaaggtgca  2760
tgttgtgtat gtttgcagtg attatgttga aaatt                          2795

SEQ ID NO: 165          moltype = DNA  length = 2670
FEATURE                 Location/Qualifiers
source                  1..2670
                        mol_type = other DNA
                        organism = Brachypodium distachyon
SEQUENCE: 165
atggaagaat ccggagaagc gagtattggg gccttcagga tcgggccgtc gacgcttctc  60
ggccgcggcg tcgcgcttcg cgtgctcctg ttcagctcgc tctggcgtct ccgggcgcgg  120
gcgcgcgccg ctgtgtcgcg cgtgcgcagg gccacgctgc caatggccgc gtcctggctt  180
cacctcagga acacccatgg cgtcctcctg attctcgtgc tcttcgggtt gctcctcagg  240
aagctctccg gtgcgcggtc gcggctggcg ctggcgcgcc ggcgtaggct gtgcaagagc  300
gcgatgcgct acgcggcgac gtatgagcag tgggtgcgtg ccgccaaggt gctcgacaga  360
atgtctgagc aggtgaacga gtctgatttt tacgacgagg agctgatcaa gagtaggctt  420
gaggagctcc ggaggcggag ggaggaaggg tcgctccggg atgtggtgtt ctgtatgcgc  480
ggcgatctcg tgaggaactt ggggaacatg tgtaatcctg agcttcataa gggcaggctc  540
gaggtgccca ggctgataaa agatttcatt gatgaggttt caactcagct gaaaatggtg  600
tgtgaatctg acaccgatgc gttatttttg gaagagaagc ttgcctttgt tcaggaaacc  660
aggcatgcct atgggaggac agcactactc ttaagtgggg gcgcttcact gggctctttc  720
catgtaggtg tagtgaaaac attagttgag cataagcttc tgcctcggat aatagcaggg  780
tctagcgttg gttccattat atgttcaatt gttgctactc gaacatggcc tgagattgag  840
agcttcttca tagactcatt acaaatctta cagttcttcg gtaggatagg tggaattttt  900
gctgtgacca aacgggttat gacttatggt gcacttcatg acattagcca gatgcaaagg  960
cttttgaggg atctcacaag taacttaaca tttcaagagg cttacgatat aactggccgt  1020
```

```
gttcttgggg tcactgtttg ctctcccaga aaaaacgagc cacctcgctg cctcaactac  1080
ctgacatcac cacatgttgt tatctggagt gctgtaactg cttcgtgtgc attccctggc  1140
ctctttgaag ctcaggaatt gatggcaaag gataggtttg gccacatagt tcccttccat  1200
gcgccctttt ccacagatcc agaacaaggt cctggagcat caaagcggcg atggagggac  1260
ggaagtttgg agatggattt accgatgatg caactaaagg agttattcaa tgtgaatcat  1320
ttcatcgtca gccaagctaa tcctcacatc tctccactcc tccgaatgaa ggagattgtc  1380
agatcctatg gaggtcgctt tgcgggaaag ctcgctcgtc ttgctgagat ggaggtgaag  1440
tatcgatgta accaagttct agaagttggc ctccccactgg gaggacttgc aaagttgttt  1500
gctcaggact gggagggtga tgtcactatg gttatgccag caacagtagc tcagtacttg  1560
aagattatac aagatccaac atatgcagaa ctccaaatgg ctgccaatca gggtcaaaga  1620
tgcacgtggg agaagctctc agcgatcaga gcaaactgtg caattgaact tgcattggat  1680
gaatccattg cggttctcaa ccacaaacga aggttaagaa gaagcacaag ggcagcagct  1740
tcttcccagg aatataccag caatgttcga ctcagaacac caaggagggt accctcatgg  1800
agctgcatca gtcgagagaa ttcgtcagga tctctctcag aagatcactt tgcggtcgct  1860
atttcatcca gtcaccaagg tactatacga gttgatggcg caccaaacat gcctcatcat  1920
gttcgtcaca gttcacacga tggaagtgag agcgaatcag aaaccattga cttaaattca  1980
tggaccagga gtggtgggcc tctaatgagg acttcatcag ctgatcagtt catcagtttt  2040
atccagaatc tcgagattga atctgagttc gatagggttc gtactacaga ggatgacaat  2100
acaggtattt tatcaggatc tacattttca aaagatccat acccaaacat tagttctaga  2160
gtcactacac cagatagatg cacagaagtt tctgaaacag agtcgtgcaa cgccggcaac  2220
acaagcatca ctgtttctga aggagatttg ctacaacctg agaggactac caccggaatt  2280
ctactcaatt ttgtcagaag agaagatctg cttggtcagc ataacagtga tgctgacatg  2340
accgaaagct ccttagccga agcatatgtg gacacatcac atttggaatc ttgtgatgcc  2400
atctcagcct ctgacagttc tgaaggtaac aaagacgcag ctgactcaga gaatctcttg  2460
gtttctcatg cagatttagt aacttcgcat caatcttcag ttgatgataa caaaggtggc  2520
tagattttga aagaattctt ttagtggctt gctaagtcga tgctgtacag gaaaaactgt  2580
agtgtctccg tttcgtgagc actactgctg gtagcatagt gaatattgta ctttgtacca  2640
gatactaaat aaatttgatt gcttgccatt                                   2670
```

```
SEQ ID NO: 166         moltype = DNA  length = 3884
FEATURE                Location/Qualifiers
misc_feature           1..3884
                       note = Populus trichocarpa
source                 1..3884
                       mol_type = other DNA
                       organism = synthetic construct
SEQUENCE: 166
gtttcttttc ccttatccgc ctttgattgc aaaagtcaat gtcagagcca tcaccccctc  60
cttgctcaat ctttacgtaa ccgtatgtat atccttatct tcttctaaca tttcccaaga  120
ctccgatcct gtatttattg tattcacttc acccttcttc tctctttcct tcccgaacga  180
aaacaaagtc tcaatctttc attctctgtt tgtctaaagt ctgtacattc ttcactttct  240
cgagttgggt ttctttcttg aatttggttt cttgggtttg attttgtttt tcaagtggat  300
attgctattt attgggtggt gatattgaga ccctttttgtt agttttgtat attggttttt  360
gaggtggatg tagttttttt aggggtttta gggtttggtt attgaaaact catatggcaa  420
ggttggcttc tggcaatctg gatttataag attctgtttt tcttgttgac acagtacagg  480
atcaaaaggg ttggattttt gttacttgtc aatatcttct tattttgtga tagctagtcc  540
ttttgcatta ggattgcata tctttattct atctacttca ttgtctctct atatattgcc  600
atcctatccg gggagagaca gattcaattg ttttattgtc cttctcattc tcattagaat  660
caaagtcttg acatacaatc ctttcacaat tgtgaaattt gattccttag tgaccatcta  720
ttgtagctgt ttcatatttg tttcgttcaa gctaattctg ttgttagatt tgagacaaaa  780
gaaggccccg cttccaatta cagaccactt tcttgttttg gttttagcta agatatggat  840
ataagcaatg aggccagtgt tgacccctttc aaaatcggac cttcatcgat cattggtagg  900
acaattgctt tcagagttct gttctgtaaa tcaatctcac atttgaggca aaaaatcttt  960
catgtgttgt tgaattacat ttatagagtt ggtgaatttg tggcgcctat gttatcatgg  1020
tttcatccaa ggaatccaca agggatattg gccatgatga cgataattgc atttttattg  1080
aaaagatatg cgaatgttaa attgagggcc gaaacagcgt ataggaggaa attttggagg  1140
aatacgatga gaactgcgtt gacatacgag gagtggtttc atgctgctaa aatgcttgat  1200
aaagagaccc caaagatgca tgaatgtgat ctctatgatg aagaactagt caggaacaag  1260
cttcaagagc tccaccaccg tcgccaagag ggatgtctta gagatataat ctttttatg  1320
agagccgatc ttgtaagaaa tctcggtaat atgtgtaacc ctgagcttca caagggtagg  1380
cttcaagtgc ccaagctcat aaaggaatat attgacgagg tctcaactca gttaagaatg  1440
gtttgtgact ccgattcaga ggagctttcg ttggaagaaa agcttgcttt catgcatgaa  1500
acgagacatg cttttgggag aacagctttg cttctgagtg gaggtgcttc acttggagcg  1560
tttcatgtgg gtgtggttaa aacactggtg gagcacaagc ttatgccccg aataattgct  1620
ggttctagtg tggggtcaat tatgtgttca gttgttgcca ccagatcgtg gccagagctg  1680
caaagttttt ttgaggattc ctggcactcg tttcagtttt ttgaccaatt gggtggaatt  1740
ttcacagttg tgaagagggt catgagacaa ggagctgttc atgaaatccg gcagttgcaa  1800
tggatgttaa ggcatcttac aagtaatctt acatttcaag aagcttatga catgactggt  1860
cgaattcttg ggatcacagt ttgctcacct aggaagcatg agccccctag atgccttaat  1920
taccttactt cccctcatgt tgttatatgg agtgcagtca ctgcttcttg tgcttttcct  1980
ggcctttttg aagcccagga actaatggca aaggacagaa gtggggaact tgtgccttat  2040
cacccaccct ttaatctgga tcctgaagaa ggatctgatg cacctatgcg taggtggagg  2100
gatggtagcc tggagattga tttaccaatg atacaattga aggaactatt caatgtcaat  2160
cattttattg taagtcaagc gaatcctcac attgctccat tgttgagact gaaggatata  2220
gtcagggcat atgggggtag ctttgctgcc aagcttgctc atctcgctga gatggaggta  2280
aaacatagat gcaatcaggt attggaactt ggttttccat taggtggact tgccaagctt  2340
tttgctcaag aatgggaagg tgatgttact gttgttatgc ctgccacact cgctcagtac  2400
tcaaaaatta ttcaaaaccc aaatcacttg gagcttcaaa aggcatcaaa ccaaggcaga  2460
aggtgcacat gggagaagct ttctgccata aaagctaatt gtggtattga gcttgctctt  2520
```

```
gatgagtgtg tttctgttct gaaccacatg cgtagactca aaaggagtgc tgagagagct  2580
gctgctgctt ctcatggcca agcaagctct gcgagcacat tgagatttag tgcttcaaaa  2640
agaattcctt cttggaattg catcgcaaga gaaaactcaa caggctcact tgaagaagac  2700
ttccttgctg atgttgcttc aacattccat caaggagttg gtgtggctgg aggaacttct  2760
actggtagga atttgagaac acaacgcaac ctacatcatg atggaagtga tagtgaatct  2820
gaaagtgtag atttgaattc ttggacaaga tctggcgggc ctttgatgag gactgcttct  2880
gcaaataagt tcattgactt tgtccaaagt ctggatgttg attctgagct aaggaaaggc  2940
ttcatggctc atcctaactc gcctggggct cagatgggag gcagggatcc atataatcag  3000
atctcaagag tgacaacccc agatagaaat tcagaaagtg agtttgatca gagagatttt  3060
agcaatagaa attctactgg tggttctagc attacagtca ccgaaggaga tttttgcag  3120
cctgaaagaa tccataacgg gtttgtgctg aatattgtaa agaaagaaga tttggcacat  3180
cccaatagga tccatgattt ggagaattac aatagtgaag ttcctgaatg tgttcagctt  3240
gattgtcctg aaaaggacat ggatgctagc tcagaatcgg actatgctgc agaggaagac  3300
gactcccctg caacagattc cttgcataaa tcagcttcca ctcttgatca cacagatgat  3360
tctgtcgttc atgacattca ggagaagcat gtcgtggatg gttaactttg agtttcttct  3420
gcattactgt accaaaatat tgggtggagt tgattcccgg gttactgtca atcaaaggtt  3480
tccgactttc cgtcacaact ggagtatcat agacgagatt tagaatctgt ttattttta  3540
ttttaaaaat atttttgaaa aaaattttga ttttattttg attttatttt tgttttaaat  3600
taatattttt ttggtgtttt tcatattatt ttgatatgtt gatattaaaa ataaattttt  3660
aatatcaatt attcaatcag atatattttt aagtaaaaca agacagtttg aaaagtaatc  3720
ggaactttta aaaggttgct cttagtagtg aattataaaa aacaattgaa agcaatctgg  3780
cagcgtcagg ctattgctgt tgtaaactaa ttttgtgcgc atactatgca acaattgtaa  3840
tccacatgct tagatttcag ccaacgagat ggaatttgac cctc                   3884
```

```
SEQ ID NO: 167          moltype = DNA  length = 2490
FEATURE                 Location/Qualifiers
source                  1..2490
                        mol_type = other DNA
                        organism = Medicago truncatula
SEQUENCE: 167
atggatcgta taagtaatga agccactgtt gatctttttc caatcggtcc ttcaggaatt  60
cttgcccgaa caattgcatt cagagtcctt ttctgcaaat ccatttcaca tttaaggtat  120
caattattct taactttatt cgattcgttt catagattta gaaaattctg ggacccatt  180
atatcatcct tgcatccaaa aaaccctcaa gggatattag ccatcatcac cattctcgct  240
ttcttgttaa aacgttacag taatgttaaa gtaagagctg aattagcata caggagaaaa  300
ttttggagaa atatgatgag atcagctttg acttatgagg agtgggctca tgcagctaag  360
atgcttgata aagagacgac attgaagacg atgaatgaat ccgattttta cgatgtagaa  420
ttggttagga ataaggttca agagttacga catcgtagac aagaggggtc tcttagagat  480
attatctttt gtatgagagc tgatcttgtt agaaatttag gtaatatgtg taaccctcag  540
cttcataaag gtaggcttca tgtgccgaga cagattaagg agtatattga tgaggtggcg  600
atgcagttga gaatggtttg tcattctgat tccgaggagc tttctttgga agaaaagctt  660
gctttcatgc atgaaactag acacgcgttt gggaggacgg ctttgttgtt gagtggtggt  720
gcttctcttg gagcttttca tgtcggtgta gttaaaacct tggtggaaca taaacttatg  780
ccgaggataa tttctggttc gagtgtagga tccattatgt gctctattgt tgctactagg  840
tcttggcctg agcttcaaag ctttttttgaa gattcgttgc actcgttaca gttttttgat  900
caaatgggtg ggatttttac gattgtcaag agggttacaa catttggtgc agttcatgag  960
atcagacagt tgcagattat gttgaggcat ctaacgagca atcttacatt tcaagaagct  1020
tacgacatga caggtcgagt tcttgggatt acagtttgct ccccaaggaa gcatgaaccg  1080
cctagatgtc ttaactactt gacttcaccc catgttgtta tatggagtgc agtcacagct  1140
tcttgtgcct ttcctggtct ttttgaggct caggaattga tggcaaagga tagaagtgga  1200
gagattgttc cttaccatcc tccatttaat ttgggtcctg aagagggttc ctcacaagtg  1260
cggcgttgga gggatggtag cttggagatc gatctaccta tgatgcagtt gaaagaattg  1320
ttcaatgtca atcattttat tgttagtcag gccaatcctc atattgcgcc attattgaga  1380
ttaaaagaat ttgtacgagc ttatggaggt aattttgctg ccaagctggc tcatctggta  1440
gagatggagg ttaaacatcg atgtaatcaa atactggaac ttggttttcc attaggtgga  1500
cttgccaagc tgtttgctca ggactgggaa ggtgatgtga cagttgttat gcctgctact  1560
cttgctcagt actcaaaaat tatccagaac ccttcttatg tggagcttca gaaggcagct  1620
aaccaaggga gaagatgcac ttgggagaag ctttcagcca ttaaagcaaa ttgtggaatt  1680
gagcttgctc ttgatgagtg tgttgcaatt ctcaatcata tgagaagact caaaagaagt  1740
gccgagagag ctgcttctgc ttctcatggt ctttctagta ctgtcaaatt tagtgcttca  1800
aaaagaattc catcatggaa tgtcattgcg cgagagaatt ctacaggatc tcttgaagac  1860
tttcttgcag acactgctgc ttcatttcat cacggggtta gtagttccag tggagccacg  1920
ggtaaaaatt ccaagcacca ccgcagcatg catgatgtaa gtgacagtga atccgaaagt  1980
gctgaattga atacctggac cagatctggt ggtcctttga tgagaactgc ttcggcagat  2040
atgttcaccg actttgtcca aaacttagaa gttgatactg aactaaacag aggaatggga  2100
actaatttta gccctcgtga ttcccagtat cacagtccca gattaacaac accggataga  2160
tgctccgaga actcagaacc cgatcagaga gaaaatggca acaaggttgt catgaatgga  2220
tctagcataa tggtaactga aggtgatctt ttgcagcctg agagaatcca taatggaatt  2280
gtgtttaatg ttgtcaagaa agaagactta acaccttcaa gtaggagtca tgattatgat  2340
agtgaaattg ctgagtgtct ccaaattgaa tgtccaggga aggagatgga tgatgctgct  2400
agctcagctt cagaaaacgg agatgacgat tctgcaacag ctaggcccct aactgaaaca  2460
ccagactcta atcctacaga taattcctga                                    2490
```

```
SEQ ID NO: 168          moltype = DNA  length = 2783
FEATURE                 Location/Qualifiers
source                  1..2783
                        mol_type = other DNA
                        organism = Glycine max
SEQUENCE: 168
```

```
atggatcata ttagtaatga ggccagtgtt gaccgttttc caattggtcc ttctggcatt  60
cttggtagga caattgcttt cagggttctt ttttgcaagt ctatctcaca ttttaggcac  120
cacatattta ttgtgttgtt agatctcttc tataggttta gggggggttt ggcatccttt  180
atatcatggt tgcatcccag gaaccctcaa gggatattgg caatgatgac aattgttgct  240
ttcttgttga aacgatacac aaatgtgaaa tcaagggctg aaatggcata taggaggaag  300
ttttggagaa acatgatgag aagtgctttg acctatgagg agtgggctca tgcagctaag  360
atgcttgata aagagacaac aaagatgaat gaatcagacc tttatgatgt ggaattggtg  420
aggaacaagc ttcaagagct ccgccaccgt cgacaagagg gatctctcgg agatataatg  480
ttttttatgc gtgccgatct tattagaaat ttaggtaata tgtgtaaccc tgaactacac  540
aagggtaggc ttcaggtgcc taaattaatc aaggagtaca ttgatgaagt aacgactcaa  600
ttgagaatgg tctgtgattc tgattcagag gagctatcat tggaagaaaa gcttgctttc  660
atgcatgaaa ctaggcatgc atttgggagg actgctttgc tgttaagtgg gggtgcctct  720
cttggagctt ctcatgtggg tgtagttaaa acactggtag aacataaact catgcctagg  780
ataattgctg gttcaagtgt gggatccatt atgtgtgctg ttgttgccac taggacttgg  840
cctgagctcc agagcttttt tgaggattca tggcactcat tgcaattttt tgatcaaatg  900
ggtgggattt ttgcagttgt taagagagtc acaacattgg gtgctgttca tgagatcaga  960
cagttgcaaa tgatgttgag gcatctaaca agcaacctta catttcaaga agcttatgac  1020
atgacaggca gaattcttgg gattactgtt tgttccccaa ggaagcatga accgcctaga  1080
tgtcttaact acttgacttc accccatgtg gttatatgga gtgcagtaac cgcttcttgt  1140
gcctttcctg gcctttttga ggctcaagaa ttgatggcaa aggatagaag tggagagatt  1200
gttccttacc accctccttt taacttaggc cctgaagagg gctccacacc agtgcgccgt  1260
tggagggatg gtagcttgga gattgattta cctatgatgc agttgaaaga actattcaat  1320
gtcaatcatt ttatagttag tcaggccaac cctcatattg caccactatt gagattgaaa  1380
gaatttgtgc ggacttatgg gggcaacttt gctgccaagc ttgctcatct tgtggagatg  1440
gaggtgaaac ataggtgtca tcaaatactg gaacttggtt ttccattagg tggacttgct  1500
aaattgtttg ctcaagactg ggaaggtgat gtgactgttg ttattcccgc aactcttgct  1560
cagtacacca aaattataca gaacccttct tatggagagc ttcaaaaggc agccaaccaa  1620
gggagaagat gtacctggga gaaactttca gccataaaag caaattgtgg cattgagctt  1680
gctcttgatg agtgtgttgt gattctcaat catatgagaa gactaaagag aattgctgag  1740
agagctgctt ctgcctctca tggtttgtcc agcactgtca ggttcagtgc ttcaaaaaga  1800
attccttcgt ggaattgcat tgcacgagag aattcgaccg gctcccttga ggaccttact  1860
gatgttgcct cctcattgca tcaaggcatc ggcagttcca gcagagccaa tggcaaaact  1920
tggaagaccc accgtggcat acatgatgga agtgacagtg actctgaaag tgttgatttg  1980
cattcttgga caagaactgg cgggcctttg atgagaacta cttcagcaaa tatgttcgtt  2040
gattttctcc aaaacttaga ggttgatacg gatcctaata aaggcttagt gagtcacact  2100
atccataatg attttcagta tcatagcccc aggctcacaa cactagatag gaactctgat  2160
agcacagaat ctgagccaag ggaaactggc aacagggttg tcaatgtgtc cagcatactt  2220
gtgaccgaag gtgatcttct gcagcctgaa aggatccata atgggattgt gtttaatgtt  2280
gtcaagaaag aagacttgtc acccttaagt agtagcagtc atggttttga aaattacaac  2340
attgaagttg ctgaatgtgt ccaagatgag tgtccaggga aggagataga tgctgctagc  2400
tctgcatctg aacacggaga tgatgaagaa tccatgccag ccaggtcctt aactgacatg  2460
ccagattaca attccattga tcatcattcg ggcacagatt cgggtatgga tcaaagcatt  2520
gttgacagtt agtgtcaagt atcagttctt ttccagtgac attttaatat tttgttccta  2580
ttgccctcca tattgtaaat agtactcatt ctagacttgg agaggtcttt attcatgatt  2640
ttgatgggaa tagcccacca atttggtttg ctcataaatg taacaaagat aaagagtttg  2700
tatacataaa ttccacgaca acattgatat ttcttggtta ccacttctca gatgaatgaa  2760
atggagacat ggttttcata att                                           2783
```

```
SEQ ID NO: 169          moltype = DNA  length = 2724
FEATURE                 Location/Qualifiers
source                  1..2724
                        mol_type = other DNA
                        organism = Sorghum bicolor
SEQUENCE: 169
atggatgaca tcgccagcga ggcgccggtg ggggcgttcg ccatcggccc gtccacggcg  60
ctgggccgcg ccgtcgcgct ccgggtgctg ctctgcggct ccgcggcgcg cctgcggcac  120
cgcctggccg cggcgctccg cgccgcgctg cccgtcgcgg cggcgtggct gcacccgcgc  180
gacaacacgc gcgggatcct gctcgccgtc tgcgccgtcg cgctcctgct gcggggccga  240
cgcggcaggg ccgggctgcg ggcgagggtg cagtccgcct accgccgcaa gttctggcgg  300
aacatgatgc gcgccgcgct cacctacgag gagtgggcgc acgcggcgcg gatgctggag  360
cgcgaggccg ccccgcgccg cgccagcgac gccgacctct acgacgagga gctcgtccgc  420
aataagctcc gcgagctcag gcaccggcgc cacgagggat cgctcaggga catcgtcttc  480
tgcatgcgcg cggacctgct caggaacctc ggcaatatgt gcaaccccga actgcacaaa  540
gggaggctgc aggtgcctag actcataaag gaatacattg aggaagtatc tactcaactg  600
aaaatggtct gtgattctga ttcagatgag ttgcctcttg aagagaaact cgcatttatg  660
catgagacaa ggcatgcctt tggtagaaca gccttgctgc taagtggagg tgcttcattg  720
ggatcctttc atgtgggtgt tgttaaaacc ttggtagagc ataaactttt gccaaggata  780
atttcaggat caagtgttgg ctcgataatg tgttctatag tagcaacaag atcatggcct  840
gagctggaga gctttttga agagtggcat tccctgaaat tttttgatca gatgggtgga  900
atctttcctg tggttaaaag aattttgacg caaggcgctg ttcatgatat aaggcacttg  960
caggtgcttt tgagaaacct taccagcaat ttgacatttc aagaagctta tgacatgact  1020
ggtcggattc ttgttgtcac cgtgtgttct ccaaggaagc atgagccgcc tcgatgccta  1080
aactatttaa catcacctca tgttcttatc tggagtgcag taacagcttc ctgtgctttt  1140
cctggacttt ttgaggccca agaattgatg gcaaaagata gatttggtca aaccattcct  1200
ttccatgctc cattcttatt aggcatagaa gaacgaactg ttgctccaac ccgccgctgg  1260
agagatggga gcttagaaag cgatttaccc atgaagcaat tgaaggaact attcaatgtg  1320
aatcatttca tagtaagcca agccaatcct cacatagctc cgctgttgag actaaaggaa  1380
atcgtcaggg cttatggagg cagcttcgct gccaagcttg ctgaacttgc tgagatggaa  1440
gtcaaacata ggtgtaatca agttttggaa cttggatttc ctctaggagg attagctaaa  1500
```

-continued

```
ttatttgctc aagattggga aggcgatgtt acagttgtta tgccagccac tcttgcgcag  1560
tattccaaga tgatacagaa cccatcttat gctgagcttc agaaggctgc gaatcaaggt  1620
aggagatgca cttgggaaaa gctatcagcc atcagggcaa attgtgctat tgagcttgca  1680
ctggatgaat gtgttgccct cctgaaccac ttgcgtaggc taaagaggag tgcagaaaga  1740
gcatccgcat cgcaaggata tggtccagca atcaggttct gcccatctag gaggattcca  1800
tcctggaatc tcatagcaag agaaaattca actggttctc ttgaagaaga aatgcttaca  1860
tctcctcaag gacctggagg agttgctgga acatctacca gaaaccagta tcctcagaga  1920
agtgcacatg agagcagcga cagtgaatct gagagtattg atttacactc ttggacaaga  1980
agtggtggcc ctcttatgag gacaacctca gccaataaat tcatcagctt tgttcagaat  2040
cttgagatcg acacagaatc cagaacaatt ccatcgaggg aagacataac tgatcttgtg  2100
acaccaaatg ctggtacctt ggcagctcat gcagtgagta gagaagcaat cgataggagc  2160
ttggacaatt cagctttaga tatccatgat accagtaccc ctagatcgac atttggccct  2220
tcaacaagta ttgtggtttc tgaaggtgac ttgttgcagc ctgaaaagat tgaaaatggt  2280
attttgttta atgttgtaag gagggatact ctgctcgggt ctagtagtgg agttgagtct  2340
caaggatctc ctcgggaacc agatgttgaa acagtacaga cggagtgcct tgatggcgtg  2400
tctacttctg atgatgatga tgacaaggaa ctaaatgcca ttgatgatgg aggaactagt  2460
cccatgagca gaaataatct acaacatcag gggtcctcac tggaagaaaa attataccat  2520
ccctcttcct taaattctga agacgagaca aacacaaaca aaccagaagc tgcatcgatt  2580
tttgatatat gtacagatat gcatccggca tctattagcc tacctgaagg gtcttcagaa  2640
aagacagaac tggaaacaac aaagattcct gatgacaatt cagctgttat gaatgatgaa  2700
gttgcctcag gtgctggtaa ctaa                                         2724

SEQ ID NO: 170         moltype = DNA  length = 2985
FEATURE                Location/Qualifiers
source                 1..2985
                       mol_type = other DNA
                       organism = Zea mays
SEQUENCE: 170
cattctctct ctctctctcc cttttcaatt tcgggggctt tatttctctc ctcccacgcc  60
ttgcatcttc ttgatgcgtt gcgtcccgac tcgaggcaga catcggaggc gcgccactga  120
cttagctcgc gatttctaga tccgcaaccc tgcgctgctc aactccgatt cttttagttc  180
ggattcgggt agcagcaggg cttcggtggc gatgacttga ttgatacgaa ttggggattt  240
cttgctgttt gcgcctctct tcgtatcggc gctgaagggc tcagctcgag attagaacaa  300
tttgggtttt ggggtctttt cttcttctac tactgctggt caagttcaca gaaatcgctg  360
gctccgtggt ccaatggacg agtccgggga agcgagcgtc ggctccttca ggatcgggcc  420
gtcgacgctg ctgggccgcg gggtggcgtt ccgcgtgctc ctcttcagct cgctgtggcg  480
cctgcgggcg cgcgcgtacg cggccatctc gcgcgtgcgc agcgcggcgc tgccggtggc  540
ggcgtcctgg ctgcacctca ggaacagcca cggcgtcctc ctcatggccg tgctcctcgc  600
cctcttcctg aggaaactct cggccgcgcg gtcgcgggcg gcgctcgcgc gccggcgcag  660
gcagcacgag aaggccatgc tgcatgccgg gacgtacgag gtctgggcgc gcgccgccaa  720
ggtgctcgac aagatgtctg agcaggtcca cgaggcggat ttctacgacg aggagctcat  780
caggaatagg ctcgaggaac tccggagacg gagggaggac gggtcgctcc gggacgtggt  840
gttctgtatg cgcggcgatc ttgttaggaa cttggggaac atgtgcaacc ctgaacttca  900
caagggcagg ctagaggttc ctaagcttat aaaggagtac attgaagagg tttctactca  960
actaagaatg gtgtgcgaat ctgacactga cgagttgctg ttggaagaga aacttgcctt  1020
tgttcaggag accaggcatg cctttgggag gacagcgcta ctcttaagtg gggggtgcttc  1080
actcgggtct ttccatgtag gtgtagtgaa aacattggtt gagcataagc ttctgcctcg  1140
gattatagca ggatcaagcg ttggttccat catatgttcg atcgttgcta cccgtacatg  1200
gcctgagatt gagagcttct tcacagactc attacagacc ttgcagtttt tcgacaggat  1260
gggcggaatt tttgcagtga tgaggcgtgt caccacttat ggtgcactgc atgacattag  1320
ccagatgcaa aggcttttga gggatctcac aagtaactta acatttcaag aggcttatga  1380
catgaccggc cgtgttcttg ggatcaccgt ttgctctcct agaaaaaatg agccaccccg  1440
ctgcctcaac tacctgacgg caccacatgt tgttatttgg agtgcagtaa ccgcctcttg  1500
tgcatttcct gggctctttg aagctcagga actgatggca aaggataggt tcggcaacat  1560
cgttcccttc catgcaccct ttgccacaga tcctgaacaa ggtcctggag catcgaagcg  1620
caggtggaga gacgggagct tggagatgga tttacccatg atgagactta aggagttgtt  1680
taatgtaaac catttcattg tgagccaaac taaccctcac atttctccac tcctccggat  1740
gaaagagctt gttagagcct atggagggcg ctttgctgga aagcttgctc gtcttgctga  1800
aatggaggtt aagtatcgat gcaaccaaat cctagagatc ggtcttccaa tgggaggact  1860
tgcaaaattg tttgcccagg attgggaggg tgatgtgacc atggttatgc cagcaacact  1920
tgctcagtac ttgaagatca ttcagaatcc aacatacgcg gagctccaaa tggctgccaa  1980
ccaaggccgc aggtgcacat gggagaagct ctccgcaatc agagcgaact gcgccattga  2040
acttgcactt gacgaatcca tagcggttct aaaccacaaa cggaggctaa aacgaagcat  2100
ggagaggacg gcggcggctt cgcagggtca ctctaactat gtccgaccca agactccgag  2160
gaggataccg tcatggagcc gcatcagtcg agagaactct ttggagtctc tctcggaaga  2220
gatctctgcg gttgctgctt cgtccatgca gcaaggcgct gctcttgttg tcggcgcacc  2280
accaacgact ctttctcagc atgttcggcg cagttctcat gacggaagtg agagtgagtc  2340
agaaaccatt gaccttaatt cctggaccag gagtggaggg cctctaatga ggacagcgtc  2400
cgccgacagg ttcatcagtt tcatccataa cattgagatt gacacagaat taagtaggcc  2460
ctgtgctgtg gaaggtgatg ctgcaggtat tttgtcagaa tctaccttcc caaacggtcc  2520
acgaccgaac aatagctcaa gtgttagtat gccaggtaga tgcacagaaa attctgggac  2580
cgagtcgtgc aacactgtca acaccagagc ttctactccc acaagcatgg ctgttcgtga  2640
aggagatttg ctgccgcctg aaagcactac tgataatgtc ctacttaaca ttgtgaaaag  2700
agacgccctg caggatggtg taactgaatt ggcggaaagc tcctgcgctg aaggatatgc  2760
ggcaaactgt gacaccgtct cagggctaga ctgctgaagg taacaagacg ctcgctgctg  2820
acttgagcaa tcaacaatta gctgatgatt agattcttct tgattttgat gatgaaaggt  2880
catttatatg tagctcacta cagcaacgca gtgtaggaaa attgtacctg ctcgatttaa  2940
actttaaaga gcatgccatg agtagctttg ttaatgttaa tattc                  2985
```

```
SEQ ID NO: 171          moltype = DNA  length = 1998
FEATURE                 Location/Qualifiers
source                  1..1998
                        mol_type = other DNA
                        organism = Physcomitrella patens
SEQUENCE: 171
atgaattact tagacactga cgccgacgct gcgctagagc atttcggcat tggacctctg  60
actttggcgc aaagagttgt ggcctttcgc gtcctatttt gtcgttgggt gaaagagctt  120
cgtgttgccc tcgcaaagag gctgcagcgg acacggaggg tatggagaca ggtgttctat  180
atgtggtttg ggtggttgaa ccctcgaaat cccagcgtcc ttctgttagc tgccgttgta  240
gcaaccatgc tcatgagaag agcgaaggca gggtctcaga aagcagagat tgcgtacaga  300
cggaagttct ggtccaattt aatgagggca gctttgacgt atgaggaatg ggctcatgcg  360
gcgcggatgc tagagaagga gcagaatcgg aggaaagatt cagacttgta cgatgaggat  420
ttggtgcgtt cgaagctcaa cgatcttcga ttgcgtcgtt tggagggtgg tgtggaggac  480
attcttttct gcattagggc cgatttagtg cgtaatttgg gtaacatgtg caatcccgaa  540
ctgcacaaag gccggctaca aactcccccc ctcatccagg aatacatcaa cgaagtgaga  600
taccatcttc gagctgtgtg tgggagcgac tcggacagct tcacacttga cgaaaaaatt  660
gcttttattc atgaaacccg ccatggtttt ggtcgcactg cacttcttct gagtggtgga  720
gcagctcttg gagcgtttca tcttggggtt gttcgaaccc ttgtcgagca tcgtttactt  780
ccccgagtga ttgccggtgc cagtgtggga tctgtcatat gctcatttgc tgcaactcga  840
acttggacag agctccagag ctttttcgaa gacaccatgc cccccatgca ctttttcgaa  900
aacatgggga gcatttttgc tattgcgcac aggcttctga ctcgaggtgc tgtgcatgaa  960
attggtatgc tgcaaaggaa aatgagacag ctcattgggg atttgacctt tcaggaagct  1020
tacgatctat ctggccgcgt gcttggaatc tctgtatgct cacctcggag actcgagcct  1080
ccgagatgtt taaattattt aacttctccc catgtagtca tttggagcgc agtcactgca  1140
tcctgcgcat tcccaggcct ttttgaagca caggagctga tggcgaagga tcgaactggt  1200
caacttgtac cctatcattc gccacctcag gttggccccg aggacaagga catggaaaag  1260
gggattggga agcggcgatg gcgagacggc agtctggaaa gcgatttgcc aatgatgcag  1320
ttgaaggaac tgtttaatgt gaatcatttc attgtcagcc aggcgaatcc gcatattaca  1380
ccatttttga ggttcaagga ttttgttcgt gcatatggag gagatttcgc tggaaaattg  1440
gcacacttag cggagatgga ggttaagcac cggtgcaagc agatgatgga gatgggcttt  1500
gaggtgtttg gattggctaa gctcttcgca caagattggg aaggagatgt cacgattgtg  1560
atgccggcca cttttgccca gtttgccaag atcatcacga acctgacagc cacagatctt  1620
cgcaaggcag tgatgcaagg ccgacgctgc acctgggcga agctatcagc cattcaggcc  1680
aactgtggca tagaattgat gctagacgaa tgtgtctctg aattaaaccg tcgtaggaaa  1740
gccctgcgtg aaatagagcg cagcgcaatg cagagcagcc atggtgggat gcgcgggtta  1800
tcaggaacaa agcgtatccc atcctggaac atcatcgccc gagagaattc ctgcggttcg  1860
ctagatgaag agagtcttca cgaggtgcgg atcccacatg atggtagcga cagcgacgat  1920
aatctggacc aaaatcagct ttcgtggacg agagcaggtg gcccgctcat gcggaccgca  1980
tcagcagcca aattcgtg                                                1998

SEQ ID NO: 172          moltype = DNA  length = 3439
FEATURE                 Location/Qualifiers
source                  1..3439
                        mol_type = other DNA
                        organism = Hordeum vulgare
SEQUENCE: 172
gatcgcagtt agtttggctt gtacgtcgcg ttccccttcc acccttatct ccttctccgg  60
ctgaccggga cgccgcattt gtcccatcca cggcacggca cggcacgggc acgggaggga  120
gaagaagaag cccagctcga ctcctcctcc gcctcctcct ttcctctgat cccctccgtt  180
tgcccattcc ccagatccca gcacgccatg cccgggcgcg caggcgccaa gccgcaccgc  240
gcgcatttct cttccgccct gctccgatcc aaggccgcgg aggtgaccca gtgagctctc  300
ccgccacgcc cgtccgtccg ccggttcatc ggtcgcccat ggacgtcatc accaacgagg  360
cgcgcgtggg ggcgttcgcg atcggcccgt ccacggcggc gggccgggcg ctcgcgctgc  420
gcgtgctcct ctgcggctcc ctggcgcggc tgcggcaccg cctcgccgcc gcgctgcgcg  480
ccgcggcgcc cctggcggcg gcctggctgc acccgcgcca caacacgcgg gggatcctgc  540
tggccgtctg cgccgtcgcg ctcctgctgc gcggccgcgg gggccgcgcc ggggtgcgcg  600
cgcgcgtgca gtccgcctac cgccgcaagt tctggcgcaa catgatgcgc gccgcgctca  660
cctacgagga gtgggcgcac gccgcgcgga tgctcgagcg agagacgccg cgccgcgcca  720
ccgacgccga cctctacgac gaggagctcg tgcgcaacaa gctccgcgag ctcaggcacc  780
gtcgccagga gggctcgctc aggacatcgg tcttctgcat gcgcgccgac ctgctcagga  840
accttggtaa catgtgcaac ccccgagctcc acaagttgag gctgcaggtg cctaaactca  900
tcaaggaata cattgaggag gtatctactc aactgaaaat ggtttgcaat tctgattcag  960
acgagttacc tctcgaggag aaactggcat ttatgcatga gacaaggcat gcctttggta  1020
gatctgcctt actgctaagt ggaggagctt catttgggtc tttccatgta ggtgttgtga  1080
aaaccttggt agagcataag cttctaccta ggattatttc aggatcaagc gttggcgcaa  1140
taatgtgtgc tattgtcgcc acaaggtcat ggccagaact ggagagtttt tttgaggagt  1200
ggcattcctt gaaattcttt gaccaaatgg gtgggatctt tcctgtattt aaaagaattt  1260
tgacgcatgg ggctgttcat gacattaggc acttgcagac gcaattgaga aatcttacaa  1320
gcaacttaac atttcaagag gcatatgaca tgactggccg ggttctcgtt gttaccgtgt  1380
gttctccaag aaaacatgag ccacctcgat gcctgaacta tttgacgtca cctcacgttc  1440
tcatctggag tgcggtaact gcttcctgtg ctttccctgg actttttgag gcccaggagt  1500
tgatggccaa agatagattc ggagaaacag ttccttttca tgctccattc ttgttgggcg  1560
tggaggaacg agctgatgct gctacacggc gatggagaga tgggagctta gaaagtgatt  1620
tgcccatgaa gcagttgaag gaattattca acgtaaatca cttcatagta agccaagcca  1680
atcctcacat tgctccatta ctgagactaa aggagatcat cagggcttat ggaggcagct  1740
ttgctgcaaa gcttgctgaa cttgctgaga tggaagttaa gcataggttc aatcaagttc  1800
tggaacttgg atttccatta ggaggaatag ctaagttatt tgctcaacat tgggaaggtg  1860
atgtgacaat tgttatgcca gccactcttg ctcagtattc gaagatcata cagaatcctt  1920
```

```
cgtattctga gcttcagaaa gcagcaagtc agggtaggcg atgcacttgg gaaaagctct  1980
ctgccatcag ggcaaactgc gctattgagc ttgcattaga tgaatgtgtt gccctcctga  2040
accacatgcg taggctgaag agaagtgcag aaagagcagc cgcttcacaa ggatatggtg  2100
ctacaattag actctgtcca tctagaagga ttccgtcatg gaatctcata gcaagagaaa  2160
attcaactgg ttctctcgat gaggagatgc tcacatctcc cactgttaca agccatcaag  2220
cagttggagg gactgctggg ccatctaaca gaaatcacca tctccaacat agtatacatg  2280
atagcagtga cagtgaatct gagagtatag acttgaactc atggacgaga agtggtggcc  2340
ctctcatgag gacagcctcg gctaataaat tcatcagctt tgttcagaac cttgagattg  2400
acccagagtt cagaacaatt tcaccaaagg ggagtgaagg tgatattttg acaccgaata  2460
gtaacttgtt tgctggtcac ccaattggta gagagccagt tgataatcat ccaaggcctg  2520
ttactcctgg taggacctca ggcaatacag gttccgatcc tcatgatact cctgttccta  2580
ggtctccatt tggtctttcc gcgagtatca tggtccctga aggtgacttg ctgcagcctg  2640
aaaagattga gaatggtatt ttattcaatg ttgtccgaag ggatactctc ctagcgtcta  2700
ctagcggagt tgaacctcat ggatcttcac atgaggcaga tgtggaaact gtaccgaccg  2760
agtgccttta tggtgcttcg gatgacgacg acaacgtgga actgaatgcc aatgatgaag  2820
cgctatctga tcgtggagat cagagatctt cagttgcagg aaatctagat tcgtccgctt  2880
ccatggactg tcaagctgaa gcaagtacta ctcgatcaga agctccatct ctctttgata  2940
tctgtgtgga gattcctcca gcaaccatga ccacagaaaa tagtcggcct gacgagcctt  3000
cttcagacat aagactggag actgtaaaga cagaatgccc tgatgagaat tctgctgctg  3060
ggaatgctga agttgactca gttcctgcca gtaaagaatc ttcctattgg tctcagacat  3120
cagaaattgg acagcagcat caagtggata tgggatctgt gaactcctgt actgtttcat  3180
tttcagaaga tgatagacat gtgagcctta tttcgaacga gaaaccggtc actacttcca  3240
gtggcggagc tgagagtatg acatctggaa gaagtgaagc tgactagcat agaacttgcc  3300
tgttgaccga cctaatgttt ttctgtgttg ggacttggta gtttgaacaa ttcagcttga  3360
tctgatccat gctatgtgtg caatttaaac tcgtgtcacg atcaaactga attgtgtcta  3420
tatgtaggtg ttgtaatcc                                               3439

SEQ ID NO: 173          moltype = DNA  length = 3470
FEATURE                 Location/Qualifiers
source                  1..3470
                        mol_type = other DNA
                        organism = Nicotiana benthamiana
SEQUENCE: 173
gttatctgat ccaaacttct gacttttttct attttccgaa tccctatgtt ttttaataaa  60
tccatctctg ccattgcagt gatatattca tttattgtta tcaccttctt catttattgg  120
tccctctgtg ttttccatat attgaaggag aaaacattaa ctttatgcga ttttgtagtt  180
tttctggttg attcctacaa cccctttttga cattgatctt gtgggttaca aaaaacattg  240
aatctttatg tcaaaatttg atctttgtat ttcattttaa attgaaattt gatttttggg  300
ggtattaagg attcttttgt cggttgattt tgtgcctttt ttgccaagtt cttgtcggtc  360
tctgagctga atttccataa tttgacaaaa agaaaaggct aaagcagaaa ggttgggagt  420
ttctttcttt gactttcaga aactaaggta ttttctttga tctaattctt gttaatatct  480
ggttcaatct gattccgttg aatcttgtga atagcctttg tttccctatt gtcagaaaat  540
tatttccttt tcactttcct cgactctcag aagttagtac aatctttgtt ctgctaaatc  600
ttgtgaataa cctttagctt agagttttag gtatctgtat attgggttct cttaacattt  660
agcctagaag ccttctctag gattagtccc ccttttcatt gagatggata taagtaatga  720
ggctacaatt gacttctttt ccattggacc tactacgata ttgggtcgaa caatcgcctt  780
tagagtgttg ttctgtaaat caatttcaca attgaagcat cacctatttc atttcttgat  840
atattacttg tacaaattca agaatggttt gtcatactac ttgacaccct tgatctcgtg  900
gttgcaccct cgtaatccac aaggaatatt ggcattggta acgcttctcg ccttcttgtt  960
gaggcgatac acgaatgtaa aaatcaaggc tgagatggcc tataggagga agttttggag  1020
gaatatgatg agatctgcat tgacttatga ggagtgggct catgctgcca agatgctaga  1080
taaagagacc cctaaaatga atgaggcaga tctttatgat gtagaattag ttcgaaataa  1140
actccaagag cttcgacatc gtaggcaaga gggttctatg agggatatca tattctgtat  1200
gagagctgac cttgttagga atcttggtaa tatgtgtaat ccagaacttc acaagggaag  1260
gcttcatgtg cctagactga ttaaggatta tattgatgag gtttcaactc agttgagaat  1320
ggtatgcgac tctgattcgg aggagcttct cttggaagag aagcttgctt tcatgcatga  1380
aacaagacat gcctttggta ggacagcttt gcttttaagt ggaggtgctt ctttaggagc  1440
tttccatgtg ggcgtggtga aaacacttgt agaacacaaa ctgatgccac ggataattgc  1500
tggttcaagt gtcggctcga ttatgtgctc catagttgca actcgatctt ggcctgagct  1560
ccagagtttt ttcgaggact cctggcactc tttgcaattt ttcgatcagt tgggtgggat  1620
ttttactatt ttcaggaggg tcatgaccca gggtgctgta catgagatca gacagctgca  1680
ggtgctgtta cgtaatctca cgaataatct tactttccaa gaagcctatg acatgactgg  1740
tagagttctg ggattactg tttgctcgcc taggaaacat gaacctccta gatgcttgaa  1800
ctacttgact tcacctcatg ttgttatatg gagtgccgtt accgcttctt gtgcctttcc  1860
tggtctcttc gaagctcaag aacttatggc aaaggataga agtggagatc ttgttccata  1920
tcacccacca tttcatttgg gtcctgatgc cacttctagt gcatctgctc gtcgttggag  1980
ggatggtagc ttggaggttg atttgccaat gatgcagcta aaggagctct tcaatgtcaa  2040
tcactttatt gtgagccagg cgaatccgca tattgctcca ctgctgagga tcaaagagtt  2100
tgtaagagct tatggaggca actttgctgc caagcttgct caacttacgg aaatggaggt  2160
gaagcacaga tgcaatcagg tattagaact tggttttccc ttgggaggat tagcaaagct  2220
ttttgctcaa gaatgggagg gtgatgtaac tgttgtaatg cctgccactc tagctcagta  2280
ctcaaaaatc atacagaatc cctcgactct ggagctgcaa aaagcagcaa atcaaggaag  2340
aaggtgcact tgggaaaaac tctcagccat gaaagcaaac tgtggaattg agcttgcact  2400
tgatgaatgc gttgctatac tgaatcacat gcgtagactg aaaaggagtg ctgagagggc  2460
ggctgctgct tcacatggct tggcaagcac tgtcagattt aacacttcca gaagaattcc  2520
ttcttggaac tgcattgcac gagagaactc aacaggctcc cttgaagatt ttcttgcgga  2580
tgttgctgct tcacatcatc aaggaggcag tggttcgggg gcgcatgtta accgtagttg  2640
gcgaacgcac cggaatgcac atgatggtag tgacagtgag ccggaaaatg tggaccttaa  2700
ttcttggaca agatcgggtg gtcctttgat gaggacaaca tcagctgata agtttattga  2760
```

```
ctttgtccag aacttggaaa ttggttcgcg attgaacaaa ggattgacta ttgacctcaa  2820
caatattatt cctcagatgg caagcaggga ccatttctcc ccgagcccaa gggtaacaac  2880
acctgataga agttcagata cagaatttga tcaaagagat tttagttaca gggtccctgc  2940
gagtagttca agcattatgg taggcgaagg tgaccttctg cagcctgaaa ggactaacag  3000
cggtattgtc ttcaatgtgg taaggaaagg agacttgacc ccatcgaaca gaagccttga  3060
ttcagaaaat aatagttccg tgcaggatgc agttgctgag tgcgtgcaac ttgaaagtcc  3120
agaaaaggag atggatatta gctcagtatc ggaggatggt gagaatgatg ttgggcaagg  3180
aagtagggta aatgaagttg attgtagtaa aaatcgttca tcaatcggtg atggcaacga  3240
taagcaagtt attgatactt gagagtttag ctttgattat tctacacagg ccattcgaat  3300
tattttttat actcaaatgg agcttctttc agagctaaca cactcagaat tggggttgta  3360
aatagtgcaa gtagcaaatc tgtaataaat gtttagtgta gtcatcaccc ttctactagt  3420
tcaaagtggc tcagttcaat tcaaattcag aacttcgata attcatgttt             3470
```

```
SEQ ID NO: 174         moltype = DNA  length = 713
FEATURE                Location/Qualifiers
source                 1..713
                       mol_type = other DNA
                       organism = Nicotiana benthamiana
SEQUENCE: 174
tgtatgagag ctgaccttgt taggaatctt ggtaatatgt gtaatccaga acttcacaag  60
ggaaggcttc atgtgcctag actgattaag gattatattg atgaggtttc aactcagttg  120
agaatggtat gcgactctga ttcggaggag cttctcttgg aagagaagct tgctttcatg  180
catgaaacaa gacatgcctt tggtaggaca gctttgcttt taagtggagg tgcttcttta  240
ggagctttcc atgtgggcgt ggtgaaaaca cttgtagaac acaaactgat gccacggata  300
attgctggtt caagtgtcgg ctcgattatg tgctccatag ttgcaactcg atcttggcct  360
gagctccaga gttttttcga ggactcctgg cactctttgc aatttttcga tcagttgggt  420
gggatttttta ctattttcag gagggtcatg acccagggtg ctgtacatga gatcagacag  480
ctgcaggtgc tgttacgtaa tctcacgaat aatcttactt tccaagaagc ctatgacatg  540
actggtagag ttctggggat tactgtttgc tcgcctagga aacatgaacc tcctagatgc  600
ttgaactact tgacttcacc tcatgttgtt atatggagtg ccgttaccgc ttcttgtgcc  660
tttcctggtc tcttcgaagc tcaagaactt atggcaaagg atagaagtgg aga         713
```

```
SEQ ID NO: 175         moltype = DNA  length = 1500
FEATURE                Location/Qualifiers
source                 1..1500
                       mol_type = other DNA
                       organism = Arabidopsis thaliana
SEQUENCE: 175
cgaaaaaaga agtagaatat atatatatat atatatatat atatatatat atatatattc  60
gtgtggacat cataaatgcc taaatgataa tagttgattt cgagttttat tttcgttact  120
tccaatcaaa ttctccttgc accatattta tttttttact gtgagaacat atataagtat  180
atattggaat tacgtatccg agaggttttt gcatatttcg tttatttatt ttcgatatcc  240
acactactgt attattaaaa atttgaaaaa ttcaactagg gcttttcatc ttctctagaa  300
ttattcgttt atttatgtcg atgtccacac tattattaaa ataaaacgag aggatatggt  360
tggatcatcc aagtttcgtt tatgactctt tgttcattta caaacgttta gttttccact  420
taagttttga aaagagttaa tttccaatat attcggcaca gtttttcaag tgtattcatc  480
tgtttttttt ttttttggtt ggctatatgg tccaaatttt gatttgcaat atgagattgc  540
acagagagaa caatctttca ttatgattaa ttattgtaca agtaacaaac accaatctcc  600
gatatacttt ggctctttag cacattgtta tgctagaagt tagcggaaat ctatatgttg  660
ttaaacgcag cgtttaaatt gaacagtgta atttaccttg aaattttaag actacatgct  720
gtttagaatt tcagatgaaa acatcttgat gttttagaaa tccacgtggg aatagcgtaa  780
aatcttatcc aacgaactta ttttggtttt gttgtatttg tgcaagtcgt cacgctaatc  840
gaaaaaagaa aagaaaaaaa gaagccgtca tgatcggcca tttctcggcc gagtctgagt  900
ctgactctgc gtccgtgtca ccattatcag atcgagcctg tcttatctcg ttgcgattcc  960
ctatgcaaaa atcttcttct tttttttatt cccccattta tctctgatct cttctctctt  1020
ctcaagtaaa cctctctgct tcacgtctct tcttttcttg tcgattttcc ccagataatc  1080
aggtaaataa ggctactttc ttatttgatc tggtggtctt tgtgttgaaa tctctgggtt  1140
ttctctgttg atttcaaagt tctctctttt tttttttgtt tactgggtgc tgtgaaaaat  1200
gatcttgtca aagtctcctc ttttcatcga attgaaactc taattagaaa aaagatcata  1260
acttttatta aaaaaatgag tttgctttgc ttaattttgc gaattgcttc atagattcat  1320
tgattagcct atttggggta acaaaaaaaa gctgacacgg tttcagattc caaaaataga  1380
tcatgactct gtttcttctc tgcagaggtt ttaataaata tatgcttctt ctcatgagtt  1440
ctcgtttttt ttgtcacctt cgcagttgaa aacacaccca aattcatctt cgaatcaata  1500
```

```
SEQ ID NO: 176         moltype = DNA  length = 2871
FEATURE                Location/Qualifiers
misc_feature           1..2871
                       note = Nucleotide sequence of the complement of the
                        pSSU-Oleosin gene inthe T-DNA of pJP3502.In order
                        (complementary sequences):Glycine max Lectin terminator
                        348nt, 3' exon 255nt, UBQ10 intron304nt, 5' exon 213nt,
                        SSU promoter
source                 1..2871
                       mol_type = other DNA
                       organism = synthetic construct
SEQUENCE: 176
ggcccctaga atctaattat tctattcaga ctaaattagt ataagtattt ttttaatcaa  60
taaataataa ttaataattt attagtagga gtgattgaat ttataatata tttttttttaa  120
tcatttaaag aatcttatat ctttaaattg acaagagttt taaatgggga gagtgttatc  180
```

```
atatcacaag taggattaat gtgttatagt ttcacatgca ttacgataag ttgtgaaaga  240
taacattatt atatataaca atgacaatca ctagcgatcg agtagtgaga gtcgtcttat  300
tacactttct tccttcgatc tgtcacatgg cggcggcccg cggccgcttc attactcgag  360
ccaggaggat ggatcgatgc tggtctgaga ccctgctacc ggttgctgac tgaactgctc  420
ggcacggtcc ttcatttcac gggccttgct cgccaacttt gtcttggccg actccaactg  480
atccgctccg ggtggatgtt tccccgtcag gtaacggtag atccaggaca gcacagacag  540
agcggcaaca ccaaatcccc cgcttgccag aaaacccgct cccaacagga agatggtgat  600
gactgcagat cagaaaaact cagattaatc gacaaattcg atcgcacaaa ctagaaacta  660
acaccagatc tagatagaaa tcacaaatcg aagagtaatt attcgacaaa actcaaatta  720
tttgaacaaa tcggatgata tctatgaaac cctaatcgag aattaagatg atatctaacg  780
atcaaaccca gaaaatcgtc ttcgatctaa gattaacaga atctaaacca aagaacatat  840
acgaaattgg gatcgaacga aaacaaaatc gaagattttg agagaataag gaacacagaa  900
atttacctgc agggaccagt acaggcgaga agatcaccag gagaggtgtg gcgattgtca  960
gcgcaatgac cgttccagcc agggtcaacc cggataacac caacaggcta cctccggcag  1020
taaccgcggt cgctgccttt acaacacgct gagcacgcgg ttgcagttgc aagtgggggg  1080
cacgtgtttg ttgctgctgc ccgtagtgct ctgccatggt ttttttaac ggagcaagcg  1140
gccgctgttc ttctttactc tttgtgtgac tgaggtttgg tctagtgctt tggtcatcta  1200
tatataatga taacaacaat gagaacaagc tttggagtga tcggagggtc taggatacat  1260
gagattcaag tggactagga tctacaccgt tggattttga gtgtggatat gtgtgaggtt  1320
aattttactt ggtaacggcc acaaaggcct aaggagaggt gttgagaccc ttatcggctt  1380
gaaccgctgg aataatgcca cgtggaagat aattccatga atcttatcgt tatctatgag  1440
tgaaattgtg tgatggtgga gtggtgcttg ctcattttac ttgcctggtg gacttggccc  1500
tttccttatg gggaatttat attttactta ctatagagct ttcatacctt tttttacct  1560
tggatttagt taatatataa tggtatgatt catgaataaa aatgggaaat ttttgaattt  1620
gtactgctaa atgcataaga ttaggtgaaa ctgtggaata tatattttttt tcatttaaaa  1680
gcaaaatttg cctttttacta gaattataaa tatagaaaaa tatataacat tcaaataaaa  1740
atgaaaataa gaactttcaa aaaacagaac tatgtttaat gtgtaaagat tagtcgcaca  1800
tcaagtcatc tgttacaata tgttacaaca agtcataagc ccaacaaagt tagcacgtct  1860
aaataaacta aagagtccac gaaaatatta caaatcataa gcccaacaaa gttattgatc  1920
aaaaaaaaaa aacgcccaac aaagctaaac aaagtccaaa aaaaacttct caagtctcca  1980
tcttccttta tgaacattga aaactataca caaaacaagt cagataaatc tctttctggg  2040
cctgtcttcc caacctccta catcacttcc ctatcggatt gaatgtttta cttgtacctt  2100
ttccgttgca atgatattga tagtatgttt gtgaaaacta atagggttaa caatcgaagt  2160
catggaatat ggatttggtc caagattttc cgagagcttt ctagtagaaa gcccatcacc  2220
agaaatttac tagtaaaata aatcaccaat taggtttctt attatgtgcc aaattcaata  2280
taattataga ggatatttca aatgaaaacg tatgaatgtt attagtaaat ggtcaggtaa  2340
gacattaaaa aaatcctacg tcagatattc aactttaaaa attcgatcag tgtggaattg  2400
tacaaaaatt tgggatctac tatatatata taatgcttta caacacttgg attttttttt  2460
ggaggctgga atttttaatc tacatatttg ttttggccat gcaccaactc attgtttagt  2520
gtaatacttt gattttgtca aatatatgtg ttcgtgtata tttgtataag aatttctttg  2580
accatataca cacacacata tatatatata tatatatatt atatatcatg cacttttaat  2640
tgaaaaaata atatatatat atatagtgca ttttttctaa caaccatata tgttgcgatt  2700
gatctgcaaa aatactgcta gagtaatgaa aaatataatc tattgctgaa attatctcag  2760
atgttaagat tttcttaaag taaattcttt caaattttag ctaaaagtct tgtaataact  2820
aaagaataat acacaatctc gaccacggaa aaaaaacaca taataaattt g          2871

SEQ ID NO: 177          moltype = DNA  length = 1578
FEATURE                 Location/Qualifiers
source                  1..1578
                        mol_type = other DNA
                        organism = Arabidopsis thaliana
SEQUENCE: 177
gtcacacaca cataaacact ccacacgctc tgcttcgtcc aatcaccaaa cacgctttaa  60
tgactctcac gttttcctcc tccgccgcaa ccgttgccgt tgctgctgca accgtaacct  120
cctccgctag ggttccggtt tatccactcg cttcgtcgac tcttcgtgga ttagtatctt  180
tcagattaac cgcgaagaag ctgtttctgc cgcctcttcg ttctcgcggc ggcgttagtg  240
tgagagccat gtctgagctt gttcaggata aagaatcgtc cgtcgcggcg agcattgctt  300
tcaatgaagc cgccggtgag acgccgagtg agcttagtca ttcccgtact ttcttggatg  360
cgcgaagtga acaagatctt ttatctggta tcaagaagga agctgaagct ggaaggttgc  420
cagcaaatgt tgcagcagga atggaagaat tgtattggaa ctacaaaaat gcagttttaa  480
gtagtggagc ttccagggca gatgaaactg ttgtatcaaa catgtctgtt gcttttgatc  540
gcatgcttct tggtgtggag gatccttata cttttaatcc atatcataaa gcagtcagag  600
aaccatttga ctactacatg tttgtccata catacatccg tcctcttatt gatttcaaaa  660
attcgtacgt tggaaatgct tctatattct ctgagctgga agacaagatt cgacagggac  720
acaatatcgt gttgatatca aaccatcaaa gtgaagctga tccggctgtc atttctctat  780
tgcttgaagc acaatctcct ttcataggag agaacattaa atgtgtggct ggtgatcgag  840
tcatcactga tcctctttgt aagccgttca gtatgggaag gaacctcata tgtgtttact  900
cgaaaaagca catgaatgat gatcctgagc ttgttgacat gaaaagaaaa gcaaacacac  960
gaagcttaaa ggagatggct acaatgctaa ggtctggcgg tcaacttata tggattgcac  1020
caagcggtgg aagggaccgc ccgaatcctt ctactgggga atggtttcct gcaccctttg  1080
atgcttcttc ggtagacaac atgagaagac tggttgaaca ttctggcgct cctggacata  1140
tatatccaat gtctttgctt tgctatgaca tcatgccccc tccaccccag gttgagaaag  1200
aaatcggaga gaaaagatta gttgggtttc acggtactgg actatcaatt gctcctgaaa  1260
tcaacttctc agacgtcaca gcagactgcg agagccctaa tgaggcgaaa gaagcataca  1320
gccaagcttt gtacaagtcg gtgaatgaac aatacgagat cttaaactct gcgattaaac  1380
acagaagagg agtagaagca tcaacttcaa gggtctcttt gtcacaacct tggaattagt  1440
ctctcgtttt agggtaacac tttcaaaact cataaatctt ctgtctcaga agttttgttg  1500
caactgtata tatattgaga gagagagcat tgttctttca tttgcaggat acacaaacac  1560
aatcaatgga aaatactc                                              1578
```

```
SEQ ID NO: 178          moltype = AA  length = 459
FEATURE                 Location/Qualifiers
source                  1..459
                        mol_type = protein
                        organism = Arabidopsis thaliana
SEQUENCE: 178
MTLTFSSSAA TVAVAAATVT SSARVPVYPL ASSTLRGLVS FRLTAKKLFL PPLRSRGGVS  60
VRAMSELVQD KESSVAASIA FNEAAGETPS ELSHSRTFLD ARSEQDLLSG IKKEAEAGRL  120
PANVAAGMEE LYWNYKNAVL SSGASRADET VVSNMSVAFD RMLLGVEDPY TFNPYHKAVR  180
EPFDYYMFVH TYIRPLIDFK NSYVGNASIF SELEDKIRQG HNIVLISNHQ SEADPAVISL  240
LLEAQSPFIG ENIKCVAGDR VITDPLCKPF SMGRNLICVY SKKHMNDDPE LVDMKRKANT  300
RSLKEMATML RSGGQLIWIA PSGGRDRPNP STGEWFPAPF DASSVDNMRR LVEHSGAPGH  360
IYPMSLLCYD IMPPPPQVEK EIGEKRLVGF HGTGLSIAPE INFSDVTADC ESPNEAKEAY  420
SQALYKSVNE QYEILNSAIK HRRGVEASTS RVSLSQPWN                        459

SEQ ID NO: 179          moltype = DNA  length = 2455
FEATURE                 Location/Qualifiers
misc_feature            1..2455
                        note = Populus trichocarpa
source                  1..2455
                        mol_type = other DNA
                        organism = synthetic construct
SEQUENCE: 179
agtgcgggtg attgggtgag gagtgaagac gctgatttta gaggttttga gagagtggca  60
gtctgcagag aataggaatc cgaccatatc ctccaaaacc cgcgctggac tcagtcaccg  120
ccaatcatca atcagccacc catcaacacc aaaaatcccc gtccttttga tttccaccac  180
ataaaaatag cacactgctc ctccttcact ccattcctat cttaataata ataataataa  240
taaagctcaa ctcttctctt ctaagtcaag acatgatcct ttccattcct gctccttcgt  300
cggcattctt cacaactact aaaccgtctc caccttttcc tagggtttct aaactctgct  360
tcttaacccc ctcatattct ctttcccttc gttttagatc cactgctcga cgctccactt  420
cttttccttg tgtcctctct tctctcaacc ttcacgcaat ggctgaactc gttcaggata  480
aagaagtctt cgcttctgct gaagttgatt acagcaagaa gaaaaacagg actcgttctc  540
gctcgtttct tgatgcaaca actgaacaag agttactgtc gggaatcagg aaggaatcag  600
aagcaggaaa acttccttca aatgttgctg caggaatgaa agatctgtat cagaactaca  660
aaaccgcagt tttgcaaagt ggaattccca acgcacatga gattgtattg gaaaatatgg  720
ctgctgcatt ggatcttata ttctttgatg ttgaggaccc gtttatcttc tcaccttatc  780
acaaagcttt gagaaagcca tatgactact ttgaatttgg tcaaaagtat atccgtccat  840
tgattgattt tagaaattca tatgtaggca atgtttccat tttcaatgaa attcaagaga  900
agcttcggca gggtcacaat attgtcttga tatcaaacca ccaaactgaa gcagatccag  960
ctgtcattgc actgttgctt gaaacatcaa gccctcacat tgctgaaaac ttgatctatg  1020
ttgctgggga tagagttgtc acagatcctc tttgcaagcc attcagcatg ggaaggaatc  1080
ttatatgtgt atactcaaaa aagcacatga atgatgaccc tgaacattca gaggagaaga  1140
gaaaagcaaa tatccgaagt ttgaaagaga tggctttgct tttaaggggt ggctcacaaa  1200
tagtctggat tgcaccaagt ggtggcaggg accgtccaga tcccttgtca ggagagtggt  1260
atccggcaca ctttgatgct tcttcagtag acaacatgag aaggcttgct gaacattctg  1320
gagctccagg acatgtttat cctctggcac tattatgcca tgacatcatg ccccctccgc  1380
ctcaggtgga aaaggaaatt ggagagagaa gagttatttc atttcatgga gttggattat  1440
cagttgcacc agaaatcagc ttctctgaag ttacagcggc atatgaaaat cctgaagagg  1500
ctaaggaggt atatacagag gctctgtata agtctgtgac tgagcaatac aatgtgctta  1560
aatctgctgt acatggaaaa caagggctag gggcgtccat tccaactgtt tctttgtcac  1620
agccatggaa ttagtcaacc ttttctatac ttgattaggc caatagtttt gttatatagt  1680
tctgcaactc ctggaccaca attctagcgg tccttctagt caagtatgtg ccaggagaag  1740
cttctctctc catgatgata tggatggctt tttctggaga tgcaatctaa gctacaagtt  1800
tttgctgtgc ttacattcta tcaaagccaa atctcacaca atatcttgaa gccaaattca  1860
tctgaaacgc gagctgttcc agaggttcaa tttcaggtgt gcagataaca gttcctagta  1920
aacacaagag ctagtcgtct gaggcgatat acatgtatat tttctcaatt ttttggtggc  1980
cgatcatatt ctttttacac caattgctca attgctactc atttttctcc ctcgttcacc  2040
ttcaataact agaagtttc atgctataac acttgcacac agaagtacta tgaacagagt  2100
tggagcacat tttgcctctt gactaaacaa gacttgtttt tagctgccac accaaacttt  2160
ttatatgatg caattatggt agtcgttttc tcttgttttg gtcaaaaccc aaaccagcta  2220
tagttgctac agccaatcga gagtggtgca tgtttgtttg tttttttttt tttttttgtc  2280
ctcagttata gtaaccatgt tcaactgaac tatgcatctc ttaggacacc acctcttaag  2340
ccccgtgatc taaccgtgtt ttcgaatttt tttttttttt ttgggctttt ggtttattta  2400
aacgcagcag ctttgaccca agttaaaaca aaaaaatcta ttaaaaaaat tgtag       2455

SEQ ID NO: 180          moltype = DNA  length = 1389
FEATURE                 Location/Qualifiers
misc_feature            1..1389
                        note = Jatropha curcas
source                  1..1389
                        mol_type = other DNA
                        organism = synthetic construct
SEQUENCE: 180
atgacacttt ctgcttttcc ttccacattc ctctttagaa tacaatcgcc atcaacgcct  60
agggtttcca tttccctccc ttccttatct tcaaagctct gtttggttcc tccctctttt  120
tctcctcctt cgcttgctct taaatcgagt gcgcgaagga ccatttgtcc ttgcttgctc  180
tcttctctca acgccaacgt ggctcacctt ctcaaggagg aaaaagaagt tgtggcttcg  240
gcttccggct gcgagaagga ggaggaaaag aagatggaac agcctagtca ctcccgcact  300
```

```
ttcctgcatg ccagaacgga acaagatttg ctgtctggaa ttagaaaaga agcagaagca  360
gggaggttgc cttcaaatgt tgcagcaggg atggaagaat tgtatcagaa ttatagaaat  420
gcagtgatac aaagtggaac ccccaatgca gaagagatca tactgtcaaa tatggccgtt  480
gctttggatc gtataagctt ggatgttgag gacccttttg tcttctcaca ttatcacaga  540
gcattgagag agccgtttga ctactataac ttcggtcaaa attatattcg tcctttggtt  600
gattttagaa attcttatgt tggcaatatt tccctttttcc atgaagtgga agagaagctt  660
cagcagggtc ataatattgt cttgatgtca aatcaccaaa ctgaagcaga cccggctata  720
attgcattgc tgcttgagaa aacaaagccc tatattgctg agaatttgat ctatatagca  780
ggtggtagag tcataacaga tcctctttgc aagccattca gcatgggaag gaatcttata  840
tgcgtgtact caaaaaaaca catgaatgat gttcctgagc ttactgagat gaagaaaaga  900
gcaaacatac ggagtttgaa ggagatggcc attccattaa ggggtgggtc acgaatagtg  960
tggattgccc caagtggtgg tagggaccgc ccagatcatc tgactggaga atggtatcca  1020
gcaccatttg atgcttcttc agtggataac atgagaaggc ttgctgaaca ttctggtgct  1080
cctgggcata tttatccatt ggcattatta tgccatgaca taatgccccc tccccttcag  1140
gtgcaaaagg aaattggaga gaaacgagtg atctcctttc atggggttgg attatcaatt  1200
gcaccgggaa tcagcttctc tgaaattgcg ggtagttgtg aaaatcctga agaggcaaag  1260
aacatttatt cacaacttct gtatgattca gtgactgcgc aatacaacgt gcttaaatct  1320
gccataaatg gcaaacgagg gctagaggct tcaattccaa ctgtctcttt gtcacaacca  1380
tggaattaa                                                          1389

SEQ ID NO: 181          moltype = DNA  length = 1368
FEATURE                 Location/Qualifiers
source                  1..1368
                        mol_type = other DNA
                        organism = Ricinus communis
SEQUENCE: 181
atgattcttt ccattctttc ccctacacta ccatcgccta gggtttgtat ttccatttct  60
tctgtatctt caaagctctc tctagtccct gtctcttctt tttctcttcc tcctcctttg  120
gccatagtaa gatggtcatc aaggtcctcc atttgtcctt gtttcttctc ttcttctctc  180
aacgccaatc cagtccccga actcctcaac gatgataaga agaagaacaa caacaacaac  240
aagagcaaga agggaaagtg tactcctcac tcccgcactt ttcttgatgc aagaactgaa  300
caagagttgc tgtatggaat taggaaggaa gcagatgcag ggaggttgcc tttaaacatt  360
gcagcaggga tggaagaagt ttatcggaat tatagaaatg cagttttgca aagtggaatt  420
ccaaatgcaa aagaaatcat actgtcaaat atggctgttg cgttagatcg tatgtgcttg  480
gatgttgagg accctttttgt cttctcacct tatcataaag cactaagaga accattcgat  540
tactataatt ttggtcaaaa ttatatccgt cctctgattg attttaggaa ttcatatgtt  600
ggcaacattt cgcttttcca tgaagttgag cagaagcttc agcagggtca caatattatt  660
ttgatgtcaa accaccagac tgaagcagat ccagctgtca ttgcattgtt gcttgaaaaa  720
acaaatccct acattgctga gaatttgatc tacgttgcag gtgatagagt tgtaacagat  780
actctatgca agccattcag catgggaagg aatcttatat gtgtgtactc gaaaaaacac  840
atggctgatg ttcctgagct tactgagatg aagaaaaaag caaacattcg cagtttaaag  900
gagatggtca tgattttaag ggatgggtct caaattgttt ggattgctcc aagtggtggc  960
agggaccgcc cagattcttt gactggagaa tggtgtccag caccctttga tgcttcttca  1020
gtggataaca tgagaaggat tactgaacat tctggcgctc caggacatat ttttccatta  1080
gcgttgttat gccacgatat catgcccccct ccacctgagg tacaaaagga aattggagaa  1140
agaagaatga tctcctttca tggagctgga ttatctattg cacccgaaat cagcttctct  1200
gaaattgctg ttgcttgcga agatcatgaa gaggctaaga acgcatatgc acaggtttta  1260
tatgattctg tgactgagca atacaatgtg cttaaatctg ccatacatgg aaaacaagga  1320
ctagaggcat caacttctac cgtctcattg tcgcaaccat gggattag             1368

SEQ ID NO: 182          moltype = DNA  length = 1344
FEATURE                 Location/Qualifiers
source                  1..1344
                        mol_type = other DNA
                        organism = Helianthus annuus
SEQUENCE: 182
atgtcgattc tcccgtcttc ttctcctact ctcttcttct ccaccgcaaa ccctagggtt  60
tctgtttctc tttcacttac ttctacagtt tctacatctt catccgtgcg cagtcgctcg  120
attttccggc attttccgta cctagcgttt tctagggcag cgaatgccgc cgcggagacg  180
tttgaaggca agaagtggtc gtcgtcctcc gctacacaac cgatctccgg atccgagctc  240
ggttactcgc atacattcat cgatgctctg tctgaacaag atcttctttc tgtaattcaa  300
agagaggtag aagctggagc actgccaaaa catatcgctc actcaatgga ggaactctat  360
cagaactaca aaaatgcggt tttccaaagt ggtaatccct gtgcagaaga tactgtattg  420
tcaaacatgc gtgtagcatt tgatcgaatg ttcttggatg tgaaggagcc tttcgaattt  480
tcaccgtatc atgaagctat tcgagagcct tttaattact atatgtttgg tcaaaattat  540
attcgtcctc tgatcaattt cagggaatca tatgttggca acgtctctct tttcagtgaa  600
atggaagaac aactgaagca gggtgaaaat gtaattttga tctcaaacca ccaatccgaa  660
gcagatccag ctgtcattgc cttgttgctt gaaacaacaa atccttatat ttccgagaac  720
ataatctatg tggcagggga cagagttata acggatcctc tttgtaagcc tttcagcatg  780
ggaaggaact tgctgtgcgt atattcaaaa aaacatatga acgatgttcc tgagcttgct  840
gatatgaaaa ggagagcaaa tacaagaagt ttaaaagaga tggctttgct tttgaggggt  900
ggatcaaaaa taatatggat tgcaccaagt ggtggaaggg acaggcctga tcccgtcaca  960
aatcaatggt ttccagcacc attcgatgcc agttctctgg acaacatgag aaggcttgtg  1020
gaccatgctg gtgtggtggg tcatatatat cctttagcca tactatgcca tgacatcatg  1080
ccccctcctc ctcaggttga gaaagaaatt ggagagaaaa ggttgatatc ttttcatggc  1140
actggaatat cagttgcacc tgaagttgat ttccaaaacg ccactgcttc ttgtggatcc  1200
cccgaggagg ccaaggcagt ttattcacag gcactttatg attcagtgtg cgagcaatac  1260
aacgtgctac aatccgccat aaatggagca aaaggcttag aagcatcaac atcaagtgtc  1320
tcattgtcgc aacctgttga ctag                                        1344
```

```
SEQ ID NO: 183          moltype = DNA  length = 1374
FEATURE                 Location/Qualifiers
source                  1..1374
                        mol_type = other DNA
                        organism = Medicago truncatula
SEQUENCE: 183
atgtttacaa caccattttc ttctccttca accgcatttt tctctccacc taaagcctca  60
tattcttctt cttcttcttc ttcttcttct tcttcttcgt tacctcttcg tagttctttc  120
actttttatc atcttcgatt taatgcaaca acttcttctt cttctgtaac aacttctgga  180
acttcttctt cttcatattg ttctcctctt gctttcaatt ctaataataa aaaacctaaa  240
gaaatttctg ctaatatggc ggcttcttct gtttcttctc gcactttcct caatgccaga  300
aatgaacaag atgttctttc tggaattaag aaggaagtag aagccggaac tttgcccccc  360
actattgctg aagggatgga agaattgtac cttaactata aaagtgcagt tgttaaaagt  420
ggagatccca aagcagatga gattgtattg tcaaatatga ctgctttatt agatcgcata  480
tttttggatg tgaaggagcc ttttgtcttt gaagcacacc ataaagcaaa gagagagcct  540
tttgactact acatgtttgg ccaaaattat attcgtccct tagttgattt caacacttct  600
tacgttggca acatgcccct tttcatacaa atggaagagc aacttaagca gggacacaat  660
attatcttga tgtcaaacca ccaaagtgaa gctgatccag ctattattgc attgctgctt  720
gaaatgcgac ttccacatat tgctgaaaac ttgatttatg tggcaggaga tagagttata  780
accgatcctc tatgcaagcc cttcagtatt ggcaggaatc tgatctgtgt ttattcaaaa  840
aagcacatgc ttgatgatcc agcacttgta gagacgaaaa gaaaagcaaa tacacgaagt  900
ctgaaggaaa tggccacgct tttaaggagt ggatcacaaa taatttggat tgccccaagc  960
ggtggtaggg atcgaccagt tgccaactct ggggaatggg caccggcacc ctttgattct  1020
tcttcagtgg acaatatgcg aaggcttgtc gatcattcag gtccaccagg tcatatctat  1080
cctatggcaa tactgtgcca tgacataatg ccccctccac taaaggttga aaaagaaatt  1140
ggggagaaaa gaattatatc atatcatggg actggcatat cacttgctcc agaaataagc  1200
ttttccgaca tcactgcttc ttgtgaaaat cctgaaaagg ctaaagaagc atactcgaaa  1260
gccttgtatg attctgtgac tagtcaatat gatgtgctgg agtctgccat acacggcaaa  1320
aaaggattag aagcatcaac tcccgcagtt tccttgtcgc agccatggaa gtag        1374

SEQ ID NO: 184          moltype = DNA  length = 1967
FEATURE                 Location/Qualifiers
source                  1..1967
                        mol_type = other DNA
                        organism = Glycine max
SEQUENCE: 184
ggctgagact gaggagcgga tcctatctct ctttcacaca ctctccttct ctttcgtatg  60
aagaatgagc acgaccggtt cttcggctta ccactgtgtg gcacacctcc caaataataa  120
gactatgttt atgctctcta cgccgccaac aaccacattc ttcgctacgc ctagggttct  180
tccgtttctc tcttcaaaac tttcttcttc ttcttcttct tctactgcgt cgtcctcgcc  240
ttgttgctcc tccatcactc ccaaggttaa atccaaagat aacaacaatt gctacctcgt  300
ctccgctaaa cattctcccg ctaacatgtc cgcttcggtt tcgtcacgca ccttcctcaa  360
cgctcggaac gaacaagagc ttctagctgg aatcaggaaa gaagtagaag ctggatctct  420
gcctgctaat gttgctgcag gaatggaaga agtgtacaat aactataaaa gtgcagttat  480
ccaaagtgga gatcccaagt caaaggagat tgtattgtcg aatatgattg ctttattgga  540
tcgcatattc ttggatgtga cggatccttt tgtctttcaa ccacaccaca aagcaaagag  600
agagcctttt gactactacg tgtttggtca gaattatatc cgtcctttag ttgatttcaa  660
aaattcttat gttggcaaca tgccccttt cattgaaatg gaagagaaac ttaagcaggg  720
acacaacatc atcttgatgt caaatcacca aactgaagct gatccagcca tcattgcttt  780
gctgctcgaa acacgactcc catatattgc tgaaaacatg acctatgtag caggagatag  840
agttataact gatcctctgt ccaaaccatt cagtattggc aggaatctca tttgtgttta  900
ctctaaaaag cacatgcttg atgatccagc tcttgtagag atgaaaagaa atgcaaatat  960
acgagctctg aaggaaatgg ctatgctttt aaggagtgga tcacaaatag tctggattgc  1020
cccaagtggt ggaagggatc gcccagatcc ccacaccgga gaatgggcac cggcacccttt  1080
tgatacttct tcggtagata atatgagaag acttgttgaa cattctggtc caccgggcca  1140
tgtatatcct ttggcgatat tgtgccatga tataatgccc cctccactaa aggttgagaa  1200
agaaattggg gagaaaagaa ttatatcctt tcatgggact ggcatatcag tggctccagc  1260
attaagcttt tctgaaacta ctgctactag tgaaaatcct gaaaaggcta aggaggtatt  1320
cacaaaagcc ctgtatgatt ctgtgacgga gcaatataat gtgctgaaat ctgcaataca  1380
tggcaaaaaa ggatttgaag catcaactcc agtagtttct ttgtcacagt catggaagta  1440
gatgaaatct gcatttcttc attgcaattt gctctgatgc agaagcaagt tacaagactt  1500
cagtcaaaca atttcaactg attcacttct gagggactgc ctattactac accggtcacc  1560
gaatgattta gcttgttgga agtttgcagt caaatacata tttttcattt catttttcct  1620
tttgctcttg gttgccgtta tcagcattca attcatctgg aatctgtttc agttcagaag  1680
gttcaaattc tgctgcttac tgtacaggtc tctcttagtt cggtgtcaga tttggttcgt  1740
tgactgataa aatactaaat tttttaccta caattttgtg atcaggctta gctagctgaa  1800
tagataaaat ataattggtt ccatttgtat tttaagtcaa ctttgttcca ttatagatga  1860
atagatgtta gtattacatg ttcagacggg gtcagtgaat aaactggtcc aaatgctaat  1920
gcaaaattat tcatattggt aaaataaaag ctctacagtt accgtta               1967

SEQ ID NO: 185          moltype = DNA  length = 1674
FEATURE                 Location/Qualifiers
source                  1..1674
                        mol_type = other DNA
                        organism = Carthamus tinctorius
SEQUENCE: 185
tctctctctc tcacacacaa cacacaaaac acacactact gctactttct ctctctacta  60
cactctcctc tcgctatgtc gatcttcttc tctccttcct cccctactct cttcttctcc  120
```

```
accacaaacg caaatcctag ggtttctcct tcatcttcac cttcttctgc cttcactcct  180
cctctgtctt cttctcgcct ccgcccgatt ctccgggggt ttccgtgcct cgcgttctct  240
gcgccggcga atgccgccca tggcacggcg gagaccgtcc acggcaataa gtggccgtca  300
ccgtcgtcct cctcctctgc tgctacgcaa ccgtccgctg gatccgacca cggtcactct  360
cgtacattca tcgatgctcg ttccgaacaa gatcttcttt ctggaattca aagagagttg  420
gaagctggaa cactgccaaa acatattgct caagcaatgg aggagctata tcagaactac  480
aaaaatgcag ttctccaaag tgcggctcct catgcagaag atattgtgtt gtcaaacatg  540
cgtgtagcgt ttgatcgtat gttcttggat gtgaaggagc cgtttgaatt ttcaccatat  600
catgaagcta ttttggaacc ttttaactac tatatgtttg gtcaaaatta tattcggcct  660
ttggtcaatt tcagggaatc atacgttggc aatgtctccg ttttcggtgt aatggaagag  720
cagcttaagc agggtgacaa ggtggttttg atctcaaacc atcaaacaga agcagatcca  780
gctgttattg ccttgatgct tgaaacaaca aacccccata tttctgagaa cataatctac  840
gtggcagggg atagagtaat aacagatcct ctttgcaagc ctttcagcat gggaaggaat  900
ctgttgtgcg tgtattcaaa aaagcatatg aatgatgttc ctgagcttgc tgagatgaaa  960
aaaagatcaa atacaagaag tttaaaaggg aggatggctt tgcttttgag gggcggatct  1020
aaaataatat ggattgcgcc aagtggtggc agggacaggc cagatcctat cacaaatcag  1080
tggtttccgg caccgtttga tgccacttcg cttgacaaca tgagaaggct cgtggaccat  1140
gctggtttgg tgggtcacat atatccttta gccatattgt gccatgacat catgcccccct  1200
cctcttcagg ttgagaaaga aattggagag aagagttgga tctcttttca tggcaccgga  1260
atatcagtgg caccggaaat taatttccaa gaagttactg cctcttgtgg gtcccccgag  1320
gaggcgaagg cagcttattc acaggcactc tatgattccg tgtgtgaaca atacaaggtg  1380
ctacattctg cggtacatgg aggaaaaggg ttagaagcat caacaccaag tgtctcgttg  1440
tcacaaccct tgcagtttct cgattagtct cttggtttag aggaggtgaa agcatattct  1500
tttgtttaga tgacataggt gtatagatga taccgaagaa tagatgtaca aacaagtgat  1560
agaaagatgt atgtctaatc aaaaaatgtt ttctgcatct tgtaaaggga tcttcaaaac  1620
agacctttta ttttagctgc agcaaccaat atatcaaaac aggtttttct tttt        1674

SEQ ID NO: 186         moltype = DNA  length = 1893
FEATURE                Location/Qualifiers
source                 1..1893
                       mol_type = other DNA
                       organism = Solanum tuberosum
SEQUENCE: 186
cgcacatatt catttcactc actttctttc ccgacccttt ctctctctaa agctctccag  60
tctgtggtga tgttgatcct ctcagcggct tcgtcttctt cttcctcctt catgctttct  120
tccgcttcgt cttcttctgc acgcattccg aggcagttat cttcattttc aacttgtgtt  180
ccagtagtag taacaactgt ttcttctgca gcaacttcga ctctatttcc gatttcctgc  240
ttcggtgtga aatcgaggac tgttgggatt cggaagctgc ggtgtgccgt tttttgtgct  300
tcgaaggtac gtggaatggc agaaatgatt gaagatgcca tgacggtttc tgcttctgag  360
agccatgagc ttccgcagtc ccgagacttc cttgacgcac gcactggaga agacttgcta  420
tctgctgttc aaaaagctgt ggaagatgaa aaactgccgc ttaatgttgc tgaaggaatg  480
gaggatttgt atcagaacta tcggaatgca gttttacaaa gtggagtccc caaagcagat  540
gaggccactt tgtataacat ggctcttgta tttgatcgtg tttttgtgga tgtgaaggat  600
ccttttgaat tctcgccata tcataaggcc attcgtgaac cttttgacta ttacaagttt  660
ggtcaaaatt atatccgcca gctagttgat ttcaggagtt cttatgttgg gaatatctca  720
gttttcggtg aaatggcaga gaagcttaaa cagggtgata atgttgtctt gatgtcaaac  780
catcaaagtg aagccgatcc tgcgattatt gcactcttga ttgaatcaaa gctcccagat  840
attgctgaga acattattta tgttgctgga gatagagtta ttactgatcc tctttgcaag  900
ccattcagca tgggaaggaa tctcctgtgt gtttattcga aaaaacatat gaatgatgac  960
cccgaacttg ctgagatgaa aaagagagca aacacaagaa gcttgaagga gatggctttg  1020
ctattgaggg gtggatcaaa aataatatgg attgctccta gtggtggaag agataggcca  1080
gaccctgtta caaacgaatg gtatccagca ccatttgatg cttccgcgac agacaacatg  1140
aggaggcttg tacaacatgc tggtgtccct ggtcacattt atcctctagc aattttgtgc  1200
catgatatta tgcccccctcc cgcccaggtt gagaaaaata tcggggagaa aagagttgta  1260
tcttttcatg gagctggcat atctgtggca cccaaaattg attttcatga ggttgctggt  1320
gctttggagg accctgaggc taagatggta tatacaaagg cactttatga ctctgtaagc  1380
cagcagtaca atgtgctaaa ttctgctata catggcaaac aaggactgaa ggcatcaata  1440
cctagtgttt cattatcaca accatggcag tagcttctct tccaacttta tttttcatat  1500
cttgttgctg tagtcagttt tgcagatgtt tgtttggcag ttacaatcaa atcacaagga  1560
ttacactcac aatctttcca cataccacgc ttgcatgtgg ttagtctatg cagaaagttg  1620
atacaaacaa agtaattctc gaagttacag caaacataac ctgaaggaat ttttttggca  1680
gggttagata attcttttga cacgaatgta cagttgcttt acattgtatt tataccaaat  1740
gttagatcca aatttgttag taatgatagc tttcaagtac tcaattctga ctttttaagg  1800
tcaagtgtta gtagctatcc tagattgctg ctcatcttgc ctttgaagtg gtaatccaat  1860
ttgttgagaa atataataaa tgatgctctg cta                              1893

SEQ ID NO: 187         moltype = DNA  length = 2016
FEATURE                Location/Qualifiers
source                 1..2016
                       mol_type = other DNA
                       organism = Oryza sativa
SEQUENCE: 187
gggctggaga tggagatgga gatggagatg gagggtgggt ttggcacaaa tcccgaagcg  60
ctccggcgac cactcccaac ccagtcccca ctagggtaac aaccccccttt cggattaggt  120
ttctagaagc ttcttctatg caggcgccgc cgctcgcctc ctcgccgtcg ccggcgtgga  180
ccgccatcct gcccgcgccg gcgaggctct gctgctcccg ccgcggcgcc ctccgcctcg  240
aagccaaggc cgcctggagg ccggcggccc gagggccgcg ggtgccggcc aagggcgccg  300
tcctcgcctc cgaggtggtg ggcccctctc ccctcctcga cgcgcgcaac gagcaagagc  360
tcattttgca tatcagaaag gaagtggaga aagggaagct gcctgcagat gtcgctgcca  420
```

```
atctagaaga gctatactac aactacaagg acgcggttat gcagagcagg gatccaaatg  480
cacacgacat cgtgctttca aacatggtgg ccctgttcga ttgtgttctg ctcgatgtag  540
agaatccgtt tacctttccg ccttatcaca aagctgtcag ggaaccattc gactattaca  600
tgtttggtca gaactacatt aggccccttg tagactatag aaattcatat gttggtaata  660
tatccatttt ccaagacatg gaacagaagc tccaacaggg ccataatgtt gttctgatgt  720
ctaaccatca gacagaagca gatccagcaa tcattgcttt gctgcttgaa agaagcaacc  780
catggatcag cgaaaacata gtttatgttg ctggtgatag ggttgttaca gatcctctct  840
gcaagccatt tagtatggga agaaacctca tttgtgtgta ctcaaaaaag catatgaatg  900
attttcctga gctagttgat atgaagagga gggcaaatac tcgtagtctg aaggaaatgg  960
ctttactttt acgtggcggt tcacagataa tttggatagc accaagtggt ggtagagatc  1020
gtccggatcc tttgacagga gaatggcatc cggcaccatt tgatgcatct gcagtggaca  1080
acatgaggag gcttctggag cattctggtg ttcctgggca catatatcca ctctcactgc  1140
tctgctatga ggttatgcct ccaccacaga aggttgagaa agagattggt gagcaaaggg  1200
ttatatcctt ccatggtgta ggcttgtcag taactgaaga gataaagtac agcgacatta  1260
cggttcatac ccaaaatgtc gacgagtgca gagagaaatt ctcagagtca ttgtacaact  1320
cagtcgttga tcagtataat gcgctcaaat ctgctatctt tagaggtcga ggagcagatt  1380
catcggacag tgccatctca ctctcacaac catggcgatg aaactccgct ttctcagttt  1440
tgttctgtct ggatttctca atgaagttac cttcatttct tttcgacaca gcagatgaac  1500
tgctgccgac attgcaattt ttcctggcag aacctttttaa acttcggtat cctaacccat  1560
actaatcatg aaggggaggc tgttactgtc atgcaaatct tgcctagtat gatgatttta  1620
cccagctgaa tcccagccac acatgatgcg ttcgttcatt gtttgcacac aaatattatt  1680
gcgtcatatg agtattcttt gggtcagaac tgcacagcaa cgcggcctgg gcactcaatc  1740
tggcatgttg tctatggggt gcatgcttgt taacagaaga agcccaacat gtgggatttt  1800
gtttttgcg gttaattttt ttcctgtttt ccttttgttc catgtatata tattcgattt  1860
tgatctccag gtttggagat acaatggtca aagtgttatg atagtctctt agtttgttgc  1920
ctcgaagtta tactcgggcg caacatgtct gactgatatt ctgatgatgt tactcgtttc  1980
tgaacttcct gacgccaata tggtgcttgg atgttg                            2016

SEQ ID NO: 188         moltype = DNA  length = 1888
FEATURE                Location/Qualifiers
source                 1..1888
                       mol_type = other DNA
                       organism = Sorghum bicolor
SEQUENCE: 188
atgcacgcgc cgccgctggt cgcgttcgca gggggcgcct gccccgccac cgccgcctcg  60
tcctcgccgt cgccctggct ggcctcgccg cgggccgcca tcctcgccgc gccggcgagg  120
ctcctacggt cccgccgcgg ggcacttcgg ctggaagcca aggccgcgtg gagggctgcc  180
ggagggggac ggggcccgag ggtcccggcc aagggcgctg tgctcgcctc ctatatgggc  240
gccgaggagg tggtgggacc ttcgtcgctg ctcgacgagg aagagctcat ttcacatatc  300
agaaaggaac tggataatgg aaaactccct gcagatgttg ccagtaatct ggaggagttg  360
tattataatt acaggaatgc tgttctgcaa aatggagatc ctaatgcata tgagatcatg  420
ctttcaaata tgacggcttt gtttgatcgt gttctactgg atgtacagaa tccatttacc  480
tttccacctt atcacaaagc tgtgcgagaa ccgttcgact attacatgtt tggtcagaac  540
tacattaggc ctctggtaga tttcaggaac tcctatgttg gcaacatttc actttttcat  600
gacatggaag agaagctgca ccagggccac aatgttgttt tgatgtctaa ccatcagaca  660
gaagcagatc cagcaattat ctccttgctt cttgaaaaaa ccaatccatg gattagtgaa  720
aacatagttt atgttgctgg agataggttt gttatggatc cactttgcaa gccatttagc  780
atgggaagaa atctcatttg cgtgtactcg aaaaagcata tgaatgattt tcctgagcta  840
gttgagatga agaggagatc aaataccga agtctcaagg aaatggcctt gcttttacgt  900
ggtggctcac agttaatttg gattgcacca agtggtggta gagaccgccc aaatccttca  960
acaggagaat ggtacccggc gccattcgat tcatctgcag tggacaatat gaggaggctt  1020
ctggagcatg ctggcgttcc tgggcacata tatccactat cattgctgtg ctatgaggtt  1080
atgcctccac cacaacaggt tgagaaagag attggtgagc agagggtgat atccttccat  1140
ggagtaggct tgtcagtaac tgaagaaata aaatatgggg atattactgc tcataccaag  1200
aatgctgatg agggaaggga gctattcaca aatactttgt acaactcagt tgttaatcag  1260
tacgatgtgc tcaaatctgc tatctttaga gatcgtggag cagctgtatc aaacaatgtc  1320
atctcattgt cacaaccatg gagatgaatg ttagctttct cagtttgggt ccagatttat  1380
tactgaagtt accttttcag aagagcaggt gaactgccat tgtgcaattt cactggagaa  1440
actcttgaac tttaatcttt ttgataccac tcgactttat cagtcatggt ggagcctgtc  1500
attgtcatgc agatccttgc taagaagtct gtggacaact gttggttggt caagggtgac  1560
tggtgattct gcacataggg atcctcgtaa ctgttgcatg cggtcgtccg caaattactg  1620
gttgctcagc aacgtgctgg ttgggcactg aggaatccgt caggttgcat cctttttgcc  1680
ttgacgtcaa tttgtgtagt tgaaggttga agtgataaat tgttttatct tgtcttgtca  1740
tcatgtatat aggctcgagt ctttttggc tccacatttt tttggagata taaaagcagc  1800
aggagttatg acatgccctc agtcggccct ccttgttgaa accctttgga tgtaacctgt  1860
ctatttctta tatatactca ctgaaagt                                    1888

SEQ ID NO: 189         moltype = DNA  length = 2046
FEATURE                Location/Qualifiers
source                 1..2046
                       mol_type = other DNA
                       organism = Zea mays
SEQUENCE: 189
gaggattcat ctcgtgtcga cgacgccttc gccctctccg agtctccgtc cgtcttccgc  60
gtcctccgca gctggactcg tgcgctattc cccaggacgc tactcccact agggttttcg  120
gattaggttt ctagaacctt ccaccgccgc ctctccatgc acgcgccgcc gctggtcacg  180
ttcgcagggg gcgcctgccc caccaccgcc tccgcttcgc cgtcgccctg gttggcctcg  240
ccgcgggacg ccatctttgc cgcgccggcg aggcccctac ggtcccgccg cgggacactc  300
cggctggaag ctaaggccgc gtggagggct gccggagggg gacggggccc gcgggtcccg  360
```

```
gccaagggcg ctgtgctcgc ctcctatatg ggcgccgagg aggtggtggg accatcgtcg  420
ctgcttgacg aggaagagtt catttctcac atcagaaagg aactggataa tggaaaactt  480
cctgcagatg ttgccagtaa cctggaggag ctgtattata attacaggaa tgcggttctg  540
caaaatggag atccaaatgc atatgaggtc atgctttcaa atatgatgac cttgtttgat  600
cgtgttctac tggatgtaca gaatccattt aactttccac cttatcataa agctttgcga  660
gaaccgttcg actattacat gtttggtcag aactacatta ggcctctggt agatttcagg  720
aactcctatg ttggcaacat ttccctttc catgatatcg aagagaatct ccaccagggc  780
cacaatgttg ttttgatgtc taaccatcag tcagaagcag atccagcaat tattgccttg  840
cttcttgaaa aaaccaatcc ttggattagt gaaaacatag tttatgttgc tggcgatagg  900
gttgttaccg atccgctttg caagccattt agcatgggaa gaaatctcat ttgcgtgtac  960
tcgaaaaagc atatgaatga tttccctgag ctaattgaga tgaagaggag atcaaatact  1020
cgaagtctca aggaaatggc attgctttta cgtggtggtt cacagttaat ttggattgca  1080
ccgagtggtg gtagagaccg cccaaatccc tcatcaggag aatggtaccc ggcaccattc  1140
gattcatctg cagtggacaa tatgaggagg cttctggagc atgctggtgt tcctgggcac  1200
atatatccac tatcattgct gtgctatgag gttatgcctc caccacaaca ggttgagaag  1260
gagattggtg agcagagggt gatatccttc catggagcag gcttgtcagt aactgaagaa  1320
ataaactatg gagacattac tgctcatacc aagaatgctg atgagggaag ggagctattc  1380
acaaatacct tgtacaactc agttgttaac cagtacaatg tgctcaaatc tgctatcttt  1440
agagatcgtg gagcagctgt atcaaacaat gtcatctcac tgtcacaacc atggcgatga  1500
atgtccagtt tcgttactga agttaccttt tcaaaagagc aggtgaacta tcattgtgca  1560
attttgctgg gagaaactct tgaacttaaa tctttttgat atcactagac ttcatcaatc  1620
atggtggagc ctgttattgt catgcagatg ctcgctaaga agtctgcaac tgttggttgg  1680
tcaagggtga ttggcgattt tgcacatacg gatccgcagt tactgctgcc tcaggttgct  1740
cagcaatgtg ctgctggttg ggcaccgagg aatccatcag gttgcatcct ttttgcccgg  1800
acgtcgattt gtgcagttga agtggtaaac gtttttttat cttgtttcgt catcatgtat  1860
atacgtaggc ttgagtcatt gttggctcca catttttgg agatataaat gcggtaggag  1920
ttatgagatg tccacagtcg gccctccctt gttgaattcc tttggatgta tcctctctct  1980
ttcgtacatg cactcactga aagtcaatgc aaatatctcg tgtttctagt aaaaaaaaaa  2040
aaaaaa                                                              2046

SEQ ID NO: 190         moltype = DNA  length = 1994
FEATURE                Location/Qualifiers
source                 1..1994
                       mol_type = other DNA
                       organism = Hordeum vulgare
SEQUENCE: 190
gagaaaccaa gaagcgagaa tcggcaccgt tcccgtcgcc gcctcgtcgc ctccgtcgcc  60
cgtcttcctt ttccgccgat tcgtgcccac caccaccact ctccttccca ctggctaggg  120
ttttcggttt ctagaacctc acgcccgccc gctccatgca agccccgccg ctcgccgcgc  180
tcgccggagg cgcctgggcc tctcaccgac ctgccatact agcggcgccg gcgggcctcc  240
gccgtcccag gcgctgcgcc ctccggctgc ccgcgtggag ggcggccgga ggcggccggg  300
ccccgcggct accggtcaag ggcgccgtgc tcgcctccga cacgggggcg gacgaggagg  360
tcgcggggcc atcgcccctg ctcgacgtgc gcagcgagca agagttcgtt ctacgcgtca  420
ggaaggaagt ggagagaggg aagttgcgtc cagatgttgc tgacaacttt gaaaacctgt  480
actgcaatta caagaatgcg gtgctacaaa atggggatcc aaatgcatat cagatcatgc  540
tttccaacat gatggattta tttgaccgcg ttctgctaga tgcagagaat ccatttacgt  600
ttcagcctta tcacaaggcc atcagagaac cgtttgacta ttacactttc ggtcagaact  660
acattaggcc actggtagat tttaggaact cttatgtcgg taacatttct gtattcagtg  720
atatggagaa gcagctccgg cagggtcata atgttgttct gatgtctaat catcagacag  780
aagcggatcc agcagttatt gccttgtcac ttgaaagaag caatccgtgg attagcgaga  840
acatagttta tgttgctggg gatagggttc ttacagatcc tctttgcaag ccatttagca  900
tgggaagaaa cctcctttgt gtgtactcaa aaaagcatat gaatgatttt cctgagctaa  960
ttgagatgaa gaggagggca aacactcgaa gtctcaagga aatggctttg cttttacgtg  1020
gggttcaca tataatttgg atagctccga gtggcggtag agaccgtcct gacccttga  1080
ctggagaatg gcacccggcg ccatttgatg catctgcagt ggataatatg aggaggcttc  1140
tggagcattc tggcgttcct gggcacatat atccattatc attgctatgc tatgagatta  1200
tgcctccacc acaacagatt gagaaagaga ttggtgagca aagggtgata tccttccatg  1260
gtgtaggctt gtcagtagct gaagaaataa agtatgggga tgttactgct caatctcaga  1320
atgctgatga ggcaaggggg aacttctcag aggctctgta cagttcagtt gttgatcaat  1380
ataatgtcct caagtctgct atctttagag accgtggagc agtttcgtcg aaccctgcca  1440
tctcactctc gcaaccatgg cggtgaaact aagctttctc aggcctggat ttctcatttc  1500
ttttcgacag agcagatgaa ctgctatagt gcaacgttgt ggtttttgc tgggatggcc  1560
ttaaactttg atgtcgtcac agttaggatg aggccctgca gatcctgtaa gttgttgaag  1620
tcgcgggaag gaaaaaccgt gtgatatgct gctacaccgt gttcatgtag tgacaggaag  1680
tctgcggctg ttgtcaggtc taaatcctaa atagcacggc ggaacccagc agcagatgat  1740
gcatgtgttc atcttttgtg aacagctact gctgtatcag atggctatca tctgggccag  1800
attggtccag caaatacaga ttggccccctg gatcctggca gtcgtctgga tcaaaatgct  1860
gatatttctt tttgtgctcg tcttattttt ttgattagtt ttgtgtacat attaattctt  1920
ttgctccaaa atttggagac acatgacatg atatatacag agcagagccc aatatgtgtc  1980
gccttcctgt taac                                                     1994

SEQ ID NO: 191         moltype = DNA  length = 1936
FEATURE                Location/Qualifiers
source                 1..1936
                       mol_type = other DNA
                       organism = Physcomitrella patens
SEQUENCE: 191
ggacgagcgg agtggagagc tatggcggca gcagctggtt ccgctggcgt ggtatgttgg  60
tctagggcag agaagcagca tgccccggtc aggggggggtg gaactagtgt taccagtagt  120
```

```
accagtggca gcggccatgc gtcgttgaaa gggagcttcg atcggctcca aggtaaccgc  180
cttctgccgc aagccttgac tatgccgtcg ctgtttcggg cgaaacgcaa tggcagaagg  240
acgccgggga atgccgtgac caatttcggg aaatctgaat tccatcgtga aattagtggg  300
agtacgcggg cgaccacgca ggtggctgaa gccaccacag ctggtcttag ggagaccatt  360
gaggaccgcg ctattatcga cggtcattct cacagttttg aaggaattca atcggaagaa  420
gagttgatgc aggtaattga aaaggaggtg gaatccggtc ggctgccgaa gcgtgctggc  480
gcgggaatgg tagagttgta tcgcaattat cgagatgctg tagtgagcag tggcgtagaa  540
aatgcgatgg atattgttgt gaaagtcatg tcaactgtgt tggaccggat tcttctgcag  600
ttcgaggagc cattcacatt tggatcgcac cacaagagaa tggtggagcc gtatgattac  660
tacacatttg gtcagaacta tgtgcgtcct ctcctagatt tcaggaactc ttaccttggg  720
aacttaaaga tctttgacca gatagagaag aacctgaaag aggggcacaa cgtcattttt  780
ctatccaatc accagactga ggcagatcct gctgttatgg cgctgttgct tgagcactct  840
cacccctatt tggcagagaa cttgacctat gtggctggag acagggttgt gctggatcca  900
ttctgcaaac cttttagtat gggcaggaat ctcttgtgcg tgtattcaaa aaagcacatt  960
cacgatgtac cggaccttgc tgaaatgaaa atcaaagcta atgcgaagac tttgagacag  1020
atgacgatcc tgctgaggca gggaggtcaa ttattatggg tagcacccag tggtggacgc  1080
gatcgccctg atcctgagac caacgaatgg gttcctgcac attttgactc gtctgctgtg  1140
gagaatatga agcgactatc tgacattgtc cgagtacctg ctcatttaca tgccctatca  1200
ttactatgtt ttgagattat gccacctcct gtccaggtac aaaaggagct aggagagcga  1260
agagcagtag gatttagcgg agttggtcta gccgtttccg agcaactaga ttatgattcc  1320
attgcgaagt tagtcgacga ttccaaaaat gcgaaggatg ccttttcgga tgcggcatgg  1380
agcgaagtca atgatatgta taacgtgtta aaagaagcaa tttatggtga ccaaggttgt  1440
gctgttagca cagattcctt gagactggaa cagccctggt ttgatggaag caggcgaact  1500
gattgaaaat aggtcatttg aagttttatg taaaagtatg aagcatcctt attgcttttt  1560
acgctgtcta agctccaagg atgtaagaat tcagcagcgt gtataatggc tacattgtca  1620
tgtgatattc tttctgattc gtgcgacacg atggccatgc ctgctcaatc cttgtcacca  1680
ggcgtctcag taggaaacgg tggtactgat tgctgtctgt ccgacttgat ttagtagctc  1740
ggattctgcg tactggataa cttggtctgg taatagggac cgatcctatc ggtgaggagt  1800
ttgtgatata gatcaatact gcactttgtt acaatcggaa tagatgcatt cattattcat  1860
ccaagccaac acatcctgag ttggagcata agttgaagca ctcctcaact tcattgaaag  1920
gagatttctc actacg                                                  1936

SEQ ID NO: 192         moltype = DNA  length = 2260
FEATURE                Location/Qualifiers
source                 1..2260
                       mol_type = other DNA
                       organism = Chlamydomonas reinhardtii
SEQUENCE: 192
gaagaatgct gcacgcgact cagcagcgcg cggtcgctgg ccgtcgcccg ttctcgggtg  60
cgcgcgcgtc gaaccgcgtt gttgctcacg cggctgcgac cgtcgccacc agtctgccga  120
ccgttgacgt ccagttccac cagcctaagc tggcgggcgt gaccaacgag cagcagttca  180
aggcggtaat caaggggctg gtcgctcagg gcaagttccc tccgcagctg gagcccgctt  240
gggattactt ctatgacaac tacaagaagg ctgtcaccag cagtggcgtc gctggggccg  300
atgagaagct tgtcacccag gtgcaagcca gcattctgga caatgtcctg aaccaggcgg  360
tgaaccccta caccttcccc tctttccaca cccgcctaat tgagccctac aactactatg  420
acttcggtca gcgctacgtc gcgaccctca tcgacttcca gaactccgtg ctgggtttcc  480
gcgagcgttt cgaccgcgtt caggagctgc tggaccagaa gcacaacgtt gttatcctcg  540
cgaaccacca gacggaggcc gaccccggtg tgtttgccca tatgctggcg aagacgcacc  600
ctaagctggc gacggatgtg atctacgtcg ctggcgaccg cgttgtcacc gatccgatgt  660
gcaagccctt ctccatgggc cgcaacctct tctgcgtgca ctccaagaag cacatggacg  720
acgctccgga gctgaaggcc gcaaagatgg agaccaaccg caagacgctg gtcgccatgc  780
aacgcaagct gaacgagggc ggcacgctca tgtggatcgc ccccagcggc ggccgcgacc  840
gccccaacgc caacgacgag tgggtgcccg ataactttga tcccgccgcc gtggagctga  900
tgcgcaacct ggtgcagcgc gccaagcagc cgggccacct gatgcccatg tccatgttca  960
gctaccccat gatgccgccg cccaagaccg tggacaagtc cattggcgag cgccgcctca  1020
cggccttcac gggcgtgggc atctccctgt gcgaggagct ggacgtggcg gccatcatcg  1080
cggccagcgg ctcggaggag aaggagcaga aggctctggc caaggccgcg cacgacgcgg  1140
tgaaggagtc gtacgcggtg ctgtccaagg ccatccagga tcccgccttc cgcgccaccc  1200
gcaaggagtt cacacagccc tggatggcgt aaggaggcgg gagcagcagc ggcagtggcg  1260
gcagcgacag cagtggcgga tcttgggggc acgaggcagc agctagcaca cgcggggccg  1320
gtggcggcag cggacgggag aggtgctggt gcggatgctg gtgccaggag cagtgcgtct  1380
atgcctggcg gcggcgccga ccggtgctga agctgttgtc ggcagcagca gcgggaactt  1440
gcgctggcga tggctgaagg tgatgtggct ggccgtacag caaatgctgc tgtcacgcat  1500
tgtcagcggc ggccgctggg tccgctggga tgtgaggagt gcgagatcag cataggccag  1560
gcgggtgggt tgcggtgccg ctgccgacac gtcgcacagg aaggagcagg aagggtgcgg  1620
ctgagcacca gggtcacttg gggcctgtgt tagcgtgacc gggcctgaaa ggggtatttg  1680
tctggggagc agctcgacgc acattcgtgg gattgcttag gaaggagcgt tgggatggct  1740
gtgccgcgcg gtgtgcccag cacgttgact ggctctgacc cgggtcaacc aatgcgttgc  1800
ggccgttgca acgatgcttc taatcagcgt gagatggagt gtacgaatgc aggtatgacg  1860
atgaccatag acgagtgtga gcgtgtgtat ctgtggattg gacacggttc attcaatcca  1920
ttcgtaccgg acatatgact atacaagacc gtgtggagtg tgtttgtgcg ctcaagactg  1980
gacgaagtgg gcgctcccga tgtggagcgc ggtgctcgcg ggttgtgtgt cttgccgcaa  2040
cgcaagcagc gtggcgtggt gtggatgatt cttgcattat gactggggtt ttaccggcgg  2100
cccagagcgt gtgtggagca aaagcaaaaa caggaacaag gagccgtgtg cacaattcgc  2160
gcggatggtg gtggctgggg atctgacagg agagtgccaa cggcggccgg gtgctagtgc  2220
ttgaacatca tgtgatattg tgattgtaca aatggactgc                        2260

SEQ ID NO: 193         moltype = AA  length = 382
FEATURE                Location/Qualifiers
```

```
source                1..382
                      mol_type = protein
                      organism = Cinnamomum camphora
SEQUENCE: 193
MATTSLASAF CSMKAVMLAR DGRGMKPRSS DLQLRAGNAQ TSLKMINGTK FSYTESLKKL  60
PDWSMLFAVI TTIFSAAEKQ WTNLEWKPKP NPPQLLDDHF GPHGLVFRRT FAIRSYEVGP  120
DRSTSIVAVM NHLQEAALNH AKSVGILGDG FGTTLEMSKR DLIWVVKRTH VAVERYPAWG  180
DTVEVECWVG ASGNNGRRHD FLVRDCKTGE ILTRCTSLSV MMNTRTRRLS KIPEEVRGEI  240
GPAFIDNVAV KDEEIKKPQK LNDSTADYIQ GGLTPRWNDL DINQHVNNIK YVDWILETVP  300
DSIFESHHIS SFTIEYRREC TMDSVLQSLT TVSGGSSEAG LVCEHLLQLE GGSEVLRAKT  360
EWRPKLTDSF RGISVIPAES SV                                          382

SEQ ID NO: 194        moltype = AA  length = 417
FEATURE               Location/Qualifiers
source                1..417
                      mol_type = protein
                      organism = Cocos nucifera
SEQUENCE: 194
MVASVAASAF FPTPSFSSTA SAKASKTIGE GSESLDVRGI VAKPTSSSAA MQGKVKAQAV  60
PKINGTKVGL KTESQKAEED AAPSSAPRTF YNQLPDWSVL LAAVTTIFLA AEKQWTLLDW  120
KPRRPDMLTD AFSLGKIVQD GLIFRQNFSI RSYEIGADRT ASIETLMNHL QETALNHVRN  180
AGLLGDGFGA TPEMSKRNLI WVVTKMQVLV EHYPSWGDVV EVDTWVGASG KNGMRRDWHV  240
RDYRTGQTIL RATSVWVMMN KHTRKLSKMP EEVRAEIGPY FVEHAAIVDE DSRKLPKLDD  300
DTADYIKWGL TPRWSDLDVN QHVNNVKYIG WILESAPISI LENHELASMT LEYRRECGRD  360
SVLQSLTAIS NDCTGGLPEA SIECQHLLQL ECGAEIVRGR TQWRPRRASG PTSAGSA     417

SEQ ID NO: 195        moltype = AA  length = 423
FEATURE               Location/Qualifiers
source                1..423
                      mol_type = protein
                      organism = Cocos nucifera
SEQUENCE: 195
MVASIAASAF FPTPSSSSSA ASAKASKTIG EGPGSLDVRG IVAKPTSSSA AMQEKVKVQP  60
VPKINGAKVG LKVETQKADE ESSPSSAPRT FYNQLPDWSV LLAAVTTIFL AAEKQWTLLD  120
WKPRRPDMLA DAFGLGKIVQ DGLVFKQNFS IRSYEIGADR TASIETLMNH LQETALNHVK  180
SAGLMGDGFG ATPEMSKRNL IWVVTKMRVL IERYPSWGDV VEVDTWVGPT GKNGMRRDWH  240
VRDHRSGQTI LRATSVWVMM NKNTRKLSKV PEEVRAEIGP YFVERAAIVD EDSRKLPKLD  300
EDTTDYIKKG LTPRWGDLDV NQHVNNVKYI GWILESAPIS ILENHELASM SLEYRRECGR  360
DSVLQSLTAV SNDLTDGLVE SGIECQHLLQ LECGTELVKG RTEWRPKHSP ALGNMGPTPG  420
GSA                                                               423

SEQ ID NO: 196        moltype = AA  length = 414
FEATURE               Location/Qualifiers
source                1..414
                      mol_type = protein
                      organism = Cocos nucifera
SEQUENCE: 196
MVASVAASSS FFPVPSSSSS ASAKASRGIP DGLDVRGIVA KPASSSGWMQ AKASARAIPK  60
IDDTKVGLRT DVEEDAASTA RRTSYNQLPD WSMLLAAIRT IFSAAEKQWT LLDSKKRGAD  120
AVADASGVGK MVKNGLVYRQ NFSIRSYEIG VDKRASVEAL MNHFQETSLN HCKCIGLMHG  180
GFGCTPEMTR RNLIWVVAKM LVHVERYPWW GDVVQINTWI SSSGKNGMGR DWHVHDCQTG  240
LPIMRGTSVW VMMDKHTRRL SKLPEEVRAE ITPFFSERDA VLDDNGRKLP KFDDDSAAHV  300
RRGLTPRWHD FDVNQHVNNV KYVGWILESV PVWMLDGYEV ATMSLEYRRE CRMDSVVQSL  360
TAVSSDHADG SPIVCQHLLR LEDGTEIVRG QTEWRPKQQA RDLGNMGLHP TESK        414

SEQ ID NO: 197        moltype = AA  length = 419
FEATURE               Location/Qualifiers
source                1..419
                      mol_type = protein
                      organism = Cuphea lanceolata
SEQUENCE: 197
MVAAAATSAF FPVPAPGTSP KPGKSGNWPS SLSPTFKPKS IPNAGFQVKA NASAHPKANG  60
SAVNLKSGSL NTQEDTSSSP PPRAFLNQLP DWSMLLTAIT TVFVAAEKQW TMLDRKSKRP  120
DMLVDSVGLK SIVRDGLVSR QSFLIRSYEI GADRTASIET LMNHLQETSI NHCKSLGLLN  180
DGFGRTPGMC KNDLIWVLTK MQIMVNRYPT WGDTVEINTW FSQSGKIGMA SDWLISDCNT  240
GEILIRATSV WAMMNQKTRR FSRLPYEVRQ ELTPHFVDSP HVIEDNDQKL HKFDVKTGDS  300
IRKGLTPRWN DLDVNQHVSN VKYIGWILES MPIEVLETQE LCSLTVEYRR ECGMDSVLES  360
VTAVDPSENG GRSQYKHLLR LEDGTDIVKS RTEWRPKNAG TNGAISTSTA KTSNGNSAS   419

SEQ ID NO: 198        moltype = AA  length = 419
FEATURE               Location/Qualifiers
REGION                1..419
                      note = Cuphea viscosissima
source                1..419
                      mol_type = protein
                      organism = synthetic construct
SEQUENCE: 198
MVAAAATSAF FPVPAPGTSP KPGKSGNWPS SLSPTFKPKS IPNGGFQVKA NASAHPKANG  60
SAVNLKSGSL NTQEDTSSSP PPRAFLNQLP DWSMLLTAIT TVFVAAEKQW TMLDRKSKRP  120
```

```
DMLVDSVGLK SIVRDGLVSR HSFSIRSYEI GADRTASIET LMNHLQETTI NHCKSLGLHN  180
DGFGRTPGMC KNDLIWVLTK MQIMVNRYPT WGDTVEINTW FSQSGKIGMA SDWLISDCNT  240
GEILIRATSV WAMMNQKTRR FSRLPYEVRQ ELTPHFVDSP HVIEDNDQKL RKFDVKTGDS  300
IRKGLTPRWN DLDVNQHVSN VKYIGWILES MPIEVLETQE LCSLTVEYRR ECGMDSVLES  360
VTAVDPSENG GRSQYKHLLR LEDGTDIVKS RTEWRPKNAG TNGAISTSTA KTSNGNSVS   419

SEQ ID NO: 199         moltype = AA  length = 382
FEATURE                Location/Qualifiers
source                 1..382
                       mol_type = protein
                       organism = Umbellularia californica
SEQUENCE: 199
MATTSLASAF CSMKAVMLAR DGRGMKPRSS DLQLRAGNAP TSLKMINGTK FSYTESLKRL  60
PDWSMLFAVI TTIFSAAEKQ WTNLEWKPKP KLPQLLDDHF GLHGLVFRRT FAIRSYEVGP  120
DRSTSILAVM NHMQEATLNH AKSVGILGDG FGTTLEMSKR DLMWVVRRTH VAVERYPTWG  180
DTVEVECWIG ASGNNGMRRD FLVRDCKTGE ILTRCTSLSV LMNTRTRRLS TIPDEVRGEI  240
GPAFIDNVAV KDDEIKKLQK LNDSTADYIQ GGLTPRWNDL DVNQHVNNLK YVAWVFETVP  300
DSIFESHHIS SFTLEYRREC TRDSVLRSLT TVSGGSSEAG LVCDHLLQLE GGSEVLRART  360
EWRPKLTDSF RGISVIPAEP RV                                          382

SEQ ID NO: 200         moltype = AA  length = 308
FEATURE                Location/Qualifiers
source                 1..308
                       mol_type = protein
                       organism = Cocos nucifera
SEQUENCE: 200
MDASGASSFL RGRCLESCFK ASFGMSQPKD AAGQPSRRPA DADDFVDDDR WITVILSVVR  60
IAACFLSMMV TTIVWNMIML ILLPWPYARI RQGNLYGHVT GRMLMWILGN PITIEGSEFS  120
NTRAIYICNH ASLVDIFLIM WLIPKGTVTI AKKEIIWYPL FGQLYVLANH QRIDRSNPSA  180
AIESIKEVAR AVVKKNLSLI IFPEGTRSKT GRLLPFKKGF IHIALQTRLP IVPMVLTGTH  240
LAWRKNSLRV RPAPITVKYF SPIKTDDWEE EKINHYVEMI HALYVDHLPE SQKPLVSKGR  300
DASGRSNS                                                          308

SEQ ID NO: 201         moltype = AA  length = 356
FEATURE                Location/Qualifiers
source                 1..356
                       mol_type = protein
                       organism = Arabidopsis thaliana
SEQUENCE: 201
MDVASARSIS SHPSYYGKPI CSSQSSLIRI SRDKVCCFGR ISNGMTSFTT SLHAVPSEKF  60
MGETRRTGIQ WSNRSLRHDP YRFLDKKSPR SSQLARDITV RADLSGAATP DSSFPEPEIK  120
LSSRLRGIFF CVVAGISATF LIVLMIIGHP FVLLFDPYRR KFHHFIAKLW ASISIYPFYK  180
INIEGLENLP SSDTPAVYVS NHQSFLDIYT LLSLGKSFKF ISKTGIFVIP IIGWAMSMMG  240
VVPLKRMDPR SQVDCLKRCM ELLKKGASVF FFPEGTRSKD GRLGSFKKGA FTVAAKTGVA  300
VVPITLMGTG KIMPTGSEGI LNHGNVRVII HKPIHGSKAD VLCNEARSKI AESMDL      356

SEQ ID NO: 202         moltype = AA  length = 362
FEATURE                Location/Qualifiers
source                 1..362
                       mol_type = protein
                       organism = Arabidopsis thaliana
SEQUENCE: 202
MLKLSCNVTD SKLQRSLLFF SHSYRSDPVN FIRRRIVSCS QTKKTGLVPL RAVVSADQGS  60
VVQGLATLAD QLRLGSLTED GLSYKEKFVV RSYEVGSNKT ATVETIANLL QEVGCNHAQS  120
VGFSTDGFAT TTTMRKLHLI WVTARMHIEI YKYPAWGDVV EIETWCQSEG RIGTRRDWIL  180
KDSVTGEVTG RATSKWVMMN QDTRRLQKVS DDVRDEYLVF CPQEPRLAFP EENNRSLKKI  240
PKLEDPAQYS MIGLKPRRAD LDMNQHVNNV TYIGWVLESI PQEIVDTHEL QVITLDYRRE  300
CQQDDVVDSL TTTTSEIGGT NGSATSGTQG HNDSQFLHLL RLSGDGQEIN RGTTLWRKKP  360
SS                                                                362

SEQ ID NO: 203         moltype = AA  length = 367
FEATURE                Location/Qualifiers
source                 1..367
                       mol_type = protein
                       organism = Arabidopsis thaliana
SEQUENCE: 203
MLKLSCNVTD HIHNLFSNSR RIFVPVHRQT RPISCFQLKK EPLRAILSAD HGNSSVRVAD  60
TVSGTSPADR LRFGRLMEDG FSYKEKFIVR SYEVGINKTA TIETIANLLQ EVACNHVQNV  120
GFSTDGFATT LTMRKLHLIW VTARMHIEIY KYPAWSDVVE IETWCQSEGR IGTRRDWILK  180
DCATGEVIGR ATSKWVMMNQ DTRRLQRVTD EVRDEYLVFC PPEPRLAFPE ENNSSLKKIP  240
KLEDPAQYSM LGLKPRRADL DMNQHVNNVT YIGWVLESIP QEIIDTHELK VITLDYRREC  300
QQDDIVDSLT TSETPNEVVS KLTGTNGSTT SSKREHNESH FLHILRLSEN GQEINRGRTQ  360
WRKKSSR                                                           367

SEQ ID NO: 204         moltype = AA  length = 412
FEATURE                Location/Qualifiers
source                 1..412
                       mol_type = protein
                       organism = Arabidopsis thaliana
```

```
SEQUENCE: 204
MVATSATSSF FPVPSSSLDP NGKGNKIGST NLAGLNSAPN SGRMKVKPNA QAPPKINGKK  60
VGLPGSVDIV RTDTETSSHP APRTFINQLP DWSMLLAAIT TIFLAAEKQW MMLDWKPRRS  120
DMLVDPFGIG RIVQDGLVFR QNFSIRSYEI GADRSASIET VMNHLQETAL NHVKTAGLLG  180
DGFGSTPEMF KKNLIWVVTR MQVVVDKYPT WGDVVEVDTW VSQSGKNGMR RDWLVRDCNT  240
GETLTRASSV WVMMNKLTRR LSKIPEEVRG EIEPYFVNSD PVLAEDSRKL TKIDDKTADY  300
VRSGLTPRWS DLDVNQHVNN VKYIGWILES APVGIMERQK LKSMTLEYRR ECGRDSVLQS  360
LTAVTGCDIG NLATAGDVEC QHLLRLQDGA EVVRGRTEWS SKTPTTTWGT AP          412

SEQ ID NO: 205         moltype = AA  length = 345
FEATURE                Location/Qualifiers
source                 1..345
                       mol_type = protein
                       organism = Arabidopsis thaliana
SEQUENCE: 205
MFIAVEVSPV MEDITRQSKK TSVENETGDD QSATSVVLKA KRKRRSQPRD APPQRSSVHR  60
GVTRHRWTGR YEAHLWDKNS WNETQTKKGR QVYLGAYDEE DAAARAYDLA ALKYWGRDTI  120
LNFPLCNYEE DIKEMESQSK EEYIGSLRRK SSGFSRGVSK YRGVAKHHHN GRWEARIGRV  180
FGNKYLYLGT YATQEEAAIA YDIAAIEYRG LNAVTNFDIS RYLKLPVPEN PIDTANNLLE  240
SPHSDLSPFI KPNHESDLSQ SQSSSEDNDD RKTKLLKSSP LVAEEVIGPS TPPEIAPPRR  300
SFPEDIQTYF GCQNSGKLTA EEDDVIFGDL DSFLTPDFYS ELNDC                  345

SEQ ID NO: 206         moltype = AA  length = 303
FEATURE                Location/Qualifiers
source                 1..303
                       mol_type = protein
                       organism = Arabidopsis thaliana
SEQUENCE: 206
MAKVSGRSKK TIVDDEISDK TASASESASI ALTSKRKRKS PPRNAPLQRS SPYRGVTRHR  60
WTGRYEAHLW DKNSWNDTQT KKGRQVYLGA YDEEEAAARA YDLAALKYWG RDTLLNFPLP  120
SYDEDVKEME GQSKEEYIGS LRRKSSGFSR GVSKYRGVAR HHHNGRWEAR IGRVFATQEE  180
AAIAYDIAAI EYRGLNAVTN FDVSRYLNPN AAADKADSDS KPIRSPSREP ESSDDNKSPK  240
SEEVIEPSTS PEVIPTRRSF PDDIQTYFGC QDSGKLATEE DVIFDCFNSY INPGFYNEFD  300
YGP                                                                303

SEQ ID NO: 207         moltype = AA  length = 445
FEATURE                Location/Qualifiers
source                 1..445
                       mol_type = protein
                       organism = Avena sativa
SEQUENCE: 207
MKRSPPPAPP AAPPPPQPSP SSSSPACSPS PSSSSCPSSS DSSSIVIPRK RARTQKAASG  60
KPKAKASAKR PKKDASRSSK ETDANGAAAA AGKRSSIYRG VTRHRWTGRF EAHLWDKNCF  120
TSVQNKKKGR QVYLGAYDTE DAAARAYDLA ALKYWGSETI LNFSVEDYAK EMPEMEAVSR  180
EEYLAALRRR SSGFSRGVSK YRGVARHHHN GRWEARIGRV LGNKYLYLGT FDTQEEAAKA  240
YDLAAIEYRG ANAVTNFDIS CYLDQPQLLA QLQQGPQVVP ALQEELQHDV QHDLQNDNAV  300
QELNSGEVQM PGAMDEPIAL DDSTECINTP FEFDFSVEEN LWSPCMDYEL DAILGNNTSN  360
SANMNEWFND STFESNIGCL FEGCSNIDDC SSSKHCADLA AFDFFKEGDD NDFSNMEMEI  420
TPQANDVSCP PNDVSCPPKM ITVCN                                        445

SEQ ID NO: 208         moltype = AA  length = 420
FEATURE                Location/Qualifiers
source                 1..420
                       mol_type = protein
                       organism = Sorghum bicolor
SEQUENCE: 208
MDMERSQQQK SPTESPPPPS PSSSSSSVSA DTVLPPPGKR RRAATTAKAK AGAKPKRARK  60
DAAAAADPPP PPAAAAAGKR SSVYRGVTRH RWTGRFEAHL WDKHCLAALH NKKKGRQVYL  120
GAYDSEEAAA RAYDLAALKY WGPETLLNFP VEDYSSEMPE MEGVSREEYL ASLRRRSSGF  180
SRGVSKYRGV ARHHHNGRWE ARIGRVFGNK YLYLGTFDTQ EEAAKAYDLA AIEYRGVNAV  240
TNFDISCYLD HPLFLAQLQQ EPQVVPALNQ EAQPDQSETE TIAQESVSSE AKTPDDNAEP  300
DDNAEPDDIA EPLITVDDSI EESLWSPCMD YELDTMSRSN FGSSINLSEW FNDADFDSNI  360
GCLFDGCSAV DEGGKDGVGL ADFSLLEDFS LFEAGDGQLK DVLSDMEEGI QPPTMISVCN  420

SEQ ID NO: 209         moltype = AA  length = 395
FEATURE                Location/Qualifiers
source                 1..395
                       mol_type = protein
                       organism = Zea mays
SEQUENCE: 209
MERSQRQSPP PPSPSSSSSS VSADTVLVPP GKRRRAATAK AGAEPNKRIR KDPAAAAAGK  60
RSSVYRGVTR HRWTGRFEAH LWDKHCLAAL HNKKKGRQVY LGAYDSEEAA ARAYDLAALK  120
YWGPETLLNF PVEDYSSEMP EMEAVSREEY LASLRRRSSG FSRGVSKYRG VARHHHNGRW  180
EARIGRVFGN KYLYLGTFDT QEEAAKAYDL AAIEYRGVNA VTNFDISCYL DHPLFLAQLQ  240
QEPQVVPALN QEPQPDQSET GTTEQEPESS EAKTPDGSAE PDENAVPDDT AEPLTTVDDS  300
IEEGLWSPCM DYELDTMSRP NFGSSINLSE WFADADFDCN IGCLFDGCSA ADEGSKDGVG  360
LADFSLFEAG DVQLKDVLSD MEEGIQPPAM ISVCN                             395

SEQ ID NO: 210         moltype = AA  length = 430
```

```
FEATURE                Location/Qualifiers
source                 1..430
                       mol_type = protein
                       organism = Triadica sebifera
SEQUENCE: 210
MASSSSDPVL KAELGSSGGG CSSGGGGESS EAVIANDQLL LYRGLKKPKK ERGCTAKERI  60
SKMPPCTAGK RSSIYRGVTR HRWTGRYEAH LWDKSTWNQN QNKKGKQVYL GAYDDEEAAA  120
RAYDLAALKY WGPGTLINFP VTDYTRDLEE MQNMSREEYL ASLRRKSSGF SRGISKYRGL  180
SSRWESSVGR MPGSEYFSSI NYVDDPAAES EYVGSLCFER KIDLTSYIKW WGLNKTRQAE  240
SISKSAEETK PGCAEDIGGE LKTTEWAIQP TEPYQMPRLG MPVHVKKHKG SKISALSVLS  300
QSAAFKSLQE KASKKQENST DNDENENKNT NTNKIDYGKA VETSASHDSS NERPVTALGM  360
SGGLSLKRNV YQLTPFLSAP LLTNYGTIDQ LVDPILWASL VPVLPTGLSR NPEVTKTETS  420
STYTFFRPEE                                                        430

SEQ ID NO: 211         moltype = DNA  length = 1531
FEATURE                Location/Qualifiers
source                 1..1531
                       mol_type = other DNA
                       organism = Solanum tuberosum
SEQUENCE: 211
ttttaaatca ttgttttatt ttctctttct ttttacaggt ataaaaggtg aaaattgaag  60
caagattgat tgcaagctat gtgtcaccac gttattgata ctttggaaga aatttttact  120
tatatgtctt tgtttaggag taatatttga tatgttttag ttagattttc ttgtcattta  180
tgctttagta taattttagt tatttttatt atatgatcat gggtgaattt tgatacaaat  240
atttttgtca ttaaataaat taatttatca caacttgatt actttcagtg acaaaaaatg  300
tattgtcgta gtacccttt ttgttgaata tgaataattt tttttatttt gtgacaattg  360
taattgtcac tacttatgat aatatttagt gacatatatg tcgtcggtaa aagcaaacac  420
tttcagtgac aaaataatag atttaatcac aaaattatta accttttta taataataaa  480
tttatcccta atttatacat ttaaggacaa agtatttttt ttatatataa aaaatagtct  540
ttagtgacga tcgtagtgtt gagtctagaa atcataatgt tgaatctaga aaaatctcat  600
gcagtgtaaa ataaacctca aaaaggacgt tcagtccata gagggggtgt atgtgacacc  660
ccaacctcag caaaagaaaa cctcccttca acaaggacat ttgcggtgct aaacaatttc  720
aagtctcatc acacatatat ttattatata atactaataa agaatagaaa aggaaaggta  780
aacatcatta aatcgtcttt gtatattttt agtgacaact gattgacgaa atctttttcg  840
tcacacaaaa tttttagtga cgaaacatga tttatagatg atgaaattat ttgtccctca  900
taatctaatt tgttgtagtg atcattactc ctttgtttgt tttatttgtc atgttagtcc  960
attaaaaaaa aatatctctc ttcttatgta cgtgaatggt tggaacggat ctattatata  1020
atactaataa agaatagaaa aaggaaagtg agtgaggttc gagggagaga atctgtttaa  1080
tatcagagtc gatcatgtgt caattttatc gatatgaccc taacttcaac tgagtttaac  1140
caattccgat aaggcgagaa atatcatagt attgagtcta gaaaaatctc atgtagtgtg  1200
gggtaaacct cagcaaggac gttgagtcca tagagggggg tgtatgtgac accccaacct  1260
cagcaaaaga aaacctcccc tcaagaagga catttgcggt gctaaacaat ttcaagtctc  1320
atcacacata tatatatatt atataatact aataaataat agaaaaagga aaggtaaaca  1380
tcactaacga cagttgcggt gcaaactgag tgaggtaata aacagcacta acttttattg  1440
gttatgtcaa actcaaagta aaatttctca acttgtttac gtgcctatat ataccatgct  1500
tgttatatgc tcaaagcacc aacaaaattt a                                1531

SEQ ID NO: 212         moltype = DNA  length = 20
FEATURE                Location/Qualifiers
misc_feature           1..20
                       note = Oligonucleotide primer
source                 1..20
                       mol_type = other DNA
                       organism = synthetic construct
SEQUENCE: 212
cactcgtgct ttccatcatc                                             20

SEQ ID NO: 213         moltype = DNA  length = 20
FEATURE                Location/Qualifiers
misc_feature           1..20
                       note = Oligonucleotide primer
source                 1..20
                       mol_type = other DNA
                       organism = synthetic construct
SEQUENCE: 213
gaaggctgag caacaagagg                                             20

SEQ ID NO: 214         moltype = DNA  length = 18
FEATURE                Location/Qualifiers
misc_feature           1..18
                       note = Oligonucleotide primer
source                 1..18
                       mol_type = other DNA
                       organism = synthetic construct
SEQUENCE: 214
ggcgattttg gattctgc                                               18

SEQ ID NO: 215         moltype = DNA  length = 20
FEATURE                Location/Qualifiers
```

```
misc_feature          1..20
                      note = Oligonucleotide primer
source                1..20
                      mol_type = other DNA
                      organism = synthetic construct
SEQUENCE: 215
cccaaccctt ccgtatacat                                              20

SEQ ID NO: 216        moltype = DNA  length = 1970
FEATURE               Location/Qualifiers
source                1..1970
                      mol_type = other DNA
                      organism = Zea mays
SEQUENCE: 216
ggtacctttt ttcccagaga taaatgtgga atagctctac aaacaaacgg catgatgctg  60
acacttggat ggcgaccttg caatcccaag aactattgca tacggttgcc agtcgacaaa  120
tatctacgcc atgcatggct acggtcggaa tacaccgtag cggcgggtaa ctcgccgata  180
ccgtccacgt gtccttggat gcccggtcgc tgatacttct ggtcttctgg acatgcacca  240
agacaatcaa gtgattcaac cttaatttaa cataatataa ataatacgta acatccaact  300
gacgtgttca cctatagaga atattccttc tgattctact ttcagaatga tgccgttgcc  360
gtgtatcgag caagtactct cactcgaagt atcttatctc ccacatccag cacaaaaatc  420
ttctgttcgt ggcaaatctt gtggcggttg aacgaaagaa tgctatataa gtagctatag  480
agaacgtatt atgtgtaaac caaccgttca gtgtaaatcg tgtgtaaata gtcatgttaa  540
tttttggcg gcagatcaag tacaaactgt atgcctcgga taaacatgta caaaccacaa  600
cactggccac tagatctata tccaacgttc ataaccatcc atccctctct gctgcactct  660
gcaaacaagc acccccatct cgtagcaaca tcttgtctcc gacaagctct cgatgtagtg  720
gaggccctcc accgcaatat cctagtgtat gatgttggag aagcgactcc taaataatgg  780
tggcaagatg ttgctaggtt tgtagccata gcctcaatct aagatcatcc caagccatgg  840
gacctgattc tacgaggcct acaaccaggc atgacacgtc gtctacccac tcttgtgcat  900
catcggtcac ttgatctgac ttggttccta accacttacc ctaggttcca aagccctaag  960
tttctcgtat attgttagtc attcttagtg ggagttttat gtgtatttca ttcctgttaa  1020
atagcatgcc aactaagcaa acatgatgat ataatatgca atctaataaa aagatatatg  1080
agtgggtttc ataaaaaagg gagagagttt catgaggagt gaaactctga atacagatac  1140
tgatatgaca gctttaaaag tagtgttatg aaatcatcat tgagaaatgg tattagcact  1200
caatcgattt ctacgctgtc aattgtcatg agcacaattt tcacccaaag aggcacacca  1260
gcaatgtccg cttgtagtgt ccgagacgtt gctccatcgc cgtcgtcttg tttctgtgcg  1320
ctccattcaa tgcggcaagt ggctcaatcc caagcggtcg tcgcctccca gccccagcag  1380
caaaatatct tcccatgcgg ccatgccttg aaaattggaa tagattctct agattcaccg  1440
ccgcgtcatc ttcactactt tctcactggc ccaatcagca tctccttctc cgagctcaat  1500
catgctcagt caagcgtcac caatggcgtc acggttggtt ttgtcactgt ctgcatgcaa  1560
gggtattttg cttcgcaagt gtaaatggaa aatggatcta aacaactgca ctgcaccaat  1620
tttggaacgc ggaaccgaga gtctgtttgg gttcgtttga aacgcgctga tgtttctcat  1680
tttttaatag atgtagttac ctgatactat ttaagttgga cgatcaaacg actgtgtcaa  1740
gtgtgattaa gaaaagcatc gaaaataaaa tttatcgcca taaaaagtta aaaacagtgg  1800
ataatagtag gacctcataa tagaaaaaat tatcaaacgg aatggagggg cccaacgcag  1860
tatatagcag ccgggtggtg ccggacatcc gacgctcgtg ccagcaggcc attcttctcg  1920
ccttactccc tcacagaacc cagtaaaata tcgccagtcc cgccgtcgag             1970

SEQ ID NO: 217        moltype = DNA  length = 584
FEATURE               Location/Qualifiers
source                1..584
                      mol_type = other DNA
                      organism = Aeluropus littoralis
SEQUENCE: 217
cccaagcttg accgatgcac acgctacctg ccaaggctcc ctccatccgc actctgcatc  60
gtcgcttcgg cgtaaacttc cacgtagtac ttgtacgatt ctagctagac ccagtgcgcc  120
caccctaccg ccggcgagcg ggcccccatc tcgcgccagg cttccatgcg ggtccaccgt  180
ggaccagccc tacgccgaac cgagcccatc cctccaccct ttcaccgcca agcgggaccc  240
gcgttggacc tttccgcttg gctggccccc accagcgtcc acgcgggcca acggcctcgc  300
gaaatggatc tccacacgac aaaccaaaac gagaagaaaa taaatggaaa ggaaagaaac  360
ggatcgccac gcgttccaga ggcgtccgct aaccacccga ttatgcttgc gcagcgtgcg  420
taacctcgtc gtggggttaa tccgggtggc cggatcggga aagccacggc ctttataacc  480
catccctgcc ggatcgaacc ggtaccggaa acaaaaacag ggggagaaaa aaagttcttc  540
gcgaggaagg aaaaggaaaa gtcgcgtgcc gtcctcgccc acag                   584

SEQ ID NO: 218        moltype = DNA  length = 928
FEATURE               Location/Qualifiers
source                1..928
                      mol_type = other DNA
                      organism = Agrobacterium rhizogenes
SEQUENCE: 218
ttagcgaaag gatgtcaaaa aaggatgccc ataattggga ggagtggggt aaagcttaaa  60
gttggcccgc tattggattt cgcgaaagcg gcattggcaa acgtggagat tgctgcattc  120
aagatacttt ttctattttc tggttaagat gtaaagtatt gccacaatca tattaattac  180
taacattgta tatgtaatat agtgcggaaa ttatctatgc caaaatgatg tattaataat  240
agcaataata atatgtgtta atctttttca atcgggaata cgtttaagcg attatcgtgt  300
tgaataaatt attccaaaag gaaatacatg gttttggaga acctgctata gatatatgcc  360
aaatttacac tagtttagtg ggtgcaaaac tattatctct gtttctgagt ttaataaaaa  420
ataaataagc agggcgaata gcagttagcc taagaaggaa tggtggccat gtacgtgctt  480
```

```
ttaagagacc ctataataaa ttgccagctg tgttgctttg gtgccgacag gcctaacgtg  540
gggtttagct tgacaaagta gcgcctttcc gcagcataaa taaaggtagg cgggtgcgtc  600
ccattattaa aggaaaaagc aaaagctgag attccataga ccacaaacca ccattattgg  660
aggacagaac ctattccctc acgtgggtcg ctagctttaa acctaataag taaaaacaat  720
taaaagcagg caggtgtccc ttctatattc gcacaacgag gcgacgtgga gcatcgacag  780
ccgcatccat taattaataa atttgtggac ctatacctaa ctcaaatatt tttattattt  840
gctccaatac gctaagagct ctggattata aatagtttgg atgcttcgag ttatgggtac  900
aagcaacctg tttcctactt tgttacca                                    928

SEQ ID NO: 219         moltype = DNA  length = 732
FEATURE                Location/Qualifiers
misc_feature           1..732
                       note = hpRNAi construct containing a 732bp fragment
source                 1..732
                       mol_type = other DNA
                       organism = synthetic construct
SEQUENCE: 219
aatgcagttt tacaaagtgg agtacccaaa gcagatgaga tcattttgta taacatggct  60
cttgtgttgg atcgtatttt tgtggatgtg aaggatgctt ttgagttctc accacatcat  120
aaggccattc gtgaaccttt tgactattac aagtttggcc aaaattatat ccgcccttta  180
cttgatttca ggagttctta tgttggcaat atatcagttt ttggtgaaat agaagagaag  240
ctcaagcagg gcgttaatgt tgttttgatg tcaaaccacc aaagtgaagc agatccagcg  300
gttattgctc tgttgcttga atcgaggcac ccatacattg ctgagaacat aatttatgtt  360
gcaggagata gagttattac tgatcctctt tgcaagccat tcagcatggg aaggaatctc  420
ctgtgtgttt attcgaaaaa acatatgggt gatgacccca aacttgtcga gaagaaaagg  480
agagcaaaca caagaagctt gaaggagatg gctgtgctat tgaggggtgg atcaaaacta  540
atatggattg ctcctagtgg tggaagagat aggccaaacc ctgttacaaa agaatggtat  600
ccagcgccat ttgatgcttc ttcaacagac aacatgagaa ggcttgtaga acatgctggt  660
gtccctggtc acatttatcc tctagcaata ttatgctatg atattatgcc ccctccgccc  720
caggttgaga aa                                                     732

SEQ ID NO: 220         moltype = AA  length = 512
FEATURE                Location/Qualifiers
source                 1..512
                       mol_type = protein
                       organism = Elaeis guineensis
SEQUENCE: 220
MAVSKNPETL APDQEPSKES DLRRRPASSP SSTAASPAVP DSSSRTSSSI TGSWTTALDG  60
DSGAGAVRIG DPKDRIGEAN DIGEKKKACS GEVPVGFVDR PSAPVHVRVV ESPLSSDTIF  120
QQSHAGLLNL CVVVLIAVNS RLIIENLMKY GLLIGSGFFF SSRLLRDWPL LICSLTLPVF  180
PLGSYMVEKL AYKKFISEPV VVSLHVILII ATIMYPVFVI LRCDSPILSG INLMLFVSSI  240
CLKLVSYAHA NYDLRSSSNS IDKGIHKSQG VSFKSLVYFI MAPTLCYQPS YPRTTCIRKG  300
WVICQLVKLV IFTGVMGFII EQYIDPIIKN SQHPLKGNVL NAMERVLKLS IPTLYVWLCV  360
FYCTFHLWLN ILAELLCFGD REFYKDWWNA KTIEEYWRMW NMPVHKWMLR HVYLPCIRNG  420
IPKGVAMVIS FFISAIFHEL CIGIPCHIFK FWAFIGIMFQ VPLVILTKYL QNKFKSAMVG  480
NMIFWFFFSI YGQPMCVLLY YHDVMNRKVG TE                                512

SEQ ID NO: 221         moltype = AA  length = 74
FEATURE                Location/Qualifiers
source                 1..74
                       mol_type = protein
                       organism = Glycine max
SEQUENCE: 221
MADIDRSFDN NVSAVSTEKS SQVSDVEFSE AEEILIAMVY NLVGERWSLI AGRIPGRTAE  60
EIEKYWTSRF STSQ                                                    74

SEQ ID NO: 222         moltype = AA  length = 146
FEATURE                Location/Qualifiers
source                 1..146
                       mol_type = protein
                       organism = Arabidopsis thaliana
SEQUENCE: 222
MGSLQMQTSP ESDNDPRYAT VTDERKRKRM ISNRESARRS RMRKQKQLGD LINEVTLLKN  60
DNAKITEQVD EASKKYIEME SKNNVLRAQA SELTDRLRSL NSVLEMVEEI SGQALDIPEI  120
PESMQNPWQM PCPMQPIRAS ADMFDC                                       146

SEQ ID NO: 223         moltype = AA  length = 268
FEATURE                Location/Qualifiers
source                 1..268
                       mol_type = protein
                       organism = Arabidopsis thaliana
SEQUENCE: 223
MGRGKIEIKR IENANSRQVT FSKRRSGLLK KARELSVLCD AEVAVIVFSK SGKLFEYSST  60
GMKQTLSRYG NHQSSSASKA EEDCAEVDIL KDQLSKLQEK HLQLQGKGLN PLTFKELQSL  120
EQQLYHALIT VRERKERLLT NQLEESRLKE QRAELENETL RRQVQELRSF LPSFTHYVPS  180
YIKCFAIDPK NALINHDSKC SLQNTDSDTT LQLGLPGEAH DRRTNEGERE SPSSDSVTTN  240
TSSETAERGD QSSLANSPPE AKRQRFSV                                     268

SEQ ID NO: 224         moltype = AA  length = 437
```

```
FEATURE                Location/Qualifiers
source                 1..437
                       mol_type = protein
                       organism = Arabidopsis thaliana
SEQUENCE: 224
MEFESVFKMH YPYLAAVIYD DSSTLKDFHP SLTDDFSCVH NVHHKPSMPH TYEIPSKETI  60
RGITPSPCTE AFGACFHGTS NDHVFFGMAY TTPPTIEPNV SHVSHDNTMW ENDQNQGFIF  120
GTESTLNQAM ADSNQFNMPK PLLSANEDTI MNRRQNNQVM IKTEQIKKKN KRFQMRRICK  180
PTKKASIIKG QWTPEEDKLL VQLVDLHGTK KWSQIAKMLQ GRVGKQCRER WHNHLRPDIK  240
KDGWTEEEDI ILIKAHKEIG NRWAEIARKL PGRTENTIKN HWNATKRRQH SRRTKGKDEI  300
SLSLGSNTLQ NYIRSVTYND DPFMTANANA NIGPRNMRGK GKNVMVAVSE YDEGECKYIV  360
DGVNNLGLED GRIKMPSLAA MSASGSASTS GSASGSGSGV TMEIDEPMTD SWMVMHGCDE  420
VMMNEIALLE MIAHGRL                                                 437

SEQ ID NO: 225         moltype = AA  length = 359
FEATURE                Location/Qualifiers
source                 1..359
                       mol_type = protein
                       organism = Arabidopsis thaliana
SEQUENCE: 225
MYHQNLISST PNQNSNPHDW DIQNPLFSIH PSAEIPSKYP FMGITSCPNT NVFEEFQYKI  60
TNDQNFPTTY NTPFPVISEG ISYNMHDVQE NTMCGYTAHN QGLIIGCHEP VLVHAVVESQ  120
QFNVPQSEDI NLVSQSERVT EDKVMFKTDH KKKDIIGKGQ WTPTEDELLV RMVKSKGTKN  180
WTSIAKMFQG RVGKQCRERW RNHLRPNIKK NDWSEEEDQI LIEVHKIVGN KWTEIAKRLP  240
GRSENIVKNH WNATKRRLHS VRTKRSDAFS PRNNALENYI RSITINNNAL MNREVDSITA  300
NSEIDSTRCE NIVDEVMNLN LHATTSVYVP EQAVLTWGYD FTKCYEPMDD TWMLMNGWN   359

SEQ ID NO: 226         moltype = AA  length = 386
FEATURE                Location/Qualifiers
source                 1..386
                       mol_type = protein
                       organism = Arabidopsis thaliana
SEQUENCE: 226
MSKRPPPDPV AVLRGHRHSV MDVSFHPSKS LLFTGSADGE LRIWDTIQHR AVSSAWAHSR  60
ANGVLAVAAS PWLGEDKIIS QGRDGTVKCW DIEDGGLSRD PLLILETCAY HFCKFSLVKK  120
PKNSLQEAES HSRGCDEQDG GDTCNVQIAD DSERSEEDSG LLQDKDHAEG TTFVAVVGEQ  180
PTEVEIWDLN TGDKIIQLPQ SSPDESPNAS TKGRGMCMAV QLFCPPESQG FLHVLAGYED  240
GSILLWDIRN AKIPLTSVKF HSEPVLSLSV ASSCDGGISG GADDKIVMYN LNHSTGSCTI  300
RKEITLERPG VSGTSIRVDG KIAATAGWDH RIRVYNYRKG NALAILKYHR ATCNAVSYSP  360
DCELMASASE DATVALWKLY PPHKSL                                       386

SEQ ID NO: 227         moltype = AA  length = 292
FEATURE                Location/Qualifiers
source                 1..292
                       mol_type = protein
                       organism = Arabidopsis thaliana
SEQUENCE: 227
MEPPQHQHHH HQADQESGNN NNNKSGSGGY TCRQTSTRWT PTTEQIKILK ELYYNNAIRS  60
PTADQIQKIT ARLRQFGKIE GKNVFYWFQN HKARERQKKR FNGTNMTTPS SSPNSVMMAA  120
NDHYHPLLHH HHGVPMQRPA NSVNVKLNQD HHLYHHNKPY PSFNNGNLNH ASSGTECGVV  180
NASNGYMSSH VYGSMEQDCS MNYNNVGGGW ANMDHHYSSA PYNFFDRAKP LFGLEGHQEE  240
EECGGDAYLE HRRTLPLFPM HGEDHINGGS GAIWKYGQSE VRPCASLELR LN          292

SEQ ID NO: 228         moltype = AA  length = 453
FEATURE                Location/Qualifiers
source                 1..453
                       mol_type = protein
                       organism = Brassica napus
SEQUENCE: 228
MDLGSVTGNV NGSPSLKELR ESKQDRSEFD GEDCLQQSSK LARTIAEDKH LPSSYAAAYS  60
RPMSFHQGIP LARSASLLSS DSRRQEHMLS FSDKPEAFDF SKYVGLDNNK NSLSPFLHQL  120
PPPYCRTPGG GYGSGGMMMS MQGKGPFTLT QWAELEQQAL IYKYITANVP VPSSLLISIQ  180
KSFYPYRSFP PSSFGWGTFH LGFAGGKMDP EPGRCRRTDG KKWRCSKDAV PDQKYCERHI  240
NRGRHRSRKP VEVQPGQTAA SKAAAVASRN TASQIPNNRV QNVIYPSTVN LPPKEQRNNN  300
NSSFGFGHVT SPSLLTSSYL DFSSNQNKPE ELKSDWTQLS MSIPVASSSP SSTAQDKTTL  360
SPLRLDLPIQ SQQETLEAVR KVNTWIPISW GNSLGGPLGE VLNSTTSSPT LGSSPTGVLQ  420
KSTFCSLSNS SSVTSPVADN NRNNNVDYFH YTT                                453

SEQ ID NO: 229         moltype = AA  length = 461
FEATURE                Location/Qualifiers
source                 1..461
                       mol_type = protein
                       organism = Brassica napus
SEQUENCE: 229
MDLGSVTGNV NGSPGLKELR GSKQDRSGFD GEDCLQQSSK LARTIAEDKH LPSSYAAYSR  60
PMSFHQGIPL TRSASLLSSD SRRQEHMLSF SDKPEAFDFS KYVGLDNNKN SLSPFLHQLP  120
PPYCRSSGGG YGSGGMMMSM QGKGPFTLTQ WAELEQQALI YKYITANVPV PSSLLISIQK  180
SFYPYRSFPP SSFGWGTFHL GFAGGKMDPE PGRCRRTDGK KWRCSKDAVP EQKYCERHIN  240
RGRHRSRKPV EVQPGQTAAS KAVASRDTAS QIPSNRVQNV IYPSNVNLQP KEQRNNDNSP  300
```

```
FGFGHVTSSS LLTSSYLDFS SNQEKPSGNH HNQSSWPEEL KSDWTQLSMS IPVASSSPSS  360
TAQDKTALSP LRLDLPIQSQ QETLESARKV NTWIPISWGN SLGGPLGEVL NSTTSSPTLG  420
SSPTGVLQKS TFCSLSNSSS VTSPIADNNR NNNVDYFHYT T                      461

SEQ ID NO: 230         moltype = AA  length = 409
FEATURE                Location/Qualifiers
source                 1..409
                       mol_type = protein
                       organism = Arabidopsis thaliana
SEQUENCE: 230
MEARPVHRSG SRDLTRTSSI PSTQKPSPVE DSFMRSDNNS QLMSRPLGQT YHLLSSSNGG  60
AVGHICSSSS SGFATNLHYS TMVSHEKQQH YTGSSSNNAV QTPSNNDSAW CHDSLPGGFL  120
DFHETNPAIQ NNCQIEDGGI AAAFDDIQKR SDWHEWADHL ITDDDPLMST NWNDLLLETN  180
SNSDSKDQKT LQIPQPQIVQ QQPSPSVELR PVSTTSSNSN NGTGKARMRW TPELHEAFVE  240
AVNSLGGSER ATPKGVLKIM KVEGLTIYHV KSHLQKYRTA RYRPEPSETG SPERKLTPLE  300
HITSLDLKGG IGITEALRLQ MEVQKQLHEQ LEIQRNLQLR IEEQGKYLQM MFEKQNSGLT  360
KGTASTSDSA AKSEQEDKKT ADSKEVPEEE TRKCEELESP QPKRPKIDN              409

SEQ ID NO: 231         moltype = DNA  length = 685
FEATURE                Location/Qualifiers
source                 1..685
                       mol_type = other DNA
                       organism = Nicotiana benthamiana
SEQUENCE: 231
aaagtccact ggaagaatac tcttcaacag ttggaaagag ttggacctaa gtcggttggt  60
gtctgtctgt taacagcagc ttttgttggc atggccttca ctatccaatt tgttagagaa  120
ttcactagat tagggttaaa tagatctgtt ggtggggtgt tggcccttgc cttttcaaga  180
gagctaagtc cagttgtcac atcaattgta gttgctgggc gtatcggtag tgcatttgct  240
gcggaactgg gcactatgca ggtatctgag cagactgaca cgttgagagt tcttggtgca  300
aatcctgttg attatttggt gacaccaaga gtgattgctt cttgcgttgc attaccattt  360
ttaaccctaa tgtgctttac agttggaatg gcatccagcg cccttttggc agatggtgtt  420
tatggaatta gcataaacat aatcttagat tctgctctga gagctcttag atcatgggac  480
cttattagtg caatgattaa atcaggggtg tttggtgcta ttatatccat cataagctgt  540
gcttgggggg tcaccacgct gggaggtgcc aaaggggttg gagagtcgac tacttcagca  600
gtagttttat ctcttgttgg catattcata gctgactttg ctctctcttg ctgtttcttc  660
cagggtgctg gcgattccct gaaga                                        685

SEQ ID NO: 232         moltype = AA  length = 824
FEATURE                Location/Qualifiers
source                 1..824
                       mol_type = protein
                       organism = Solanum tuberosum
SEQUENCE: 232
MDISNEAKVE FISIGPSSIV GRTIAFRVLF CKSISRLRHN IFHFLIYYLY KIKNCLSYYL  60
TPLIKWFHPR NPQGILALVT LLAFLLRRYT NVKIRADMVY KRKFWRNMMK SALTYEEWAH  120
AAKMLEKETP KMNEAEFYDE ELVVNKLQEL QHRRNEGSLR DIMFFMRADL VRNLGNMCNP  180
QLHKGRLHVP KLIKEYIDEV STQLKMVCDY DSDEILLEEK LAFMHETRHA FGRTALLLSG  240
GASLGAFHVG VVKTLVEHKL MPRIIAGSSV GSIMCSVVAT RSWPELQSFF ENFWHVLQPF  300
EQMGGILTVF RRIMRQGAVH EIRQLQVMLR HLTNNLTFQE AYDMTGRVLG ITVCSPRKHE  360
PPRCLNYLTS PHVVIWSAVT ASCAFPGLFE AQELMAKDRS GNLVPYHPPF HLEPDQAAAS  420
GSSARRWRDG SLEIDLPMMQ LKELFNVNHF IVSQANPHIA PLLRIKEFVR AYGGNFAAKL  480
AHLTEMEVKH RCNQVLELGF PLRGLAKLFA QDWEGDVTVV MPATLAQYLK IIQNPSTLEV  540
QKAANQGRRC TWEKLSAIKA NCGIELALDE CVAILNHMRR LKRSAERAAA ASQGMSSSTV  600
KLNASRRIPS WNCIARENST GSLEEDFHAD ASSSLHHHNA GRNWRCNNKN AAHDHHGSDS  660
ESENADNNSW TRSGGPLMRT TSADKFIDYV QNLEMHPSQR SSRGLSIDLN NVVVREPLSP  720
SPRVTTPARR SDTEFDQRDI RIIVAEGDLL QTERTNNGIV FNVVRRGDLT PSNRSLDSEN  780
NSCFHDPVAE CVQLENPEKD MDISSASEDG ENAVLDEVTK NQII                   824

SEQ ID NO: 233         moltype = DNA  length = 2475
FEATURE                Location/Qualifiers
source                 1..2475
                       mol_type = other DNA
                       organism = Solanum tuberosum
SEQUENCE: 233
atggatataa gtaatgaggc taaagtagag ttcatttcca taggaccttc ttcaattgta  60
ggtcgaacaa tagcctttcg agttttgttt tgcaaatcaa tatcgcggtt gaggcacaac  120
atttttcatt tcttgatata ttacttgtac aagatcaaga attgtctgtc atactacttg  180
acacctttga tcaaatggtt tcacccgcgt aatccacagg ggatattagc attagtaaca  240
cttctagcct tcttgttgag gcgatatacg aatgtaaaaa tcagggctga tatggtttat  300
aagaggaaat tttggaggaa tatgatgaaa tctgcattaa cttatgagga atgggctcat  360
gctgcgaaaa tgttggagaa agagacacct aaaatgaatg aagcagagtt ttatgatgaa  420
gagttagttg taaataaact tcaagaactt caacatcgtc gtaatgaagg atctttaaga  480
gatattatgt tctttatgag agctgatctt gtgagaaatc tgggtaatat gtgtaatcca  540
cagcttcata agggtaggct tcatgtgcct aaacttatta aggagtatat tgatgaggtt  600
tcaactcagt tgaaaatggt atgtgattat gattcagatg agattttgtt ggaggagaag  660
cttgctttta tgcatgaaac aagacatgct tttggtagga cagcattgct tttaagcggg  720
ggcgcgtctt tgggagcttt tcatgttggt gtggttaaga cattggttga gcacaagctt  780
atgccaagga taattgctgg ttcgagtgtt ggatcgatta tgtgttctgt agttgcaact  840
cggtcttggc ctgagctgca gagttttttt gagaattttt ggcatgtgtt gcagccgttt  900
```

```
gaacagatgg gtggaattct aactgttttc aggaggatca tgagacaagg ggctgtacat  960
gagattaggc agttgcaggt gatgttacgc catctcacga ataatcttac tttccaagaa  1020
gcttacgata tgactggtcg agttctaggg attactgttt gctcccctag aaaacatgaa  1080
cctcctagat gtttgaacta cttgacttca cctcatgttg ttatatggag tgctgtgact  1140
gcttcttgcg cgtttcctgg tctgtttgaa gctcaagaac tgatggcaaa ggatagaagt  1200
ggtaatcttg ttccttatca tccaccattt catttggaac ctgatcaggc tgcagcttct  1260
ggttcatctg ctcgtcgatg gagggatggt agcttggaga tcgatctacc tatgatgcag  1320
ctaaaagagc tattcaacgt aaaccacttt atcgtgagcc aggcgaatcc acatattgct  1380
cctttactca ggatcaaaga gtttgtaaga gcttatggag gcaactttgc tgccaagctt  1440
gctcatctta ctgagatgga agtgaagcac agatgcaatc aggtactgga acttggtttt  1500
cccttgaggg gattagccaa gctatttgct caagattggg aaggcgatgt caccgttgta  1560
atgccagcca ctcttgctca gtacttgaag atcatacaga atccctctac tttggaggtt  1620
caaaaagcag caaatcaagg gaggagatgc acttgggaga aactatcagc cattaaggca  1680
aattgtggaa ttgagcttgc tcttgatgag tgtgtagcaa tactcaacca tatgcgtaga  1740
ctaaaaagga gcgcggagag agcagctgct gcttcacaag gcatgtcaag cagcacagtc  1800
aaactcaatg cttctagacg tattccttct tggaattgca ttgcaagaga gaactcaaca  1860
ggctcccttg aagaagactt tcacgcggat gcttcttcct ctcttcatca tcacaatgct  1920
ggtcgaaact ggcgttgtaa taacaagaat gctgcacatg atcatcatgg tagtgacagt  1980
gagtctgaaa acgcggataa taattcttgg acaagatcag gtggtccatt gatgaggaca  2040
acatcagctg ataagtttat tgactatgta caaaacttgg aaatgcatcc ttcacaacga  2100
tcgagcagag gactgagtat tgacctcaac aatgttgtag tcagggagcc tctttctccg  2160
agtccacgag tgacaacacc tgctaggaga tcagatacag aatttgatca aagagacatc  2220
agaattatcg tcgctgaagg tgatttacta cagactgaaa ggactaacaa tgggattgta  2280
ttcaatgtgg taaggagagg agacttaact ccatcaaaca ggagtcttga ttcagaaaac  2340
aacagttgct ttcatgatcc agtggccgaa tgcgtgcaac tcgaaaatcc tgagaaggat  2400
atggatataa gttcagcatc agaagatgga gaaaatgcag tactagatga agtaacaaaa  2460
aatcagatca tataa                                                   2475
```

```
SEQ ID NO: 234          moltype = AA  length = 521
FEATURE                 Location/Qualifiers
source                  1..521
                        mol_type = protein
                        organism = Solanum tuberosum
SEQUENCE: 234
MAASIGALKS SPSSNNCINE RRNDSTRAVS SRNLSFSSSH LAGDKLMPIS SLRSQGVRFN  60
VRRSSLIVPP KAVSDSQNSQ TCLDPDASRS VLGIILGGGA GTRLYPLTKK RAKPAVPLGA  120
NYRLIDIPVS NCLNSNISKI YVLTQFNSAS LNRHLSRAYA SNMGGYKNEG FVEVLAAQQS  180
PENPDWFQGT ADAVRQYLWL FEEHTVLEYL ILAGDHLYRM DYEKFIQAHR ETDADITVAA  240
LPMDEKRATA FGLMKIDEEG RIIEFAEKPQ GEQLQAMKVD TTILGLDDKR AKEMPFIASM  300
GIYVISKDVM LSLLRDKFPG ANDFGSEVIP GATSLGMRVQ AYLYDGYWED IGTIEAFYNA  360
NLGITKKPVP DFSFYDRSAP IYTQPRYLPP SKMLDADVTD SVIGEGCVIK SCKIHHSVVG  420
LRSCISEGAI IEDSLLMGAD YYETDADRKL LAAKGSVPIG IGKNCHIKRA IIDKNARIGD  480
NVKIINKDNV QEAARETDGY FIKSGIVTVI KDALIPSGII I                     521
```

```
SEQ ID NO: 235          moltype = DNA  length = 1819
FEATURE                 Location/Qualifiers
source                  1..1819
                        mol_type = other DNA
                        organism = Solanum tuberosum
SEQUENCE: 235
ctagtgattg caatcacact ctaccacaca ctctctagta gagagatcag ttgataacaa  60
gctttgttaa caatggcggc ttccattgga gccttaaaat cttcaccttc ttctaacaat  120
tgcatcaatg agagaagaaa tgattctaca cgtgcagtat ccagcagaaa tctctcattt  180
tcgtcttctc atctcgccgg agacaagttg atgcctatat cgtccttacg ttcccaagga  240
gtccgattca atgtgagaag aagttcattg attgtgccgc ctaaggctgt ttctgattcg  300
cagaattcac agacatgtct agacccagat gctagccgga gtgttttggg aattattctt  360
ggaggtggag ctgggacccg actttatcct ctaactaaaa aaagagcaaa gccagctgtt  420
ccacttggag caaattatcg tctgattgac attcctgtaa gcaactgctt gaacagtaac  480
atatccaaga tctatgttct cacacaattc aactctgcct ctctgaatcg ccacctttca  540
cgagcatatg ctagcaacat gggaggatac aaaaacgagg gctttgtgga agttcttgct  600
gctcaacaaa gtccagagaa ccccgattgg ttccagggca cggctgatgc tgtcagacaa  660
tatctgtggt tgtttgagga gcatactgtt cttgaatacc ttatacttgc tggagatcat  720
ctgtatcgaa tggattatga aaagtttatt caagcccaca gagaaacaga tgctgatatt  780
accgttgccg cactgccaat ggacgagaag cgtgccactg cattcggtct catgaagatt  840
gacgaagaag gacgcattat tgaatttgca gagaaaccgc aaggagagca attgcaagca  900
atgaaagtgg atactaccat tttaggtctt gatgacaaga gagctaaaga aatgcctttc  960
attgccagta tgggtatata tgtcattagc aaagacgtga tgttaagcct acttcgtgac  1020
aagttccctg gggccaatga ttttggtagt gaagttattc ctggtgcaac ttcacttggg  1080
atgagagtgc aagcttattt atatgatggg tactgggaag atattggtac cattgaagct  1140
ttctacaatg ccaatttggg cattacaaaa aagccggtgc cagattttag cttttacgac  1200
cgatcagccc caatctacac ccaacctcga tatctaccac catcaaaaat gcttgatgct  1260
gatgtcacag atagtgtcat tggtgaaggt tgtgtgatca agagctgtaa gattcatcat  1320
tccgtggttg gactcagatc atgcatatca gagggagcaa ttatagaaga ctcacttttg  1380
atgggggcag attactatga gactgatgct gacaggaagt tgctggctgc aaagggcagt  1440
gtcccaattg gcatcggcaa gaattgtcac attaaaagag ccattatcga caagaatgcc  1500
cgtatagggg acaatgtgaa gatcattaac aaagacaacg ttcaagaagc ggctagggaa  1560
acagatggat acttcatcaa gagtgggatt gtcaccgtca tcaaggatgc tttgattcca  1620
agtggaatca tcatctgaag gaatgcgttt taacttggtt gtcctccaag attttggcta  1680
aacagccatg aggtagaaac gtgctgaact tttattttcc tgagctgtag aaatctagtg  1740
```

```
tacatctttc tgttatgata cttctcatta cccctacaag agaagactgg atgctgtaaa  1800
aattattcgt ctagaataa                                               1819

SEQ ID NO: 236          moltype = DNA  length = 1173
FEATURE                 Location/Qualifiers
source                  1..1173
                        mol_type = other DNA
                        organism = Sapium sebiferum L.
SEQUENCE: 236
tgccaatagc cagccaataa aacatctaca cgttttcaca cggcttttca tcacagccgt  60
tgtttttctc atctcactcc gtgccttcat cttcatcctc ttctcctctc tctctgtctc  120
tatatgtata gaagcgttag atgtcttgcg ttgttaacca attcattttt cgctttctgc  180
ttcttctaat attataagaa agtttgattc ttcttcttgt caatctttgt tcgcggcttt  240
taacgatatc cgctaaagga aatttgaaat ttcaattatg gccgatggaa acgtcaattc  300
gcaagaacag atggctaagc aggaggaaca gaggctgaag tatttggagt ttgtacaagt  360
ggctgcaata catgctgtgg tgaccttcac aaacctctat gtttatgcca aaaacaagtc  420
gggtccattg aagcccggtg ttgagactgt tgaaggtacg gtcaagagtg tggttggacc  480
tgtttatggc aagttccatg atgttcccat tgaggttctc aagtttgtcg atcgcaagat  540
tgatcaatct gtaagcagcc tagacagccg tgtgcctcca gttgtgaagc agttatcggc  600
ccaagcattt tcagtggctc gcgaagcccc agtggctgct cgtgctgtgg cttctgaagt  660
gcagactgct ggagtgaagg aaactgcatc tgggttggca agaactctgt acttcaaata  720
tgaacccaag gccaaggagc tatacaccaa gtatgaacca aaagcggaac agtgtgctgc  780
ctctgcctgg cgtaagctca atcaactccc agtcttccct catgtagctc aggttgttat  840
gccaacagca gcttattgtt ctgaaaagta caaccaggca gtacttacca ccgctgagaa  900
aggatacaga gtgtcctctt atttgccttt tgtgcccact gagagaattg ctaagttgtt  960
taggaatgag gcacctgaat ctacccctt ccttccaat tgagcaagat gctgataaat  1020
gattcacaat ggacatgtgg acagaataaa aatctttgga tattatatgg tactgtgtat  1080
ttcaaggttc aagattactc tctacaatgt gtgaattttt gtttcagatg acttaattct  1140
tgttcattca ttatatatat atatatatat ata                               1173

SEQ ID NO: 237          moltype = AA  length = 241
FEATURE                 Location/Qualifiers
source                  1..241
                        mol_type = protein
                        organism = Sapium sebiferum L.
SEQUENCE: 237
MADGNVNSQE QMAKQEEQRL KYLEFVQVAA IHAVVTFTNL YVYAKNKSGP LKPGVETVEG  60
TVKSVVGPVY GKFHDVPIEV LKFVDRKIDQ SVSSLDSRVP PVVKQLSAQA FSVAREAPVA  120
ARAVASEVQT AGVKETASGL ARTLYFKYEP KAKELYTKYE PKAEQCAASA WRKLNQLPVF  180
PHVAQVVMPT AAYCSEKYNQ AVLTTAEKGY RVSSYLPFVP TERIAKLFRN EAPESTPFLS  240
N                                                                  241

SEQ ID NO: 238          moltype = DNA  length = 1252
FEATURE                 Location/Qualifiers
source                  1..1252
                        mol_type = other DNA
                        organism = Sapium sebiferum L.
SEQUENCE: 238
ctacttttcc ctagcattag tattctaggc cccactctgt agattcctcc agctgcctga  60
tctaattttt tatcaactct tgaccgttcg atcatcccaa cggctcagat tcactagtac  120
ttttctcaca ccgtatctcc gattctccat gactccatcg atataaatcg cagtgctcat  180
caactgaatt ctcgaaattg cggttacaag ctgctataag aagcgaaaag aaacgctgag  240
aaacaggatc cgttcctcct ccctcgtttt ttactcctta caagatggag accgagaaga  300
agattcctga attgaagcac ttagggttcg tgaggatggc tgctattcag tcactgattt  360
gcgtctcgaa tctctacgat tacgcgaagc ataactcagg acctttgaga tccactgttg  420
gaaccgtgga gggtgccgta accaccgtag taggtccagt ttaccagaaa ttcaaagacc  480
ttcctgatga tcttcttgta tatgttgata agaaggtgga tgaaggaaca cacaagtttg  540
ataagcatgc tccacctatt gctaagaagg ctgcgagcca agcccatagt ttgtttcata  600
tagccttgga gaaggtcgaa aaactcgtgc aggaggctcg tgcaggagga cctcgtgctg  660
ctctgcattt tgtggctaca gagtcgaagc acttggcgtt gacccaatct gtgaagctgt  720
atagtaaact taatcagttc cctgtcattc acactgttac agatgtaacc cttcccacag  780
ctactcactg gtcagataag tataaccata cccttatgga cctgacccgg aagggttata  840
cgatctttgg ttatttgcct ttggttccta ttgatgacat atctaagaca tttaaacaaa  900
gtaaagcaga ggagaaagaa aatgcaacta cgcataaatc tgattcatcg gattccgact  960
aaacggttgc catcatgtct aatgggtgtg gtttgttaag tatagtggtt tgcgaaaatg  1020
ttctagggtt tatgagcctg ctcgaaagat gctgagaaat ggaaatctgt actatttagg  1080
agtttttccg tactataata atgagtatga atggtttgta aattctgcct tgtgctttct  1140
cgacaagtat atcatgcttc tattttttac tactacttac tggactactg aattgtctca  1200
taattgtccc tagtgtctaa ttaaatatca cctccaaaat attattgaaa aa          1252

SEQ ID NO: 239          moltype = AA  length = 225
FEATURE                 Location/Qualifiers
source                  1..225
                        mol_type = protein
                        organism = Sapium sebiferum L.
SEQUENCE: 239
METEKKIPEL KHLGFVRMAA IQSLICVSNL YDYAKHNSGP LRSTVGTVEG AVTTVVGPVY  60
QKFKDLPDDL LVYVDKKVDE GTHKFDKHAP PIAKKAASQA HSLFHIALEK VEKLVQEARA  120
GGPRAALHFV ATESKHLALT QSVKLYSKLN QFPVIHTVTD VTLPTATHWS DKYNHTLMDL  180
```

```
TRKGYTIFGY LPLVPIDDIS KTFKQSKAEE KENATTHKSD SSDSD                225

SEQ ID NO: 240          moltype = DNA  length = 938
FEATURE                 Location/Qualifiers
source                  1..938
                        mol_type = other DNA
                        organism = Sapium sebiferum L.
SEQUENCE: 240
gagtattcac actctggcct gattgggttt gctataaagg gcgatcgttg caacgctcca  60
tattgtctac ttggttttgt ttcaaatctc atcattttgt aaatttgcga cagtgtagcg  120
ttttctagga aaaaggttgc taaaggaaag tagttatcaa accgcagaaa tggcggaatc  180
cgaacttaat caacacacag atatggttca agatgatgat aaaaaactca agtatctaga  240
ttttgtacaa gtggccgcga tctatgttgt ggtttgtttc tctagtatct atgaatatgc  300
taaggaaaac tccggtccac taaaaccagg ggtccaagcc gttgagtgta ccgtcaaaac  360
tgtaataagt ccggtttacg agaagtttcg cgacgtacct tttgaactcc ttaaattcgt  420
cgatcgtaaa gttgacaact ctctaggcga gttggacagg cacgtgccgt cgctggtgaa  480
gcaggcatca agccaagctc gagctgtggc tagtgaaatt caacatgctg gattggtaga  540
cgcaactaag aacattgcga agacgatgta tacaaagtat gaactgacgg cttggcagct  600
ctactgcaaa tacaagccgg tggctaagcg ttacgcggtg tcgacctggc gctcattgaa  660
ccagcttcct ctgtttcctc aagcggctca gattgcaatc ccaactgctg cttcgtggtc  720
tgagaaatac aataagatgg ttcgttacac gaaagataga ggatatccag cggcggtgta  780
tctgccattg atctcggttg agaggattgc caaggtgttc aatgaagact taaacgggcc  840
caccgtccct accaatggat catccgccgc agcacaatag ttttcatttt atgtatttat  900
gtcagattga agacgctccg gagattttga aaacctga                      938

SEQ ID NO: 241          moltype = AA  length = 194
FEATURE                 Location/Qualifiers
source                  1..194
                        mol_type = protein
                        organism = Sapium sebiferum L.
SEQUENCE: 241
MAESELNQHT DMVQDDDKKL KYLDFVQVAA IYVVVCFSSI YEYAKENSGP LKPGVQAVEC  60
TVKTVISPVY EKFRDVPFEL LKFVDRKVDN SLGELDRHVP SLVKQASSQA RAVASEIQHA  120
GLVDATKNIA KTMYTKYELT AWQLYCKYKP VAKRYAVSTW RSLNQLPLFP QAAQIAIPTA  180
ASWSEKYNKM VRYT                                                  194

SEQ ID NO: 242          moltype = DNA  length = 2526
FEATURE                 Location/Qualifiers
source                  1..2526
                        mol_type = other DNA
                        organism = Sorghum bicolor
SEQUENCE: 242
atggacgagt ccggggaagc gagcgtcggc tccttcagga tcggcccgtc gacgctgctg  60
ggccgcgggg tggcgctccg cgtgcttctc ttcagctcgc tgtggcgcct gcgggcgcgc  120
gcgtacgccg ccatctcgcg cgtgcgcagc gcggtgctgc cggtggcggc gtcctggctt  180
cacctcagga acacccacgg cgtcctcctc atggtcgtcc tcttcgccct ctccctgagg  240
aagctctccg gcgcgcggtc gcgggcggcg ctcgcgcgcc ggcgcaggca gtacgagaag  300
gccatgctgc atgccgggac gtacgaggtc tgggcccgcg ccgccaatgt gctcgacaag  360
atgtctgatc aggtccatga ggcggatttc tatgacgagg agctgatcag gaacaggctt  420
gaggacctcc ggaggcggag ggaggacggg tcgctgcggg acgtggtgtt ctgtatgcgc  480
ggcgatcttg ttaggaactt ggggaacatg tgcaatcctg aacttcacaa gggcaggcta  540
gaggttccta agcttataaa ggaatacatt gaagaggttt ctattcaact aagaatggtg  600
tgcgaatctg acactgatga gttgctattg ggagagaagc ttgcctttgt tcaggagacc  660
aggcatgcct ttgggaggac agccctactc ttaagtgggg gtgcttcact ggggtctttc  720
catgtaggtg tagtgaaaac attggttgag cataagcttc tgcctcggat tatagcagga  780
tcaagcgttg gttccattat atgttcgatt gttgctaccc ggacatggcc tgagattgag  840
agcttcttca cagactcatt acagaccttg cagttctttg ataggatggg tggaattttt  900
gcagtgatga ggcgagtcac cactcatggt gcactgcatg acattagcca gatgcaaagg  960
cttctgaggg atctcacaag taacttaaca tttcaagagg cttatgacat gactggccgt  1020
gtccttggga tcaccgtttg ctctcctaga aaaaatgagc caccccgctg cctcaactat  1080
ctgacgtcgc cgcacgttgt tatttggagt gctgtaactg cctcttgtgc atttcctggg  1140
ctctttgaag ctcaggaact gatggcgaag gatagattcg gcaacatagt tcccttccat  1200
gcaccctttg ccacagatcc tgaacaaggt cctggagcat caaagcgccg gtggagagat  1260
gggagcctgg aaatggattt gcccatgatg agactcaagg agttgtttaa tgtaaaccat  1320
ttcattgtga gccaaactaa tcctcacatt tctcccctcc tccgaatgaa agagcttgtt  1380
agagtctatg gagggcgctt tgctggaaag cttgctcgtc ttgctgagat ggaggttaag  1440
tatcgatgta accaaatcct agagattggt cttccaatgg gaggacttgc aaaattgttt  1500
gctcaggact gggagggtga tgtcaccatg gttatgccgg caacagtagc tcagtatttg  1560
aagattattc agaatccaac atatgcggag ctccaaatgg ctgccaacca aggccgcagg  1620
tgtacatggg agaagctctc tgcaatcaga gcaaactgtg ccatcgaact tgcattggat  1680
gaatctatag cagttttaaa ccacaaacgg aggctaaaaa gaagcatgga gaggacagag  1740
gctgctttgc agggtcattc taactatgtt cgactcaaaa ctccaaggag ggtaccatca  1800
tggagctgca tcagtcgaga gaattcttca gaatctctct cggaagagat ttcagcagtt  1860
gctacttcaa ccgcgcagca aggtgctgct cttgttgtcg gcacagccac tctttctcac  1920
catgttcgac gcaattctca tgacggaagt gagagtgaat cagaaaccat tgaccttaat  1980
tcctggacca ggagtggtgg gcctctaatg aggacagcat ctgctgacat gttcatcagt  2040
ttcatccata accttgagat tgacacggaa ttaagtaggc cctgtactgt ggagggtggt  2100
actgcaggta tttcgtcaga atctaccttc ccaaatgatc cacaaccgaa caatggctca  2160
agtgttacta ctccaggtag atgcacagaa aattctgaga ccgaggcata cgacactgtc  2220
```

```
aacaccagag ccagtcaggc ttctactccc acaagcatcg ctgtttctga aggagatttg  2280
ctgcagcctg aaagcattgc tgacggtatc ctgcttaaca ttgtgaaaag agatgccttg  2340
caggctcaaa atgacagcgt aactgaattg gccgaaagct cctgcactga aacatatgcg  2400
gaaacttgtg acaccatctc agggtctggc actgctgaag ataacaagga tactgctgac  2460
tcaagcaatc actcacttga tattgatgct tttgtagttt cgcatcaacc ttcagctgat  2520
gattag                                                             2526

SEQ ID NO: 243         moltype = DNA  length = 3099
FEATURE                Location/Qualifiers
source                 1..3099
                       mol_type = other DNA
                       organism = Triticum aestivum
SEQUENCE: 243
atgcccgcgc ctgcaggtgc gtgcagccaa gccccaccgc tcgccttcta ttccgcgtcc  60
cctagcttgg cccggccctg ctccgatcca aggccgcggc ggtggcccag tgccctctcc  120
ctcctgccac gccgtccgcc gcccatggac gtcatcacca acgaggcgcg cgtgggggcg  180
ttcgcgatcg gcccgtccac ggcggcgggg cgcgcgctcg cgctgcgcgt gctcctctgc  240
ggctcgctgg cgcggctgcg gcaccgcctc gccgccgcgc tgcgcgccgc ggcgccgctg  300
gcggcggcct ggctgcaccc gcgccacaac acgcgggga tcctgctcgc cgtctgcgcc  360
gtcgcgctgc tgctgcgcgg ccgcgggggc cgcgccgggg tgcgcgcgcg ggtgcagtcc  420
gcctaccgcc gcaagttctg gcggaacatg atgcgcgccg cgctcaccta cgaggagtgg  480
gcgcacgccg cgcggatgct cgagcgggag acgccgcgcc gcgtcaccga cgccgacctc  540
tacgacgagg agctcgtgtg caacaagctc cgtgagctca ggcaccgccg tcaggagggc  600
tcgctcaggg acatcgtctt ctgcatgcgc gccgatctgc tcaggaacct tggtaacatg  660
tgcaaccccg agctccacaa gttgaggctg caggtgccta aaaccatcaa ggagtacatt  720
gaggaggtat ctactcaact gaaaatggtt tgcaattctg attcggacga gttacccctt  780
gaagagaaac tggcatttat gcatgagaca agacatgcct ttggtagatc ggccctactg  840
ctaagtggag gtgcttcatt tggctctttc catgtgggtg ttgtgaaaac cttggtagag  900
cataagcttc tacctaggat tatttcagga tcaagcgttg gcgcaataat gtgtgctatt  960
gtagccacac ggtcatggcc agaactagag agttttttg aggagtggca ttccttgaaa  1020
ttctttgacc agatgggtgg gatctttcct gtatttaaaa gaattttgac gcatggagcg  1080
gttcatgaca ttaggcactt gcagacgcag ttgagaaatc ttacaagcaa tttgacattt  1140
caagaggcat atgacatgac tggccgggtt ctcgttgtta ctgtgtgttc tccaagaaaa  1200
catgagccac cacgatgcct gaactatttg acatcacctc atgttctcat ttggagtgca  1260
gtaactgctt cctgtgcttt tcctggactt tttgaggccc aggagttgat ggccaaagat  1320
agattcggag aaacagttcc ttttcatgct ccattcttgt tgggtgtgga ggaacgagct  1380
gacgctgcta cacggcgctg gagagatggc agcttagaaa gtgatttacc catgaagcaa  1440
ttgaaggaat tattcaacgt aaatcacttc atagtaagcc aagccaatcc tcacattgct  1500
ccattactga gactaaagga gatcatcagg gcttacggag gcagctttgc tgcaaagctt  1560
gctgaacttg ctgagatgga agttaagcat aggttcaatc aagttctgga acttggattt  1620
ccattaggag gaatagctaa gttgtttgct caacattggg aaggtgatgt gacaatcgtt  1680
atgccagcca cacttgctca gtattcgaag atcatacaga atccttcgta ttctgagctt  1740
cagaaagccg caagtcaggg taggcgatgc acttgggaaa agctctctgc tatcagggca  1800
aactgcgcta ttgagcttgc attagatgaa tgtgttgccc tcctgaacca catgcgtagg  1860
ctgaagagaa gtgcagaaag agcagctgct tcacaaggat atggtgctac aattagactc  1920
tgtccatcta gaaggattcc atcatggaat ctcatagcaa gagaaaattc aactggttct  1980
ctcgatgagg aaatgctcac atgtcccact gttacgagcc atcaagcagt tggagggact  2040
gctgggccat ctaacagaaa tcaccatctc caacatagta tgcatgatag cagtgacagt  2100
gaatctgaga gtatagactt gaactcatgg acgagaagtg gtggccctct catgagaaca  2160
gcctcagcta ataaattcat cagctttgtt cagaaccttg agattgacac agaattcaga  2220
acaatttcac caagggggag cgaaggtgat attgttacac cgaatagtaa cttatttgct  2280
ggtcacccaa ttggtagaga gccagttgat aaccatccag ggcctgctac tcctggtagg  2340
acctcaggca attcaggttg cgatcctcat gatactcctg ttcctaggtc tccatttggt  2400
ctttccacaa gtatcatggt ccctgaaggt gacttgctgc agccggaaaa gattgagaat  2460
ggtattttat tcaatgttgt gagaagggat gctcttgtag cgactactag cggagttgaa  2520
cctcatggat cttcacagga agcagatgtg gaaactgtac cgaccgagtg cctttatggt  2580
gcttcggatg acgacgacga caacgtggaa ctgaatgctg atcatgaagc attatctgac  2640
cctggagatc agagatcctc agttgcagga aacctagatc cgtccacttc catggattgt  2700
caagctgatg aaacaagtac tactcgatca gaagctccat ctctctttaa tatctgtgtg  2760
gagattcctc cagcaaccat gatcagagaa aatagtcggc ccgacgagcc ttcttcagac  2820
ataagactgg agattgtaaa gacagaatgc cctgatgaga attcagctgc tgggaacgat  2880
gaagttggct cagttcctgc caataaagaa tcttcctatt gttctcagac agctgaaaat  2940
agacagcagc atcaagttga tatgggatct gtgaactcct gtagtgtttc agtttcagaa  3000
gatgataggc atgtcagcct catttcgaac gagaaaccag ttactacttc cagtggcgga  3060
gcggagagta tgacatctgg aagaaatgaa gctgactag                         3099

SEQ ID NO: 244         moltype = DNA  length = 2198
FEATURE                Location/Qualifiers
misc_feature           1..2198
                       note = S. bicolor SDP1 hpRNAi fragment
source                 1..2198
                       mol_type = other DNA
                       organism = synthetic construct
SEQUENCE: 244
gcggcggcgt ggctgcaccc gcgcgacaac acgcgcggga tcctgctcgc cgtctgcgcc  60
gtcgcgctgg gtgcagtccg cctaccgccg caagttctgg cggaacatga tgcgcgccgc  120
gctcacctac gaggagtggg cgcacgcggc gcggatgctt ggagtgcagt aacagcttcc  180
tgtgcttttc ctggactttt tgaggcccac catctaggag gattccatcc tggaatctca  240
tagcaagaga aaattcaact ggttctctat gtgcaatcct gaacttcaca agggcaggct  300
```

```
agaggttcct aagcttataa aggaatacat tgaagaggtt tctattcaac taagaatggt  360
gtgcgaatct gacactgatg agttgctatt gggagagaag cttgcctttg ttcaggagac  420
caggcatgcc tttgggagga cagccctact cttaagtggg ggtgcttcac tggggtcttt  480
ccatgtaggt gtagtgaaaa cattggttga gcataagctt ctgcctcgga ttatagcagg  540
atcaagaagg gtggacccag ctttcttgta caaagtggtc tcgaggaatt cggtacccca  600
gcttggtaag gaaataatta ttttcttttt tccttttagt ataaaatagt taagtgatgt  660
taattagtat gattataata atatagttgt tataattgtg aaaaaataat ttataaatat  720
attgtttaca taaacaacat agtaatgtaa aaaaatatga caagtgatgt gtaagacgaa  780
gaagataaaa gttgagagta agtatattat ttttaatgaa tttgatcgaa catgtaagat  840
gatatactag cattaatatt tgttttaatc ataatagtaa ttctagctgg tttgatgaat  900
taaatatcaa tgataaaata ctatagtaaa aataagaata aataaattaa aataatattt  960
ttttatgatt aatagtttat tatataatta aatatctata ccattactaa atattttagt  1020
ttaaaagtta ataaatattt tgttagaaat tccaatctgc ttgtaattta tcaataaaca  1080
aaatattaaa taacaagcta aagtaacaaa taatatcaaa ctaatagaaa cagtaatcta  1140
atgtaacaaa acataatcta atgctaatat aacaaagcgc aagatctatc attttatata  1200
gtattatttt caatcaacat tcttattaat ttctaaataa tacttgtagt tttattaact  1260
tctaaatgga ttgactatta attaaatgaa ttagtcgaac atgaataaac aaggtaacat  1320
gatagatcat gtcattgtgt tatcattgat cttacatttg gattgattac agttgggaag  1380
ctgggttcga aatcgataag cttgcgctgc agttatcatc atcatcatag acacacgaaa  1440
taaagtaatc agattatcag ttaaagctat gtaatatttg cgccataacc aatcaattaa  1500
aaaatagatc agtttaaaga aagatcaaag ctcaaaaaaa taaaaagaga aaagggtcct  1560
aaccaagaaa atgaaggaga aaaactagaa atttacctgc acaagcttgg atcctctaga  1620
ccactttgta caagaaagct gggtccaccc ttcttgatcc tgctataatc cgaggcagaa  1680
gcttatgctc aaccaatgtt ttcactacac ctacatggaa agaccccagt gaagcacccc  1740
cacttaagag tagggctgtc ctcccaaagg catgcctggt ctcctgaaca aaggcaagct  1800
tctctcccaa tagcaactca tcagtgtcag attcgcacac cattcttagt tgaatagaaa  1860
cctcttcaat gtattccttt ataagcttag gaacctctag cctgcccttg tgaagttcag  1920
gattgcacat agagaaccag ttgaattttc tcttgctatg agattccagg atggaatcct  1980
cctagatggt gggcctcaaa aagtccagga aaagcacagg aagctgttac tgcactccaa  2040
gcatccgcgc cgcgtgcgcc cactcctcgt aggtgagcgc ggcgcgcatc atgttccgcc  2100
agaacttgcg gcggtaggcg gactgcaccc agcgcgacgg cgcagacggc gagcaggatc  2160
ccgcgcgtgt tgtcgcgcgg gtgcagccac gccgccgc                        2198
```

```
SEQ ID NO: 245         moltype = DNA  length = 22
FEATURE                Location/Qualifiers
misc_feature           1..22
                       note = Oligonucleotide primer
source                 1..22
                       mol_type = other DNA
                       organism = synthetic construct
SEQUENCE: 245
ttttaacgat atccgctaaa gg                                          22
```

```
SEQ ID NO: 246         moltype = DNA  length = 23
FEATURE                Location/Qualifiers
misc_feature           1..23
                       note = Oligonucleotide primer
source                 1..23
                       mol_type = other DNA
                       organism = synthetic construct
SEQUENCE: 246
aatgaatgaa caagaattaa gtc                                         23
```

```
SEQ ID NO: 247         moltype = DNA  length = 22
FEATURE                Location/Qualifiers
misc_feature           1..22
                       note = Oligonucleotide primer
source                 1..22
                       mol_type = other DNA
                       organism = synthetic construct
SEQUENCE: 247
cttttctcac accgtatctc cg                                          22
```

```
SEQ ID NO: 248         moltype = DNA  length = 25
FEATURE                Location/Qualifiers
misc_feature           1..25
                       note = Oligonucleotide primer
source                 1..25
                       mol_type = other DNA
                       organism = synthetic construct
SEQUENCE: 248
agcatgatat acttgtcgag aaagc                                       25
```

```
SEQ ID NO: 249          moltype = DNA  length = 18
FEATURE                 Location/Qualifiers
misc_feature            1..18
                        note = Oligonucleotide primer
source                  1..18
                        mol_type = other DNA
                        organism = synthetic construct
SEQUENCE: 249
gcgacagtgt agcgtttt                                                18

SEQ ID NO: 250          moltype = DNA  length = 25
FEATURE                 Location/Qualifiers
misc_feature            1..25
                        note = Oligonucleotide primer
source                  1..25
                        mol_type = other DNA
                        organism = synthetic construct
SEQUENCE: 250
atacataaaa tgaaaactat tgtgc                                        25

SEQ ID NO: 251          moltype = DNA  length = 23
FEATURE                 Location/Qualifiers
misc_feature            1..23
                        note = Oligonucleotide primer
source                  1..23
                        mol_type = other DNA
                        organism = synthetic construct
SEQUENCE: 251
acagacatgt ctagacccag atg                                          23

SEQ ID NO: 252          moltype = DNA  length = 24
FEATURE                 Location/Qualifiers
misc_feature            1..24
                        note = Oligonucleotide primer
source                  1..24
                        mol_type = other DNA
                        organism = synthetic construct
SEQUENCE: 252
cactctcatc ccaagtgaag ttgc                                         24

SEQ ID NO: 253          moltype = DNA  length = 25
FEATURE                 Location/Qualifiers
misc_feature            1..25
                        note = Oligonucleotide primer
source                  1..25
                        mol_type = other DNA
                        organism = synthetic construct
SEQUENCE: 253
ctgagatgga agtgaagcac agatg                                        25

SEQ ID NO: 254          moltype = DNA  length = 21
FEATURE                 Location/Qualifiers
misc_feature            1..21
                        note = Oligonucleotide primer
source                  1..21
                        mol_type = other DNA
                        organism = synthetic construct
SEQUENCE: 254
ccattgttag tcctttcagt c                                            21
```